United States Patent [19]

Rusterholz et al.

[11] Patent Number: 4,873,630

[45] Date of Patent: Oct. 10, 1989

[54] SCIENTIFIC PROCESSOR TO SUPPORT A HOST PROCESSOR REFERENCING COMMON MEMORY

[75] Inventors: John T. Rusterholz, Roseville; Archie E. Lahti, Fridley; Louis B. Bushard, Anoka; Larry L. Byers, Apple Valley; James R. Hamstra, Plymouth; Charles J. Homan, St. Paul, all of Minn.

[73] Assignee: Unisys Corporation, Blue Bell, Pa.

[21] Appl. No.: 761,201

[22] Filed: Jul. 31, 1985

[51] Int. Cl.⁴ ..................... G06F 15/347; G06F 15/16

[52] U.S. Cl. ............................... 364/200; 364/232.21; 364/231.8; 364/263

[58] Field of Search ... 364/200 MS File, 900 MS File, 364/730, 736

[56] References Cited

U.S. PATENT DOCUMENTS

| | | | |
|---|---|---|---|
| 4,101,960 | 7/1978 | Stokes et al. | 364/200 |
| 4,507,728 | 3/1985 | Sakamoto et al. | 364/200 |
| 4,541,046 | 9/1985 | Nagashima et al. | 364/200 |
| 4,633,434 | 12/1986 | Scheuneman | 364/900 |
| 4,674,032 | 6/1987 | Michaelson | 364/200 |

*Primary Examiner*—Gareth D. Shaw
*Assistant Examiner*—Christina M. Eakman
*Attorney, Agent, or Firm*—Charles A. Johnson; Robert S. Bramson

[57] ABSTRACT

An improved Scientific Processor for use in a data processing system having a general purpose host processor and a High Performance Storage Unit, and under operational control of the host processor is described. The Scientific Processor includes a Vector Processor Module and a Scalar Processor Module, each operable at comparable rates, wherein scalar operands and vector operands can be manipulated in various combinations under program control of an associated host processor, all without requirement of dedicated storage or caching. The Scalar Processor Module includes instruction flow control circuitry, loop control circuitry for controlling nested loops, and addressing circuitry for generating addresses to be referenced in the High Performance Storage Unit. A scalar processor arithmetic logic unit is described for performing scalar manipulations. The Vector Processor Module includes vector control circuitry and vector file storage circuitry together with vector file loading and vector storage circuitry. A plurality of vector manipulating pipelines for performing instruction functions of vector addition, vector multiplication and vector move is described wherein the pipelined functions can occur simultaneously, and each pipeline is capable of providing resultant operand pairs at a rate approximately equal to the reference cycle of the High Performance Storage Unit.

26 Claims, 252 Drawing Sheets

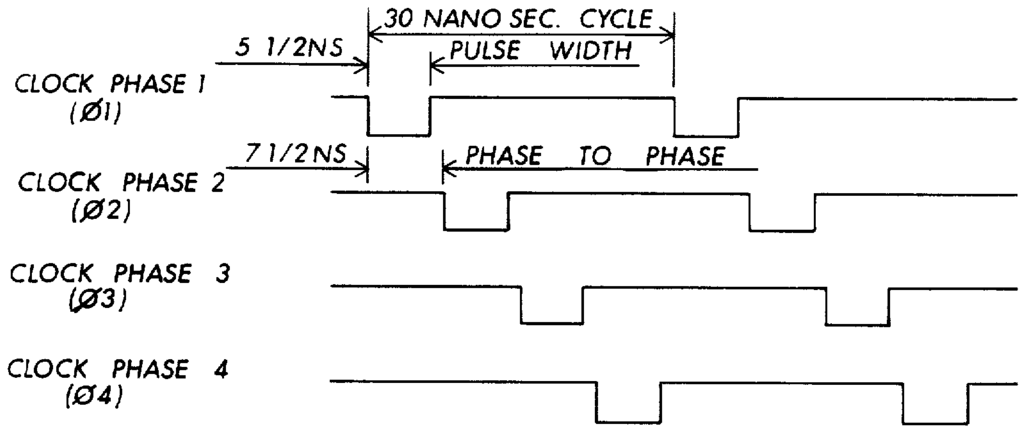
CLOCK PHASES AT OUTPUT CPG GATE ARRAY
FIG. 7
FIG. 6
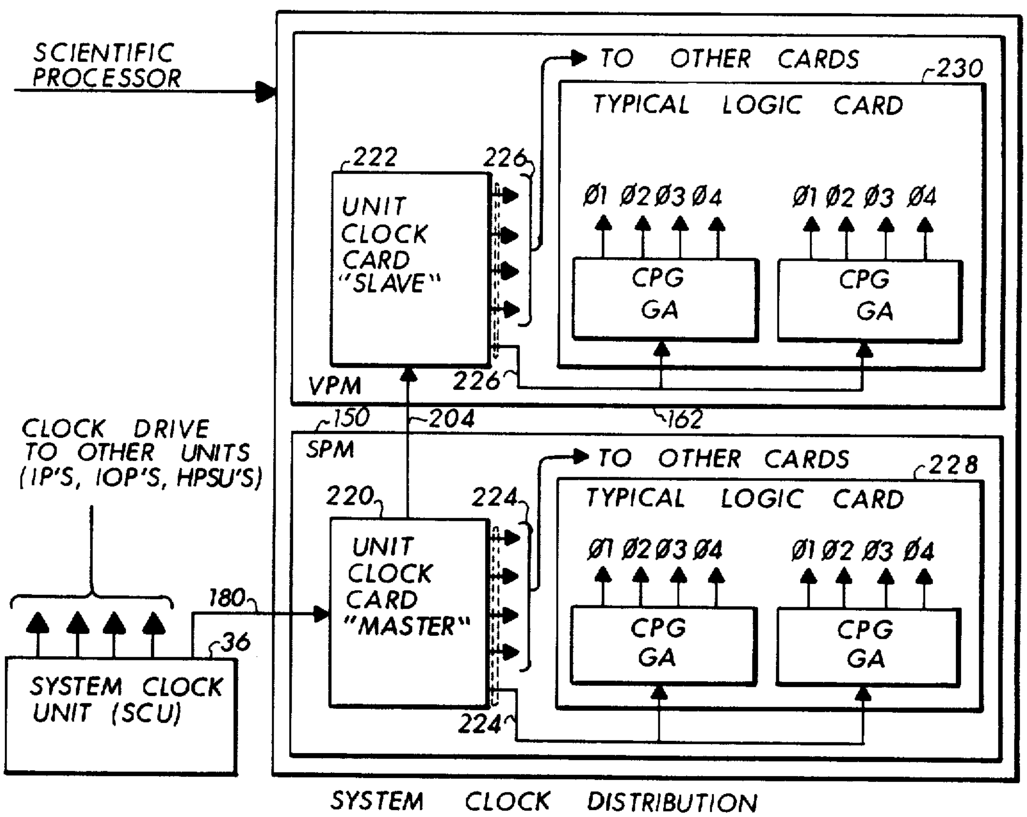
SYSTEM CLOCK DISTRIBUTION

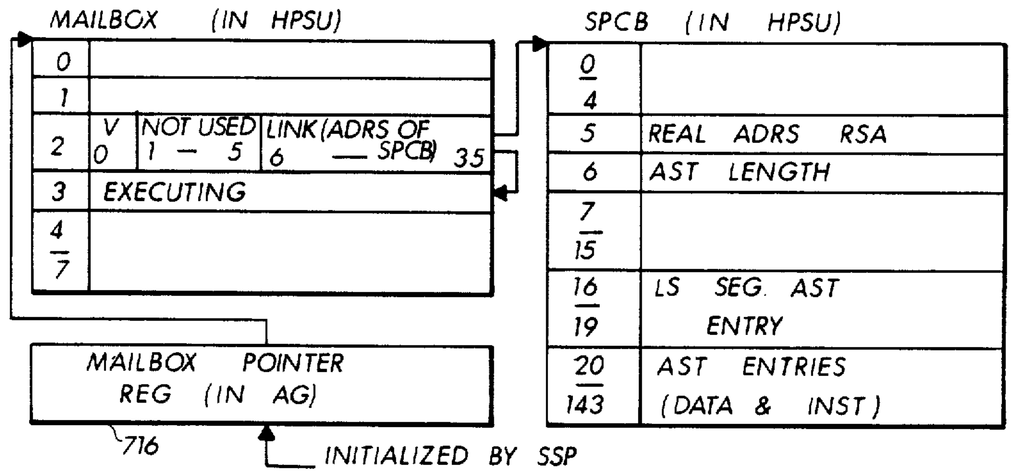
FIG. 12 LOCATING SPCB
EXECUTING FIRST INST
| f | t | r1 | r2 | X | r3 | X | S1 | X | S2 | X | S3 | X |
|---|---|---|---|---|---|---|---|---|---|---|---|---|
| 7 | 3 | 4 | 4 | 2 | 4 | 5 | 1 | 2 | 1 | 1 | 1 | 1 |
RR FORMAT ADD INST
f = 142 - OP-CODE FOR RR ADD
t = 0- SINGLE PRECISION INTEGER
r1= 1-G-REG NO.1 (AUGEND)
r2= 2-G-REG NO.2 (ADDEND)
r3= 3-G-REG NO.3 (SUM)
S1 = S2 = S3 = 0 - ALL G-REG'S
FIG. 13 EXAMPLE RR FORMAT ADD
EXECUTING FIRST INST
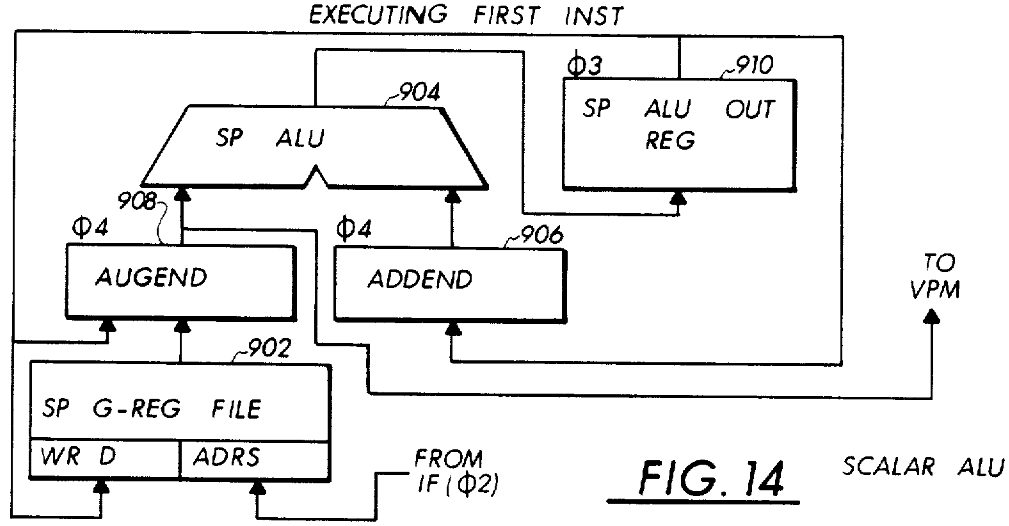
FIG. 14 SCALAR ALU

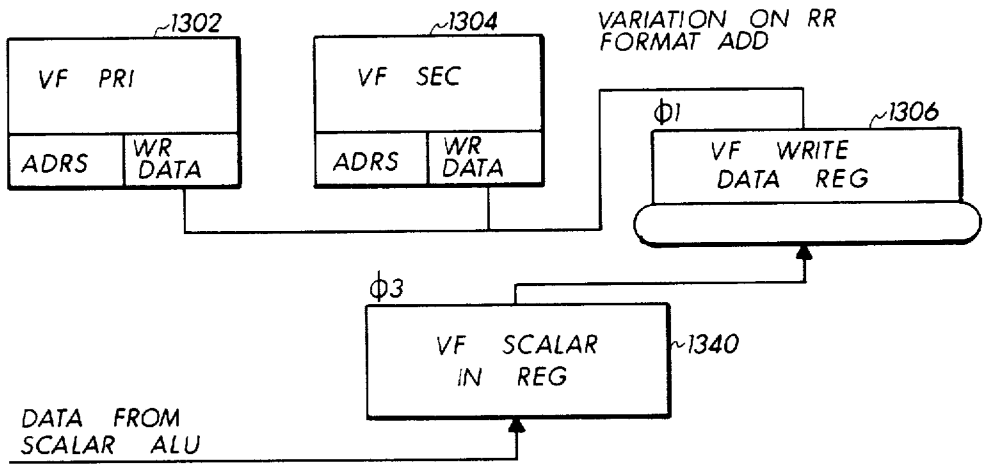

FIG. 15

VF WR FOR RR ADD WITH S3=1

| f | t | V1 | V2 | l | V3 | | S1 | | S2 | C |
|---|---|---|---|---|---|---|---|---|---|---|
| 7 | 3 | 4 | 4 | 2 | 4 | 6 | 1 | 2 | 1 | 2 |

VV FORMAT ADD INST
f = 042 - OP-CODE FOR VV ADD
t = 2 - SINGLE PRECISION FP
V1 = 4 - VECTOR FILE NO.4 (AUG)
V2 = 5 - VECTOR FILE NO.5 (ADD)
l = 0 - ELCNT (NO. ELEMENTS)
V3 = 6 - VECTOR FILE NO. 6 (SUM)
S1 = S2 = 1 - VECTOR FILES (NOT G-REG)
C = 3 - DO ELEMENTS WITH ONE IN MASK

FIG. 16

THIRD INSTRUCTION

• SC X-FERS GOP TO VF DP & SP ADDEND REG WHEN AVAILABLE.

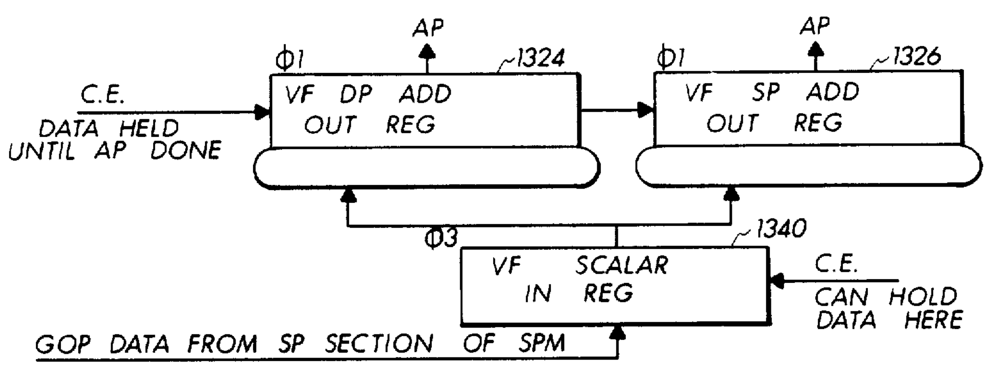

• SC CLEARS GOP WAIT DES AND TERMINATES. ALLOWS VC & AP TO PROCEED. REST IS SIMILAR TO THE PREVIOUS INST (VV ADD).

FIG. 17

VPM EXECUTING FOURTH INST GOP TRANSFER

INST BFR AND XRAM BLOCK DIAGRAM

OPERATION
36 BIT VIRTUAL ADRS USED FOR INST BFR REFERENCES

VIRTUAL ADRS FORMAT

| SEGMENT ADRS | 0 0 | PAGE ADRS | WORD ADRS | BFR STACK ADRS |
|---|---|---|---|---|
| 00 - 17 | 18 - 19 | 20 - 27 | 28 - 33 | 34 - 35 |

FIG. 23 INST. BFR. REFERENCING

JP SEQ DESIGNATORS

JP SEQUENCE

3 CYCLES JP NOT TAKEN TIMING

RAISING BLOCK DESIGNATORS
FOR JUMP INSTRUCTIONS
(BLKS FOR JUMPS RESOLVED IN 4 CYCLES)

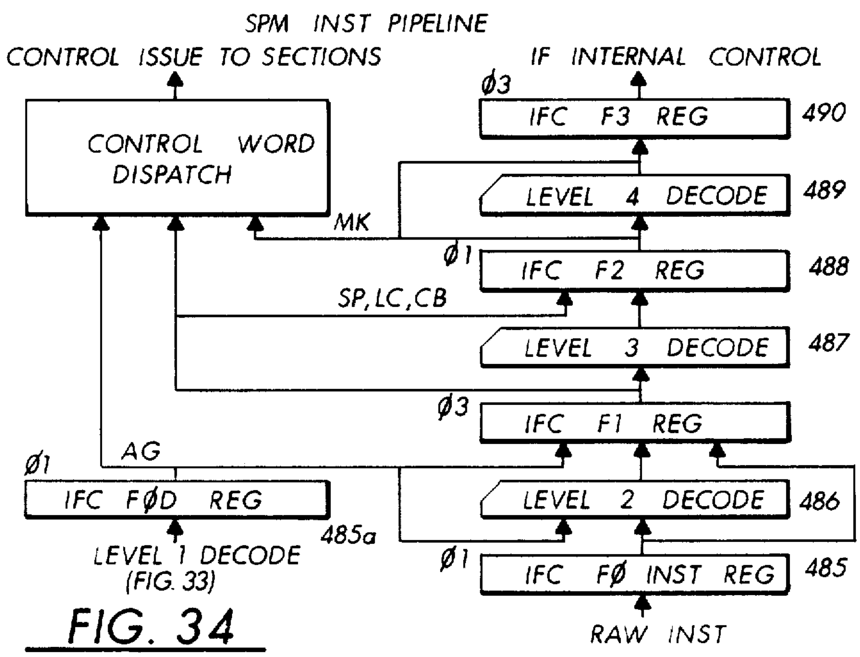
FIG. 34
FIG. 35
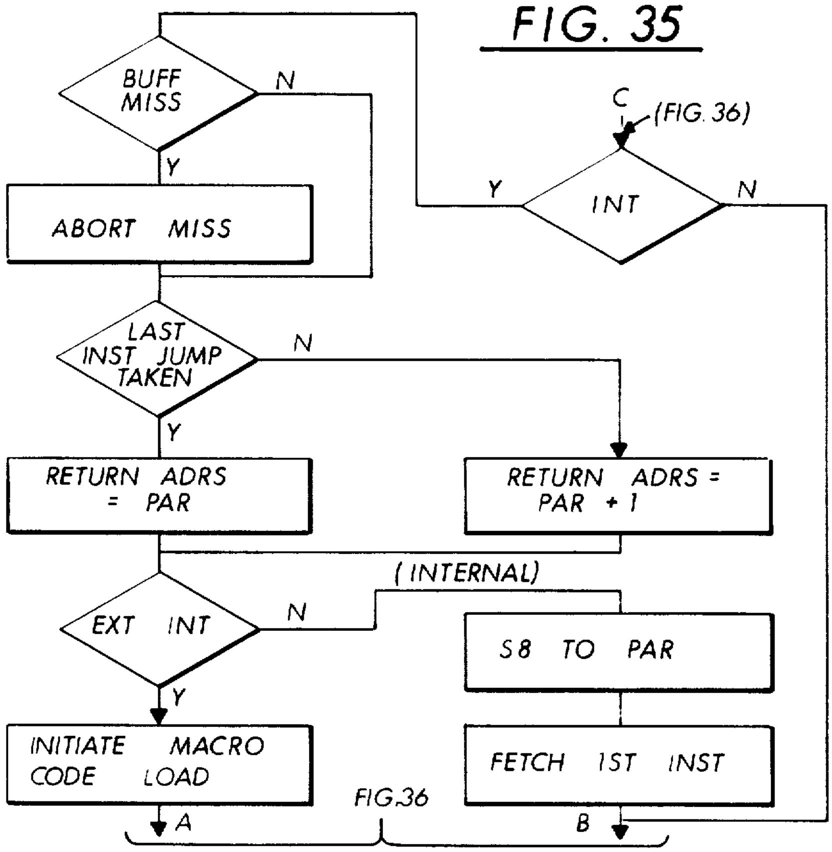

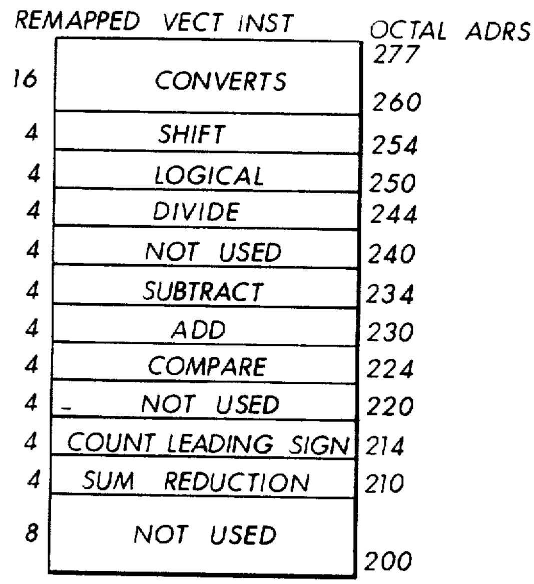
FIG. 40
REMAPPED VECT INST ADDRESS GEN
XRAM ADDRESS BITS
| INST | 0 | 1 | 2 | 3 | 4 | 5 | 6 | 7 |
|---|---|---|---|---|---|---|---|---|
| SUM REDUCT | 1 | 0 | 0 | 0 | 1 | 0 | $TI_1$ | $TI_2$ |
| COMPARE | 1 | 0 | 0 | 1 | 0 | 1 | J0 | J1 |
| ADD | 1 | 0 | 0 | 1 | 1 | 0 | $TI_1$ | $TI_2$ |
| SUBTRACT | 1 | 0 | 0 | 1 | 1 | 1 | $TI_1$ | $TI_2$ |
| DIVIDE | 1 | 0 | 1 | 0 | 0 | 1 | $TI_1$ | $TI_2$ |
| LOGICAL | 1 | 0 | 1 | 0 | 1 | 0 | $TI_0$ | $TI_1$ |
| SHIFT | 1 | 0 | 1 | 0 | 1 | 1 | $TI_0$ | $TI_1$ |
| CONVERT | 1 | 0 | 1 | 1 | $TI_1$ | $TI_2$ | $T3_0$ | $T3_1$ |
| CLS | 1 | 0 | 0 | 0 | 1 | 1 | $TI_1$ | $TI_2$ |
FIG. 41
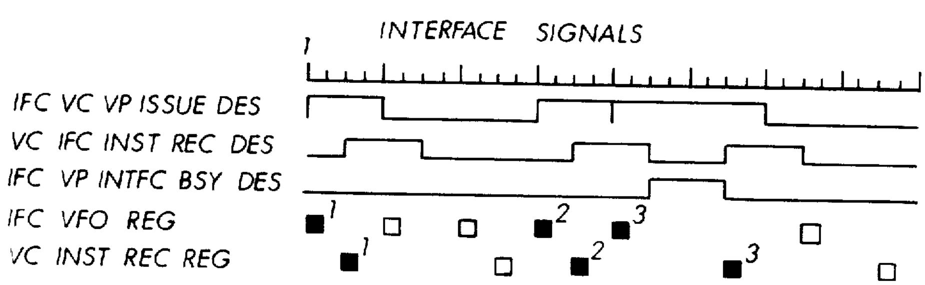
FIG. 42

TO HPSU

04
BRKPT REG
6-29
11
04
HPSU ADR REG
0-21
9A
0 1 2 3
03
MAIL BOX HOLD
0-21
9C
0 1 2 3
FROM SP
02
HPSU ADR BUF
0-29
11
02
MAIL BOX
0-21
9C
02
MAIL BOX
0-21
9C
01
(VSO+STRIDE) BUF
0-35
11
01
(AA+STRIDE) BUF
0-29
11
01
(PUL-STRIDE) BUF
0-29
11
VSO+STRIDE
0-35 0-35
AA+STRIDE
0-29 0-35
PUL-STRIDE
0-29 0-35
02
VSO BUF 4
0-35
02
AA. BUF 2
0-29
02
PUL BUF 2
0-29
REAL ADDRESS MEMORY
12
DATA
WR ADR (04)
RD ADR (03)
CLEAR
WRITE (02)
READ
721
04
VSO BUF 3
0-35
04
AA BUF 1
0-29
04
PUL BUF 1
0-29

TRANSLATION

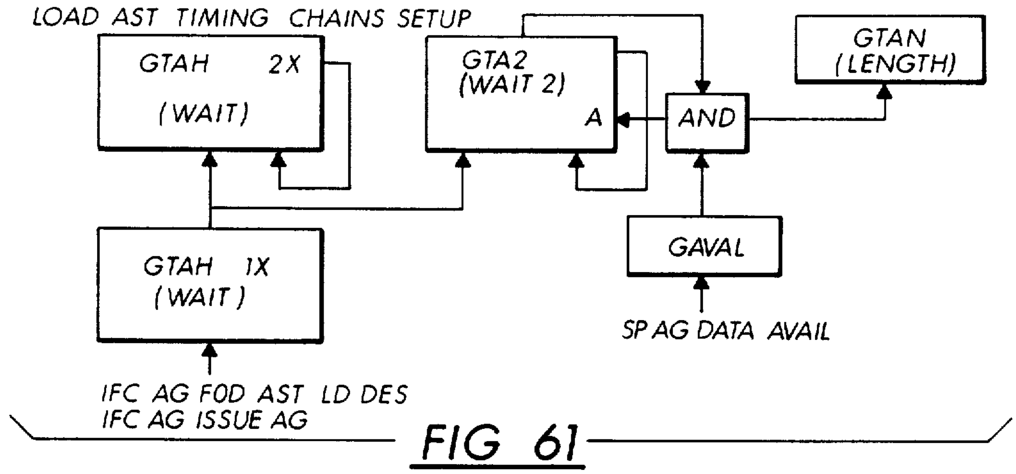
FIG 61
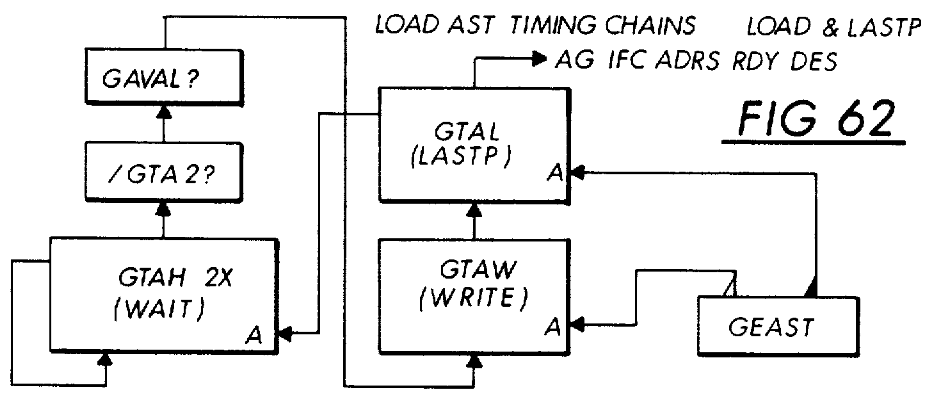
FIG 62
FIG 63
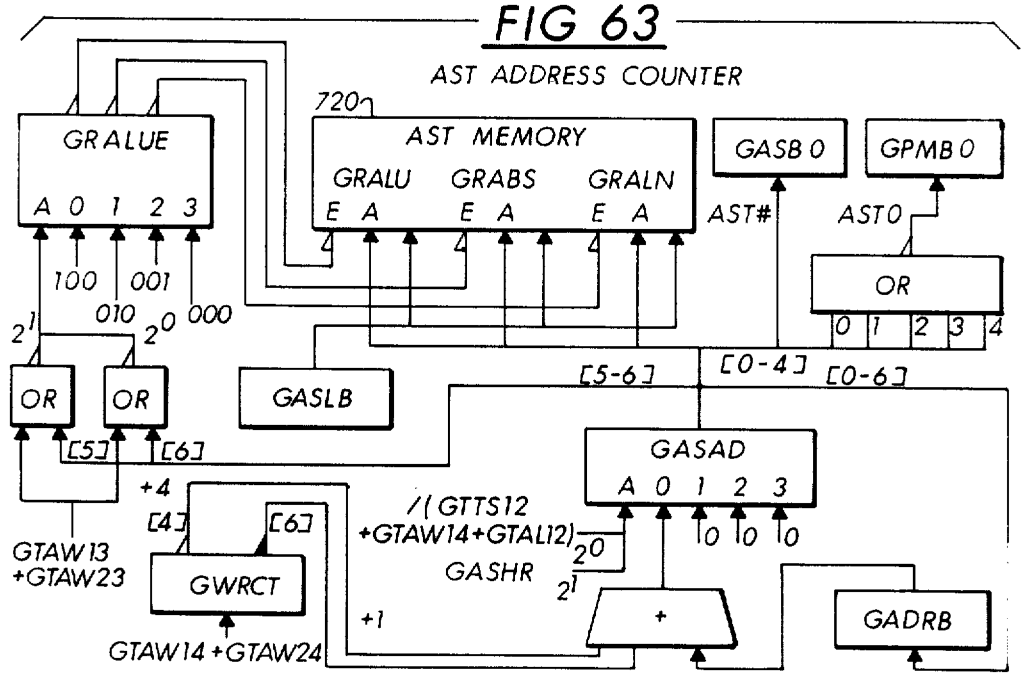

FIG. 70B
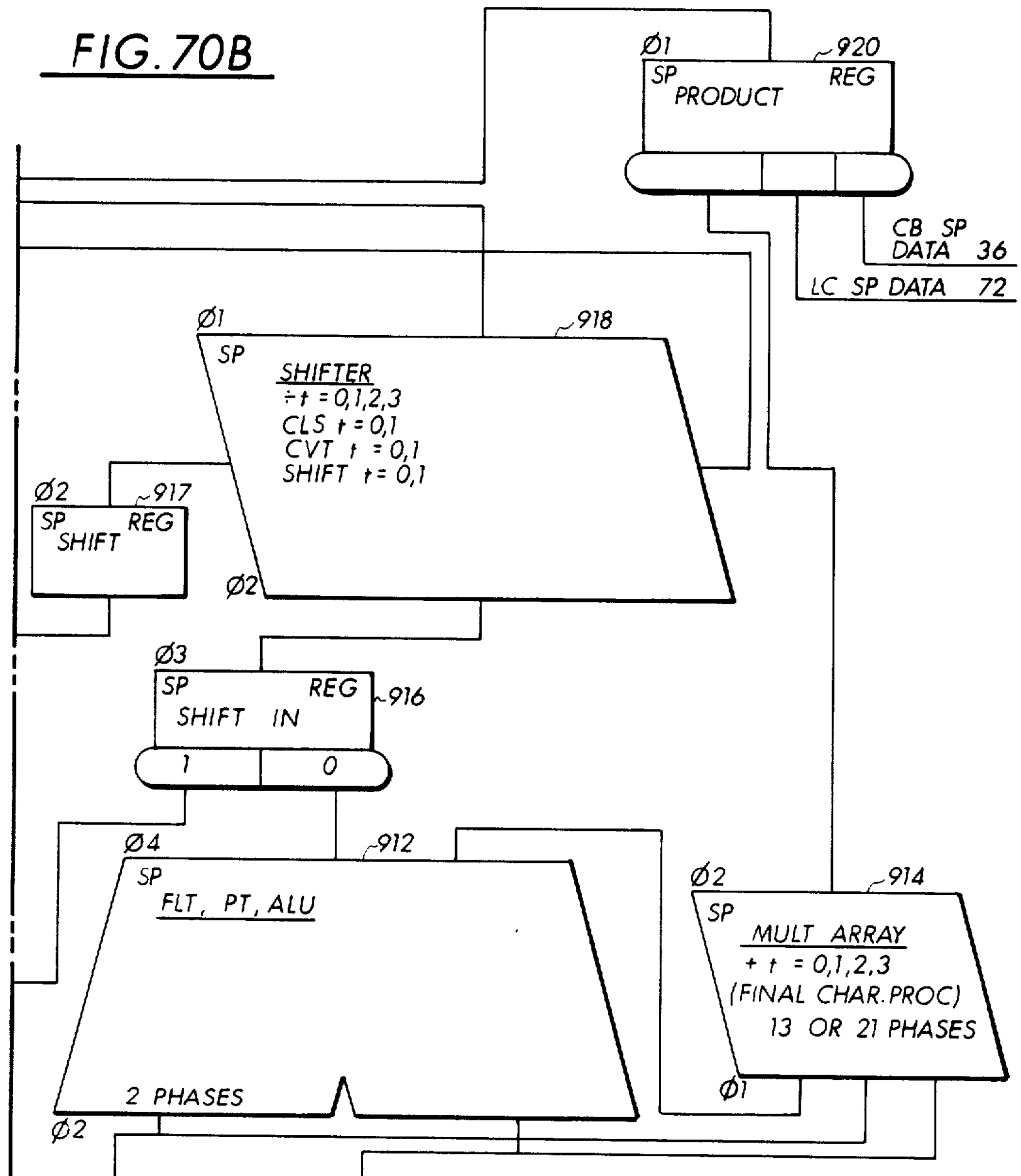
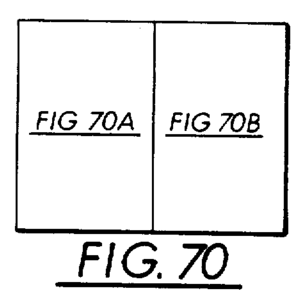
FIG. 70

EIGHTEEN (18) MASTER BITS

| CONTROL OVERVIEW | |
|---|---|
| | ISSUE SP DES |
| (1) IFC SP F1 | ADD INST DES |
| (2) | SUB |
| (3) | MPY |
| (4) | DIVD |
| (5) | ABS |
| (6) | CLS |
| (7) | LOG |
| (8) | CMPR |
| (9) | CVRT |
| (10) | SHF |
| (11) | SRC |
| (12) | DEST |
| (13) | EXG |
| (14) | SRC CB |
| (15) | SRC LC |
| (16) | GIV |
| (17) | IJL |
| (18) | DJG |

F.P. UNIT CONTROL

FP ALU DATA PATH

FIG 89
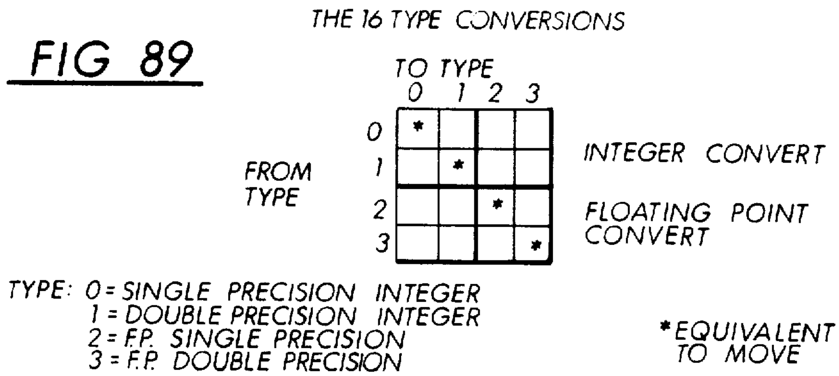
FIG 93 INTEGER DIVIDE TIMING
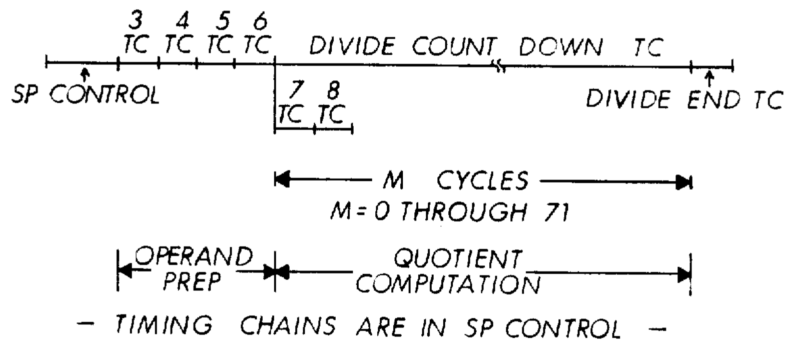
FIG. 94 FLOATING PT. DIVIDE TIMING
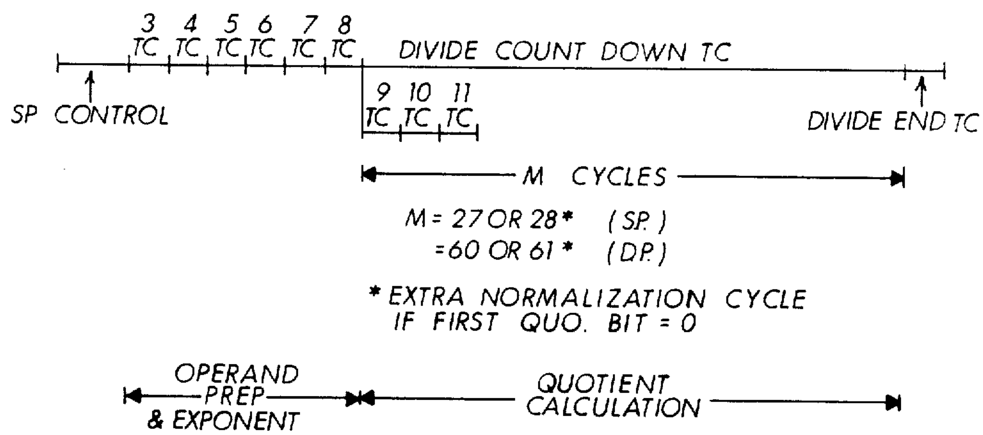

CVT INT→ FP

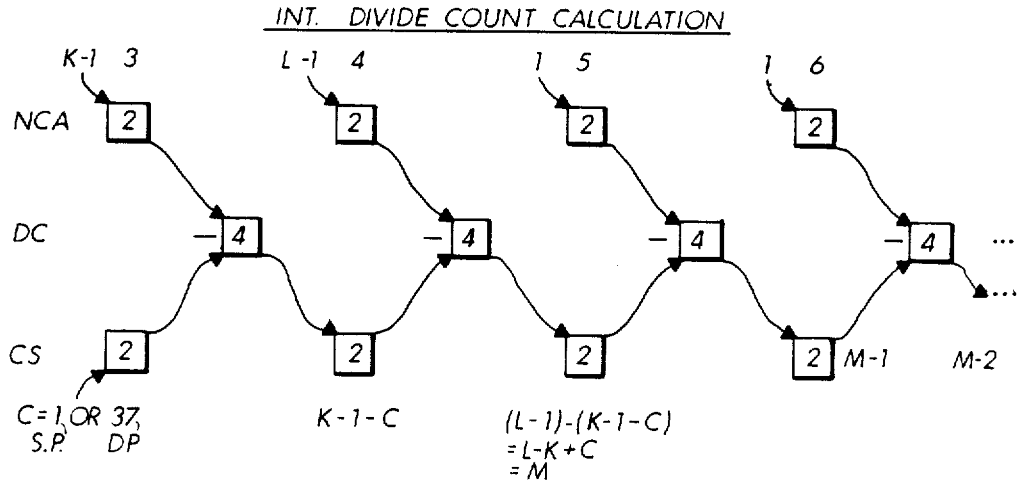
INTEGER OVERFLOW IF M > 36 AND SINGLE PRECISION
FIG. 97
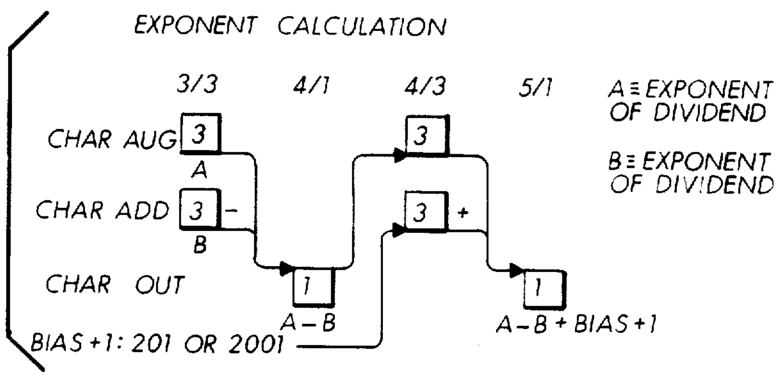
FIG. 98
NON-RESTORING
```
1    0.100110
   - 0.110000
     1.110101     Q#1=0

2    1.101011
   + 0.110000
     0.011011     Q#2=1

3    0.110110
   - 0.110000
     0.000110     Q#3=1

4    0.001100
   - 0.110000
     1.011011     Q#4=0
```
ONES COMPLEMENT
FIG. 99
RESTORING
```
1    0.100110
   - 0.110000
     1.110101     Q#1=0

1A   1.110101
   + 0.110000     } RESTORE CYCLE
     0.100110

2    1.001100
   - 0.110000
     0.011011     Q#2=1

3    0.110110
   - 0.110000
     0.000110     Q#3=1

4    0.001100
   - 0.110000
     1.011011     Q#4=0
```
NO RESTORE ON LAST CYCLE JXS
SAME AS LAJ FOR b≠0 EXCEPT ADR+1 NOT STORED.
FOR b=0: JUMP ADRS FROM S12

MOVE DEST TO CB

MOVE SRC FROM CB

FIXED TIME
NO ISSUE FROM IFC

FIG. 114
HSR3 (SPCB 11) MARS/L, LAJ, JXS, JUMPS, DIAG
| HPSU ADRS | MUA DET ERR | HPSU DET ERR | EAGLE DET ERR | MUE | DIAG | LAJ JXS | JHFP |
|---|---|---|---|---|---|---|---|
| 0–21 | 22 | 23 | 24 | 25–28 | 29 | 30 | 31–35 |
FIG. 113
EXTERNAL MONITOR (SIO)
MOVE, MARS/L
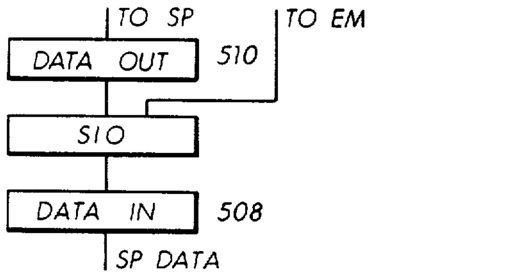
FIG. 115
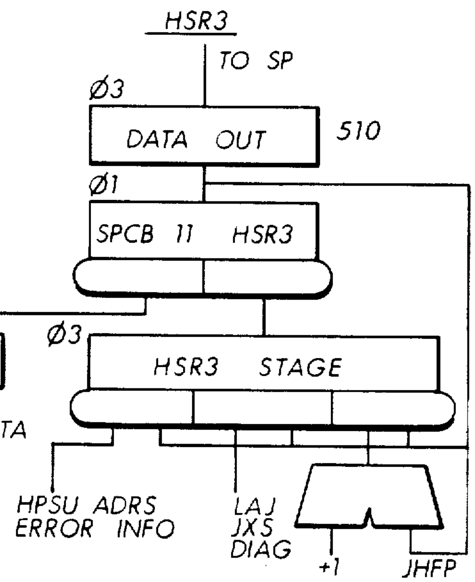
FIG. 116
BREAKPOINT (S14)
MOVE, MARS/L
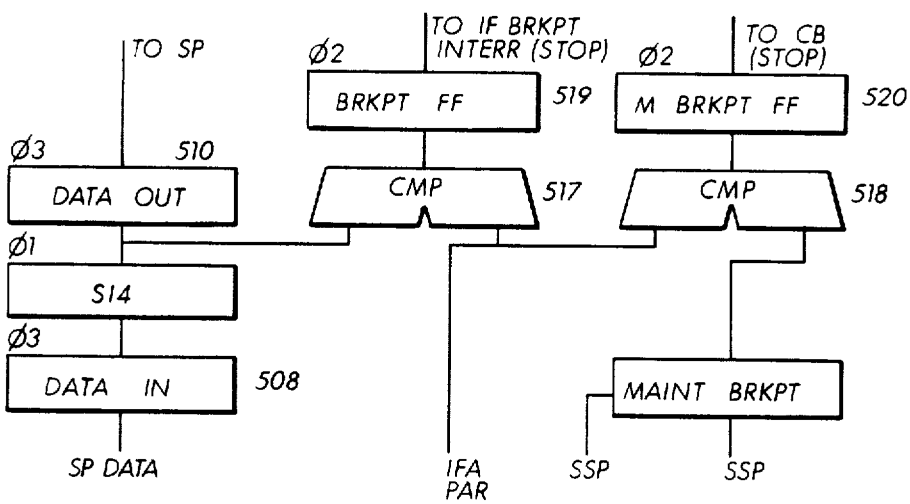

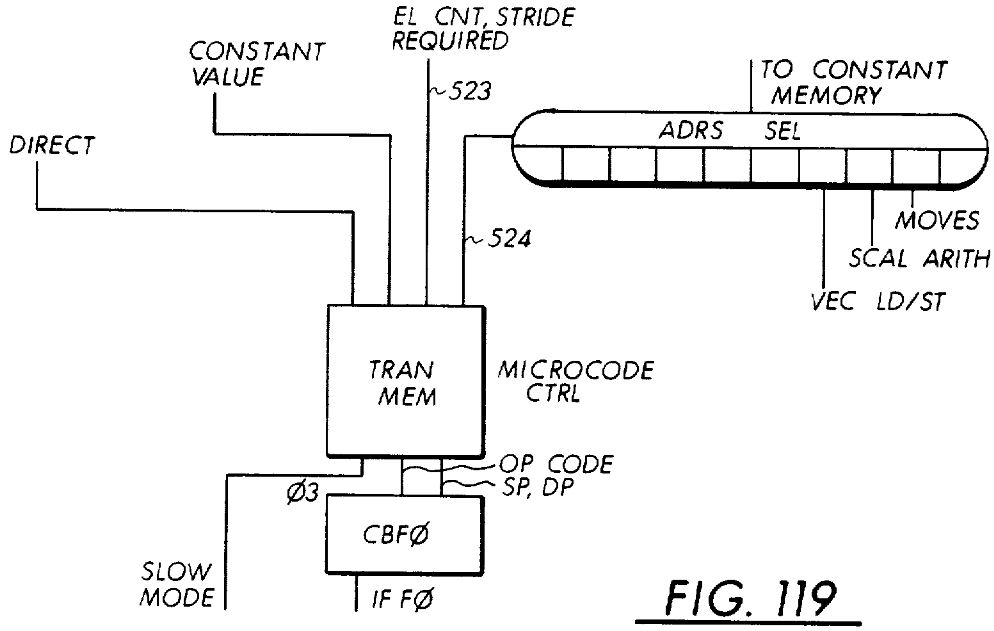
FIG. 119
FIG. 120
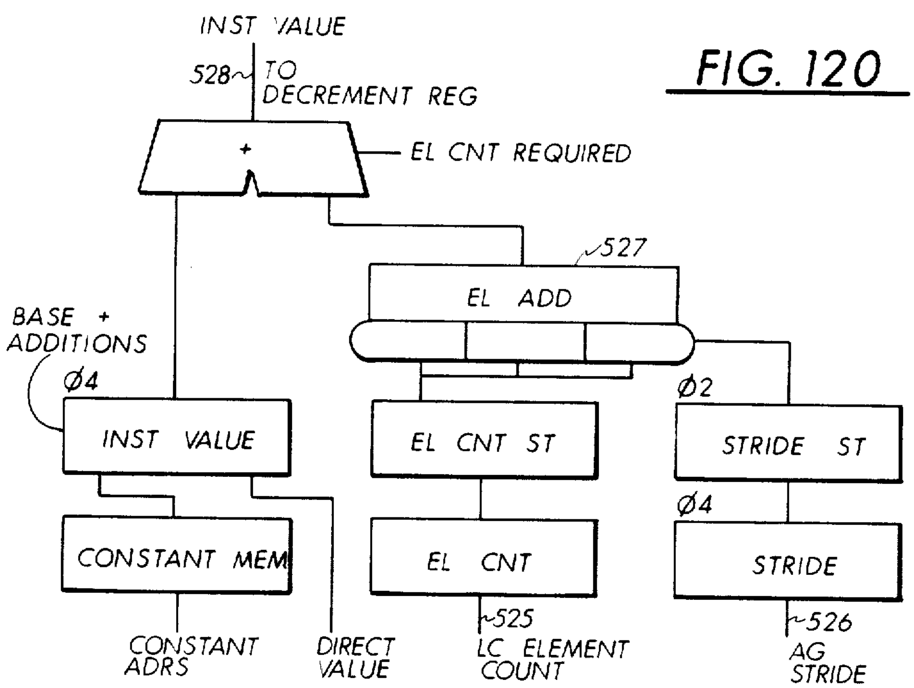

INT INTERRUPT IND REG (S8)

| BIT | INTERRUPT |
|---|---|
| 0 | INTERVAL TIMER RUNOUT |
| 1 | INST BRKPT |
| 2 | LSS OVERFLOW |
| 3 | LSS UNDERFLOW |
| 4 | UNDEFINED INSTRUCTION |
| 5 | VEC REGISTER LENGTH OVERFLOW |
| 6 | DIVIDE FAULT |
| 7 | INTEGER OVERFLOW |
| 8 | FLOATING CHAR OVERFLOW |
| 9 | SP CHAR UNDERFLOW |
| 10 | DP CHAR UNDERFLOW |
| 11 | DATA BRKPT CMP- READ |
| 12 | DATA BRKPT CMP- WRITE |
| 13 | REMAINING LENGTH OVERFLOW |
| 30-35 | ELEMENT INDEX |

S8

MASK (S11)

MASK FANOUT

INTERNAL INTERRUPT HANDLER

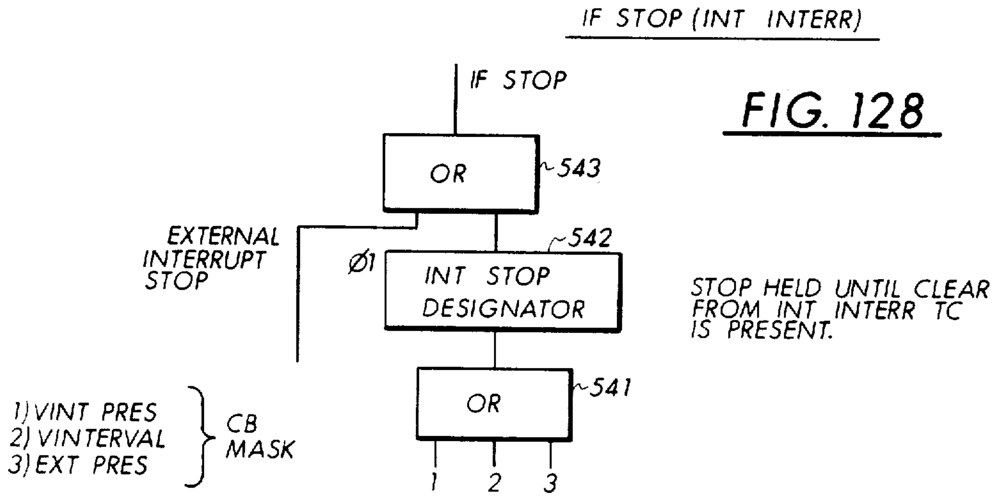
FIG. 128
FIG. 127
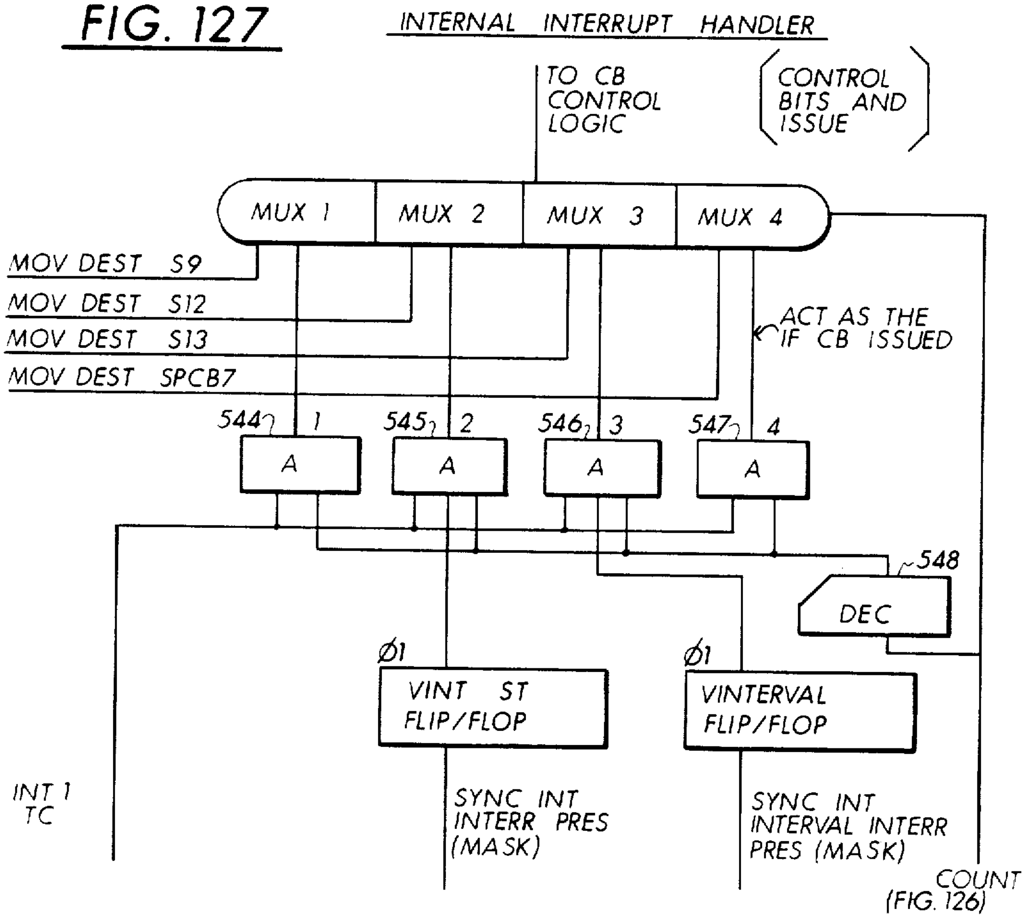

EXTERNAL INTERRUPTS (CAPTURE)

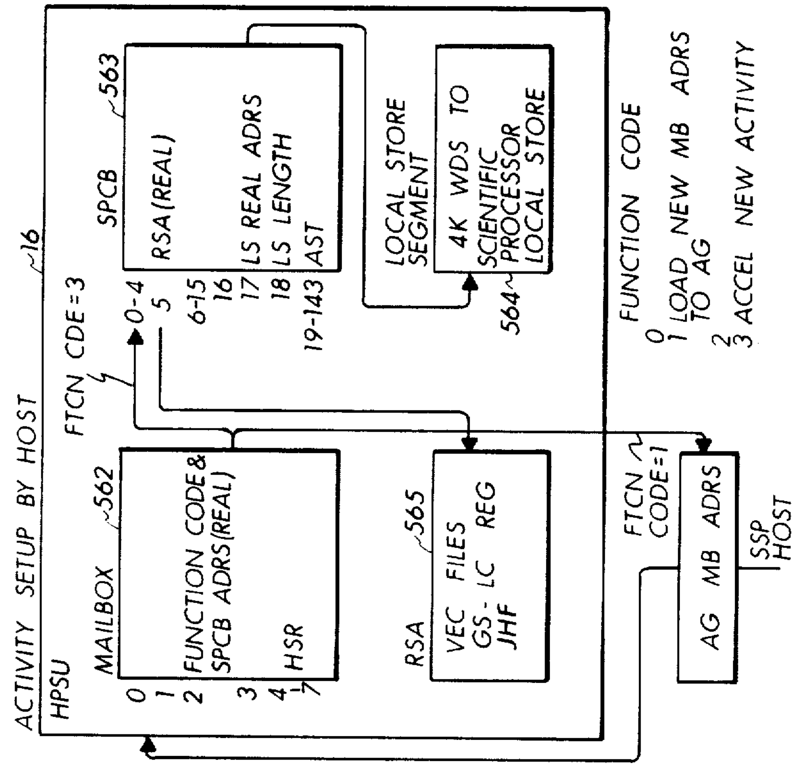
FIG. 131
FIG. 130A
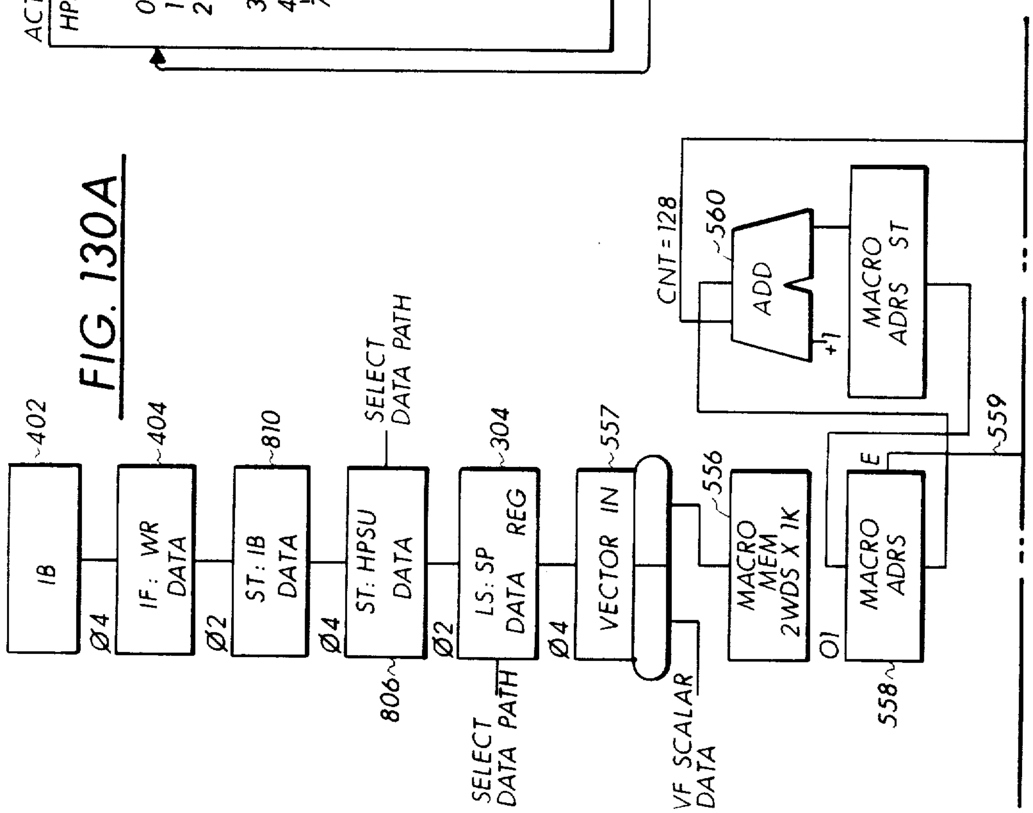

COMBINATIONS OF DATA XFER

| | OUTPUT | |
|---|---|---|
| | WD0 | WD1 |
| STRAIGHT | A | B |
| BROADCAST A | A | A |
| " B | B | B |
| X-OVER BOTH | B | A |

INTERFACE TO VECTOR PROCESSOR

G. INTERFACE FOR INPUT DATA TO LOCAL STORE

INTERFACE TO ST- (WDS 2+3)

1 PARITY ON THE DATA OUT TO THE HPSU (SI) IS ODD. ALL OTHER PARITY IS EVEN.
2 LOCAL STORE (LS) DATA IS SELECTED DURING ANY SCALAR STORE INSTRUCTION.
3 THE LEAST SIGNIFICANT TWO BITS OF EACH WORD SELECT COMES FROM THE AG STORE SELECT MEMORY.

FIG. 151

VF DATA OUT

| PRI | | SEC | |
|---|---|---|---|
| 0 | 1 | 16 | 17 |
| 2 | 3 | 18 | 19 |
| 4 | 5 | 20 | 21 |
| 6 | 7 | 22 | 23 |
| 8 | 9 | 24 | 25 |
| 10 | 11 | 26 | 27 |
| 12 | 13 | 28 | 29 |
| 14 | 15 | 30 | 31 |
| 32 | 33 | 48 | 49 |
| 34 | 35 | 50 | 51 |
| 36 | 37 | 52 | 53 |
| 38 | 39 | 54 | 55 |
| 40 | 41 | 56 | 57 |
| 42 | 43 | 58 | 59 |
| 44 | 45 | 60 | 61 |
| 46 | 47 | 62 | 63 |

STORE VECTOR SP AND DP
WRITE DATA REG

| WD0 | WD1 | WD2 | WD3 |
|---|---|---|---|
| 0 | 1 | | |
| 16 | 17 | 2 | 3 |
| 4 | 5 | 18 | 19 |
| 20 | 21 | 6 | 7 |
| 8 | 9 | 22 | 23 |
| 24 | 25 | 10 | 11 |
| 12 | 13 | 26 | 27 |
| 28 | 29 | 14 | 15 |
| 32 | 33 | 30 | 31 |
| 48 | 49 | 34 | 35 |
| 36 | 37 | 50 | 51 |
| 52 | 53 | 38 | 39 |
| 40 | 41 | 54 | 55 |
| 56 | 57 | 42 | 43 |
| 44 | 45 | 58 | 59 |
| 60 | 61 | 46 | 47 |
| | | 62 | 63 |

STORE BUF

| ADRS | WD0 | WD1 | WD2 | WD3 |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |
| 8 | 32 | 33 | 34 | 35 |
| 9 | 36 | 37 | 38 | 39 |
| 10 | 40 | 41 | 42 | 43 |
| 11 | 44 | 45 | 46 | 47 |
| 12 | 48 | 49 | 50 | 51 |
| 13 | 52 | 53 | 54 | 55 |
| 14 | 56 | 57 | 58 | 59 |
| 15 | 60 | 61 | 62 | 63 |

STORE ALTERNATING ELTS

VF DATA OUT

| PRI (REAL) | | SEC (IMAGINARY) | |
|---|---|---|---|
| 0 | 1 | 0 | 1 |
| 2 | 3 | 2 | 3 |
| 4 | 5 | 4 | 5 |
| 6 | 7 | 6 | 7 |
| 8 | 9 | 8 | 9 |
| 10 | 11 | 10 | 11 |
| 12 | 13 | 12 | 13 |
| 14 | 15 | 14 | 15 |
| 16 | 17 | 16 | 17 |
| 18 | 19 | 18 | 19 |
| 20 | 21 | 20 | 21 |
| 22 | 23 | 22 | 23 |
| 24 | 25 | 24 | 25 |
| 26 | 27 | 26 | 27 |
| 28 | 29 | 28 | 29 |
| 30 | 31 | 30 | 31 |
| 32 | 33 | 32 | 33 |
| 34 | 35 | 34 | 35 |
| 36 | 37 | 36 | 37 |
| 38 | 39 | 38 | 39 |
| 40 | 41 | 40 | 41 |
| 42 | 43 | 42 | 43 |
| 44 | 45 | 44 | 45 |
| 46 | 47 | 46 | 47 |
| 48 | 49 | 48 | 49 |
| 50 | 51 | 50 | 51 |
| 52 | 53 | 52 | 53 |
| 54 | 55 | 54 | 55 |
| 56 | 57 | 56 | 57 |
| 58 | 59 | 58 | 59 |
| 60 | 61 | 60 | 61 |
| 62 | 63 | 62 | 63 |

WRITE DATA REG

| WD0 | WD1 | WD2 | WD3 |
|---|---|---|---|
| 0 | 1 | 0 | 1 |
| 2 | 3 | 2 | 3 |
| 4 | 5 | 4 | 5 |
| 6 | 7 | 6 | 7 |
| 8 | 9 | 8 | 9 |
| 10 | 11 | 10 | 11 |
| 12 | 13 | 12 | 13 |
| 14 | 15 | 14 | 15 |
| 16 | 17 | 16 | 17 |
| 18 | 19 | 18 | 19 |
| 20 | 21 | 20 | 21 |
| 22 | 23 | 22 | 23 |
| 24 | 25 | 24 | 25 |
| 26 | 27 | 26 | 27 |
| 28 | 29 | 28 | 29 |
| 30 | 31 | 30 | 31 |
| 32 | 33 | 32 | 33 |
| 34 | 35 | 34 | 35 |
| 36 | 37 | 36 | 37 |
| 38 | 39 | 38 | 39 |
| 40 | 41 | 40 | 41 |
| 42 | 43 | 42 | 43 |
| 44 | 45 | 44 | 45 |
| 46 | 47 | 46 | 47 |
| 48 | 49 | 48 | 49 |
| 50 | 51 | 50 | 51 |
| 52 | 53 | 52 | 53 |
| 54 | 55 | 54 | 55 |
| 56 | 57 | 56 | 57 |
| 58 | 59 | 58 | 59 |
| 60 | 61 | 60 | 61 |
| 62 | 63 | 62 | 63 |

STORE BUFFER

| ADRS | WD0 | WD1 | WD2 | WD3 |
|---|---|---|---|---|
| 0 | 0 | 1 | 0 | 1 |
| 1 | 2 | 3 | 2 | 3 |
| 2 | 4 | 5 | 4 | 5 |
| 3 | 6 | 7 | 6 | 7 |
| 4 | 8 | 9 | 8 | 9 |
| 5 | 10 | 11 | 10 | 11 |
| 6 | 12 | 13 | 12 | 13 |
| 7 | 14 | 15 | 14 | 15 |
| 8 | 16 | 17 | 16 | 17 |
| 9 | 18 | 19 | 18 | 19 |
| 10 | 20 | 21 | 20 | 21 |
| 11 | 22 | 23 | 22 | 23 |
| 12 | 24 | 25 | 24 | 25 |
| 13 | 26 | 27 | 26 | 27 |
| 14 | 28 | 29 | 28 | 29 |
| 15 | 30 | 31 | 30 | 31 |

SWITCH BUFFER

| | | | | |
|---|---|---|---|---|
| 0 | 32 | 33 | 32 | 33 |
| 1 | 34 | 35 | 34 | 35 |
| 2 | 36 | 37 | 36 | 37 |
| 3 | 38 | 39 | 38 | 39 |
| 4 | 40 | 41 | 40 | 41 |
| 5 | 42 | 43 | 42 | 43 |
| 6 | 44 | 45 | 44 | 45 |
| 7 | 46 | 47 | 46 | 47 |
| 8 | 48 | 49 | 48 | 49 |
| 9 | 50 | 51 | 50 | 51 |
| 10 | 52 | 53 | 52 | 53 |
| 11 | 54 | 55 | 54 | 55 |
| 12 | 56 | 57 | 56 | 57 |
| 13 | 58 | 59 | 58 | 59 |
| 14 | 60 | 61 | 60 | 61 |
| 15 | 62 | 63 | 62 | 63 |

FIG. 152

VF DATA OUT

| PRI (DATA) | | SEC (INDEX) | |
|---|---|---|---|
| 0 | 1 | 0 | 1 |
| 2 | 3 | 2 | 3 |
| 4 | 5 | 4 | 5 |
| 6 | 7 | 6 | 7 |
| 8 | 9 | 8 | 9 |
| 10 | 11 | 10 | 11 |
| 12 | 13 | 12 | 13 |
| 14 | 15 | 14 | 15 |
| 16 | 17 | 16 | 17 |
| 18 | 19 | 18 | 19 |
| 20 | 21 | 20 | 21 |
| 22 | 23 | 22 | 23 |
| 24 | 25 | 24 | 25 |
| 26 | 27 | 26 | 27 |
| 28 | 29 | 28 | 29 |
| 30 | 31 | 30 | 31 |
| 32 | 33 | 32 | 33 |
| 34 | 35 | 34 | 35 |
| 36 | 37 | 36 | 37 |
| 38 | 39 | 38 | 39 |
| 40 | 41 | 40 | 41 |
| 42 | 43 | 42 | 43 |
| 44 | 45 | 44 | 45 |
| 46 | 47 | 46 | 47 |
| 48 | 49 | 48 | 49 |
| 50 | 51 | 50 | 51 |
| 52 | 53 | 52 | 53 |
| 54 | 55 | 54 | 55 |
| 56 | 57 | 56 | 57 |
| 58 | 59 | 58 | 59 |
| 60 | 61 | 60 | 61 |
| 62 | 63 | 62 | 63 |

WRITE DATA REG

| W0 | W1 | W2 | W3 |
|---|---|---|---|
| 0 | 1 | 0 | 1 |
| 2 | 3 | 2 | 3 |
| 4 | 5 | 4 | 5 |
| 6 | 7 | 6 | 7 |
| 8 | 9 | 8 | 9 |
| 10 | 11 | 10 | 11 |
| 12 | 13 | 12 | 13 |
| 14 | 15 | 14 | 15 |
| 16 | 17 | 16 | 17 |
| 18 | 19 | 18 | 19 |
| 20 | 21 | 20 | 21 |
| 22 | 23 | 22 | 23 |
| 24 | 25 | 24 | 25 |
| 26 | 27 | 26 | 27 |
| 28 | 29 | 28 | 29 |
| 30 | 31 | 30 | 31 |
| 32 | 33 | 32 | 33 |
| 34 | 35 | 34 | 35 |
| 36 | 37 | 36 | 37 |
| 38 | 39 | 38 | 39 |
| 40 | 41 | 40 | 41 |
| 42 | 43 | 42 | 43 |
| 44 | 45 | 44 | 45 |
| 46 | 47 | 46 | 47 |
| 48 | 49 | 48 | 49 |
| 50 | 51 | 50 | 51 |
| 52 | 53 | 52 | 53 |
| 54 | 55 | 54 | 55 |
| 56 | 57 | 56 | 57 |
| 58 | 59 | 58 | 59 |
| 60 | 61 | 60 | 61 |
| 62 | 63 | 62 | 63 |

STORE BUFFER

| ADRS | WD0 | WD1 | WD2 | WD3 |
|---|---|---|---|---|
| 0 | 0 | 1 | 2 | 3 |
| 1 | 4 | 5 | 6 | 7 |
| 2 | 8 | 9 | 10 | 11 |
| 3 | 12 | 13 | 14 | 15 |
| 4 | 16 | 17 | 18 | 19 |
| 5 | 20 | 21 | 22 | 23 |
| 6 | 24 | 25 | 26 | 27 |
| 7 | 28 | 29 | 30 | 31 |
| 8 | 32 | 33 | 34 | 35 |
| 9 | 36 | 37 | 38 | 39 |
| 10 | 40 | 41 | 42 | 43 |
| 11 | 44 | 45 | 46 | 47 |
| 12 | 48 | 49 | 50 | 51 |
| 13 | 52 | 53 | 54 | 55 |
| 14 | 56 | 57 | 58 | 59 |
| 15 | 60 | 61 | 62 | 63 |

INDEX BUFFER

| ADRS | WD0 | WD1 |
|---|---|---|
| 0 | 0 | 1 |
| 1 | 2 | 3 |
| 2 | 4 | 5 |
| 3 | 6 | 7 |
| 4 | 8 | 9 |
| 5 | 10 | 11 |
| 6 | 12 | 13 |
| 7 | 14 | 15 |
| 8 | 16 | 17 |
| 9 | 18 | 19 |
| 10 | 20 | 21 |
| 11 | 22 | 23 |
| 12 | 24 | 25 |
| 13 | 26 | 27 |
| 14 | 28 | 29 |
| 15 | 30 | 31 |

| ADRS | WD0 | WD1 |
|---|---|---|
| 0 | 32 | 33 |
| 1 | 34 | 35 |
| 2 | 36 | 37 |
| 3 | 38 | 39 |
| 4 | 40 | 41 |
| 5 | 42 | 43 |
| 6 | 44 | 45 |
| 7 | 46 | 47 |
| 8 | 48 | 49 |
| 9 | 50 | 51 |
| 10 | 52 | 53 |
| 11 | 54 | 55 |
| 12 | 56 | 57 |
| 13 | 58 | 59 |
| 14 | 60 | 61 |
| 15 | 62 | 63 |

SWITCH BUFFERS

INDEXED STORE

FIG. 153

| INSTRUCTION CLASSES | DESIGNATORS: MASK VCTR BUSY | MASK MOVE SRC BUSY | MASK VALID | MASK STAT VALID | MOV D MASK ACT | VCTR COMP ACT |
|---|---|---|---|---|---|---|
| MOVE READING MASK (VECTOR INST) | IF SETS<br>MK CLRS | | | | SET WAIT | SET WAIT |
| MOVE SOURCING MASK PARAMETERS | | IF SETS<br>IF CLRS | | NOT SET WAIT | | |
| MOVE DESTINATING MASK | | | IF CLRS<br>MK SETS | IF CLRS<br>MK SETS | IF SETS<br>MK CLRS<br>IF SET<br>MK VALID | SET WAIT |
| VECTOR COMPARE | SET WAIT | SET WAIT | | IF CLRS<br>MK SETS | SET WAIT | IF SETS<br>SET WAIT<br>MK CLRS |
| JUMP | | | NOT SET WAIT | | | |
| MOVE SOURCING MASK | | IF SETS<br>IF CLRS | NOT SET WAIT | | | |

WHEN VECTOR COMPARE COMPLETES, THE MASK VALID DES IS SET 3 CLOCK CYCLES FOLLOWING THE CLEARING OF VCTR CMPR ACT DES VECTOR INST ISSUE OCCURS 3 CYCLES EARLIER AS A RESULT OF THIS. NOTE THAT THE MASK VCTR BUSY DES DOES NOT SET ON A VECTOR LOAD OR STORE.

FIG. 185

VF READ OUTPUT REG'S 1392 1393

1391

| PIPE \ CARDS | VF PRIMARY | VF SECONDARY |
|---|---|---|
| AP | AUGEND | ADDEND |
| MP | MULTIPLICAND | MULTIPLIER |
| MV | — | MOVE |
| VS | STORE (PRI) | STORE (SEC) |
| SC | SCALAR | — |

VF TIME SLOT PATTERNS

| PATTERN \ SLOT | 0 | 1 | 2 | 3 | 4 | 5 | 6 | 7 |
|---|---|---|---|---|---|---|---|---|
| 1 | RD | | | | | | | |
| 3 | RD | WR | | | | | | |
| 4 | | WR | | | WR | | | |
| 5 | | | RD | | | WR | | |
| 6 | RD | | | WR | | | | |
| 7 | | WR | WR | | | | | |
| 8 | | RD | WR | | | | | |
| 9 | | RD | | WR | | | | |

VF ADDRESSING FOR AP OR MP

TIME SLOT REG FORMAT-1

| WRITE | ENCODED PIPE SELECT | | | RESERVE | AUTO RELEASE | INIT RD/WR MUX CTR | DLY INIT RD/WR MUX CTR | TEMP RESERVE |
|---|---|---|---|---|---|---|---|---|
| 0 | 1 | 2 | 3 | 4 | 5 | 6 | 7 | 8 |

BIT 0 - WRITE-TS IS FOR VF WR. USED FOR VF ADRS SEL. ETC.
BITS 1-3 - WHICH PIPE THE TS IS ASSIGNED TO USED FOR VF ADRS SEL. ETC.
BIT 4 - TS IS IN USE. USED FOR TS PATTERN SEARCH.

BLOCK DIAGRAM OF ORGANIZATION & ADDRESSING

READ VF REGS

| CARD / PIPE | VF PRI CARDS | VF SEC CARDS |
|---|---|---|
| AP | AUG | ADD |
| MP | MPCD | MCTR |
| MV | — | MOVE |
| VS | STORE (PRI) | STORE (SEC) |
| SC | SCALAR | — |

BLOCK DIAGRAM OF ONE TYPICAL CONFLICT DETECTOR

MAIN CHAIN CONFLICT

| WRITE (LATE) \ READ | AP OP1 | AP OP2 | MP OP1 | MP OP2 | MV OP2 | VS OP1 | VS OP2 | SC OP1 | SC OP2 |
|---|---|---|---|---|---|---|---|---|---|
| AP OP3 | X | X | 6 | 6 | 9 | 12 | 12 | 15 | 15 |
| MP OP3 | CHIP3 | 3 | X | X | | 12 | 12 | 15 | 15 |
| MV OP3 | 3 | 3 | 6 | 6 | X | 11 | 11 | 14 | 14 |
| VL OP3 | 2 | 2 | 5 | 5 | 8 | 11 | 11 | 13 | 13 |
| VL OP4 | 1 | 1 | 4 | 4 | 8 | 10 | 10 | 13 | 13 |
| SC OP3 | 1 | 1 | 4 | 4 | 7 | 10 | 10 | X | X |

46 TOTAL DETECTORS

| WRITE (LATE) \ READ | AP OP1 | AP OP2 | MP OP1 | MP OP2 | MV OP2 | VS OP1 | VS OP2 | SC OP1 | SC OP2 |
|---|---|---|---|---|---|---|---|---|---|
| AP OP 5 | 18 | 18 | 17 | 17 | 16 | 20 | 20 | 19 | 19 |
| MP OP 5 | 18 | 18 | 17 | 17 | 16 | 20 | 20 | 19 | 19 |

18 TOTAL DETECTORS

SECOND RANK FOR AP & MP BECAUSE OF LONG LATENCY (9 CYCLES) USED WHEN HAVE SEVERAL (>1) INSTR'S TO SAME PIPE (E.G. AP+MP) WITH EARLIEST HAVING SMALL ELCNT

FIG. 203

| READ \ WRITE (EARLY) | AP OP 3 | MP OP 3 | MV OP 3 | VL OP 3 | VL OP 4 | SC OP 3 |
|---|---|---|---|---|---|---|
| AP OP1 | X | 34 | 28 | 32 | *32 | 34 |
| AP OP2 | X | 34 | 28 | 32 | *32 | 34 |
| MP OP1 | 24 | X | 27 | 31 | *31 | 27 |
| MP OP2 | 24 | X | 27 | 31 | *31 | 27 |
| MV OP2 | 23 | 23 | X | 30 | *30 | 33 |
| VS OP1 | 22 | 22 | 26 | X | X | 26 |
| VS OP2 | 22 | 22 | 26 | X | X | 26 |
| SC OP1 | 21 | 21 | 25 | 29 | *29 | X |
| SC OP2 | 21 | 21 | 25 | 29 | *29 | X |

*NOTE: THESE COMPARATORS HAVE VC OP4 VL G FLNG & FLVLD AS ONE OF ITS INPUTS

43 TOTAL DETECTORS

FIG. 204

| READ / WRITE | AP | | MP | |
|---|---|---|---|---|
| | OP 1 | OP 2 | OP 1 | OP 2 |
| VL OP4 | * 1A | *1A | * 4A | * 4A |
| VL OP3 | 1A | 1A | 4A | 4A |

8 DETECT

| WRITE / WRITE | AP | | MP | |
|---|---|---|---|---|
| | OP3 | OP5 | OP 3 | OP 5 |
| VL OP 4 | *2A | *2A | *5A | *5A |
| VL OP 3 | 2A | 2A | 5A | 5A |

8 DETECT

| WRITE / READ | AP | | MP | |
|---|---|---|---|---|
| | OP3 | OP5 | OP 3 | OP5 |
| VS OP2 | 3A | 3A | 6A | 6A |
| VS OP1 | 3A | 3A | 6A | 6A |

8 DETECT

FIG. 205

WRITE

| WRITE (WRITE EARLY / WRITE LATE) | AP | MP | VP | VL | | SC |
|---|---|---|---|---|---|---|
| | OP3 | OP3 | OP3 | OP3 | OP4 | OP 3 |
| AP OP3 | | A- 1 | B- 4 | B- 5 | B-5 | B- 4 |
| MP OP 3 | A - 1 | | B- 4 | B - 5 | B - 5 | B- 4 |
| MV OP3 | A- 2 | A- 2 | | B- 6 | B- 6 | C-7 |
| VL OP 3 | A - 2 | A - 2 | C - 7 | | | C-7 |
| VL OP4 | A- 3 | A - 3 | C- 8 | | | C- 8 |
| SC OP3 | A- 3 | A- 3 | C- 8 | 8-6 | 8-6 | |

28 DETECTORS

| WRITE EARLY / WRITE LATE | MV | SC | VL | |
|---|---|---|---|---|
| | OP 3 | OP3 | OP 3 | OP 4 |
| AP OP5 | M- 1 | M-1 | M- 2 | M- 2 |
| MP OP5 | M - 1 | M- 1 | M- 2 | M- 2 |

8 DETECTORS

FIG. 206

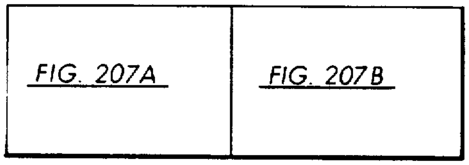
FIG. 207
FIG. 207A
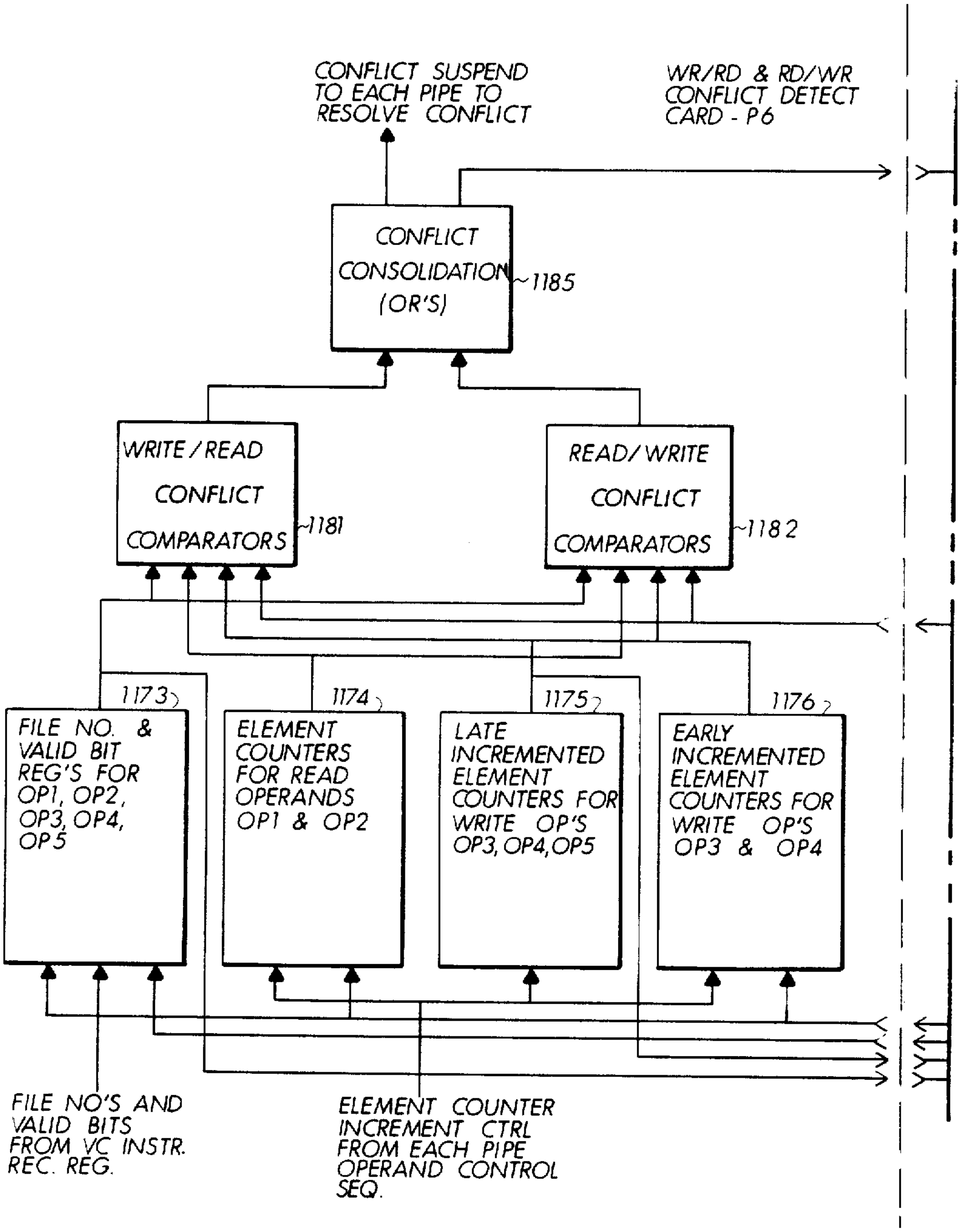

FORMAT OF VECTOR CONTROL WORD

| VECTOR FILE PATTERN | BRKPT | SPARE | OPER-ATION CONTROL | MASTER BIT PIPE SELECT | OPERATION MODIFIER MPI | 0 | 1 | T FIELD |
|---|---|---|---|---|---|---|---|---|
| 0 – 3 | 4 | 5 | 6 - 13 | 14 - 19 | 20 | — | 22 | 23 - 24 |

BITS 0-3 - VF PATTERN FOR THIS INSTR.

BIT 4 - BREAKPOINT ARMING SIGNAL-TO PIPE.

BIT 5 - SPARE BIT

BITS 6-13 - UNIQUE DEFENITION OF INSTRUCTION TO EXECUTE OR OPERATION TO PERFORM. (EG.-USED BY AP, MP, MV, AS MICRO CODE ENTRY ADDRESS)

BITS 14-19 - PIPE SECECT FIELD

BITS 20-22 THE MULTIPLE PASS INSTRUCTION (MPI) BIT IS SET FOR CERTAIN INSTRUCTIONS THAT REQUIRE 2 PIPES, TO PARTICIPATE IN THE EXECUTION. AN OCTAL VALUE=2 IN THE FIELD SPECIFIES A GIV INSTR.

BIT 23-24 FROM INSTRUCTION T(TYPE) FIELD (S).

BIT 25 COMPOSITE T-BIT. USED TO SPECIFY THAT THE ELCNT IS SP OR DP.

BITS 26-28 - G-REGISTER OPERAND ENABLE BITS 0 & 1 DENOTE THAT OP1 OR OP2, RESPECTIVELY, FOR VV FORMAT INSTRUCTIONS ARE FROM A G-REG.

BITS 29-32 - VECTOR OPERAND ENABLE DENOTE THAT THE CORRESPONDING FILE NO. IS USED BY THIS INSTRUCTION USED TO ENABLE CONFLICT DETECTION.

BITS 33-36 - VOP 1 FILE NUMBER USED FOR ADRS.

BITS 37-40 - VOP 2 DITTO

BITS 41-44 - VOP3 DITTO

BITS 45-48 - VOP4 DITTO

BITS 49-55 - PARITY BITS:

| | | | |
|---|---|---|---|
| P0 - | 0-5 | P4 - | 25-32 |
| P1 - | 6-13 | P5 - | 33-40 |
| P2 - | 14-19 | P6 - | 41-48 |
| P3 - | 20-24 | | |

FIG. 209A

| COM-POSITE T BIT | GOP ENABLE 0 1 2 | VOP ENABLE 1 2 3 4 | VOP-1 FILE NO. | VOP-2 FILE NO. | VOP-3 FILE NO. | VOP-4 FILE NO. | PARITY BITS P0-P6 |
|---|---|---|---|---|---|---|---|
| 25 | 26-28 | 29-32 | 33-36 | 37-40 | 41-44 | 45-48 | 49-55 |
FIG. 209 B
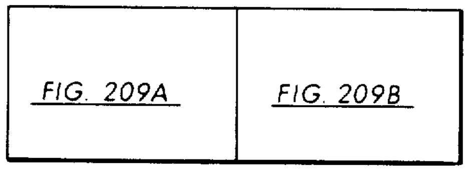
FIG. 209
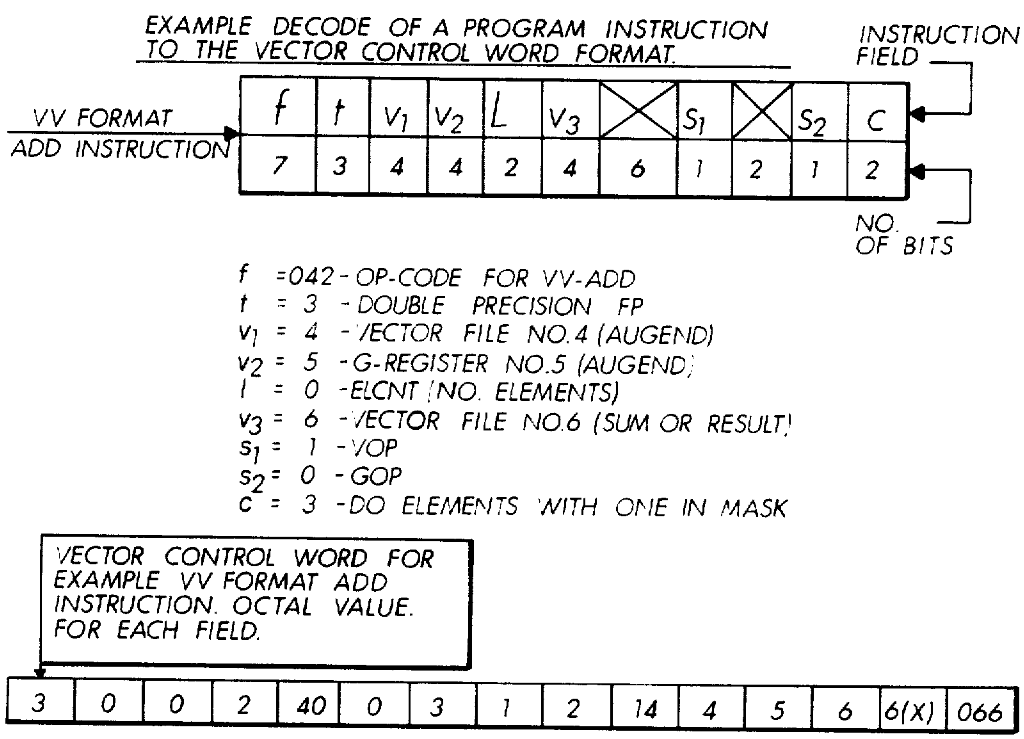
FIG. 210

FLOATING POINT NUMBERS

SINGLE PRECISION FLOATING POINT FORMAT

| SIGN | CHARACTERISTIC | MANTISSA |
|---|---|---|
| 0 | 1 8 | 9 35 |

| OCTAL VALUES | |
|---|---|
| CHARACTERISTIC | UNBIASED EXPONENT |
| 377<br>200<br>000 | +177<br>000<br>-200 |

DOUBLE PRECISION FLOATING POINT FORMAT

| SIGN | CHARACTERISTIC | MANTISSA |
|---|---|---|
| 0 | 1 11 | 12 35 |

| MANTISSA |
|---|
| 36 71 |

| OCTAL VALUES | |
|---|---|
| CHARACTERISTIC | UNBIASED EXPONENT |
| 3777<br>2000<br>0000 | +1777<br>0000<br>-2000 |

FIG. 215

DP SHIFT-ELMT 0

DP SHIFT-ELMTS 1-31

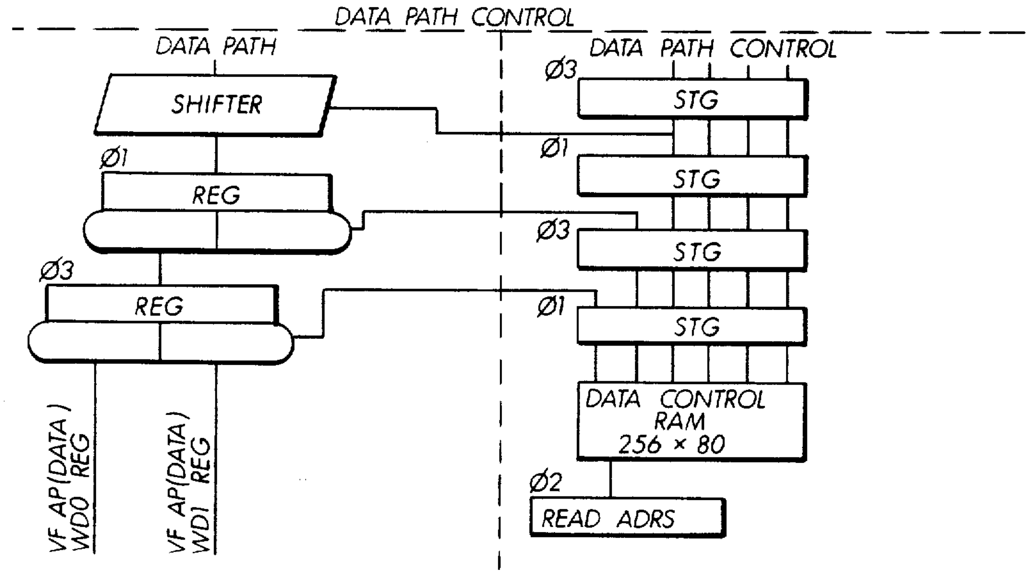
FIG. 228
FIG. 226
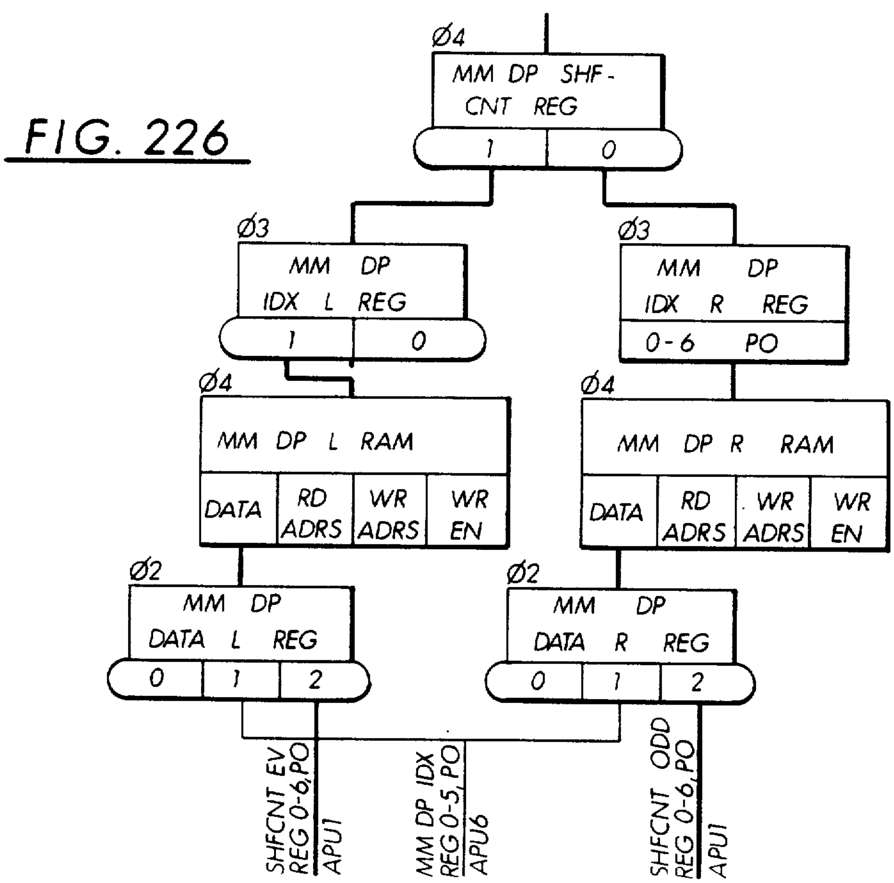

DP MAX/MIN REDUCTIONS

SP→DP, ELK=4, CONFLICT ELEMENT COUNTERS

| SP MAX/MIN REDUCTIONS - INDEX GENERATION | | | | | | DP MAX/MIN REDUCTIONS - INDEX GENERATION | | | | |
|---|---|---|---|---|---|---|---|---|---|---|
| CYCLE | AUG REG | ADD REG | SUM REG | SP IDX REG | DP IDX REG | CYCLE | AUG REG | ADD REG | SUM REG | DP IDX REG |
| 1 | 0 | 0 | 0 | 0,1 | 2,3 | 1 | 0 | 0 | 0 | 0,1 |
| 2 | 0 | 0 | 0 | 16,17 | 18,19 | 2 | 0 | 0 | 0 | 8,9 |
| 3 | 0 | 4 | 4 | 4,5 | 6,7 | 3 | 0 | 2 | 2 | 2,3 |
| 4 | 4 | 0 | 4 | 20,21 | 22,23 | 4 | 2 | 0 | 2 | 10,11 |
| 5 | 4 | 4 | 8 | 8,9 | 10,11 | 5 | 2 | 2 | 4 | 4,5 |
| 6 | 8 | 0 | 8 | 24,25 | 26,27 | 6 | 4 | 0 | 4 | 12,13 |
| 7 | 8 | 4 | 12 | 12,13 | 14,15 | 7 | 4 | 2 | 6 | 6,7 |
| 8 | 12 | 0 | 12 | 28,29 | 30,31 | 8 | 6 | 0 | 6 | 14,15 |
| 9 | 32 | 0 | 32 | 32,33 | 34,35 | 9 | 16 | 0 | 16 | 16,17 |
| 10 | 32 | 0 | 32 | 48,49 | 50,51 | 10 | 16 | 0 | 16 | 24,25 |
| 11 | 32 | 4 | 36 | 36,37 | 38,39 | 11 | 16 | 2 | 18 | 18,19 |
| 12 | 36 | 0 | 36 | 52,53 | 54,55 | 12 | 18 | 0 | 18 | 26,27 |
| 13 | 36 | 4 | 40 | 40,41 | 42,43 | 13 | 18 | 2 | 20 | 20,21 |
| 14 | 40 | 0 | 40 | 56,57 | 58,59 | 14 | 20 | 0 | 20 | 28,29 |
| 15 | 40 | 4 | 44 | 44,45 | 46,47 | 15 | 20 | 2 | 22 | 22,23 |
| 16 | 44 | 0 | 44 | 60,61 | 62,63 | 16 | 22 | 0 | 22 | 30,31 |

VPM BLOCK DIAGRAM (WITH MP PIPE ONLY)

TO CHARACTERISTIC & SIGN LOGIC

DOUBLE FLOATING MULTIPLY

SEQ CTRL BLOCK DIAGRAM

MOVE:

COMPRESS:

DISTRIBUTE:

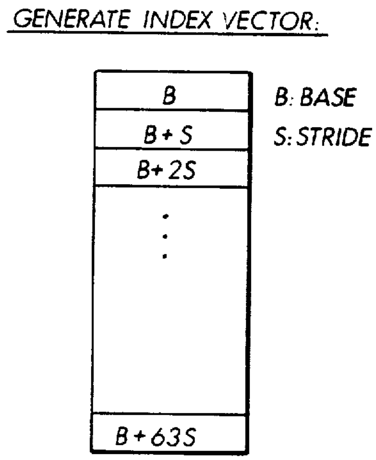
FIG. 261
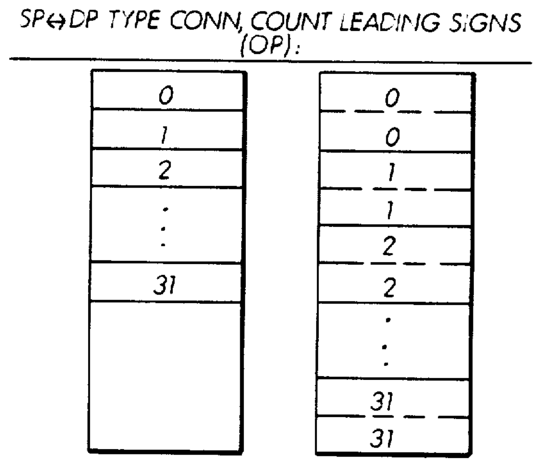
FIG. 262
FIG. 263
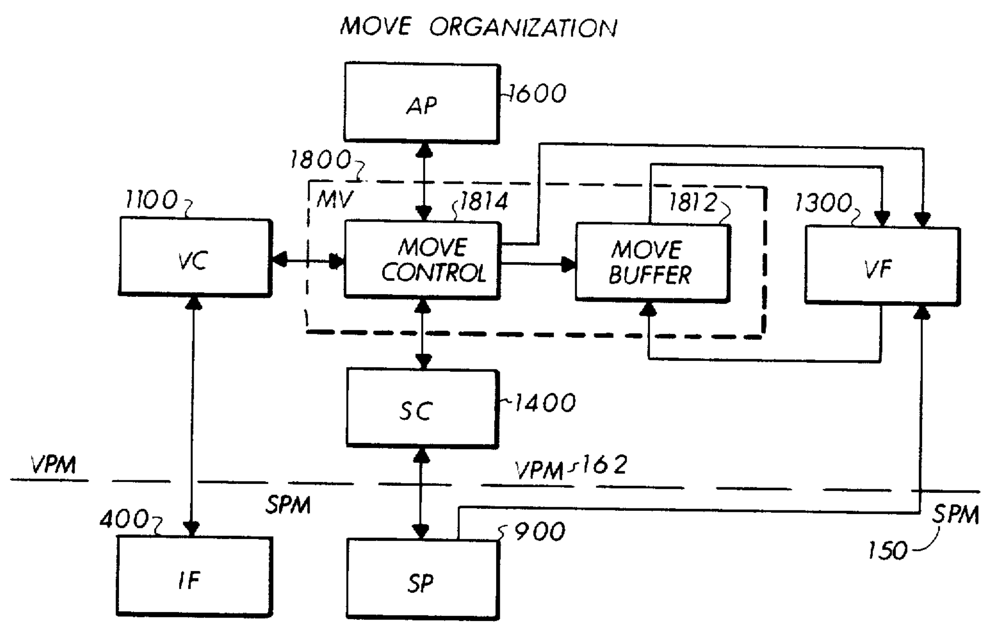

32×2 WORDS

MOVE BUFFER

MOVE DATA PATH

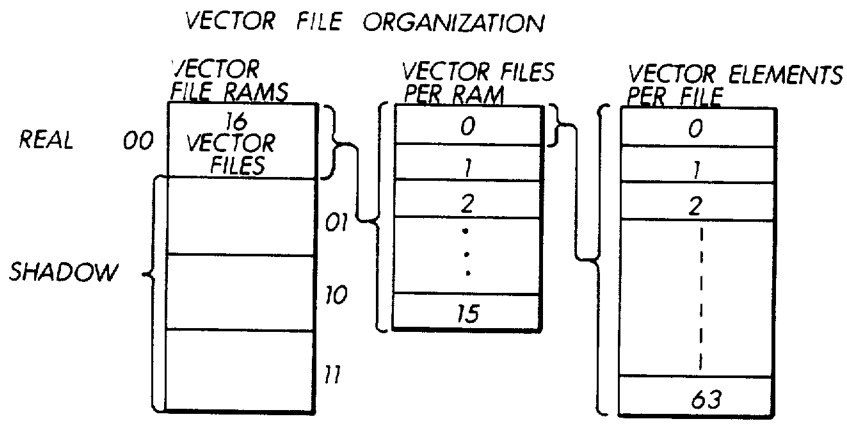
FIG. 267
FIG. 266
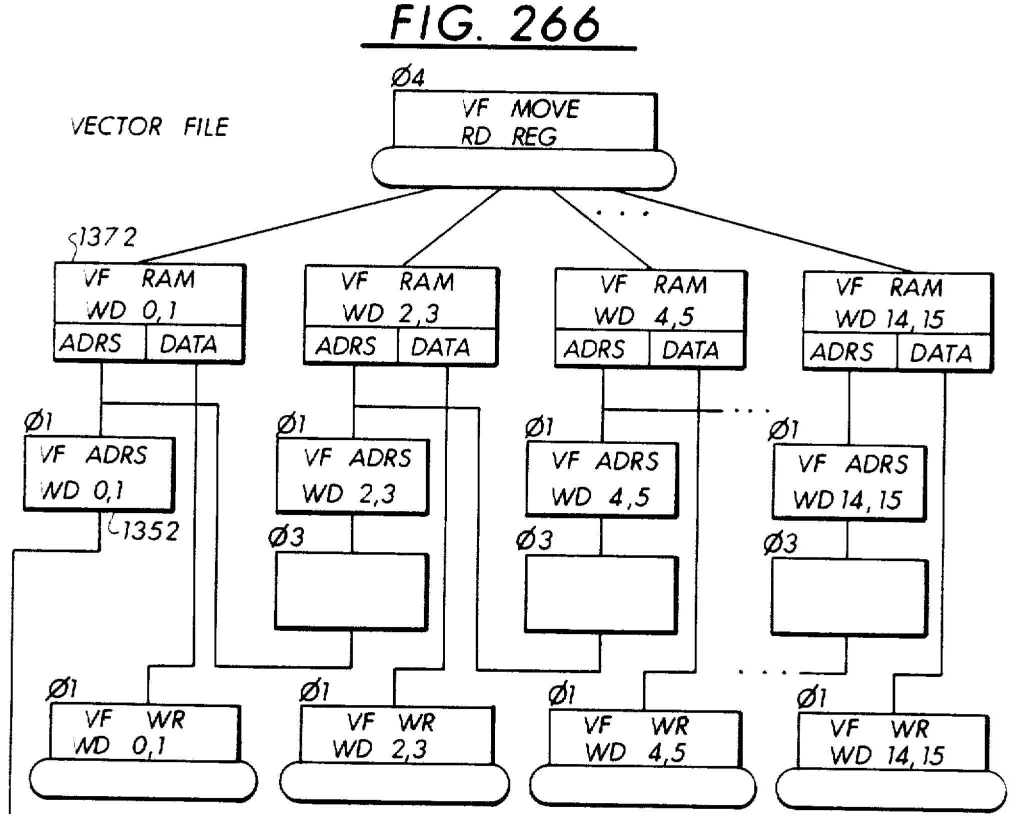

MOVE CONTROL TIMING

MV TIME SLOT PATTERNS:

| INST | # | PATTERN 0 | 1 | 2 | 3 | 4 | 5 | 6 | 7 |
|---|---|---|---|---|---|---|---|---|---|
| MOVE<br>DISTRIBUTE<br>GIV<br>SP→DP CONV<br>DP— SP CONV | | RD | | | WR | | | | |
| COMPRESS | | | | RD | | | WR | | |

MV VF ADDRESSING:

FIG. 295 REDUCTION INSTRUCTION (ELCNT<= 2)
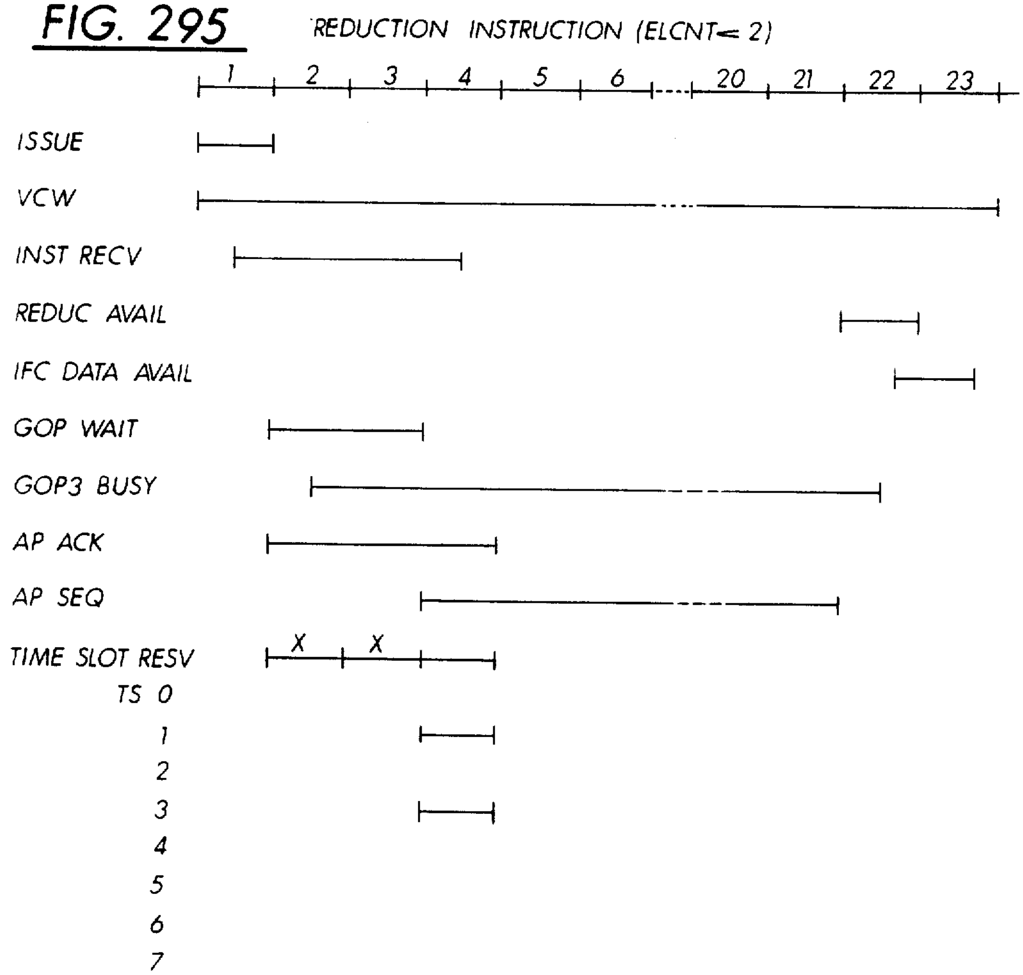
FIG. 296 GIV INST (ELCNT=9, NO CONFLICTS)
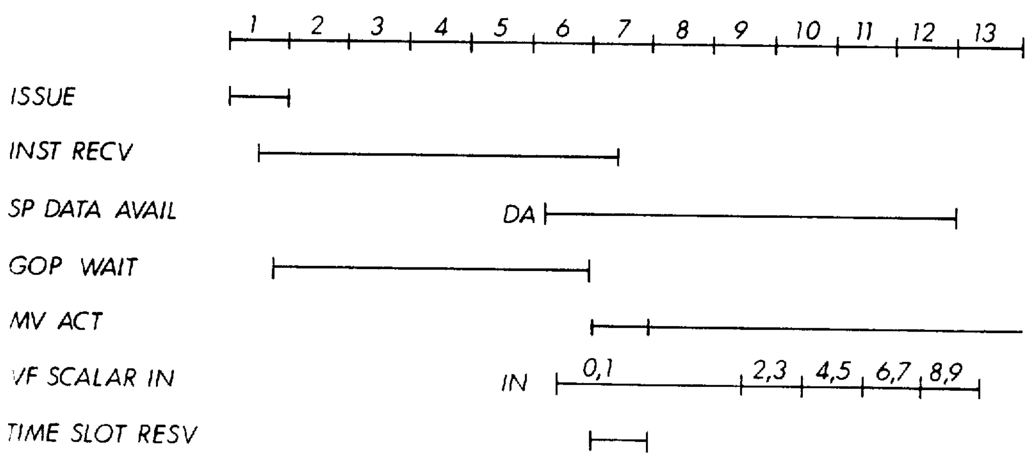

1. A ZERO IN THE PROCESSED MASK MEANS LOAD THE ELEMENT.
2.

| C | PROC. MASK |
|---|---|
| 0 | 0 |
| 1 | MASK |
| 2 | 0 |
| 3 | /MASK |

STORE BLOCK DIAGRAM

SCIENTIFIC PROCESSOR TO SUPPORT A HOST PROCESSOR REFERENCING COMMON MEMORY

INDEX OF CONTENTS

Index of Contents
Related Patent Applications
- A. Field of the Invention
- B. State of the Prior Art Objects
Summary of the Invention
Glossary of Abbreviations
Brief Description of the Drawings
Description of the Preferred Embodiment
- A. Conventions
- B. The System
- C. High Performance Storage Unit (HPSU)
- D. Multiple Unit Adapted (MUA)
- E. Scientific Processor Overview (SP)
  - 1. Interfaces
  - 2. Clock Distribution and Timing
  - 3. Technology
  - 4. Major Sections
  - 5. Scalar Processor Module Block Diagram (SPM)
    - a. Instruction Flow (IF)
    - b. Local Store (LS)
    - c. Control Block (CB)
    - d. Mask Processor (MK)
    - e. Address Generation (AG)
    - f. Store Buffer (ST)
    - g. Scalar Processor Arithmetic Logic Unit (SPALU)
    - h. Loop Control (LC)
    - i. Scalar Processor Module Operation
  - 6. Vector Processor Module Block Diagram
    - a. Vector Control (VC)
    - b. Vector Load (VL)
    - c. Vector File (VF)
    - d. Add Pipe (AP)
    - e. Multiply Pipe (MP)
    - f. Move Pipe (MV)
    - g. Vector Store (VS)
    - h. Scalar/Vector Data Transfer Control (SC)
  - 7. Operation
    - a. Acceleration/Deceleration
    - b. Power on
    - c. Processor States
    - d. Initialization
    - e. First Instruction
    - f. Second Instruction
    - g. Third Instruction
    - h. Fourth Instruction
    - i. Activity Stop
- F. Scientific Processor Detailed Description
  - 1. Scalar Processor Module in Detail
    - a. Instruction Flow (IF)
      - 1. Overview
      - 2. Program Addressing (F4)
      - 3. Program Address Capture (F5)
      - 4. Instruction Buffer (F6, F7)
      - 5. Virtual Address (VA)
      - 6. Jump Sequence
      - 7. Functions
      - 8. Partitioning
      - 9. Operation Control
    - b. Address Generation
    - c. Scalar Processor
    - d. Scientific Processor Control Block (SPCB)
    - e. Local Store
    - f. Store Buffer (SPM 6)
    - g. Loop Control
    - h. Mask Processor
  - 2. Vector Processor Module in Detail
    - a. Vector Processor Module Operation
    - b. Add Pipe
    - c. Multiply pipe (MP)
    - d. Move Pipe
    - e. Scalar/Vector Control
    - f. Vector Load
    - g. Vector Store
- G. Conclusion
- H. Claims
- I. Abstract of the Disclosure

RELATED PATENT APPLICATIONS

The following co-pending patent applications are assigned to the assignee of this invention, and their teachings are incorporated herein by reference:

Title: HIGH PERFORMANCE STORAGE UNIT
Inventor: James H. Scheuneman
Serial No.: 596,130
Filed: Apr. 2, 1984
Patent No.: 4,633,434
Issued: Dec. 30, 1986

Title: MULTIPLE UNIT ADAPTER
Inventor: James H. Scheuneman
Serial No.: 596,205 (now abandoned)
Filed Apr. 2, 1984
Serial No.: 047,579 - Continuing Application
Filed: May 5, 1987
Patent No.: 4,722,052
Issued: Jan. 26,1988

Title: PARTIAL DUPLEX OF PIPELINED STACK WITH DATA INTEGRITY CHECKING
Inventor: James H. Scheuneman
Serial No.: 595,864
Filed: Apr. 2, 1984
Patent No.: 4,697,233
Issued: Sep. 29, 1987

Title: PIPELINED DATA STACK WITH ACCESS THROUGH CHECKING
Inventor: James H. Scheuneman
Serial No.: 596,131
Filed: Apr. 2, 1984

Title: AN IMPROVED INSTRUCTION BUFFER FOR A DIGITAL DATA PROCESSING SYSTEM
Inventors: Michael Danilenko, Archie Lahti, John Rusterholz
Serial No.: 585,708
Filed: Mar. 2, 1984
Patent No.: 4,691,279
Issued: Sep. 1, 1987

Title: MULTIPLE PORT MEMORY WITH PORT DECODE ERROR DETECTOR
Inventor: James H. Scheuneman
Serial No.: 596,132
Apr. 2, 1984
Patent No.: 4,649,475
Issued: Mar. 10, 1987

Title: HIGH PERFORMANCE PIPELINED STACK WITH OVER-WRITE PROTECTION
Inventor: Wayne A. Michaelson Serial No.: 596,203
Filed: Apr. 2, 1984
Patent No.: 4,674,032
Issued: June 16, 1987
Title: A MULTILEVEL PRIORITY SYSTEM
Inventors: James H. Scheuneman and Wayne A. Michaelson
Serial No.: 596,206 (now abandoned)
Filed: Apr. 2, 1984
Patent No.: 4,757,440
Issued: July 12, 1988
Title: MULTIPLE OUTPUT PORT MEMORY STORAGE MODULE
Inventor: James H. Scheuneman and Gary D. Burns
Serial No.: 596,214
Filed: Apr. 2, 1984
Patent No.: 4,652,993
Issued: Mar. 24, 1987
Title: PIPELINED SPLIT STACK WITH HIGH PERFORMANCE INTERLEAVED DECODE
Inventors: James H. Scheuneman and Wayne A. Michaelson
Serial No.: 596,215
Filed: Apr. 2, 1984
Patent No.: 4,600,986
Issued: Apr. 2, 1984
Title: SYNCHRONIZED SELECTABLE RATE CLOCKING SYSTEM
Inventors: Thomas Wilcoski and William DeKarske
Serial No.: 595,885
Filed: Apr. 2, 1984
Patent No.: 4,560,939
Issued: Dec. 24, 1985
Title: APPARATUS FOR CREATING A MULTIPLICATION PIPELINE OF ARBITRARY SIZE
Inventor: John R. Schomburg
Serial No.: 451,130
Filed: Dec. 20, 1982
Patent No.: 4,549,280
Issued: Oct. 22, 1985
Title: A BINARY DIVISION CIRCUIT
Inventor: John R. Schomburg and Louis B. Bushard
Serial No.: 491,520
Filed: May 4, 1983
Patent No.: 4,594,680
Issued: June 10, 1986
Title: MACRO LEVEL CONTROL OF AN ACTIVITY SWITCH IN A SCIENTIFIC VECTOR PROCESSOR
Inventor: A. E. Lahti and R. L. James
Serial No.: 761,138
Filed: July 31, 1985
Patent No.: 4,791,56
Issued: Dec. 13, 1988

BACKGROUND OF THE INVENTION

A. Field of the Invention

This invention relates to the field of digital data processing systems wherein one or more host data processors utilize one or more supporting scientific processors in conjunction with storage systems that are commonly accessible. More particularly it relates to an improved Scientific Processor for use in such a digital data processing system. Still more particularly it relates to an improved Scientific Processor having a Scalar Processor Module and a Vector Processor Module, and operable under program control of one or more host processors, and further having addressing compatible with the host processor(s). More particularly, it relates to an improved Scientific Processor capable of accessing the high speed storage of a host processor(s) without need for dedicated mass storage or extensive caching.

B. State of the Prior Art

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processor; to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with host data processing systems. One such prior art scientific processor is disclosed in U.S. Pat. No. 4,101,960, entitled "Scientific Processor" and assigned to Burroughs Corporation, of Detroit, Michigan. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an over-all control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input/output path exists to and from the secondary storage system from this front-end processor. Since task transfers involve the use of the input/output path of the front-end processor, it is this input/outputpath and the transfer of data thereon between the primary and secondary storage systems which becomes the limiting link between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scientific data processing system is considered to overcome the data transfer bottleneck by providing an unique system architecture using a high speed memory unit which is commonly accessible by the host processor and the scientific processor. Further, when multiple High Performance Storage Units (HPSU) are required, a Multiple Unit Adapter (MUA) is coupled between a plurality of high sped memory units and the Scientific Processor (SP).

Data processing systems are becoming more and more complex. With the advent of integrated circuit fabrication technology, the cost per gate of logic elements is greatly reduced and the number of gates utilized is ever-increasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

When an SP is utilized in a data processing system to perform supporting scientific calculations in support of a host processor or processors, and is utilized in conjunction with two or more HPSU's, the problem of timing of the access of the SP to any selected HPSU for either reading or writing causes problems of access coordination. In order to coordinate and provide the required control, the over-all system is arbitrarily bounded to require that the SP issue no more than a predetermined number of Requests for access without the receipt back of an Acknowledge. In one configuration, the system is bounded by requiring that no more than eight such Requests be issued by the SP without receipt of an Acknowledge. The details of the interface and control of a Multiple Unit Adapter for transmitting data to and from a designated HPSU by the SP is described in detail in the co-pending application entitled "Multiple Unit Adapter". There it is pointed out that the interface to the HPSU's must also provide for and accommodate different requesters that may be associated therewith. While the data processing system is essentially synchronous, that is operations are under clock control in their execution, the occurrence of Requests, the availability of responding units, and the occurrence of Acknowledge signals are asynchronous with respect to each other. The details of operation of the HPSU's are set forth in detail in the copending application entitled "High Performance Storage Unit".

The prior art has recognized that scientific processors generally have computational rates that significantly exceed the storage rates of associated memory systems. This imbalance restricted the use of these earlier systems and made them suitable for only a small class of scientific problems. The previously noted prior art scientific processor disclosed in U.S. Pat. No. 4,101,960 was an exception to that general rule, in that it had a computational rate of one-half of the storage rate of the memory system. A more ideal solution to the problem is to set the maximum rate at which arithmetic/logical computational results are produced in a support processor are approximately equal to the maximum rate that data operands can move to and from the memory system, yielding a computation-to- storage rate ratio that is as close as possible to one-to-one.

OBJECTS

It is a primary object of this invention to provide an improved digital data processing system wherein one or more host data processors utilize one or more supporting scientific processors in conjunction with storage systems that are commonly accessible.

Another primary object of the invention is to utilize an improved High Performance Storage Unit use in a data processing system for providing common access to one or more host data processors and at least one Scientific Processor.

Another object of the invention is to provide an improved Scientific Processor that can be tightly coupled to one or more host processors through shared main highspeed storage without the necessity of coupling through input/output channels or mass storage systems.

Still another object of the invention is to provide an improved Scientific Processor that can be tightly coupled to one or more host processor through common access to the virtual address space of the host processor(s) in main high-speed storage.

Yet another object of the invention is to provide an improved Scientific Processor functional to perform scalar and vector manipulations in parallel and under program control of one or more host processors, through task assignments made by the operating system of the host(s).

It is a further primary object of the invention to provide an improved Scientific Processor for use in a data processing system, which Scientific Processor has balanced computation and storage rates.

It is another object of the invention to provide an improved Scientific Processor having a Scalar Processor Module and a Vector Processor Module.

Still another object of the invention is to provide an improved Scientific Processor having a Scalar Processor Module and a Vector Processor Module, each having access to a control memory and balanced computational rates.

Yet another object of the invention is to provide an improved Scientific processor that utilizes a plurality of parallel data pipeline configurations Within a Vector Processor Module.

Still another object of the invention is to provide a Scientific Processor having an improved Vector Processor Module including operable in parallel for performing addition, multiply and move functions, and including improved vector handling capabilities.

Another object of the invention is to provide an improved Vector Processor Module for use in a Scientific Processor utilizing a plurality of pipelined data paths within the Vector Processor Module wherein the data paths have associated therewith a conflict detection and resolution system.

Still another object of the invention is to provide an improved Vector Processor Module for use in a Scientific Processor which is balanced with the same number of computational result words per clock cycle as the number of words per clock cycle transferred by the storage interface with the main memory system.

Still a further object of the invention is to provide an improved Vector Processor Module with a unique Vector Storage having a primary and a secondary store of identical stored data.

Still another object of the invention is to provide an improved Scientific Processor having balanced computational and storage rates wherein a plurality of words can be transferred to or from main storage and at the same time an equal plurality of words per cycle are produced by a combined plurality of data paths.

It is a further primary object of the invention to provide a Scientific Processor having an improved Loop Control structure.

It is another object of the invention to provide a Scalar Processor Module in the Scientific Processor including an improved Loop Control structure that participates in al vector instructions performed by the Vector Processor Module.

Yet another object of the invention is to provide a Scientific Processor having Loop Control structure capable of providing a high performance means of handling the parameters associated with program loops in the Scientific Processor, particularly those involved with vector processing.

Another object of the invention is to provide a Scientific Processor having a structure having special registers and instructions for controlling loops which make it possible to efficiently pre-compute loop counts, thereby enhancing the speed of the Scientific Processor.

Still another object of the invention is to provide an improved Scientific Processor having a conflict detection structure for use in a pipelined Vector Processor Module of the Scientific Processor, which structure detects operational conflicts between the pipelined data and essentially halts one of the pipeline until the information necessary to perform the operation is available from those pipelines not halted.

Another object of the invention is to provide a Scientific Processor having enhanced address translation capabilities using general purpose registers.

Yet a further object of the invention is to provide a Scientific Processor having address translation occurring at rates similar to single-register indexing rates.

The foregoing objectives and other more detailed and specific objects will be come apparent and be understood from the drawings and the description of the invention.

SUMMARY OF THE INVENTION

The digital data processing system includes one or more host processors each coupled to one or more high performance storage units. Host processors can be selected from units available commercially, where the 1100/90 System available from Sperry Corporation is found to be particularly advantageous.

The High Performance Storage Unit (HPSU) is unique, and is basically a memory unit capable of coupling to various pluralities of instruction processors, and input/output units as well as to a pair of Scientific Processor (SP). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing systems, and without the requirement of caching by either the host or the Scientific Processor.

When more than one HPSU is desired to provide additional storage capacity, a Multiple Unit Adapter (MUA) is utilized between each Scientific Processor and multiple High Performance Storage Units. Generally, the MUA is an interface unit which couples a single Scientific Processor port to a plurality of up to four HPSUs via four HPSU ports. In this manner a Scientific Processor may address, read and write in any of the HPSUs.

The MUA is used in a scientific data processing system to interface at least one Scientific Processor to a plurality of High Performance Storage Units. The use of a separate MUA in such a data processing system enables the Scientific Processor of such a system to have a single HPSU port to thereby reduce the cost of the Scientific Processor when a single HPSU is desired to be used in the system. The MUA is required only when more than one HPSU is used in the scientific data processing system, thereby providing the additional memory interfaces needed for the Scientific Processor.

The Scientific Processor (SP) used herein is a special purpose processor attached to the host system via the HPSU(s). It is optimized for high speed execution of floating-point vector arithmetic operations. The SP provides increased performance for both integer and floating-point scalar operations that are embedded in the vectorized code to thereby provide over-all increased performance for scientific vector FORTRAN programs.

The present invention is directed toward that Scientific Processor (SP) which includes a Scalar Processor Module (SPM) and a Vector Processor Module (VPM).

The Scientific Processor is optimized for balanced computation and storage rates with an associated memory system in the operation of the Vector Processor Module. A plurality of data pipelines simultaneously apply data to the Vector Processor Module. Information is transferred to and from an associated main memory system by the Vector Processor Module. The rate at which the information (data) enters the Vector Processor Module from all of the pipelines approximates the rate that the information is transferred to the main memory system.

The Vector Processor Module has parallel pipelines including an Add pipeline and a Multiply pipeline wherein the data for the Add pipeline and the data for the Multiply pipeline are entering the Vector Processor Module in parallel. A predetermined 2N number (for example four) data words per clock cycle can be transferred either to or from the main memory system, while N data words per clock cycle are produced in parallel from each of the Add pipeline and the Multiply pipeline for a total of 2N words of computational results. In this way, the Vector Processor Module is balanced to the units of the main memory system with the same number of computational result words per clock cycle as the number of words transferred by the main memory interface. This balance permits the close coupling of the Scientific Processor to the Main memory system without necessity of large capacity intermediate buffering (caching) memory.

The Scientific Processor also includes a novel conflict detection and resolution mechanism associated with the plurality of pipelines. Where simultaneous computations are being performed, certain of these computations require the results of concurrent computations and a particular order of computation is followed. The conflict detection and resolution mechanism performs this function.

GLOSSARY OF ABBREVIATIONS

| TERM | DEFINITION |
|---|---|
| ACCEL | ACCELERATE |
| ADD | ADDEND |
| ADRS | ADDRESS |
| AG | ADDRESS TRANSLATION AND GENERATION SECTION |
| AI | ATTENTION INTERRUPT |
| ALT1 | FIRST ALTERNATE ELEMENT COUNT |
| ALT2 | SECOND ALTERNATE ELEMENT COUNT |
| ALU | ARITHMETIC LOGIC UNIT |
| AP | ADD PIPELINE SECTION (ALU) |
| ARM | AVAILABILITY, RELIABILITY, MAINTAINABILITY |
| AST | ACTIVITY SEGMENT TABLE |
| AUG | AUGEND |
| BFR | BUFFER |
| BNA | BANK NOT AVAILABLE |
| BPA | BOARD-PAIR ASSEMBLY |
| BRKPT | BREAKPOINT |
| BUF | BUFFER |
| BVL | BEGIN VECTOR LOOP |
| CB | CONTROL BLOCK SECTION |
| CAM | CONTENT ADDRESSABLE MEMORY |
| CELP | CURRENT ELEMENT LOOP POINTER |
| CBS | CB MEMORY SHADOW RESIGER |
| CLK | CLOCK |
| CLR | CLEAR |
| COMPR | COMPARE |
| CNT | COUNT |
| CONSIM | CONCURRENT FAULT SIMULATOR |
| CP | CHARACTERISTIC PIPELINE |
| CPG | CLOCK PULSE GENERATOR |
| CTRL | CONTROL |
| CVLP | CURRENT VECTOR LOOP POINTER |
| DBL | DOUBLE |
| DEC | DECELERATE |
| DES | DESIGNATOR |
| DEST | DESTINATION |
| DIAG | DIAGNOSE INSTRUCTION |
| DP | DOUBLE PRECISION |
| DP-FLP | DOUBLE PRECISION FLOATING POINT |
| DP-FXP | DOUBLE PRECISION FIXED POINT |
| EDC | ERROR DATA CAPTURE |
| EI | EXTERNAL INTERRUPT |
| EIF | EXECUTE IMMEDIATE FUNCTION |
| EL | ELEMENT LOOP |
| ELCNT | ELEMENT COUNT |
| ELPT | ELEMENT POINTER |
| EM | EXTERNAL MONITOR INTERFACE SECTION |
| EN | ENABLE |
| FLD | FIELD |
| FLP | FLOATING POINT |
| FXP | FIXED POINT |
| G | G REGISTER |
| GA | GATE ARRAY |
| GIV | GENERATE INDEX VECTOR |
| GOP | G OPERAND |
| HPP | HIGH PERFORMANCE PACKAGING TECHNOLOGY |
| HPSU | HIGH PERFORMANCE STORAGE UNIT |
| IA | INSTRUCTION ADDRESS |
| IDX | INDEX |
| IF | INSTRUCTION FLOW SECTION (CONSISTS OF IFA, IFB, & IFC) |
| IFA | INSTRUCTION FLOW ADDRESSING |
| IFB | INSTRUCTION FLOW BUFFER |
| IFC | INSTRUCTION FLOW CONTROL |
| IIH | INTERFACE INTERRUPT HANDLING |
| INTFC | INTERFACE |
| INTRP | INTERRUPT |
| INVLD | INVALIDATE |
| INTIN | INTERRUPTING INSTRUCTION |
| IP | INSTRUCTION PROCESSOR |
| IOP | INPUT/OUTPUT PROCESSOR |
| IPL | INITAL PROGRAM LOAD |
| IPCU | INSTRUCTION PROCESSOR COOLING UNIT |
| IUCT | IN UNIT CARD TEST |
| LSB | LEAST SIGNIFICANT BIT |

-continued

GLOSSARY OF ABBREVIATIONS

| TERM | DEFINITION |
|---|---|
| | ($2^{35}$ IN 36 BIT WORD) |
| JHF | JUMP HISTORY FILE |
| LC | LOOP CONTROL SECTION (VECTOR LOOP & EL LOOP REG.) |
| LCS | LOOP CONTROL STACK |
| LD | LOAD |
| LS | LOCAL STORAGE (4K RAM IN LOCAL STORE |
| LSI | LARGE SCALE INTEGRATED CIRCUIT |
| LSS | LOCAL STORAGE STACK SECTION) |
| LSSA | LOCAL STORAGE SEGMENT ADDRESS |
| MCI | MAINTENANCE AND CONTROL INTERFACE |
| MEC | MAXIMUM ELEMENT COUNT |
| MFLOPS | MILLION FLOATING POINT OPERATIONS PER SECOND |
| MK | MASK PROCESSOR SECTION |
| MP | MULTIPLY PIPELINE |
| MPS | MULTIPLY PIPELINE SECTION |
| MPCD | MULTIPLICAND |
| MPI | MULTIPLE PASS INSTRUCTION |
| MRDNG | MOVE REGISTER DATA-NOT A G REGISTER |
| MSB | MOST SIGNIFICANT BIT ($2^0$ IN 36 BIT WORD) |
| MUA | MULTIPLE UNIT ADAPTER |
| MULTR | MULTIPLIER |
| MUX | MULTIPLEXER |
| MV | MOVE PIPELINE SECTION |
| MZ | VECTOR STRIP SIZE REGISTER |
| NELCNT | NEXT ELEMENT COUNT |
| NLJ | NON-LOCAL JUMP |
| NOVLP INST | NONOVERLAPPED INSTRUCTION |
| OLM | ONLINE MAINTENANCE |
| PAR | PROGRAM ADDRESS REGISTER (ADDRESS OF NEXT INSTRUCTION) |
| PT | POINTER |
| PCC | POWER COUPLING CONTROL |
| RAM | RANDOM ACCESS MEMORY |
| RDY | READY |
| REG | REGISTER |
| RR | REGISTER-TO-REGISTER INSTRUCTION FORMAT |
| RSLT | RESULT |
| RS | REGISTER-TO-STORAGE INSTRUCTION FORMAT |
| SAEV | STORE ALTERNATE ELEMENT |
| ST | STORE BUFFER SECTION |
| SC | SCALAR/VECTOR DATA TRANSFER CONTROL SECTION |
| SCC | SCALAR CONDITION CODE |
| SCG | SINGLE CONDITION GENERATE |
| SCU | SYSTEM CLOCK UNIT |
| SCS | SCALAR LOCAL STORE |
| SEDC | SCANSET ERROR DATA CAPTURE |
| SEL | SELECT |
| SI | STORAGE INTERFACE |
| SIMD | SINGLE INSTRUCTION MULTIPLE DATA |
| SLR | STORE LOOP CONTROL REGISTER |
| SP | SCIENTIFIC PROCESSOR |
| SP ALU | SCALAR PROCESSOR ARITHMETIC LOGIC SECTION |
| SP-FLP | SINGLE PRECISION FLOATING POINT |
| SP-FP | SINGLE PRECISION FIXED POINT |
| SPCB | SCIENTIFIC PROCESSOR CONTROL BLOCK |
| SPM | SCALAR PROCESSOR MODULE |
| SPP | SYSTEM PROBE PANEL |
| SRC | SOURCE |
| SS | SCANSET SECTION |
| SSI | SMALL SCALE INTEGRATED CIRCUITS |
| SSP | SYSTEM SUPPORT PROCESSOR |
| ST | STORE BUFFER SECTION |
| SUNA | STORAGE UNIT NOT AVAILABLE |
| SV | STORE VECTOR |
| SVX | STORE VECTOR INDEXED |

-continued

| GLOSSARY OF ABBREVIATIONS | |
|---|---|
| TERM | DEFINITION |
| TC | TIMING CHAIN |
| TM | TRACKING MEMORY |
| TS | TIME SLOTS |
| UCM | UNIT CONTROL MODULE |
| UIA | UNIVERSAL INTERFACE ADAPTER |
| UP | UNIVERSAL PROCESSOR INTERFACE SECTION |
| UPI | UNIVERSAL PROCESSOR INTERFACE |
| USC | UNIT SUPPORT CONTROLLER |
| VC | VECTOR CONTROL SECTION |
| VCW | VECTOR CONTROL WORD |
| VF | VECTOR FILE |
| VL | VECTOR LOOP |
| VL | VECTOR LOAD |
| VOP | VECTOR OPERAND |
| VP | VECTOR PROCESSOR |
| VPM | VECTOR PROCESSOR MODULE |
| VPW | VECTOR PARAMETER WORD |
| VS | VECTOR STORE |
| VSO | VIRTUAL SEGMENT OFFSET |
| VS | VECTOR STORAGE SECTION |
| VV | VECTOR STORAGE INSTRUCTION FORMAT |
| WO | WORK CAPACITY |
| WR | WRITE |

BRIEF DESCRIPTION OF THE DRAWINGS

FIG. 6 is a block diagram of the Clock Distribution system used in the SP;

FIG. 7 is a timing diagram of the Clock Phases of the Clock Distribution System;

FIG. 12 is a simplified block diagram illustrating the method of locating of the Control Block (CB) in the HPSU by the mailbox pointer register in the Address Generation (AG) section of the Scalar Processor Module (SPM);

FIG. 13 illustrates an example of the RR Format of the Add instruction of the Arithmetic Logic Unit (ALU) portion of the SPM in the SP executing the first instruction;

FIG. 14 is a block diagram of the Scalar Processor Arithmetic Logic Unit (SPALU) portion of the SPM illustrating a first instruction execution;

FIG. 15 is a block diagram of the Vector File Write operation for an RR Add Instruction;

FIG. 16 is the format of one of the instructions that requires information from vector files only (VV), being an Add Instruction;

FIG. 17 is a block diagram of the VPM G Operand Transfer Instruction;

FIG. 23 is a logical block diagram showing how the Instruction Flow Buffer (IFB) is referenced;

FIG. 34 is a logical block diagram of the same raw instruction entering the control portion of the Instruction Flow section (IF) and passing through the various decoding levels prior to becoming the internal control for the IF section and the control for all other sections;

FIG. 35 is a flow chart of the events that have to occur and that must be referred to by the Instruction Flow Control (IFC) before it can determine what it must do next;

FIG. 40 is a further simplified pictorial diagram of the remapped Vector instruction with their corresponding octal addresses;

FIG. 41 is a table showing the XRAM address bits of the instruction of the remapped vector instruction address generator;

FIG. 42 is a timing diagram of the interface signals between the Instruction Flow section and the Vector Processor Module;

FIG. 61 is a simplified logical block diagram of a load AST timing chain setup;

FIG. 62 is also a simplified logical block diagram of additional load AST timing chains;

FIG. 63 is a logical block diagram of the address counter used in conjunction with the Activity Segment Table;

FIG. 70A, and FIG. 70B when arranged as in FIG. 70, is a detailed logical block diagram of the Scalar Processor section of the SPM;

FIG. 89 is a table showing the sixteen combinations of conversion types between single and double precision integers and single and double precision floating point operations;

FIG. 93 is a timing diagram showing the timing chains used in an integer divide operation;

FIG. 94 is also a timing diagram showing the timing chains used in a floating point division operation;

FIG. 97 is a timing diagram showing the timing sequence of the integer divide count calculation, where k equals the number of leading signs, m equals the number of digits in the quotient, NCA refers to the Norm Count A register, CS, the characteristic stage register, and DC corresponds to the Divide Count register;

FIG. 98 is also a timing diagram which illustrates the sequence in which the exponent is calculated;

FIG. 99 is a calculation illustration of a nonrestoring and a restoring division floating point operation;

FIG. 113 is a simplified block diagram of the logic used in conjunction with state register word 10 to return data to the SP and provide an external monitor signal;

FIG. 114 illustrates the word format of the Hardware Status Register 3 (HSR3);

FIG. 115 s a logical block diagram of the circuitry used to create the Hardware Status Register 3 (HSR3);

FIG. 116 is a logical block diagram of the circuitry associated with the breakpoint register S14;

FIG. 119 is a logical block diagram of the microcode control circuitry used in conjunction with the quantum timer to provide data thereto from the translation memory;

FIG. 120 is a more detailed logical block diagram of the additional circuitry associated with the microcode control of FIG. 119 which illustrates the source of the calculated value being sent to the decrementing register;

FIG. 121 is a table showing a listing of the various internal interrupt indicator signals included in the register S8;

FIG. 122 is a logical block diagram illustrating the circuitry associated with the state register, S8 including the element index status signals (EIS) selectively entering the state register S8;

FIG. 123 is a logical block diagram illustrating the circuitry associated with the origination of valid interrupts, with particular emphasis on the mask state register S11 operation during a move operation;

FIG. 124 is. a logical block diagram illustrating the circuitry utilized in a mask fanout circuit from the mask state register, S11 to provide a signal back from it to the various sections of the SVP;

FIG. 125 is a logical block diagram of the circuitry used to provide an IFA start address by the status loading of state registers S9, S12 and S13 into the Control Block (CB) memory;

FIG. 126 is a logical block diagram of the circuitry needed in the internal interrupt handler, which handler is previously a timing chain;

FIG. 127 is an extension of FIG. 126 interconnected thereto at the COUNT line and is a logical block diagram showing the AND gates and the multiplexer used to select the desired move instruction for execution by the Control Block control logic;

FIG. 128 is a logical block diagram of the circuitry to provide a stop signal to the Instruction Flow section upon receipt of an internal interrupt signal;

FIG. 129 is a logical block diagram of the circuitry necessary to capture external interrupt signals;

Figure 20:
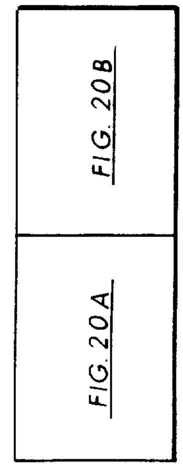
FIG. 20A and FIG. 20B, when arranged as in FIG. 20, is a logical block diagram showing how the original program address is captured, the retry address is captured, the retry address is compared and the Address Segment Table (AST) number file is organized.
Figure 130:
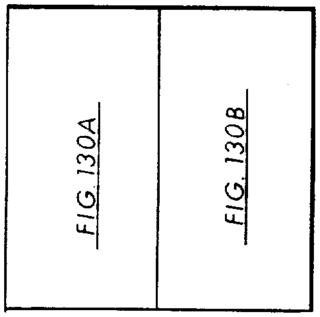
Figure 130B:
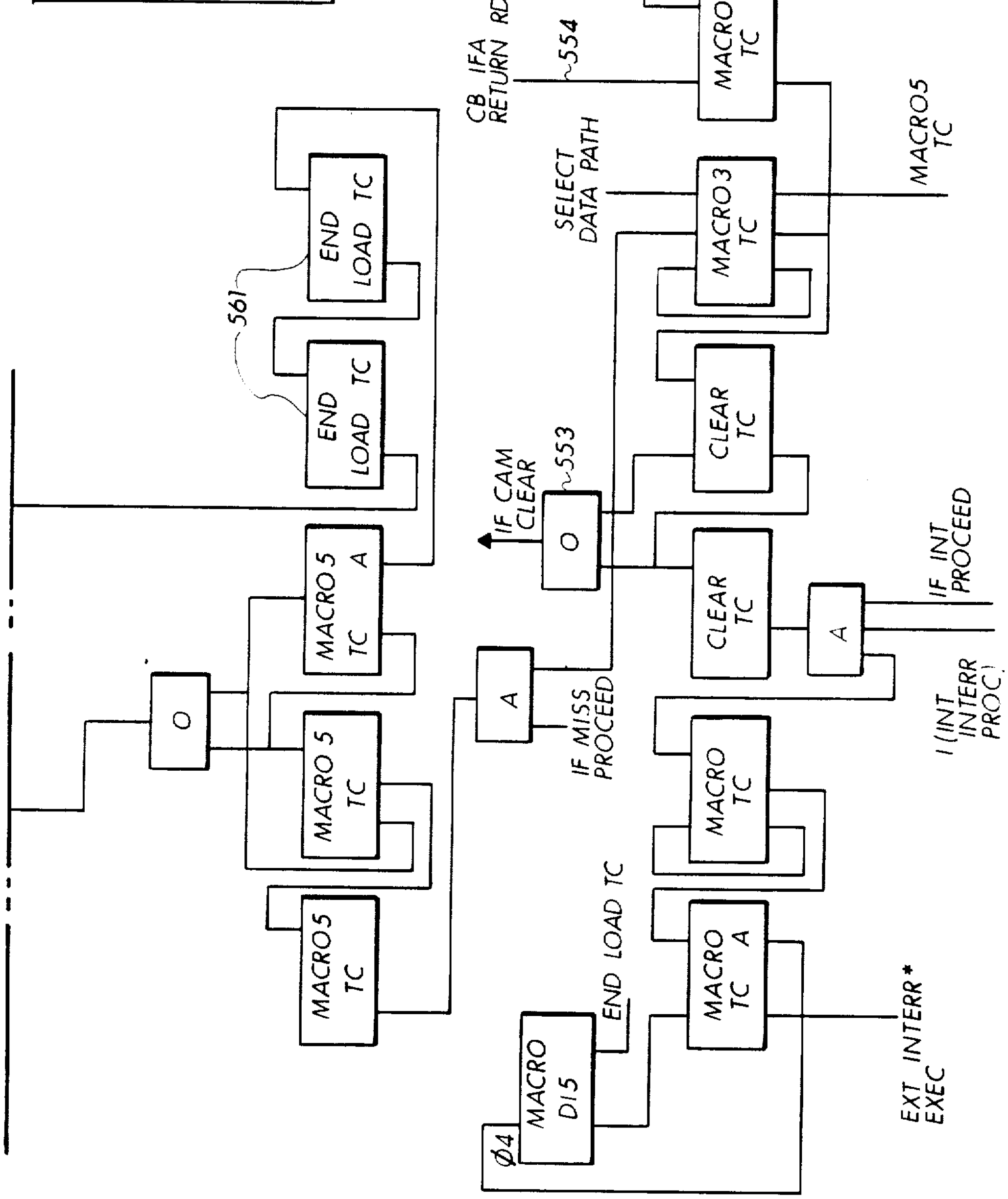
Figure 133:
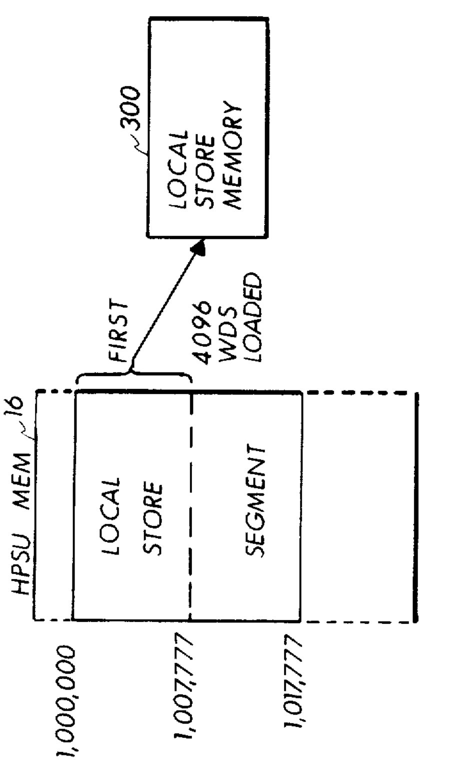
Figure 132:
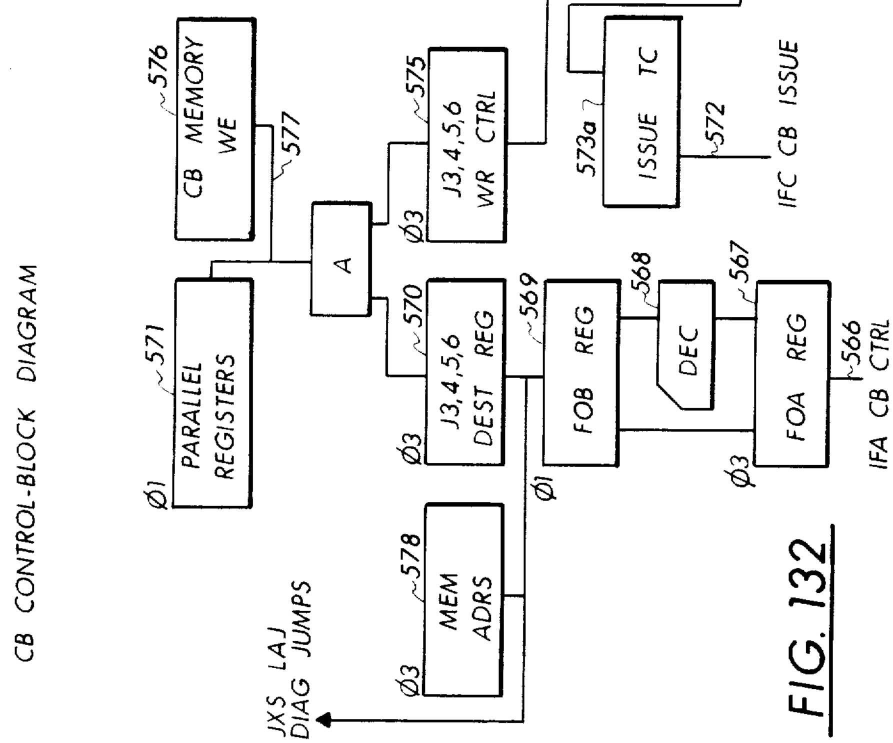
Figure 134:
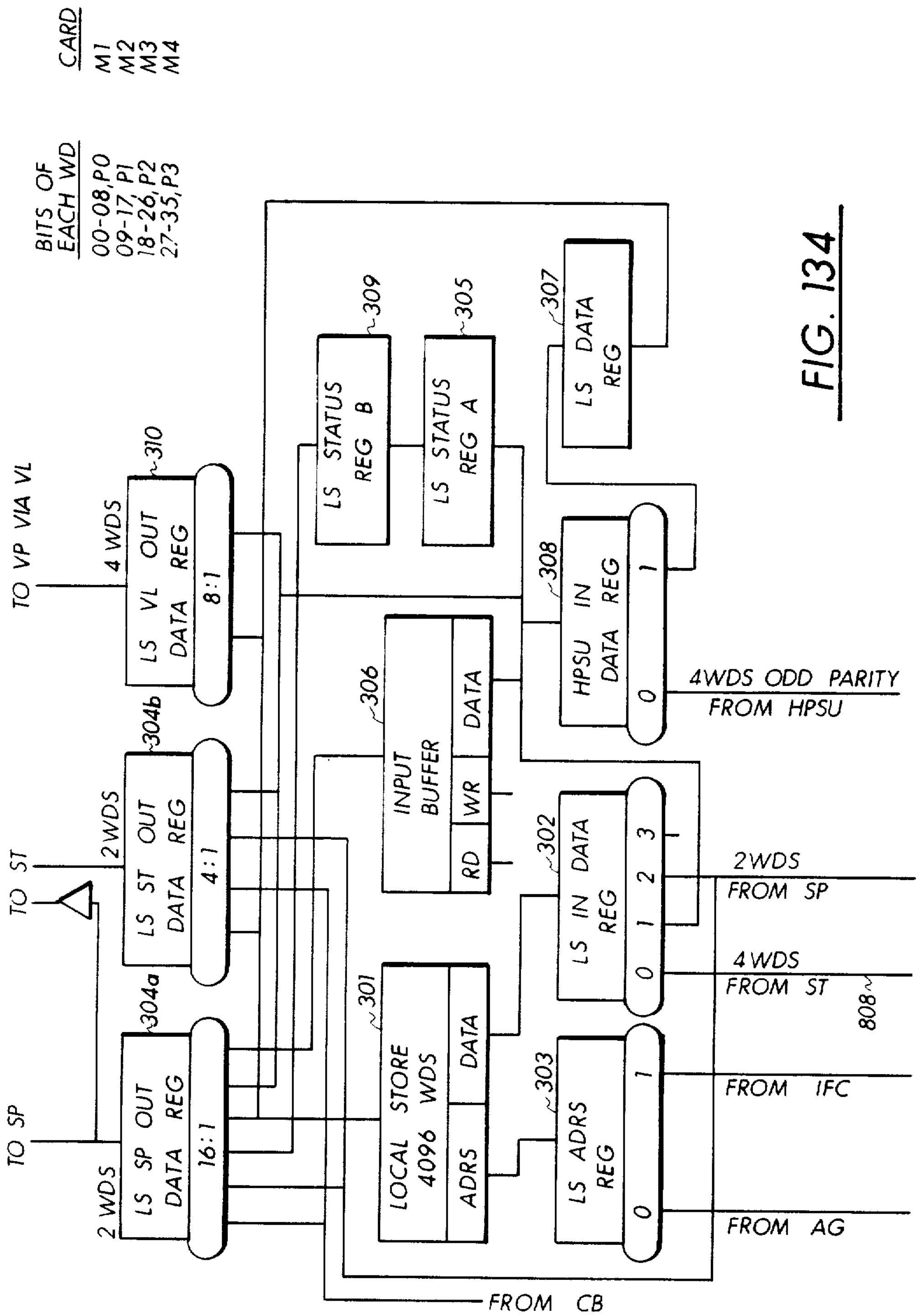
Figure 135:
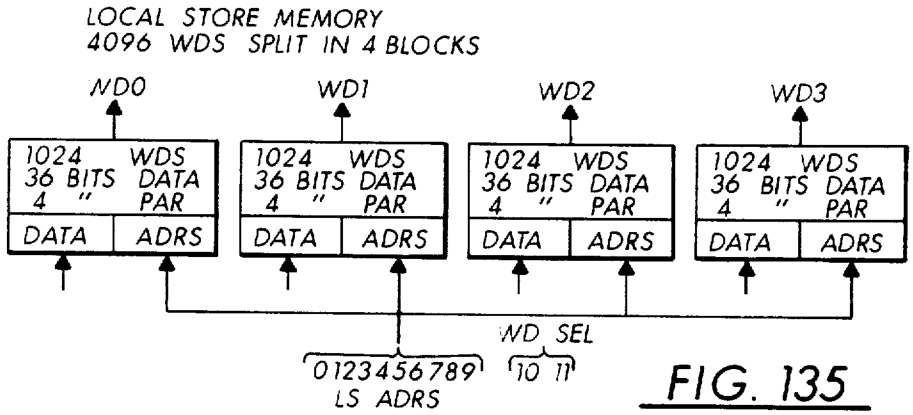
Figure 136:
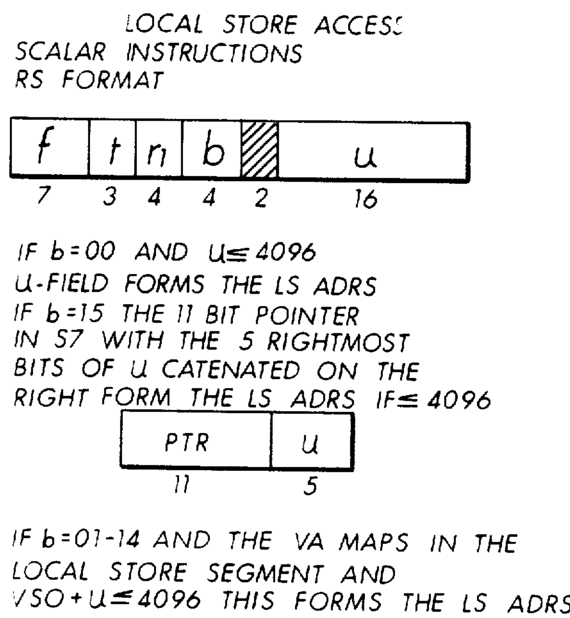
Figure 137:
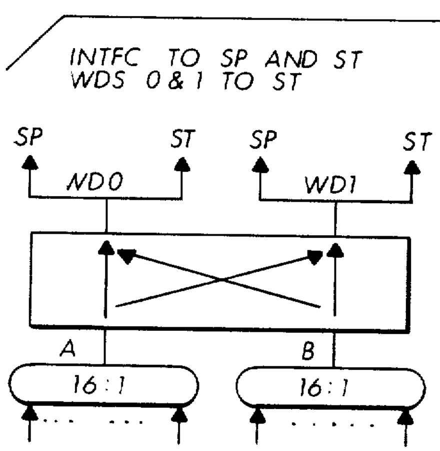
Figure 138:
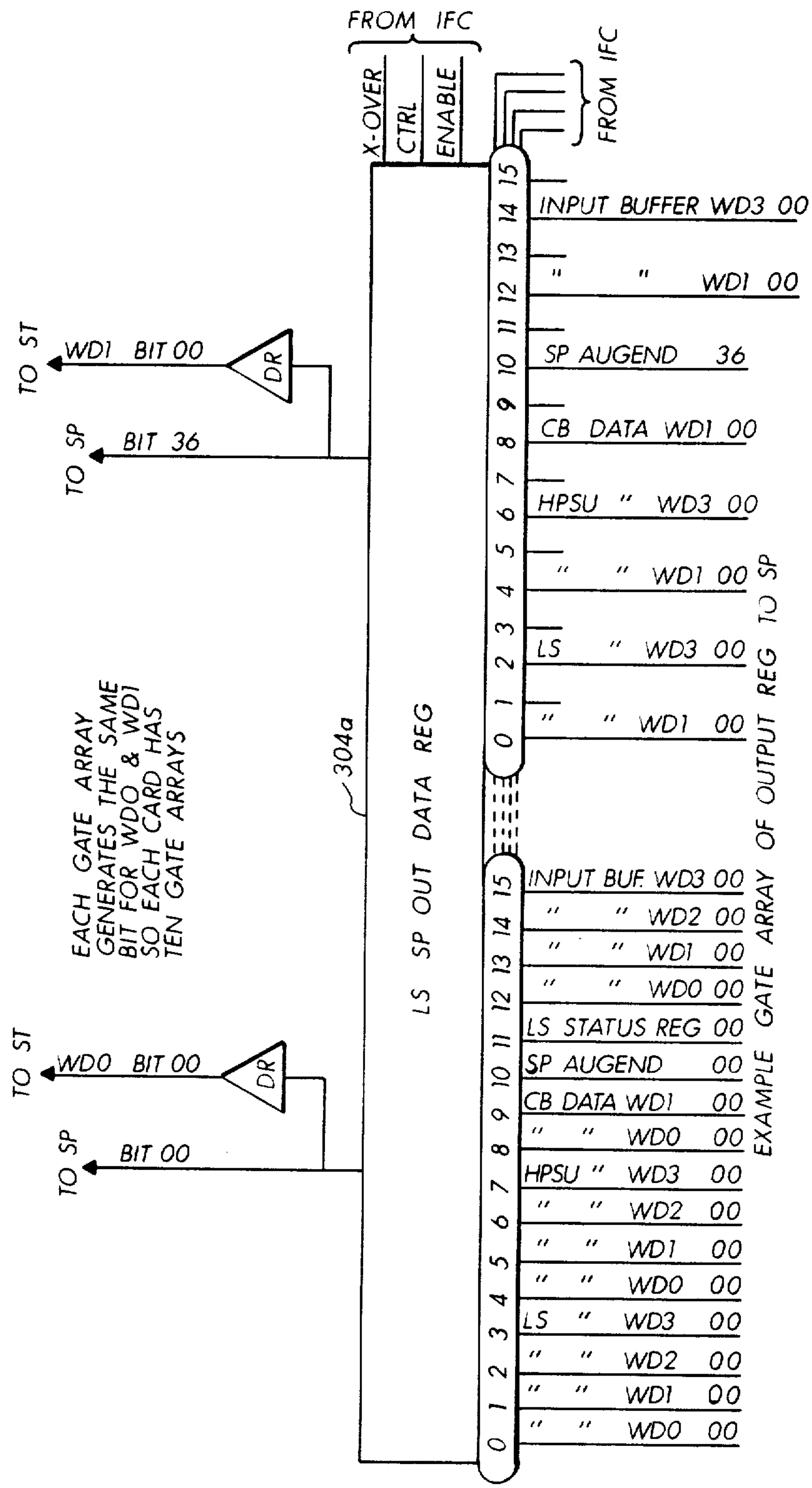
Figure 140:
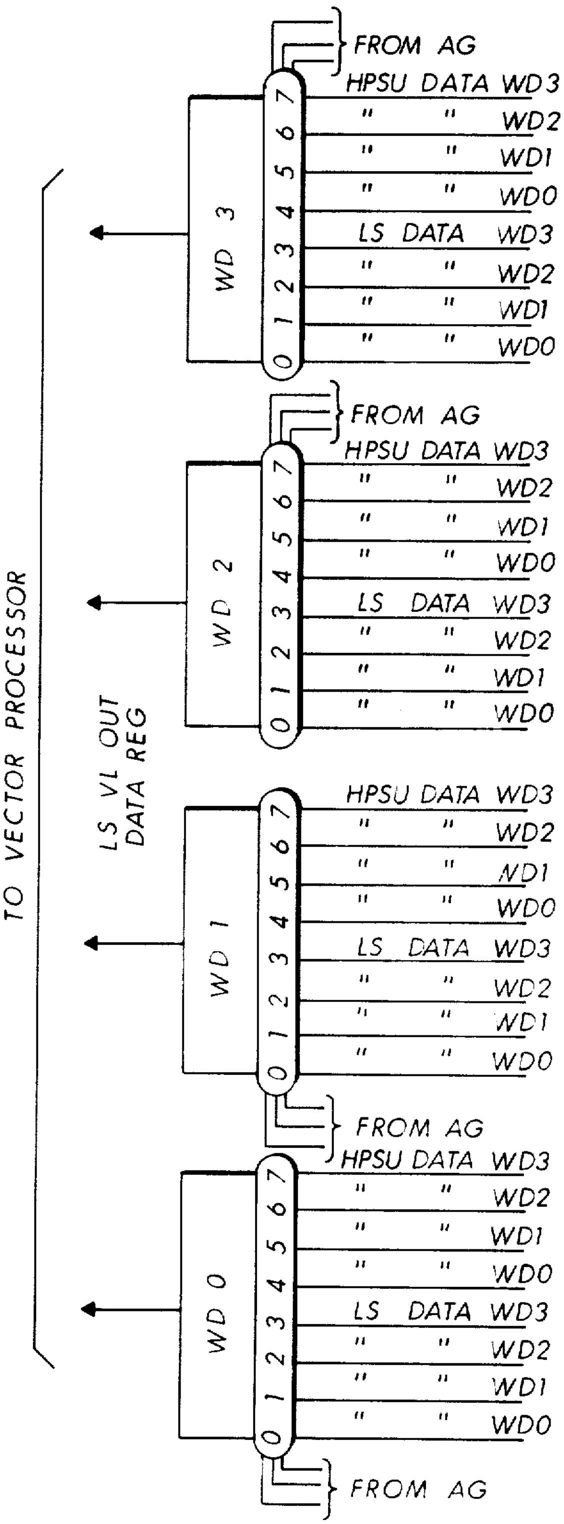
Figure 141:
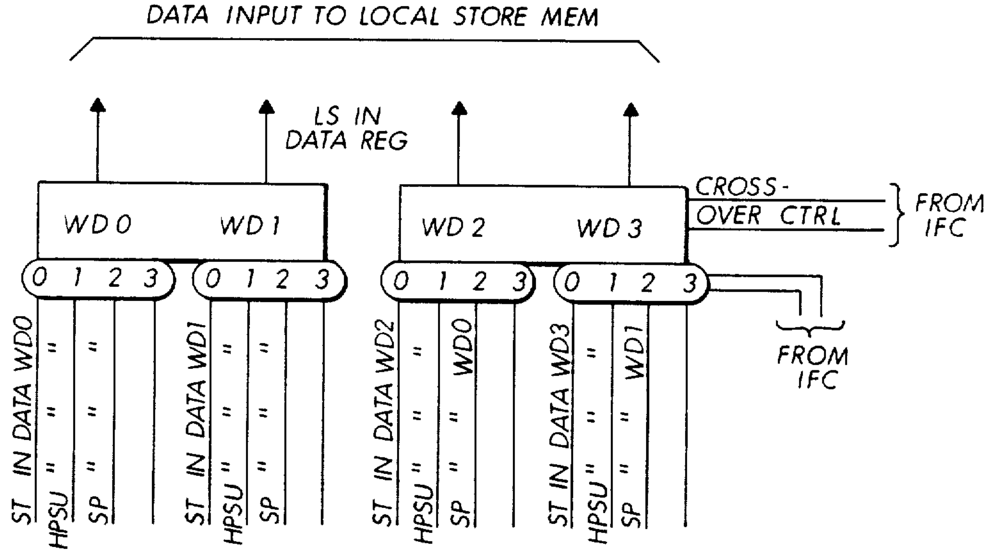
Figure 139:
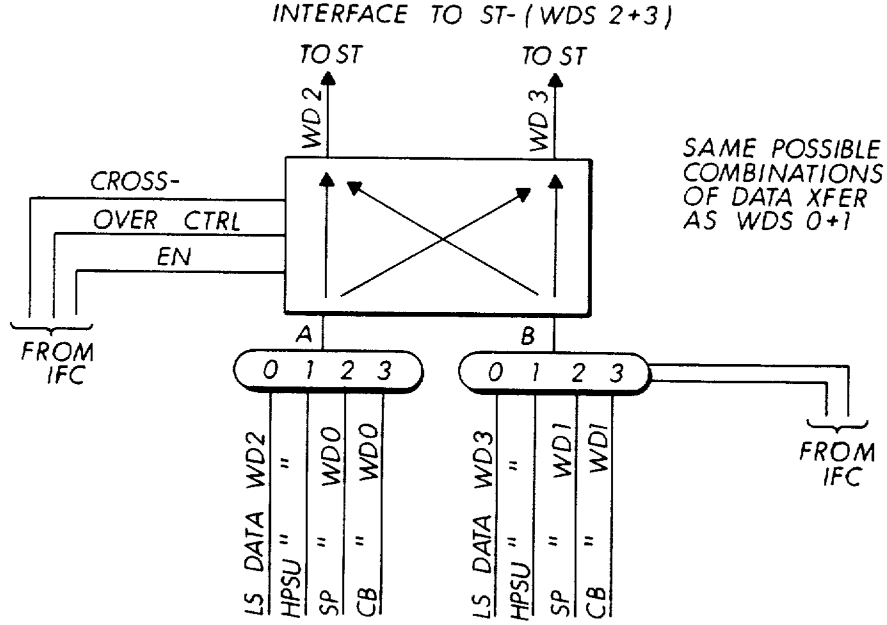
Figure 142:
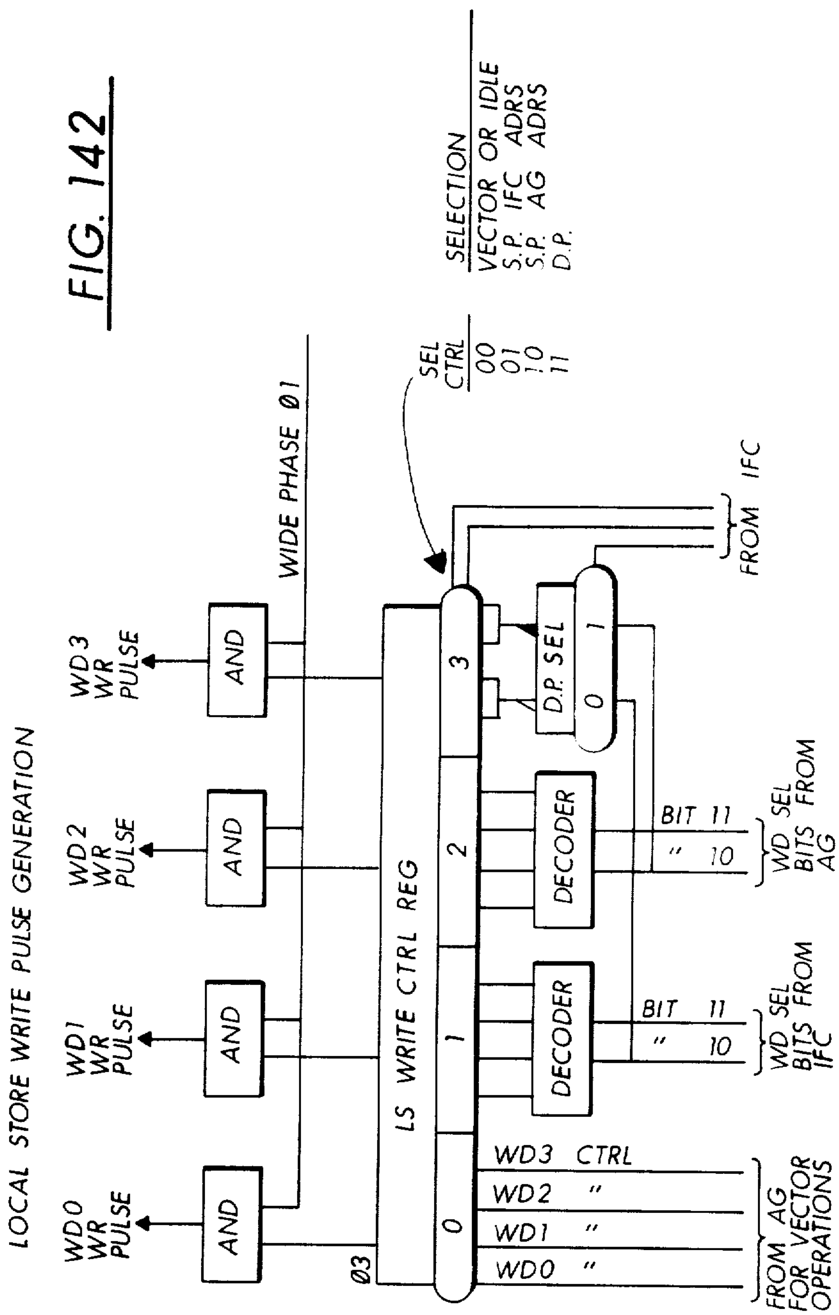
Figure 144:
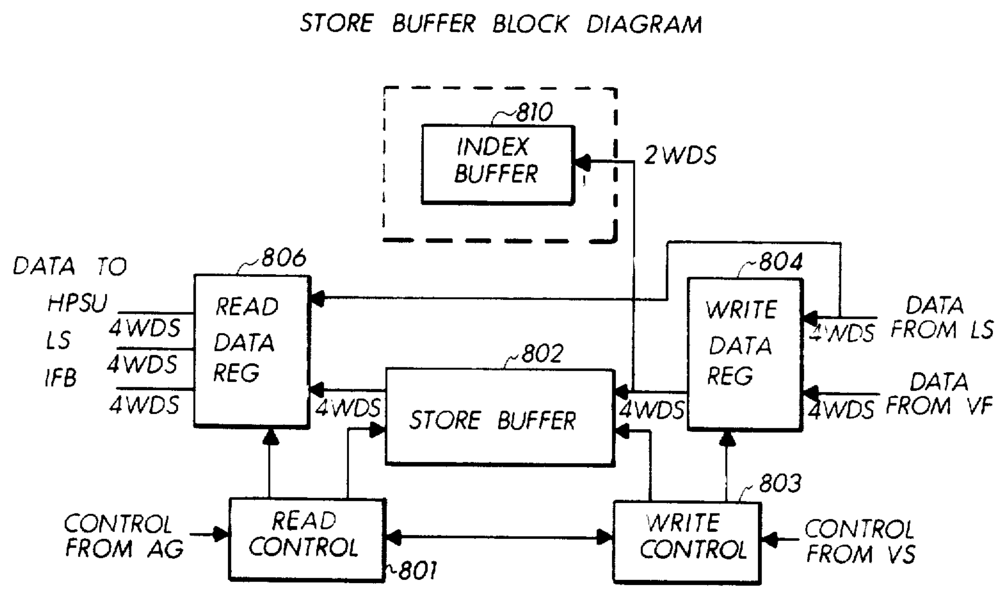
Figure 143:
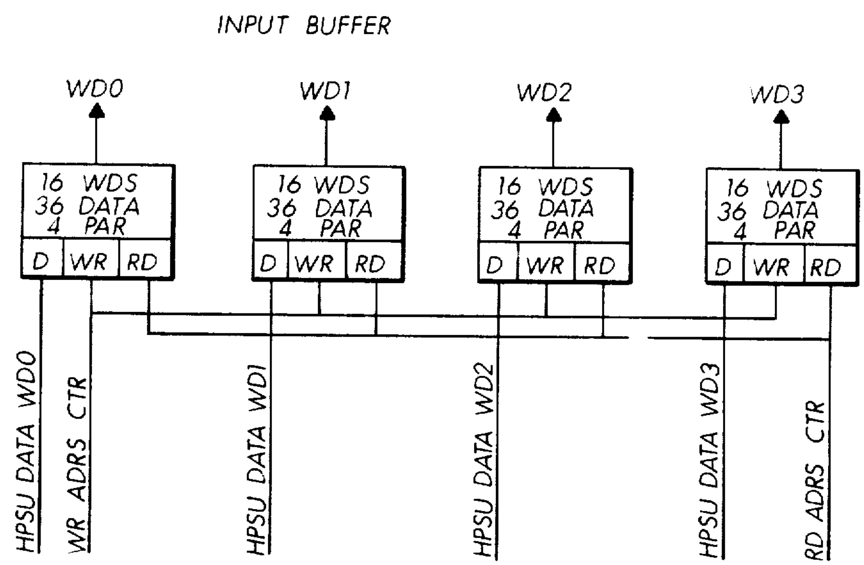
Figure 145:
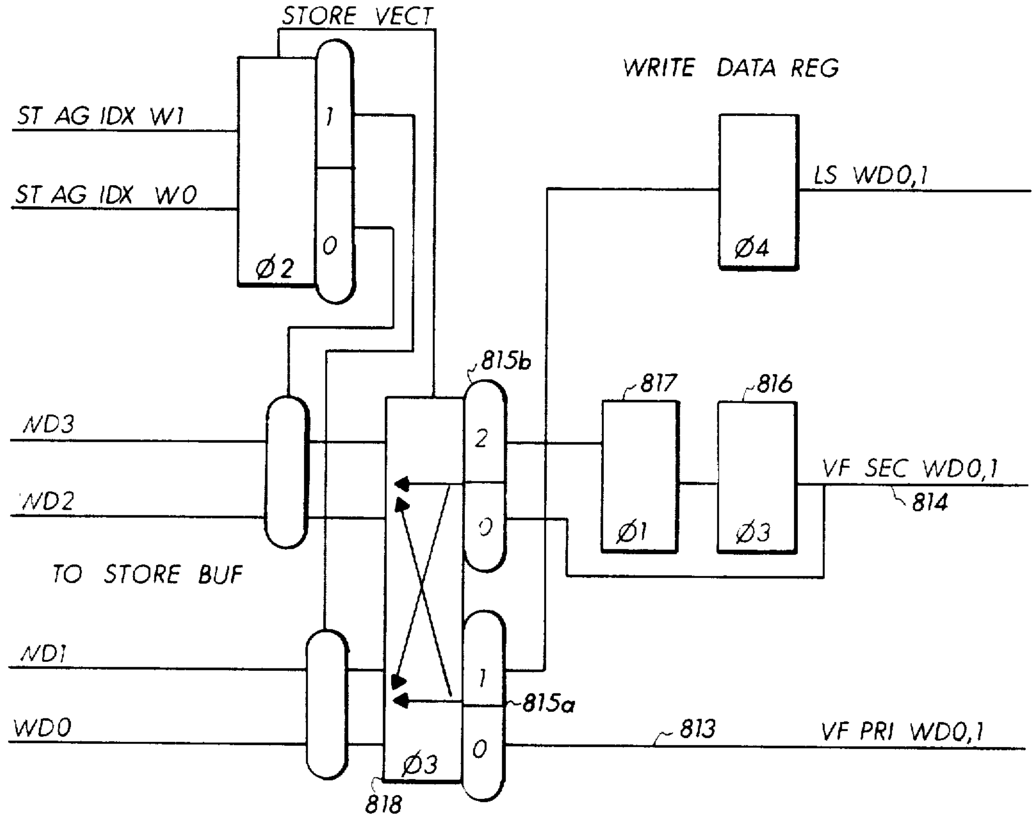
Figure 147:
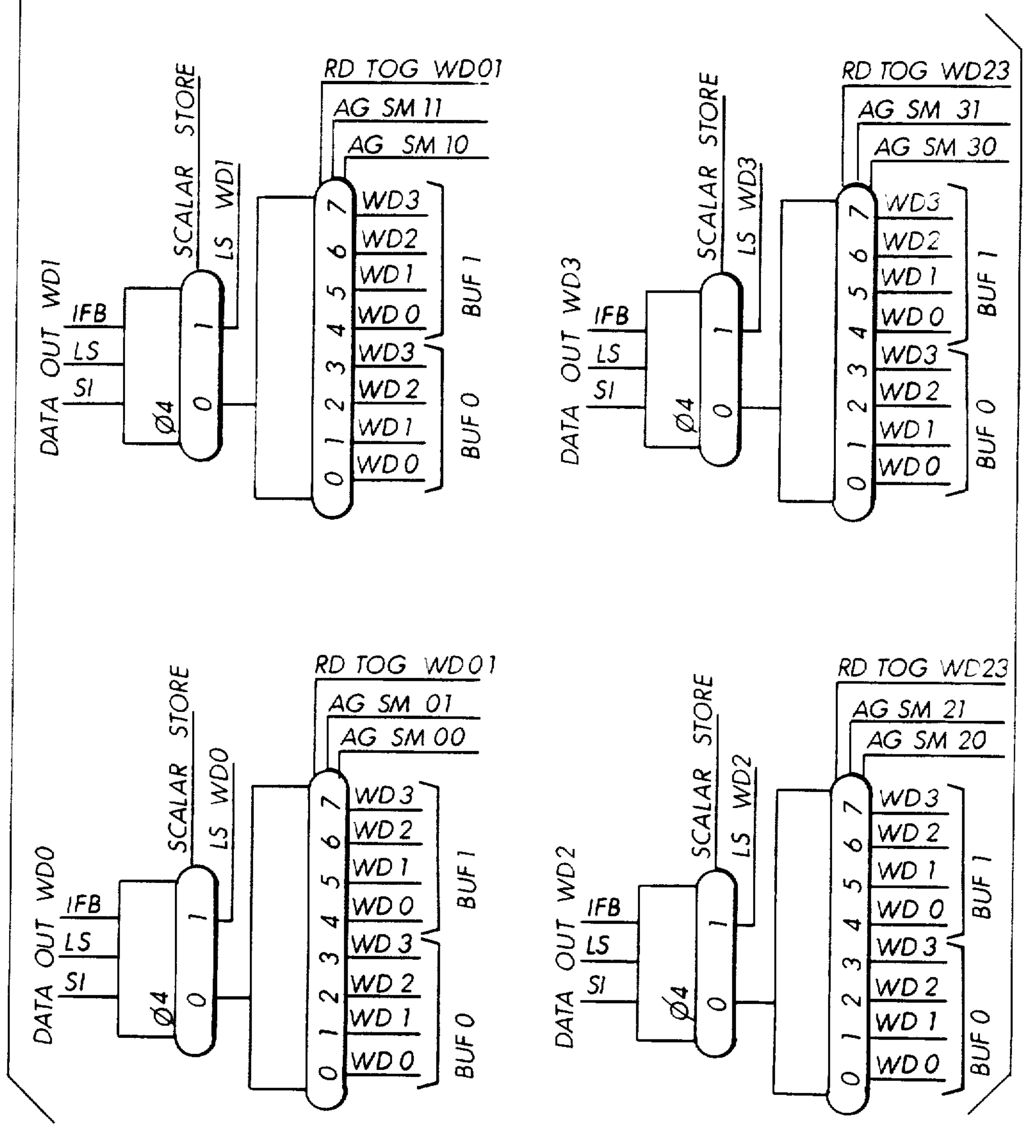
Figure 149:
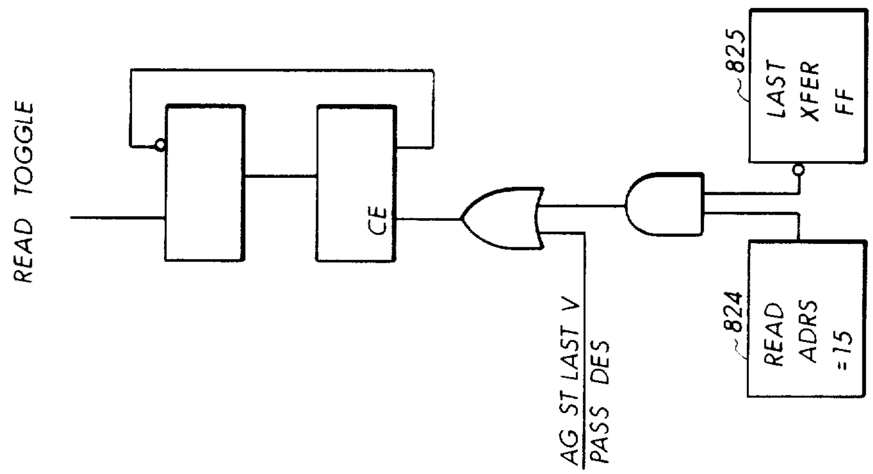
Figure 148:
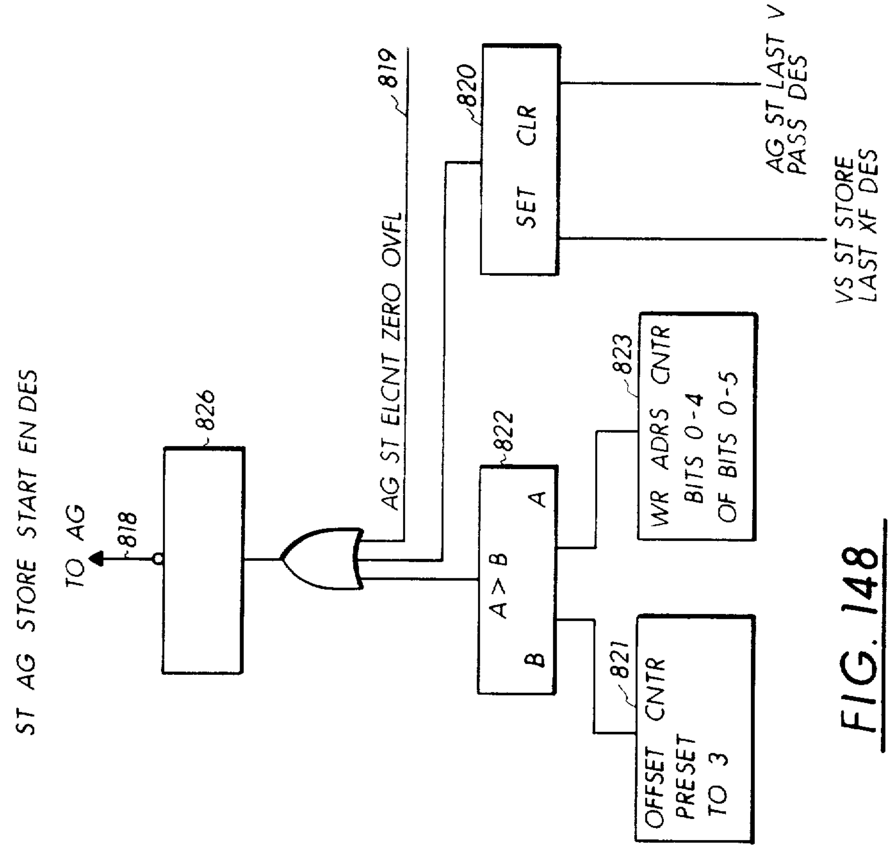
Figure 150:
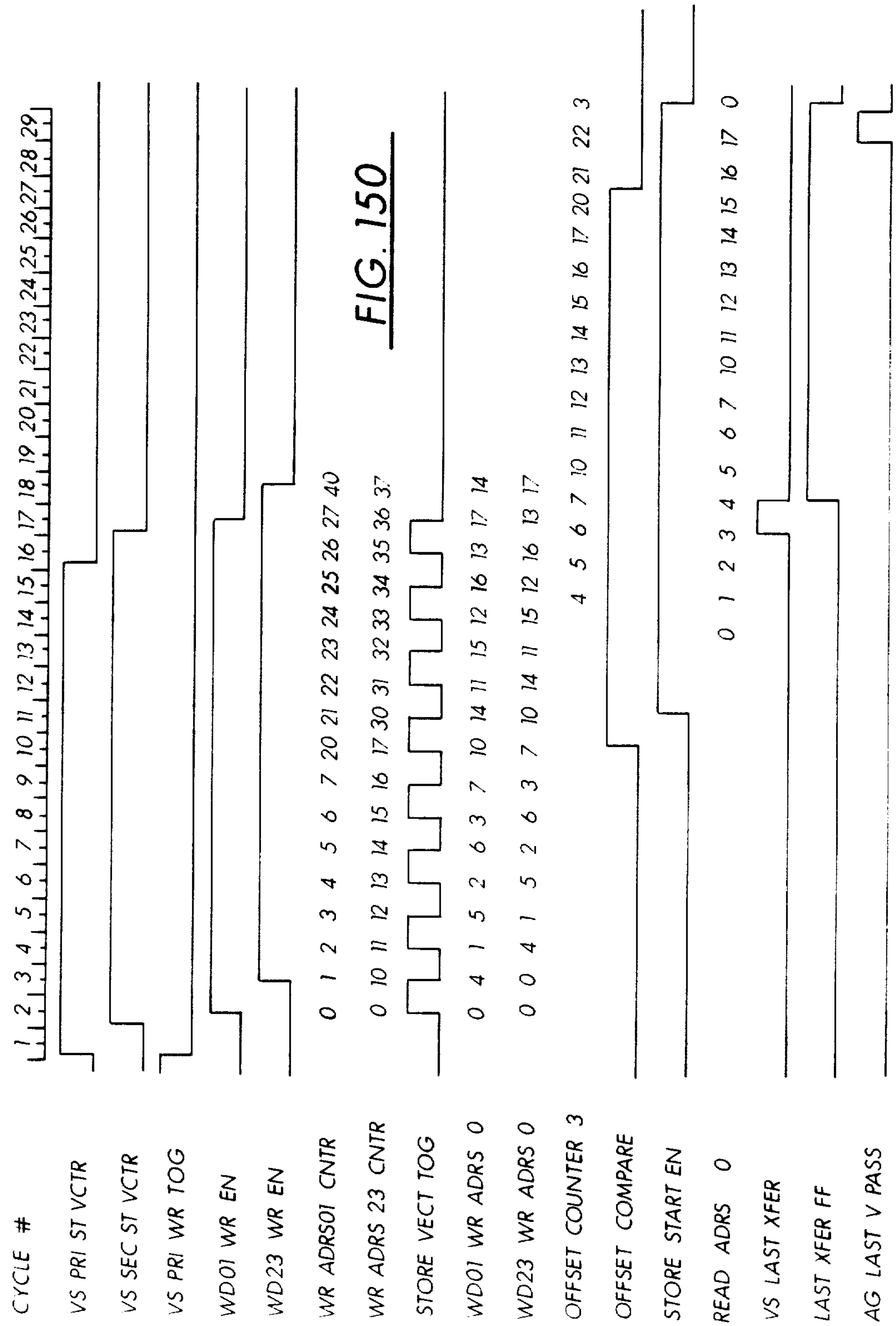
Figure 156:
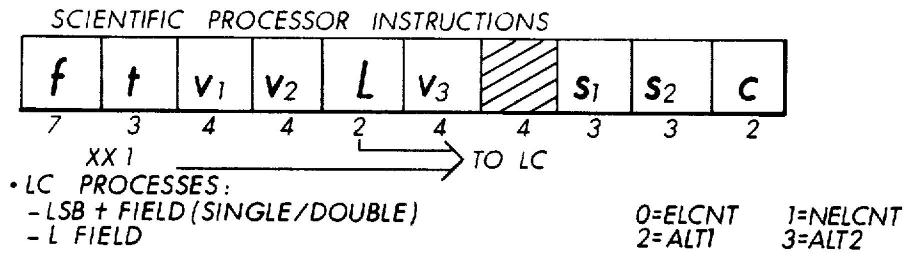
Figure 155:
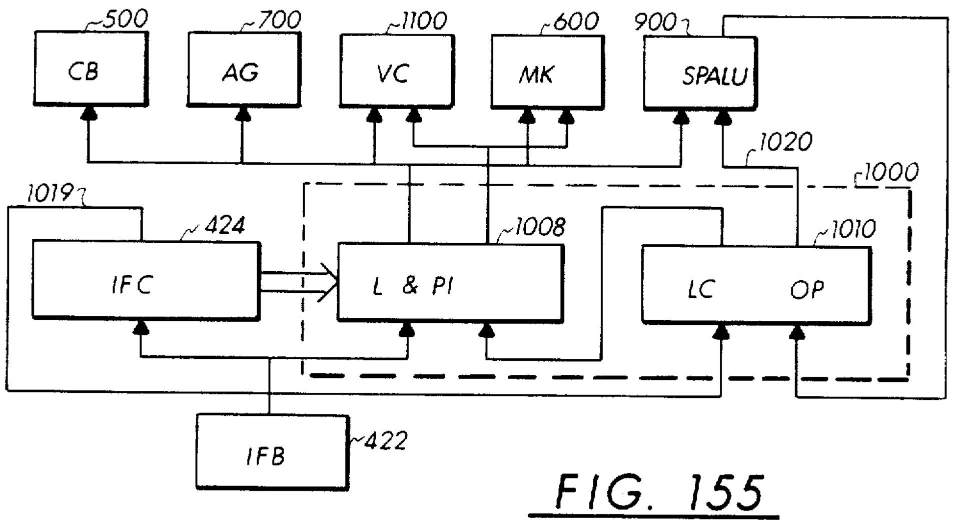
Figure 154:
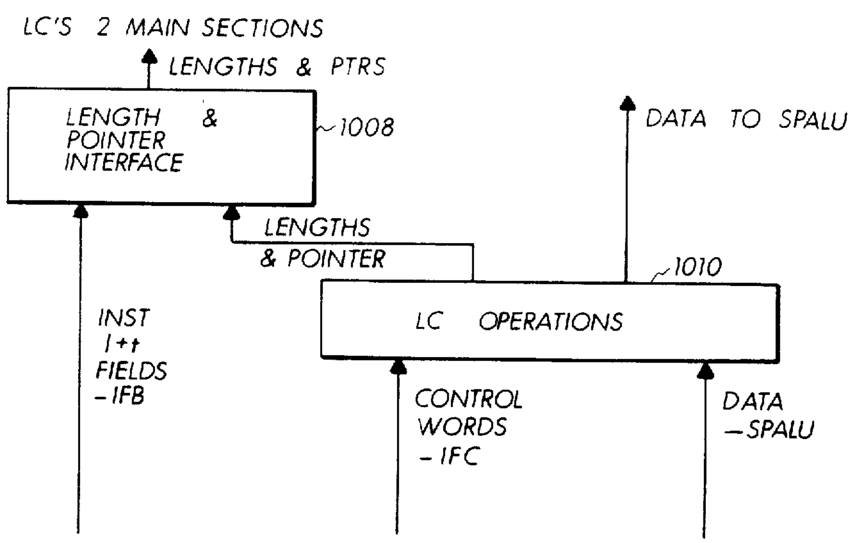
Figure 158:
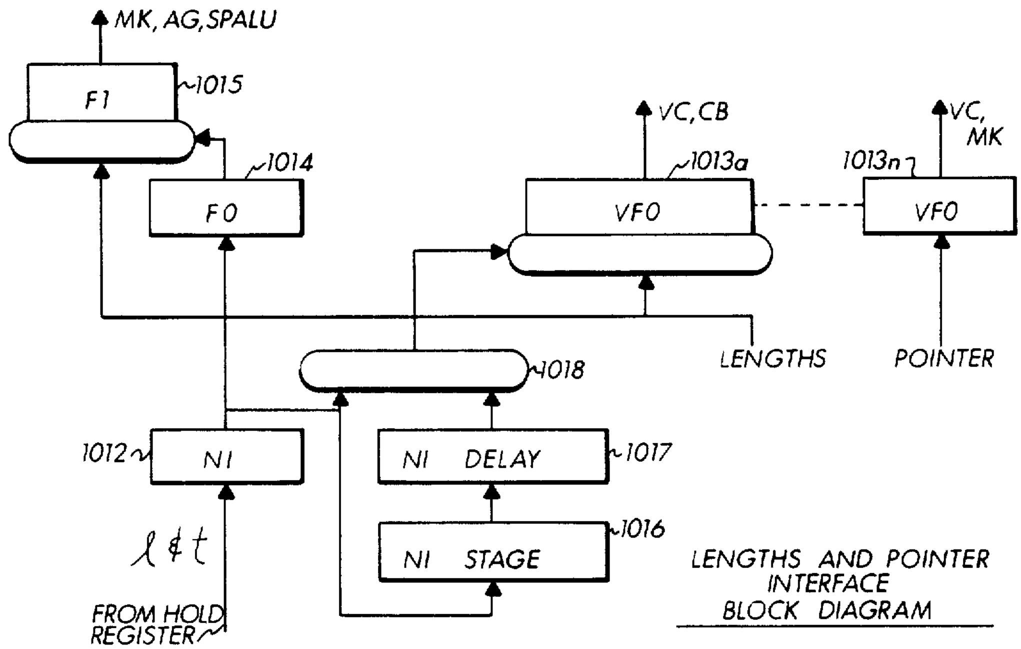
Figure 157:
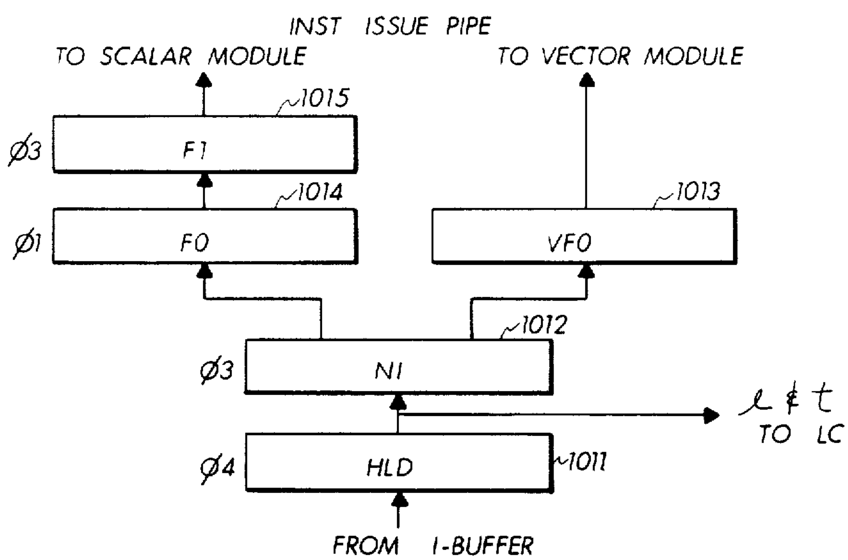
Figure 161:
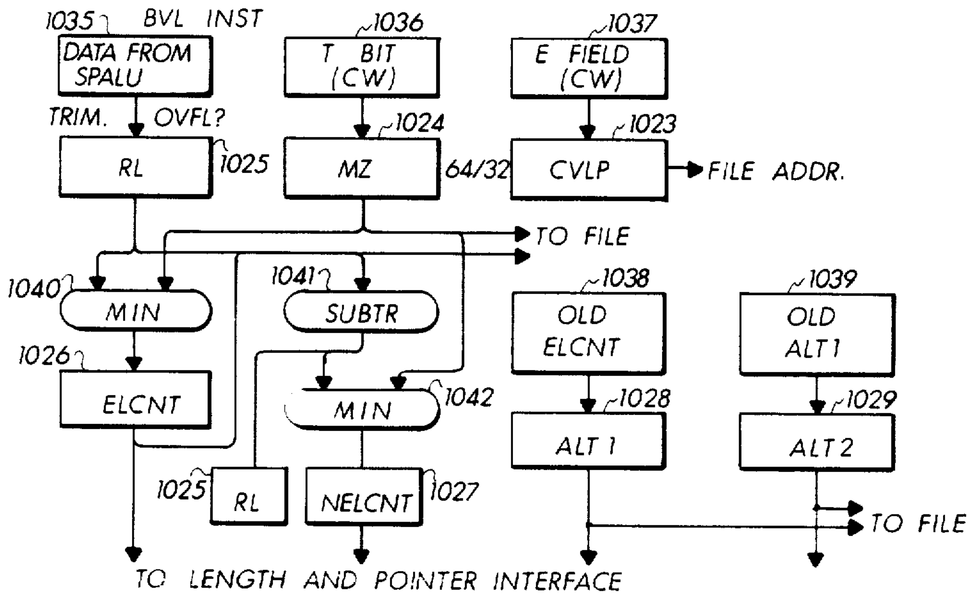
Figure 160:
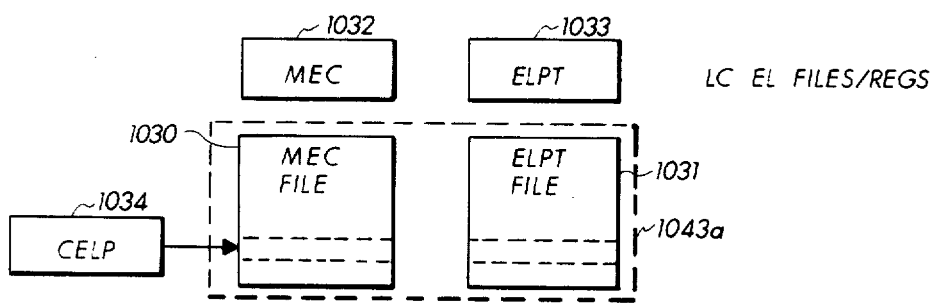
Figure 159:
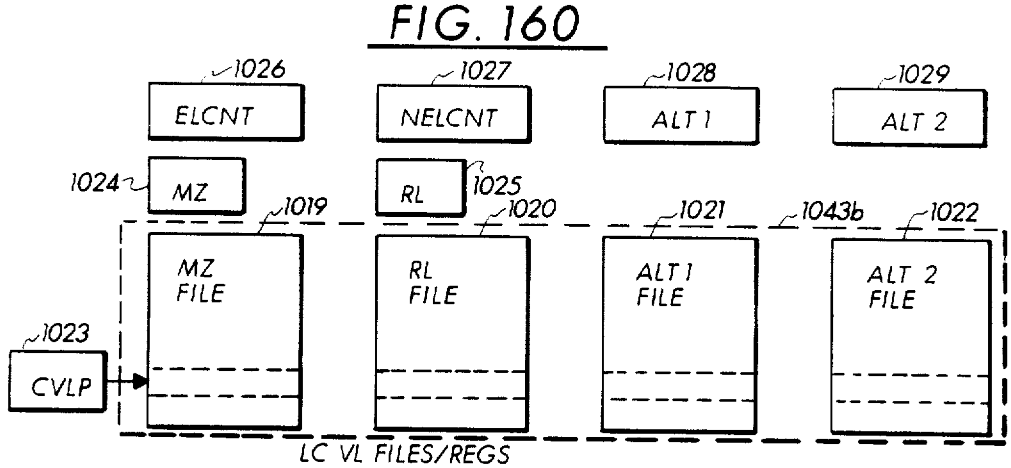
Figure 162:
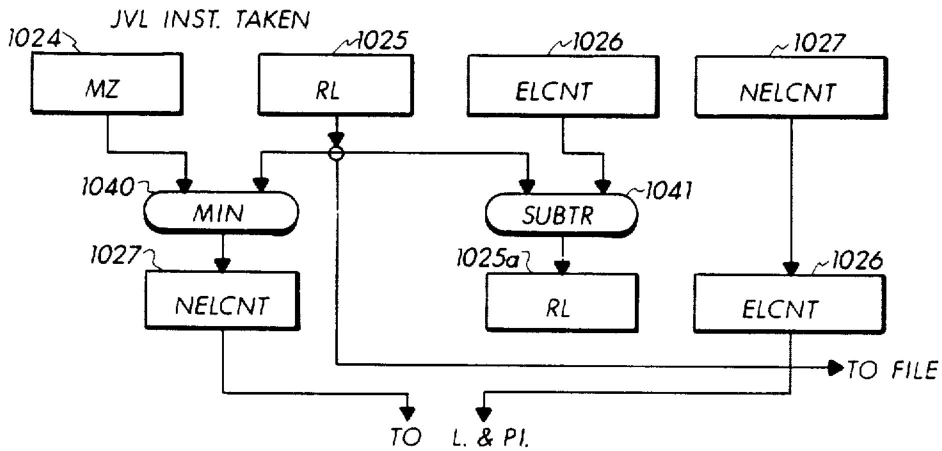
Figure 163:
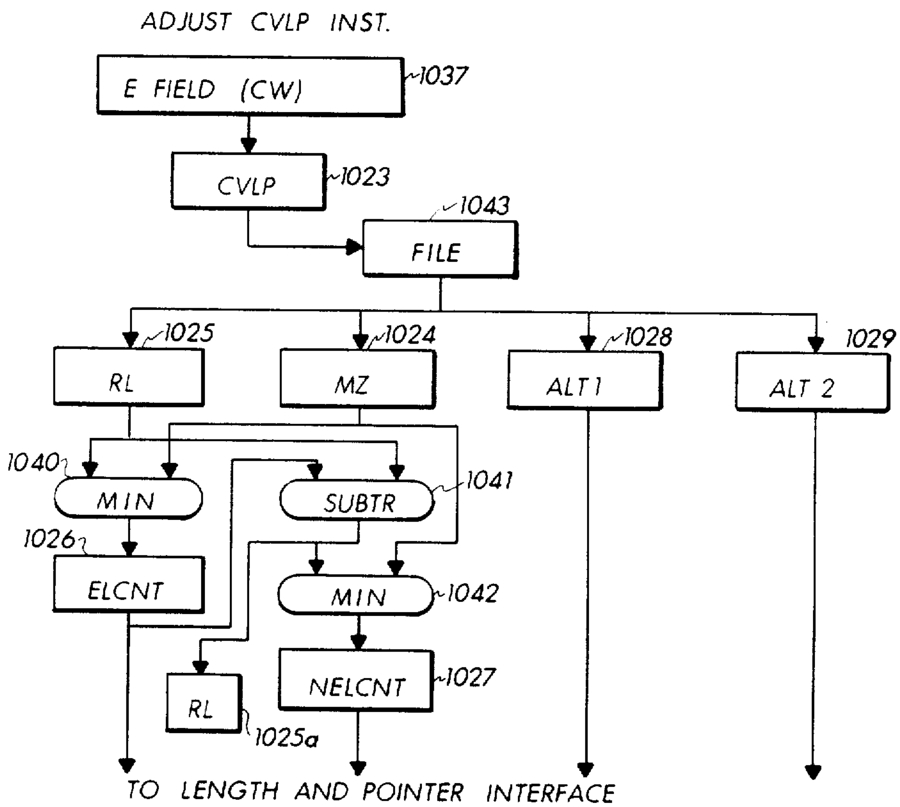
Figure 164:
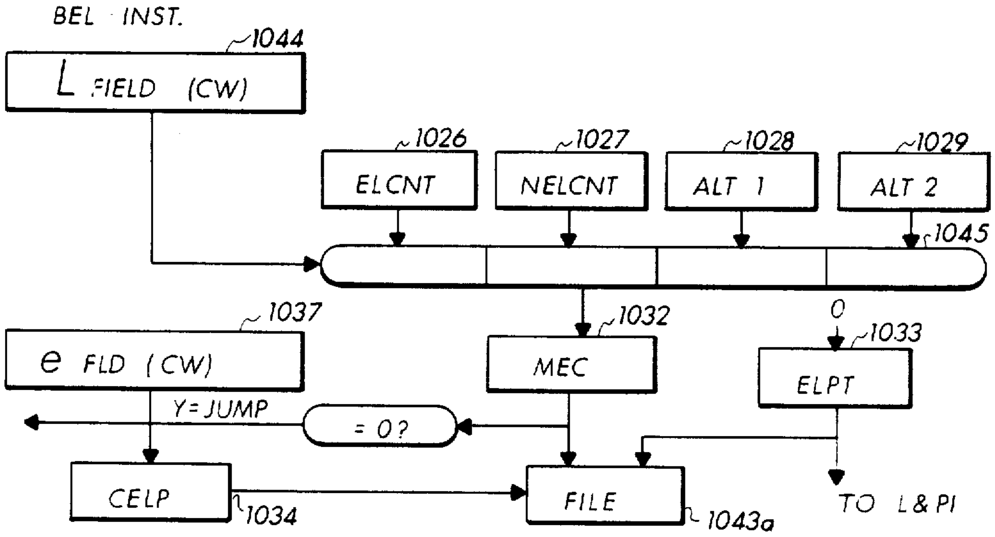
Figure 165:
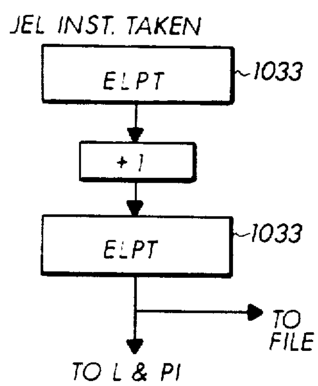
Figure 166:
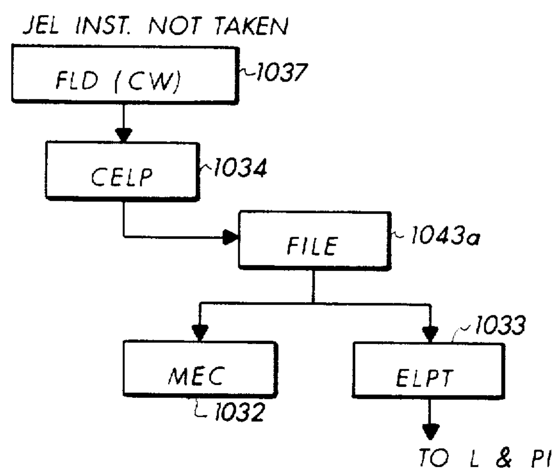
Figure 167:
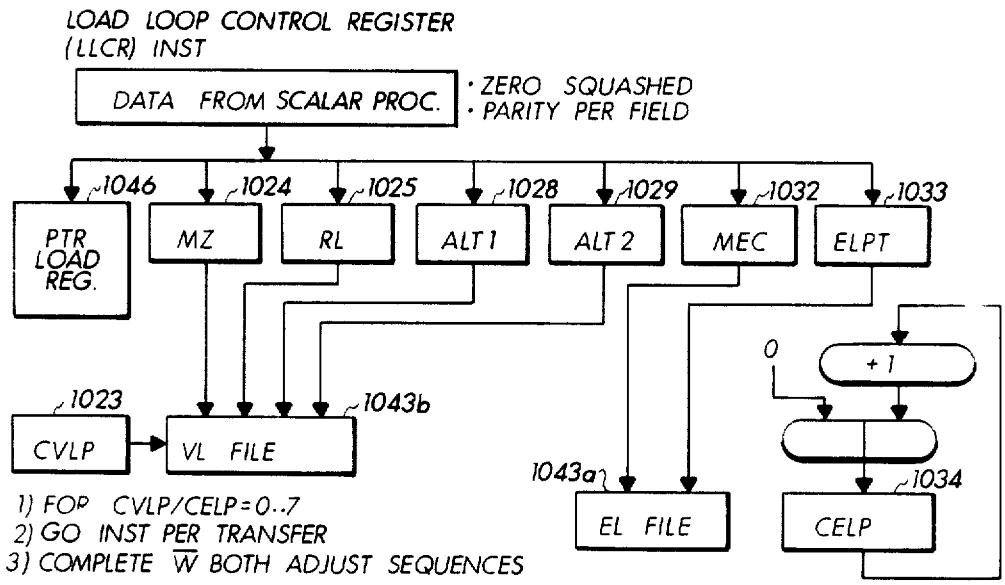
Figure 168:
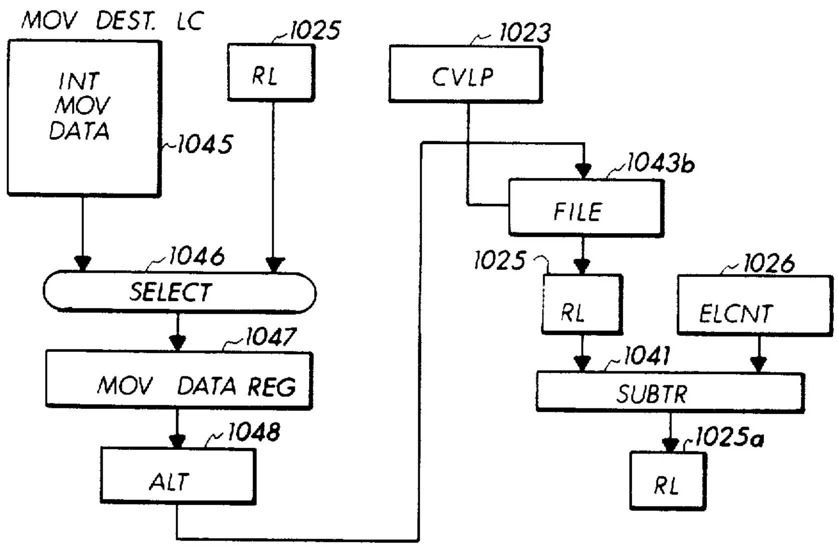
Figure 169:
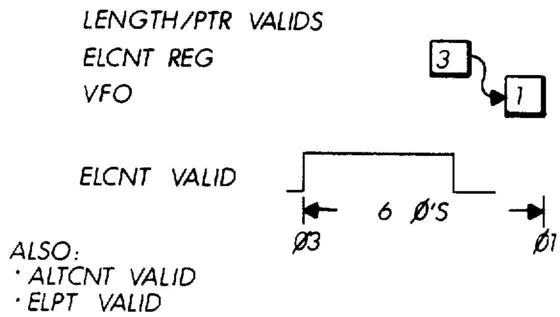
Figure 170:
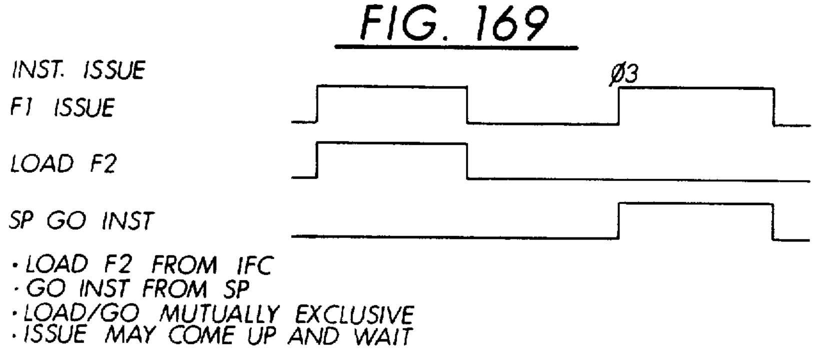
Figure 171:
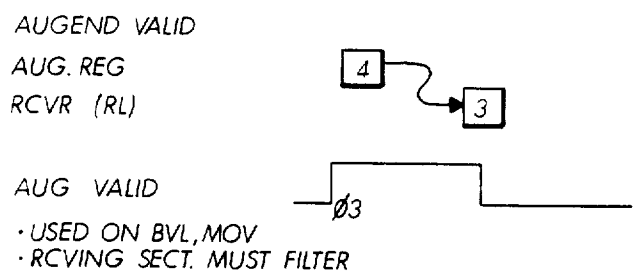
Figure 172:
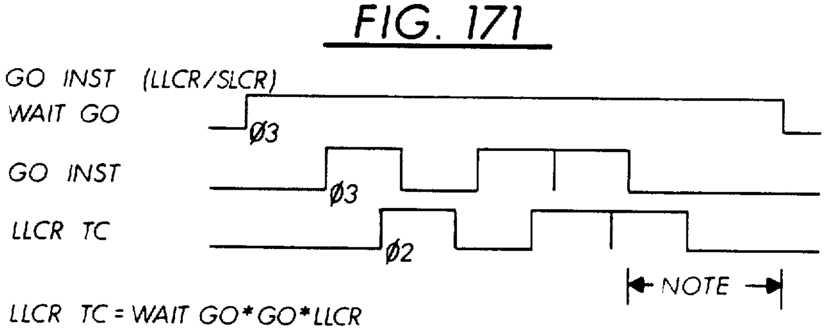
Figure 173:
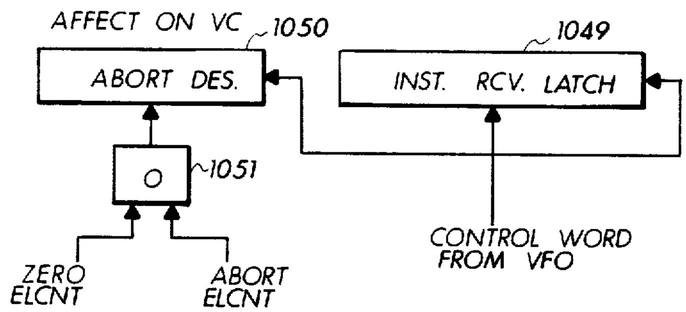
Figure 174:
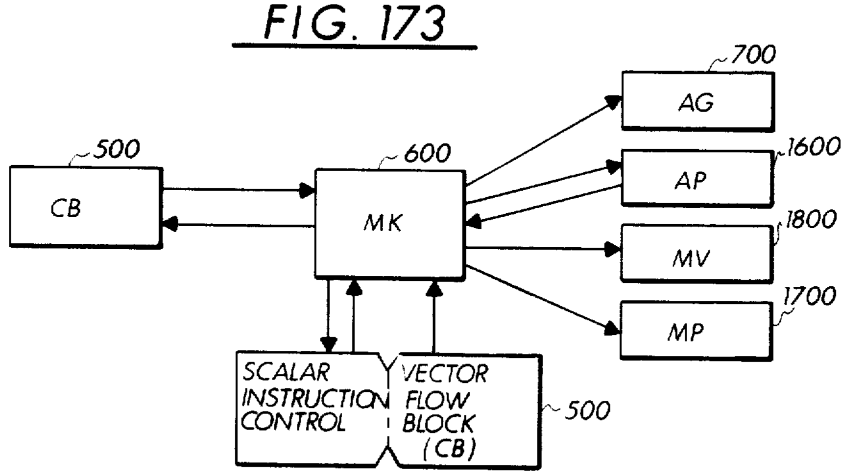
Figure 175:
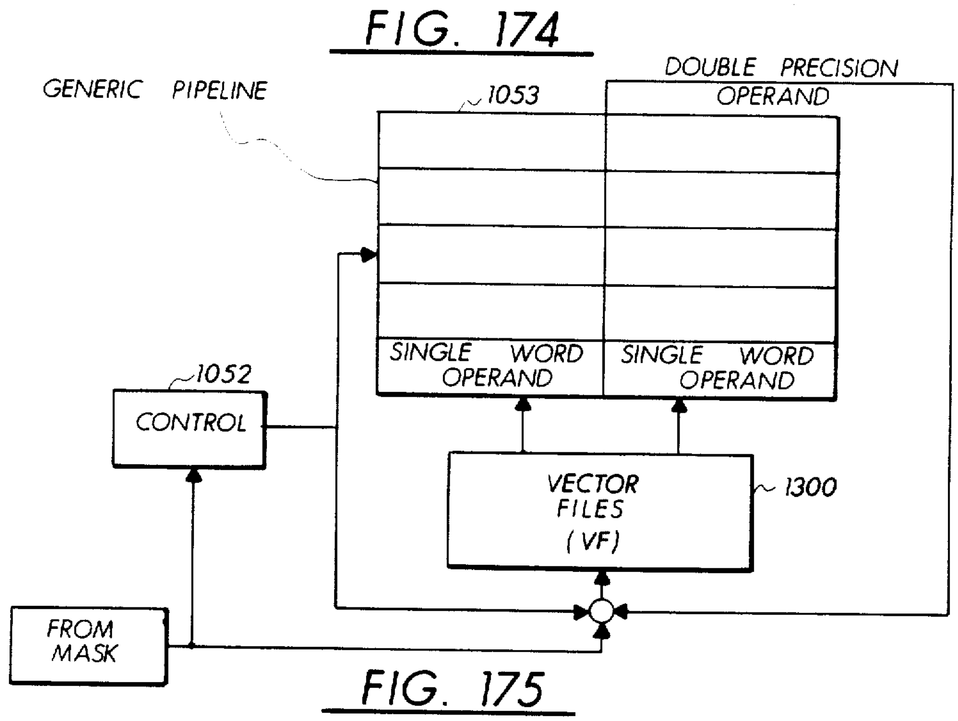
Figure 176:
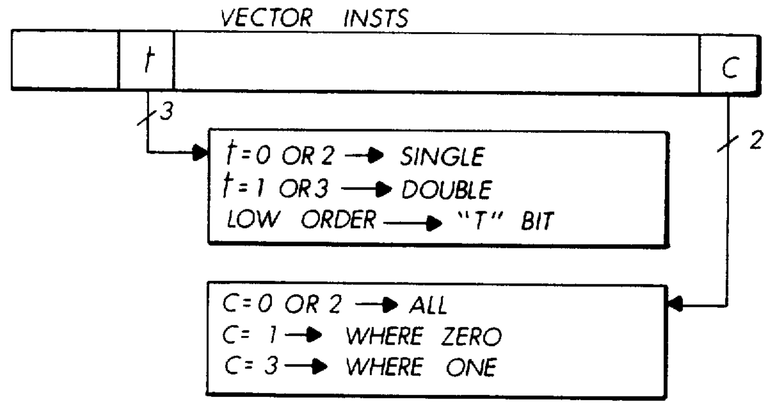
Figure 178:
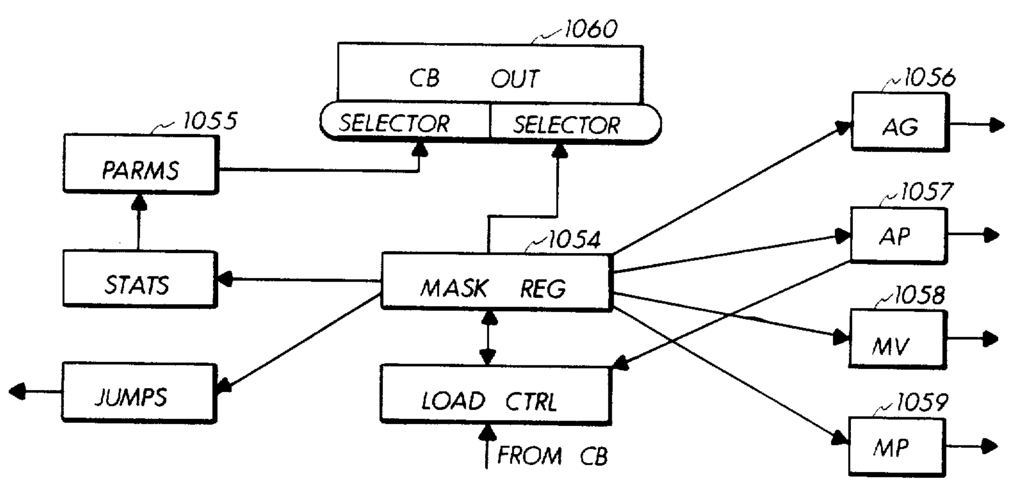
Figure 179:
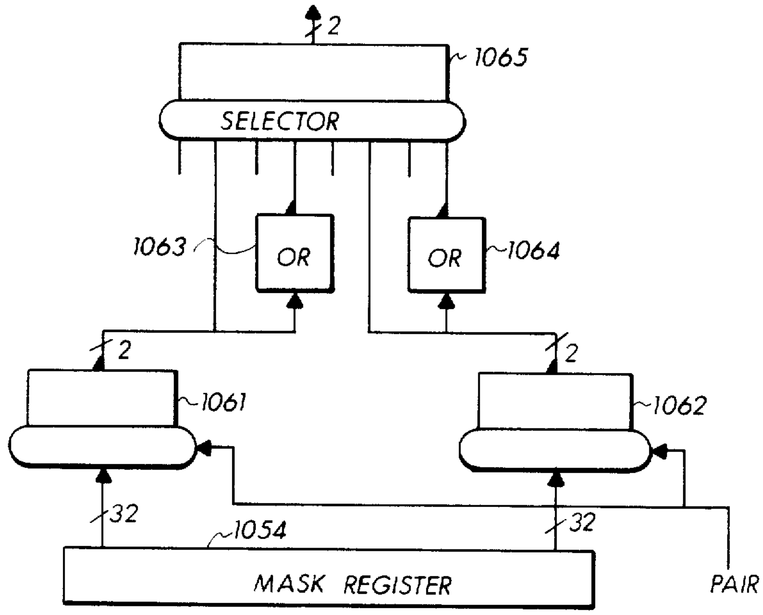
Figure 180:
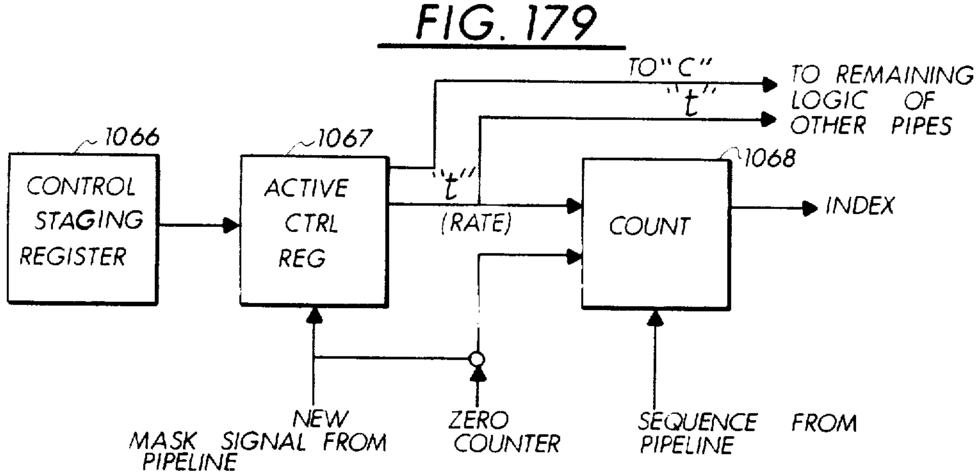
Figure 181:
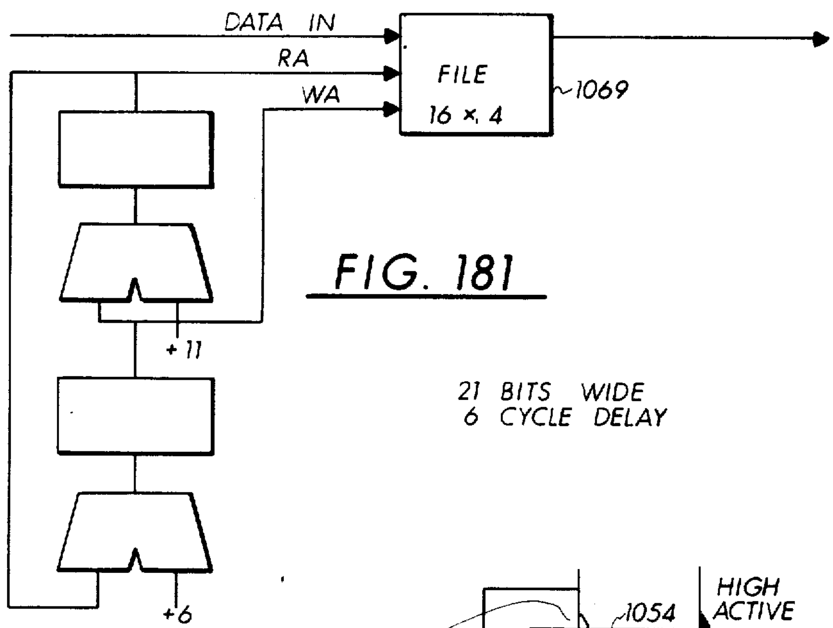
Figure 183:
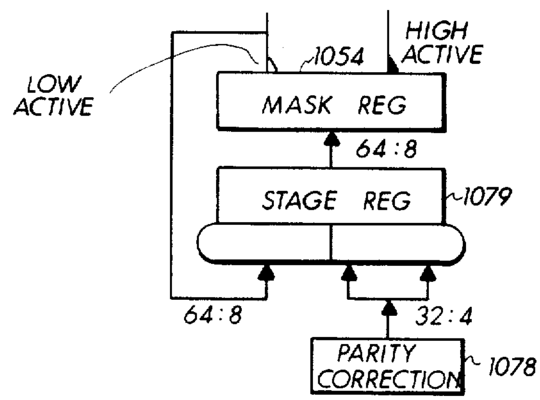
Figure 184:
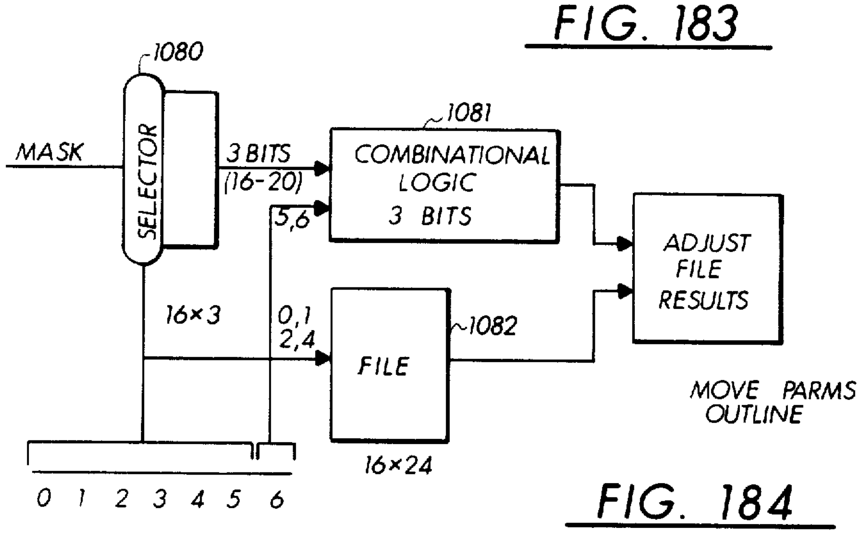
Figure 182:
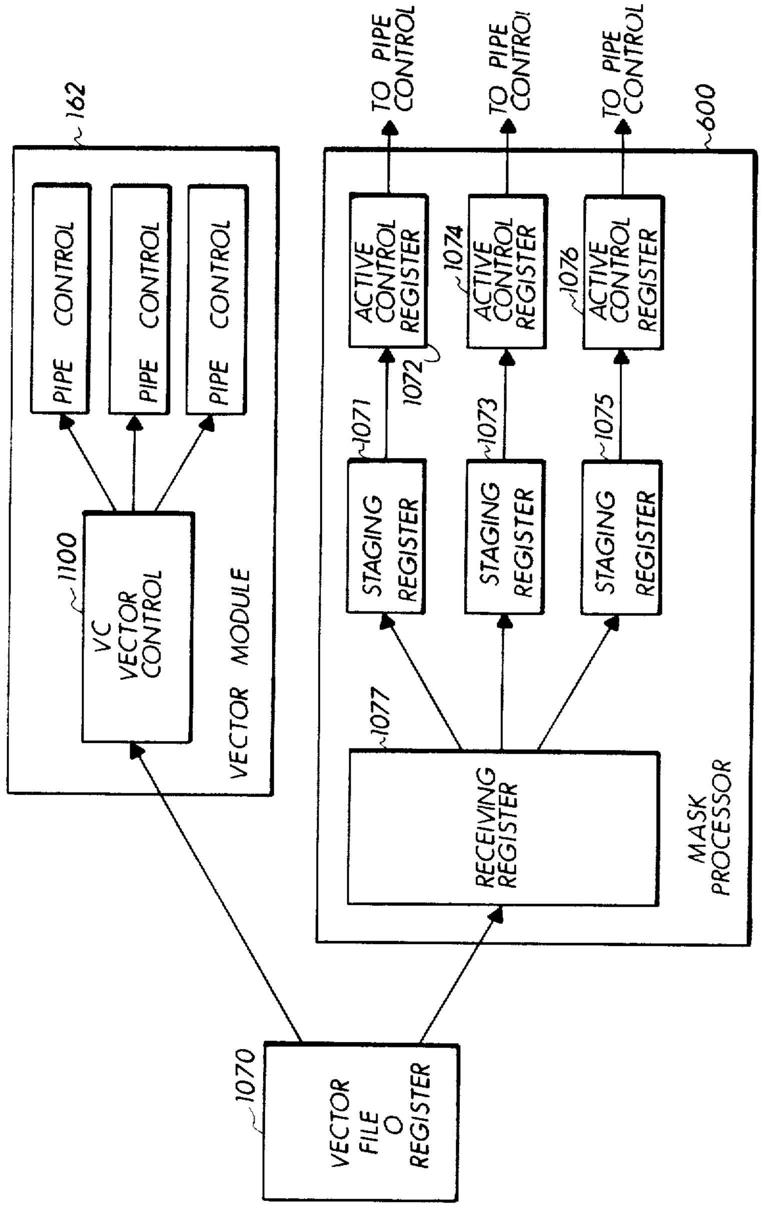
Figures 186, 188:
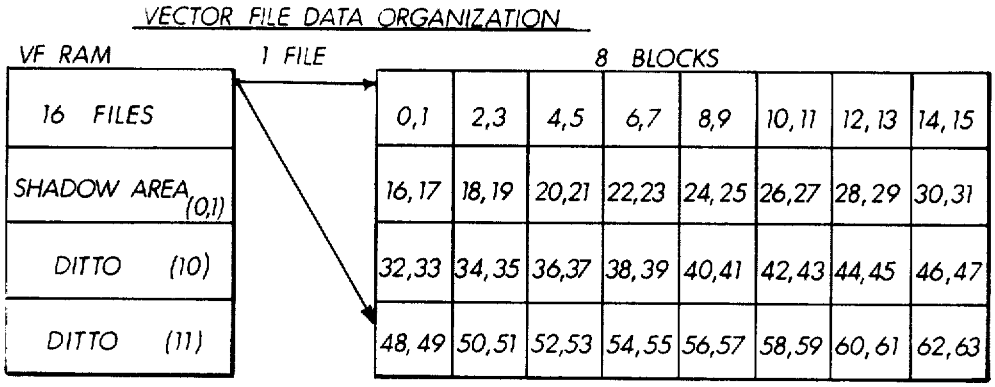
Figure 187:
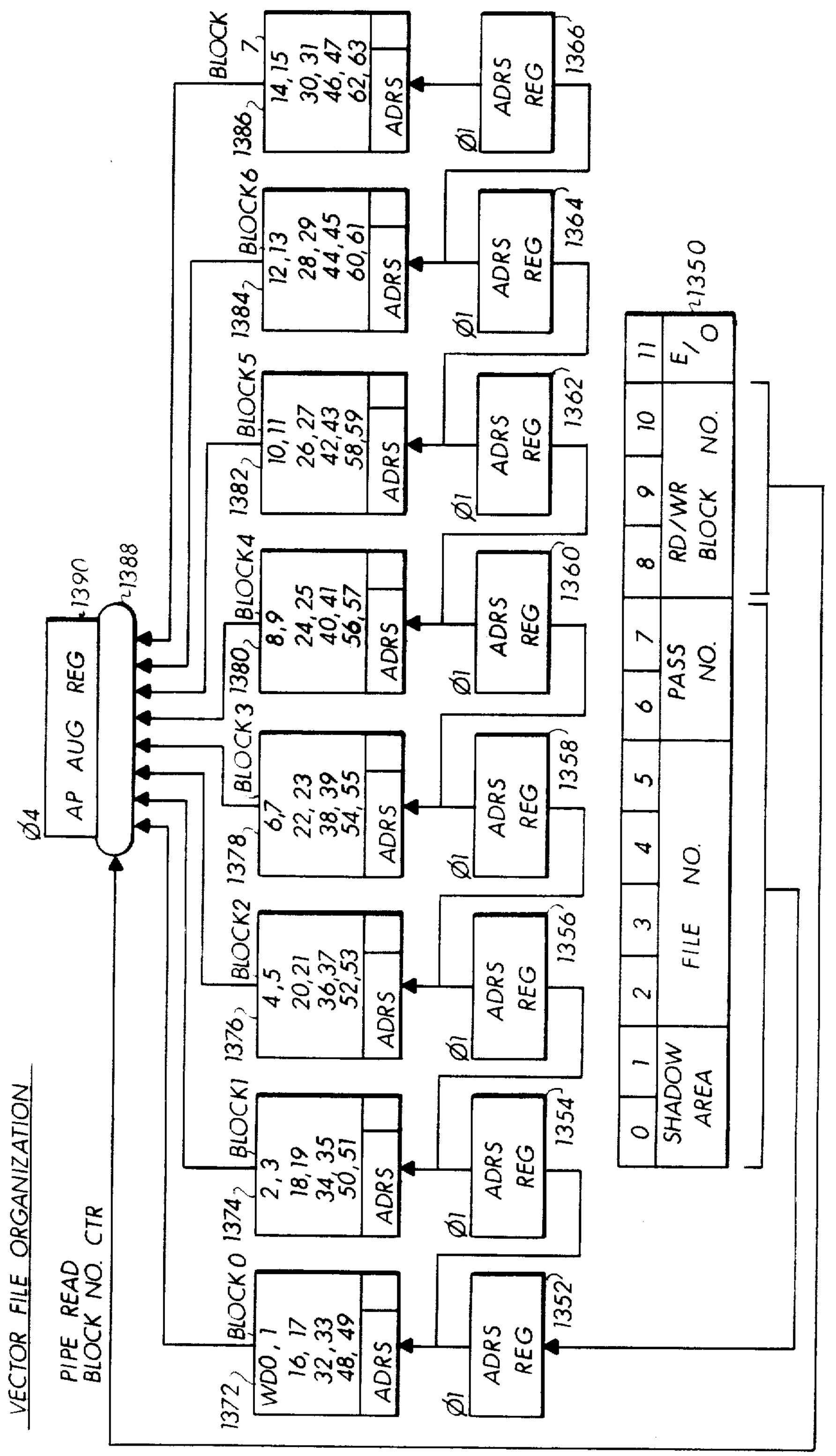
Figure 189:
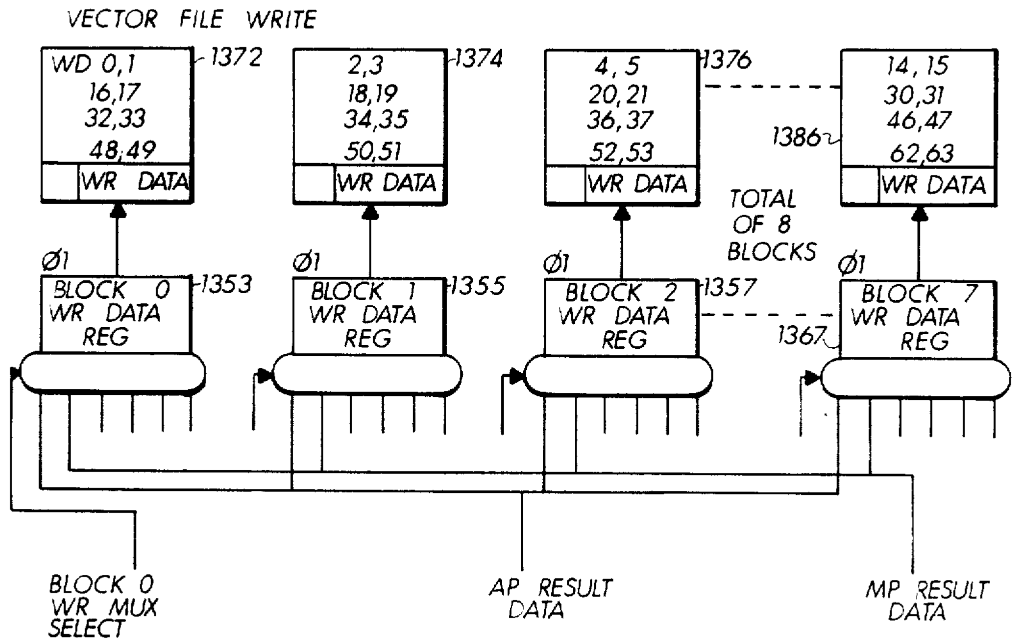
Figure 190:
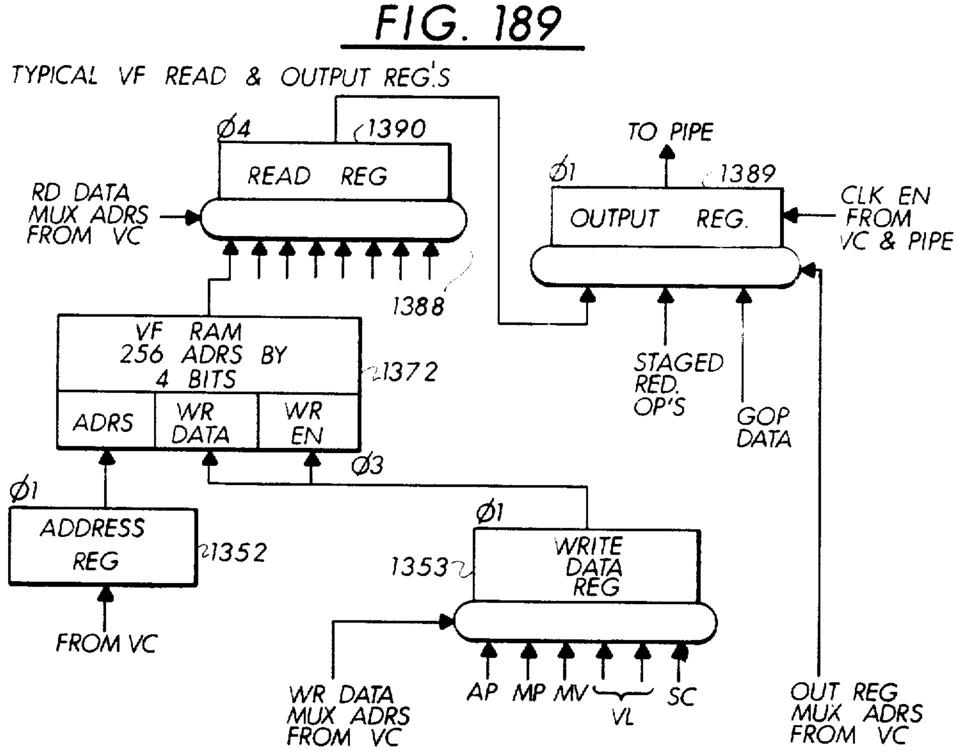
Figures 191, 192:
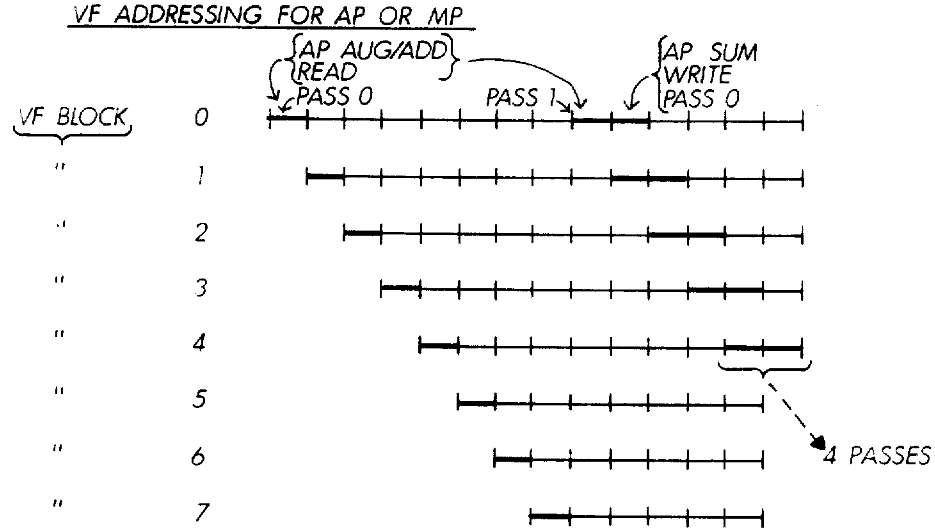
Figures 193, 195:
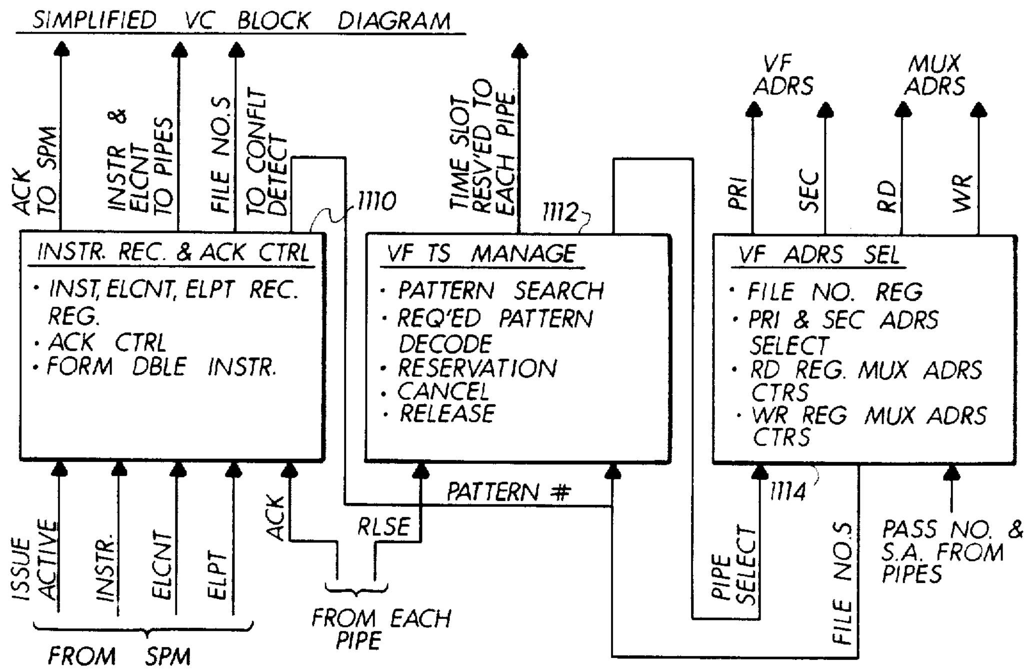
Figure 194A:
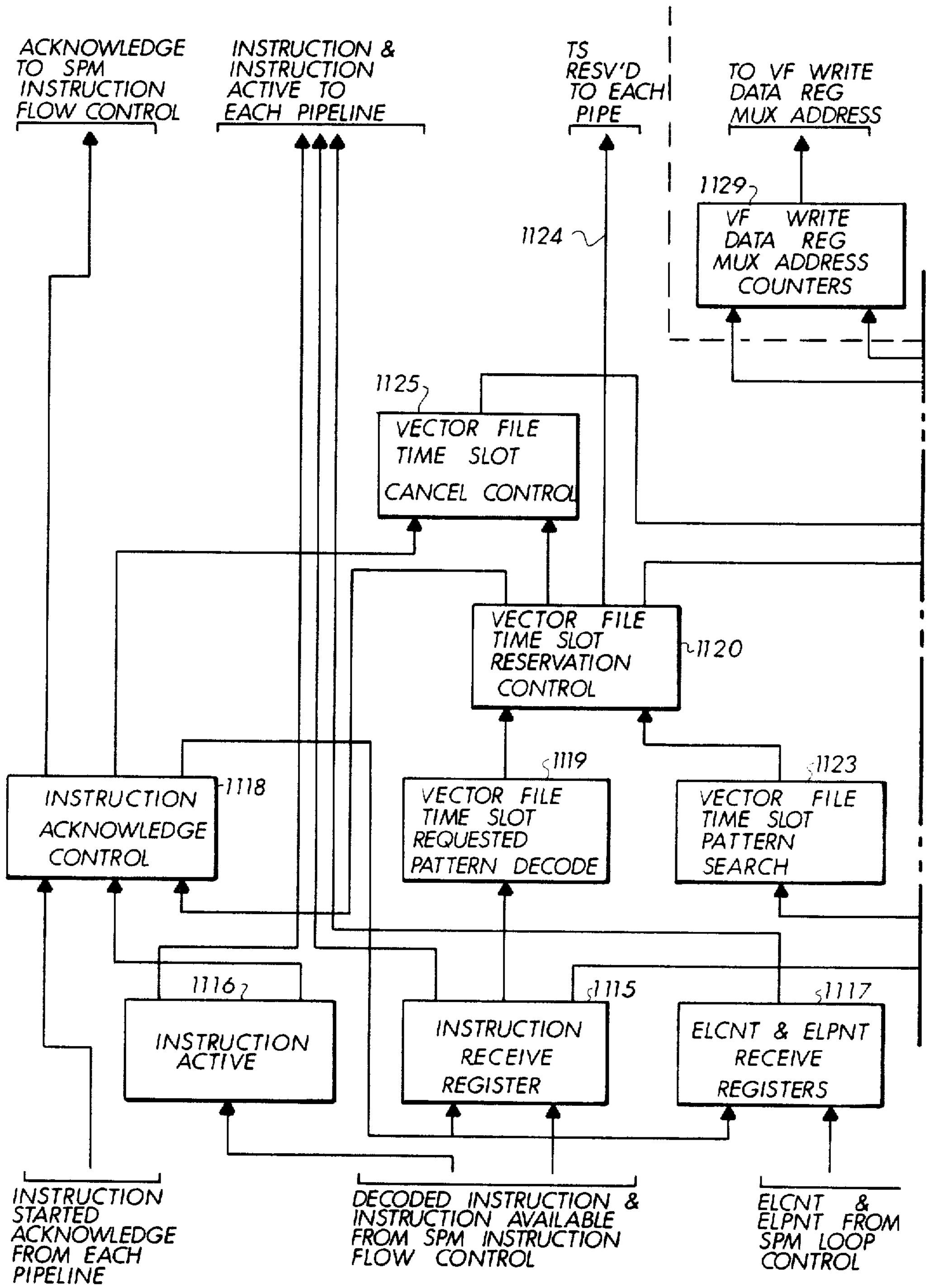
Figure 217:
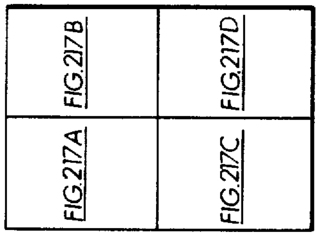
Figure 218:
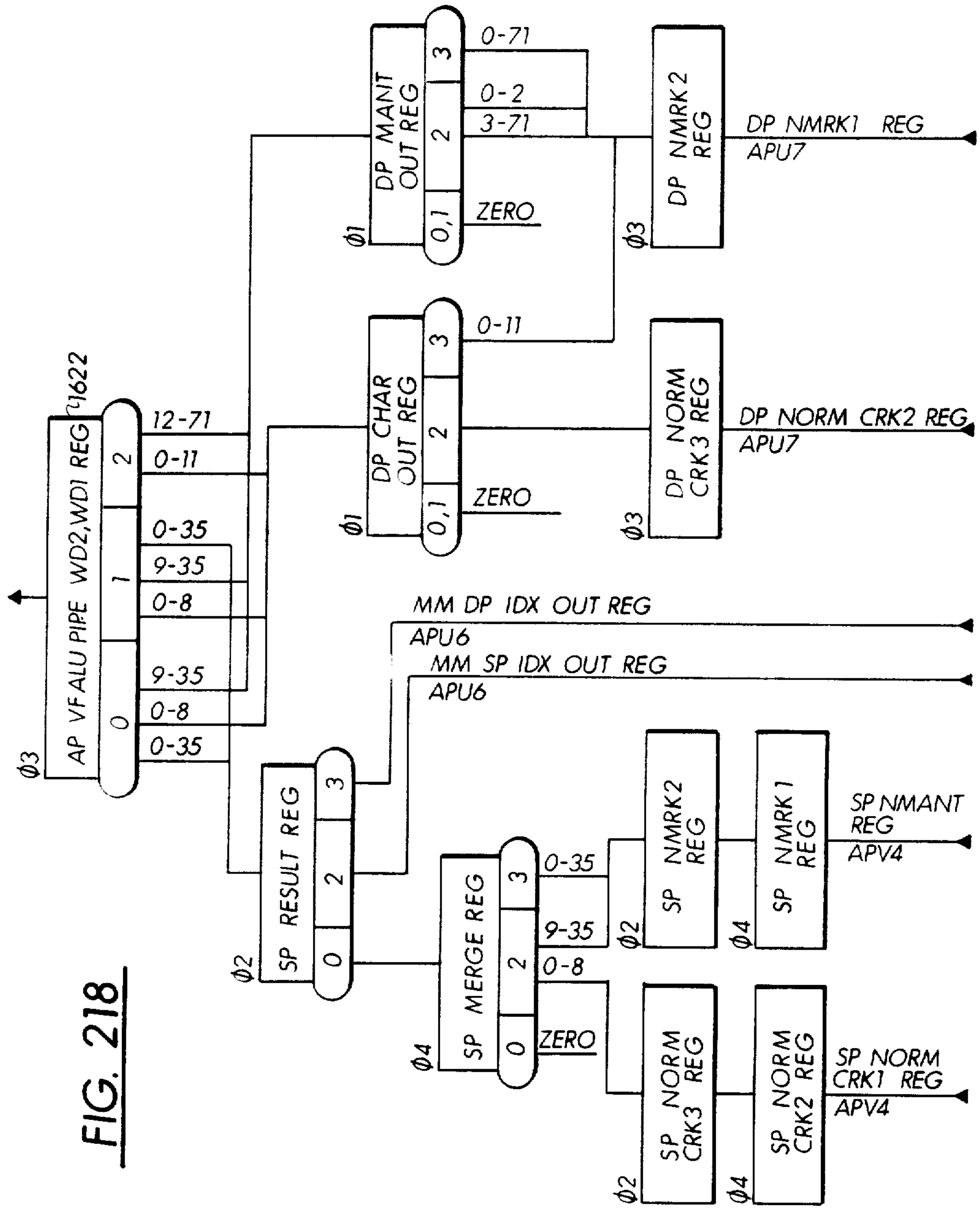
Figures 194, 196:
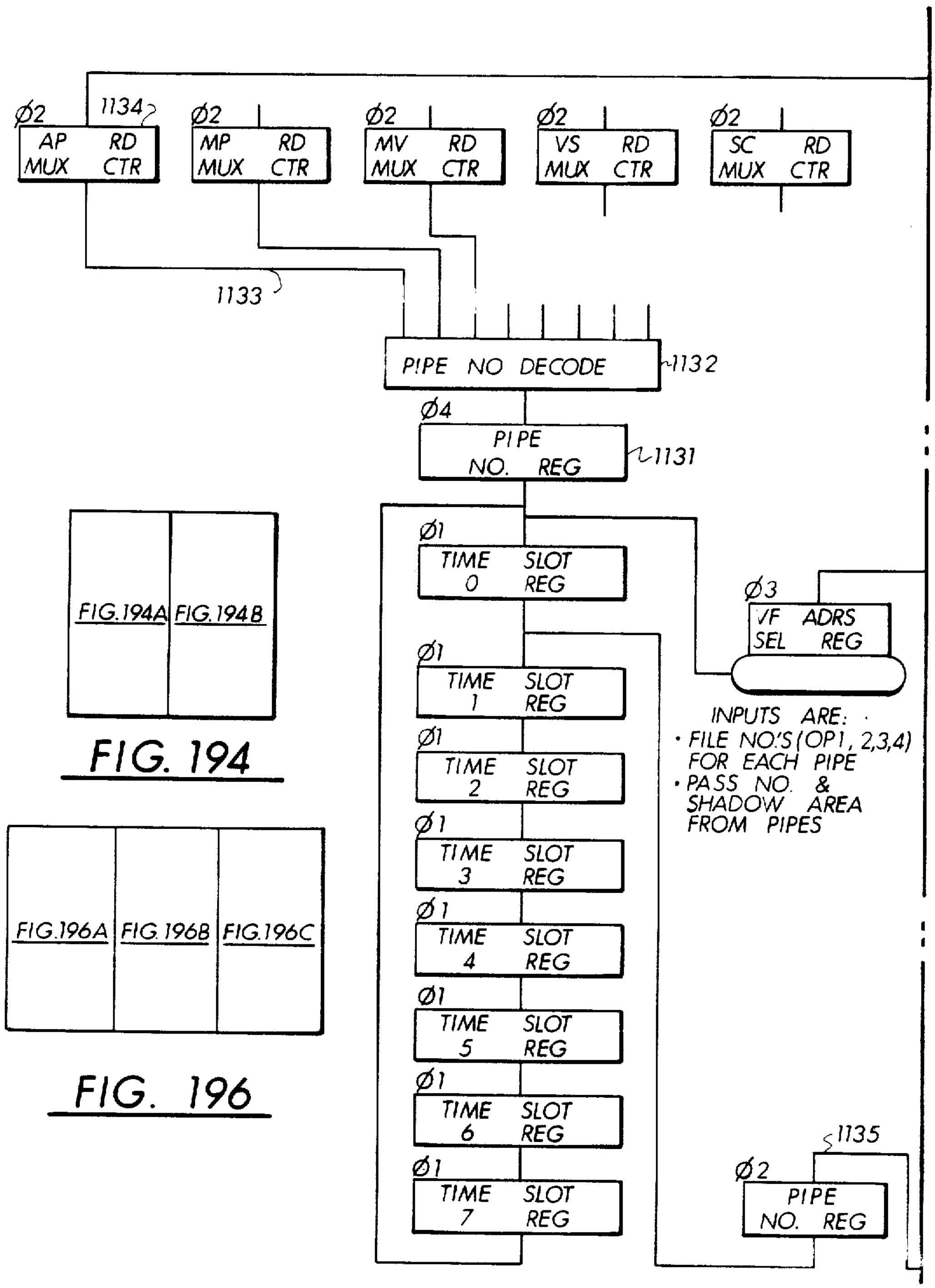
Figure 194B:
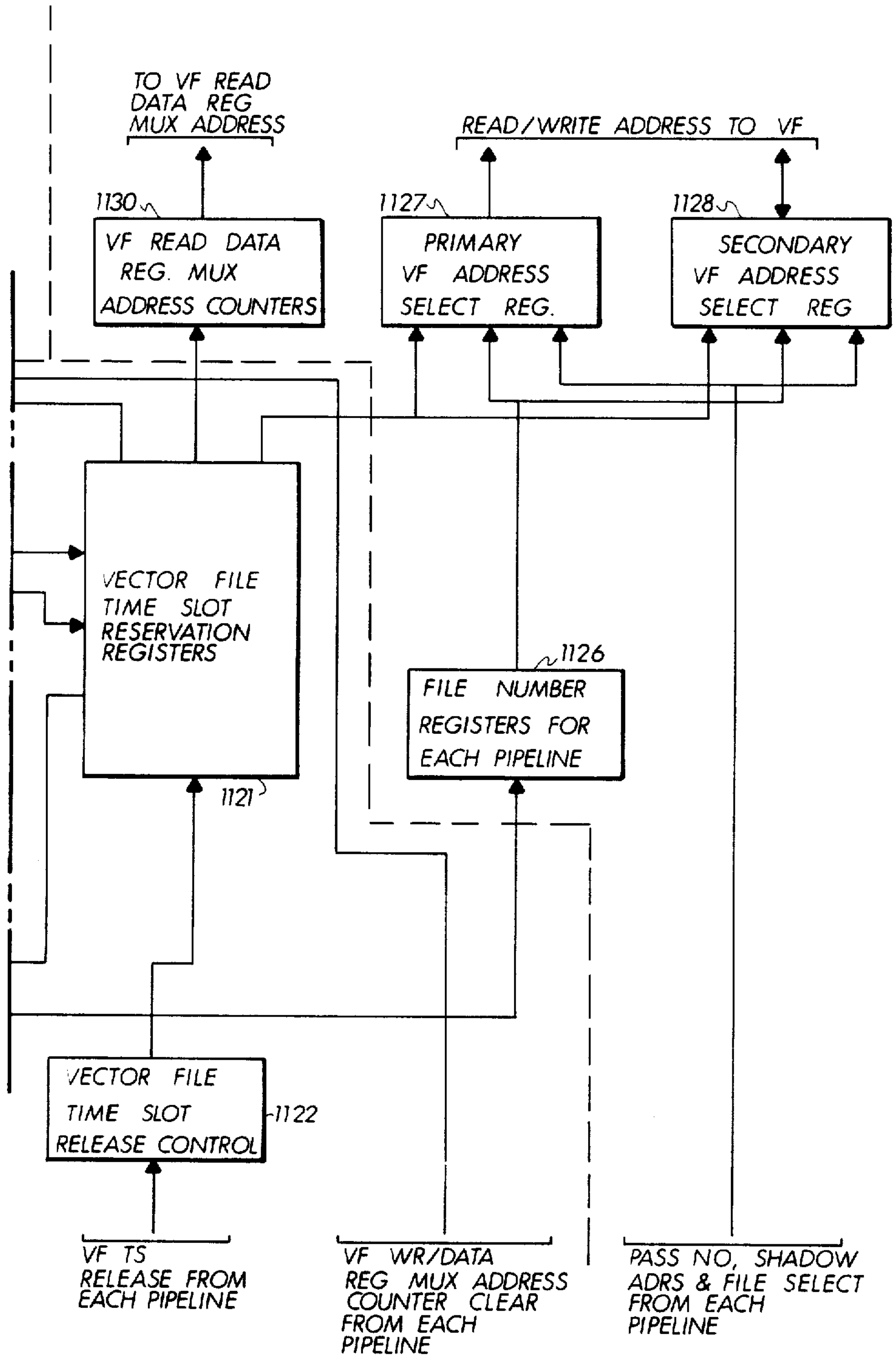
Figure 196B:
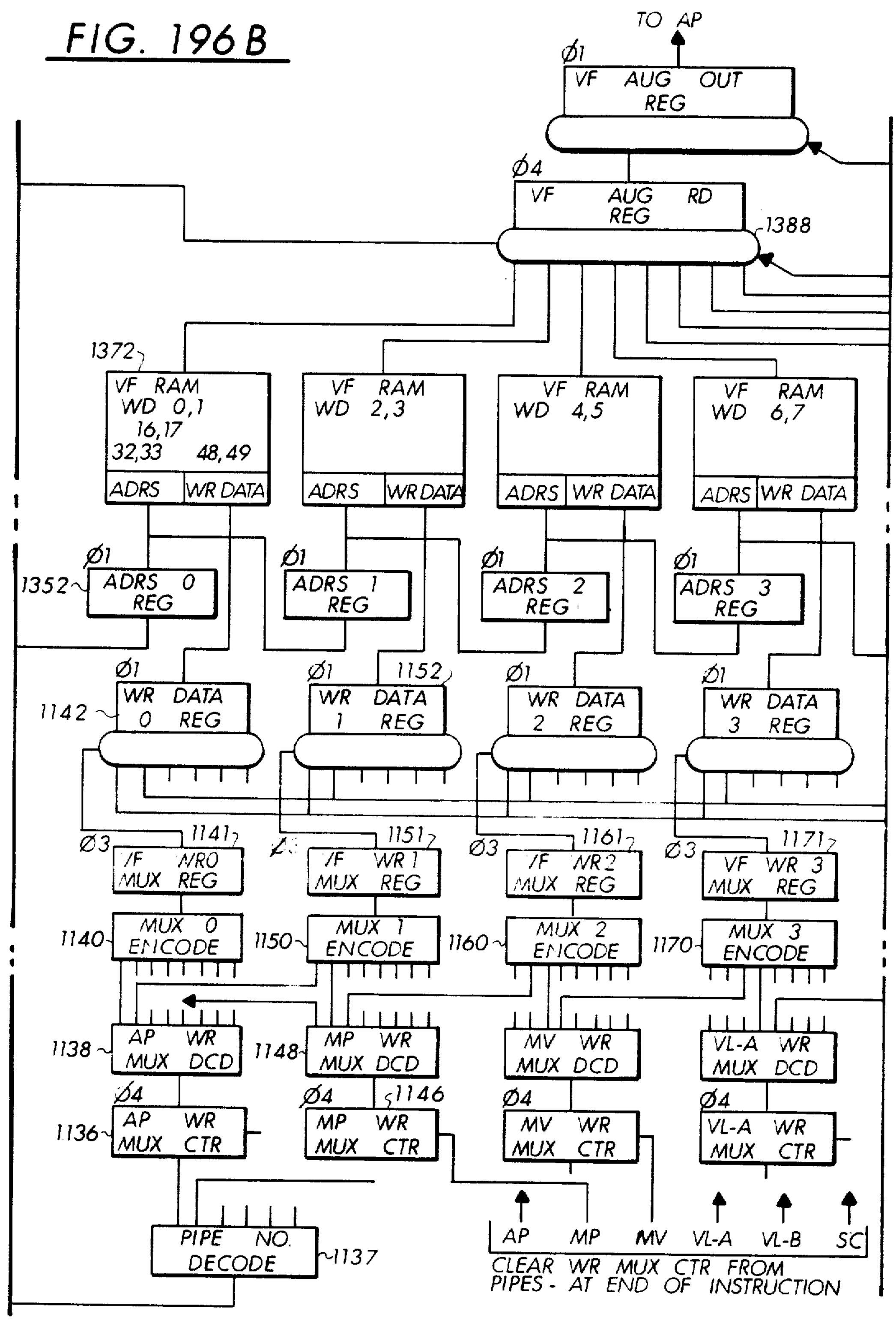
Figure 196:
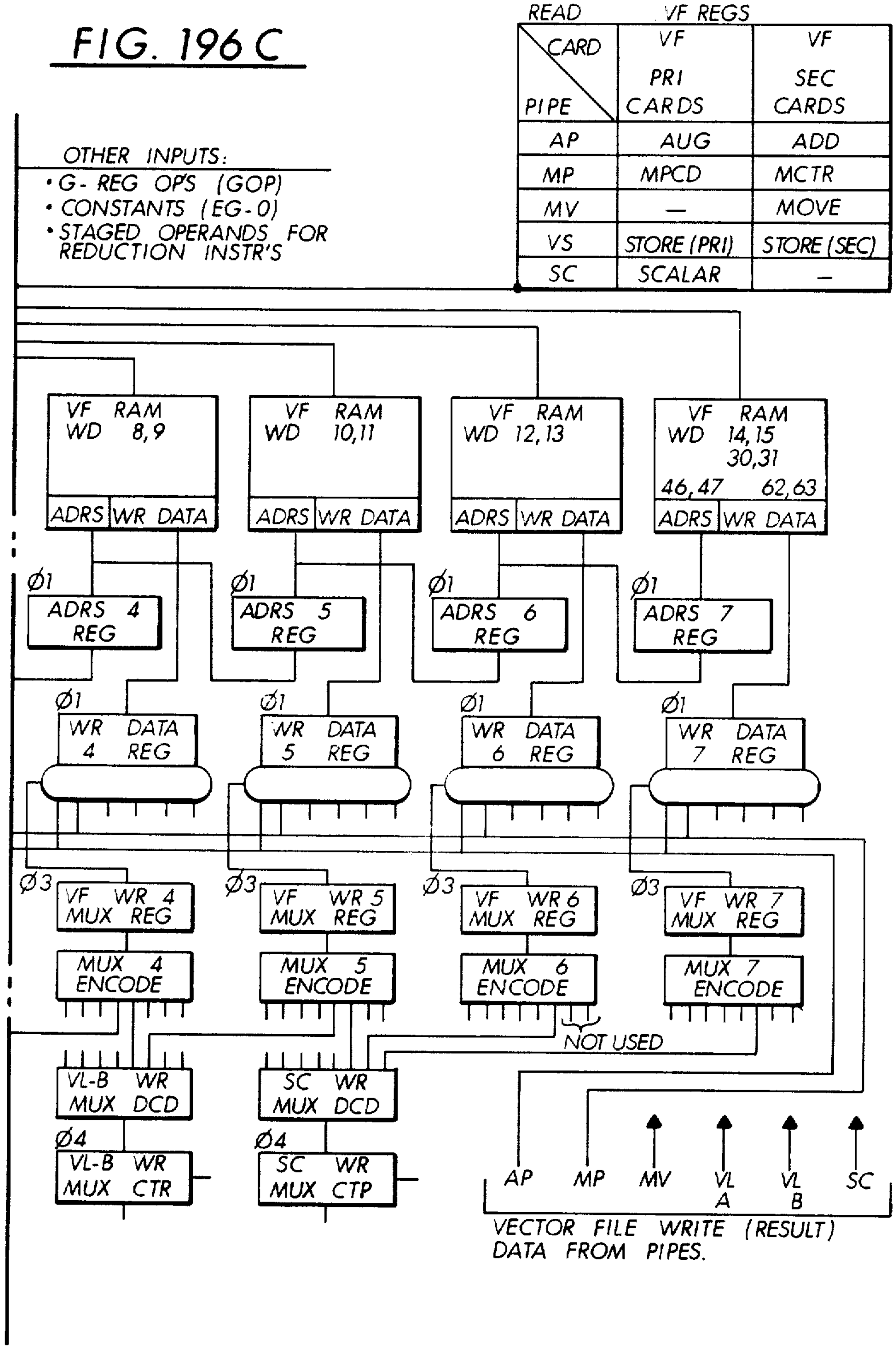
Figure 197:
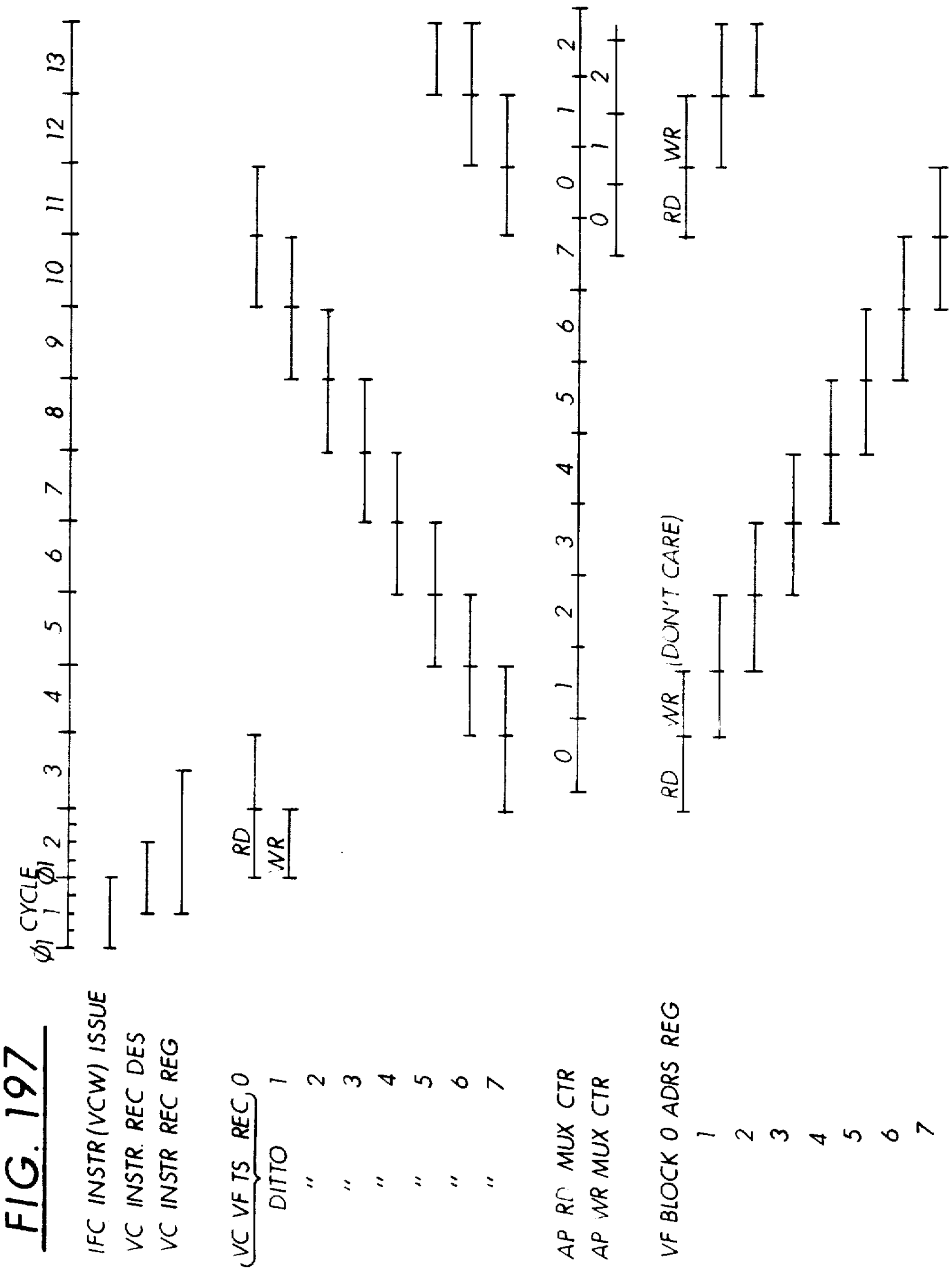
Figure 198:
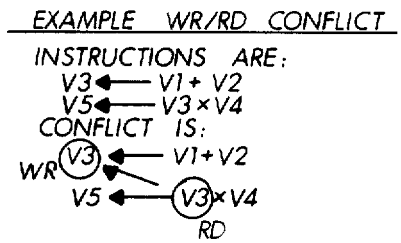
Figure 199:
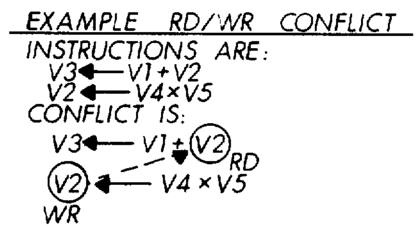
Figure 200:
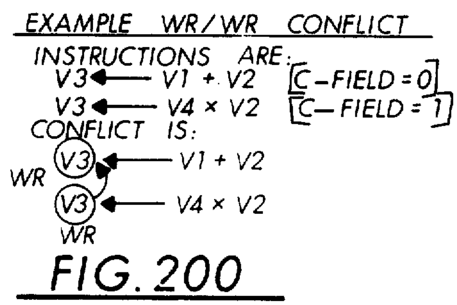
Figure 201:
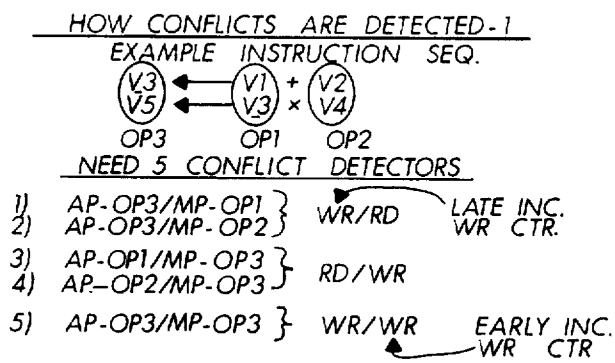
Figure 207B:
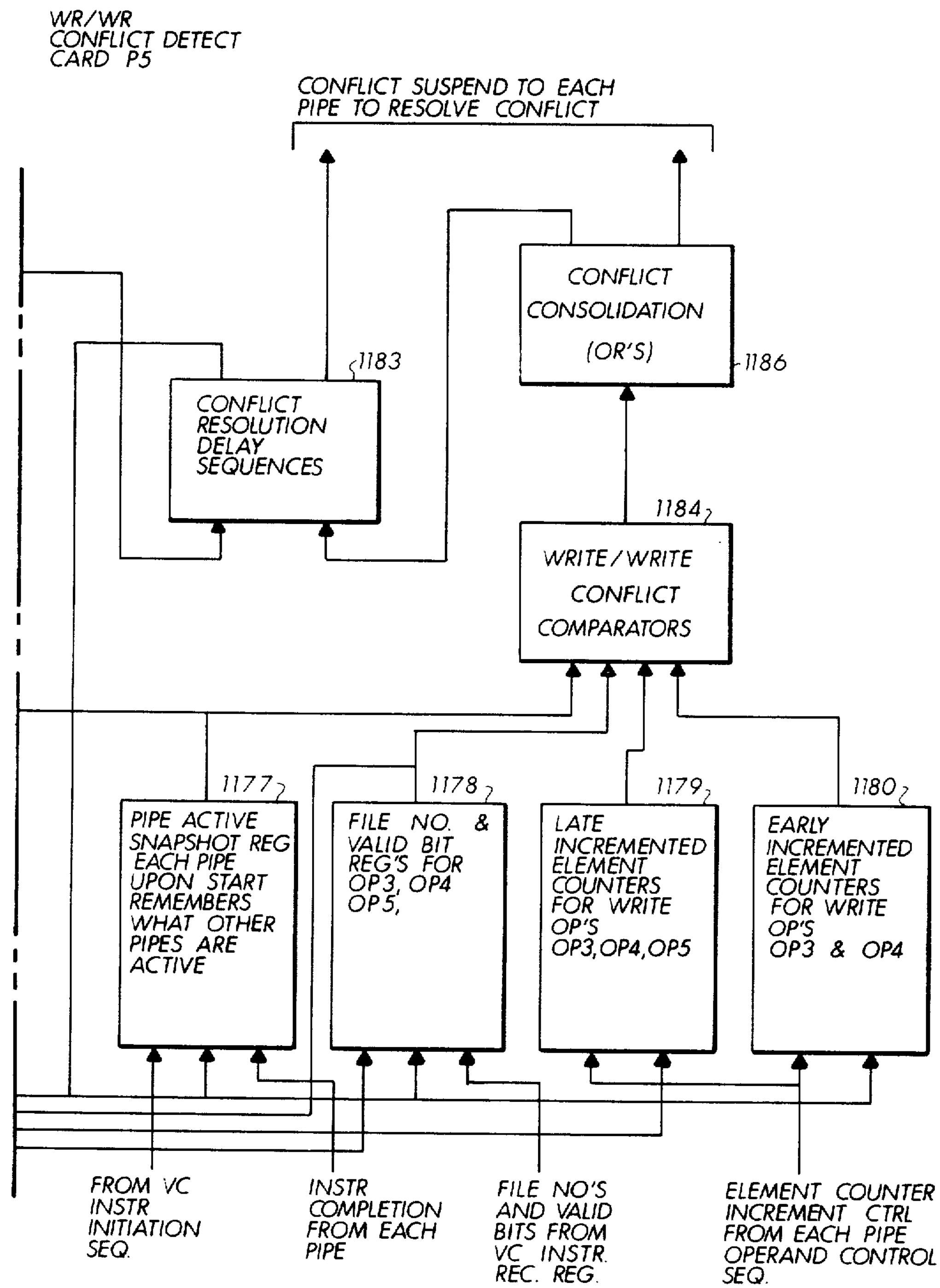
Figure 208:
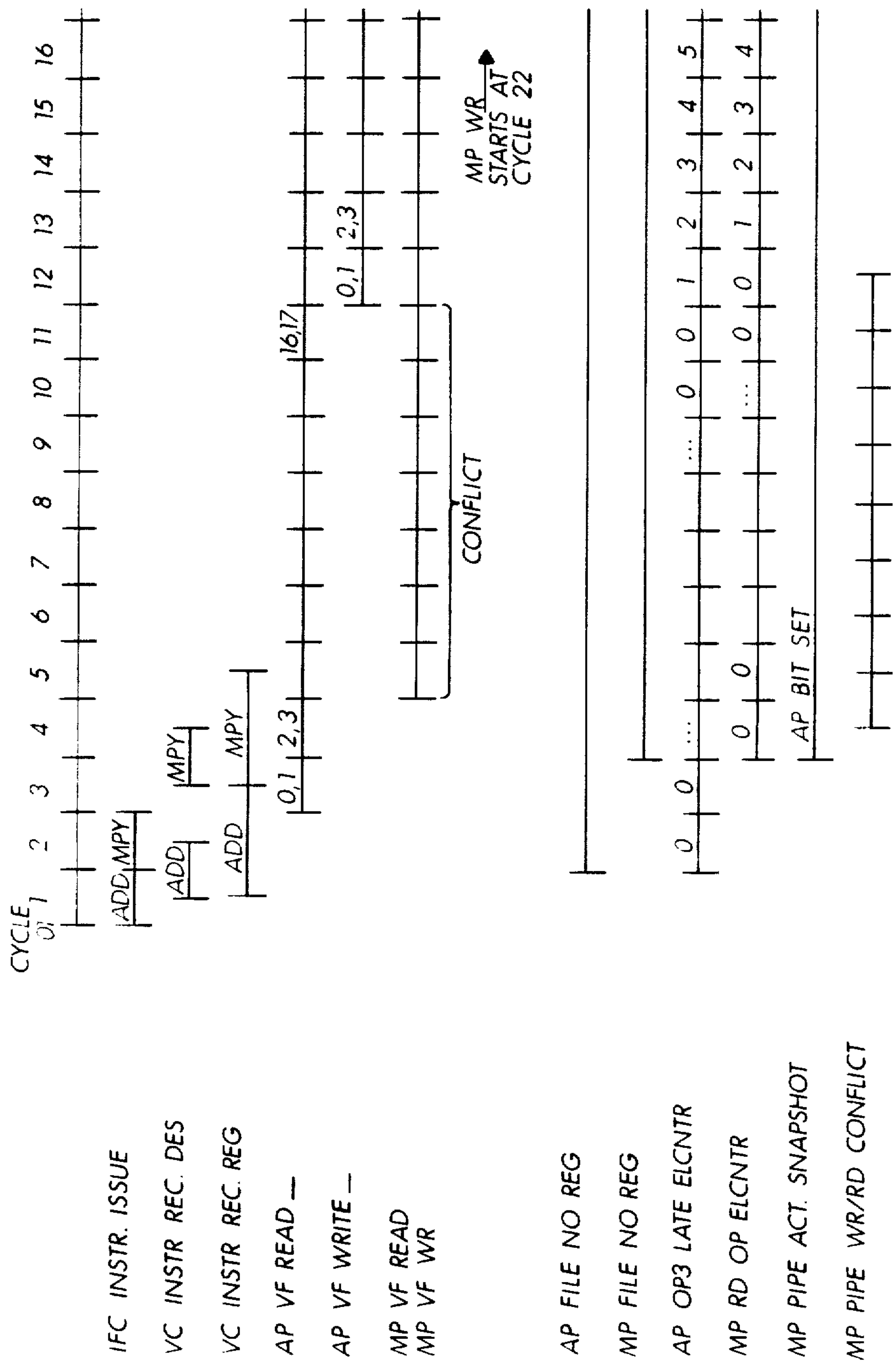
Figure 211:
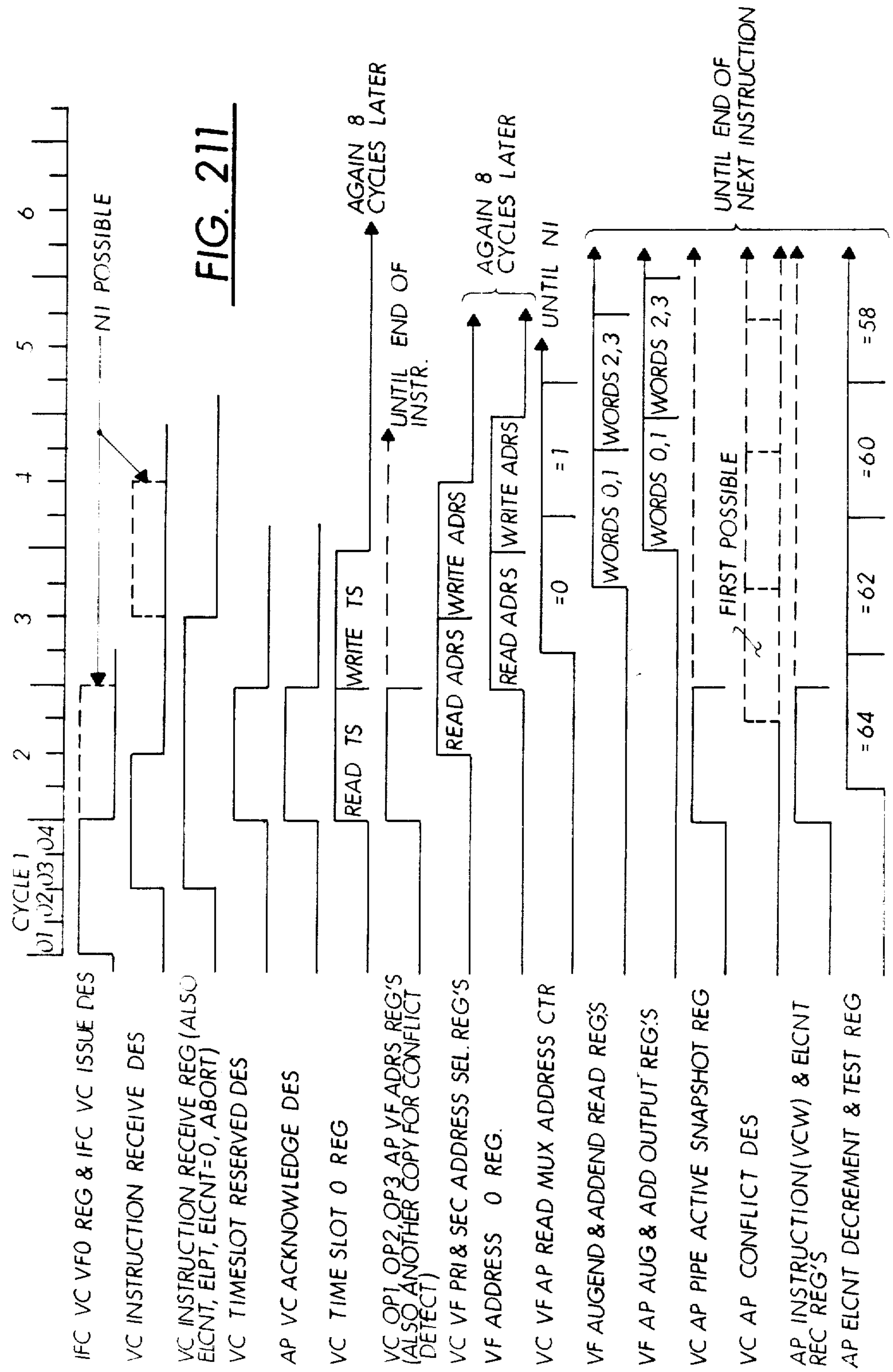
Figure 212:
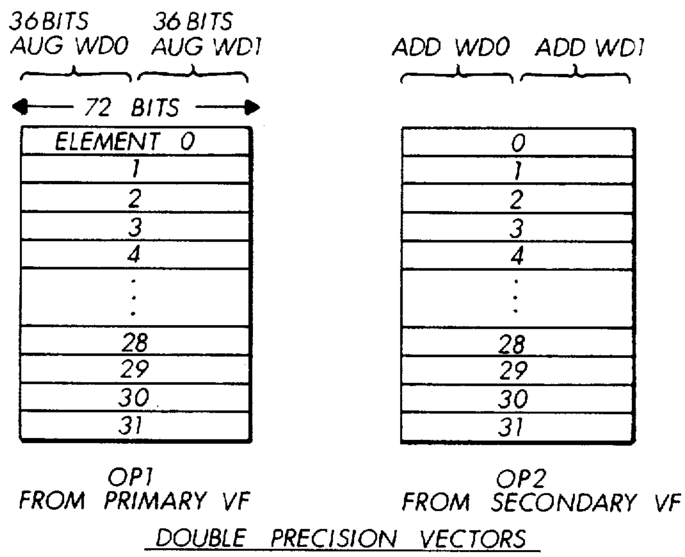
Figure 213:
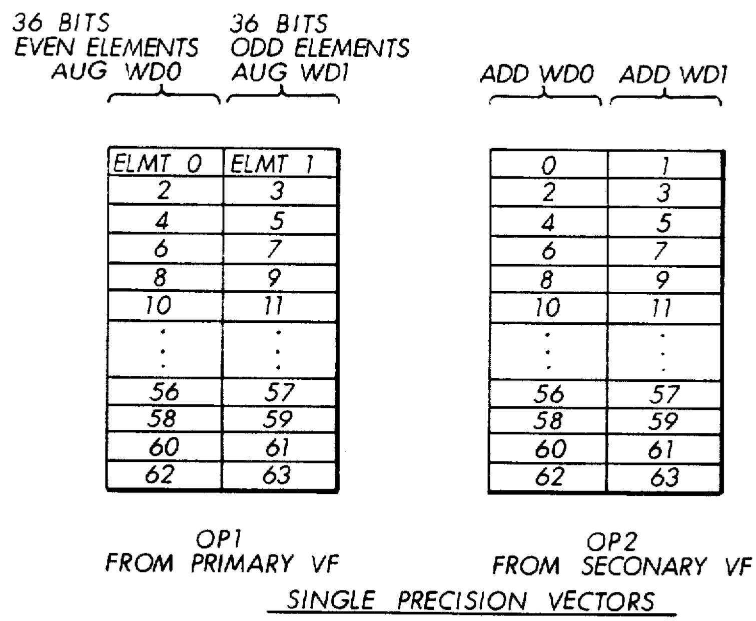
Figure 214:
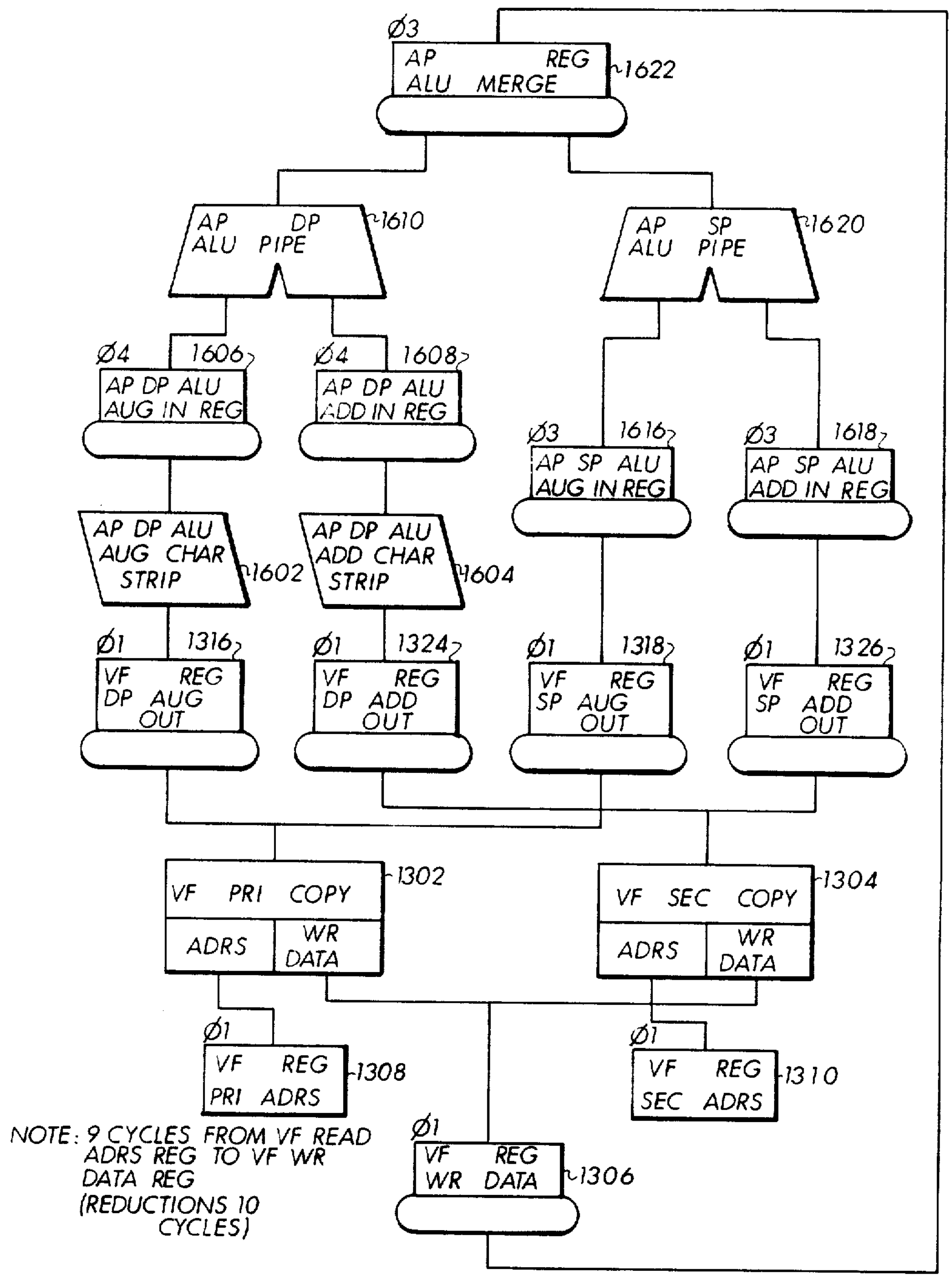
Figure 216B:
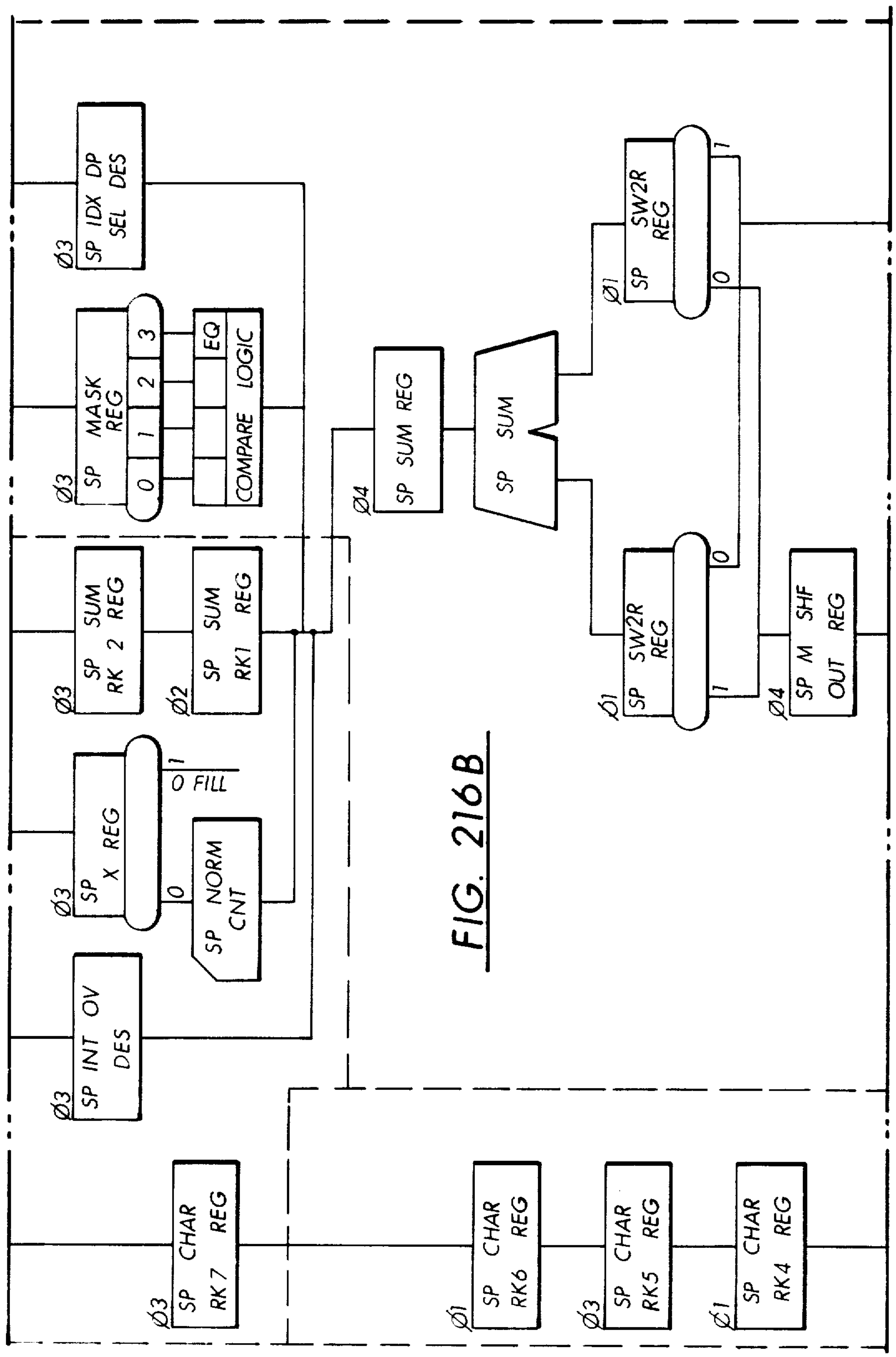
Figure 216C:
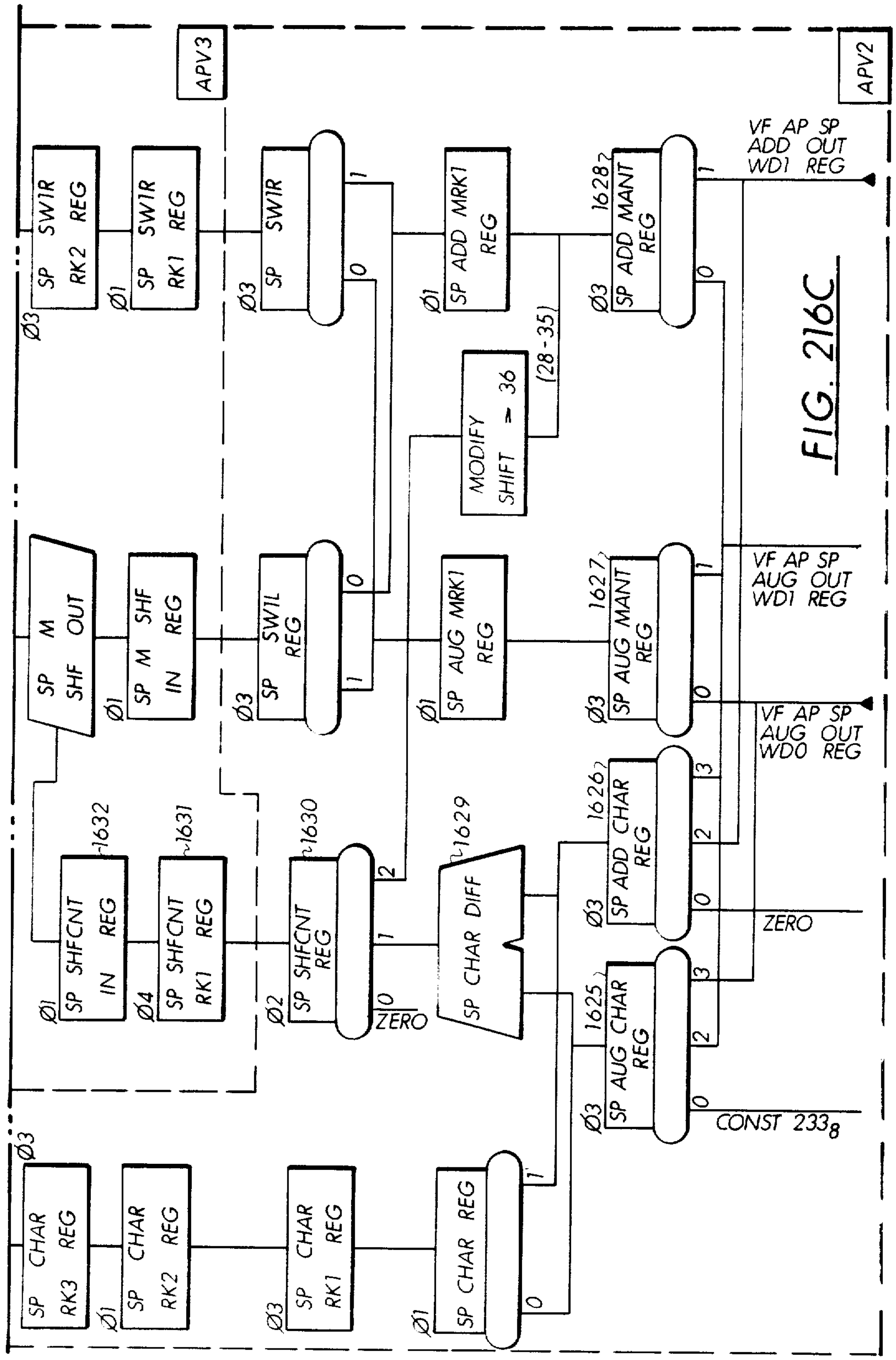
Figure 216:
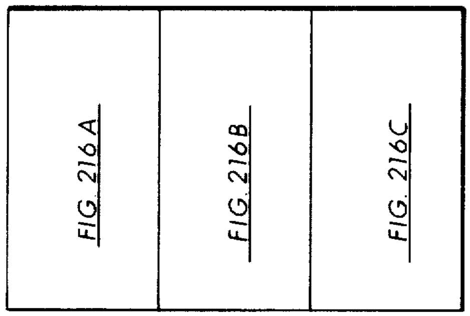
Figure 216A:
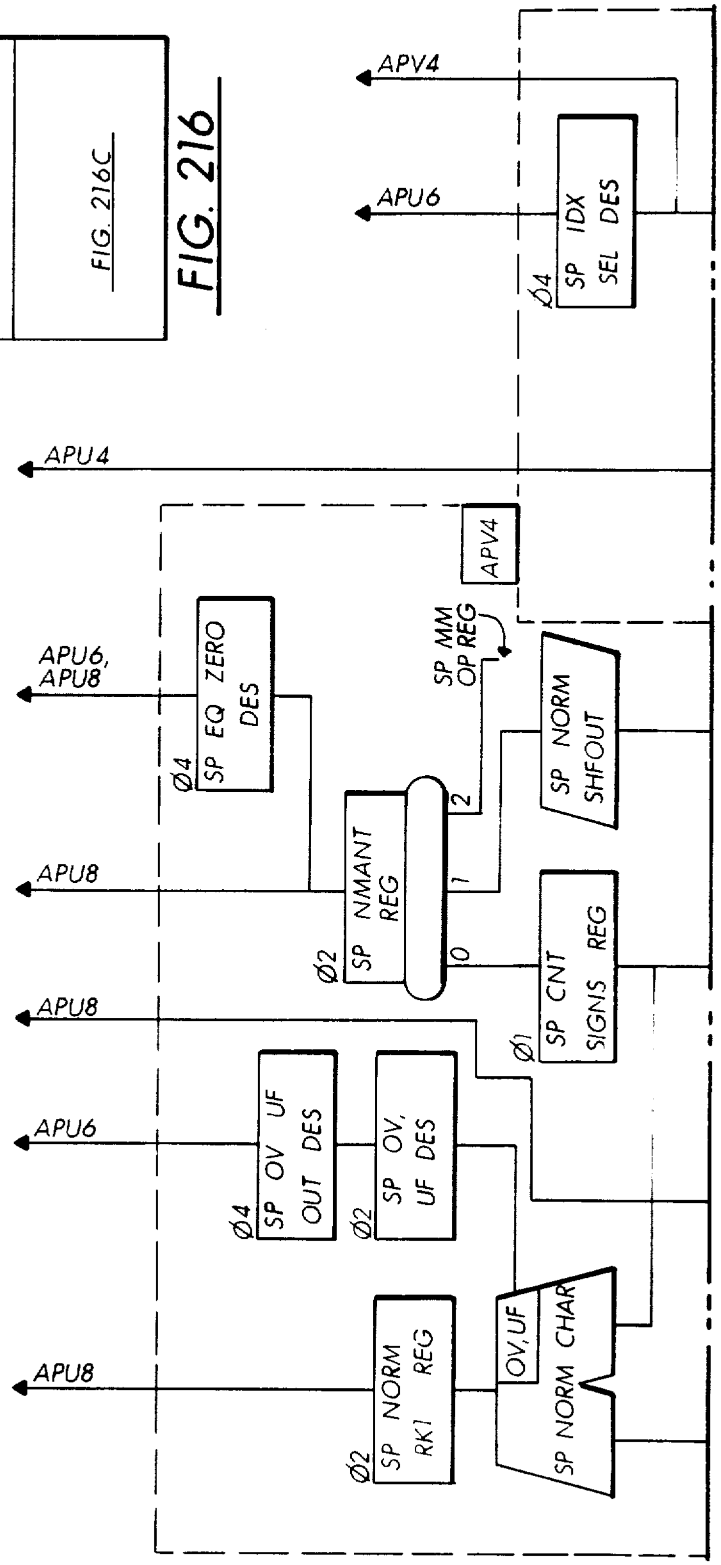
Figure 217C:
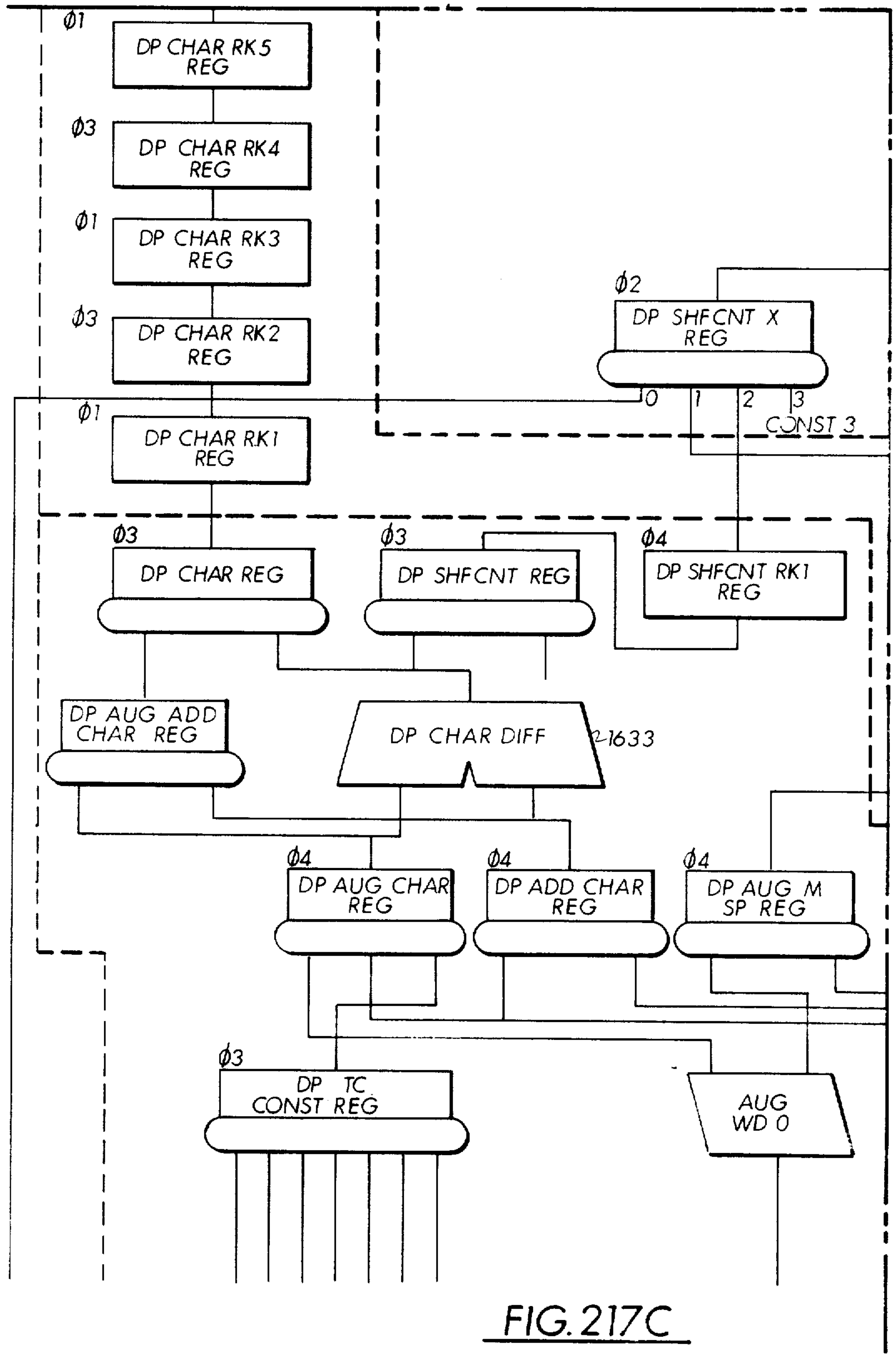
Figure 217:
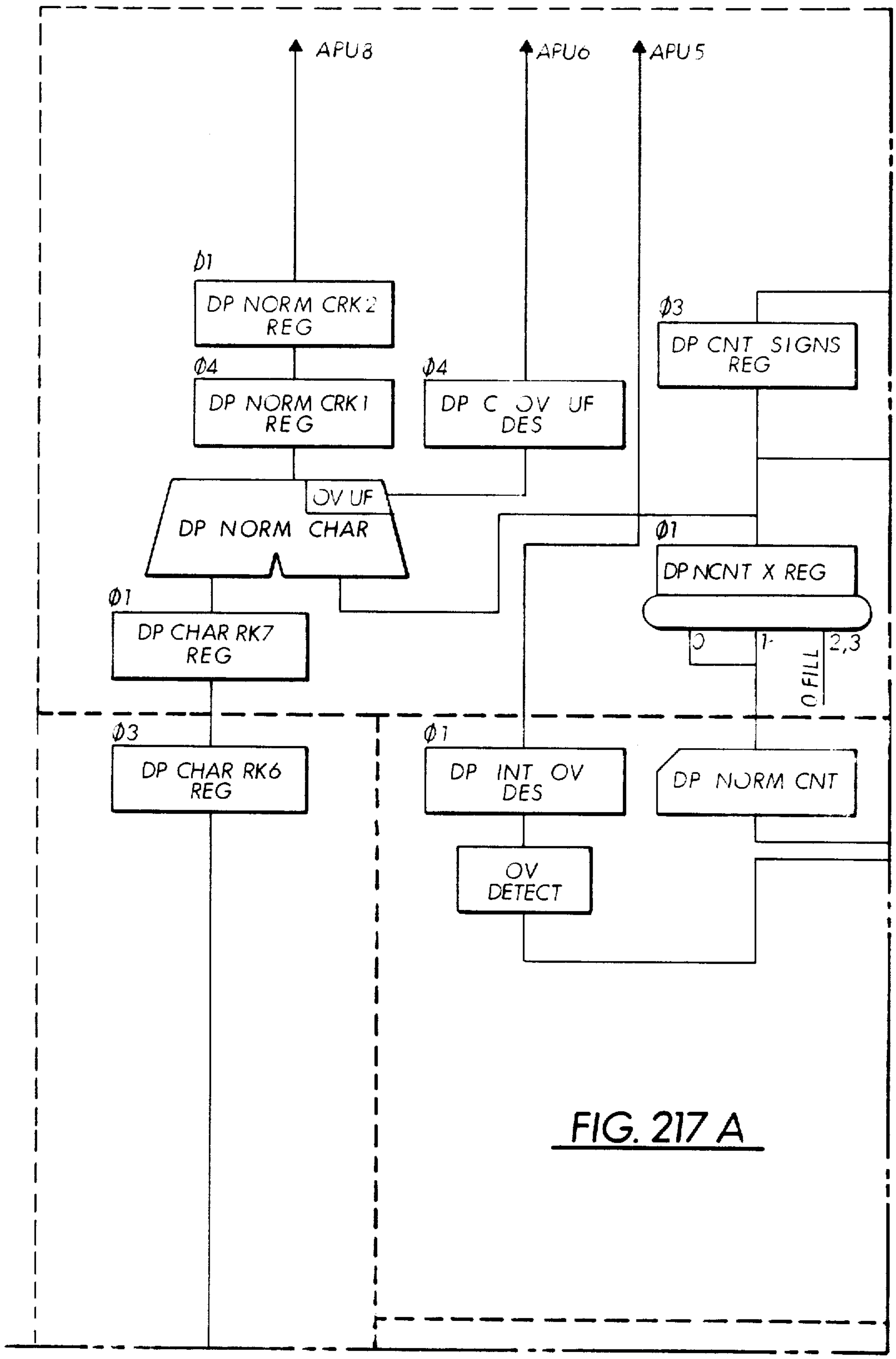
Figure 217:
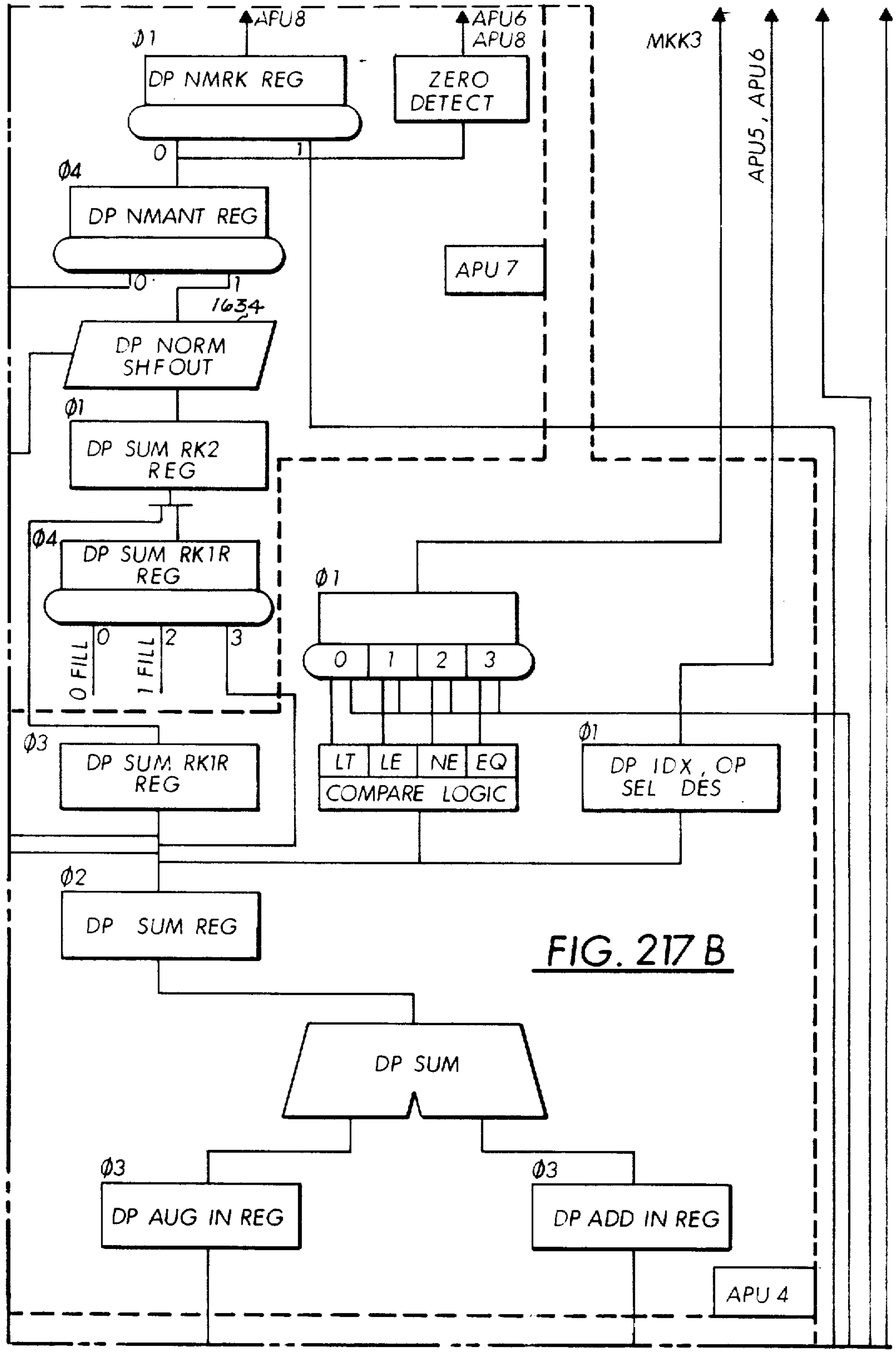
Figure 217D:
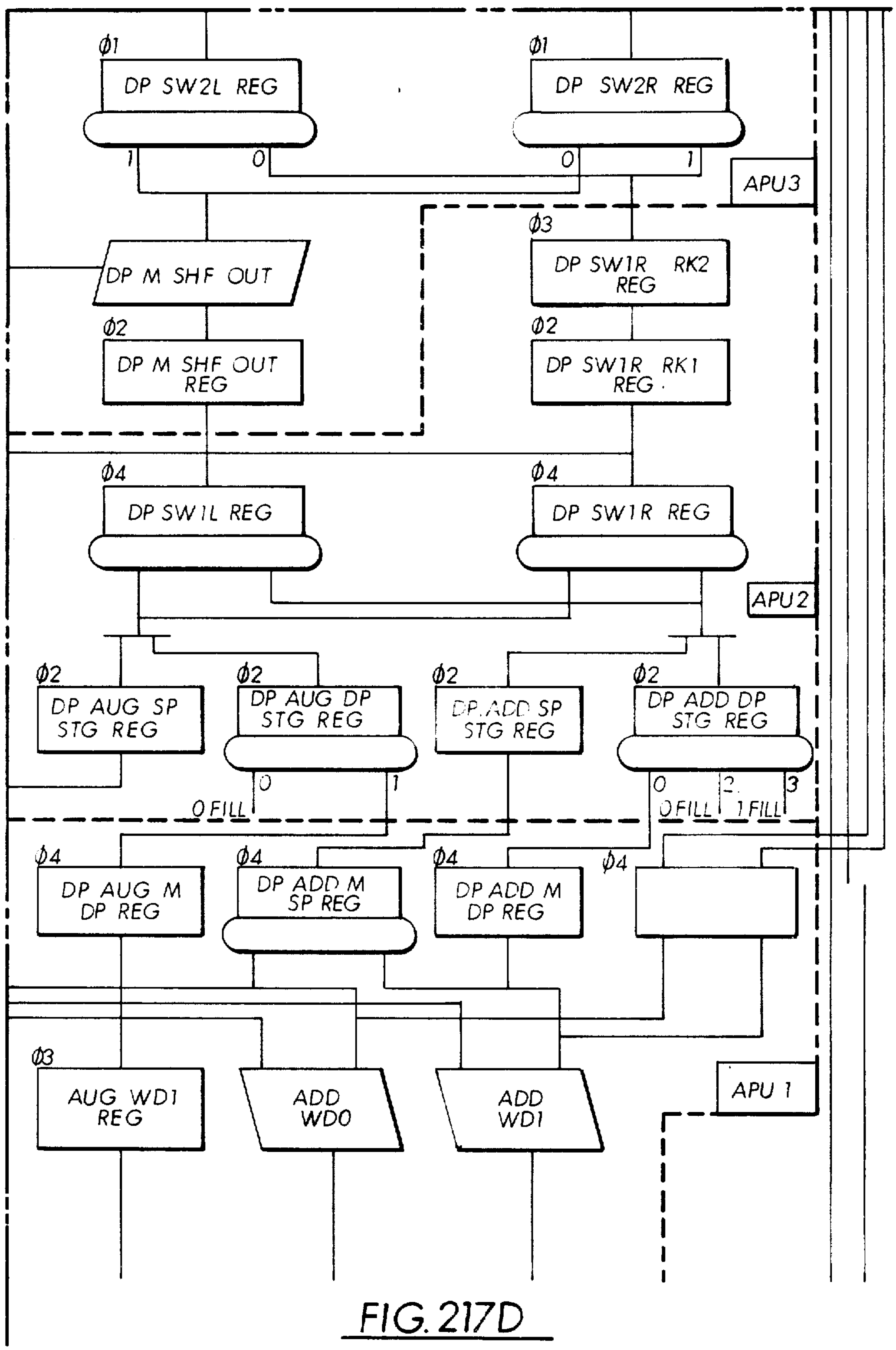
Figure 219:
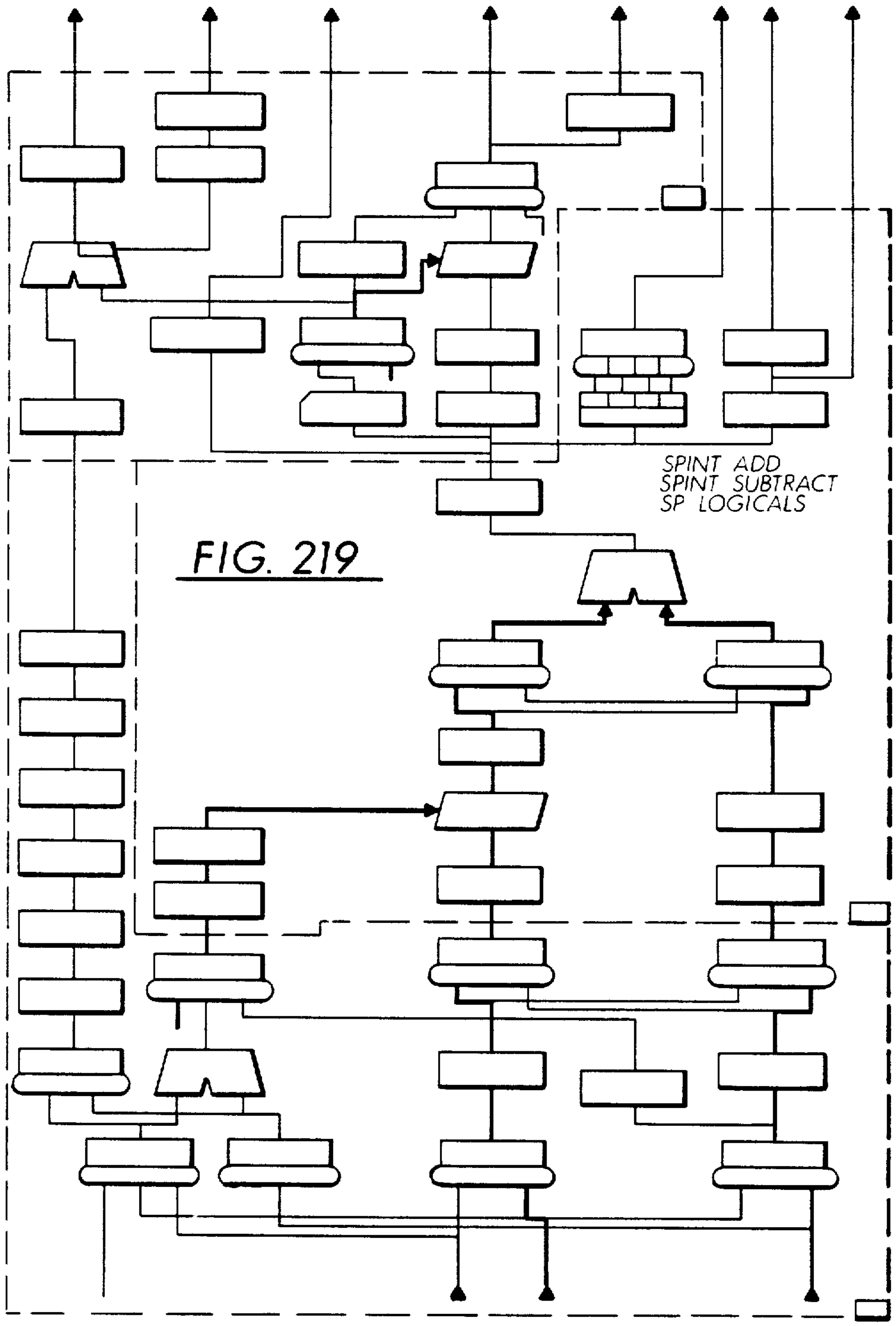

FIG. 130A and. FIG. 130B, when arranged as in FIG. 130, is a logical block diagram of the circuitry needed to accomplish the transfer of the macrocode used for duplication of the Address Generation control signals and of the loading of this macrocode into the Instruction Flow Buffer (IFB);

FIG. 131 is a pictorial block diagram illustrating the procedure by which an activity is set up in the Scientific Processor by the Host Processor;

FIG. 132 is a simplified block diagram of the control system used in the Control Block (CB);

FIG. 133 is a pictorial block diagram of the relationship between the High Performance Storage Unit (HPSU) and the Local Store Memory (LS) showing how the LS is loaded from the HPSU;

FIG. 134 is a more detailed logical block diagram of the Local Store (LS) used in the Scalar Processor Module;

FIG. 135 is a simplified block diagram showing how the 4096 words of the Local Store memory are divided into four blocks to provide a four word output;

FIG. 136 illustrates a word format of a scalar instruction using an RS format, which format is used to access the Local Store (LS);

FIG. 137 is a simplified logical block diagram pictorially illustrating the interface of the Scalar Processor (SPALU) and the Store Buffer (ST) with words zero and one;

FIG. 138 is a logical block diagram of a sample gate array used as the output data register to the Scalar Processor (SPALU) and the Store Buffer (ST);

FIG. 139 is a simplified logical block diagram pictorially illustrating the interface to the Store Buffer (ST) with words two and three;

FIG. 140 is a simplified logical block diagram illustrating the interface lines between the Local Store (LS) and the Vector Processor Module of the Scientific Vector Processor using the Local Store, Vector Load output data register;

FIG. 141 is another simplified block diagram showing the interface connections for input data to the Local Store (LS) memory;

FIG. 142 is a logical block diagram showing the logic circuitry used to generate the Local Store write pulses;

FIG. 143 is a more detailed logical block diagram of the circuitry of the input buffer shown generally in FIG. 134;

FIG. 144 is a basic logic block diagram of the Store Buffer section of the Scalar Processor Module;

FIG. 145 is a more detailed logical block diagram of the Write Data register illustrated generally in the logic block diagram of the Store Buffer shown in FIG. 144;

FIG. 14 is a more detailed pictorial block diagram of the Store Buffer shown generally in the basic logic block diagram of FIG. 144;

FIG. 147 is a more detailed logical diagram of the Read Data Output register shown generally in the basic logic block diagram of FIG. 144;

FIG. 148 is a logical block diagram of the circuitry used to store an Enable designator which will later be used to start the Address Generation section in response to a signal from the Store Buffer;

FIG. 149 is a detailed logical diagram of the read toggle circuit used in the Store Buffer section of the Scalar Processor Module;

FIG. 150 is a timing diagram showing the sequential schedule of each of the basic functions of a Store Vector operation;

FIG. 151 illustrates three separate buffer storage tables pictorially illustrating the word contents of each of the numbered locations in each of the storage tables for a normal Store Vector operation;

FIG. 152 shows another group of buffer storage tables used in an indexed store operation, where the Index Buffer is shown as two separate buffer tables which are switched between during a normal indexing operation;

FIG. 153 includes four Buffer Storage tables and illustrates a Store Alternating Element operation with a Store Buffer table and a Switch Buffer table, which operation is used when writing vector arrays so that a real and an imaginary value may be described;

FIG. 154 is a simplified pictorial block diagram illustrating the main elements of the Loop Control section of the Scalar Processor Module;

FIG. 155 is also a simplified pictorial block diagram showing how the Loop Control section is positioned in the Scientific Vector Processor;

FIG. 156 illustrates the instruction format used in the Scientific Processor illustrating, in particular, the various fields and their bit length;

FIG. 157 illustrates a simplified logic block diagram of an instruction issue pipeline;

FIG. 158 is a more detailed logic block diagram of the length and pointer. interface generally shown in FIG. 154;

FIG. 159 is a pictorial block diagram illustrating the files and registers of the Vector Load portion of the Loop Control section;

FIG. 160 is another pictorial block diagram illustrating the files and registers of the element counts and element pointers of the Loop Control section;

FIG. 161 is a detailed logic diagram of the circuitry used in the execution of a Build Vector Loop (BVL) instruction;

FIG. 162 is a pictorial block diagram illustrating the logical path taken during the execution of a Jump Vector Loop (JVL) instruction;

FIG. 163 is a detailed logic diagram of the circuitry used in the execution of an Adjust Current Vector Loop Pointer instruction;

FIG. 164 is a simplified logic block diagram showing the logical data path taken during a Begin Element Loop instruction to provide the information to the Length and Pointer Interface (L & PI);

FIG. 165 is a similar simplified block diagram showing the logical, path taken during the execution of a Jump Element Loop instruction;

FIG. 166 is a corresponding block diagram to that shown in FIG. 165 illustrating the block diagram of the path taken when the instruction indicates that the Jump Element Loop is not to be taken;

FIG. 167 is a simplified logic block diagram showing the logical path taken during the execution of a Load Loop Control Register operation;

FIG. 168 is also a simplified block diagram showing the logical path taken during the execution of a move instruction where the destination of the move is in the Loop Control section;

FIG. 169 is an illustration of a simplified timing diagram showing the sequence for validating the contents of the Element Count register;

FIG. 170 is a timing diagram illustrating the sequence for the issuance of an instruction;

FIG. 171 is a further illustration of a simplified timing diagram showing the sequence for validating the contents of the Augend register, which validation is used on the Begin Vector Loop and the Move instruction;

FIG. 172 is a timing diagram illustrating the sequence for the issuance of the GO instruction from a Load Loop Control Register (LLCR) and/or a Store Loop Control Register (SLCR);

FIG. 173 is a simplified block diagram showing the logical data path of an Abort instruction and its effect upon the operation of the Vector Control (VC) section of the VPM;

FIG. 174 is a simplified block diagram illustrating the relationship of the Mask Processor relative to the remaining sections of the Scientific Processor (SP);

FIG. 175 is a simplified block diagram showing the operational sequence of a generic pipeline showing signals coming from the Mask Processor as input signals to the Vector Files;

FIG. 175 is a simplified drawing of a Vector instruction format particularly showing the t field and the C field which are the relevant fields to a Mask operation;

FIG. 176 is a block diagram showing Move operations between the Mask register and the State registers S4 and S5. The operational path is from the state registers S4 and S5 through the Mask register and returning to the S4 and S5 registers;

FIG. 178 is a simplified block diagram of the internal Mask Processor showing the Mask register central to the diagram and the various other interface sections for external communication with the other portions of the Scientific Processor;

FIG. 179 is a simplified block diagram showing the logic path followed to accomplish the Mask selection process by multiple word selectors which use a partial four way multiplexer on the input to the gate arrays;

FIG. 180 is a simplified block diagram outlining the logic circuitry utilized as a control for a Vector Pipe interface;

FIG. 181 is a logical block diagram of the circuitry used to accomplish the time delay associated with the various mask bits illustrating that as many as 21 bits are actually delayed for six cycles;

FIG. 182 is a logical block diagram illustrating the circuitry used to maintain all of the mask bits in a single location and only send over the appropriate mask bits, for a particular Vector operation, at the same time that the pipeline is doing that Vector operation;

FIG. 183 is a simplified logical block diagram illustrating the data paths taken to load the Mask register;

FIG. 184 is a logic block diagram showing the outline of the data path followed by the Move parameters;

FIG. 185 is a table showing each of the instruction classes with the setting conditions for each of the designators indicated in the respective blocks of the table;

FIG. 186 is a pictorial diagram of the Vector File organization illustrating, in particular, one of the sixteen files;

FIG. 187 is a pictorial block diagram of the Vector File organization illustrating the addressing of the eight blocks of the single file;

FIG. 188 is a table showing the identity and the location of the Vector File Read Output registers; FIG. 189 is a simplified block diagram of the Vector File Write data organization;

FIG. 190 is a simplified block diagram of the a typical Vector File RAM with address, write, read and output registers;

FIG. 191 is a table illustrating the time slot patterns of the Vector File;

FIG. 192 is a timing diagram of a typical Vector File addressing operation for either the Multiply Pipe or the Add Pipe;

FIG. 193 is a simplified block diagram of the Vector Control (VC) section of the Vector Processor Module;

FIG. 194A through FIG. 194B, which arranged as in FIG. 194, is a more detailed logic block diagram illustrating the Vector Control section of the Vector Processor Module;

FIG. 195 is an illustration of the Time Slot register format showing the definitions of each of each of the eight bits;

FIG. 196A through FIG. 196C when arranged as in FIG. 196, is a still further block diagram of the Vector File organization and addressing with particular reference made to the MUX registers and encoders and the Time Slot registers;

FIG. 197 is a timing diagram of the Time Slot registers of FIG. 196 illustrating a write portion of a Vector Add operation;

FIG. 198 is an illustrative example of a Write/Read conflict among the various pipes of the Vector Processor Module seeking access to the Vector File;

FIG. 199 is an illustrative example of a Read/Write conflict among the various pipes of the Vector Processor Module, seeking access to the Vector File;

FIG. 200 is an illustrative example of a Write/Write conflict among the various pipes of the Vector Processor Module seeking access to the Vector File;

FIG. 201 is a simplified illustration of how the various conflict are detected using five detectors;

FIG. 20 is a block diagram of a single typical conflict detector;

FIG. 203 illustrates a pair of tables showing a first and a second rank of Write/Read conflict detectors which are used in the main chain conflict;

FIG. 204 shows another conflict detection table which detects Read/Write conflicts; FIG. 205 is a group of three tables which pictorially illustrates the presence of possible conflicts; FIG. 206 includes a pair of tables showing the locations of Write/Write conflicts and the Write/Write comparators;

FIG. 207A and 207B, when arranged as in FIG. 207, is a more detailed block diagram showing the structure of a Write/Read and a Read/Write detector and also the structure of a Write/Write detector;

FIG. 208 is a timing diagram of a Write/Read conflict where an Add instruction is followed by a Multiply instruction where the result of the Add operation is used as an input to the Multiply operation;

FIG. 209, which includes FIGS. 209A-209B is a pictorial example of the format of the Vector Control word used in the Vector Control section of the Vector Processor Module;

FIG. 210 is a pictorial example of the decoding of a program instruction to the Vector Control word format;

FIG. 211 is a timing diagram showing the timing sequence for the issuance and start up of a Vector/Vector format Add instruction;

FIG. 212 is a pictorial block diagram showing the elements of the $OP_1$ and $OP_2$ from the primary and secondary Vector Files as double precision vectors;

FIG. 213 is a similar pictorial diagram to that shown in FIG. 212, however, in this instance the elements of the $OP_1$ and $OP_2$ from the primary and secondary Vector Files are shown as single precision vectors;

FIG. 214 is a logical block diagram illustrating the interface logic between the Add Pipe and the Vector File;

FIG. 215 illustrates the format of both single precision and double precision floating point numbers;

FIG. 216A through FIG. 216C when arranged as in FIG. 216, is a block diagram showing the logical data paths of a single precision Add Pipe;

FIG. 217A through FIG. 217D, when arranged as in FIG. 217, is a block diagram showing the logical data path of a double precision Add Pipe;

FIG. 218 is a block diagram illustrating how the single precision Add Pipe of FIG. 216 is merged to the double precision Add Pipe of FIG. 217;

FIG. 219 is basically the block diagram of the single precision Add Pipe of FIG. 216, with the lines used in the Single Precision Integer Add and Single Precision Integer Subtract operations darkened for emphasis; .

Figure 26:
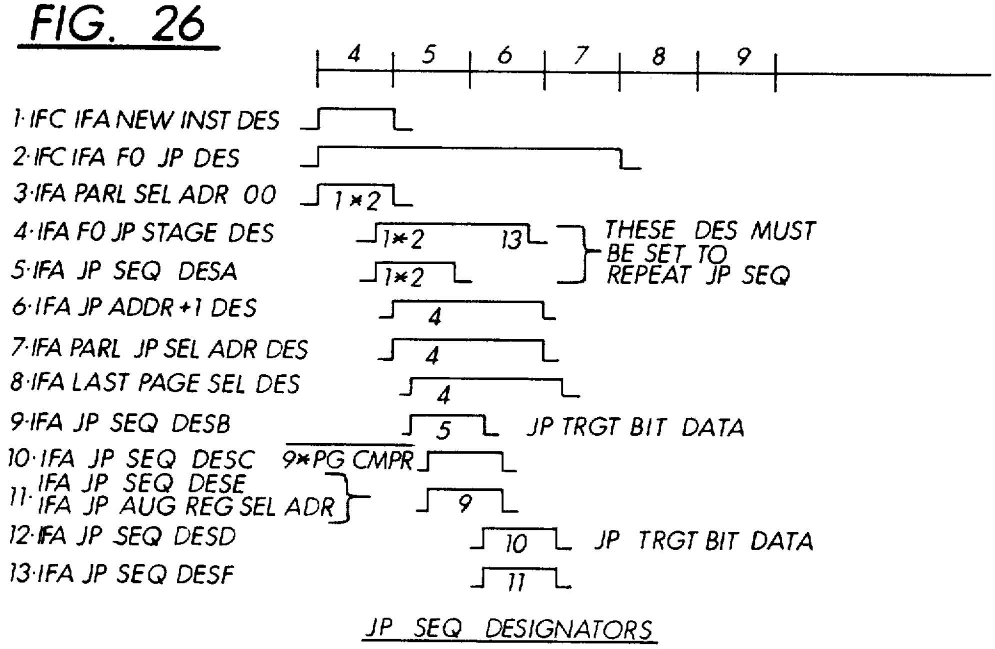
FIG. 26 is another timing diagram used in the IF section showing the Jump Sequence designators.
Figure 27:
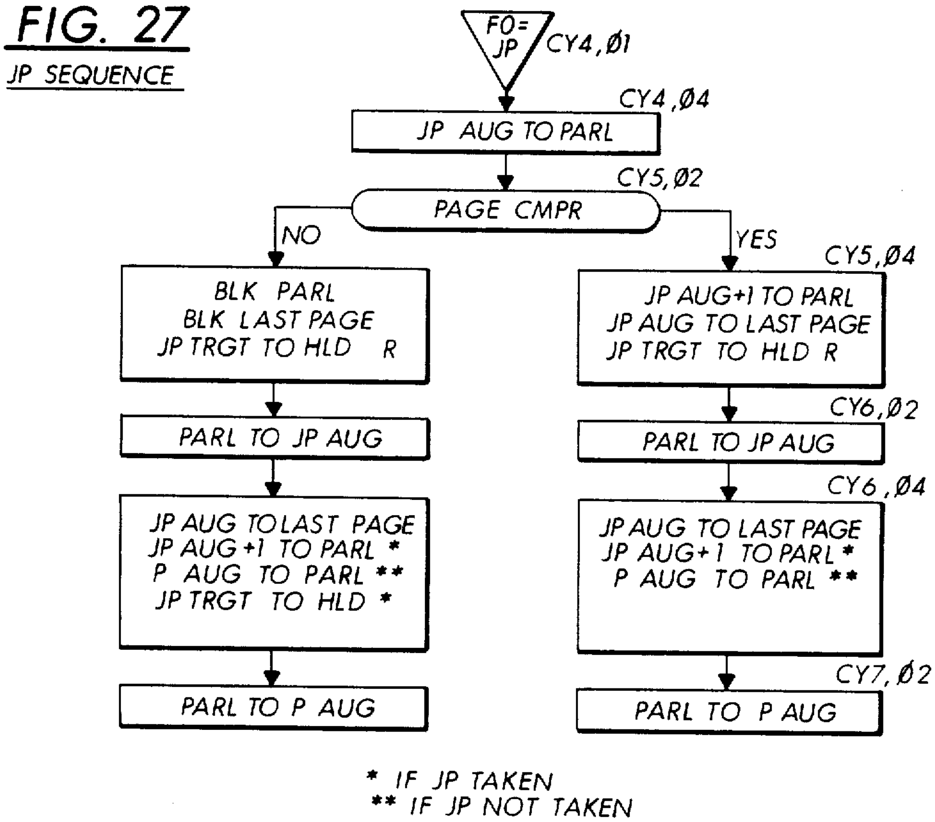
FIG. 27 is a flow chart showing the various steps taken during a Jump Sequence.
Figure 220:
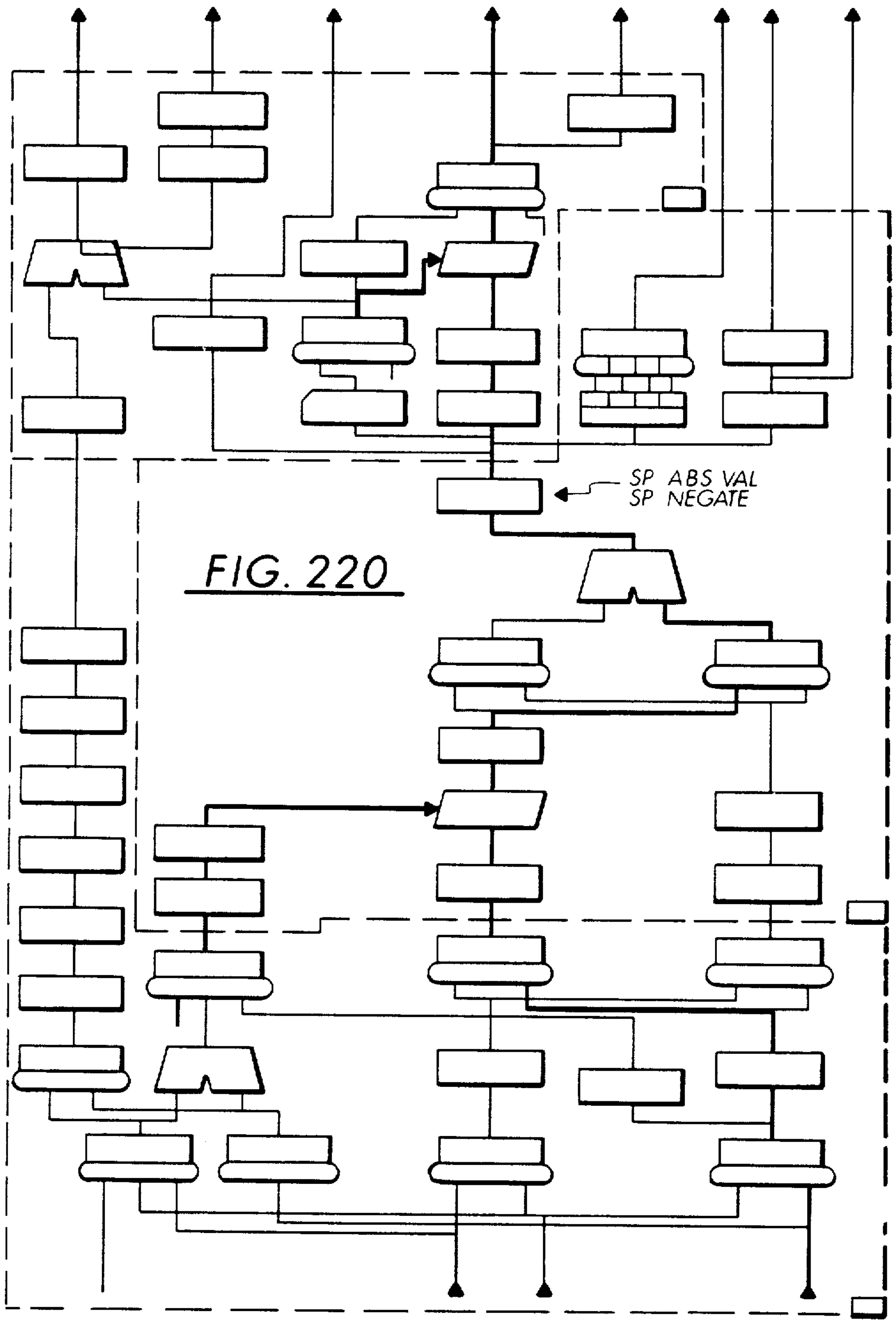
Figure 221:
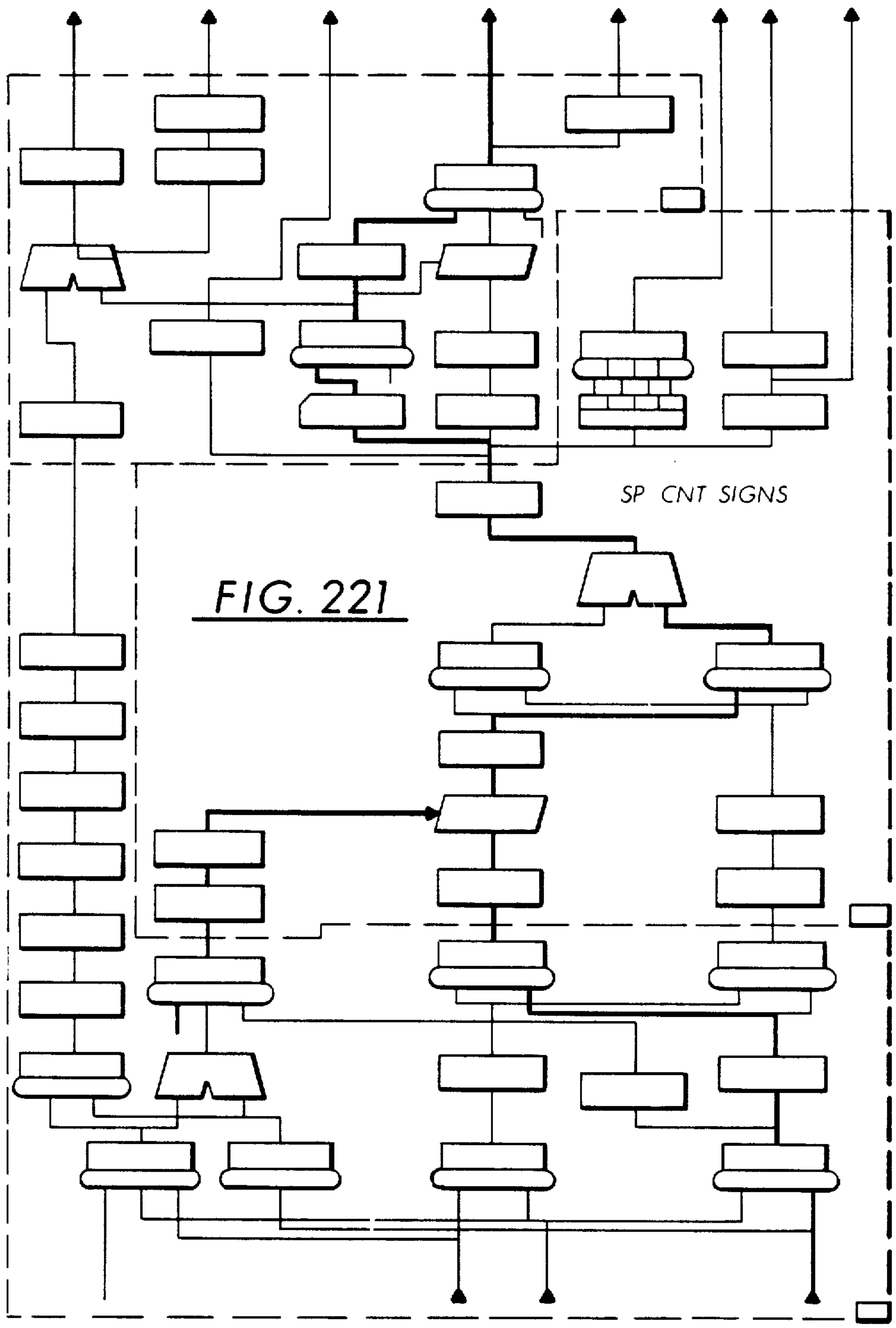
Figure 222:
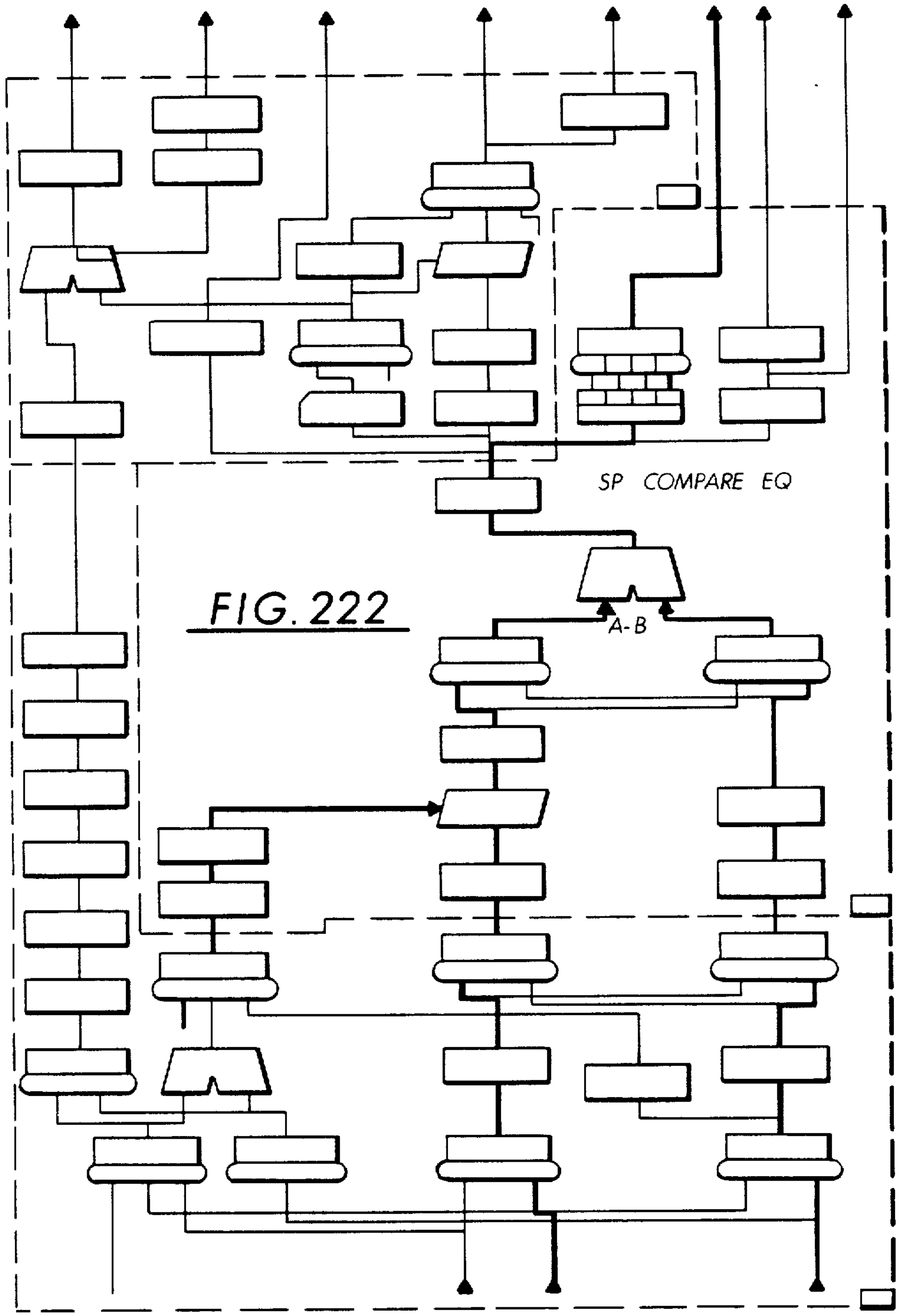
Figure 223:
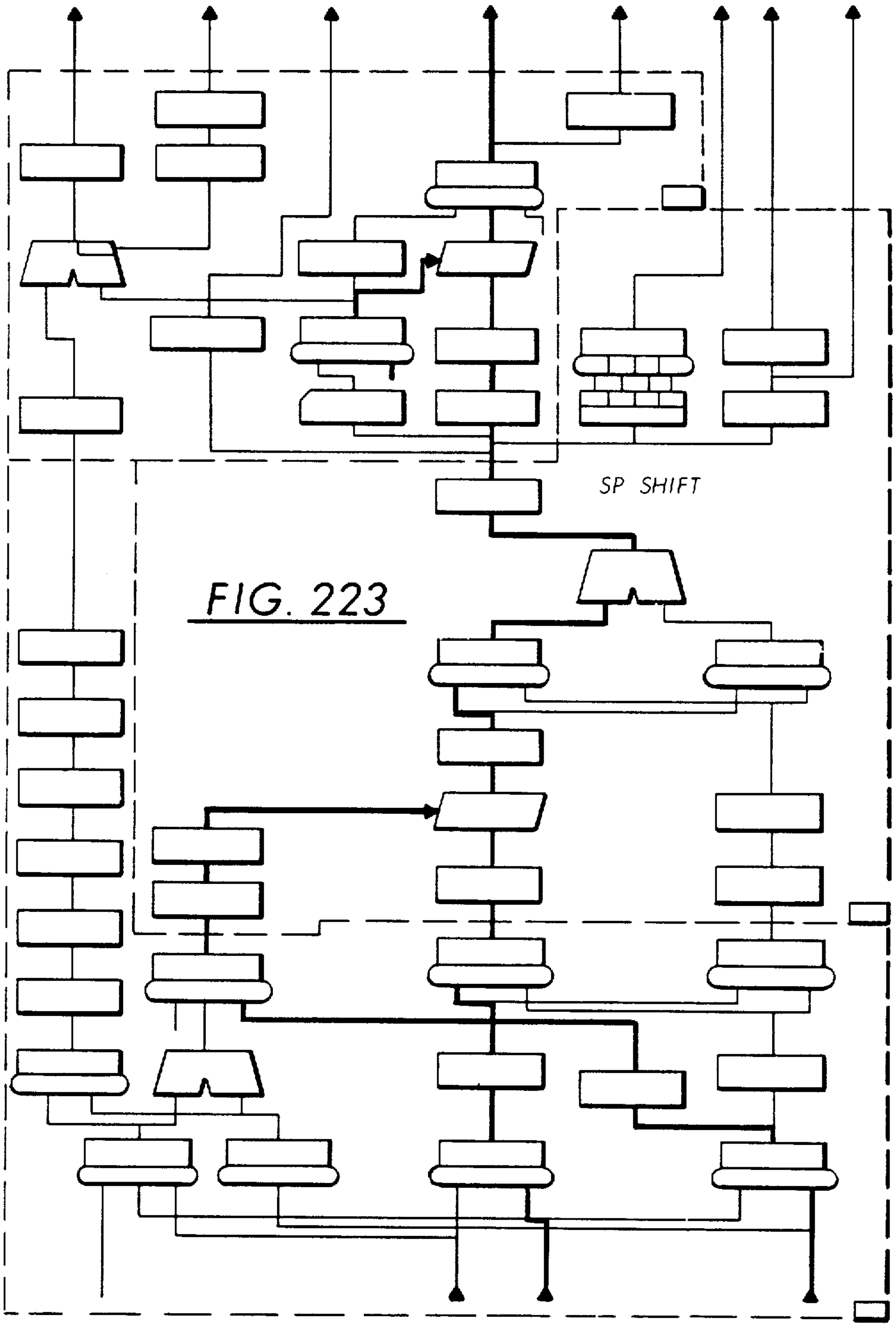
Figure 224:
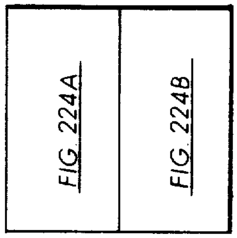
Figure 224A:
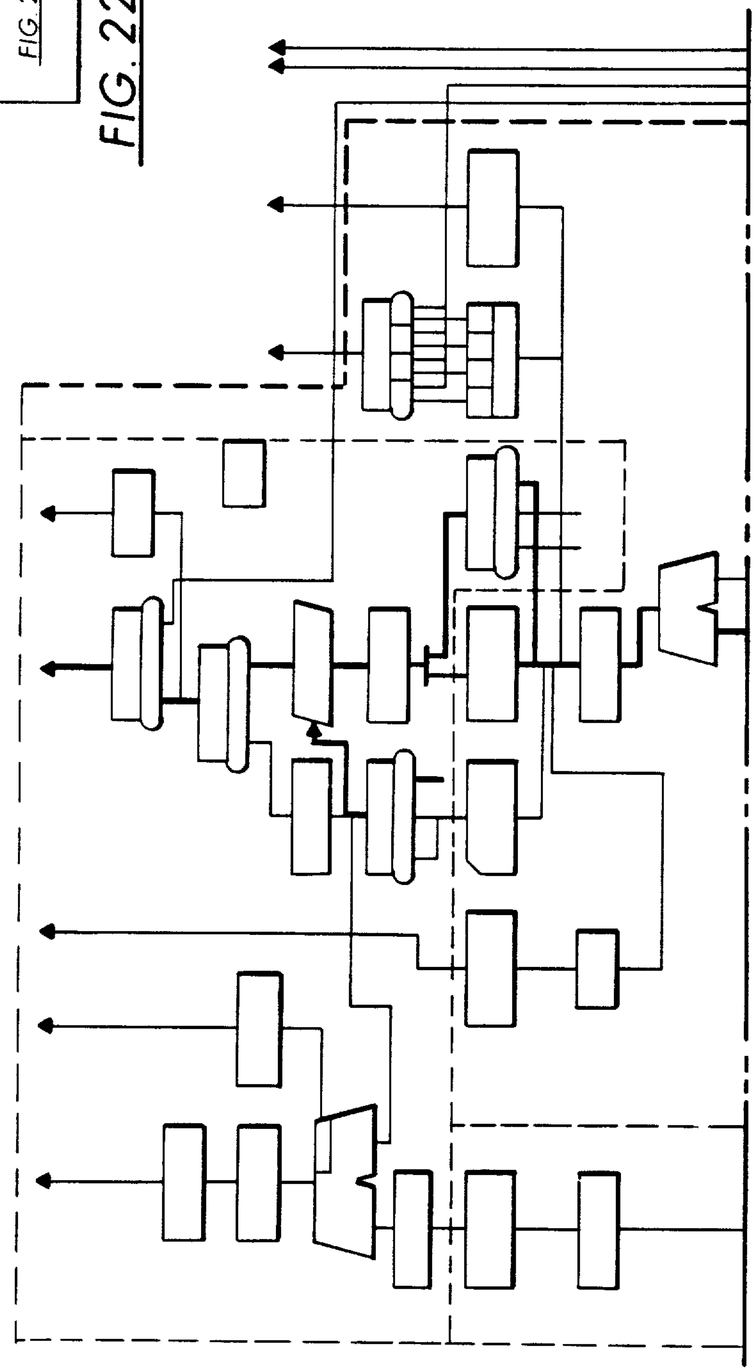
Figure 224B:
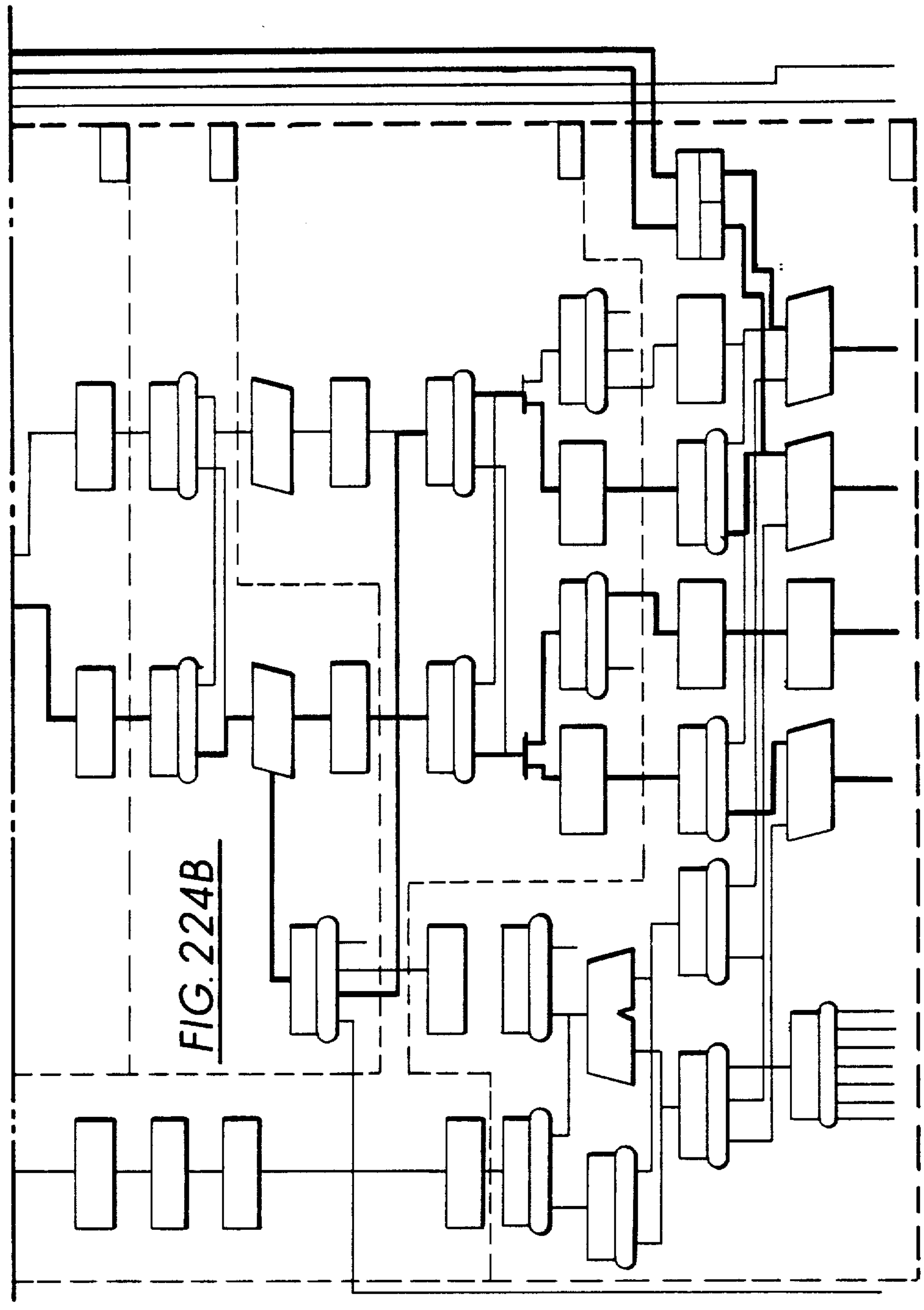
Figure 225:
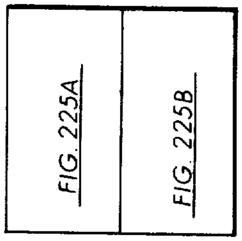
Figure 225A:
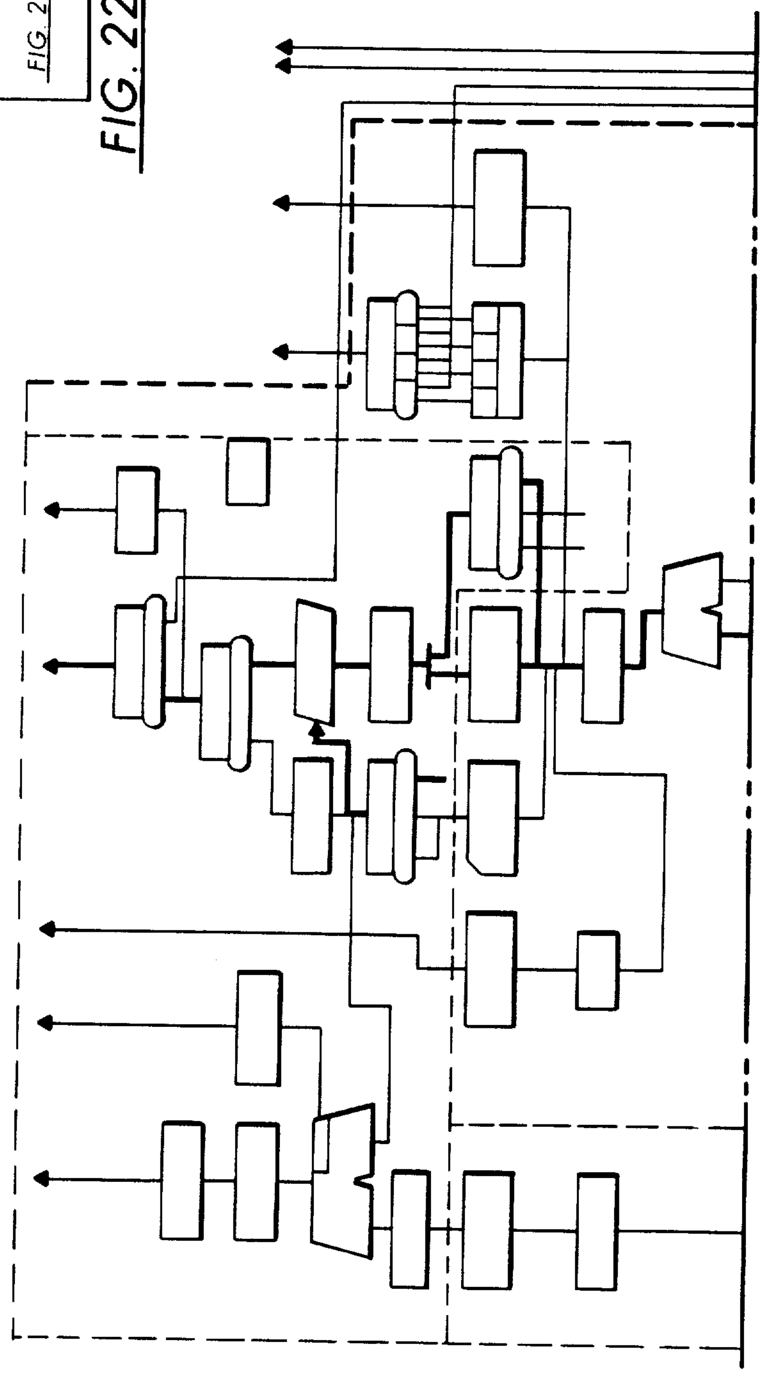
Figure 225B:
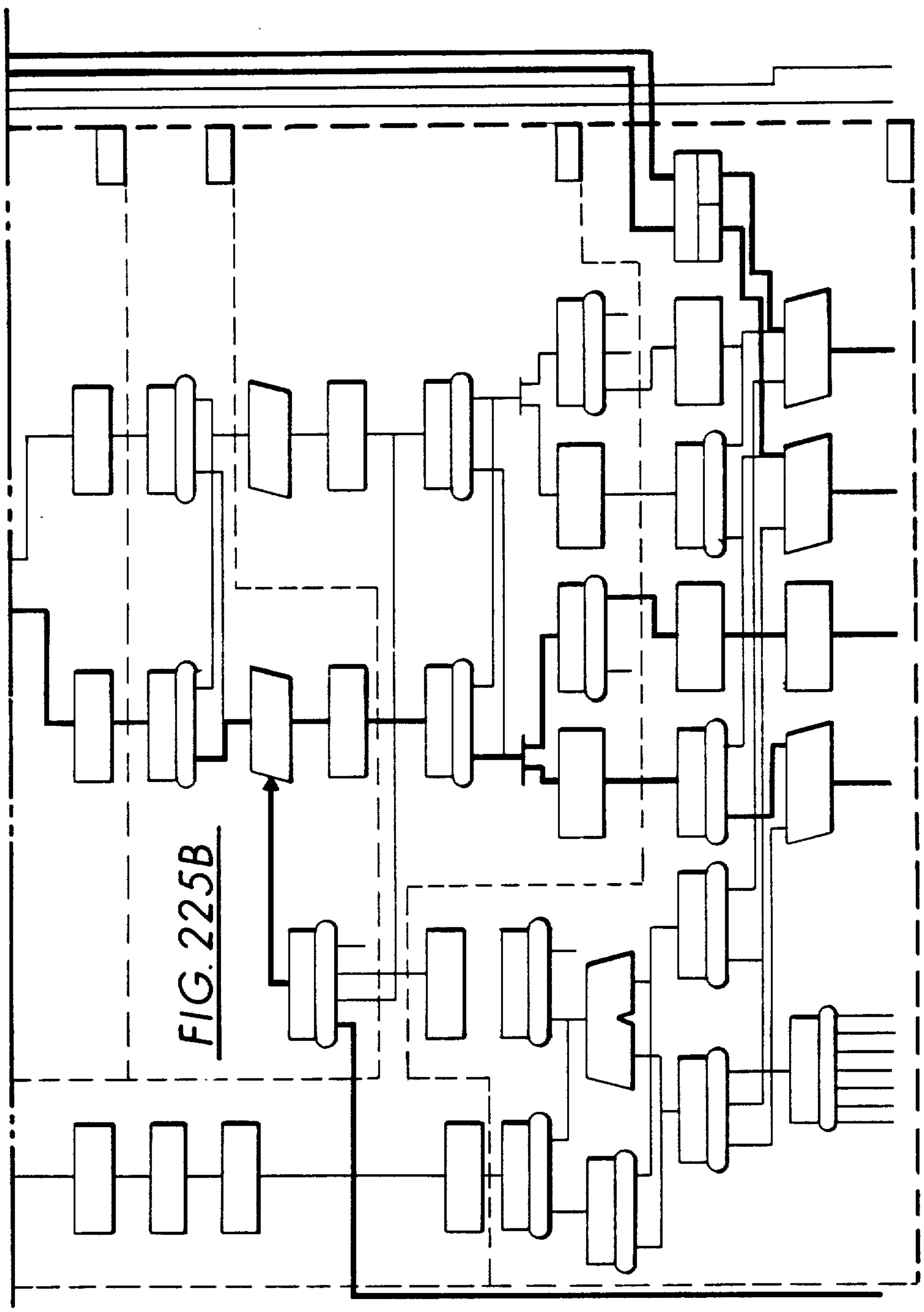
Figure 227:
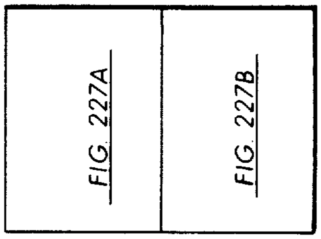
Figure 227A:
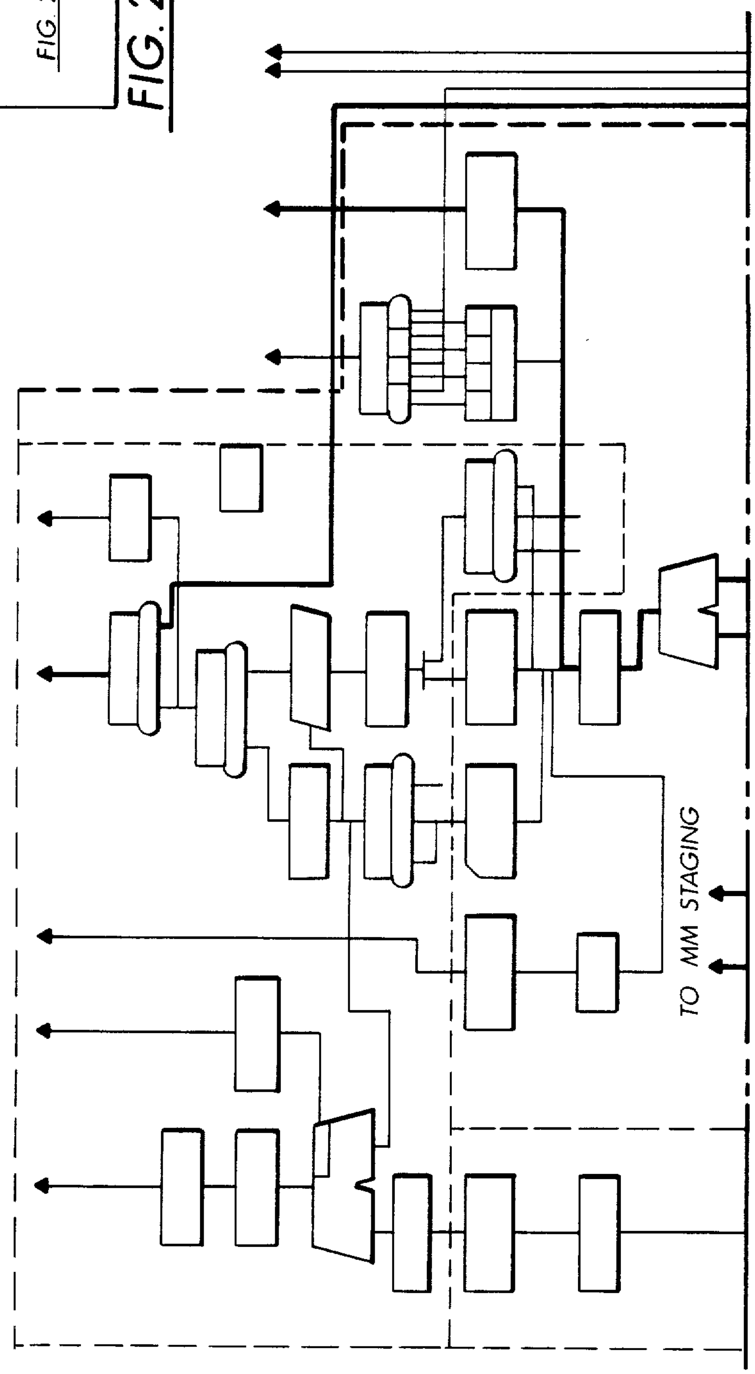
Figure 227B:
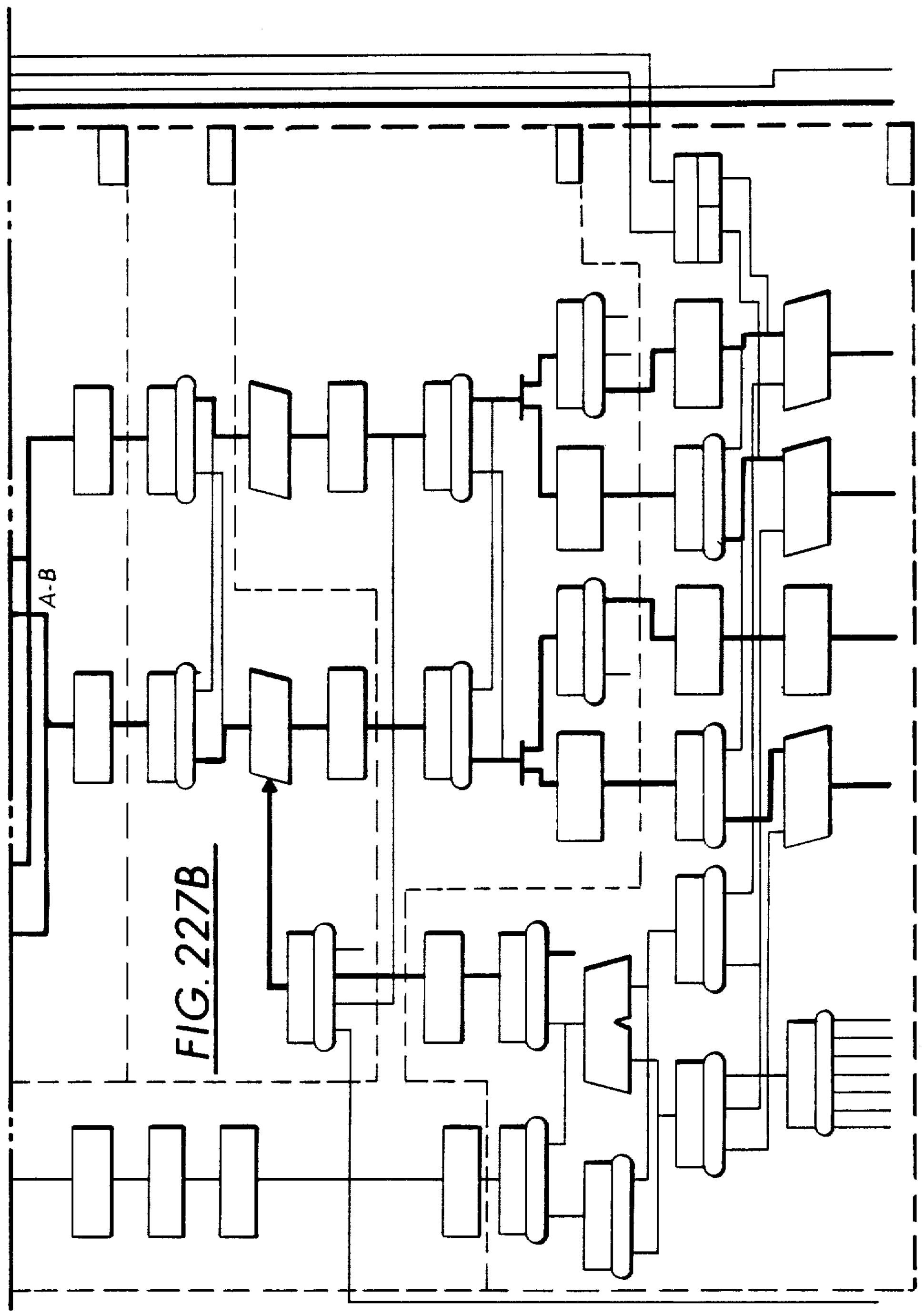
Figure 229:
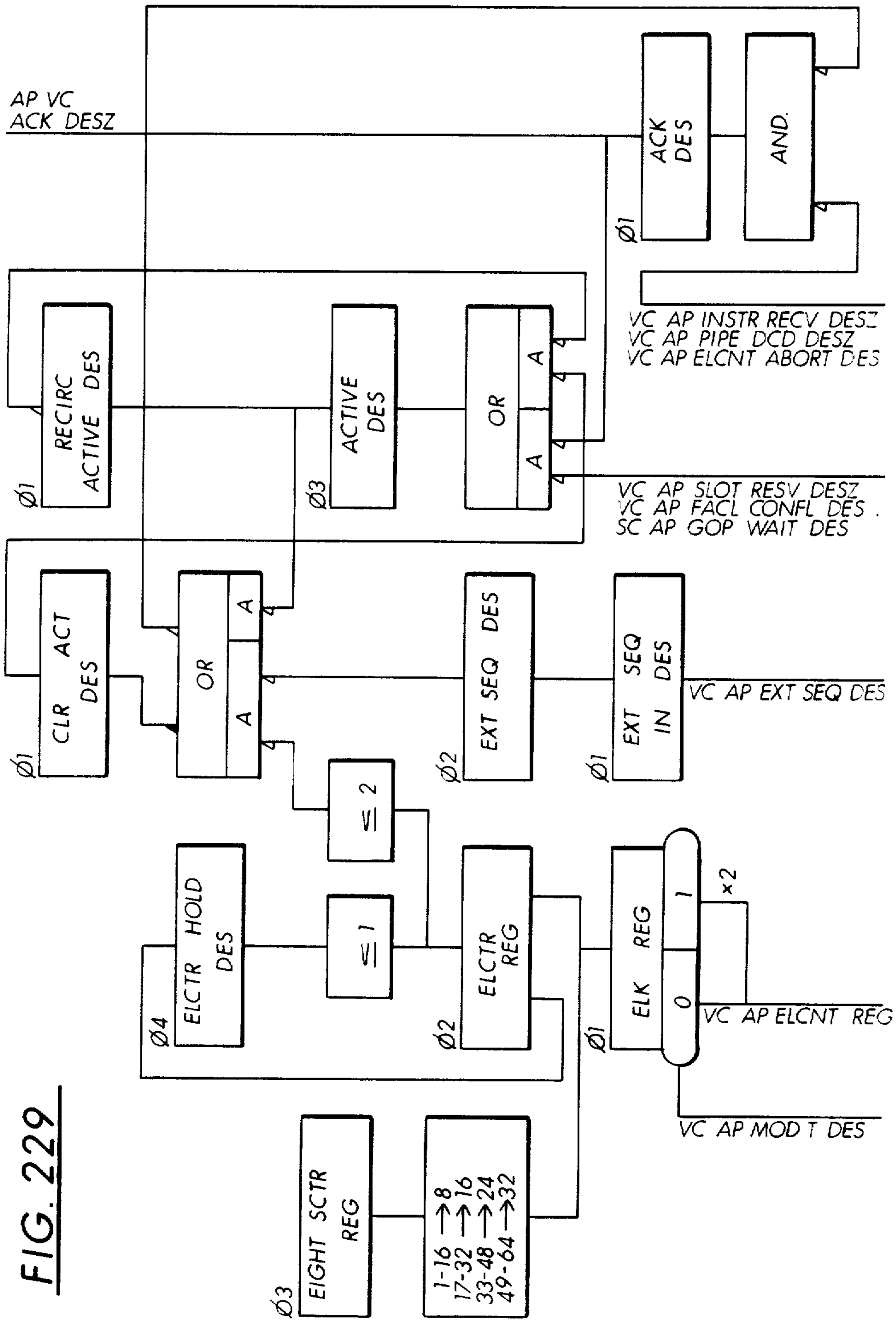
Figure 230:
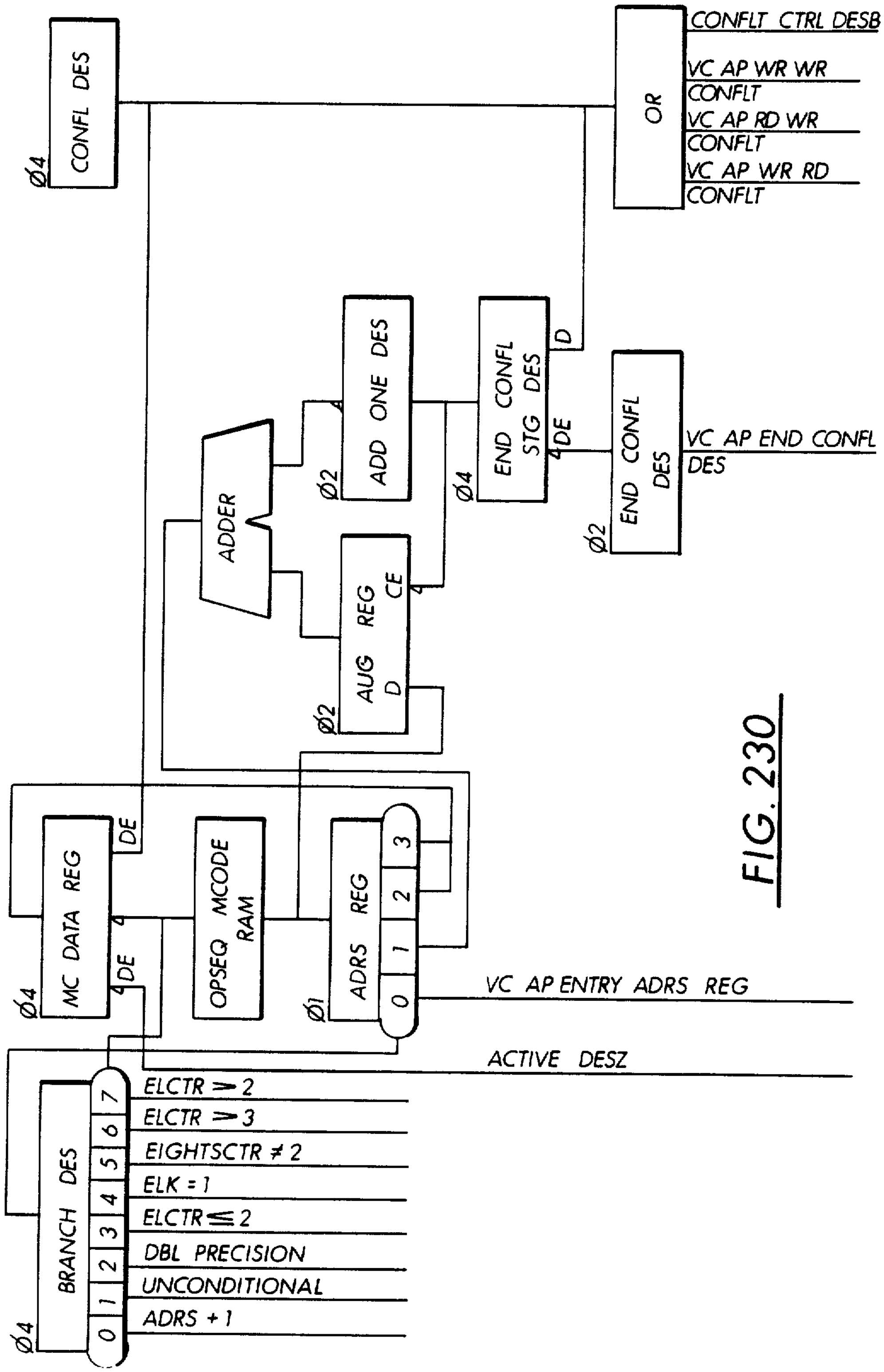
Figure 231:
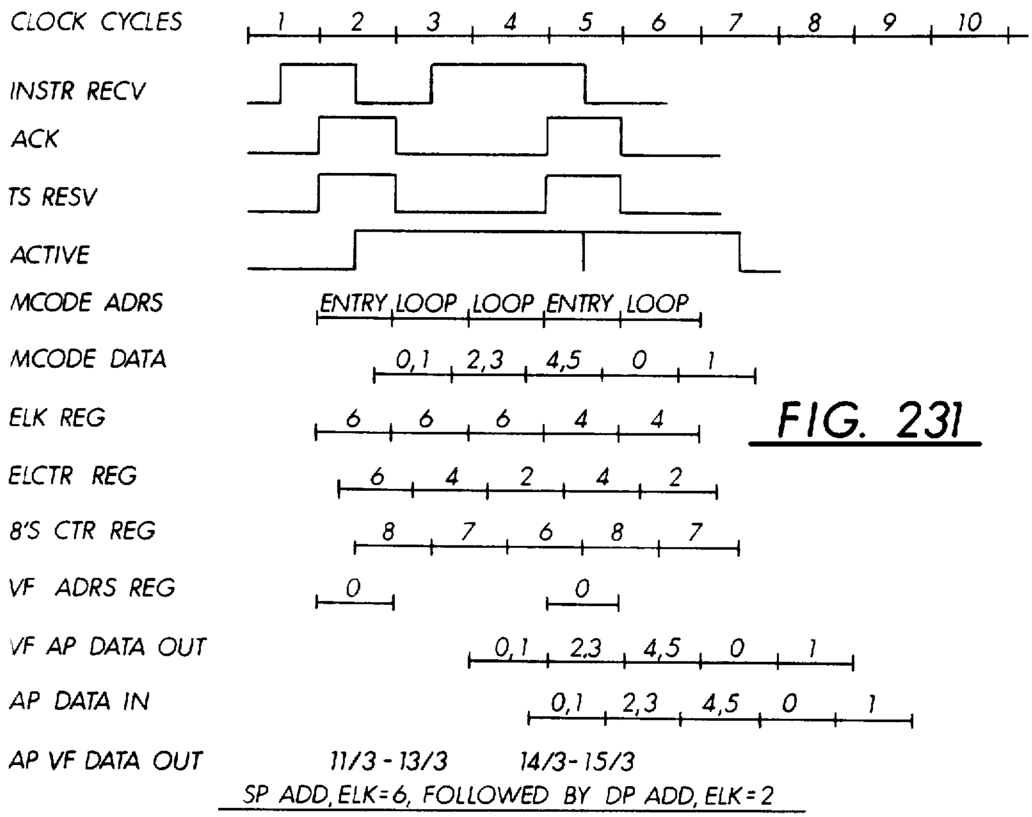
Figure 233:
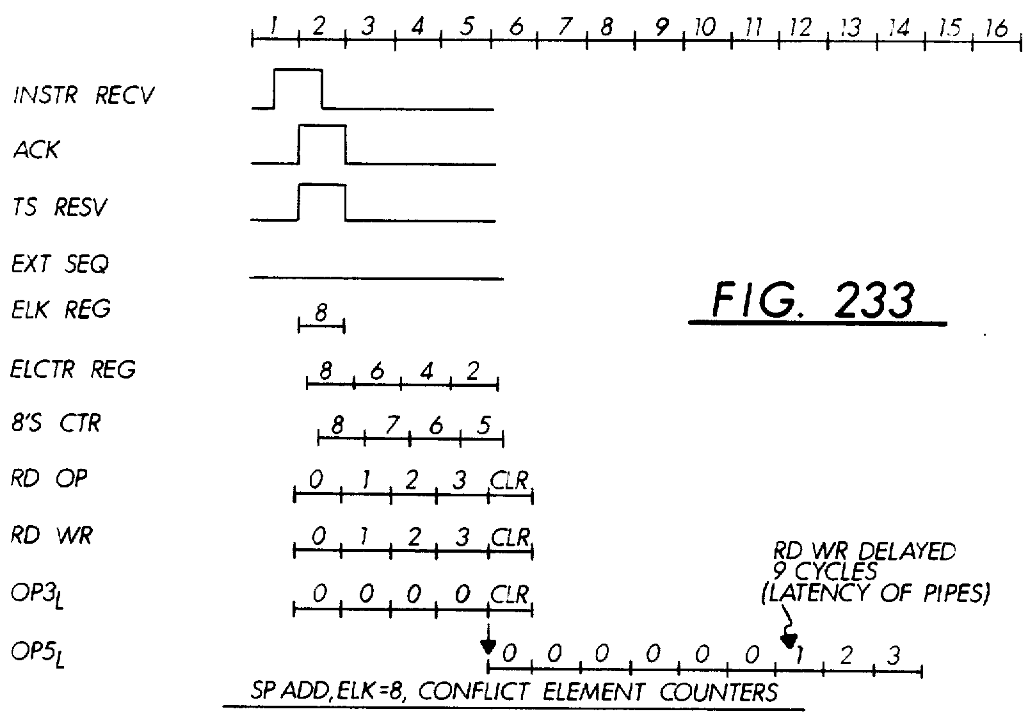
Figure 232:
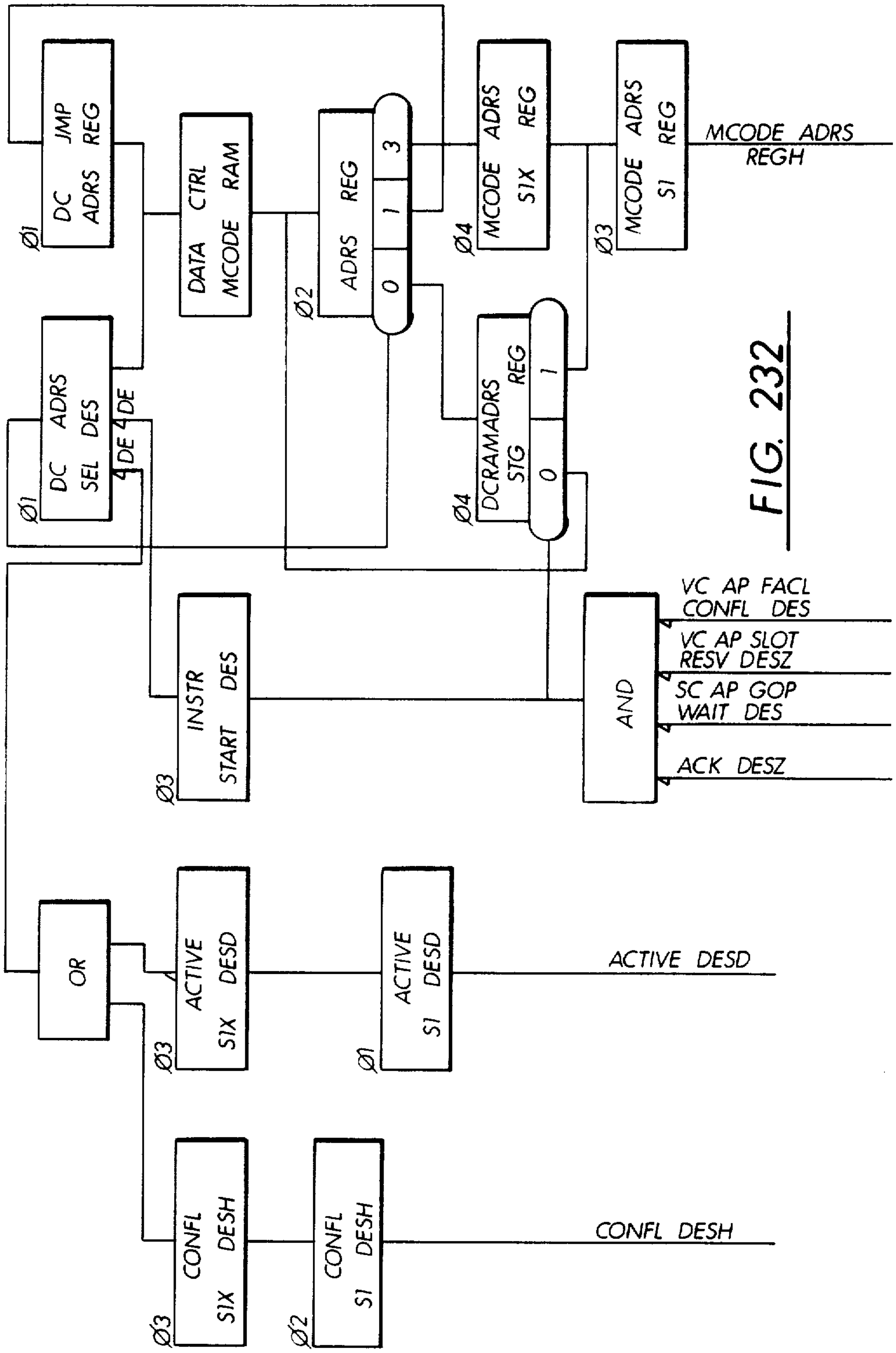
Figure 234:
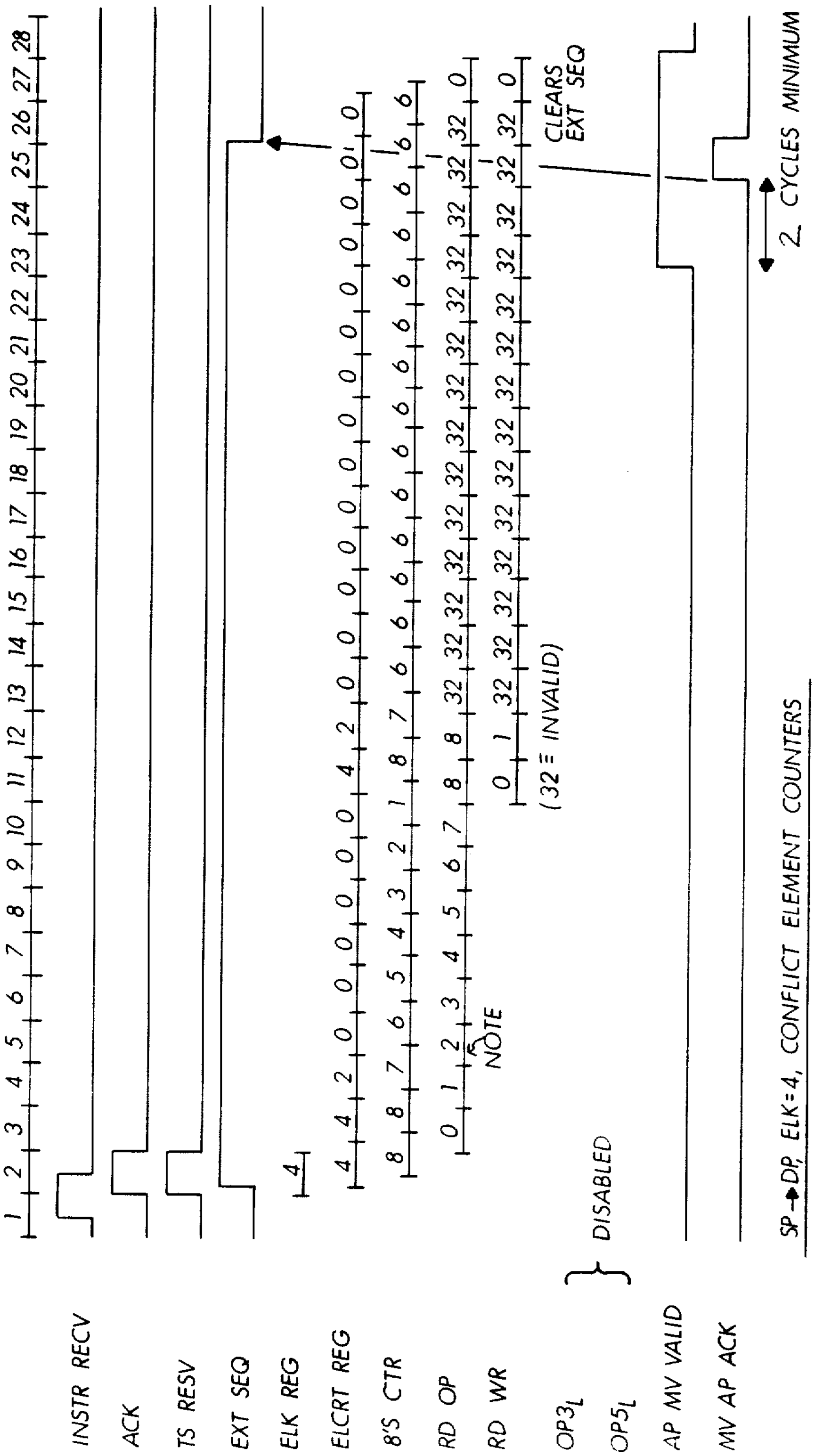
Figure 235:
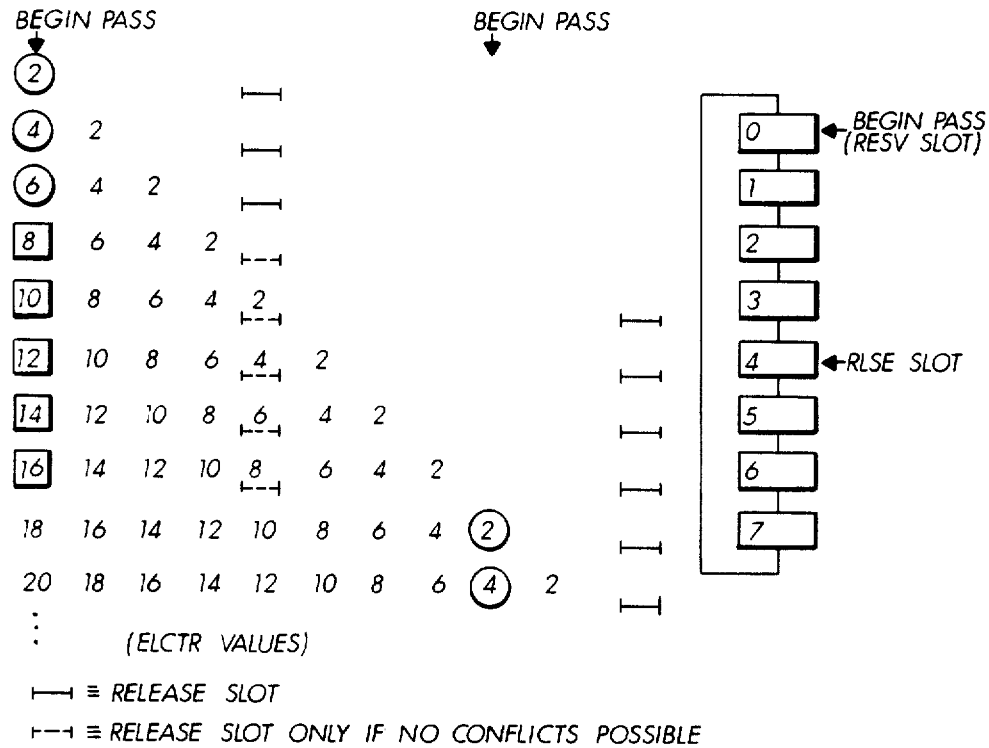
Figure 237:
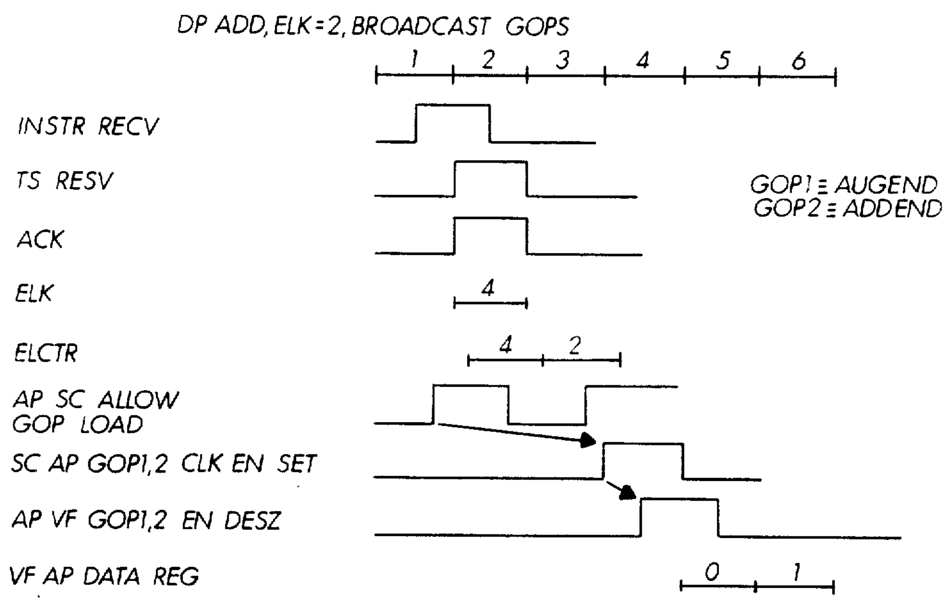
Figure 236:
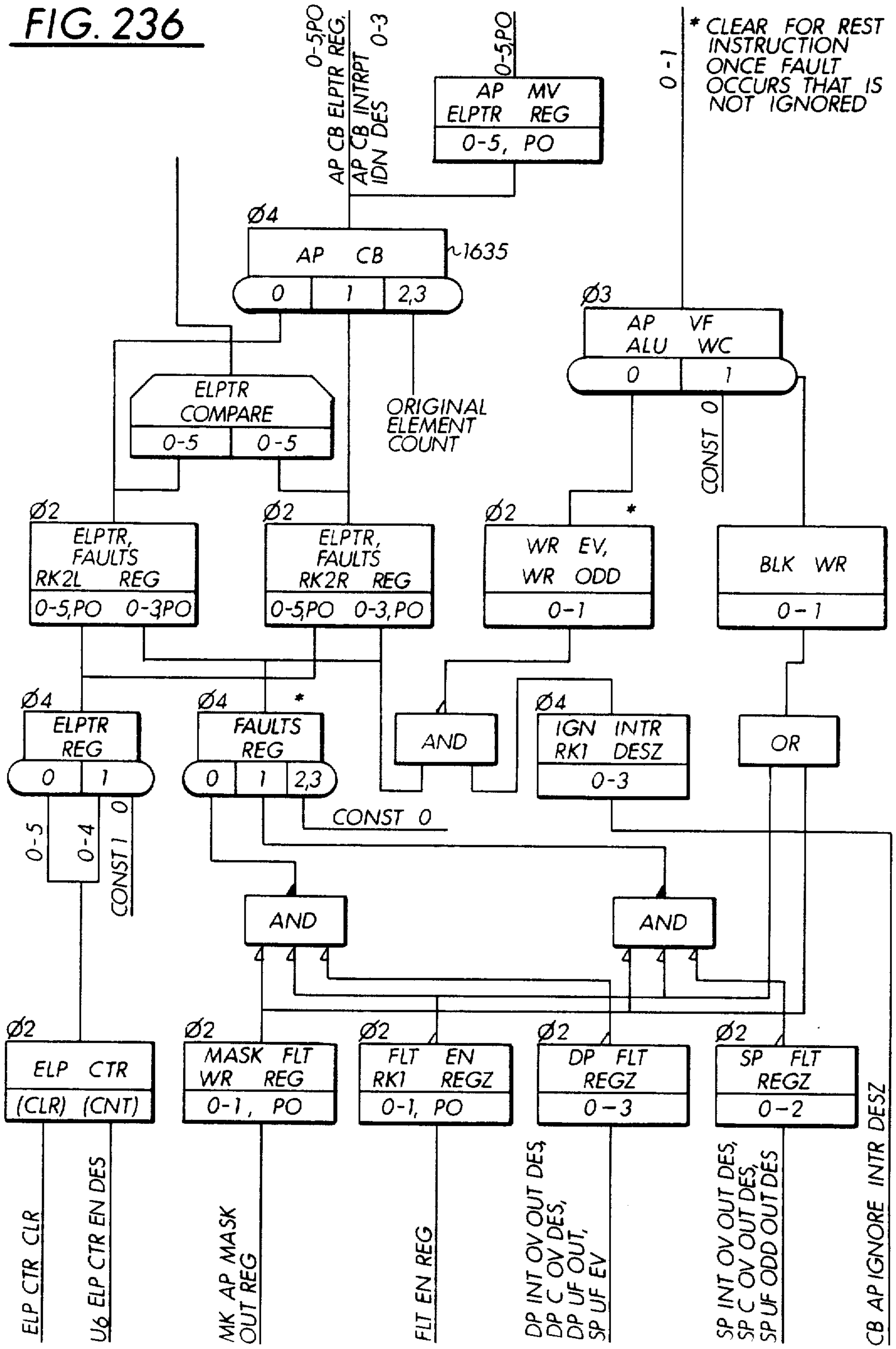
Figure 238:
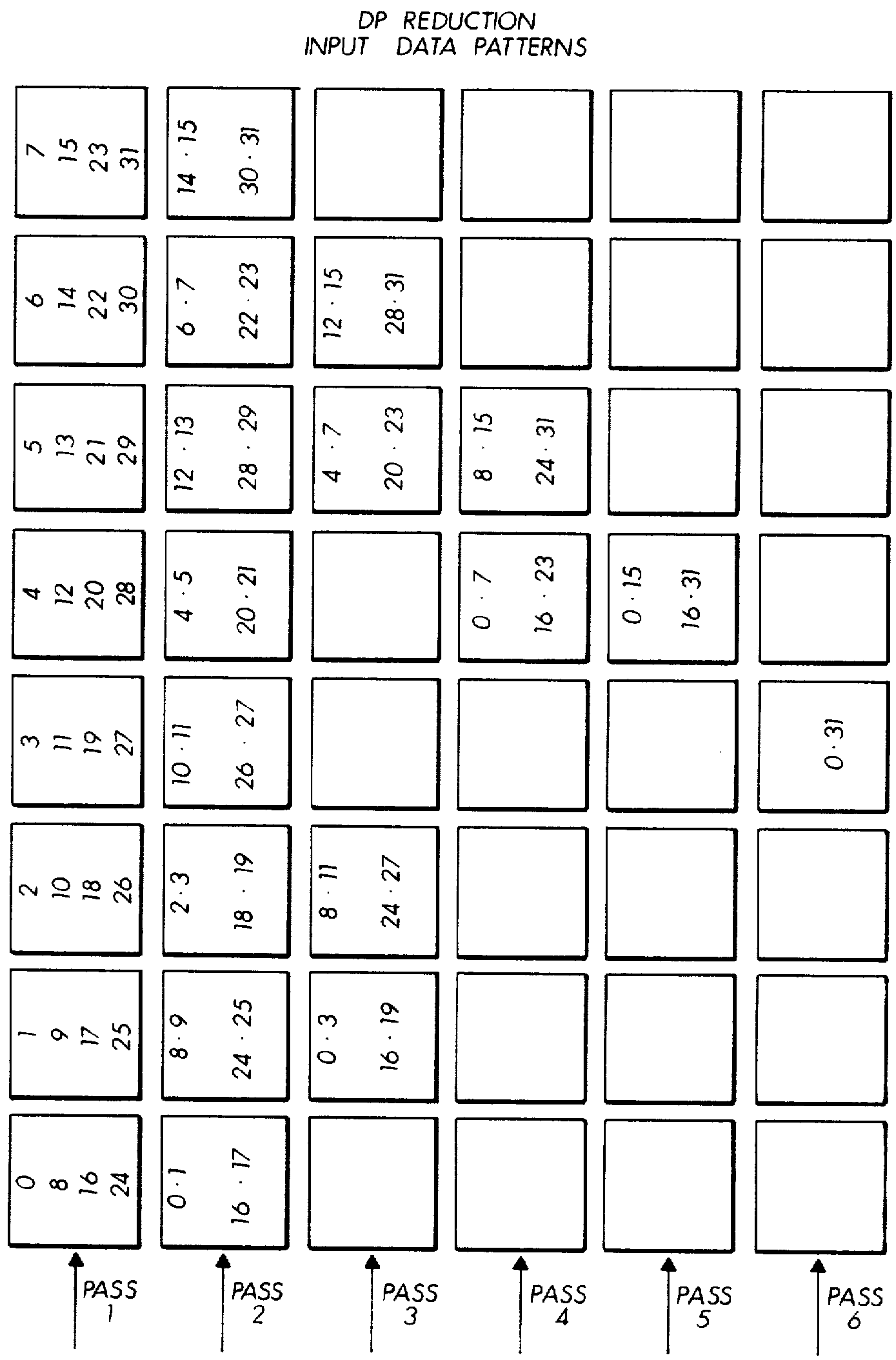
Figure 240:
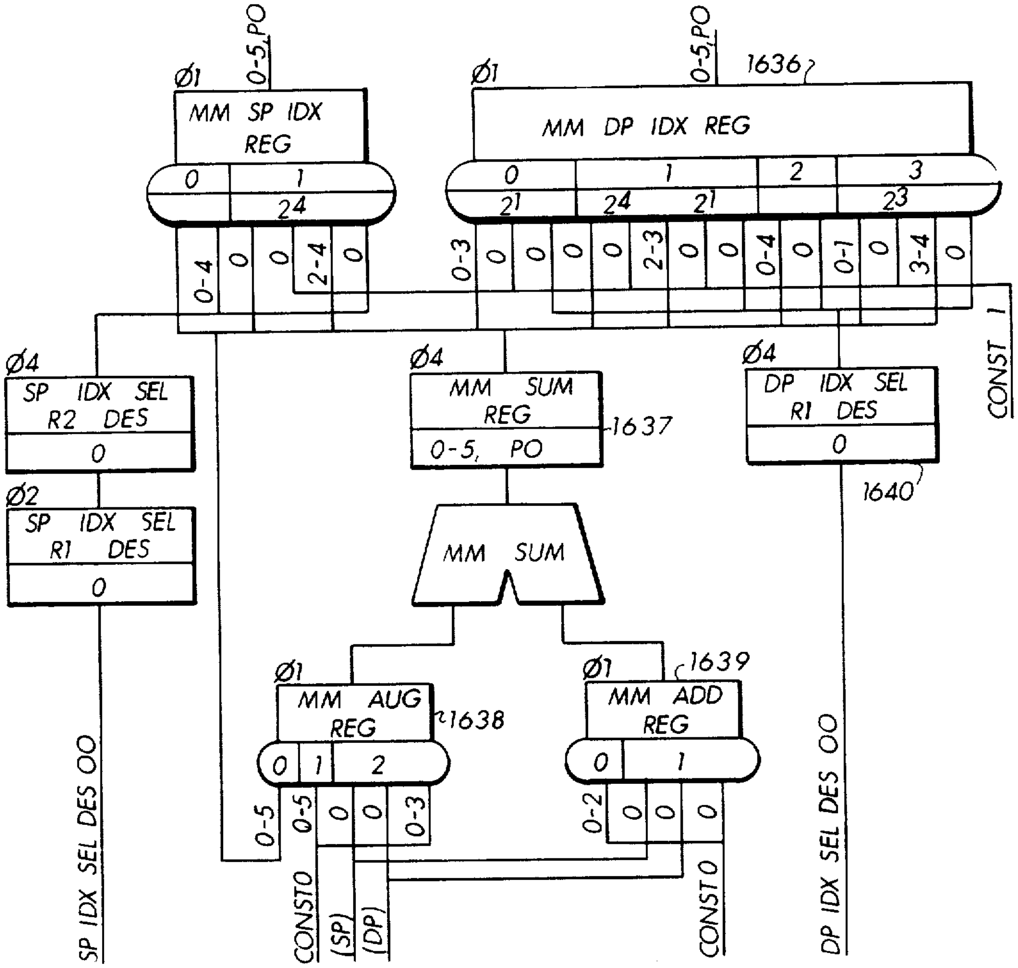
Figure 244:
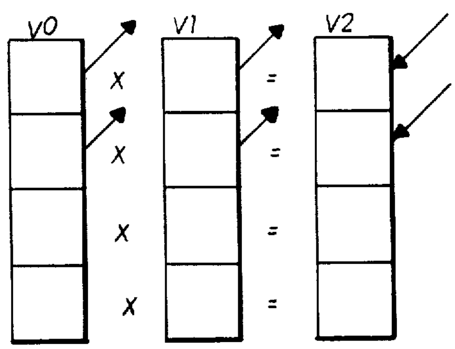
Figures 239, 241:
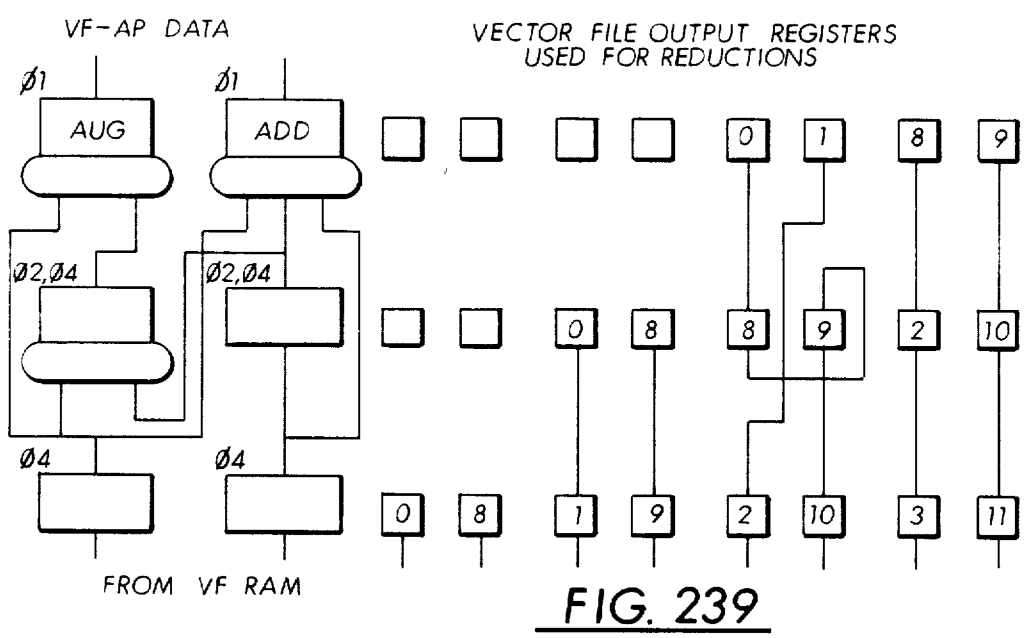
Figure 242:
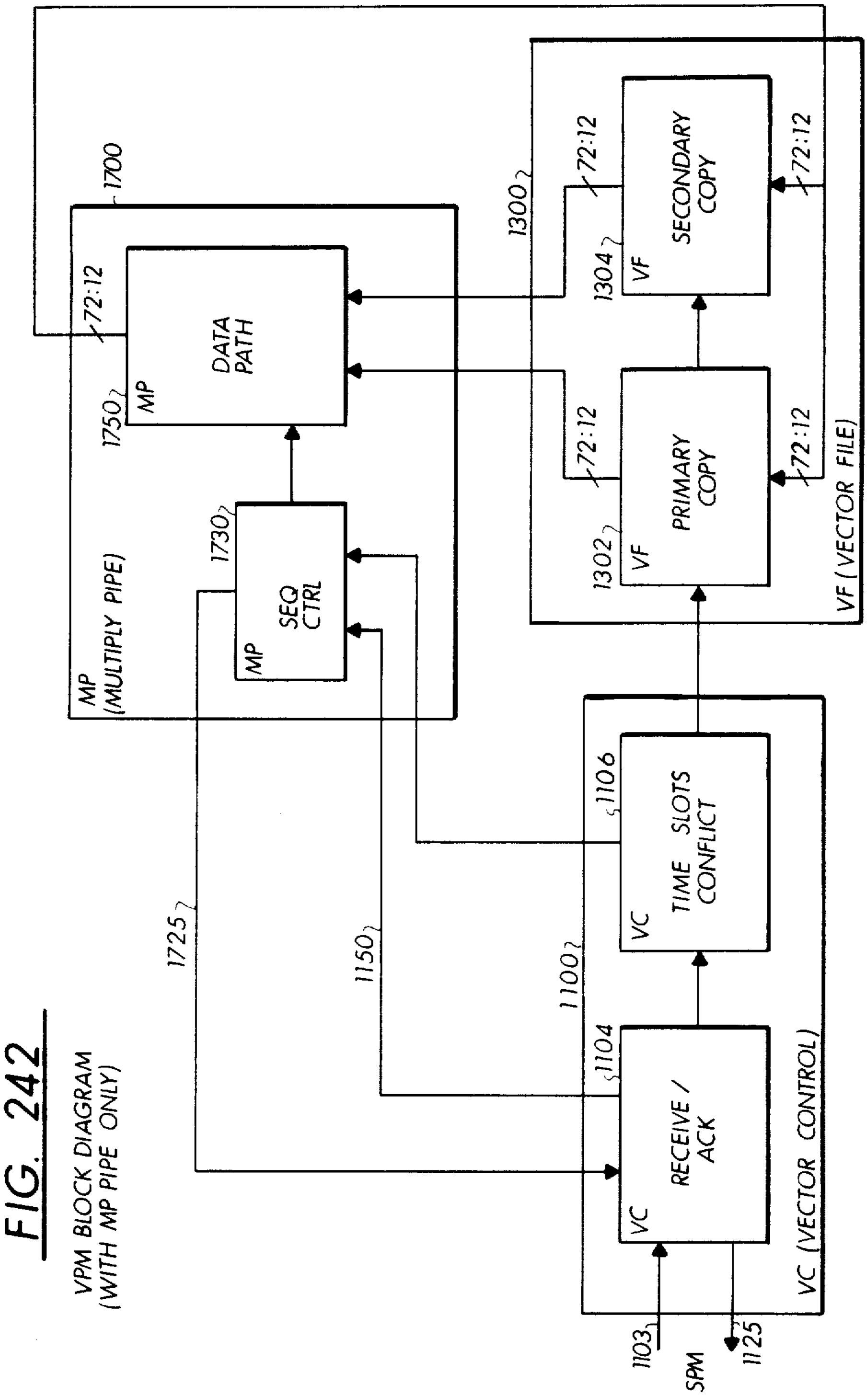
Figure 243:
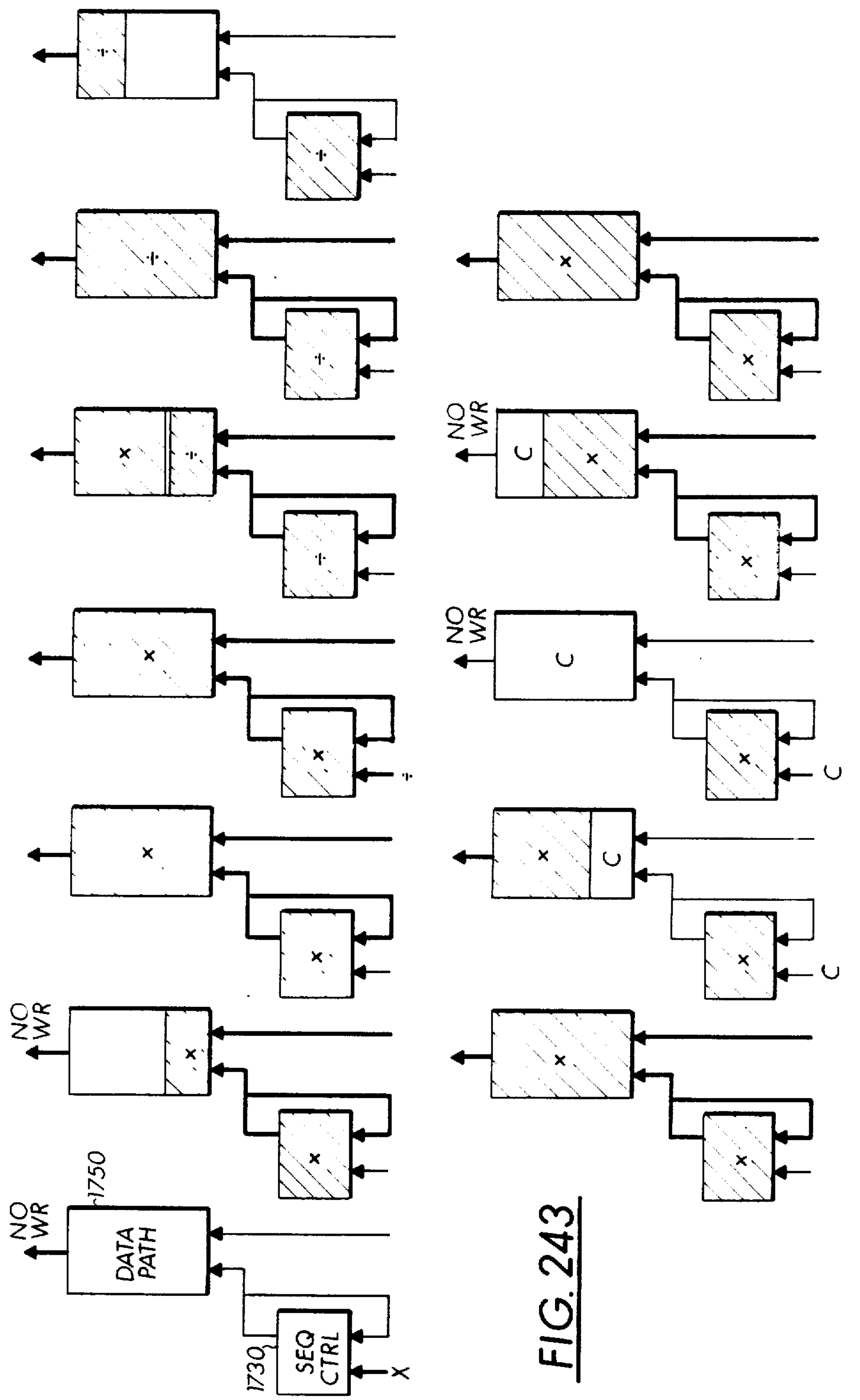
Figure 245:
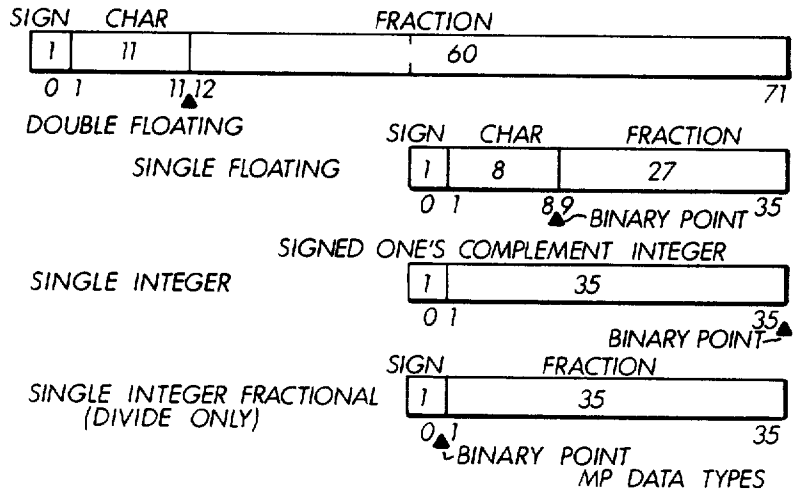
Figure 246:
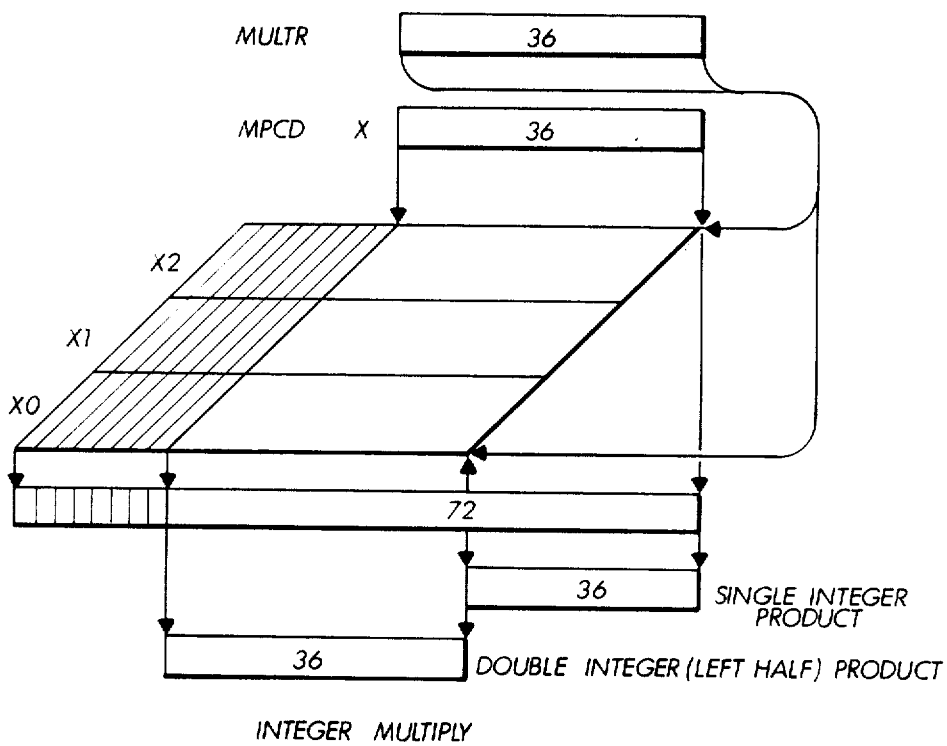
Figure 247:
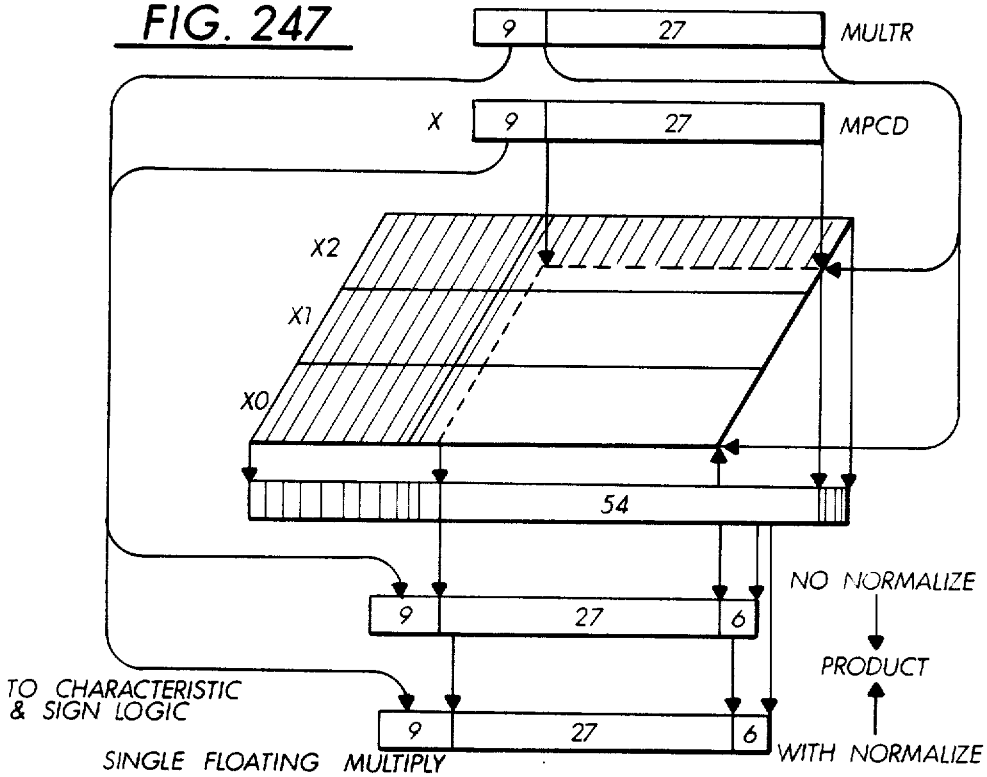
Figure 249:
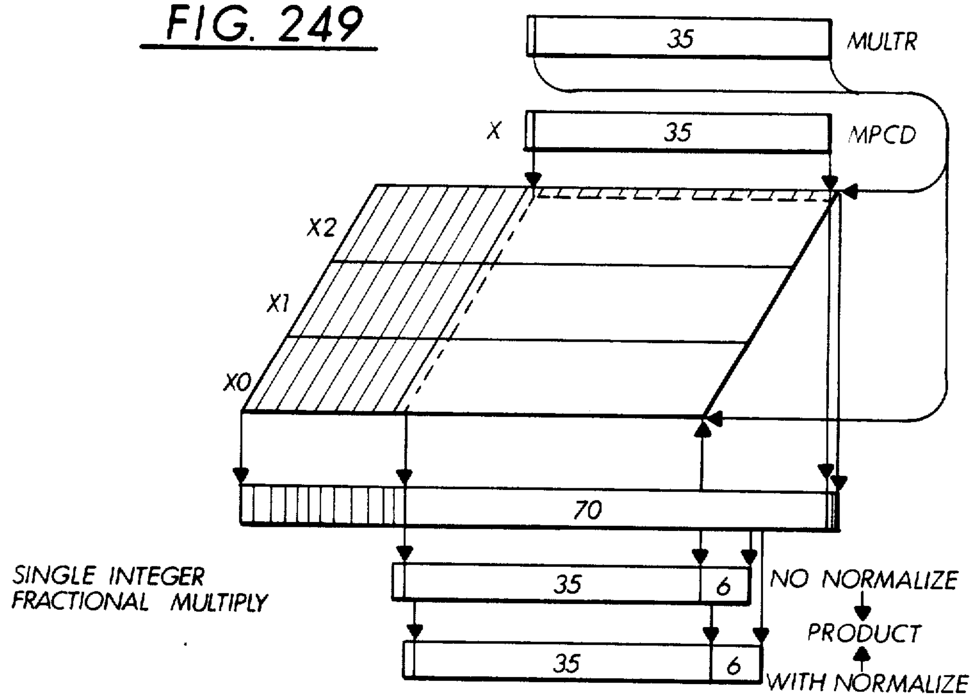
Figure 248:
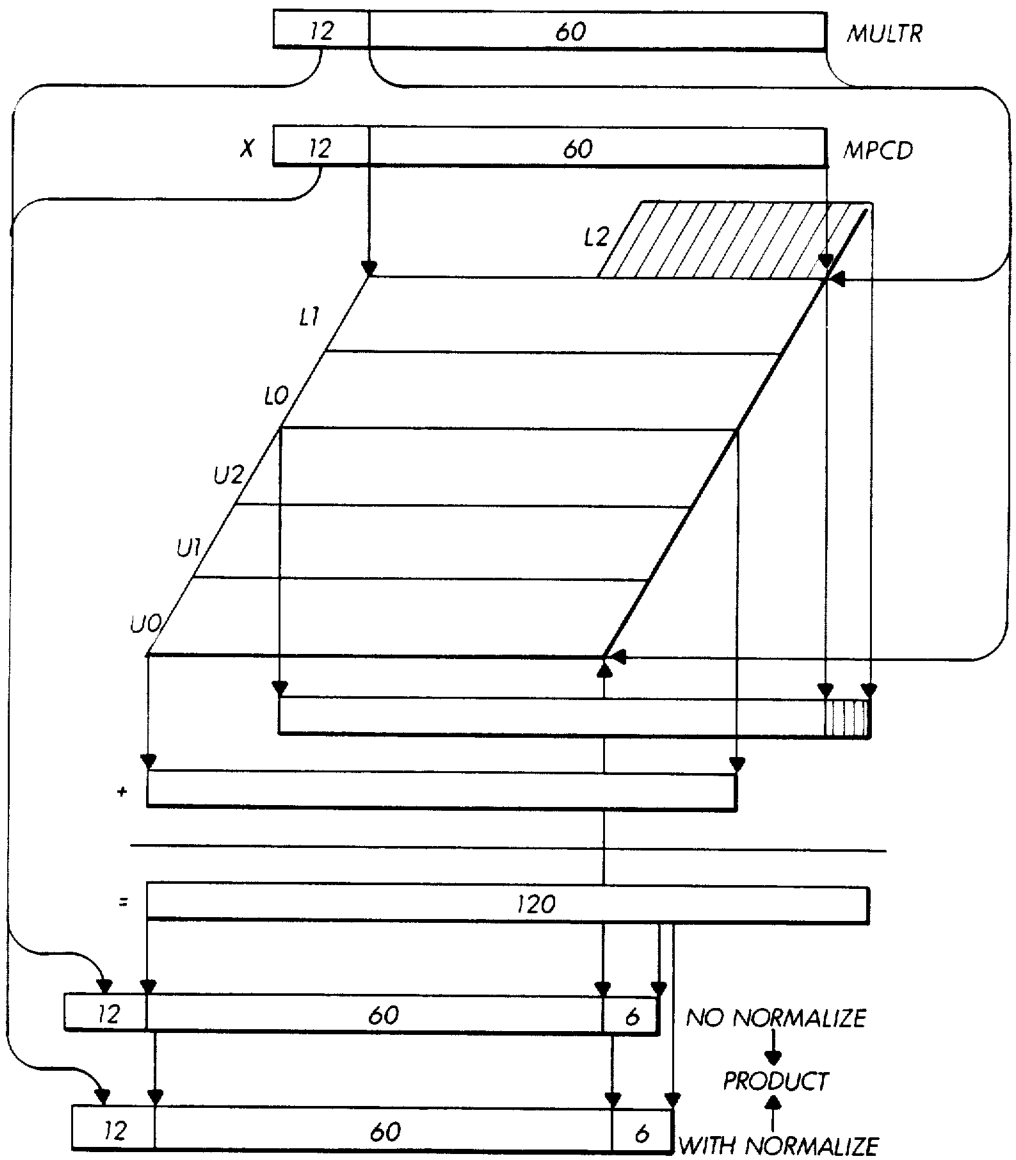
Figure 250A:
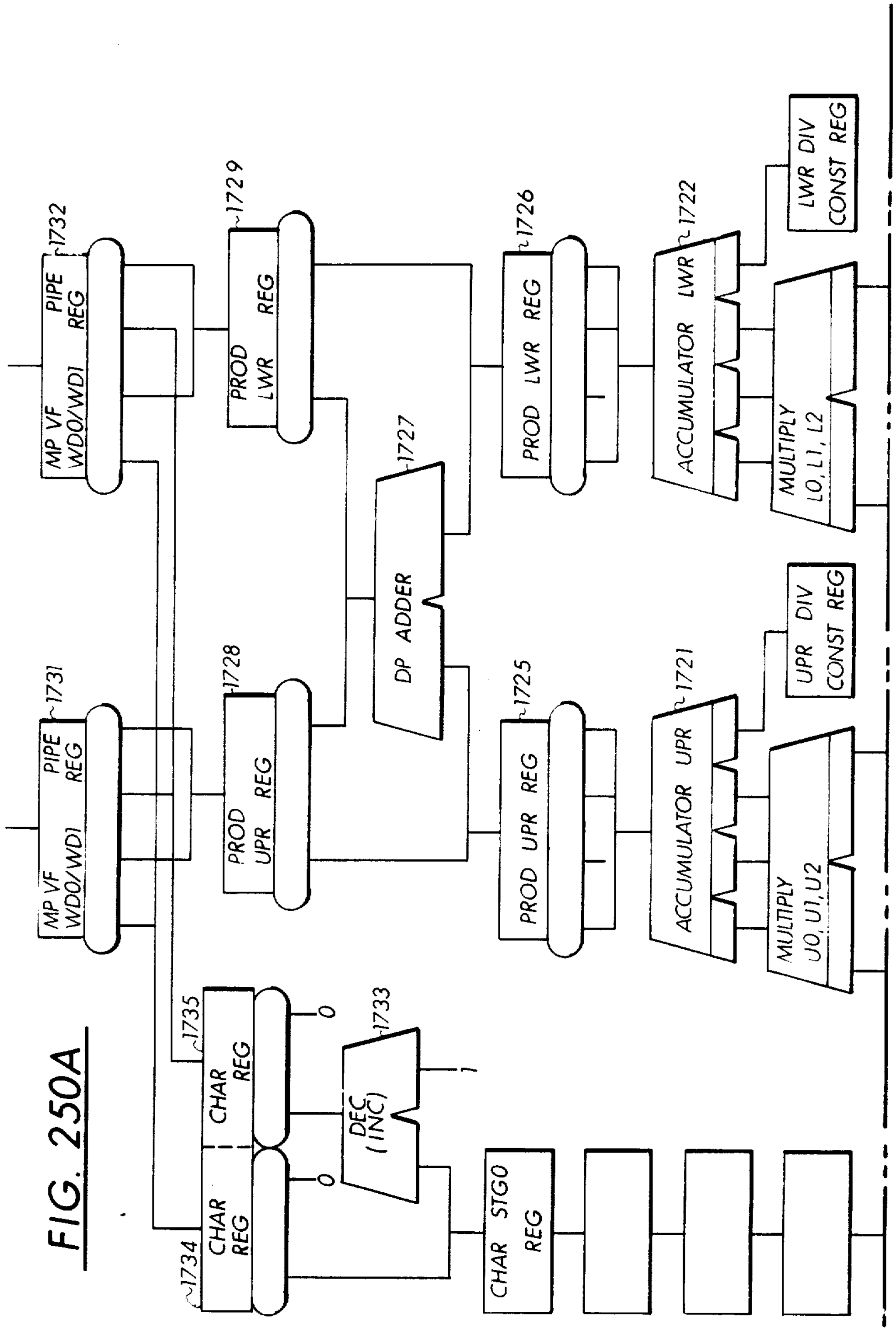
Figures 250, 250B:
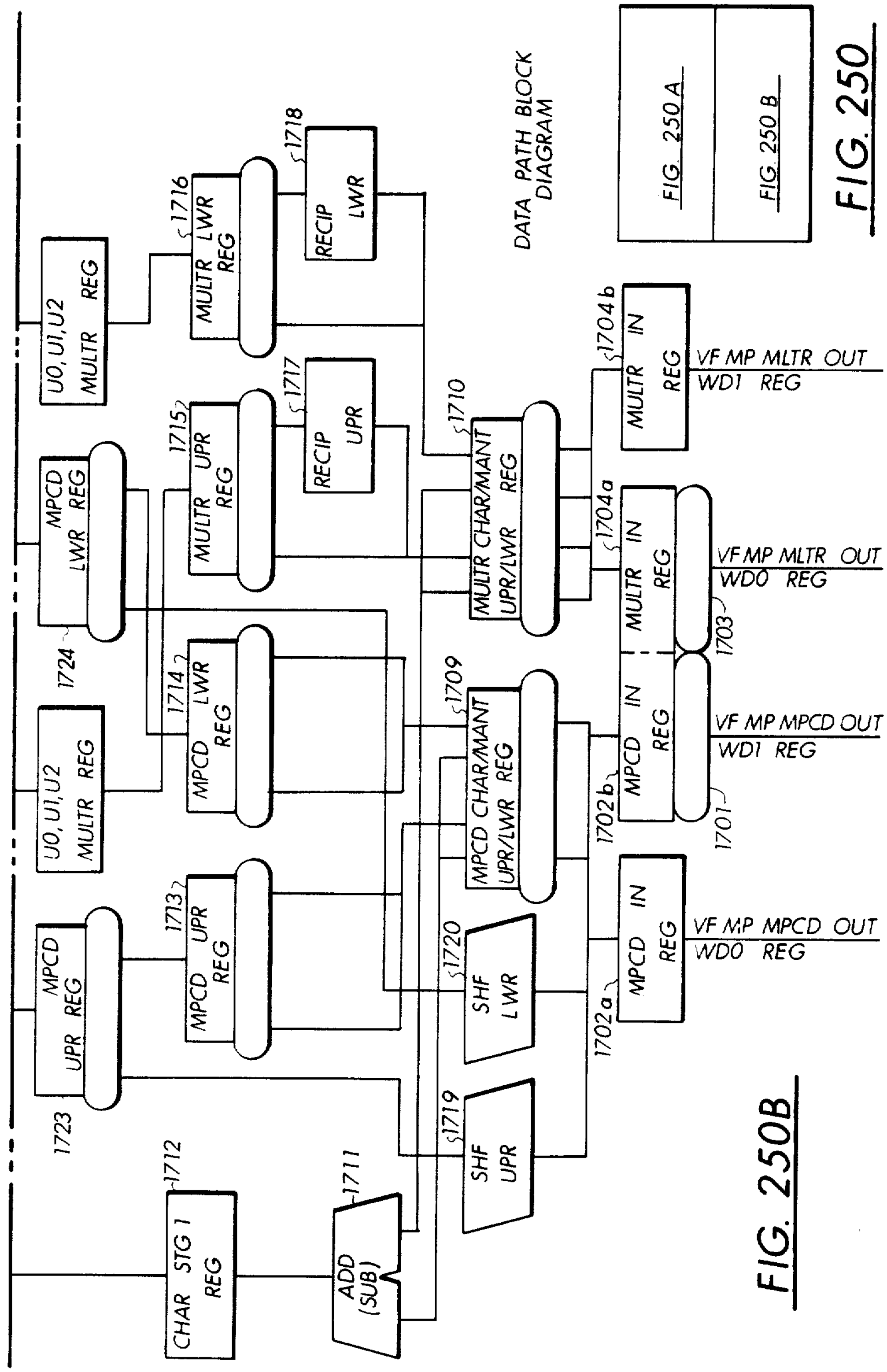
Figure 251:
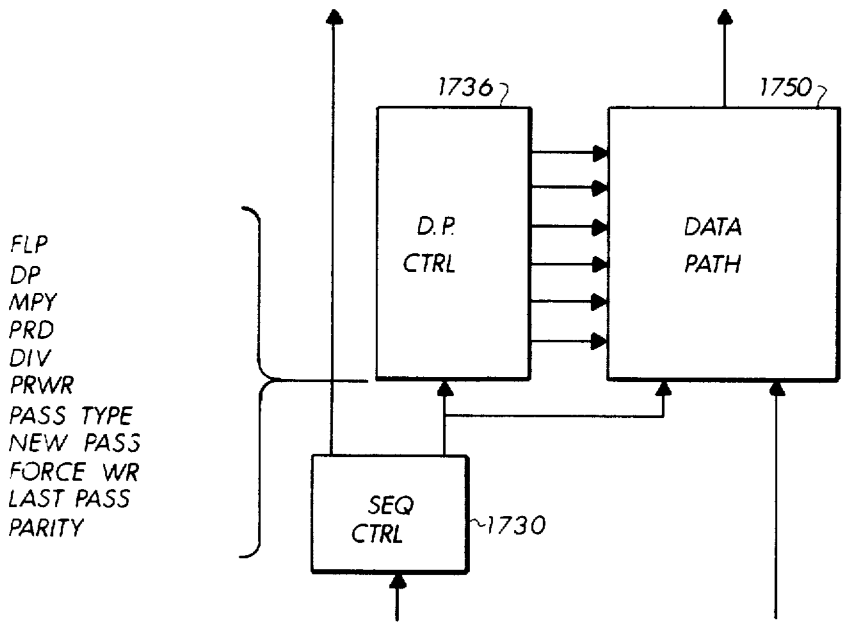
Figure 253:
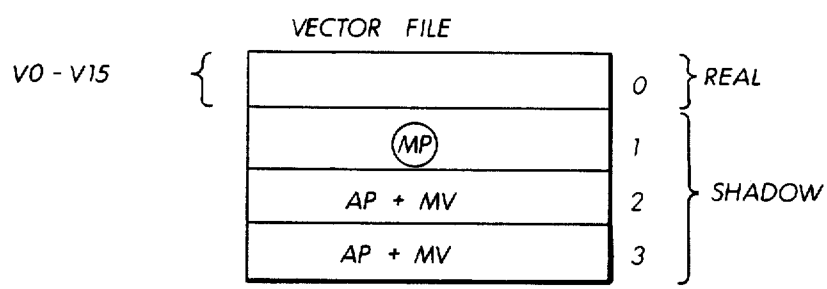
Figure 252A:
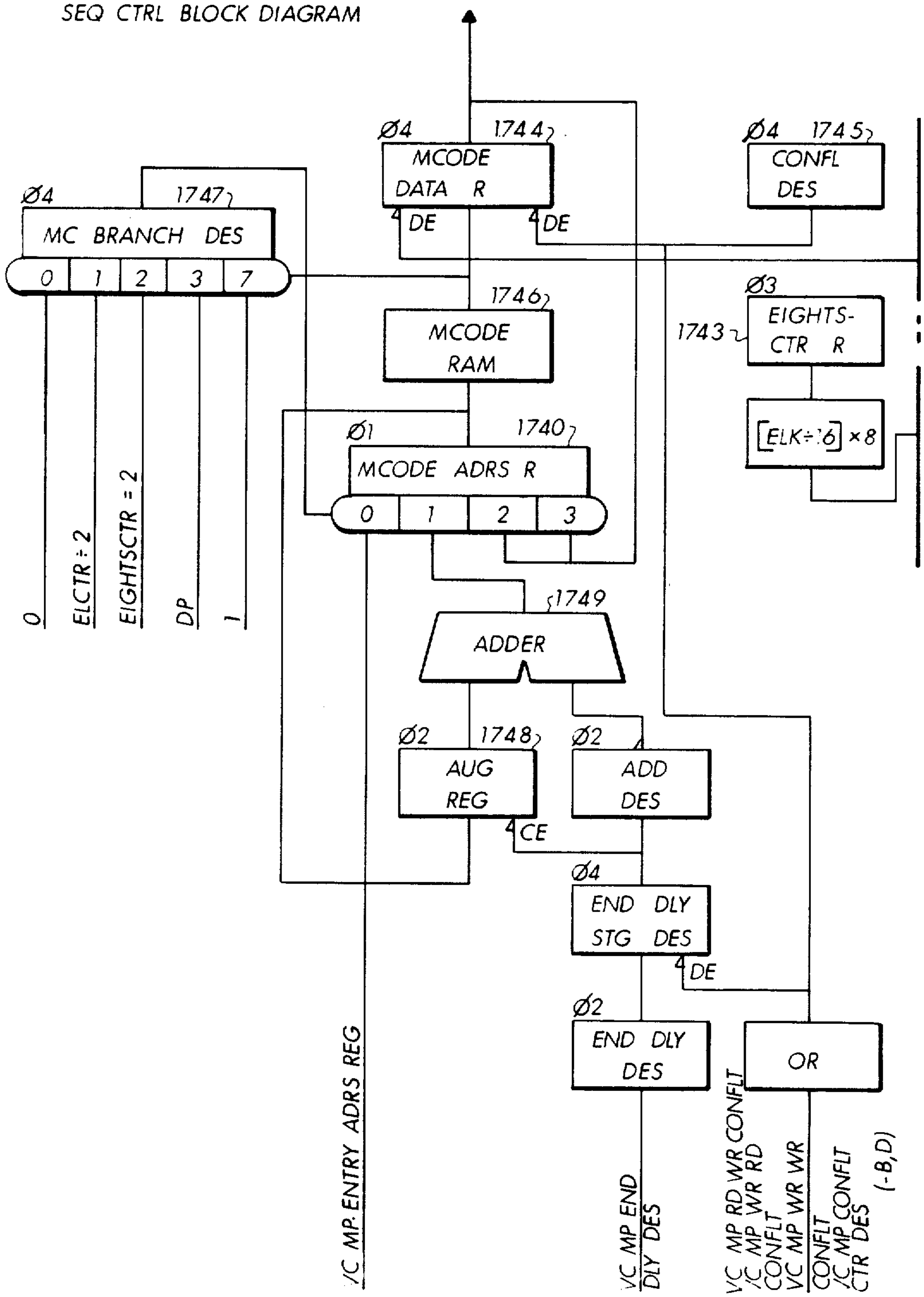
Figure 252B:
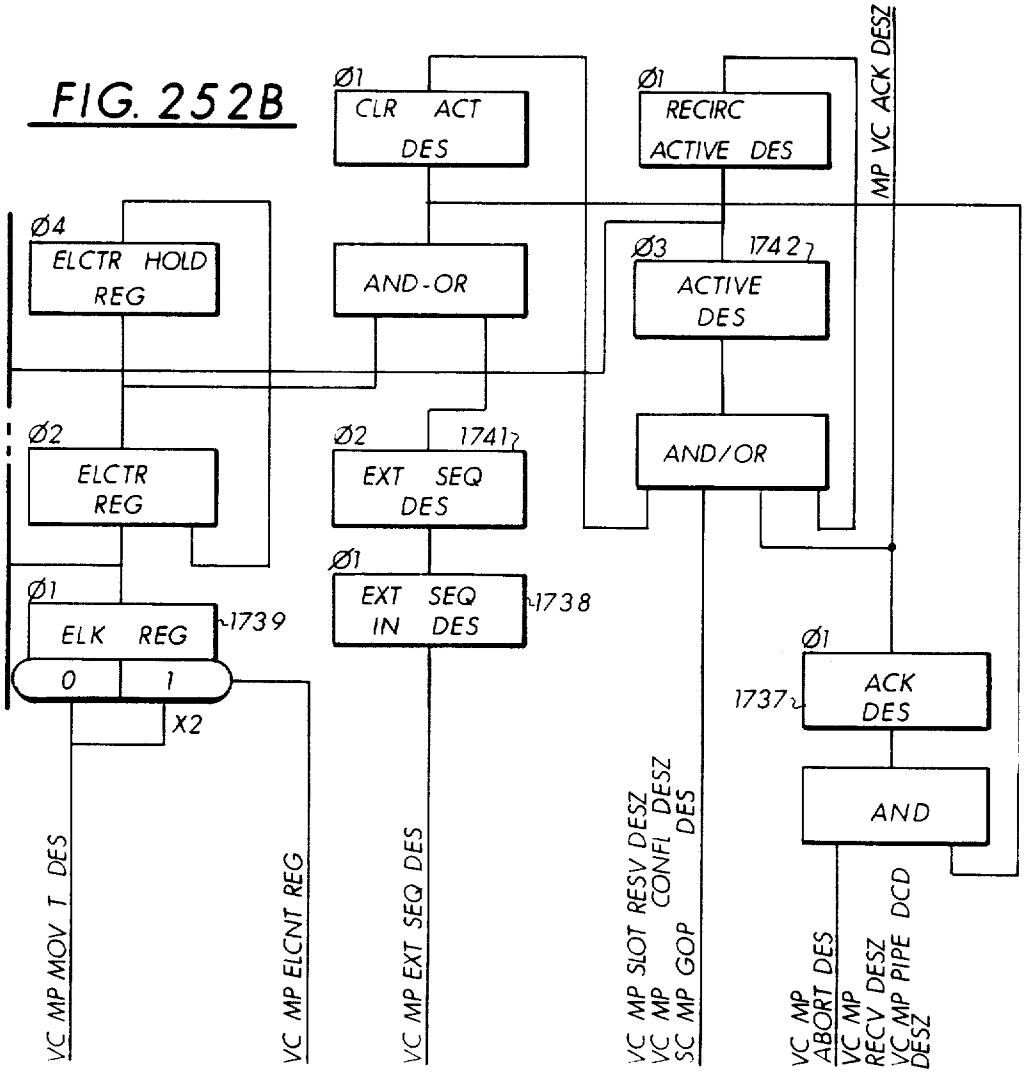
Figure 252:
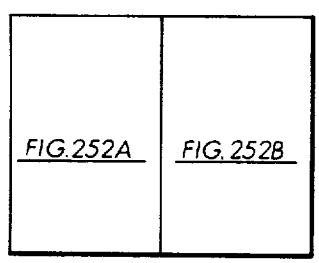
Figure 254:
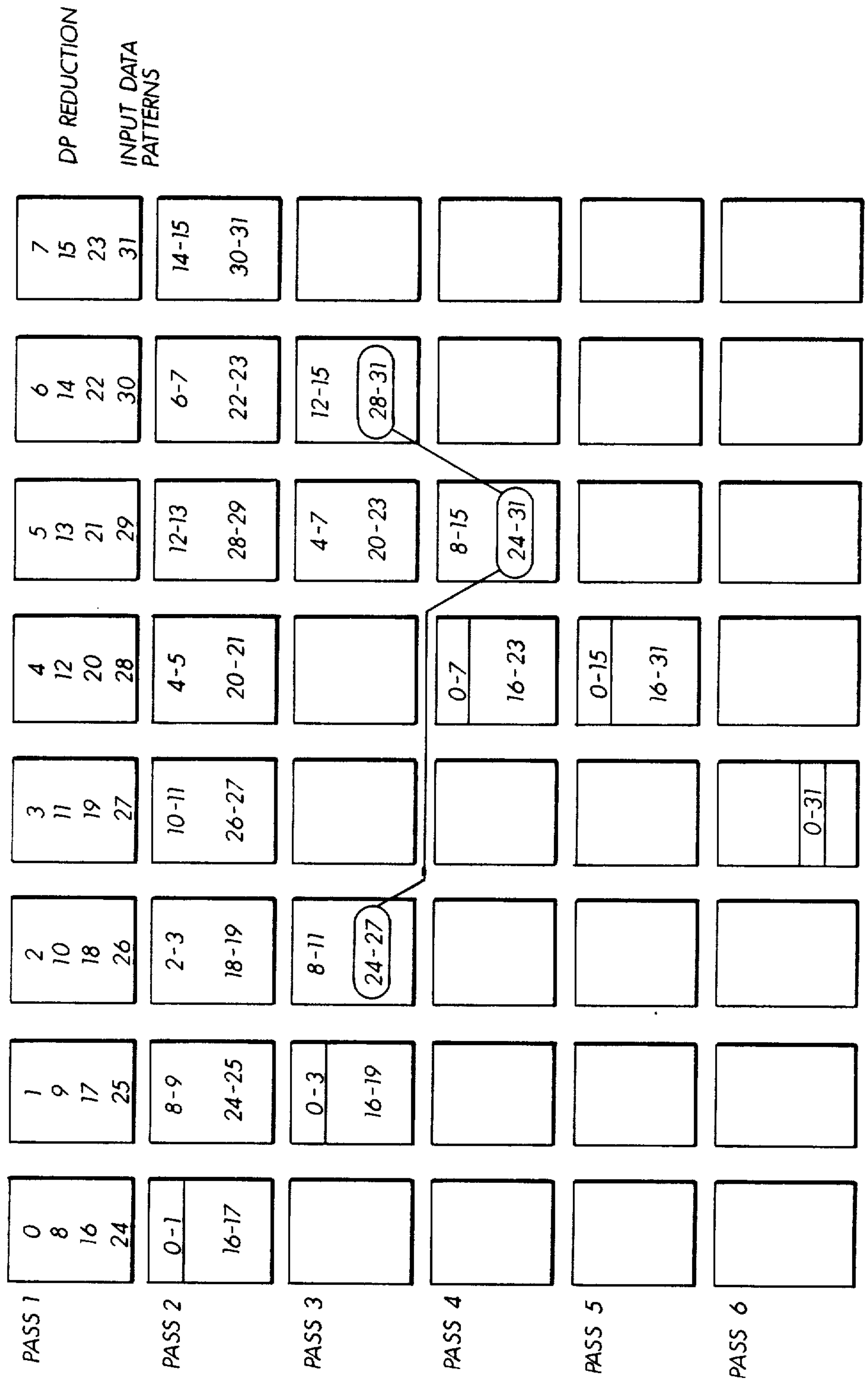
Figure 257:
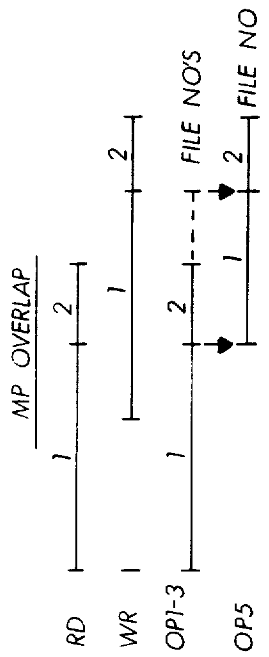
Figure 256:
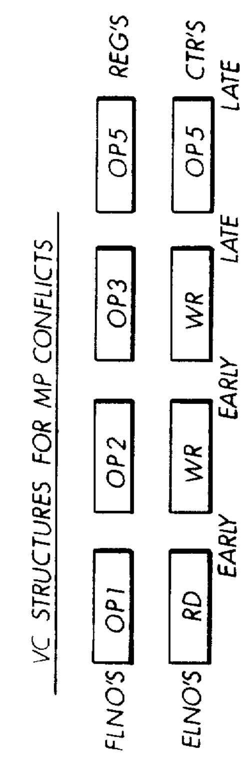
Figure 255:
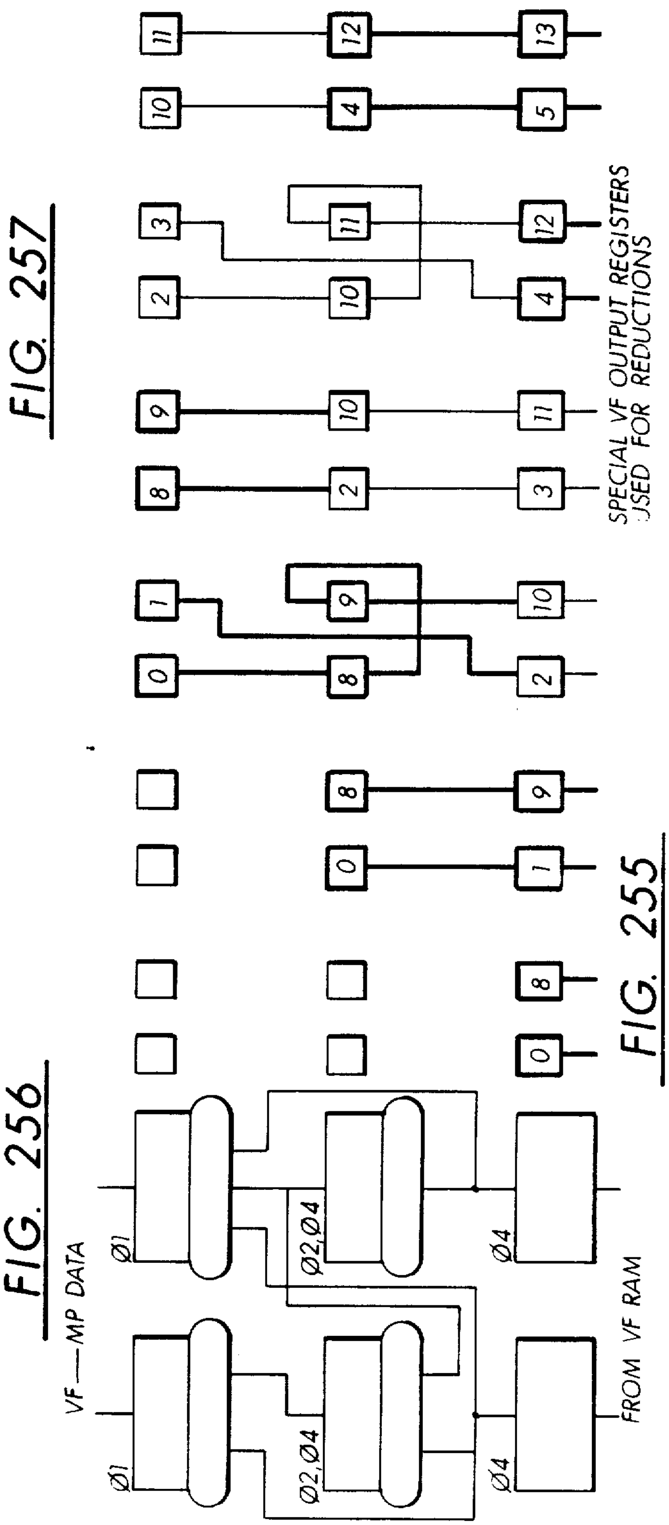
Figure 258:
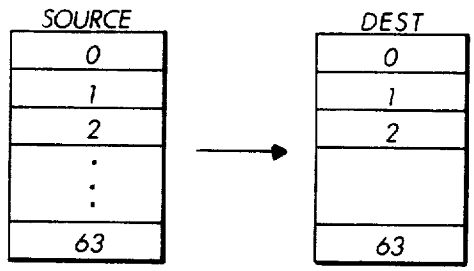
Figure 259:
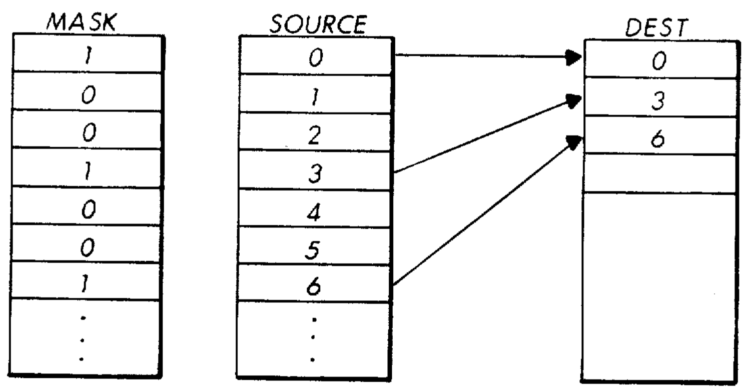
Figure 260:
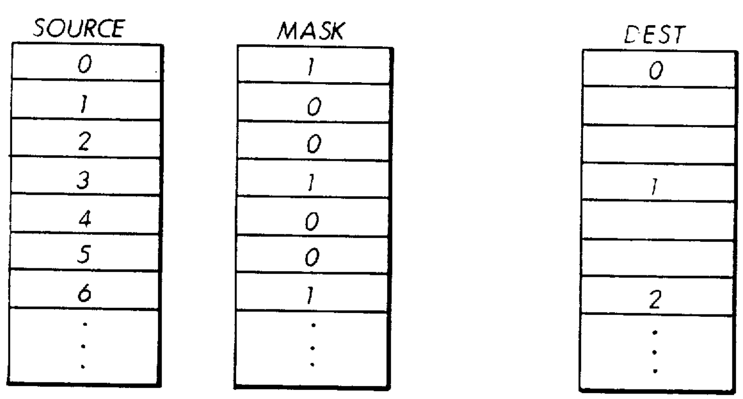
Figure 265:
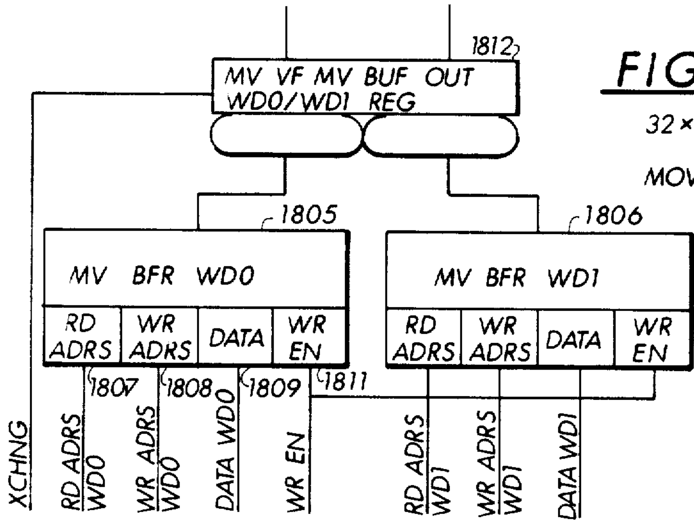
Figure 264:
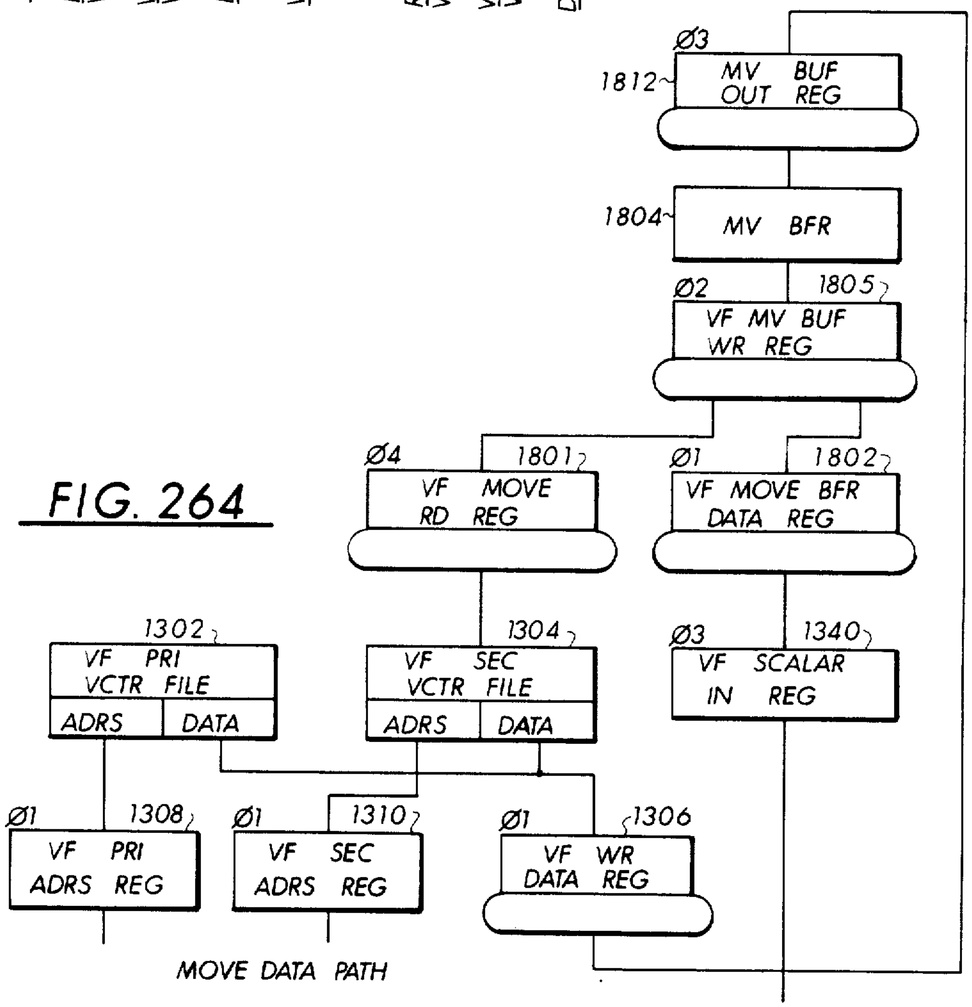
Figure 268:
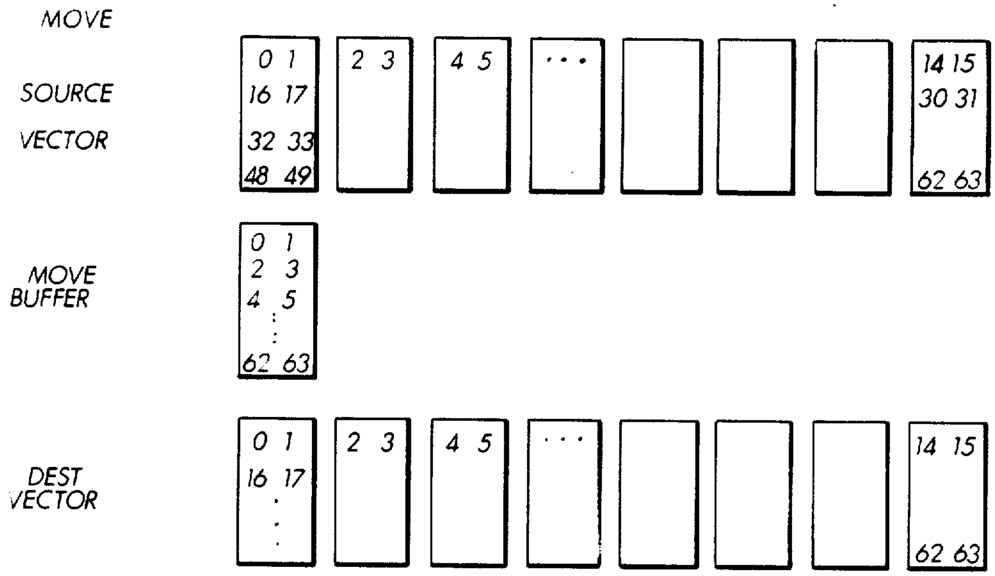
Figure 269:
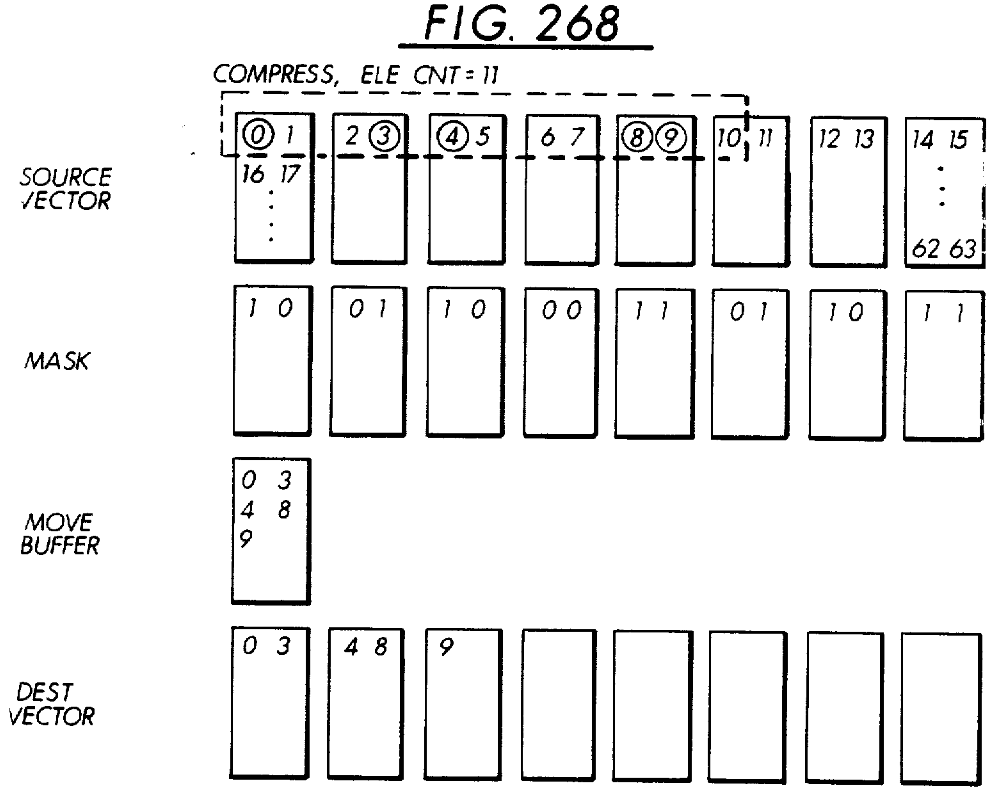
Figure 271:
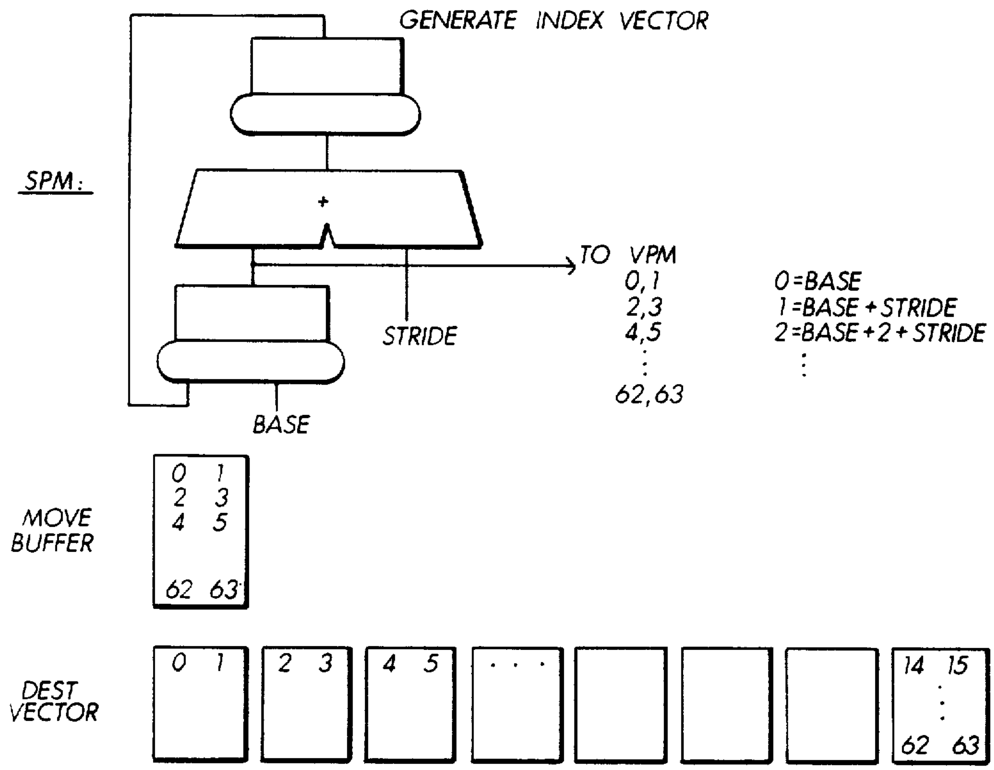
Figure 270:
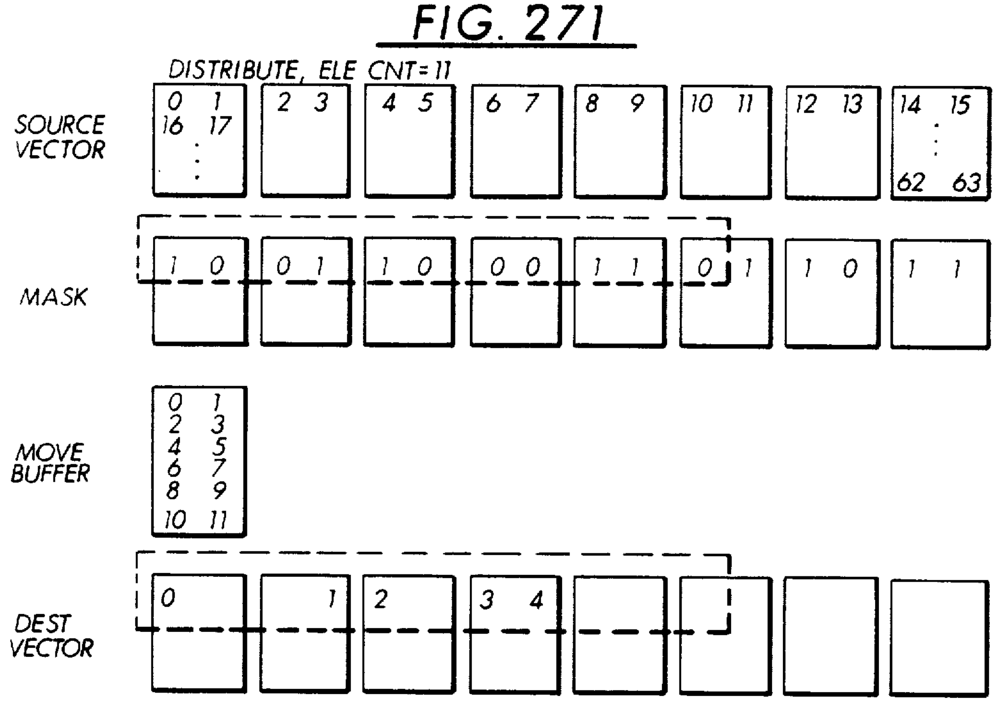
Figure 273:
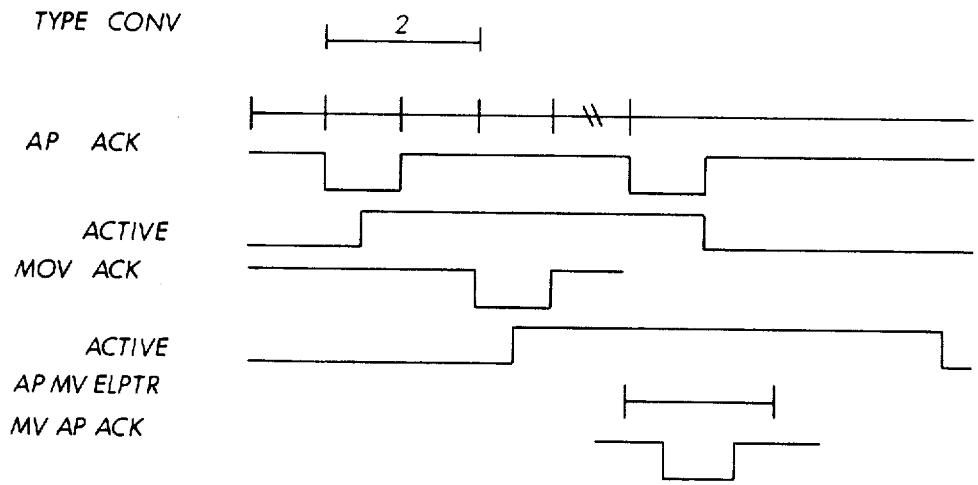
Figure 272:
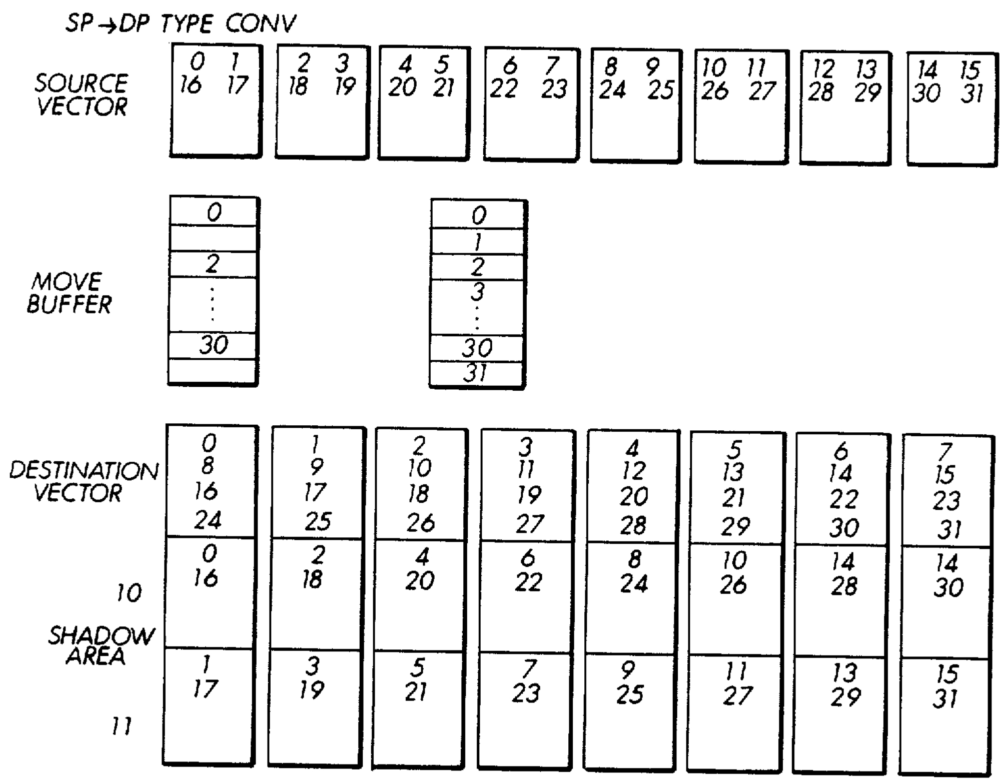
Figure 275:
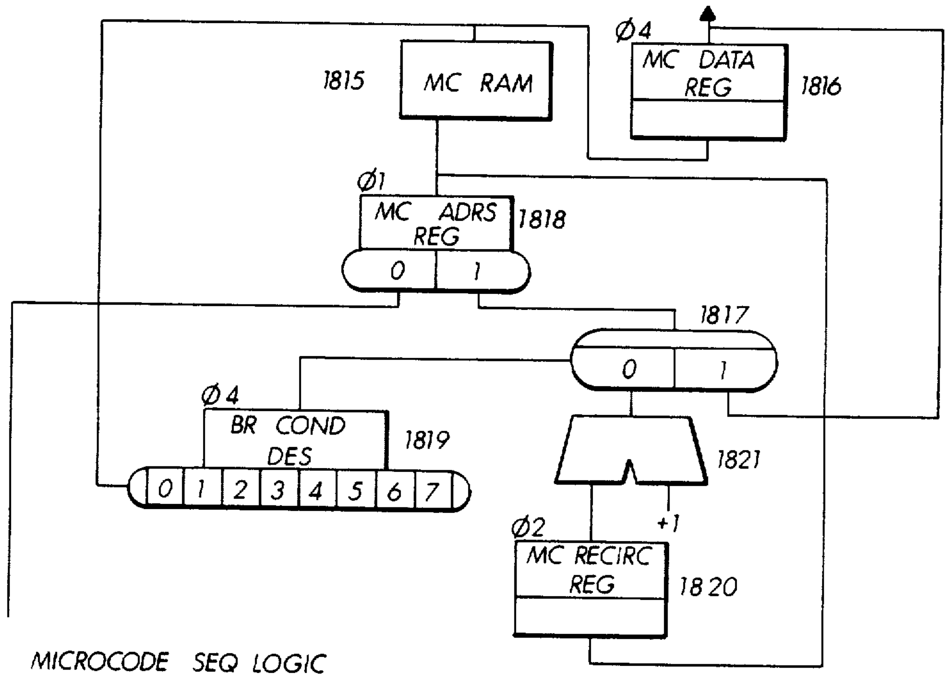
Figure 274:
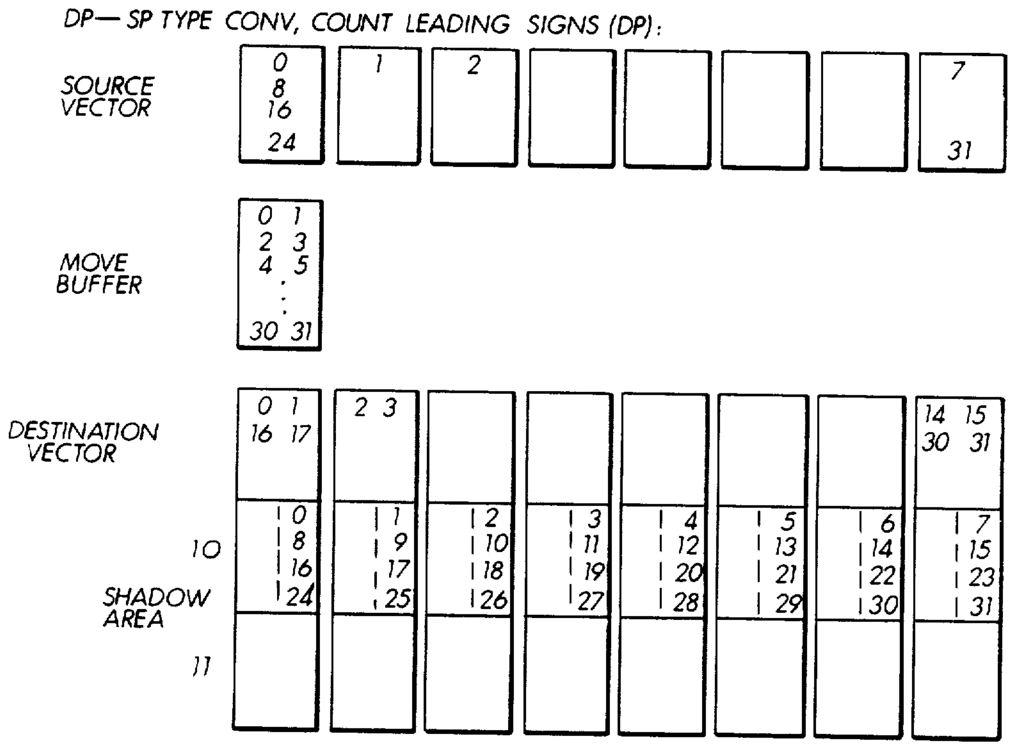
Figure 276:
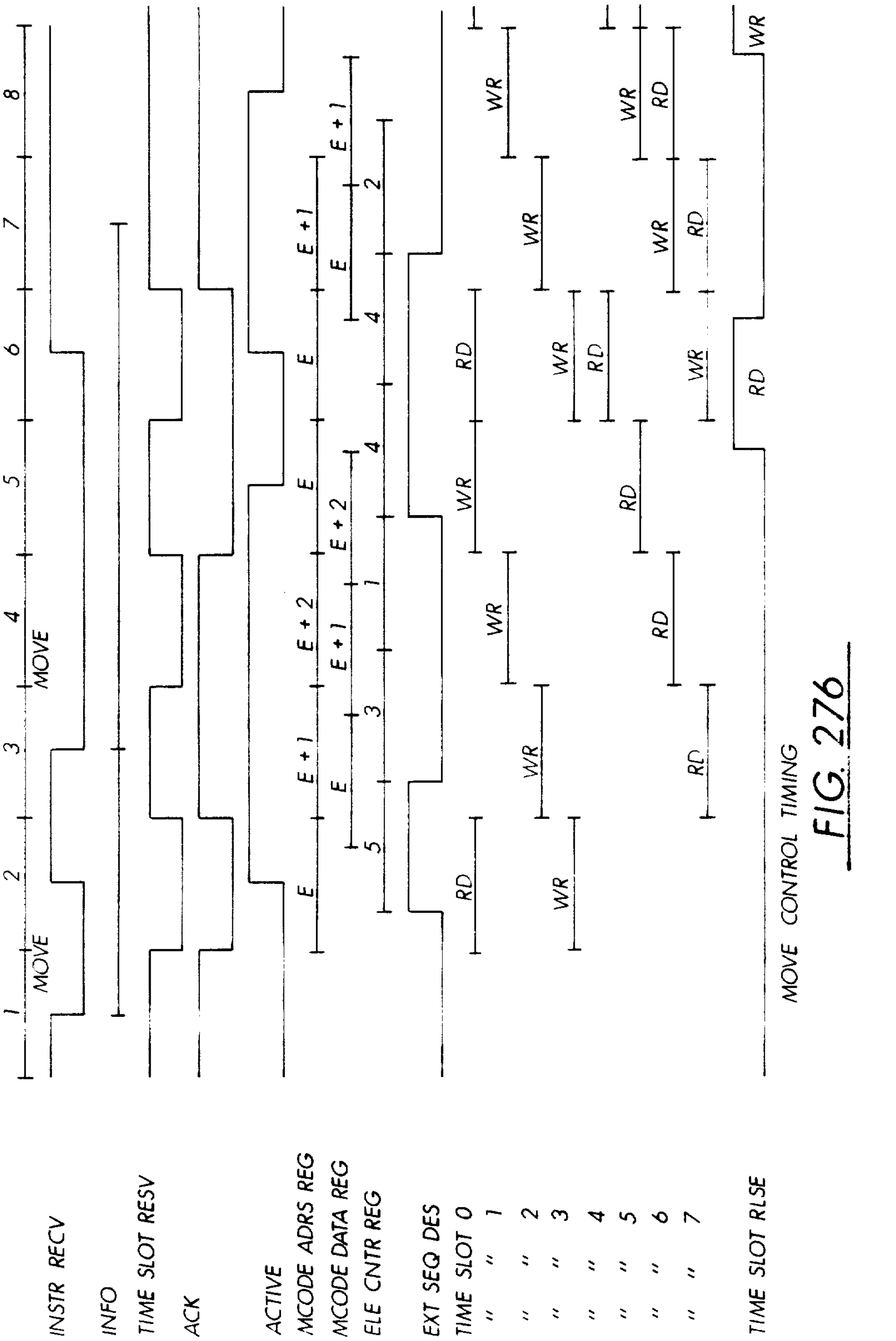
Figures 277, 278:
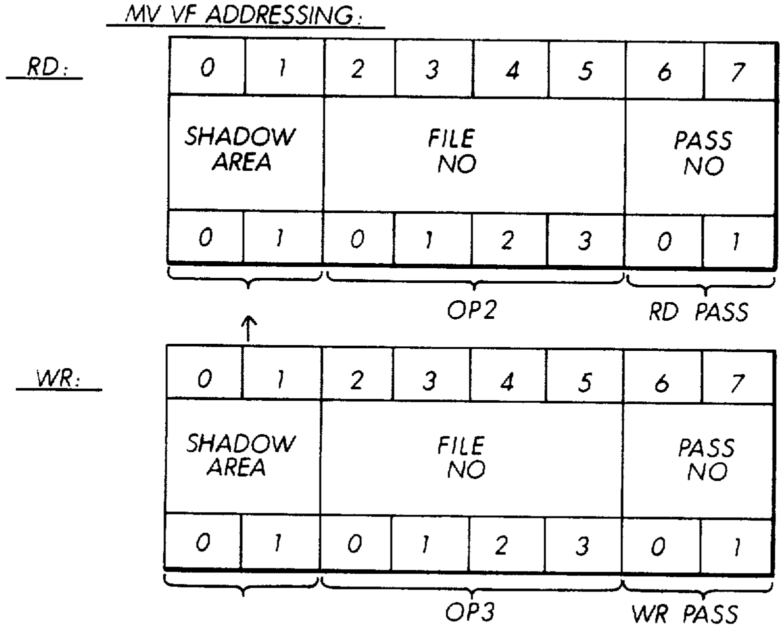
Figure 280:
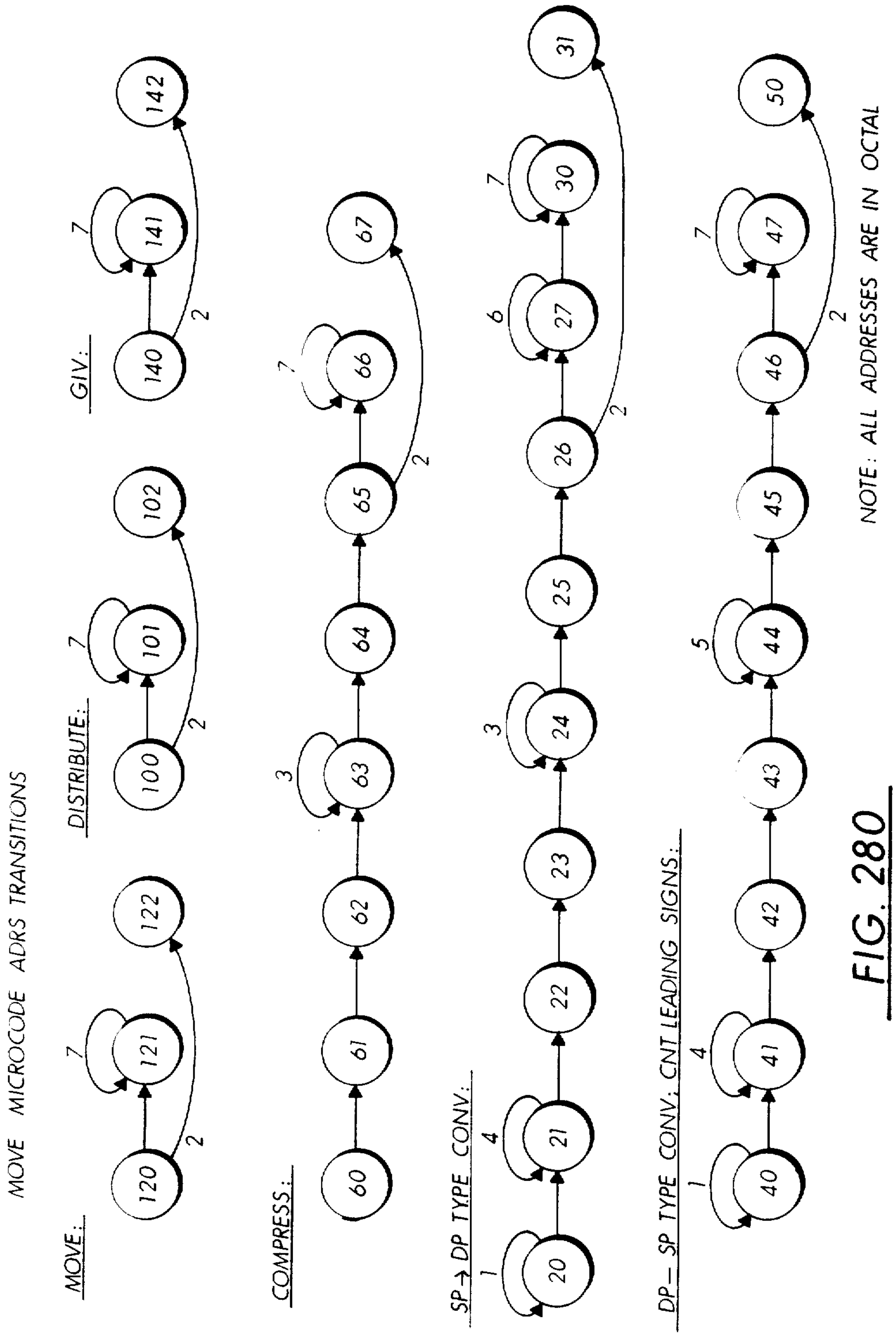
Figure 281:
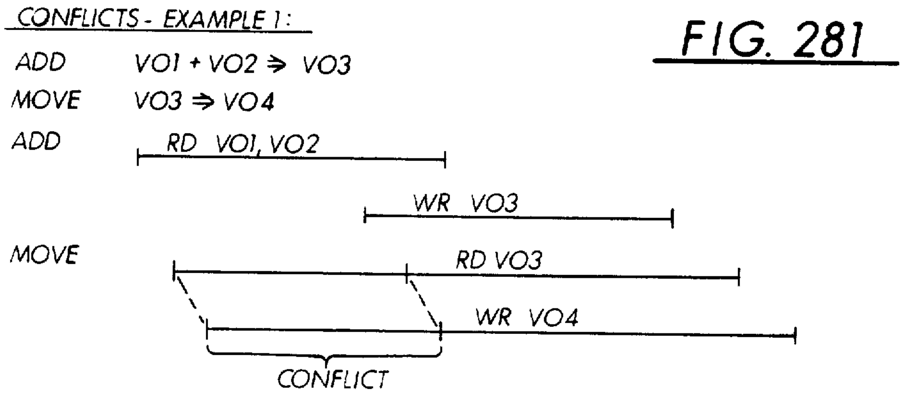
Figure 282:
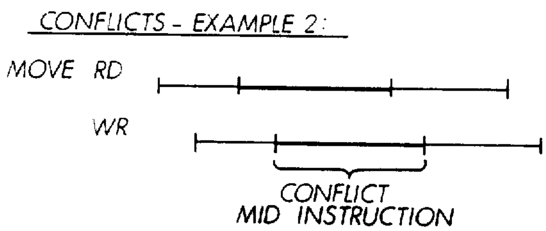
Figure 283:
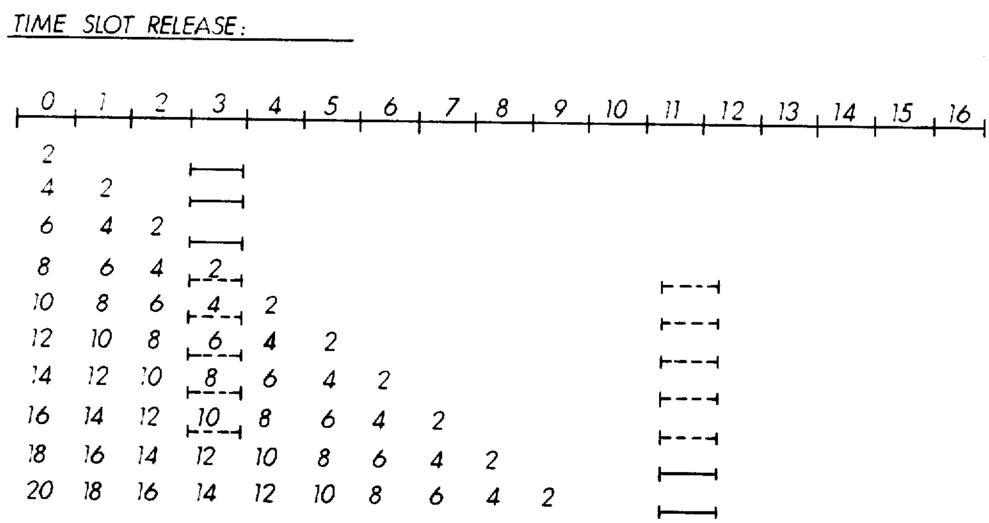
Figure 284:
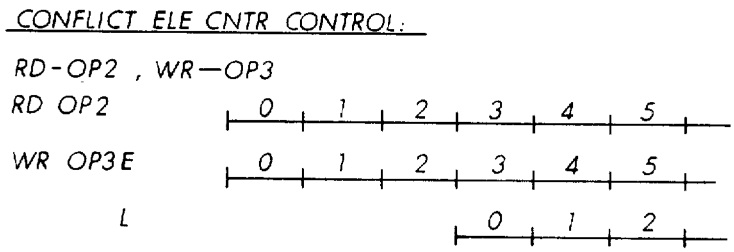
Figure 285:
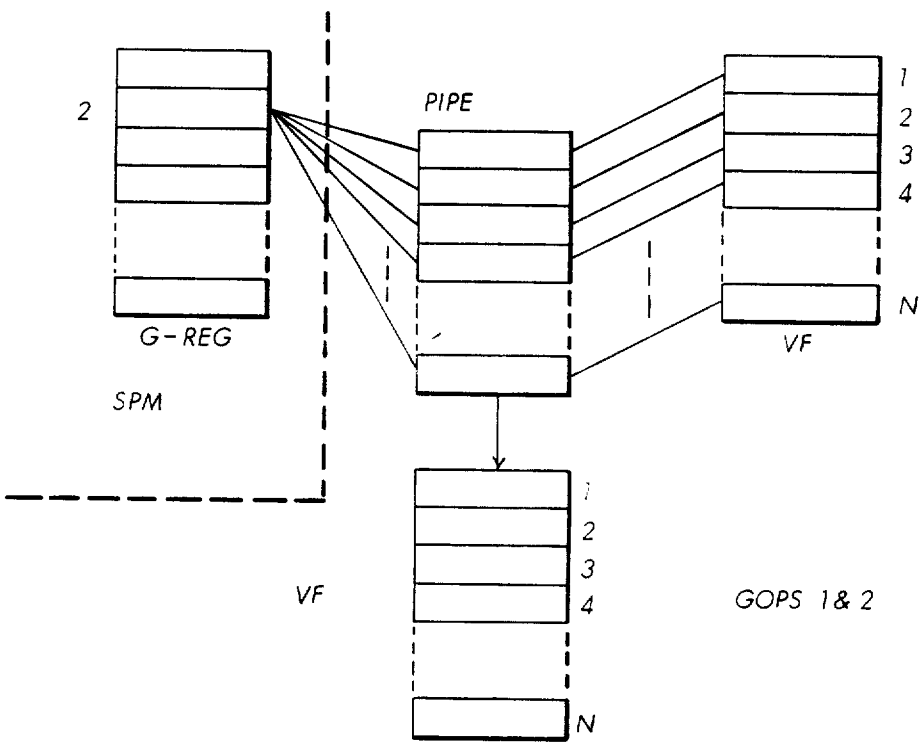
Figure 286:
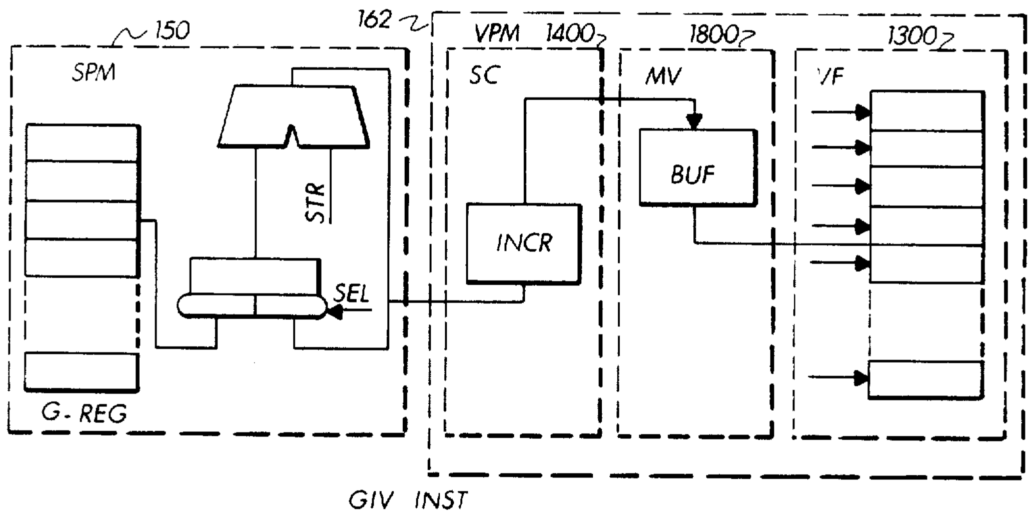
Figure 287:
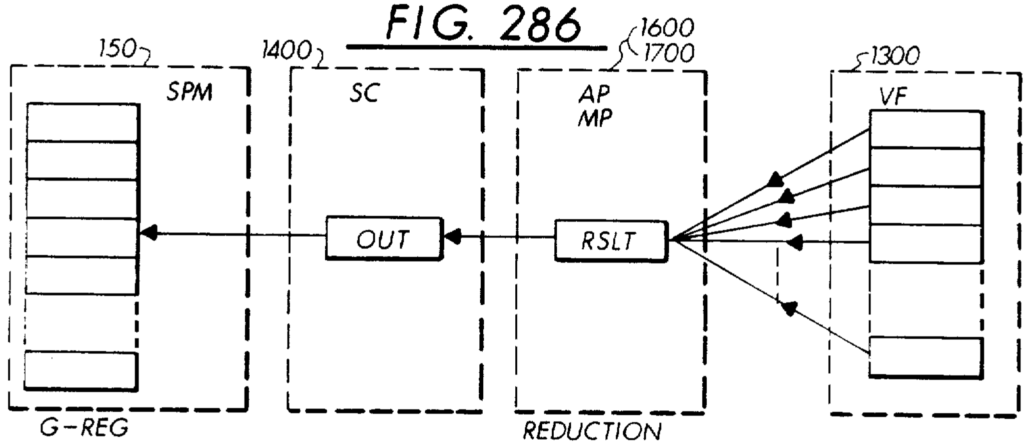
Figure 288:
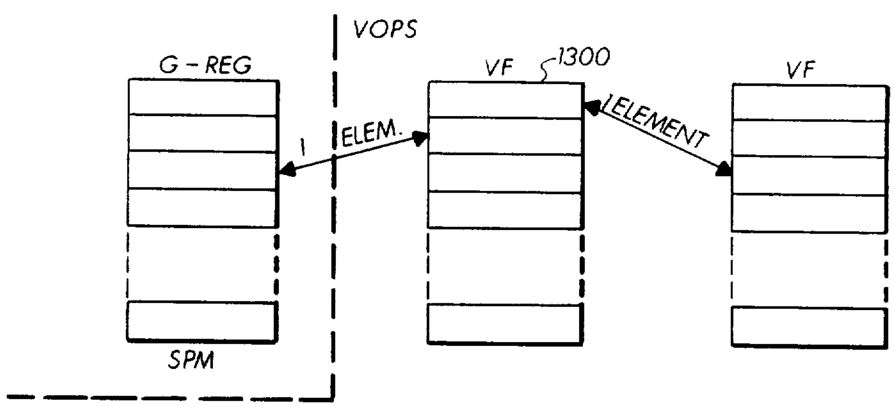
Figure 289:
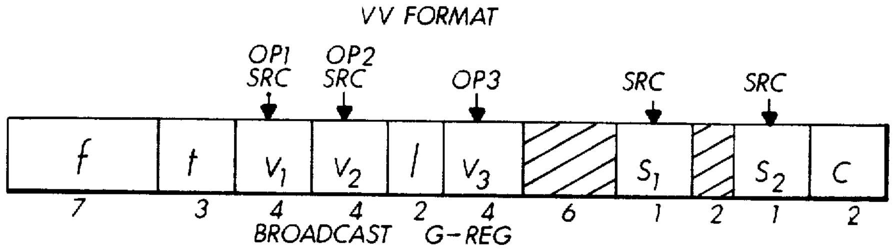
Figure 290:
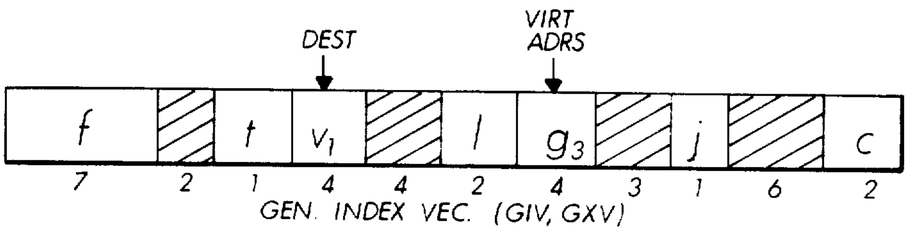
Figure 291:
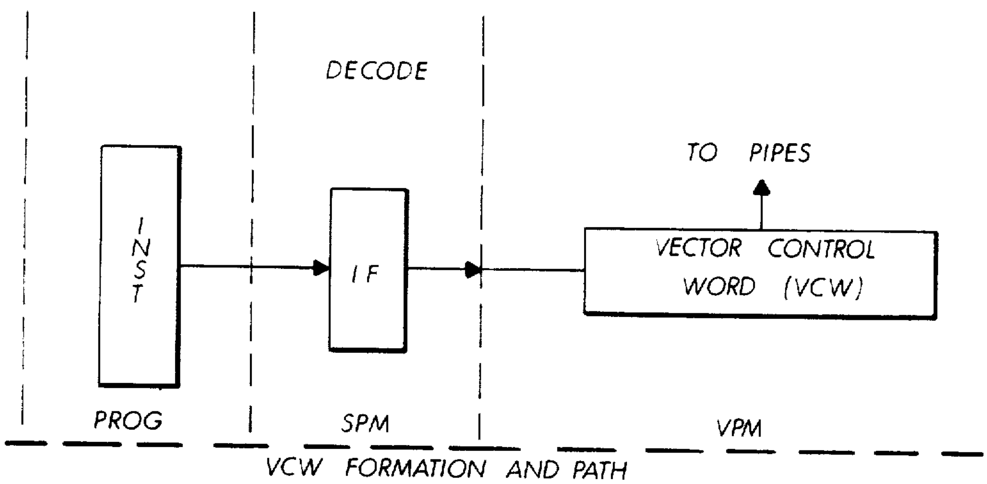
Figure 292:
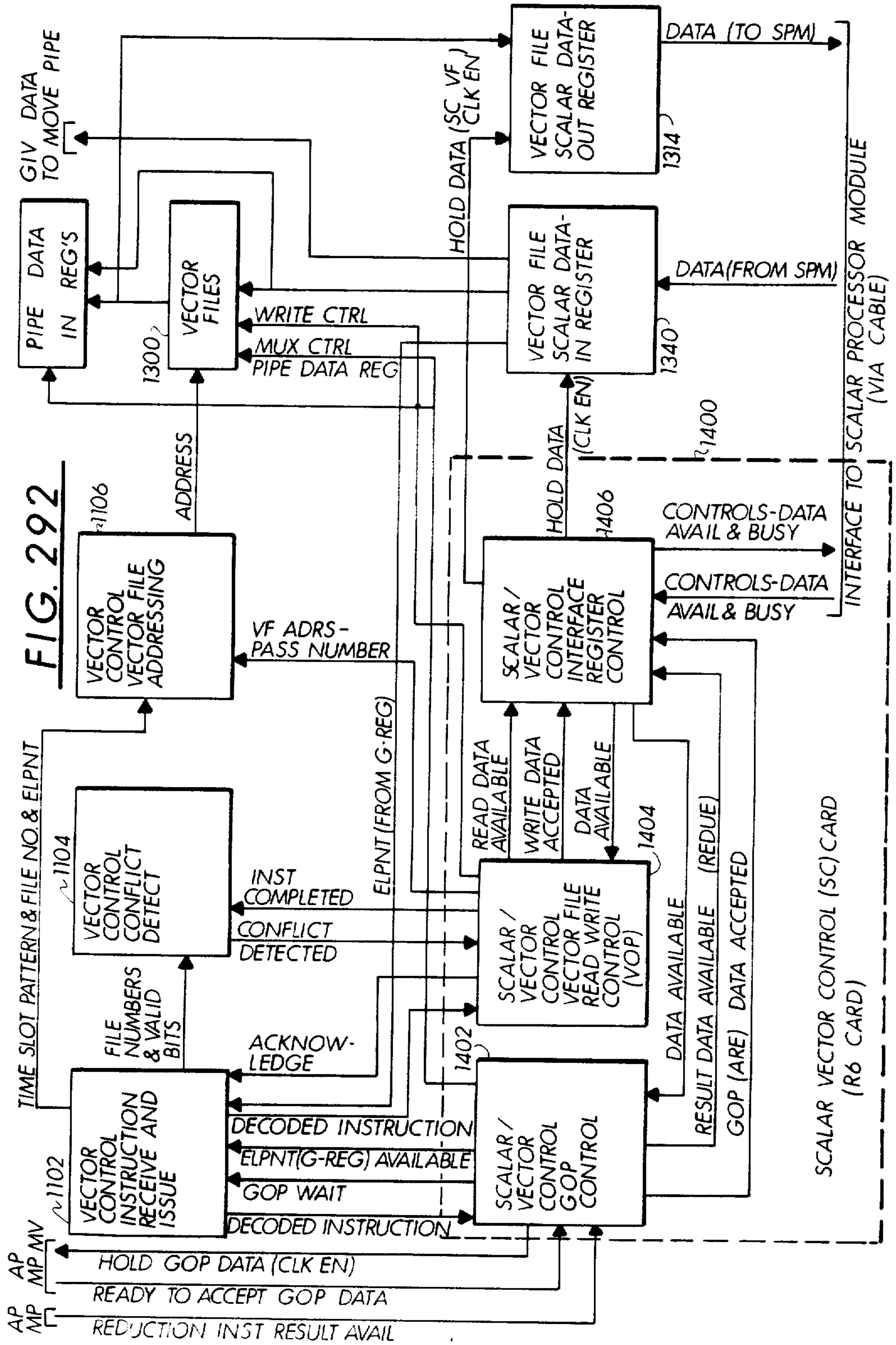
Figure 293:
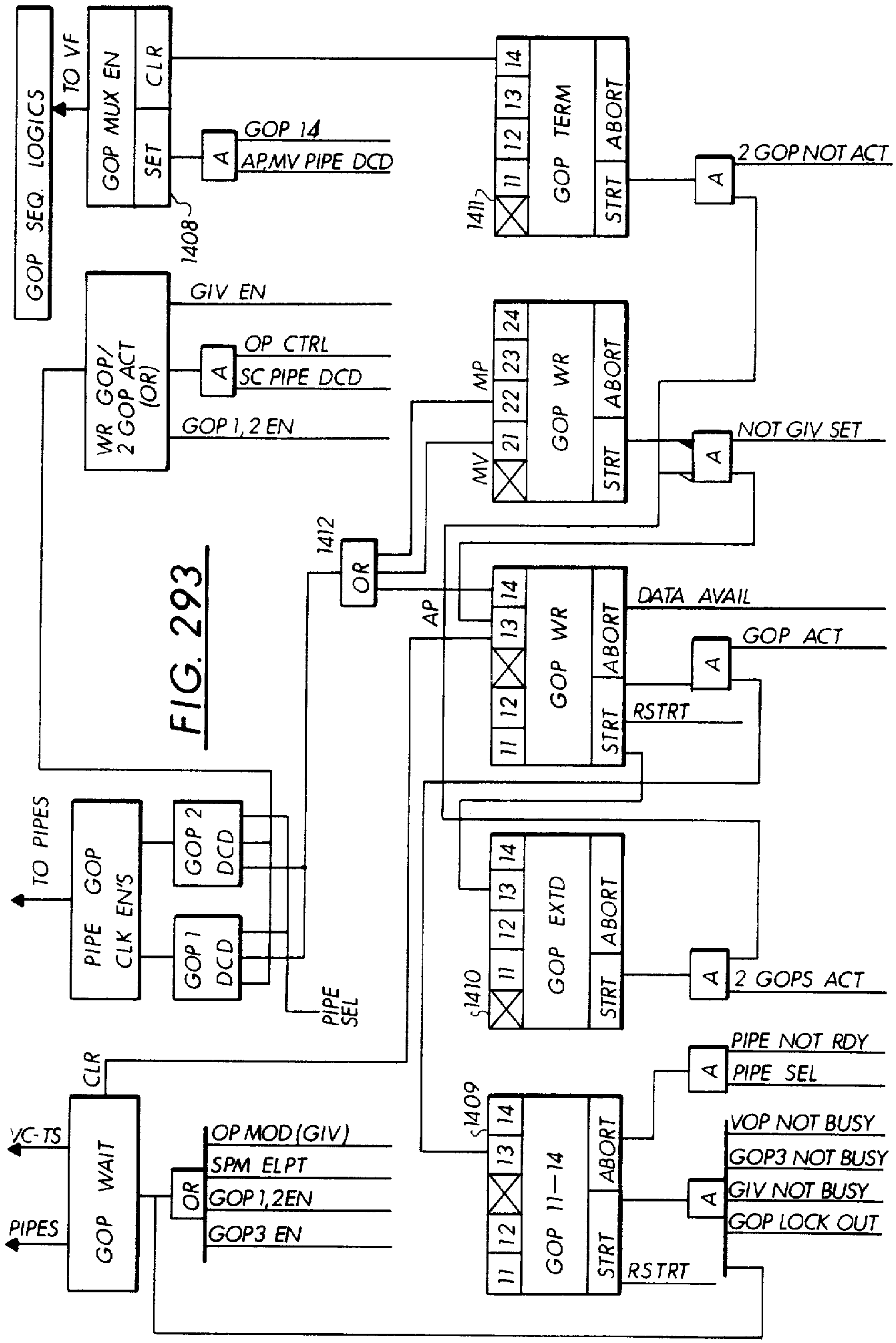
Figure 294:
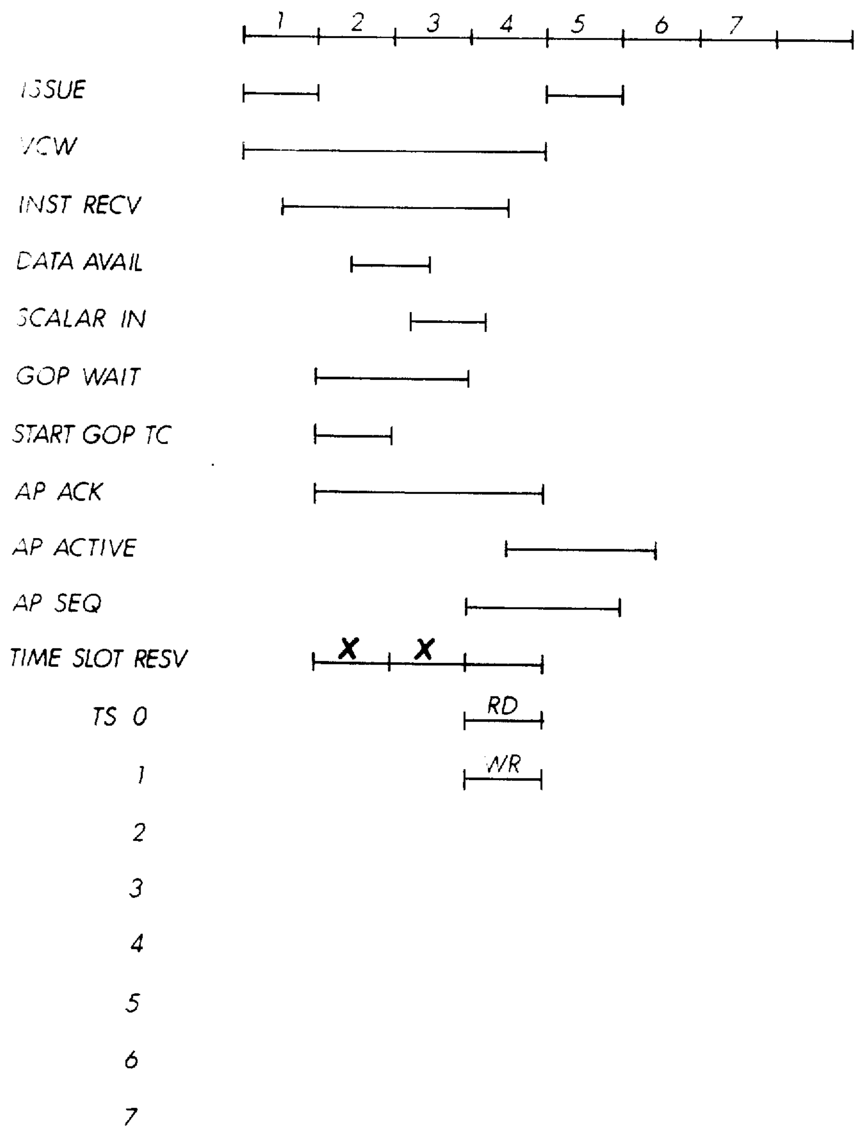
Figure 298:
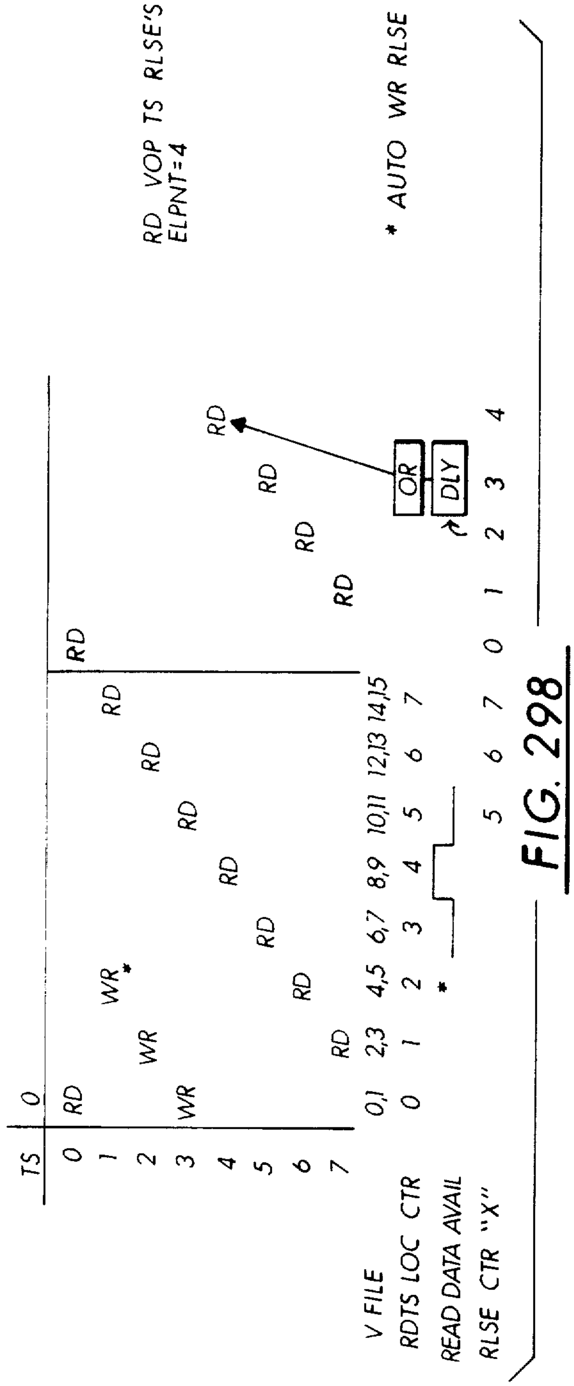
Figure 297A:
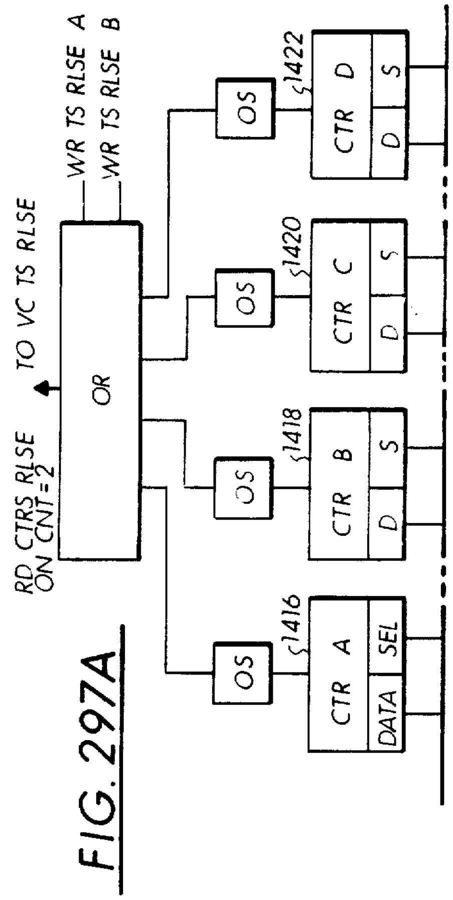
Figure 297:
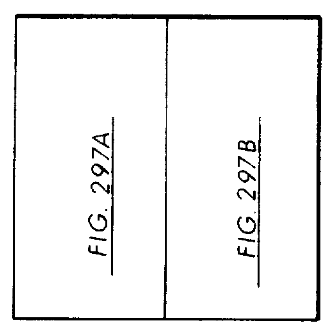
Figure 297B:
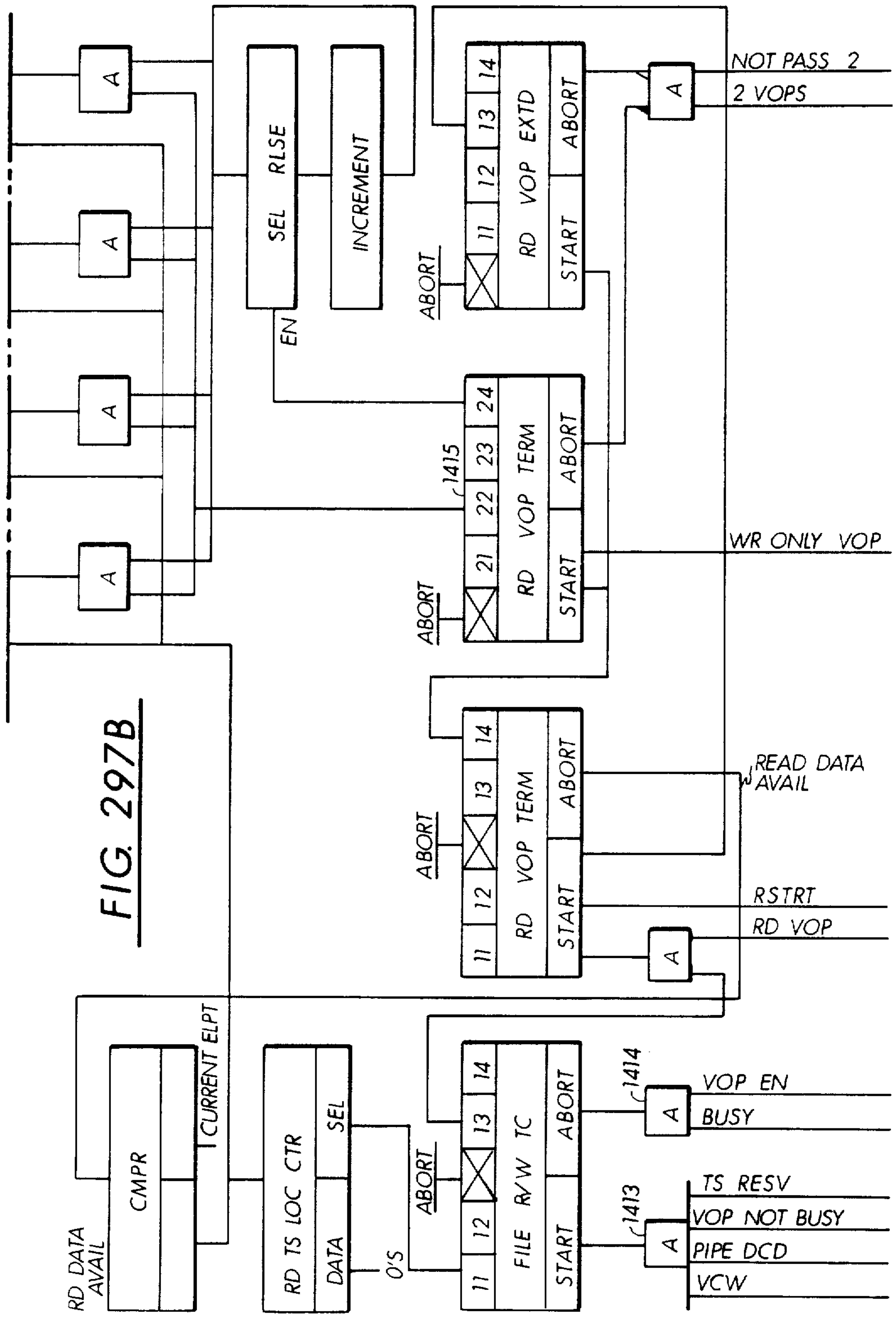
Figure 299:
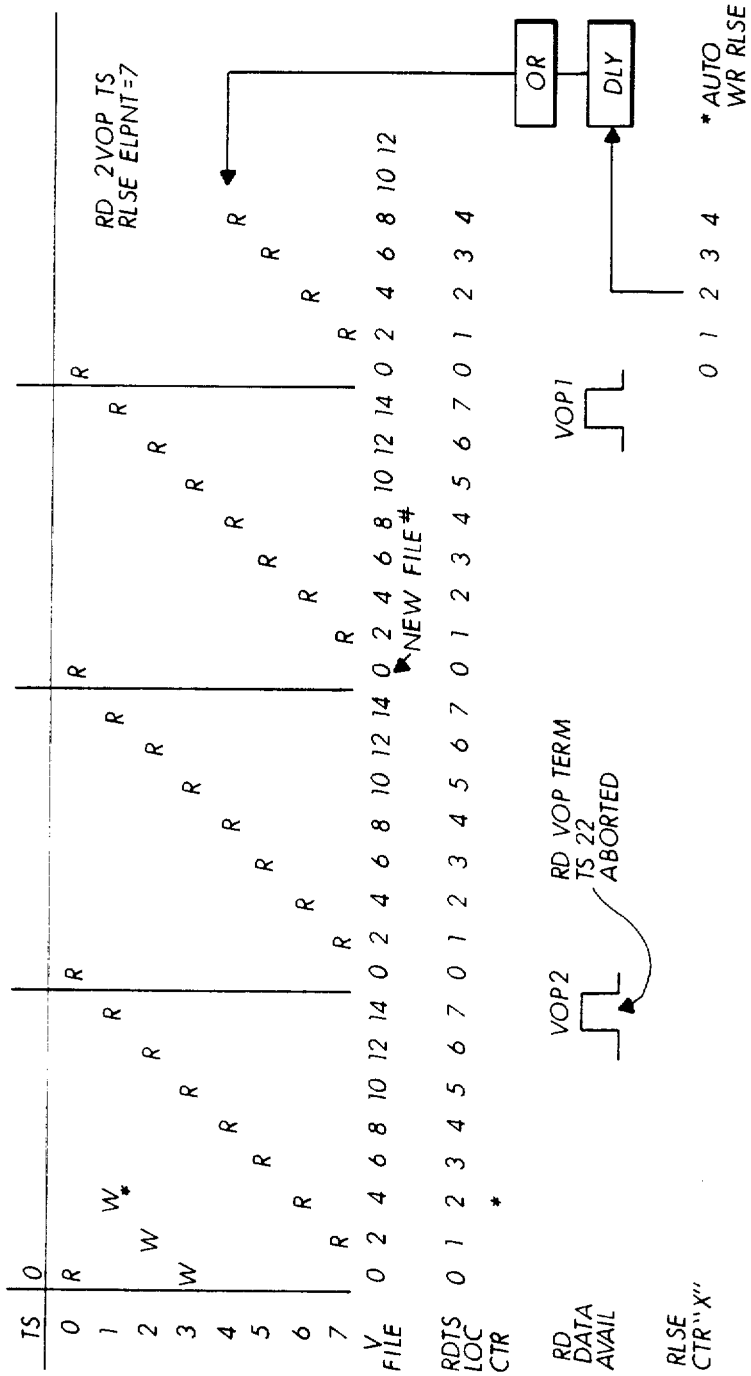
Figure 301:
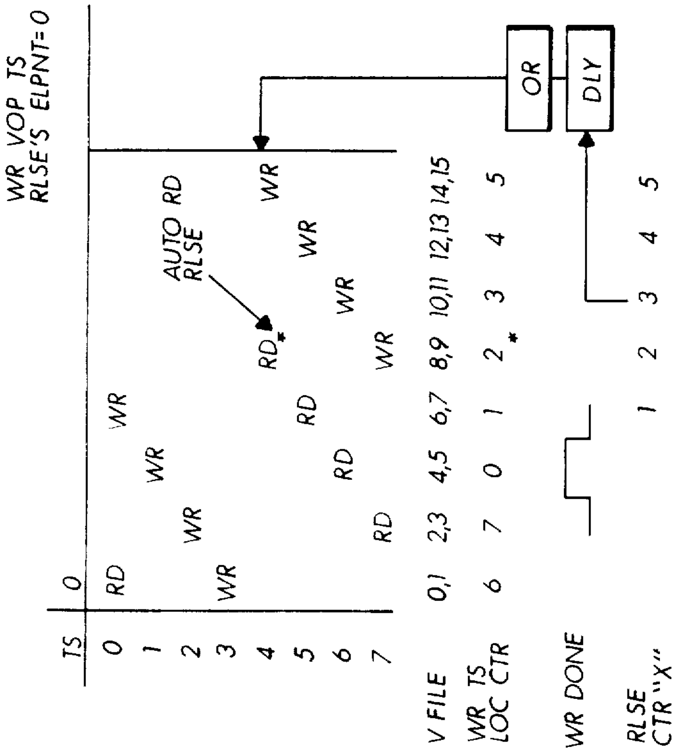
Figure 300:
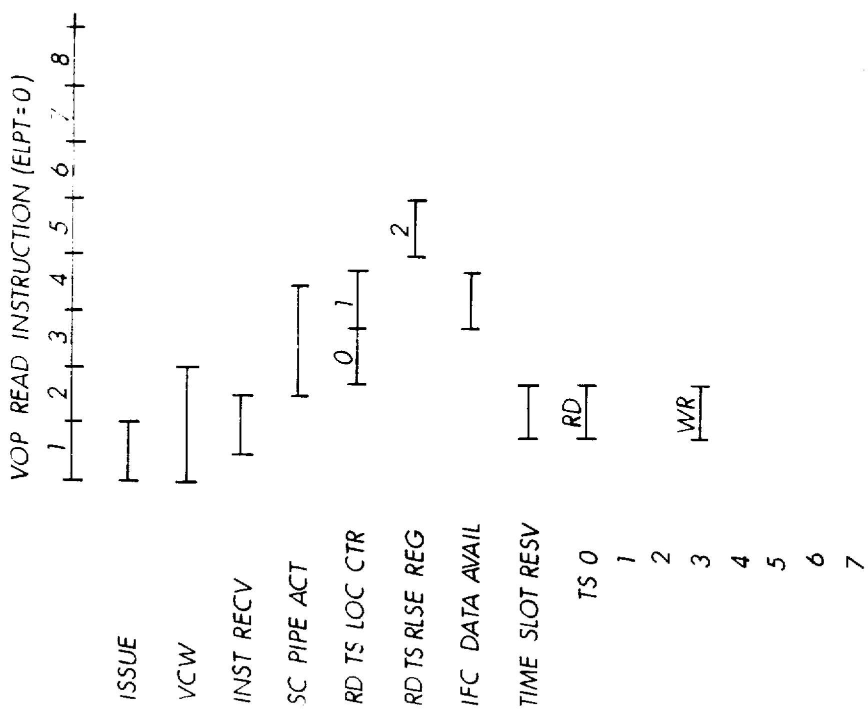
Figure 302:
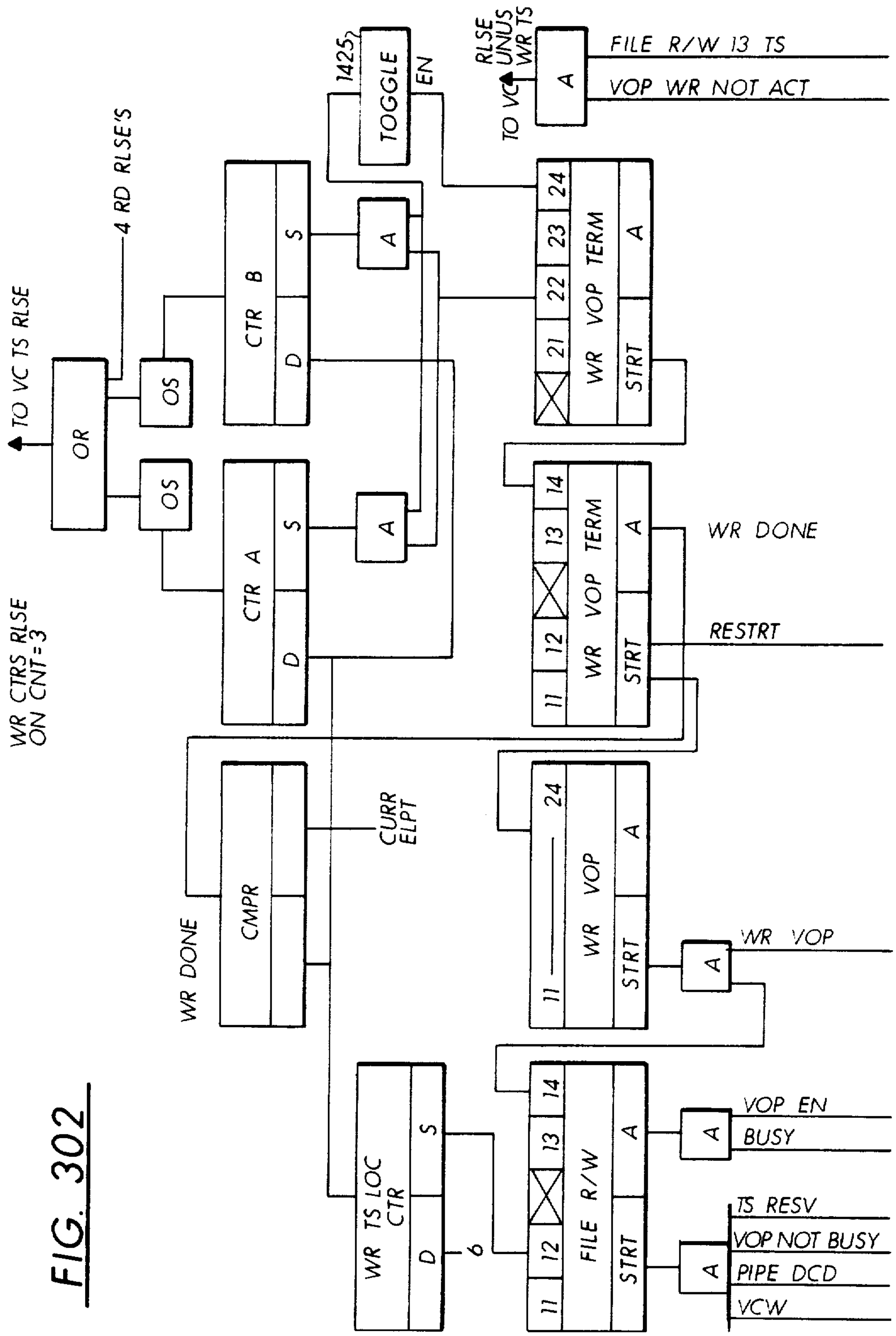
Figure 303:
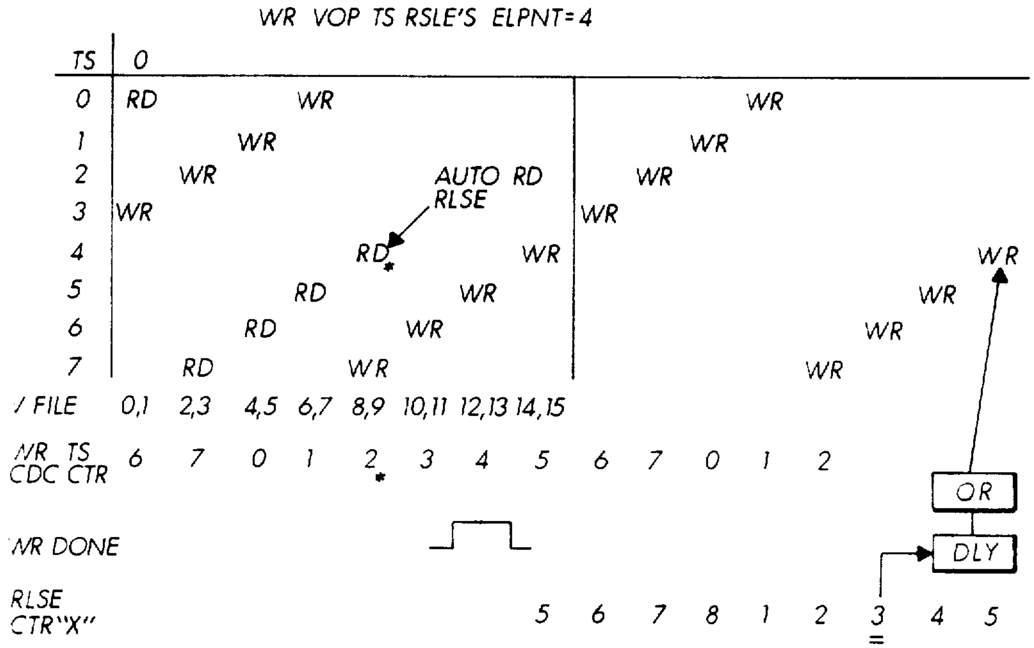
Figure 304:
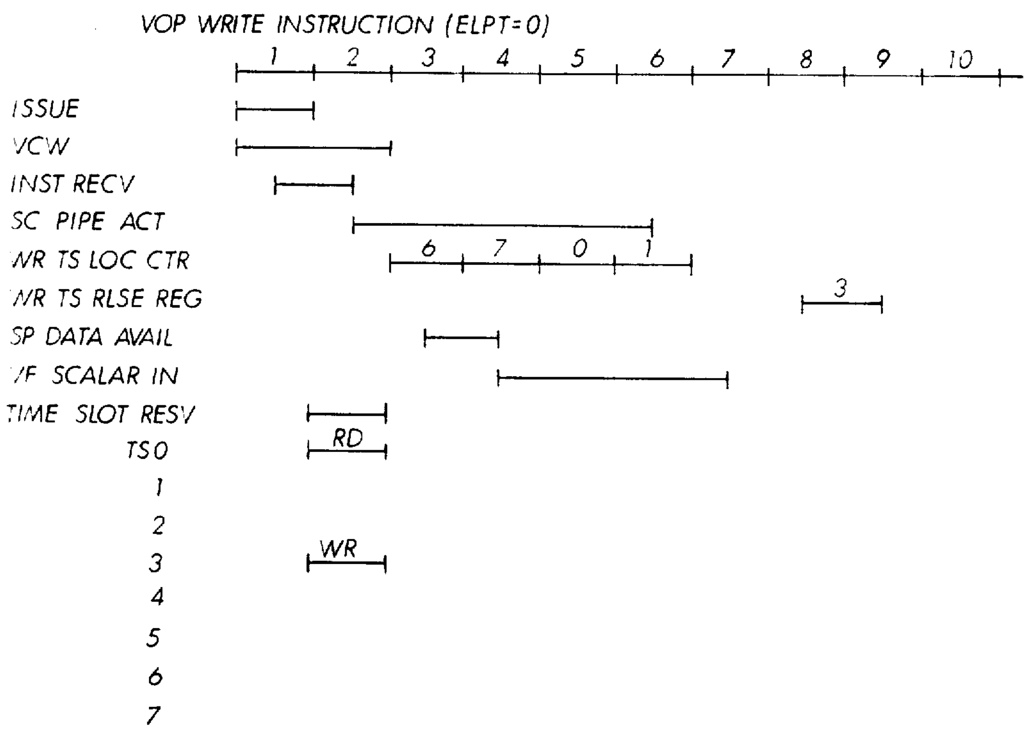
Figure 305:
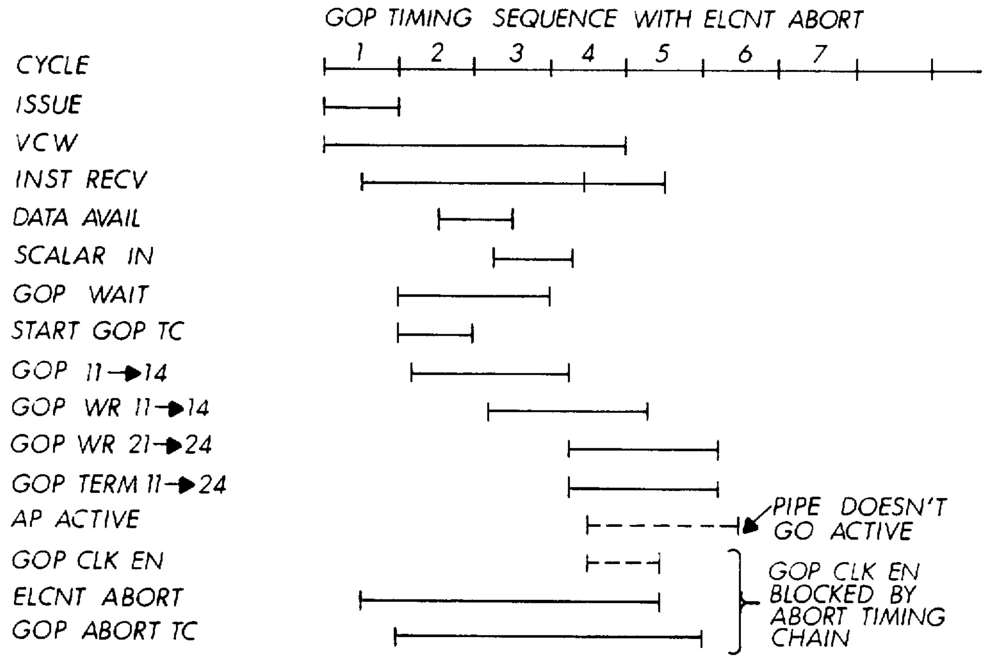
Figure 307:
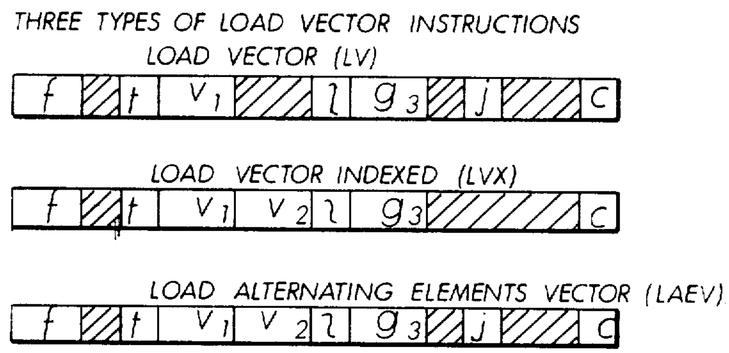
Figure 306:
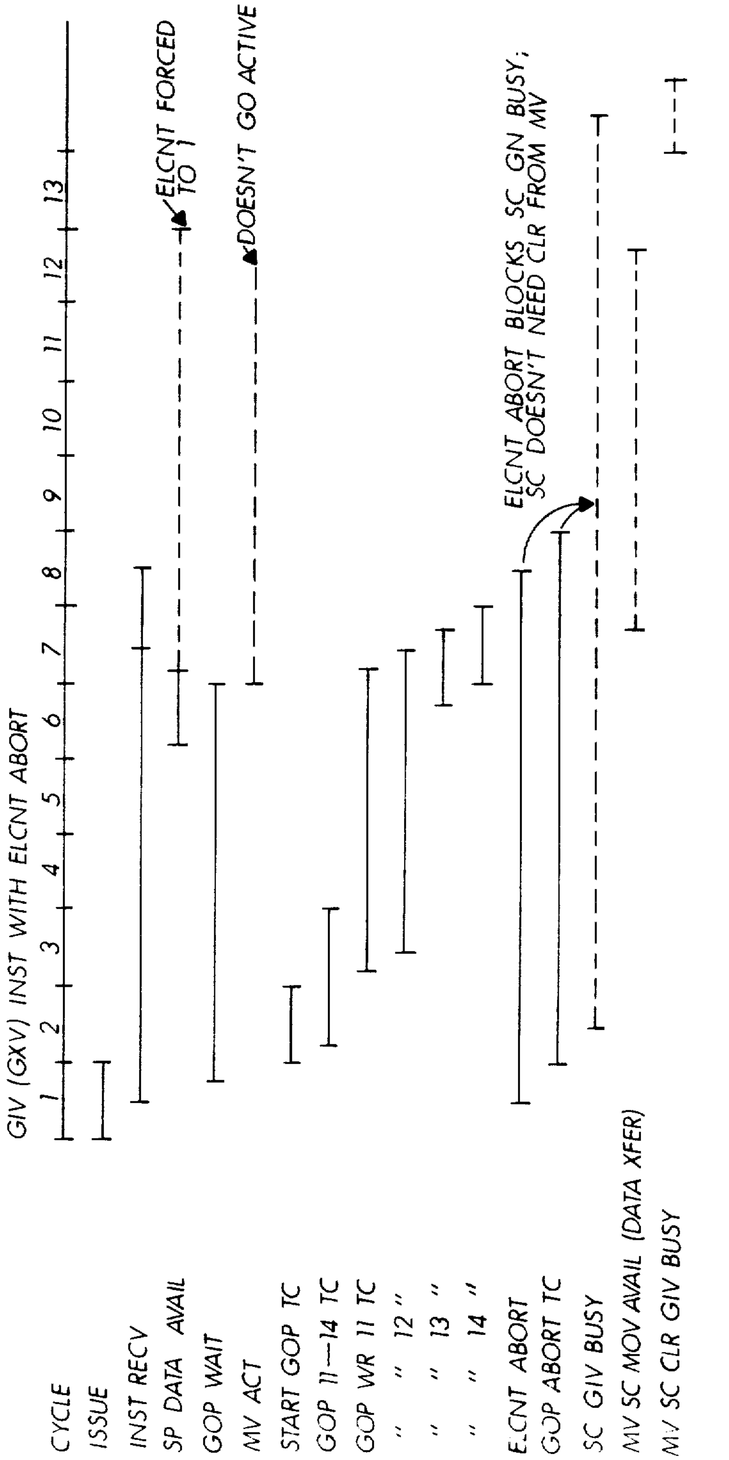
Figure 308:
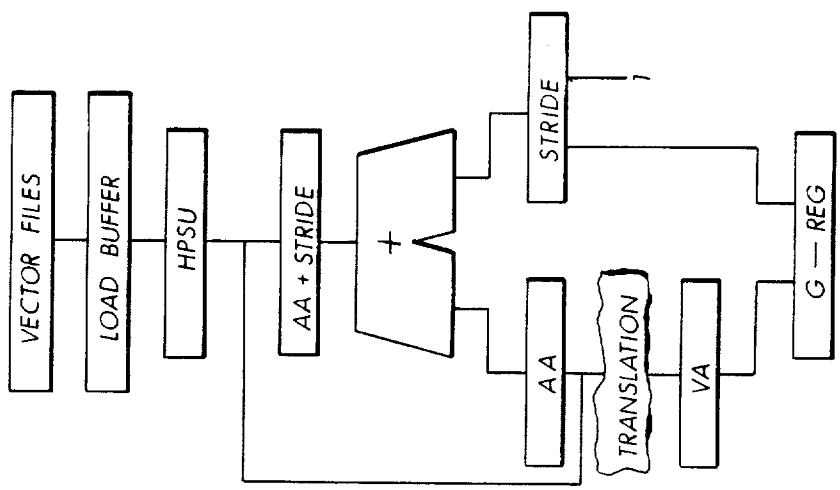
Figure 309:
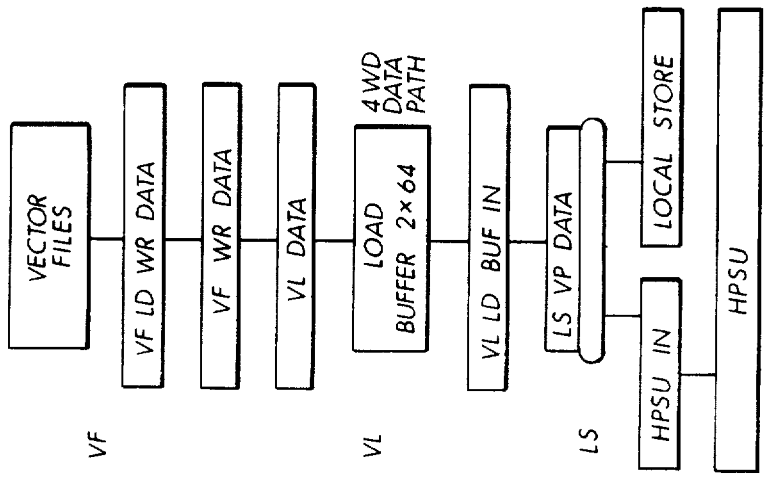
Figure 310:
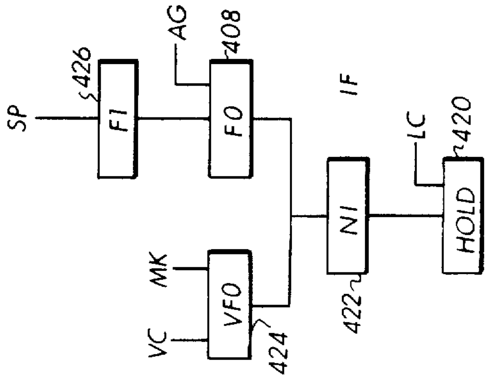
Figure 311:
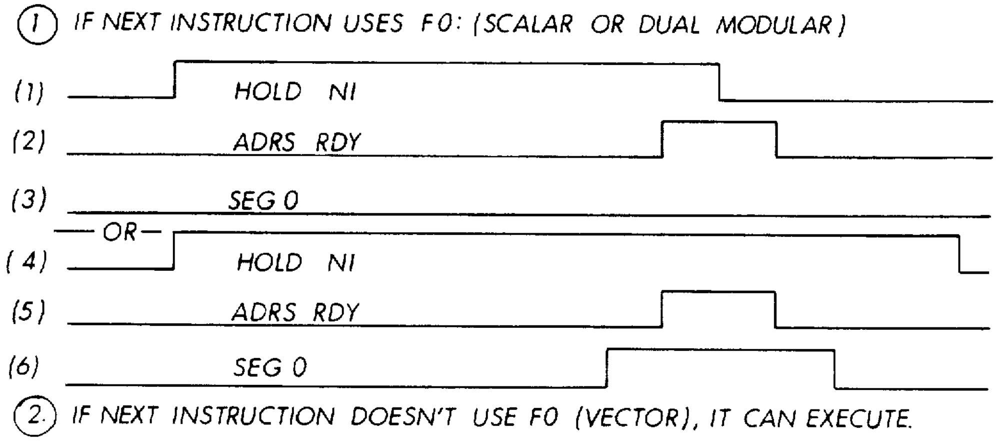
Figure 312:
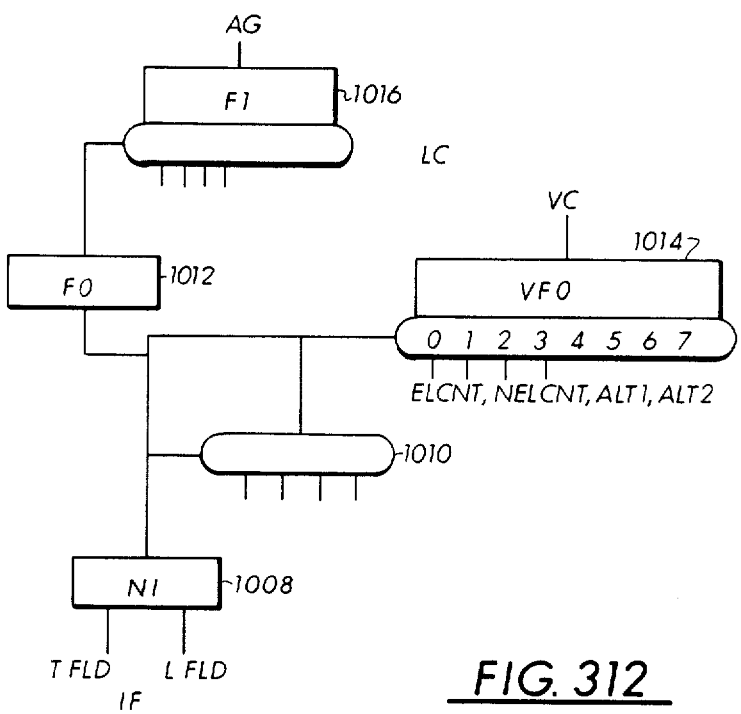
Figure 313:
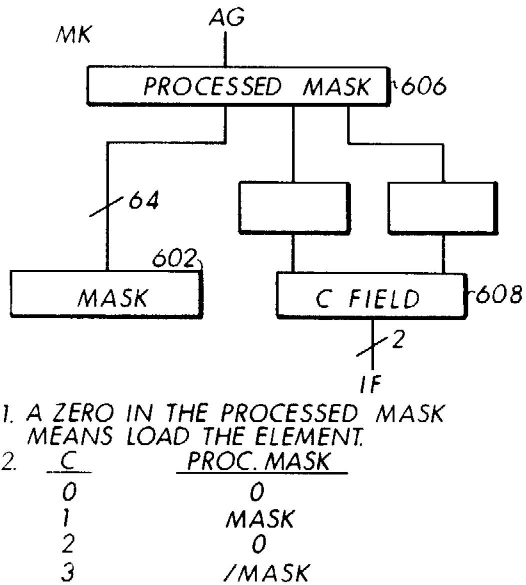
Figure 314:
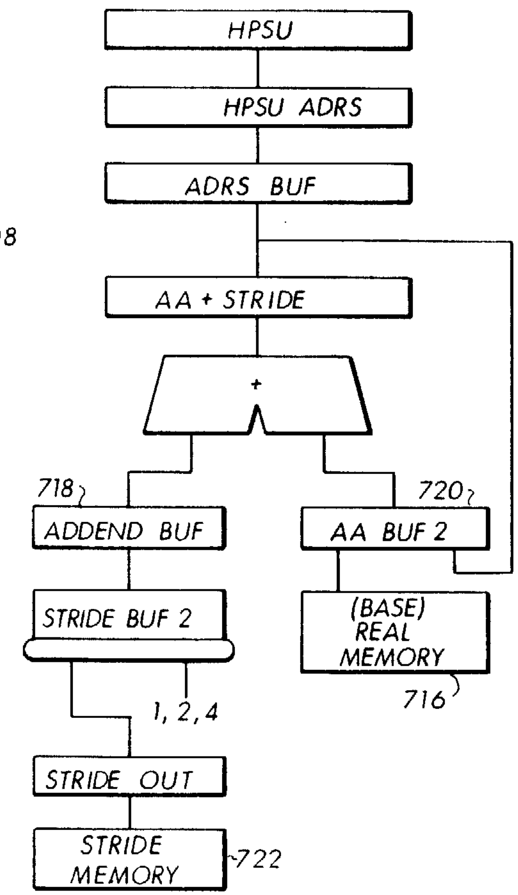
Figure 315:
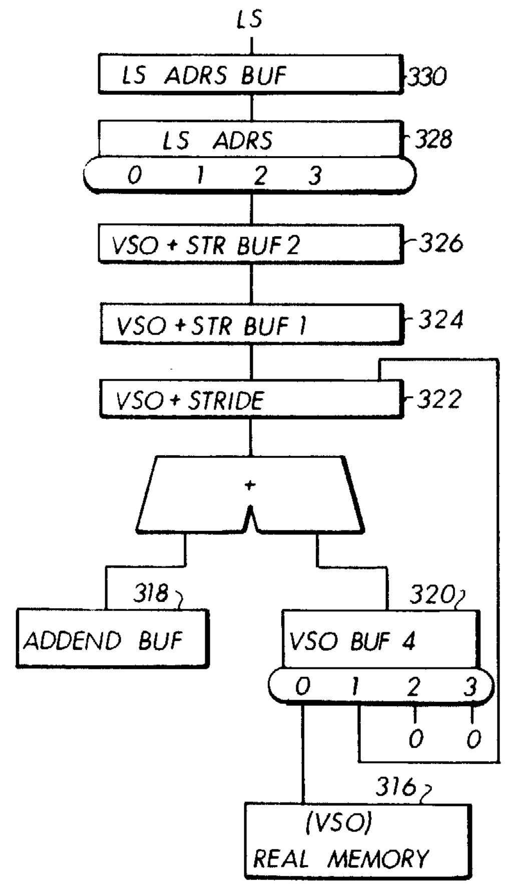
Figure 317:
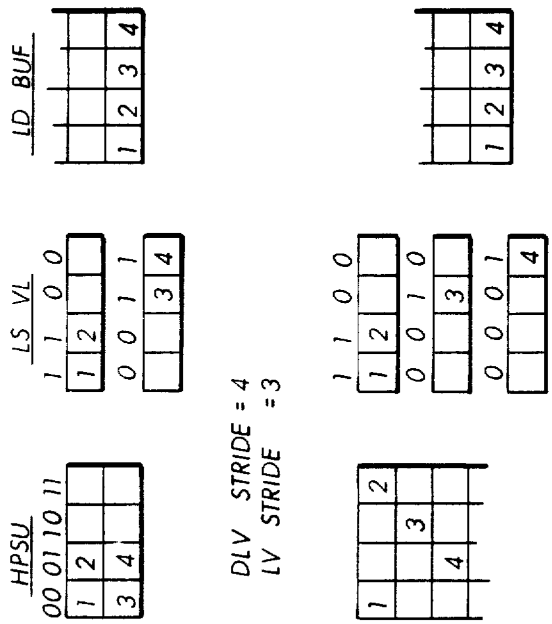
Figure 316:
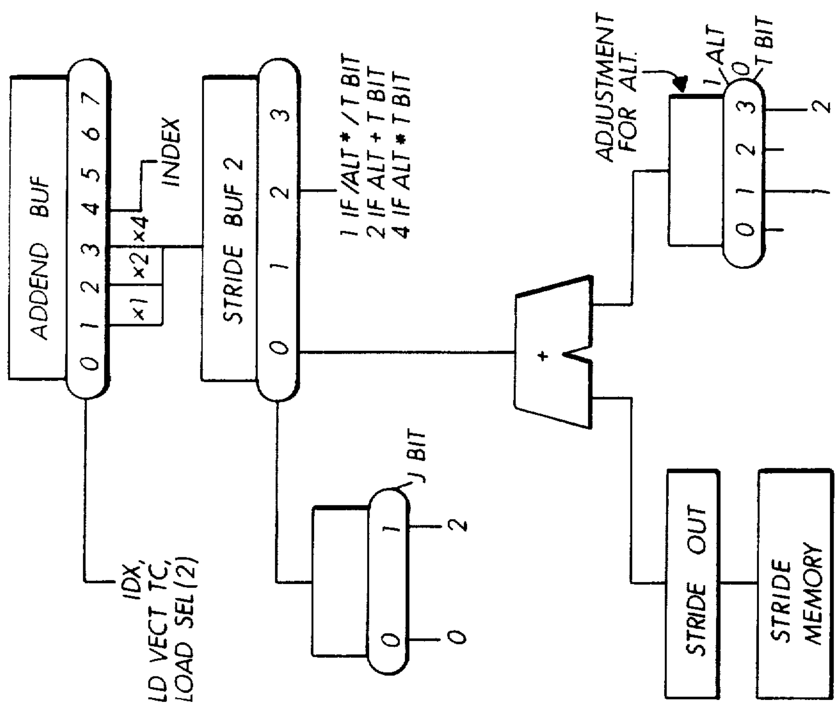
Figure 319:
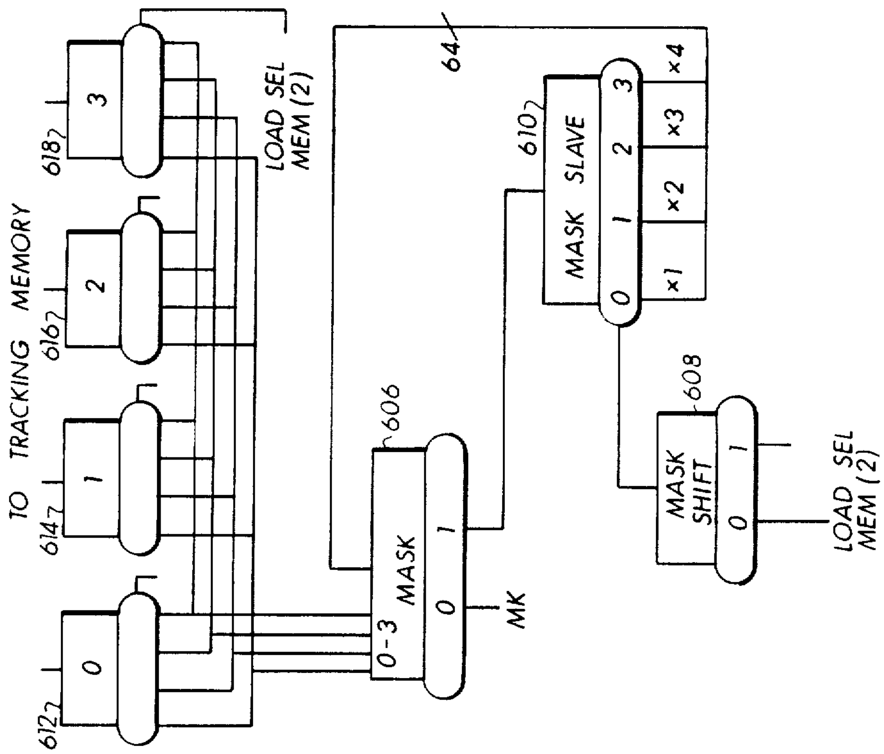
Figure 318:
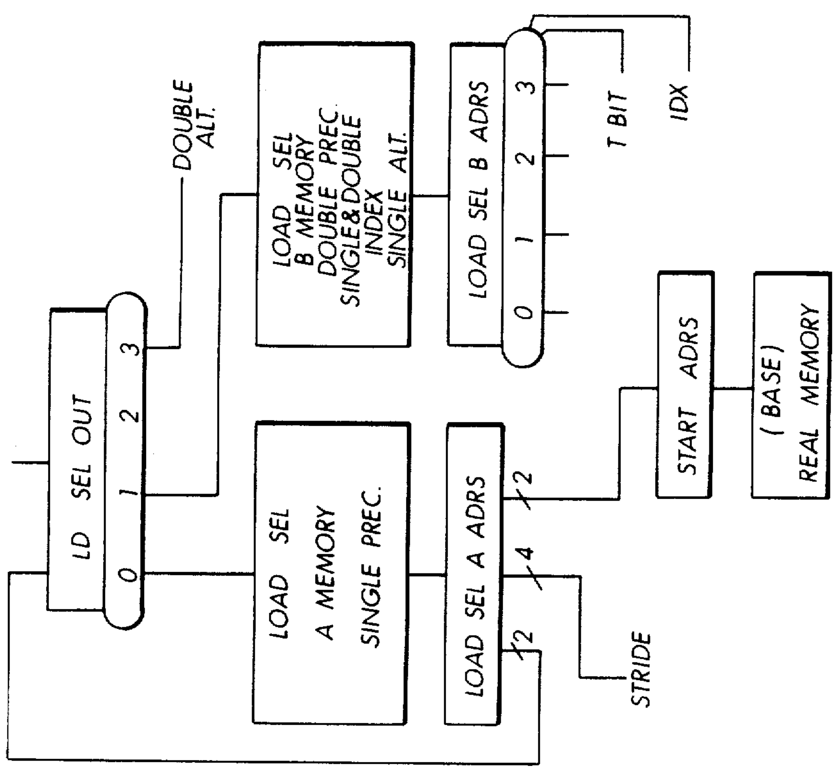
Figure 322:
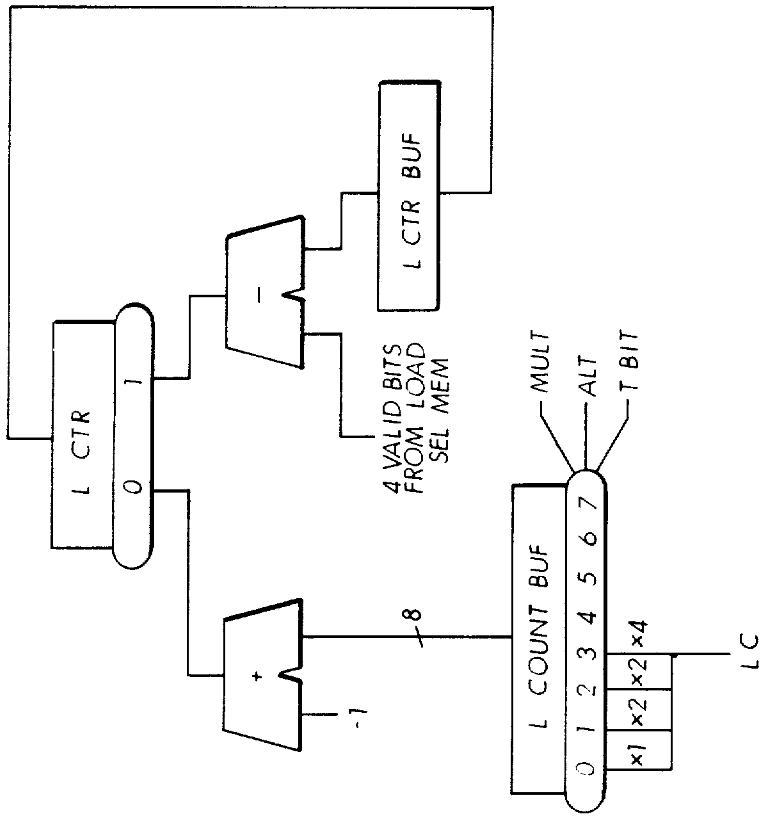
Figure 320:
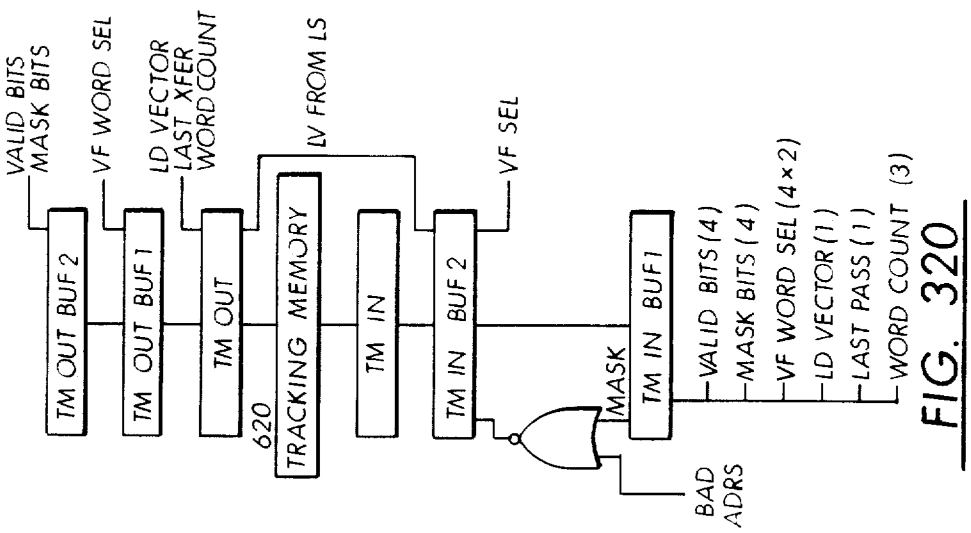
Figure 321:
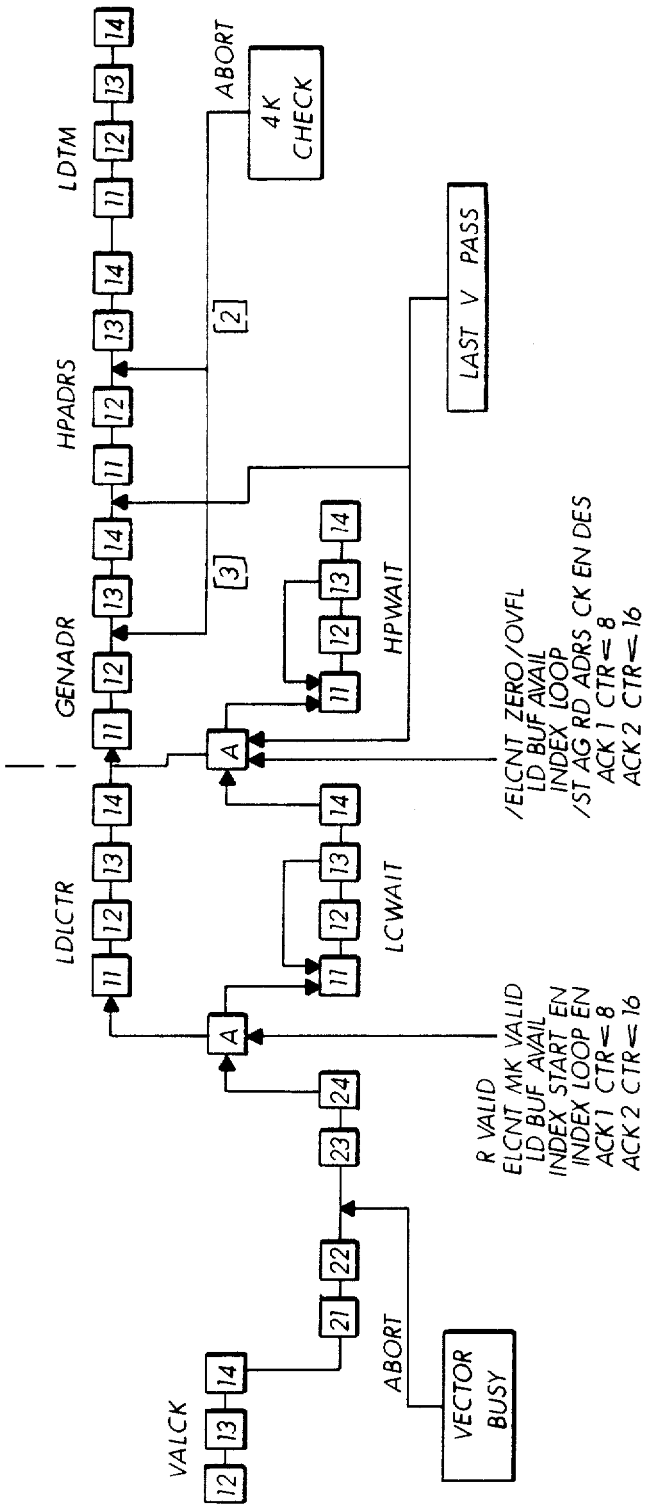
Figure 324:
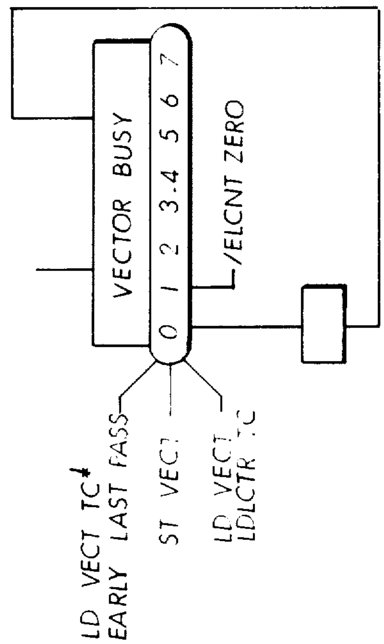
Figure 323:
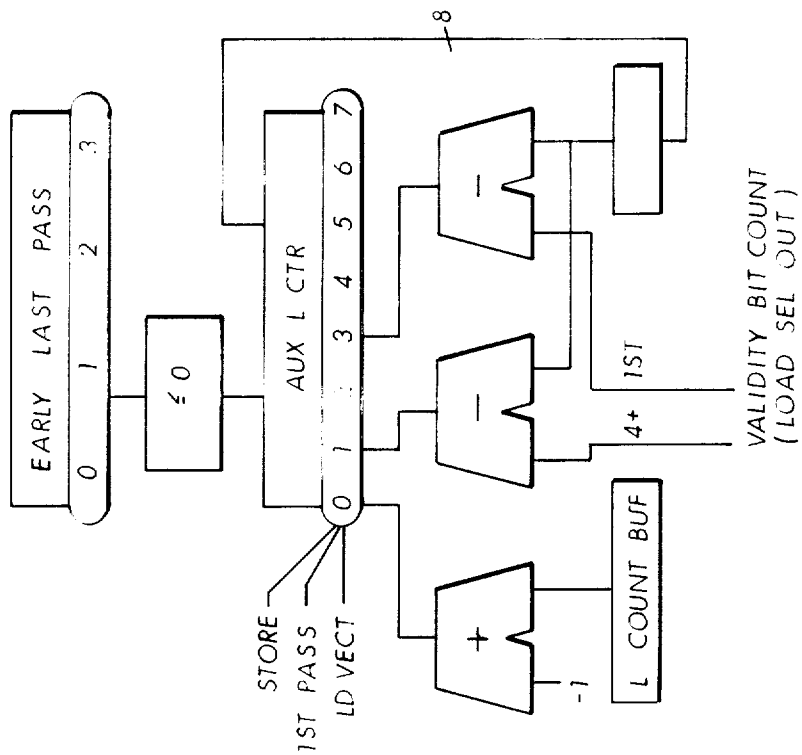
Figure 325:
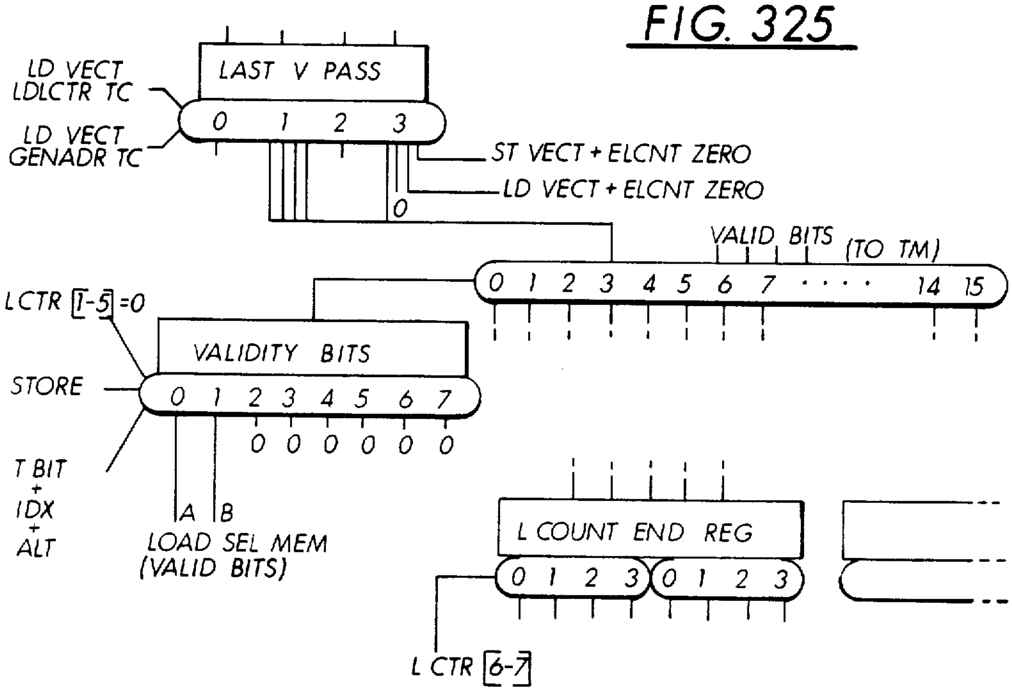
Figure 326:
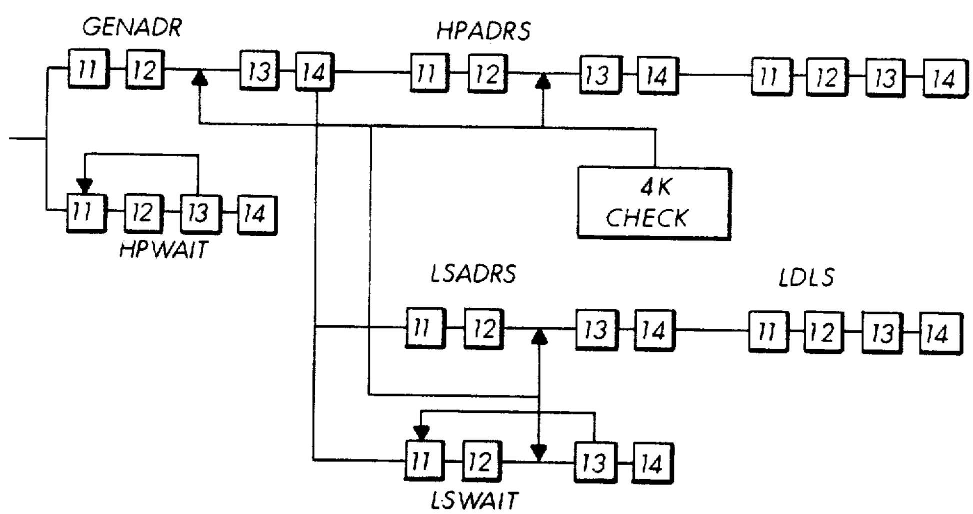
Figure 328:
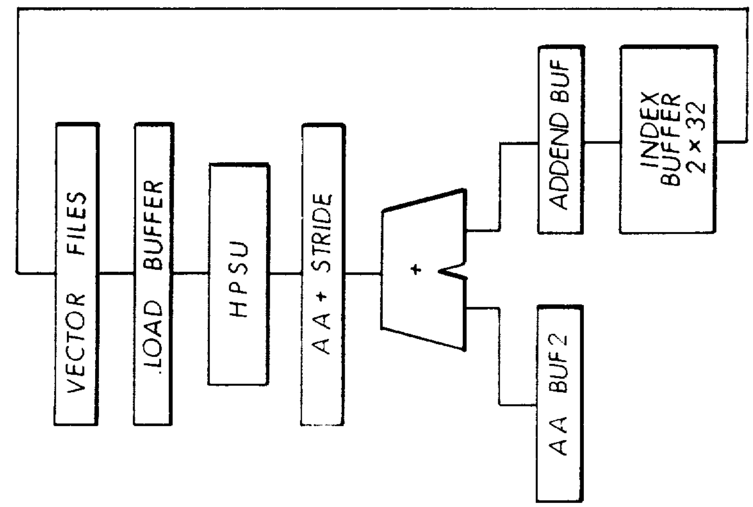
Figure 327:
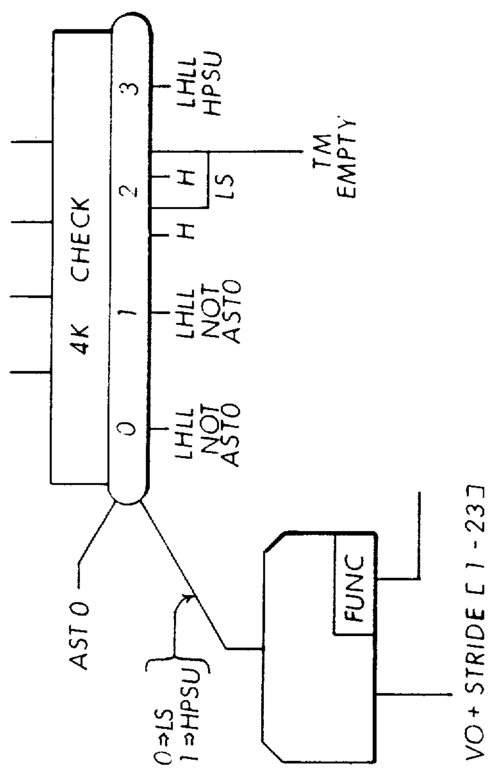
Figure 329:
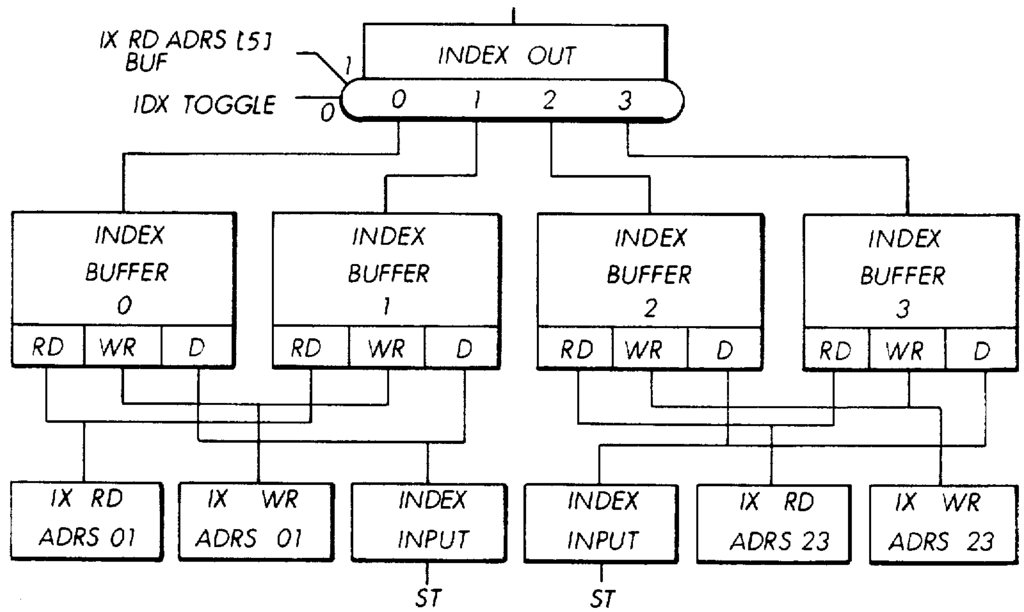
Figure 330:
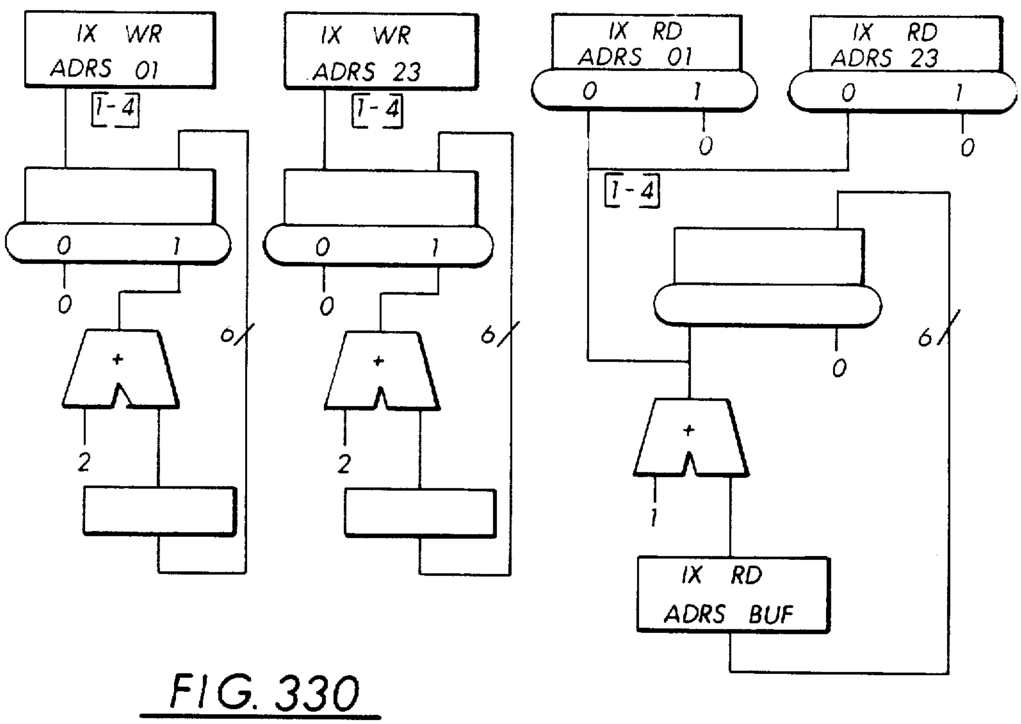
Figure 331:
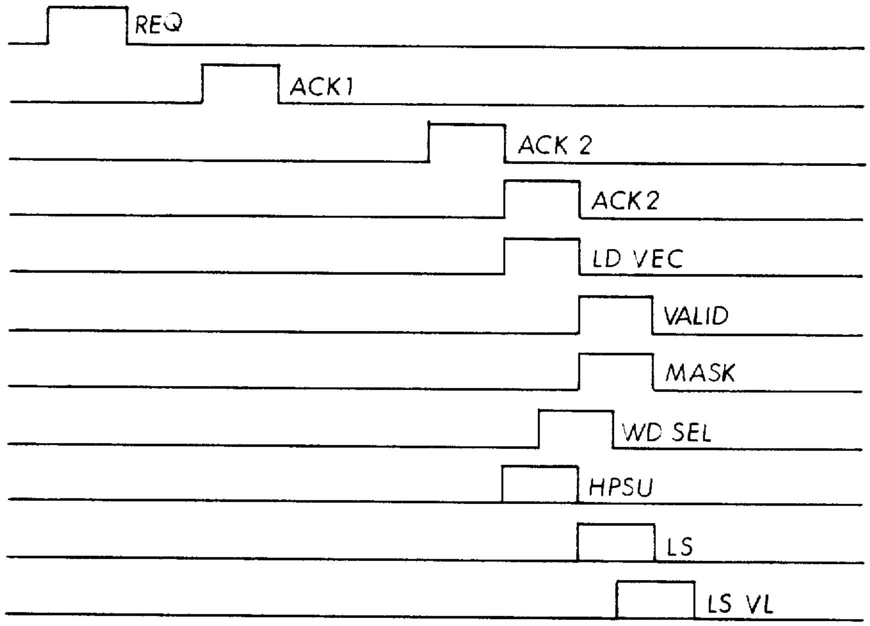
Figure 333:
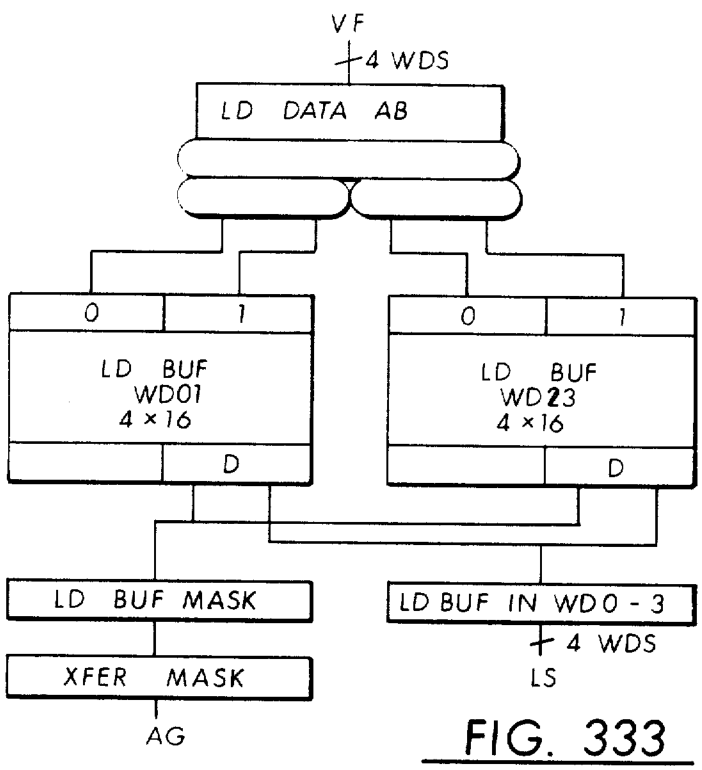
Figure 339:
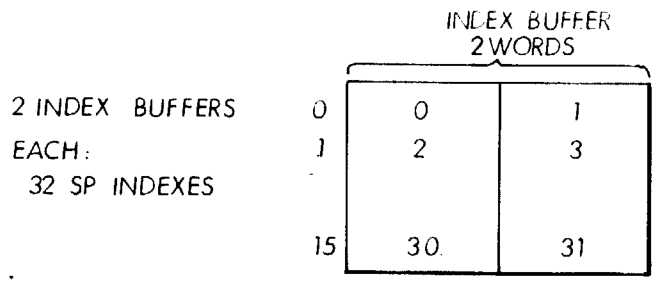
Figure 338:
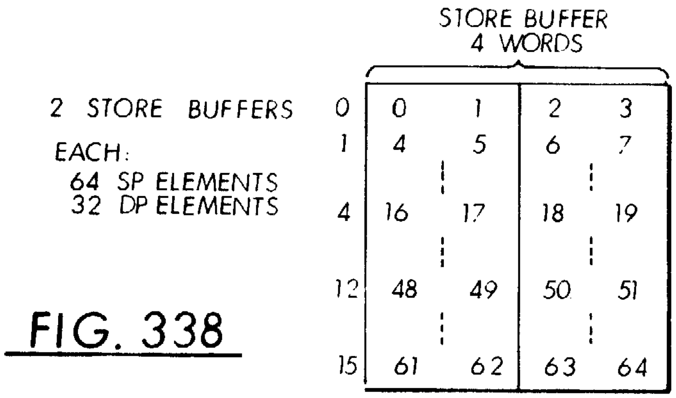
Figure 332:
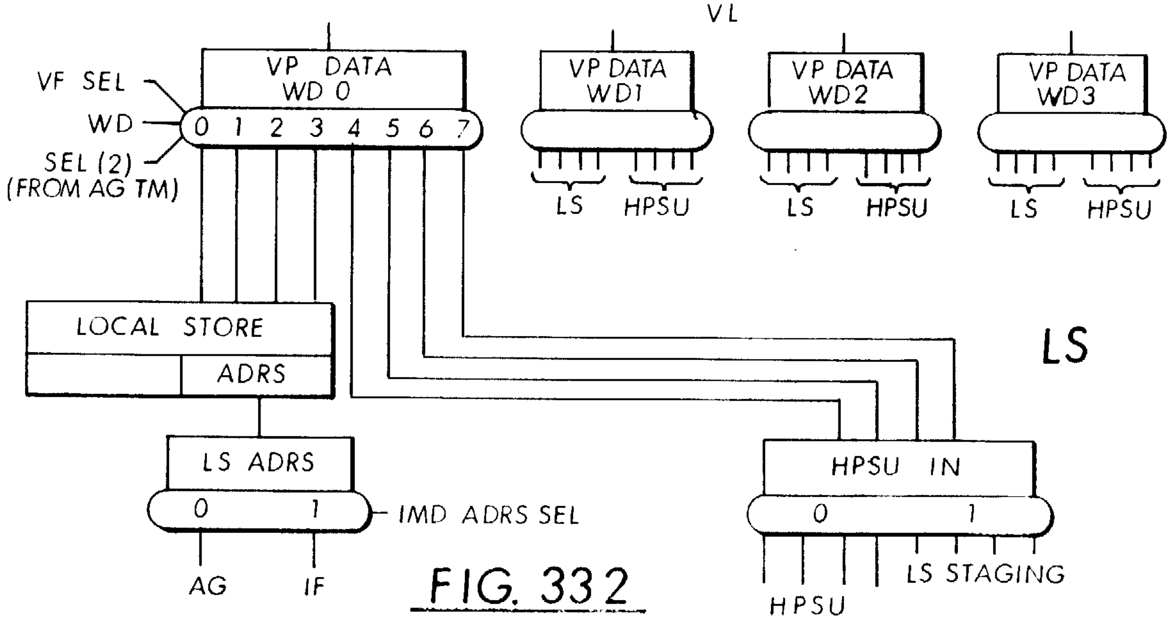
Figure 335:
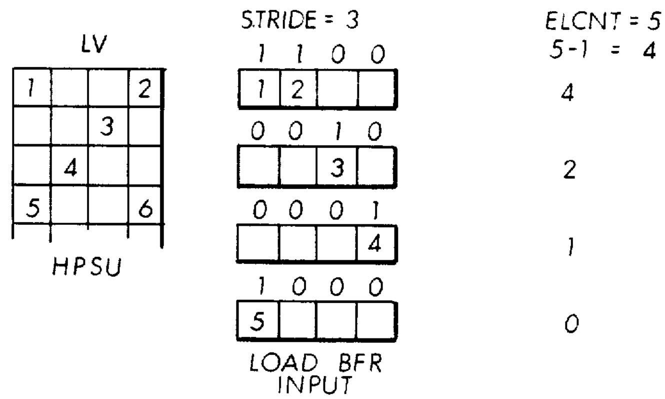
Figure 334:
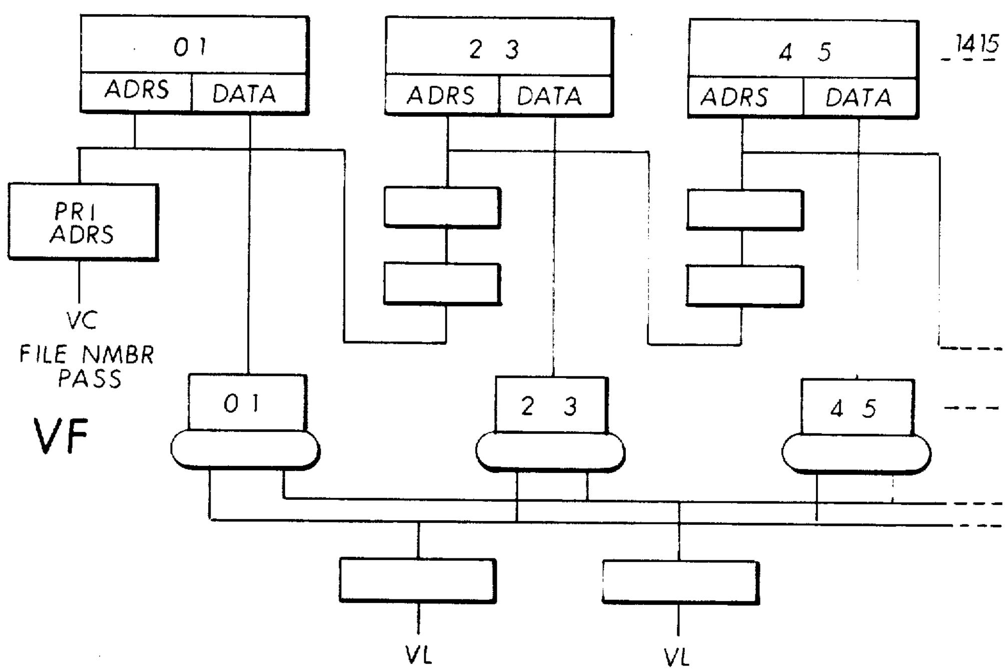
Figure 340:
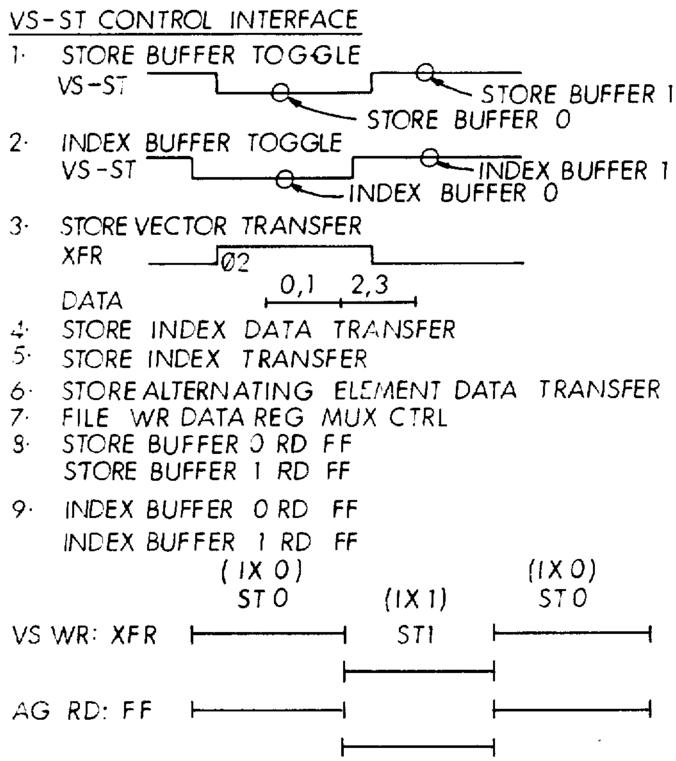
Figure 336:
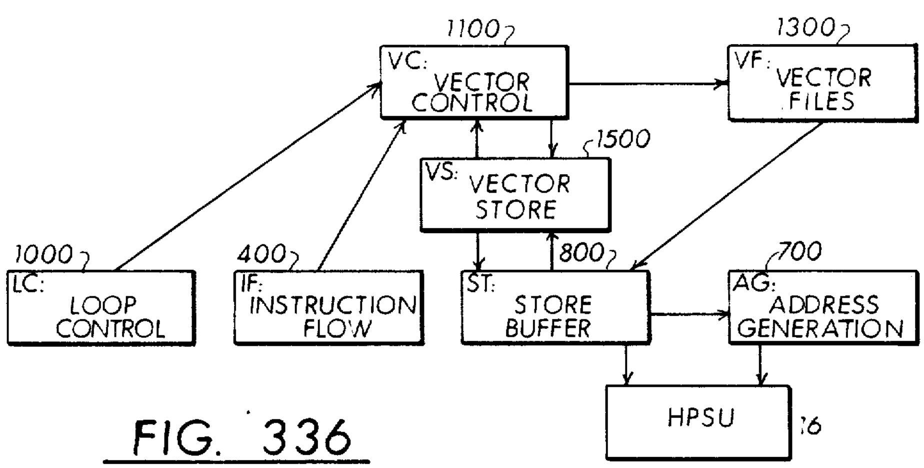
Figure 337:
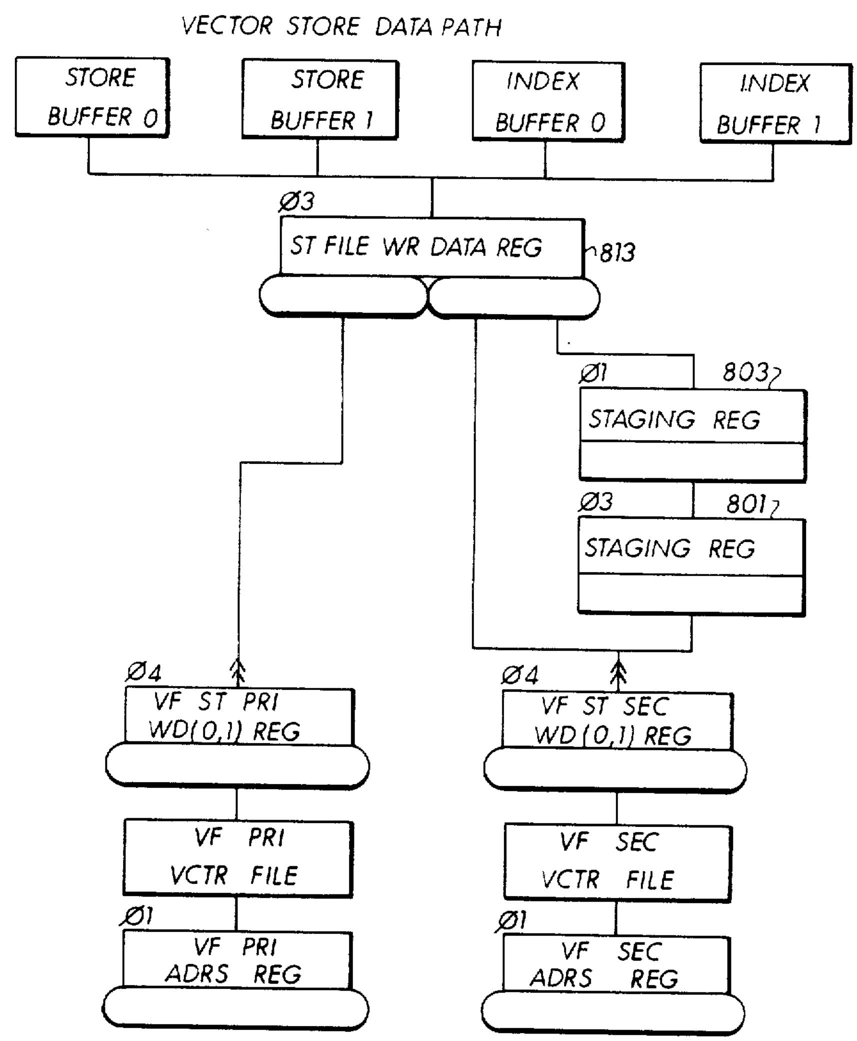
Figure 341:
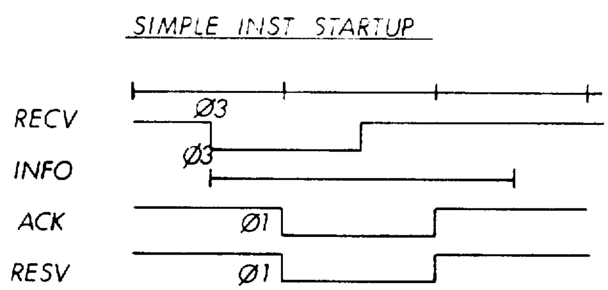
Figure 346:
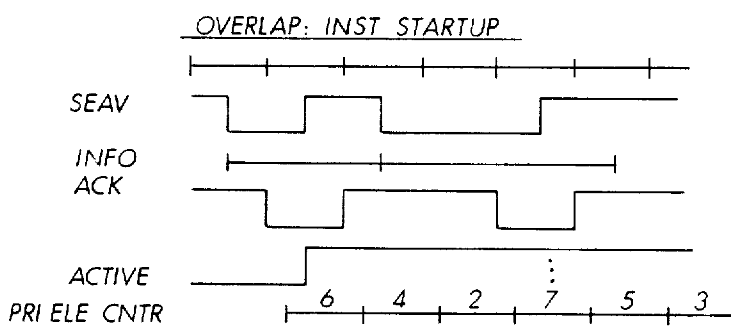
Figure 342:
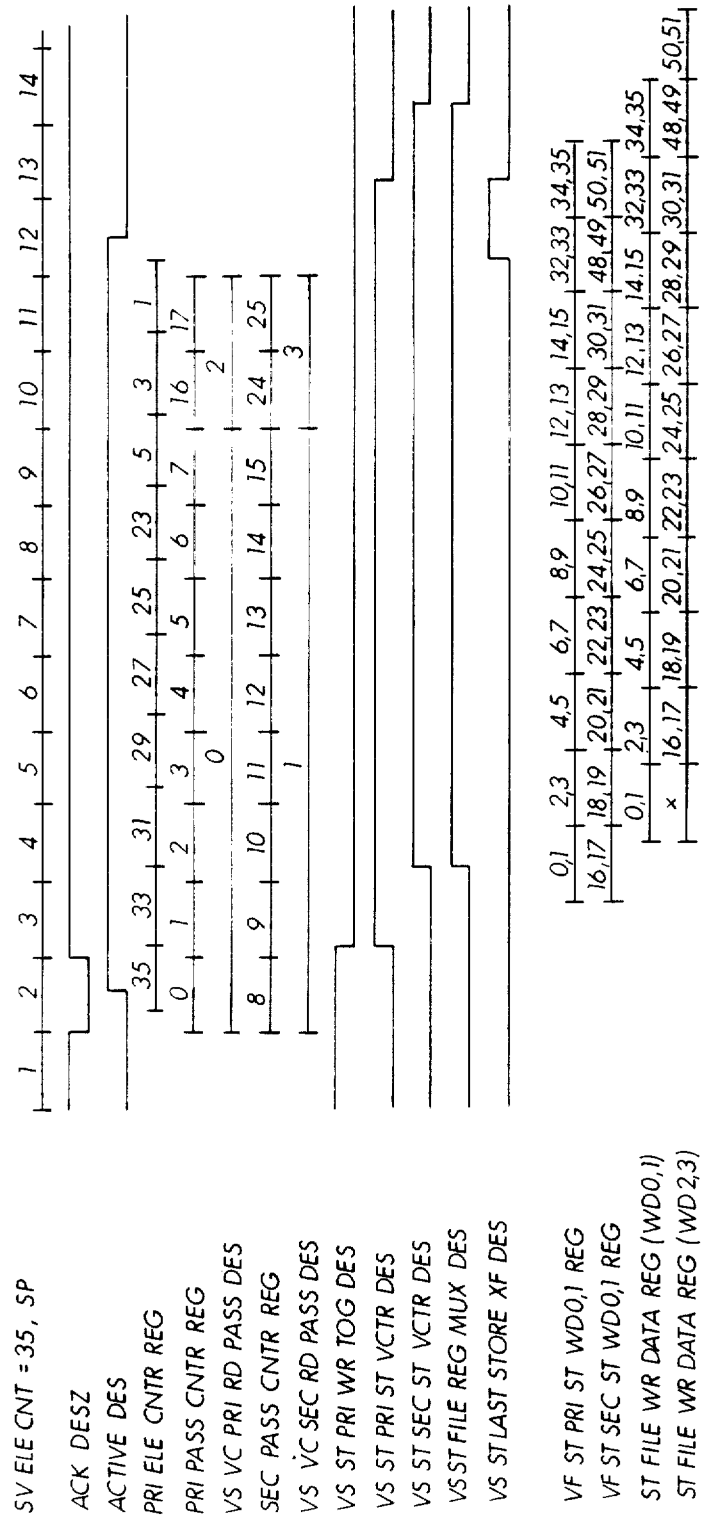
Figure 343:
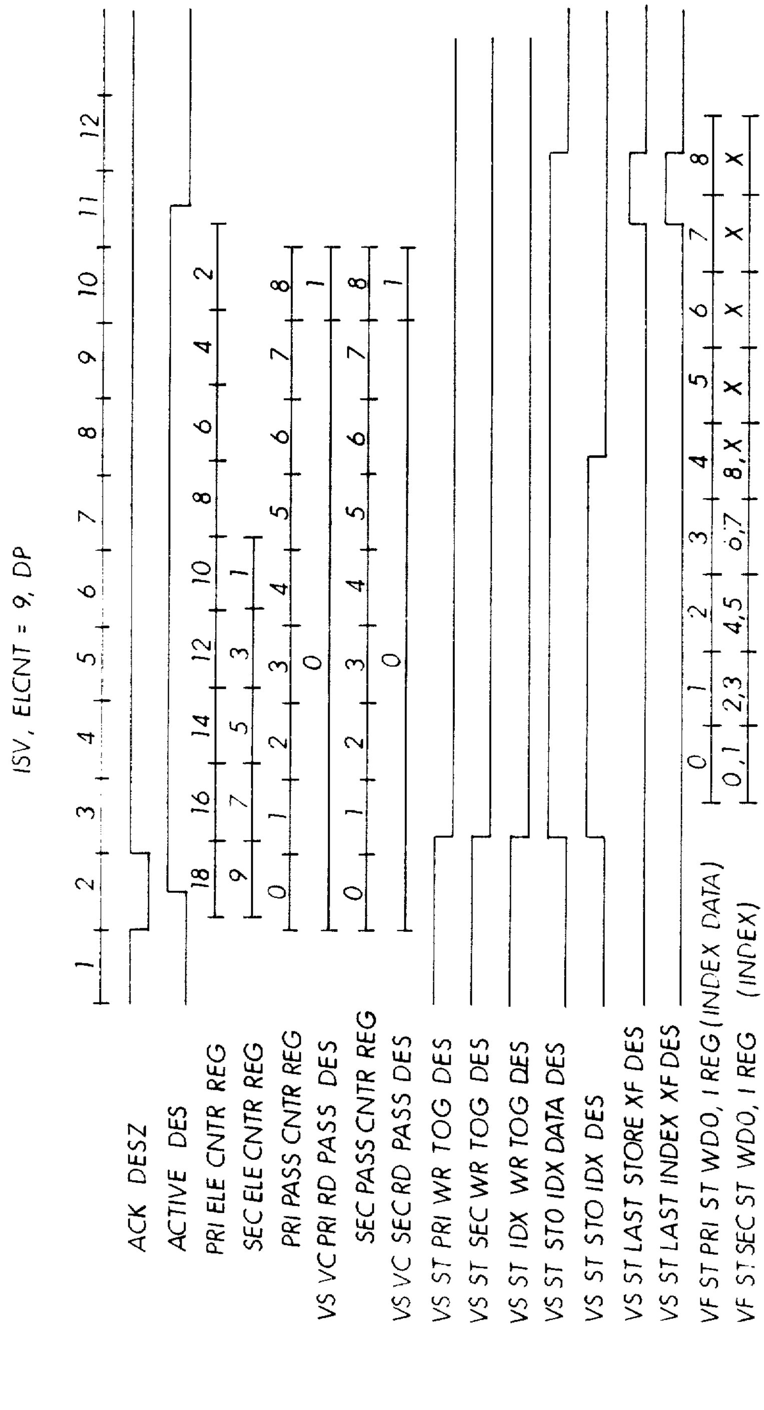
Figure 344:
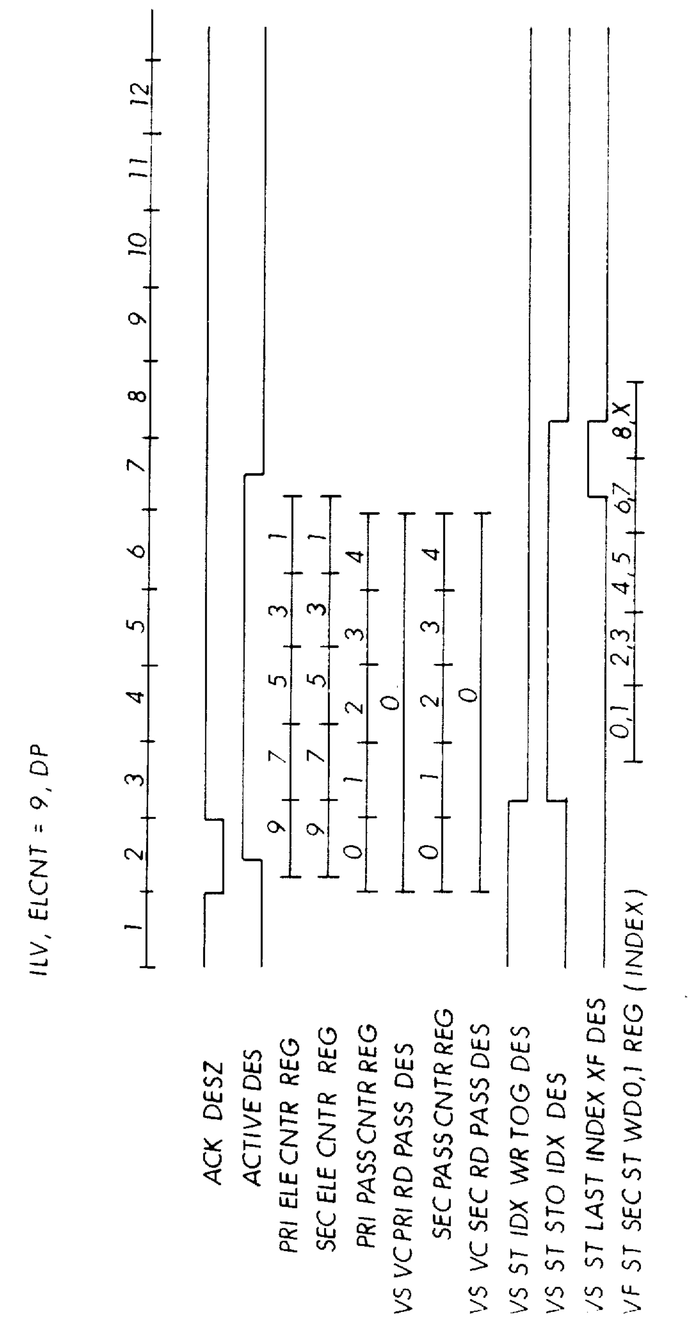
Figure 345:
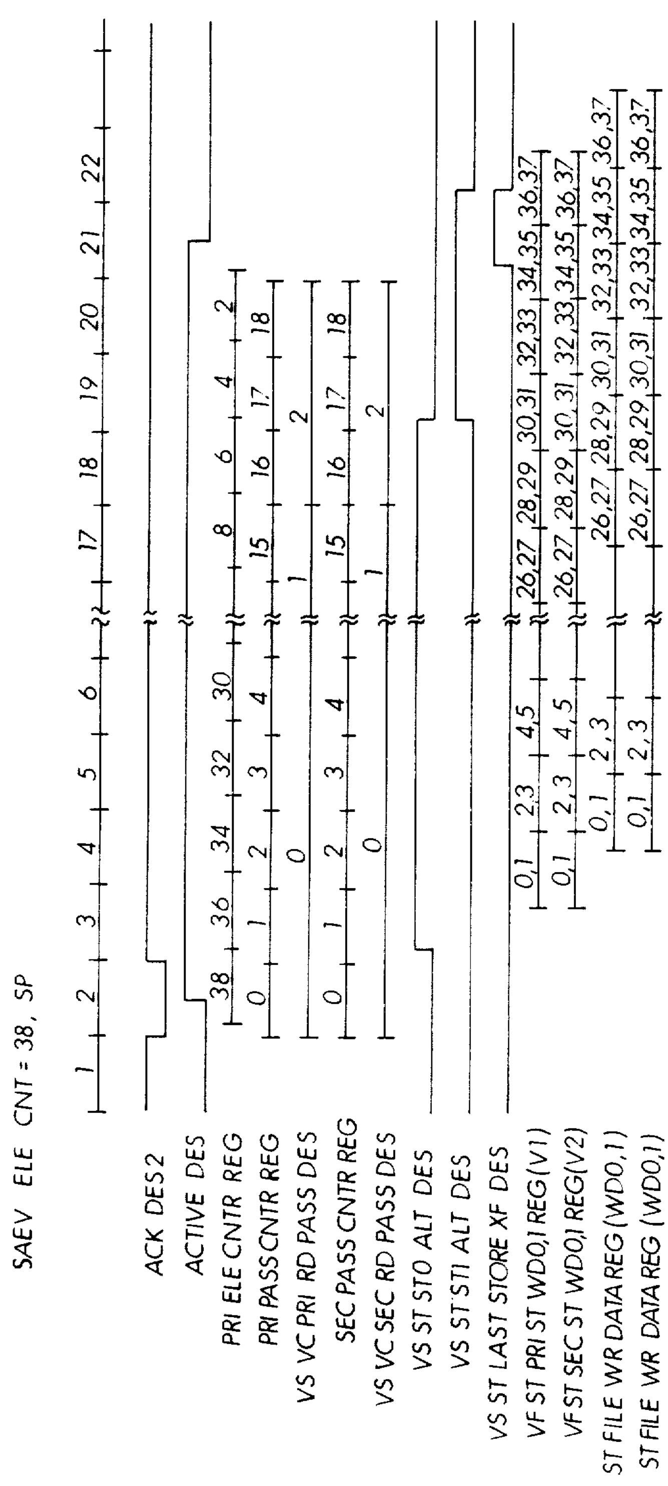
Figure 347:
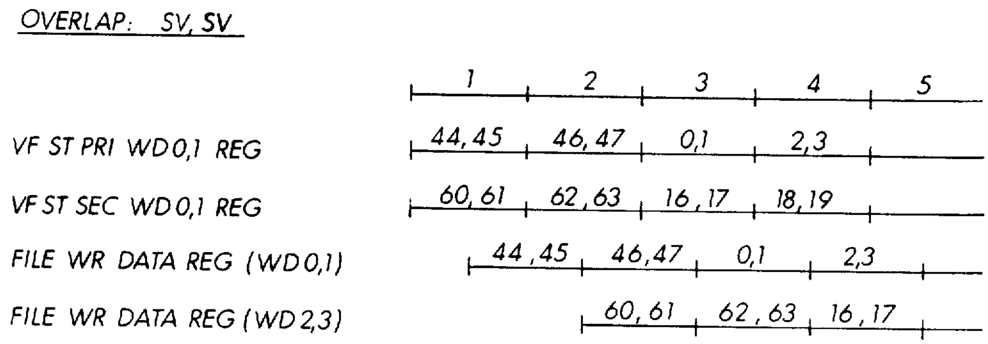
Figure 348:
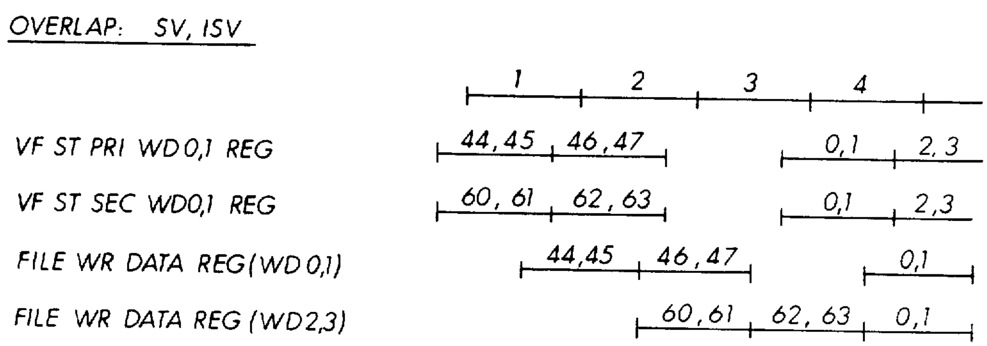

FIG. 220 is a block diagram of the single precision Add Pipeline of FIG. 216 with the lines used in the Single Precision Absolute Value operation and in the negate operation darkened for emphasis;

FIG. 221 is a block diagram of the single precision Add Pipe of FIG. 216 with the lines used in the Single Precision Count Leading Sign operation darkened for emphasis;

FIG. 222 is the block diagram of the Single Precision Add Pipe of FIG. 216 with the lines used in the Single Precision Compare Equality operation darkened for emphasis;

FIG. 223 is the basic block diagram of FIG. 213, however, this figure has those lines used in the Single Precision Shift operation darkened for emphasis;

FIG. 224, which includes FIGS. 224A-224B, is the same basic block diagram as FIG. 217 which shows the logical data path of a double precision operation, however, this diagram illustrates, via the emphasized darkened lines, the Double Precision Shift element 0 operation;

FIG. 225, which includes FIGS. 225A-225B, is basically identical to FIG. 224 except that the emphasized darkened lines follow the double precision elements 1-31 operation;

FIG. 226 illustrates the Maximum Index Logic Buffer used to compensate for the speed variations between the Single Precision Shift and the Double Precision Shift operations with the data path emphasized by the darkened lines;

FIG. 227 comprising FIGS. 227A and 227B is a repetition of FIG. 217 with the data path utilized by a Maximum Staging operation darkened for emphasis;

FIG. 228 is a logic drawing illustrating both the data path itself and the data path control using the successive Staging registers in association with the Data Control RAM;

FIG. 229 is a logic block diagram which illustrates the t designators, the Acknowledge (ACK) designators and the Element Hold designators which are used for indicating to the Vector Control section that the instruction data has been received;

FIG. 230 is a logic block diagram which illustrates the circuitry associated with the Operation Sequencing Microcode RAM, and the Microcode Data register which is used if the pipeline is presently active or is experiencing a conflict;

FIG. 231 is a timing diagram of the microcode sequencing occurring in the logic circuitry shown in FIG. 230;

FIG. 232 is a block diagram showing the logical circuitry associated with the Data Control Microcode RAM;

FIG. 233 is a timing diagram showing a Single Precision Add operation sequence with an ELK=4 and with the Conflict Element Counters;

FIG. 234 is a timing diagram showing a single precision-to-double precision type conversion with the ELK=4 and with the corresponding Conflict Element Counters;

FIG. 235 is a pictorial representation illustrating how the eights counter synchronizes the Add Pipe to its time slot;

FIG. 236 illustrates a block diagram comprising the logic circuitry used if the pipeline is presently active or is experiencing a conflict;

FIG. 237 is a timing diagram which shows the interface signals between the Add Pipe and the Scalar Control sections of the module for a broadcast instruction;

FIG. 238 illustrates a double precision reduction of input data patterns showing the various passes that must be accomplished;

FIG. 239 is a pictorial diagram illustrating the Vector File output staging registers used for reductions showing how the data is ordered;

FIG. 240 is a logic diagram illustrating the relevant portion of the circuitry used to generate the indices necessary to provide the max/min reductions to be stored in the Vector File;

FIG. 241 is table of indices generated on each time cycle by the circuitry shown in FIG. 240;

FIG. 242 is a simplified block diagram of the Vector Processor Module with only the Multiply Pipe shown;

FIG. 243 is a pictorial block diagram showing the relationship of sequential control to data path;

FIG. 244 illustrates a simple pictorial diagram of a pair of four element vectors being multiplied;

FIG. 245 is an illustration of the word format of Multiply Pipe data types;

FIG. 246 is a pictorial parallelogram block diagram illustrating an Integer Multiply;

FIG. 247 is a pictorial parallelogram block diagram illustrating a single precision floating point Multiply operation;

FIG. 248 is a pictorial parallelogram block diagram illustrating a double precision floating point Multiply operation;

FIG. 249 is a pictorial block diagram illustrating a single integer fractional Multiply operation;

FIG. 250 includes FIG. 250A and FIG. 250B and taken together they illustrate the logical block diagram of the data paths through the Multiply Pipe, which appear as two separate pipelines;

FIG. 251 is a block diagram showing the generalized version of the Multiply Pipe with the various control bit in parts to the data path;

FIG. 252 includes FIG. 252A and FIG. 252B which taken together show a detailed block diagram of the sequence control portion of the Multiply Pipe;

FIG. 253 is a pictorial block diagram illustrating the shadow area concept used in the Vector File;

FIG. 254 is a pictorial diagram showing the input data pattern for each of six passes through the file using the product reduction algorithms;

FIG. 255 is a logical diagram showing the MP data path from the Vector File RAM as well as the special Vector File registers used for reductions;

FIG. 256 is a pictorial diagram of the Vector Control structures used for Multiply Pipe conflicts;

FIG. 257 is a timing diagram illustrating the read/-write operations during a Multiply Pipe overlap operation;

FIG. 258 is a pictorial representation of the Move Pipe showing the move from the source to the destination vector;

FIG. 259 is a pictorial representation of a Compress operation illustrating the use of the Mask Vector;

FIG. 260 is pictorial representation showing a Distribute operation using the Source, the Mask and the Destination Vectors;

FIG. 261 pictorially illustrates the Generate Index Vector which generates a vector of indices;

FIG. 262 pictorially illustrates the single precision to double precision vector type conversion, as well as the Count Leading Signs operation;

FIG. 263 is a simplified block diagram of the organization of the Move Pipe;

FIG. 264 is a detailed logic diagram showing the Move Pipe data path;

FIG. 265 is a more detailed block diagram of the Move Buffer shown generally in FIG. 264;

FIG. 266 is a generalized block diagram of the Vector File showing the address sequence passing along the successive VF RAM's;

FIG. 26 is a simplified block diagram of the Vector File Organization showing the expansion of a Vector RAM of the Vector File into sixteen Vector Files, and then into 64 elements;

FIG. 268 is a pictorial diagram of the Vector File illustrating the contents of the Source Vector, the Move Buffer and the Destination Vector;

FIG. 269 is a pictorial diagram of the same Vector File as in FIG. 268, and showing the insertion of the Mask information into the Vector File to accomplish a Compress operation;

FIG. 270 is a similar pictorial diagram of the same Vector File as in FIG. 268, however, this diagram shows the element contents for a Distribution operation with an element count of eleven (11) is performed;

FIG. 271 illustrates the SPM logic used to generate an Index Vector along with the element contents of the Move Buffer and the Destination Vector;

FIG. 272 illustrates the element contents of the Vector File for a Single Precision-to-Double Precision Conversion operation;

FIG. 273 is a timing diagram showing the signal sequence during a Conversion operation;

FIG. 274 is a block diagram of the Vector File showing the element contents of the Source Vector, Move Buffer, Destination Vector and Shadow Area for a Double Precision-Single Precision conversion for a Count Leading Signally illustrating the word contents of each instruction;

FIG. 275 is a logical block diagram showing the circuitry used for the Microcode Sequence Logic Control of the Move Pipe;

FIG. 276 is a timing diagram showing the signal sequence required to accomplish control of the Move Pipe operation;

FIG. 277 is an instruction pattern table showing the Move Pipe (MV) time slot patterns of read/write operations;

FIG. 278 is a pair of instruction formats showing Move Vector File Addressing, the Read (RD) format for Vector File Move addressing, and the Write (WR) format for the same thing;

FIG. 27 is a timing diagram showing the signal sequence necessary to accomplish the addressing of the Vector File by a Move operation;

FIG. 280 is a pictorial representation showing the address transitions of the microcode during a Move operation, a Compress operation, a Distribute operation, a single precision-to-double precision Conversion and vice versa and a Generate Index Vector operation;

FIG. 281 is a simplified timing diagram of a first example showing the conflict between a Read operation in a Move Pipe operation with the Write operation of an Add Pipe operation;

FIG. 282 is a simplified timing diagram of a second conflict example showing a conflict occurring in mid instruction;

FIG. 283 is also a timing diagram showing the time slot locations which are released during successive clock cycles;

FIG. 284 is a simplified timing diagram of the occurence of a sample conflict during an element counting sequence between a Read $OP_2$ and a Write $OP_3$ operation;

FIG. 285 is a simplified diagram showing the issuance of G Broadcast Operands, called G OPS, from the Scalar Processor Module to the Vector File of the Vector Processor Module via the Add Pipe, the Multiply Pipe or the Move Pipe;

FIG. 286 is a block diagram of the issuance of the Generate Index Vector (GIV) instruction showing a simplified logic diagram of relationship of the G registers of the SPM to the Scalar/Vector Data Transfer Control, the Move Pipe and the Vector File of the Vector Processor Module;

FIG. 287 is a block diagram showing the issuance of a Reduction instruction from the VF to the AP or MP and thereafter to the G registers of the SPM from the SC;

FIG. 288 is another block diagram of the Vector operand instruction path illustrating an element being transferred from the Vector File back to the G registers of the SPM;

FIG. 289 is an illustration of the Broadcast G register instruction in a Vector/Vector (VV) format;

FIG. 290 is another format illustration showing the content of a Generate Index Vector (GIV) or a Generate Transfer Vector (GXV) instruction;

FIG. 291 is a pictorial block diagram showing the formation of a Vector Control Word from the issuance of a program instruction through its decoding in the IF section of the SPM and then to the VPM for passage through the various pipelines;

FIG. 292 is a more detailed block diagram of the Scalar/Vector Control interface between the Scalar Processor Module and the Vector Files of the Vector Processor Module;

FIG. 293 is a block diagram illustrating the sequence logic of the G operation (G OP) instruction;

FIG. 294 is a timing diagram showing the G OP timing sequence;

FIG. 295 is a timing diagram illustrating the timing sequence of the Reduction instruction;

FIG. 296 is a timing diagram of the Generate Index Vector (GIV) instruction;

FIG. 297 includes FIG. 297A and FIG. 297B, positioned as shown, taken together they illustrate a logic block diagram of a plurality of timing chains used in conjunction with a group of Read counters which illustrate the basic control mechanisms;

FIG. 298 is a Time Slot (TS) timing diagram for a Read V OP with an element point equal to four;

FIG. 299 is a Time Slot (TS) timing sequence diagram for a Read 2 V OP operation with an element point equal to seven;

FIG. 300 is a timing diagram for a Read V 0P instruction with an element point equal to zero;

FIG. 301 is a Time Slot (TS) timing diagram for a Write V OP instruction with an element point equal to zero;

FIG. 302 is a logic block diagram which illustrates the circuitry required for a Write V OP only operation;

FIG. 303 is a Time Slot (TS) timing diagram for a Write V OP instruction with an Element Point (ELPT) equal to four;

FIG. 304 is a timing diagram for a Write V 0P instruction with an Element Point (ELPT) equal to zero;

FIG. 305 is a timing diagram for a G OP instruction timing sequence with the Element Count (ELCNT) aborted;

FIG. 306 is a similar diagram to that shown in FIG. 305 showing the GIV (GXV) instruction with the Element Count (ELCNT) aborted;

FIG. 307 is a representation of the formats of three types of Load Vector instructions, showing the Load Vector (LV), the Load Vector Indexed (LVX) and the Load Alternating Elements Vector (LAEV) instruction formats;

FIG. 308 is a block diagram illustrating the logic involved in the loading of a vector from the G register to the Vector File;

FIG. 309 is a block diagram showing the four word data path of the Load Buffer positioned between the Local Store and the Vector File;

FIG. 310 is a simplified block diagram of the Instruction Flow section as it relates to the Vector Load;

FIG. 311 is a timing diagram showing the signal sequence when the next instruction uses the F0 register;

FIG. 312 is a simplified block diagram of the Loop Control as it relates to the Address Generation section, the Vector Control section and the Instruction Flow section;

FIG. 313 is also a simplified block diagram which illustrates the Mask Processor receiving the IF information into the C field and providing the contents of the processed Mask register for transmittal to the Address Generation section;

FIG. 314 is a block diagram of the addressing scheme used to determine the addressed location in the High Performance Storage Unit;

FIG. 315 is an illustration of the addressing scheme that is used when the Local Store is addressed;

FIG. 316 is a logical block diagram of the stride buffer operation;

FIG. 317 illustrates a number of address tables showing the HPSU, the LS VL and the Load Buffer (LD BUF) values for a Double Load Vector (DLV) with a stride of four and a Load Vector (LV) with a stride of three;

FIG. 318 is a logical block diagram of the Load Select memory illustrating its actual implementation;

FIG. 319 is a logical block diagram of the circuitry used to implement the Mask Processor;

FIG. 320 is a logical block diagram of the Tracking Memory;

FIG. 321 is a logical block diagram of the timing chains used to control the loading of the vector;

FIG. 322 is a logical block diagram of the element counter used with the timing chains of FIG. 321;

FIG. 323 is the logical block diagram of another mechanism similar to the Element Counter, which is used to allow the instruction;

FIG. 324 is a simplified logic block diagram of the Vector Busy circuitry used in the Vector Load operation;

FIG. 325 is a logical block diagram of the circuitry used to illustrate the four different types of Last Pass signals and how they are selected;

FIG. 326 is a block diagram showing the timing chains used to control the Vector Load (VL) from the Local Store (LS);

FIG. 327 is a logical block diagram showing how the four thousand (4K) word check is implemented when it is translated to the ST entry zero and there is a possibility that it is going to the Local Store;

FIG. 328 is a logical block diagram illustrating the circuitry used to implement the Index Load Vector operation where the indices to be added are supplied by another vector in the Vector File;

FIG. 329 is a block diagram of the four Index Buffers used to temporarily store the sixteen different indices;

FIG. 330 is a block diagram of the Single Read Address Buffer since there is only one address even though there are two stored in the Address registers;

FIG. 331 is a timing diagram of the Vector Load control interface;

FIG. 332 is a block diagram of the Local Store section and to interface the AG, the IF, and the HPSU with the Vector Load section;

FIG. 333 is a block diagram of the entire Load Buffer section of the Vector Load (VL);

FIG. 334 is a block diagram of the Vector File (VF) section as it interfaces with the Vector Load section under the control of the Vector Control section;

FIG. 335 is a pictorial example of a Load Vector with a stride of three and an Element Count (ELCNT) of five for operation of the load select memory;

FIG. 336 is a simplified block diagram of the Vector Store (VS) section of the VPM;

FIG. 337 is a block diagram showing the data path of the Vector Store (VS) section;

FIG. 338 is a simplified representation of the Store Buffer showing the four word content;

FIG. 339 is a simplified representation of the pair of Index Buffers of the Vector Store section;

FIG. 340 is a timing diagram of the Control Interface signals between the Vector Store (VS) and the Store Buffer (ST);

FIG. 341 is a timing diagram showing a simple instruction startup;

FIG. 342 is a timing diagram of a Store Vector Instruction for a single precision operation and the Element Count (ELCNT) equals thirty-five (35);

FIG. 343 is a timing diagram of an Index Store Vector (ISV) instruction, the Element Count (ELCNT) is equal to nine (9) and a double precision result is desired;

FIG. 344 is a timing diagram for an Index Load Vector (ILV) instruction where the Element Count is equal to 9 and a double precision operation is desired;

FIG. 345 is a timing diagram for a Store Alternating Elements Vector (SAEV) instruction where the Element Count is equal to 38 and a single precision result is desired;

FIG. 346 is a simplified timing diagram for an SAEV instruction startup where an overlap occurs;

FIG. 347 is a simplified timing diagram corresponding to that shown in FIG. 346 where the instruction overlap involves a Store Vector (SV) instruction with another Store Vector instruction; and FIG. 348 is a simplified timing diagram corresponding to that shown in FIG. 346 and FIG. 347 where the overlap concerns a Store Vector instruction with an Index Store Vector instruction.

DETAILED DESCRIPTION OF THE PREFERRED EMBODIMENT

A. Conventions

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor. a group of parallel conductors, or a general path of data for control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art as they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND, designated A; OR; Inversion designated I, and the like, the designations within the block symbols of the respective functions is readily understandable to those skilled in the art. More complex macro logical functions, for example multiple input Exclusive-OR, designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of a High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead input lines will provide a low at the output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead output would normally indicate and AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various type of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function; and the symbol having a curve at the input and the curve pointed output, often referred to as the "shield" symbol, represents circuits that perform the logical OR function. For the AND or Or functions the straight line input or the dot, represents a High AND or High OR respectively, and results in a High output signal when all input signals are High for AND, or a High output signal when any input is High for a High OR. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

Figure 1:
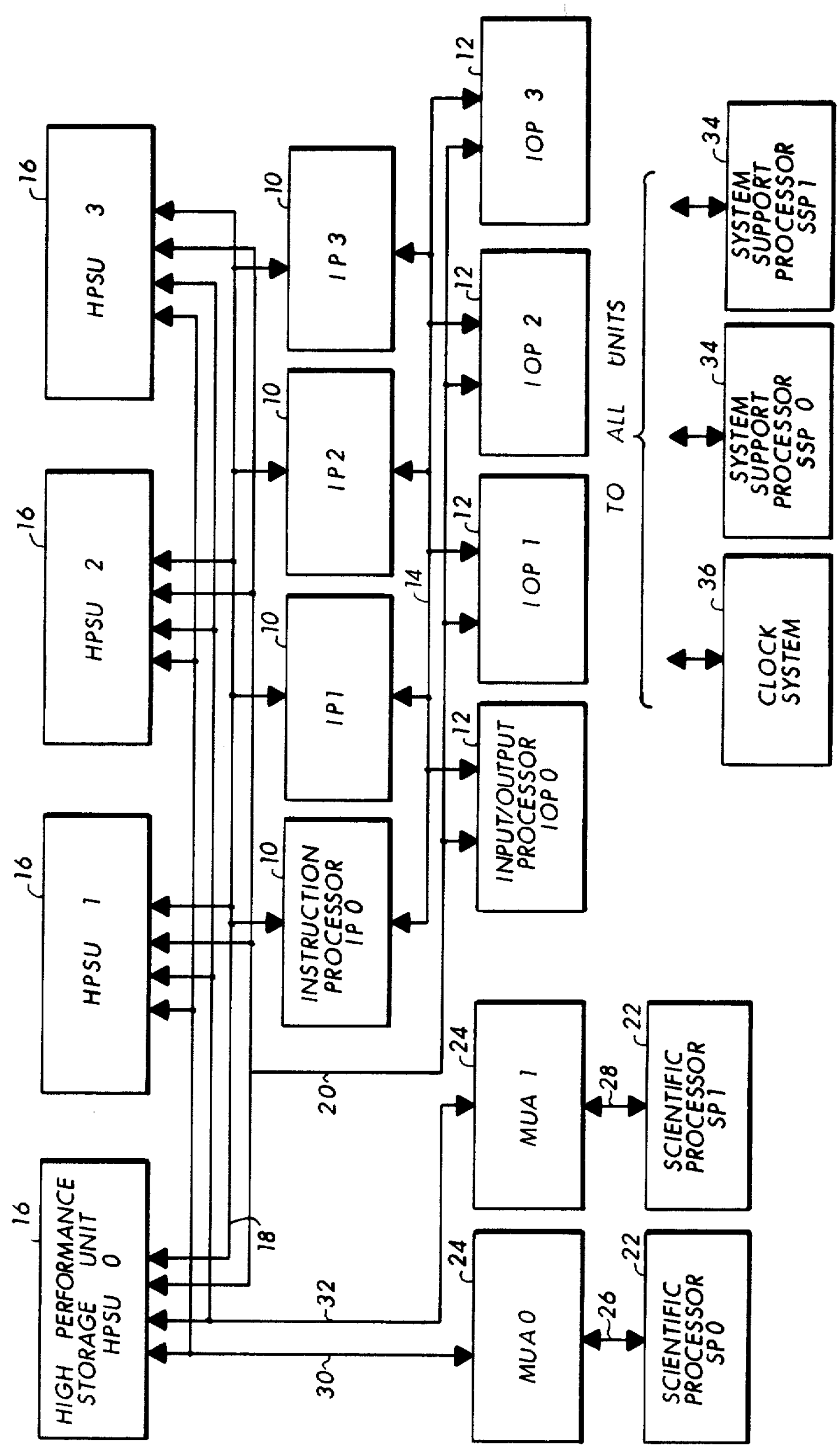
FIG. 1 is a system block diagram of the over-all digital data processing system in which the invention can be utilized.

FIG. 1 is a system block diagram of the over-all digital data processing system in which the invention can be utilized. The over-all system is essentially modular, and provides for parallel processing.

For the configuration illustrated, from one to four Instruction Processors IPO through IP3, each labelled 10, can be utilized. Each IP can for example be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and in general does data manipulation. The IP also executes instructions to set up input and output data buffers and channel access control.

In conjunction with the IPs, from one to four Input-/Output Processors IOPO through IOP3, labelled 12, can be utilized. The interconnections between the IPs and the IOPs, collectively labelled 14, are in fact direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs function as the system Central Processing Units, and the IOPs act as CPUs to handle all of the communications. The IPs and IOPs are commonly referred to as the 1100/90 system.

From one to four High Performance Storage Units HPSUO through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HPSU also includes at least one Scientific Processor (SP) port, and in the embodiment shown has two such SP ports. Each SP port has a four-word data interface. The IOP and the IP interfaces operate on a 60 nanosecond clock cycle and the SP interface operates on a 30 nanosecond clock cycle. The HPSU is a novel memory system and is described in one or more of the above identified co-pending incorporated patent applications.

Error Correction Code (ECC) is used internally to each HPSU to provide single-bit error correction and double-bit error detection.

In the embodiment illustrated one or two Scientific Processor SP1 and SP2, labelled 22, can be utilized. If a single SP is used with a single HPSU, it may be coupled directly to the SP port of such HPSU. The SP can be for example a Type 3068-00 unit available from Sperry Corporation. When two or more HPSUs are used with an SP, it is necessary to provide a Multiple Unit Adapter (MUA) for each SP. In this configuration MUAO and MUA1, each labelled 24, are coupled to SPO and SP1, respectively, across interface lines 26 and 28. MUAO is coupled to each HPSU through interconnection paths 30, and MUA1 is coupled to each HPSU through intercommunication path 32.

Each SP functions under direction of one or more of the IPs to perform scientific type calculations in a support mode. In this regard, the IPs can be considered to be the so-called "host" processors and the SPs can be considered to be support processor, all operating through common storage. The host IPs execute the master operating system and function to initiate specific tasks in the SPs. The SPs respond and execute the instructions necessary to accomplish the assigned tasks. The instruction set of the SPs include scalar and vector instructions, as will be described below, and interfaces with the HPSUs without need for large quantities of dedicated storage.

The over-all system maintenance and supervision is accomplished through one or two System Support Processors SSP0 and SSP1, each labelled 34, which are connected to all units of the system. The SSP is available commercially and is utilized in the Sperrry Corporation 1100/90 Systems. In general, it is understood that each SSP performs the function of a hardware maintenance panel for the system. The display and setting of information, the activation of most maintenance facilities, selecting modes of operation and the like, is done at the control section of the SSP.

A Clock System 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock. The clock system is novel, and is described in one of the above identified co-pending patent applications.

Intercommunication between units is essentially on a Request and Acknowledge basis, and the interfaces will be described in more detail as appropriate.

C. High Performance Storage Unit (HPSU)

Figure 2:
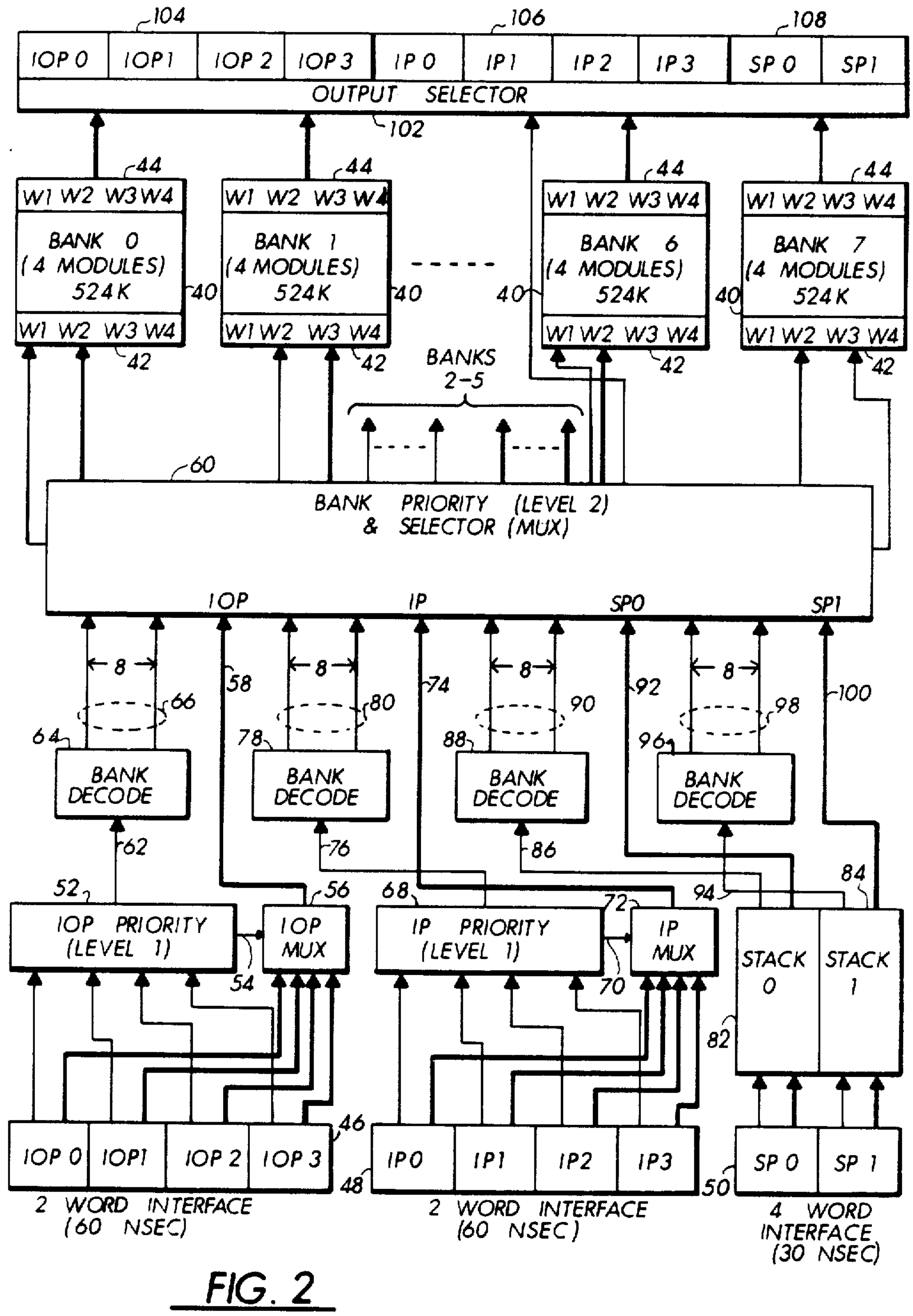
FIG. 2 is a simplified functional blocked diagram of the High Performance Storage Unit (HPSU)

FIG. 2 is a simplified functional blocked diagram of the High Performance Storage Unit (HPSU).

The HPSU is a storage device that is commonly accessible by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524 K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOPO through IOP3. It also has an IP interface 48 which can accommodate up to four IPs at the four IP ports designated IOPO through IOP3. The IOP ports 46 and the IP ports 48 each operate on a two-word interface at a clock rate of 60 nanoseconds.

The HPSU also has an input SP interface 50 which can accommodate two SPs at the two ports labelled SPO and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SP requests and data are temporarily held in Stack 0 and Stack 1 awaiting availability of the memory system. In essence, Stack 0 and stack 1 are each a first-in-first-out (FIFO) circulating buffer. The request information feeds out of Stack 0 on line 86 to the Bank Decode 88 which provides a one-of eight selection and data passes on line 92 to the Bank Priority Selector 60. Similarly, request information passes on line 94 to the Bank Decode 96 for making selections on lines 98, while the data passes on line 100.

The Bank Priority and Selector functions to select between the IOP, IP, and the two SP requests presented to it for accessing memory. It also functions to control the Output Selector 102 when reading is to take place. The HPSU has an IOP output 104 capable of handling four IOP ports IOPO through IOP3. It also has an IP output 106 capable of handling four IP ports labelled IPO through IP3. Finally, it has an SP output 108 capable of handling two SP output ports (from the HPSU) labelled SPO and SP1. Data rates and timing at the output ports 104, 106, and 108 are similar to those for the input ports previously described.

The HPSU is described in detail in one or more of the identified co-pending applications.

D. Multiple Adapter (MUA)

Figure 3:
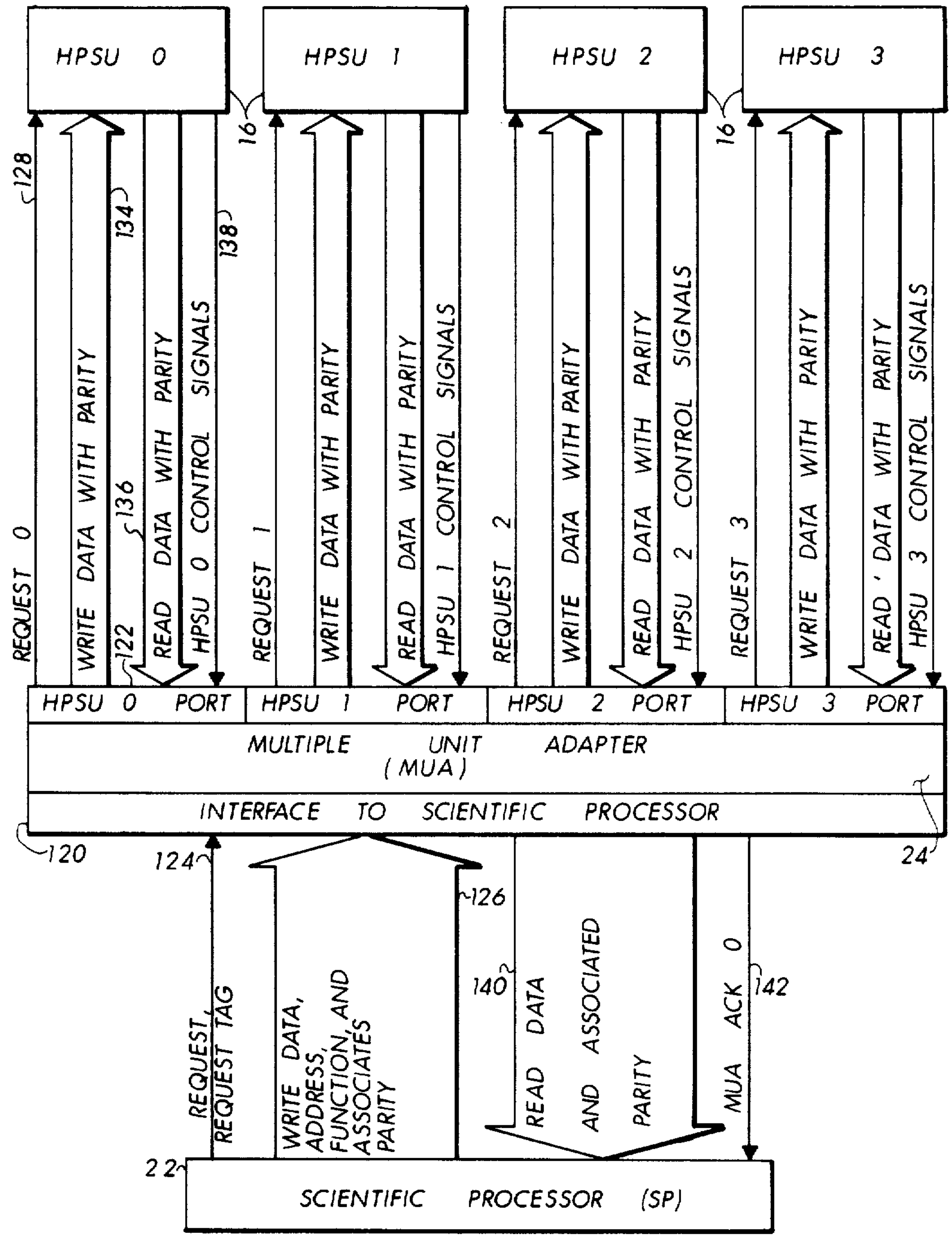
FIG. 3 is a simplified block diagram of the Multiple Unit Adapter (MUA) for providing selective interconnection of a Scientific Processor to one of up to four High Performance Storage Units.

FIG. 3 is a simplified block diagram of the Multiple Unit Adapter (MUA) for providing selective interconnection of a Scientific Processor 22 to one of up to four High Performance Storage Units 16.

The MUA 24 has an Interface 120 to Scientific Processor (SP) 22 and up to four HPSU ports 122, each adapted for interconnection to an associated HPSU 16.

A Scientific Processor (SP) 22 issues Request signals on control path 124 to the MUA. For a write operation, the write data, address, function, and associated parity is provided via cable 126. The MUA can accumulate up to eight requests from the SP without acknowledgement, and the requests and the associated data are stored in a first-in-first-out (FIFO) stack (not shown). This accumulation can be considered as pipelined or queued requests.

For purposes of example, if it is assumed that the SP has designated HPSUO, and the request is determined by the MUA to be the next request to be processed, a Request 0 will be provided on control path 128 to HPSUO. Recalling that this will be only one of several requests that can be provided to HPSUO, it will be honored when its priority is selected. If the function is write, the write data with parity will be provided on cable 134. If the function is to read, the read data with parity will be passed from HPSUO on cable 136 to the MUA. Upon completion of the requested function, the HPUSO control signals will pass via control path 138 to the MUA. When the MUA establishes that the current request is a read, the read data and associated parity will pass on cable 140 to the SP. As each request is passed on to the selected HPSU, an MUA Acknowledge O (ACK O) signal will be passed on control path 142 to the SP, thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSUl, HPSU2, and HPSU3, would function in a similar manner. When the SP requests access to a different HPSU, all outstanding requests to the first HPSU must be serviced prior to the MUA processing requests to a different HPSU.

All data and control signals from the SP are passed on to the HPSU, with the exception of a few special control signals, and all data and control signals from the HPSU are passed on to the SP. The SP data word is four 36-bit words wide. Along with the data field, an address field of 22-bits and a function field of 6-bits are sent with the request. Odd parity is provided for every 9-bits of data, making the SP data word transmission a total of 160-bits, the address field a total of 25-bits, and the function code field a total of 7-bits.

The MUA is described in detail in one or more of the identified co-pending applications.

E. Scientific Processor (SP)

Figure 4:
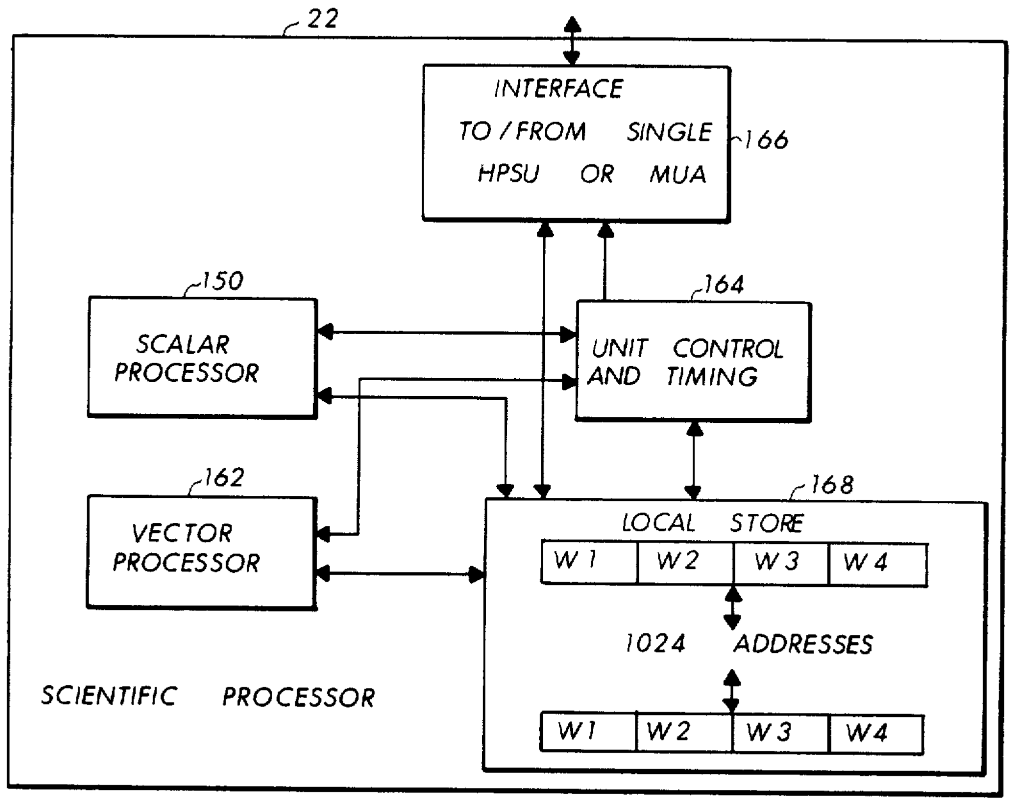
FIG. 4 is a simplified block diagram of the Scientific Processor (SP)

FIG. 4 is a simplified block diagram of the Scientific Processor (SP).

Basically, the SP 22 is a subsystem defined as an attached processor of the host system. The SP has been optimized for the high speed execution of floating-point vector arithmetic operations. It is intended to execute user code only and is not intended to run an executive program. It does not require a control program nor does it have any priviledged modes of operation. The SP includes distinct modules, the Scalar Processor Module (SPM) 150, the Vector Processor Module (VPM) 162, the Unit Control Timing 164, the Interface 166, and the Local Store 168.

The Vector Processor Module 162 performs vector calculations. The Scalar Processor Module 150 performs scalar operations, and also has the over-all control function, including instruction fetch and issue. Generally speaking, the Scalar and Vector processor instructions require both modules to execute.

The Local Store 168 in the preferred embodiment comprises a high speed random-access memory (RAM) 4,096 words. The arrangement is such that four words W1 through W4 are accessed simultaneously, yielding an addressable range of 1,024 addresses. The Local Store 168 is used primarily for the storage of frequently used scalar variables, and it should be noted as distinguished from the relatively large dedicated memory sections in prior art support processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

The Scientific Processor (SP) 22 is part of a tightly coupled multiprocessor system. The primary purpose of the SP is the high speed execution of vector floating-point arithmetic. As described with reference to FIG. 1 two new units have been designed to allow operation of SP(s) in the 1100/90 multiprocessor system. They are the High Performance Storage Unit HPSU(s) 16, and the Multiple Unit Adapter MUA(s) 24.

Each SP only runs user programs that are set up in an HPSU by one of the IPs. Programs and portions of programs set up for execution on an SP are called activities.

In a minimum multiprocessor system configuration utilizing an SP, the HPSU is central to the system. The SP, the IP, and the IOP all interface to the HPSU. The SP has one special port that allows requests each clock cycle, while other ports only accept requests on a two clock cycle basis. Multiple requests for the same module address rahge within the HPSU are honored on a certain priority basis and in that case, some of the requesters must wait their turn.

The System Clock Unit (Clock System 36) provides logic clock signals to the HPSU, the SP, the IP and the IOP. Each System Support Processor (SSP) 34 has its own clock source (not shown). The SSP is directly connected to the HPSU, the IOP, the IP and to the SP. It is also indirectly connected to the System Clock Unit 36 and to the Instruction Processor Cooling Units (not shown).

1. Interfaces

Figure 5:
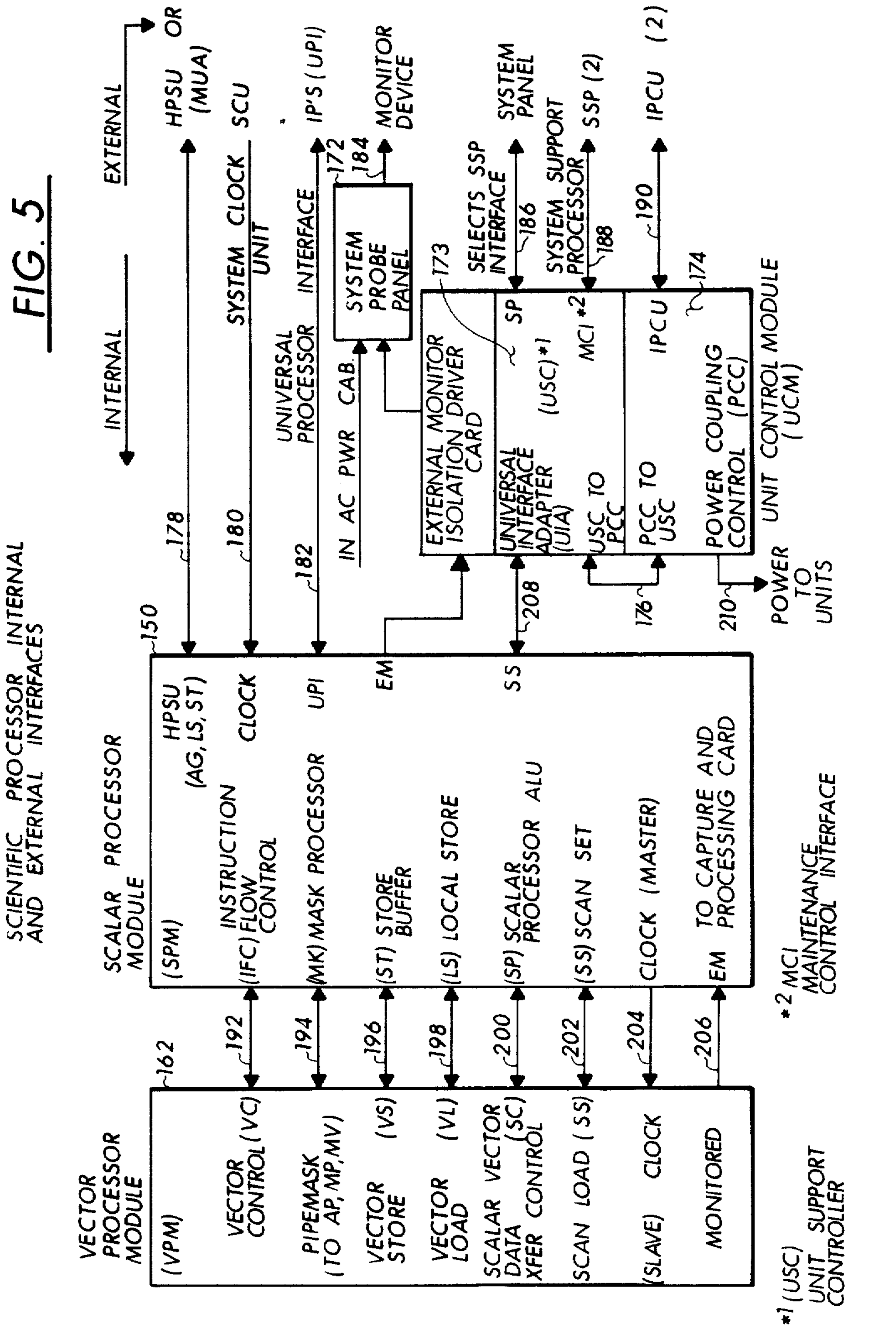
FIG. 5 is a block diagram of the Scientific Processor (SP) Internal and External Interfaces.

FIG. 5 is a block diagram of the Scientific Processor (SP) internal and external interfaces. In the Scientific Processor, which is designated as a Type 3068-O unit available from Sperry Corporation, there are four internal units or modules, namely the Vector Processor Module (VPM) 162, the Scalar Processor Module (SPM) 150, the Unit Control Module (UCM) 170, and the System Probe Panel 172. The Unit Control Module 170 is further partitioned into two logical entities, the Unit Support Controller (USC) 173 and the Power Coupling Controller (PCC) 174. The USC-to-PCC 176 is an internal interface.

The interfaces are shown as lines, but it should be understood that this is illustrative only, and that physically there may be multiple conductors and circuits utilized. The external interfaces, are the interfaces to other units within the central complex, and are listed down the right hand side of the FIG. 5. The read/write data interface via line 178 to the HPSU or MUA interfaces with the SPM 150. The System Clock Unit (SCU) interfaces via lines 180 with the SPM 150. The Universal Processor Interface (UPI) and the Instruction Processor(s) is interfaced via line 182. The interface at the System Probe Panel 172, to the Monitor Device is via line 184. The input from the System Panel selects the SSP interface and interfaces with the Unit Support Controller 173 of the Unit Control Module 170 via line 186. One of the things that this interface does is to select the next interface. There are two interfaces via line 188 to two different System Support Processor 34 which interface with the Maintenance Control Interface (MCI) of the Unit Support Controller 173. The last external interface 190 is from the Power and Cooling Controller 174 to the Instruction Processor Cooling Units (not shown). It selects one of the two cooling units and monitors environmental conditions.

The internal interfaces are the interfaces going between the VPM 162 and the SPM 150. The instruction interface 192 is from the Instruction Flow Control (IFC) logic section of the SPM to the Vector Control (VC) section of the VPM. The mask interface 194 is from the Mask Processor (MK) of the SPM to the Add Pipe (AP), the Multiply Pipe (MP), and the Move Pipe (MV) in the VPM. These will be described in detail below. The Vector Store (VS) interface 196 provides information stored in the Vector Files to the Store Buffer (ST). It also provides information from main storage, or HPSU or Local Store. The Vector Load (VL) interface 198 transfers data from the Local Store (LS) section to the Vector Load (VL), from where it is transferred into the Vector Files. The source of the data in this case is from the HPSU or from Local Store. The Scalar Vector Data Transfer (SC) interface 200 transfers data from the SPM to the VPM. It also writes Scalar instructions into the Vector Files or broadcasts G operands. Further it transfers data in the opposite direction from the VPM to the SPM. This data could be elements from Vector Files or results or reduction instructions. The Scan Set (SS) interface 202 couples the master Scan Set card in the SPM to the slave Scan Set card in the VPM. The clock interface, 204 is from the master clock card in the SPM to the slave clock card in the VPM. The last interface shown is the External Monitor (EM) interface 206. It involves a collection of key logic signals in the VPM. These signals are routed to the SPM and ultimately they go out of the external monitor interface of the System Probe Panel 172.

There is another internal interface 208 from the SPM to the Unit Support Controller 173. This is the universal interface adapter interface from the Unit Support Controller and connects to the Scan Set card of the SPM. An interface 210 is provided between the Unit Control Module 170 and the power and cooling units (not shown).

2. Clock Distribution and Timing

FIG. 6 is a block diagram of the Clock Distribution System. The System Clock Unit (SCU) 36 provides multiple drives, with a separate drive for each IP, IOP and HPSU in the system.

The interface 180 from the System Clock Unit SCU comes into the Master unit clock card 220 in the Scalar Processor Module (SPM) 150. From there, clock signals are sent to the Slave Unit Clock Card 222 in the Vector Processor Module (VPM) 162. The unit clock cards 220 and 222 serve their respective modules. The lines 224 and 226 emanating from the unit clock cards represent the drive to remaining logic cards within the associated module. Typical logic cards 228 and 230 in each module receive the clock drive from the System Clock Unit, and utilizes two Clock Pulse Generator (CPG) Gate Arrays (GA) on each card to derive the four phase clock signals identified as phases 1, 2, 3, and 4 (01, 02, 03, 04) for distribution on that logic card. In other words, each logic card has its associated CPG circuits.

FIG. 7 is a timing diagram of the Clock Phases. The clock phases illustrated occur at the output of the two Clock Pulse Generators on each logic card. The low portion of each clock pulse is the active level. The time low is the period of the clock pulse that is considered its active time. Four clock pulse phases are generated. The times shown are common to all four phases. The clock cycle is 30 nanoseconds from start of one clock pulse in a phase to the start of the next occurring pulse in that phase. The clock pulses are nominally 5½ nanoseconds in duration. The time duration from the beginning of a clock signal in one clock phase to the beginning of a clock signal in the next subsequent clock phase is nominally 7½ nanoseconds.

3. Technology

While not illustrated, some of the features of the high performance technology utilized to construct the SP will be described. Emitter coupled subnanosecond circuits including gate arrays and Small Scale Integrated (SSI) circuits, known in the industry as the 100K family are used. The gate array circuits have 168 logic gates, 48 logic pins and power dissipation of up to 5 watts. The SSI packages, or chips as they are called, have 21 logic pins and power dissapation of up to a quarter of a watt. Most of the IP gate arrays plus 13 additional types that were designed specifically for this SP are used. The printed circuit cards have space for a maximum of 227 SSI circuit packages. Gate arrays require two SSI locations. The printed circuit cards are never fully populated with gate array circuit packages or chips, since a certain number of spare circuit locations for possible logic changes were provided. A pair of card pins for logic changes, check out and modifications are also reserved. In some instances power distribution pins on a card are the limiting factor for the necessary interconnections. The printed circuit cards are 11.3 inches wide by 10.8 inches deep, with logic, power, and ground connectors on three edges. Connectors on the rear edges of the cards plug into a back panel of the module through use of a conventional connector. The two side edges of the cards connect to the side panel to the module with Zero Insertion Force (ZIF) connectors. The cards are paired together and have two connectors for logic signals between the cards of the pair. These circuit packages are water cooled by a cold plate between the cards of the pair. Two cards of a cold plate are molded together into a subassembly part for insertion into the card module. Each module has room for a maximum of 52 cards or 26 card pairs. The SPM has 48 cards and the VPM has 52 cards. Ribbon cable and coaxial cable are used for logic interconnect between the SPM and VPM.

4. Major Sections

Figure 8:
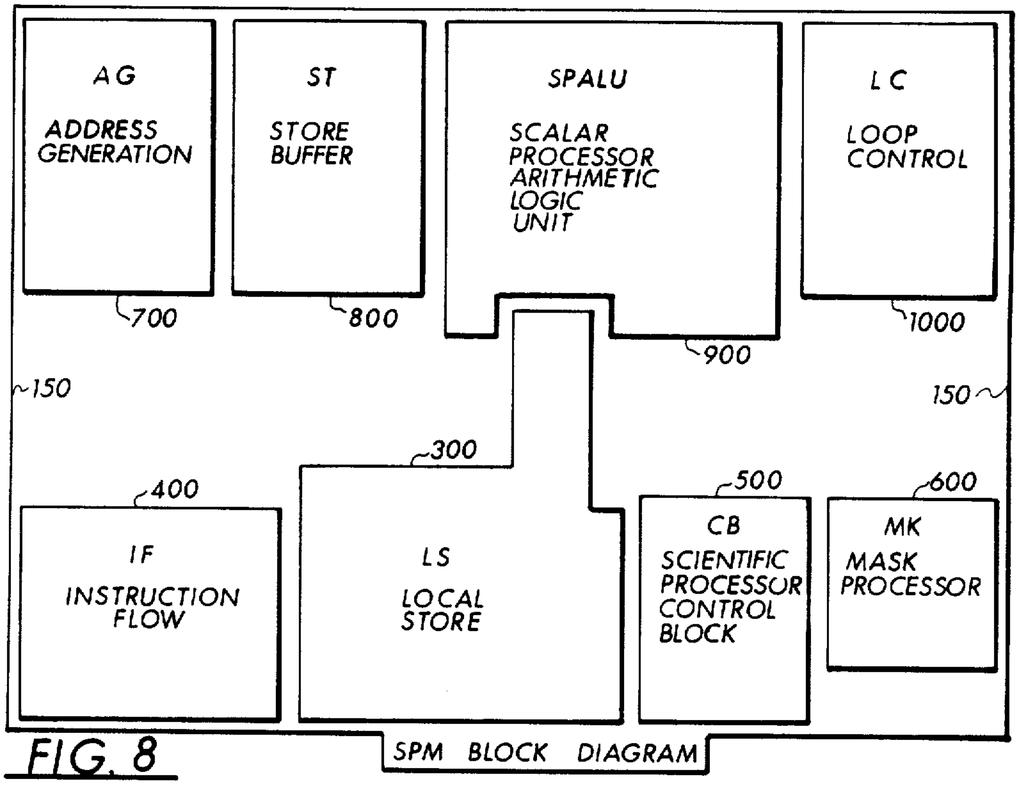
FIG. 8 is a simplified pictorial diagram of the major sections of the Scalar Processor Module (SPM) of the SP.
Figure 9:
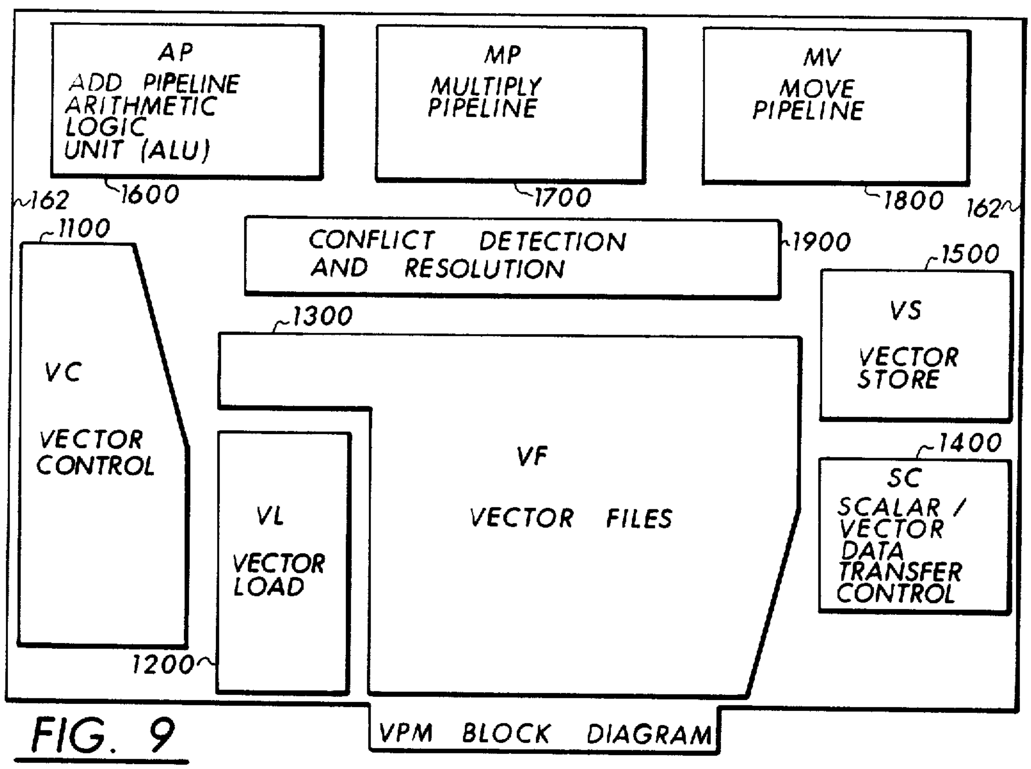
FIG. 9 is a simplified pictorial diagram of the major sections of the Vector Processor Module (VPM) of the SP.

FIG. 8 is a block diagram of major sections of the Scalar Processor Module (SPM) of the SP. FIG. 9 is a block diagram of the major sections of the Vector Processor Module (VPM) of the SP. These two drawings taken together illustrate the machine organization at the major section level. First, as to the section block diagrams in general, there are a total of sixteen major logic sections with eight sections in each of the SPM and the VPM. Several additional auxiliary sections are present, such as the Scan Set and the external monitor however, these will be referred to only briefly since they are not necessary for a complete understanding of the invention. Each section has a character identifier. This identifier is also used as a prefix for exchange for all logic signals originating in that section. In the SPM (FIG. 8), break-out to the eight logic sections is on a functional basis. These sections provide architectually, required functions. In the VPM (FIG. 9) the sections are designated to accommodate explanation of the parallel pipelined operations of the vector processing sections.

The sixteen logic sections mentioned for FIG. 8 and FIG. 9 indicate their relative positions on the later detailed block diagrams. Referring now to the SPM block diagram of FIG. 8, there is illustrated the Instruction Flow Control (IF) section 400; the Local Store (LS) section 300; the Control Block (CB) section 500; the Mask Processor (MK) section 600; the Address Generation (AG) section 700; the Store Buffer (ST) section 800; the Scalar Processor Arithmetic Logic Unit (sPALU) 900; and the Loop Control (LC) section 1000. These sections will be described in detail below.

The VPM sections are shown in FIG. 9, and again the relative positions of the various sections are indicated as they will be related to more detailed block diagrams. These major sections include the Vector Control (VC) section 1100; the Vector Load (VL) section 1200; the Vector File (VF) section 1300; the Scalar Vector Data Transfer Control (SC) section 1400; the Vector Store (VS) section 1500; the Add Pipeline (AP) section 1600, which includes an Arithmetic Logic Unit (ALU); the Multiply Pipeline (MP) section 1700; and the Move Pipeline (MV) section 1800. A special control section Conflict Detection and Resolution 1900 is utilized to resolve conflicts between the various pipelined sections.

Figures 10, 10D:
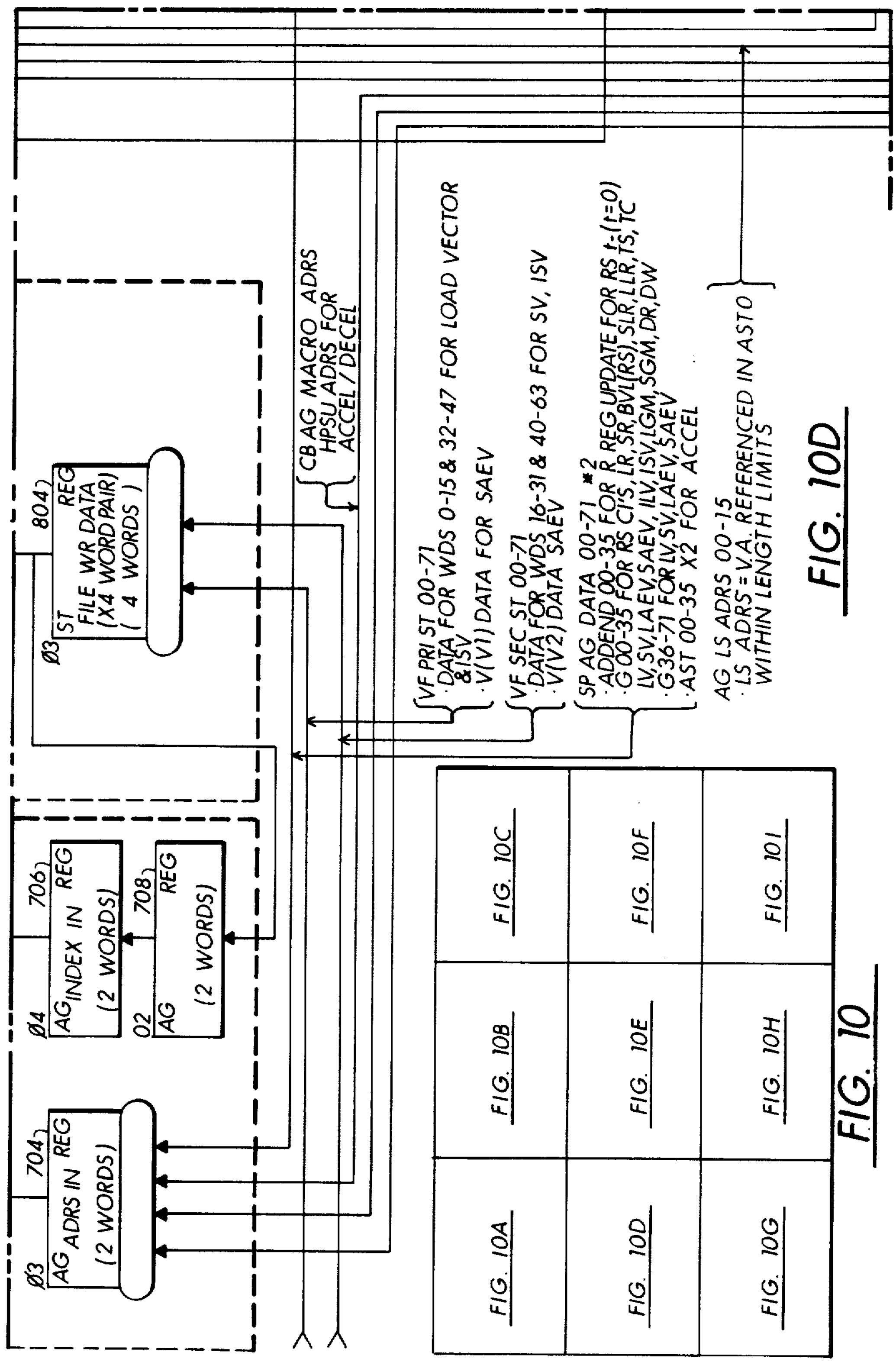
FIG. 10A through FIG. 10I, when arranged as shown in FIG. 10, comprises a logic block diagram of the Scalar Processor Module (SPM) illustrating in more detail the logical arrangement and functioning of the sections illustrated in FIG. 8.
Figure 10A:
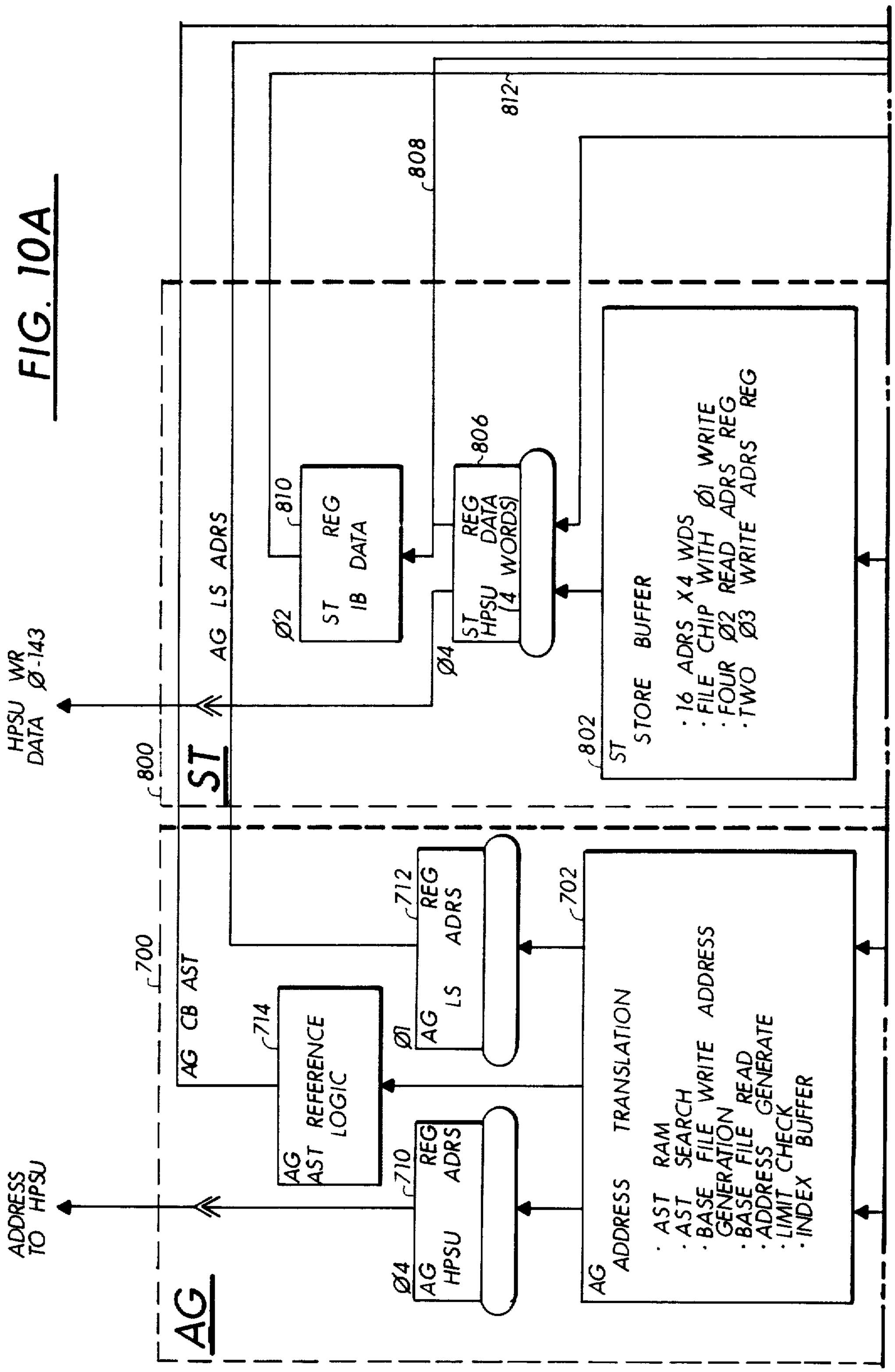
Figure 10B:
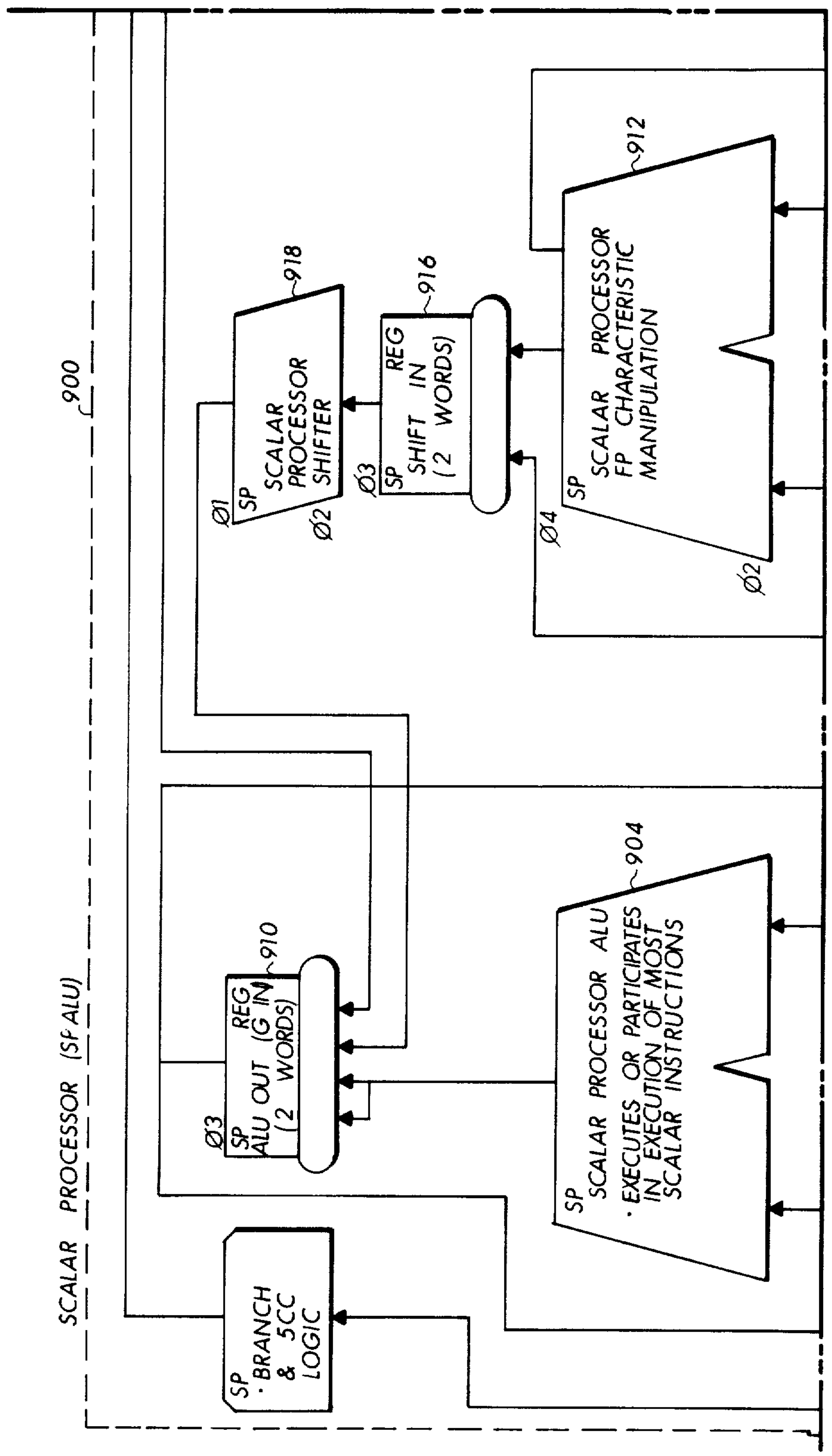
Figure 10C:
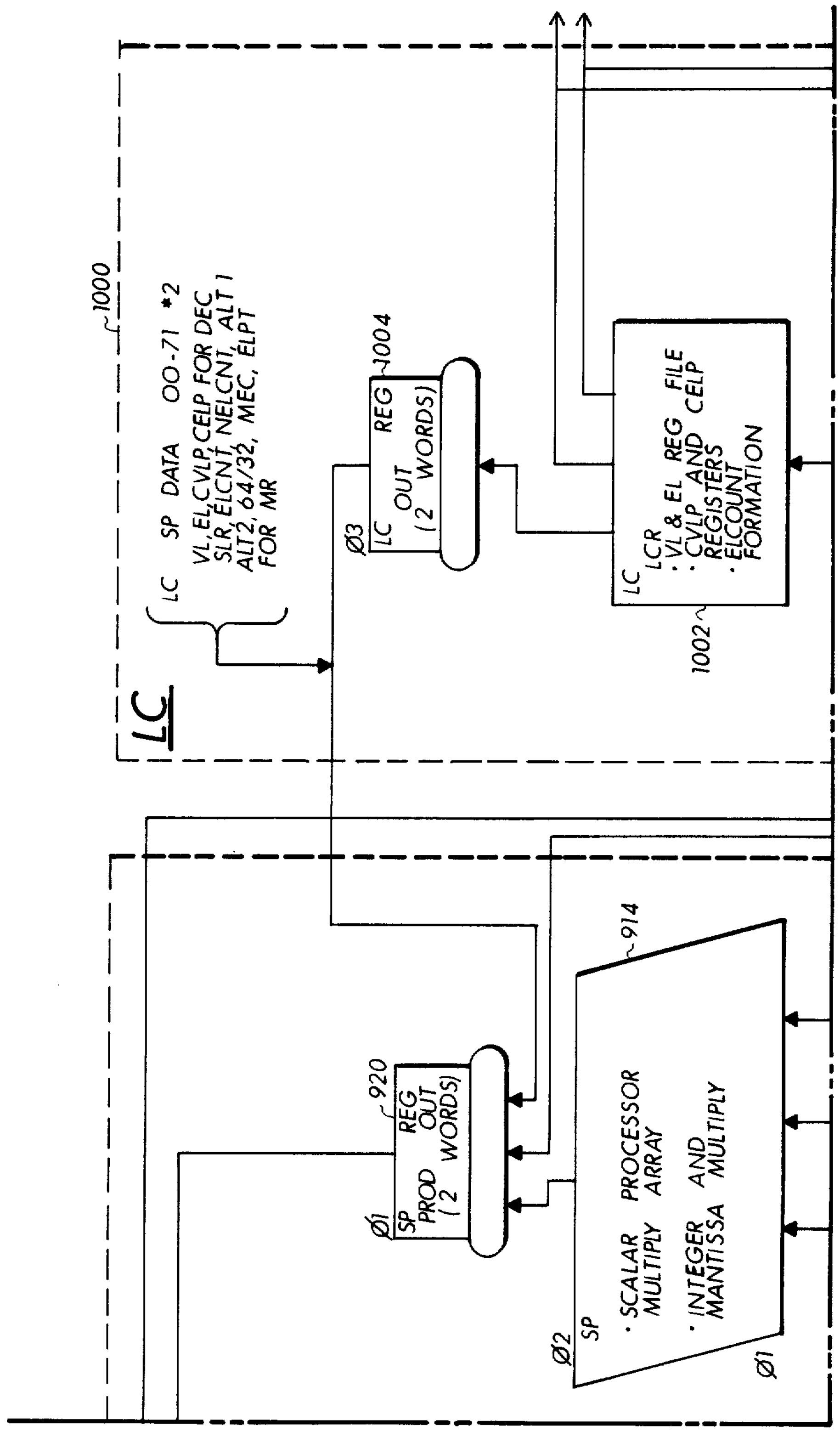
Figure 10:
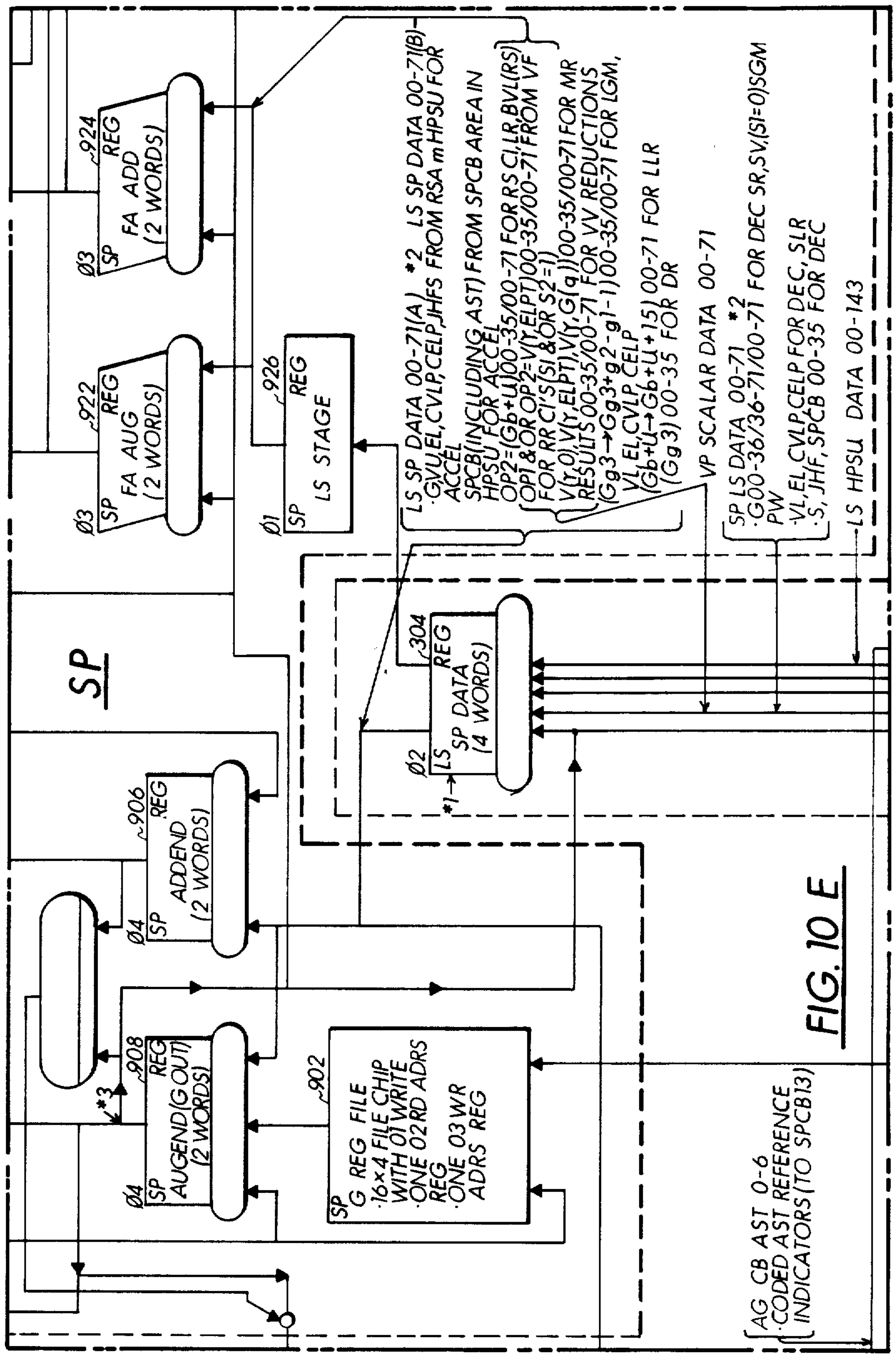
Figure 10F:
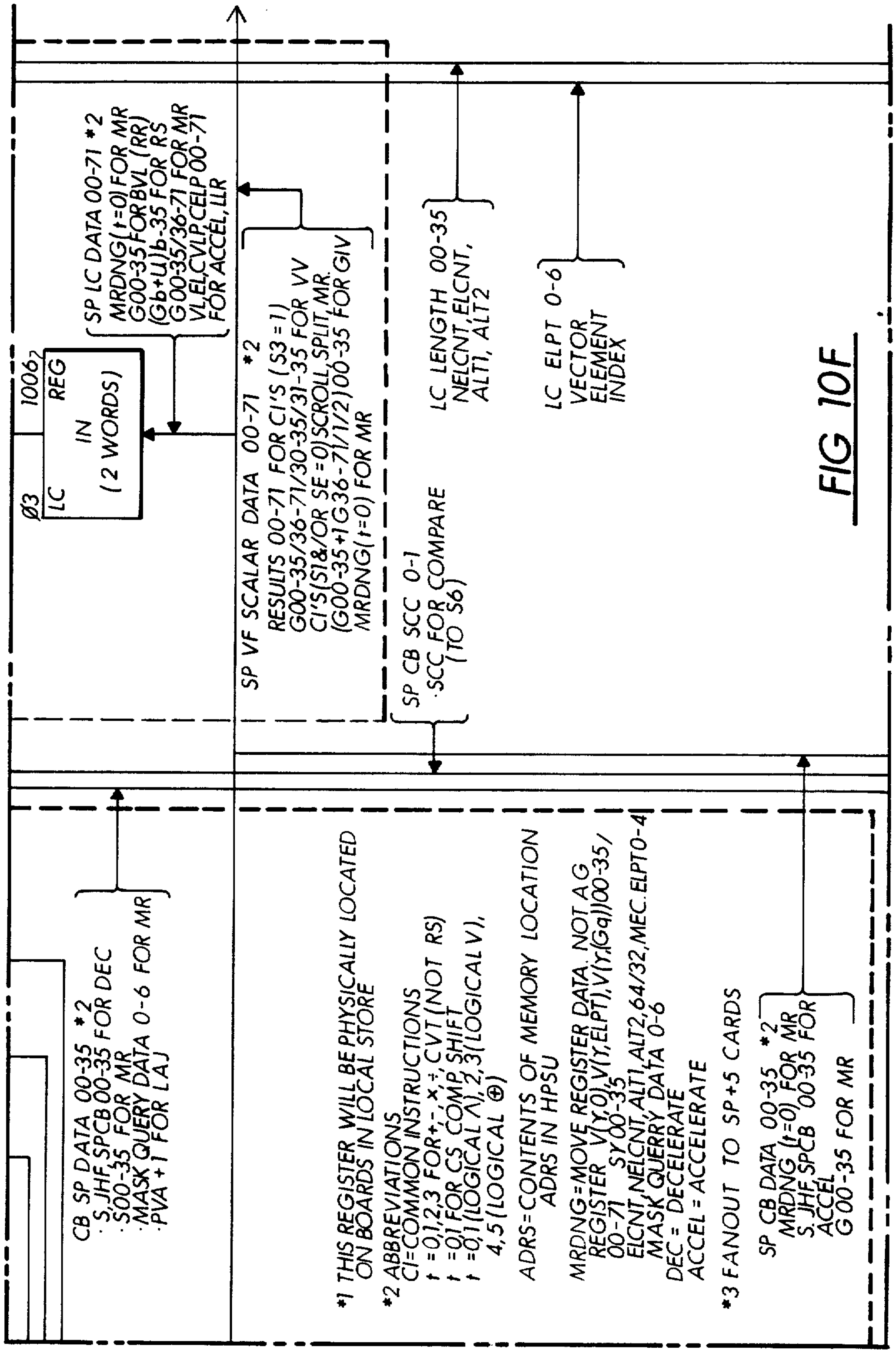
Figure 10G:
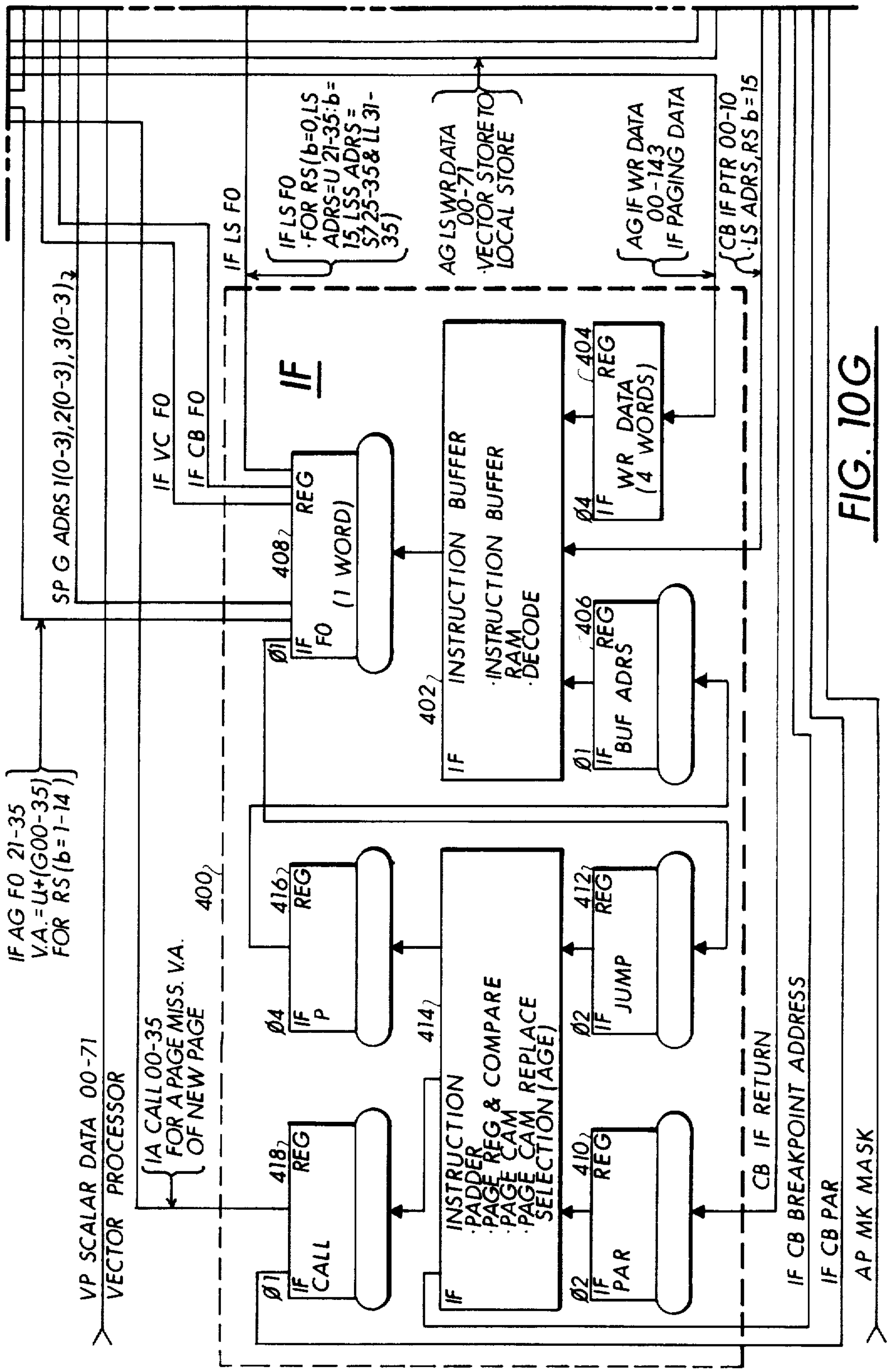
Figure 10H:
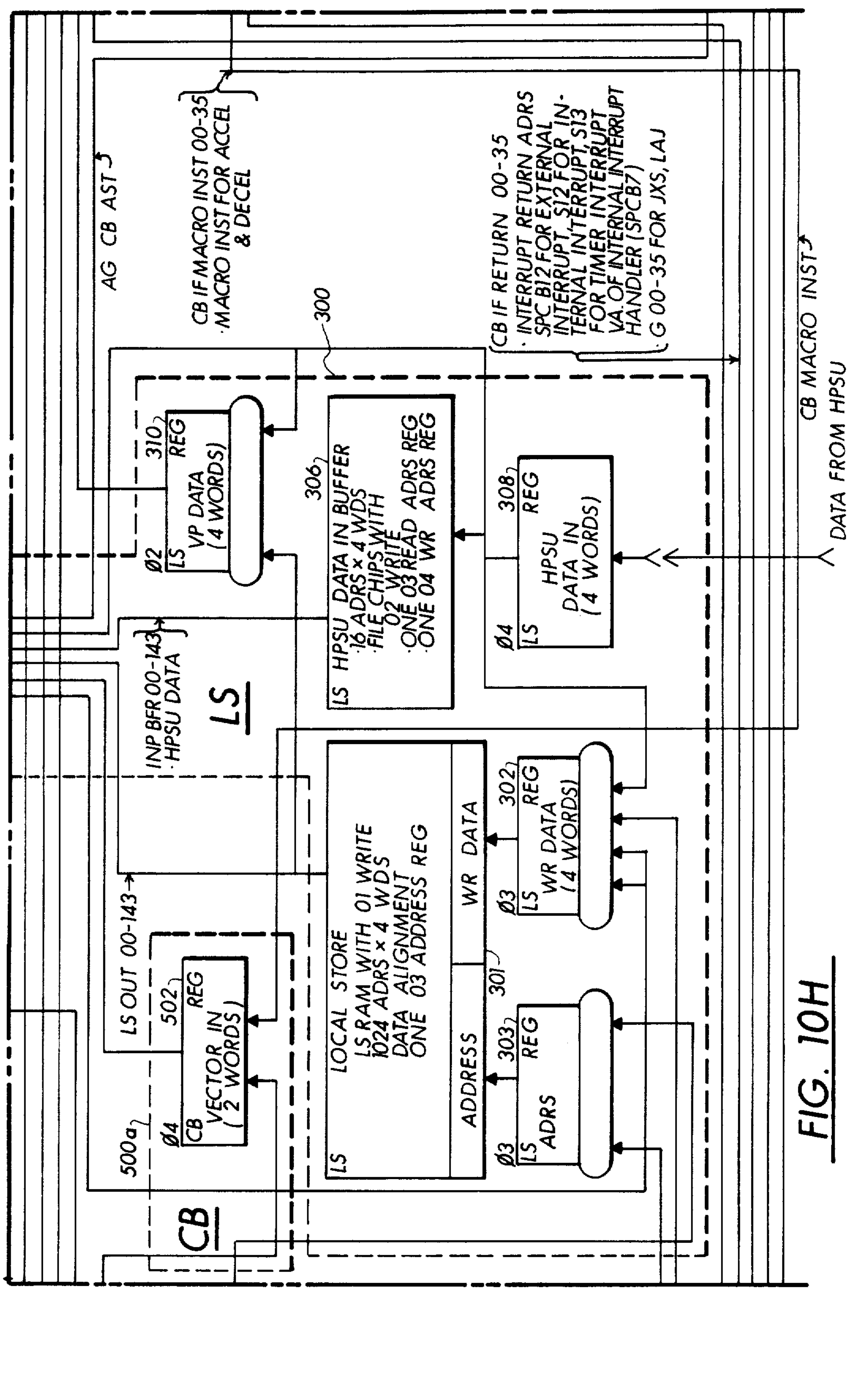

5. Scalar Processor Module Block Diagram FIG. 10*a* through FIG. 10*i*, when arranged as shown in FIG. 10, comprises a logic block diagram of the Scalar Processor Module (SPM) illustrating in more detail the logical arrangement and functioning of the sections illustrated in FIG. 8. In the more detailed logic block diagrams, activating clock phases are identified adjacent the block symbols.

a. Instruction Flow (IF)

The Instruction Flow (IF) section is enclosed in dashed block 400, and includes the Instruction Buffer 420, which is a 4096 word RAM organized four words wide, and also contains the instruction decode mechanism which is primarily decode logic. Associated therewith are three interface registers which include the Write Data Register (WR DATA) 404 for the instructions that are written into the Instruction Buffer on a four word basis; Buffer Address Register (BUF ADRS) 406 for receiving the address for instructions which are to be read out of or written into the Instruction Buffer; and the FO Instruction Register 408. The instructions always are read from the Instruction Buffer for execution. The Program Address Register (PAR) 410 holds the Address of the instruction to be executed and the Jump Register 412 holds the jump-to Address. These addresses are translated by Instruction translate circuitry 414, where a virtual Address is determined. The P Register 416 holds the 36-bit virtual address, and the Call Register 418 holds the Control Block program Address.

The Instruction Buffer 402 is organized into sixteen pages of 256 instructions per page. The first 256 addresses are page O, the next 256 addresses are page 1, and so forth. In the Instruction translate circuitry 414, the page Content Addressable Memory (CAM) is fully associative on the page basis. That is, the most significant 28-bits of the address are actually used in a CAM look-up. The architecture does not allow modifying instructions so the instructions within the Instruction Buffer are never sent back to storage, but they are invalidated after use.

Included in the IF section is the page replacement section (see block 414). Normally the replacement algorithm determines that a start is made at the first page, whenever instructions are first brought in for an activity. Any additional instructions that are required for the next page goes onto page one, the next page into page two, and so forth until all of the pages are used up. Basically, if a new page is required, then one page must be invalidated and the select mechanism chooses which one will be replaced based on the Age algorithm. This will be described in more detail below.

b. Local Store

The Local Store (LS) section is shown enclosed in dashed block 300, it includes the Local Store circuitry 301 consisting of a 4096 word RAM organized at 1024 addresses by four words wide, so it is possible to read or write one to four words per reference. A data mechanism for aligning the data is included. It can arrange or interchange the four words in any selectable order. The Address is received in the Address Register (ADRS REG) 303. The write data is held in the Write Register (WR DATA REG) 302, and the read data is directed to the SP Data Register 304, which is four words wide.

The HPSU Data Buffer 306 in the LS section 300 includes memory circuitry organized on a four word by 16 address basis. It is constructed of separate chips to allow concurrent reading and writing. It is a first-in, first-out buffer and is used exclusively for the Load Multiple instruction for loading multiple G registers, as will be described below. Data from the HPSU is received by the HPSU Data In Register 308, which is four words in capacity. The HPSU data words are available selectively to the Local Store 301, the HPSU Data In Buffer 306, the SP Data Register 304, or the Vector Process Register (VP DATA REG) 310.

c. Control Block (CB)

The Control Block (CB) section is shown enclosed in dashed blocks 500*a* and 500*b*. The Scientific Processor Control Block (SPCB) circuitry is shown as block 504 includes the State Registers which comprise an architectural entity that contain the state of the machine at certain stages of activity execution. Portions of the Scientific Processor Control Block (SPCB) 504 contains information or pointers gated to execute activities. For example, it includes a G op history file which is a record of the jump instructions executed which allows tracing of programs. The Macrostack contains the code used for various internal operations such as acceleration, deceleration, handling interrupts and so forth. The instructions from the Macrostack are actually transferred into the Instruction Buffer just as a page from the instruction storage might be. It is executed from there in a normal fashion. Also included are the Interrupts, and the Interrupt Detection and Control logic. A separate patent application has been filed concurrently with this application on this Macrostack operation and the contents are included herein by this reference.

The Program Address Register (PAR) 506 receives the address, and the data word is directed to the Data In Register 508 for recording the SPCB. Data read out is directed to the Data Out Register 510 (one word), and return addresses are directed to the Return Register 512 for transmission to PAR Register 410 in IF 400. The Vector In Register 502 (in dashed block 500*a*) receives two words from the Vector Processor Module and is under control of SPCB 540, to transfer received words to the SP Data Register 304.

d. Mask Processor (MK)

The Mask Processor (MK) shown enclosed in dashed block 600 includes circuitry in block 602 that includes the Mask Registers, which actually are State Word Register 4 and State Work Register 5. Masking allows various alterations and calculations of the fan out into the vector processing entities. It is operative in the Vector Processor Module (VPM) in the Add Pipe line 1600, the Multiply Pipe line 1700, and the Move Pipe line 1800. Additionally, the mask is provided to the Address Generation (AG), shown enclosed in dashed block 700 for load and store vector instructions. Also it accepts data from the Add Pipeline in the Vector Processor Module for altering the mask for comparison instructions. The MK Out Register 604 provides one word of data at a time to the Data Out Register 510 in Control Block **500*b***.

e. Address Generation (AG)

The Address Generation (AG) section is shown in dashed block 700, and includes the Address Translation portion 702 which responds to address information derived from a variety of sources. This includes information from the Activity Segment Table (AST) which is in the form of a RAM; from SPCB 504 of Control Block **500*b*; from Instruction Flow 400; and from Scalar Processor ALU 900. This AST has to do with information for translating virtual addresses into real storage addresses. It consists of up to 32 four word entries and the number is specified in word 6 of the SPCB 504**. The first entry is always for the local store segment. Some of the instruction data contained in each of the entries are lower segment name and the upper segment name, the execute, the read and write address and the length of the segment minus one word. Also included are the instructions for doing an AST Search, which is a portion of the address translation mechanism for translating a virtual address into a real address. It also has the Base File write mechanism as well as the Base File itself. It holds translated real addresses for subsequent usage. There are 16 of these Base Files and they are associated on a one-for-one basis with the 16 general registers or G registers which are architectural entities and will be described more fully below.

In most instances the virtual address for a storage reference is obtained from one of those general or G registers; one of the exceptions, of course, being instruction buffer page misses. In the latter case the virtual address comes from the Instruction Flow 400 section to the ADRS IN Register 704, included is the Address Generation section. There the base files can be read for subsequent usage of a previously translated address. The Address Generation 700 section is where the contents of the base file are passed to form an address to either the HPSU via the HPSU ADRS Register 710, or to the Local Store 300 via the LS ADRS Register 712. Limit check hardware is also included in Address Translation 702 to make sure that the request is within the segment. If the request is outside the segment an interrupt is initiated. It also contains the Index Buffer which is used for the Vector Index Store and Index Load instruction which contains the vector of indexes into the segment. From the HPSU ADRS Register 710, the address is interfaced by cable to the High Performance Storage Unit. If the request was to an address in Local Store 300 then the LS ADRS Register 12 is utilized. The input from the Vector Processor is where most virtual addresses are sent to the Address Translation section 702. The AST Reference Logic 714 provides access (AG CB AST) to the Control Block SPCB 504.

f. Store Buffer (ST)

The Store Buffer section (ST) is shown enclosed in dashed block 800. ST includes the Store Buffer 802 which is a buffer that allows simultaneous read and write of data. It is organized four words wide by 16 addresses. The data coming from the Vector Files of the Vector Processor Module is where a Vector Store instruction is entered into the four word FILE WR DATA Register 804. It is temporarily written into the Store Buffer 802 and from there the data is then transferred out through the HPSU Data Register 806 four words at a time to the HPSU. The HPSU output data register accomplishes the data alignment in that it can rearrange the four words out of the Store Buffer 802 in any arrangement. This section also has an output 808 to the Local Store 300, in case, the address that was formed in the Address Generation section 700, was for Local Store rather then for the HPSU. The ST DATA Register 810 provides an output 812 to IF 400 if the words are to be stored in Instruction Buffer 402.

g. Scalar Processor Arithmetic Logic Unit (SPALU)

The SPALU 900 section is enclosed in dashed block 900, contains four major sub-sections. The G Register File 902 is an architectural entity, that includes 16 G Registers constructed of chips to allow simultaneous read and write. It is organized 2 words wide by 16 addresses.

The Scalar ALU 904 is constructed of ALU Gate Arrays and has a capability of doing various arithmetic and logical operations. It is this section that executes or participates in execution of most scalar instructions, however, it does not handle scalar multiply, shifts, or floating-point multiply instructions.

The Scalar ALU 904 receives a two-word input from the ADDEND Register 906 and a two-word input from the AUGEND Register 908, and produces a two-word output to the ALU OUT Register 910.

Scalar floating point manipulation is accomplished by the Scalar Processor FP Characteristic Manipulation 912 Gate Arrays, and the Scalar Processor Multiply Array 914, which accomplishes either integer or mantissa multiply operations; and drives the Product Out Register 920.

The Scalar Processor FP Characteristic 912 circuitry drives the Shift In Register 916 which controls the shifting of the Scalar Processor Shifter 918.

The floating point augend is provided through the Floating Point Augend Register (FA AUG) 922, and the addend is provided through the Floating Point Addend Register (FA ADD) 924.

h. Loop Control (LC)

The Loop Control (LC) section is shown enclosed in dashed block 1000. The Loop Control Register (LCR) section 1002 generally contains eight Vector Loop (VL) registers, eight Element (EL) registers, the Current Vector Loop Pointer (CVLP) register and the Current Element Pointer (CELP) register. The Current Vector Loop Pointer register selects one of the eight Vector Loop registers from which the Element count is formed for vector instructions. The Current Element Pointer register selects one of the eight Element registers from which the element point is formed. Additionally, there is the element count formation logic and the element point formation logic. Also included is the logic for detecting the element count equal to 0 or the element count or pointer of a given range. LCR 1002 provides output to Register 1004, and receives input from Register 1006. These complex operations will be described in more detail below.

i. Scalar Processor Module Operation

Having described each of the eight logical sections of SPM, the overall operation will be described with reference to FIG. 8 and FIG. 10.

The Address Generation section 700 does all of the address translation and the generation for all references made to memory for operands and instructions as well as for some references to Local Store 300. The Address Generation section contains the Activity Segment Table (AST) 702.

The Control Block (CB) 500 section of the Scientific Processor (SP) contains the state or S registers and the CB registers. It handles interrupt detection and response and essentially provides control to the SP at any given time.

The Instruction Flow 400 Control section is the heart of the machine. It initiates the execution of all of the instructions and includes the Instruction Buffer 402.

The Loop Control (LC) 1000 section contains the Loop Control registers 1002 and does all processing on those registers.

The Local Store (LS) 300 section physically houses the Local Store RAM 301 and also contains the HPSU Data Input Buffer 306 and the HPSU Data Input Register 308.

The Mask Processor (MK) 600 section contains the Mask Registers 602 which are State Register S4 and S5 and it performs all processing on those registers.

The section on the Scalar Processor Arithmetic Logic Unit (SPALU) 900 includes the G Registers 902 and performs all Scalar Processing in the machine.

The Store Buffer (ST) 800 section is the final section and it contains the buffer for the data that is being sent back to memory. It includes the HPSU Data Register 806 for output from the SP.

The functionality of the Address Generation 700 section must accommodate several instruction types. It does the address generation and translation for all format instructions. There are three formats for instructions, one is the RS format, the second is the RR format and the final one is the VV format. The RS format generally means that the operation requires one Register operand and one Storage operand, thus the term RS.

The RR format means that the operands both come from Registers, while the VV format usually means that the operands come from Vector Registers, however the load vector is also a VV instruction.

Turning to the first class of instructions that the AG 700 executes, it accomplishes the operand fetch for all RS format instructions except for the case where the data comes immediately from the Local Store 300. That is the case where the B field of the instruction is 0 or 15 and it has an absolute address less than 4K. As these instruction are explained the complexity of the instructions should be appreciated to understand the difficult tasks that the AG 700 section must perform. On the RS format instruction, for example, it has to, in one instance, get the upper word of the two-word pair, while in another instance it must obtain the lower word of the two-word pair. In still another instance, it must get both words of that pair.

The VV format instruction is involved in many types of vectors. For example, there is the Load Vector, Store Vector, Load Alternating Element Vector, Store Alternating Element Vector, Index Load Vector, Index Store Vector. Further, variables must be dealt with on many of these instructions. These include the stride or index for the indexed loads and stores, the lengthening of an operation. Also, a masking operation might be involved and the type of precision must be determined. The next instruction class includes the Load G Multiple, the Store G Multiple, the Load Control Registers and the Store Loop Control Register. For the Load G Multiple and Store G Multiple there again is a case of single or double precision which is indicated by the t field in the instruction. It will either be a 0 or 1 for single or double precision, respectively. Whenever a page of instructions is not stored in the Instruction Buffer 402, an instruction buffer miss sequence goes into operation and a page load is done primarily by the Address Generation section.

Because of the intimate interaction between the AG 700 section of the SP and the HPSU, it is considered worthwhile to review for a moment the HPSU structure. It has eight (8) banks and four words per bank. One way that this could be diagrammed is to show words 0 through 31 on a line with words 0 through 3 being contained in bank zero, words 4 through 7 in bank one, words 28 through 31 in bank seven, and then words 32 through 35 would end up in bank zero again, words 36 through 39 would end up in bank one, and word 64 again in bank zero. If variables are on these banks and words, N could be assigned to the word in bank M, to bank 1 and to the block address. Generally, this formula would have the word in a bank number, the bank number for an address, and the block address. The possible range on these variables is as follows: N is 0, 1, 2, or 3,; M is 0 to 7 from banks 0 through 7 and the block address which would form 0 to 2 17th minus 1, with the largest address being 4 million minus 1. An example of a calculation of the block address, bank address, and word address is helpful. Choosing 1107 as a number, this would be located in the 34th block, in the 4th bank and it would be the third word in that bank.

The HPSU interface is capable of transferring four words per request. The AG 700 section has to send out four requests, the absolute address noted above minus the final two bits of it, so a 22 bit address is created. It is the bank address and the block address combined that is sent out. When it sends out for the four words to be read, not all of the information is there, since the bottom two bits of this address are missing. Those bottom two missing bits are essentially a set of four mask bits in the AGSI function register. The top four bits of this 6 bit register are the write field for the four words sent out by the AG section to the memory.

The functions of the Address Generation 700 section will now be summarized. First, it does an AST lookup. This means an Activity Segment Table lookup and it starts with either a G Register for Base Register or a G Register plus an offset amount from the instruction. The instruction includes a U field and that is the offset field of the instruction. So an AST lookup is done with a U base register or the base register plus offset from the instruction. It then calculates a virtual segment offset and then adds the virtual segment offset to the real base address. The next function that must be performed is link checking to determine whether the references are within the AST entry. It also must do permission bit checking, since each block of memory that the SP can access has three bits associated with it to indicate whether you can read that section, write that section or execute instruction from that section. When the Address Generation section is involved in a Vector Load it has to do a calculation for addresses. First it calculates the base plus virtual segment offset, so that it is the first block of four words that it gets back from memory. The next clock it starts with the base plus the virtual segment offset and replace the virtual segment plus base with the new calculation. In the case of an Index Vector Load it would add the index to the base plus virtual segment offset. There is a new calculation going on for a Load Vector. The same thing applies to a Store Vector.

The next function that the AG 700 section performs is the control of the data path for operands returning from the HPSU. There are essentially two buffer areas where these operands may be sent. One is in the Vector Processor Module, and the other is in the Scalar Processor Module. The buffer in the Vector Processor Module is in the Vector Load 1200 section, while the buffer in the Scalar Processor Module is in the Local Store 300 section.

The AG section also maintains shadow G Registers. These are registers that accelerate the acquisition of operands from HPSU. They are translated G Registers or base registers located in the Address Generation 700 section.

Another Address Generation hardware feature that should be pointed out is the Tracking Memory feature. This is the feature that controls the data path from memory (HPSU) for items returning from main memory (HPSU). For every request to main memory there is exactly one entry in the Tracking Memory, and the contents of that Tracking Memory controls the data paths, the selectors and the MUXes for the data path along which the operand travels. The load select memory feeds the Tracking Memory with information for that purpose.

Another memory in the AG section that should be noted is the Source Select Memory. The contents of that memory are not stored anywhere rather they are used immediately and eliminated. The Store Buffer 800 section contains the HPSU Data Register 806 for transferring the operands to the HPSU.

The ST 800 section contains a Store Buffer 802 for operands being sent to an HPSU. Again this section is primarily controlled by AG 200.

The next section is the Local Store (LS) 300 section. This section is controlled primarily by outside sections, it contains the storage interface to Local Store data array (RAM) 301. It physically contains a 4K Local Store RAM 301, and includes the HPSU Data Input Buffer 306. It is controlled by the Instruction Flow 400 section and the Address Generation 700 section. The Address Generation 700 section operates in conjunction with the Store Buffer (ST) 800 and Local Store (LS) 300 sections.

The next section is the Scientific Processor Control Block (CB) 500 section. Following is a list of the instructions in which it is involved. First, it is used in the Move instruction. It is also involved in an Advance Local Store Stack instruction, and Retrack Local Store Stack instruction. It should be recalled that it contains the CB section which includes the State Registers 504 (S Registers). One of the S Registers contains the Local Store pointer. The CB section controls acceleration and deceleration and it has macro codes for that purpose. The macro code looks very much like normal instructions and it operates very much like a normal instruction, however, the machine is put into an acceleration or a deceleration mode when these instructions are executed. The Control Block is involved with every instruction that has a possibility of a fault. Those instructions are the Floating Point Add and Subtract, the Integer Add and Subtract, the Floating Point and Integer Multiply and Divide; and any RR format instruction where a Vector Register length can occur. This includes every RR format instruction and similarly every VV format instruction. The Control Block section is also involved in the Load Address and Jump instruction of the Jump External Segment instruction. CB controls registers S6, S7, S11 and S14. The S6 Register has the Scalar condition code bits. The S7 Register contains the pointer to the Local Storage stack. The S11 Register can change the mode of the machine to and from slow mode to fast mode.

The SPALU 900 section is involved in all RS format instructions as well as the RR format scalar operations. Those instructions include the Add, Subtract, Multiply, Divide, Conversions, Sign calculations, Absolute Value, Shift and Compare, as well as logicals and scalar loads and stores. The SPALU section is involved in all moves except Loop Control internal moves. The SPALU 900 contains the G Registers 902. Other instructions that would access a G Register, for example, are VV format instructions that require one or more G Operands instead of Vector Operands. Also any instruction that accesses the HPSU needs a Base Register which all come from the G Register file 902. The SPALU is involved in all but six instructions in the machine.

The SPALU section contains the G Registers 902 and it resolves Read/Write conflicts and also Write/Write conflicts. The ALU Out Register 910 is a very important register in the SPALU section. It is important because most of the traffic in SPM goes through that register.

The Mask (MK) 600 section contains the Mask Processor 602, which includes the Mask Registers used for holding the State Words S4 and S5. In fact it is the top 32 bits of S4 Register and the top 32 bits of S5 Register. The Mask Processor is involved in almost all VV format instructions because those require masks. A list of these instructions are: the Add/Subtract; Multiply/Divide, Absolute Value, Move and Move Negative, Shift Count Leasing Signs, Logical, and Compare. In the Compare instruction, the Mask is set out at the beginning of the operation and the Mask is changed during the operation. In other words, the Mask is both the source and a destination in this operation, i.e. the Compare puts results back into the Mask Register.

The Mask Processor sends mask bits to the Add Pipe 1600, to the Multiply Pipe 1700, and to the Move Pipe 1800. It has three interfaces to the Vector Processor and it sends the full Mask to the Address Generation 700 section. The Loop Control 1000 (LC) section contains Loop Control Registers 1002, including the Vector Length Registers and the Element Length Registers, the Current Vector Loop Pointer, and the Current Element Loop Pointer. It also contains shadow Loop Control Registers.

The term "shadow" is used herein to define a group of additional backup registers. They are used in very much the same sense that the Loop Control (LC) registers are, but they are additional registers which are only used during acceleration and deceleration operations. The Loop Control 1000 section is also involved in RR moves, and it does Loop Control moves internally to increase the speed. It performs the processing for the Begin Vector Loop instruction, Jump Vector Loop instruction, Begin Element Loop instruction, Jump Element Loop instruction, the Adjust Current Vector Loop Pointer instruction, the Adjust Current Element Loop Pointer instruction, and the Adjust Both Vector and Element Loop Pointer instruction. It is also involved in an additional Jump. So there are actually four instructions where the Loop Control section is involved in Jump operations.

The last section to be discussed is the Instruction Flow (IF) section, 400 which is essentially the heart of the machine. It contains the Instruction Buffer 402 and initiates execution of all instructions. It does most decode operations. It sends out control words to the various other sections of the machine like the SPALU 900 section, the VC 1100 section in the VPM, and it sends out instruction valid bits. Of course, it does all of the Jumps, and the final execution of the Jumps. At this point the functionality of each logic section of the Scalar Processor Module has now been described.

The data flow portion of the Scalar Processor Module are the paths on which data travels when instructions are executed. Some examples will be described.

First, consider the path on which the data travels for a Move, namely a move from S3 Register to G4 Register, although the specific numbers of these registers does not matter. The data will start in the CB 500 section. From there it will go to a register in the SPALU section. This would be the register in which multiple results are placed when a Multiply is done, however, it is used also for transferring operands on many of the Move instructions. It goes from there to the SP ALU Out Register 910. The SP ALU Out Register 910 is essentially the Write Data Register for the G Register File 902. It is the path for the Move from S3 Register to G4 Register. If the Move were from S4 Register to G4 Register, then the data would start in the Mask Processor 602 and would leave the Mask Processor to the MK Data Out Register 604. From there it goes to the CB 500 section as selected by the CB Data Out Register 510. Thereafter it follows the remainder of the path that the previous Move discussion covered.

In a Move from G5 Register to S4 Register there will be an Address sent to the SPALU 900 section from the Instruction Flow 400 section. This will go into the SP G Register File 902 in a Read Address Register. From there it will be read out to G5 Register from the G Register File 902, where it will go into the SP Augend Register 908 and from there it will go down to CB Data In Register 508. Finally, it will be transferred over to the Mask Processor and will enter through the MK Data In Register (not shown).

6. Vector Processor Module Block Diagram (VPM)

Figure 11H:
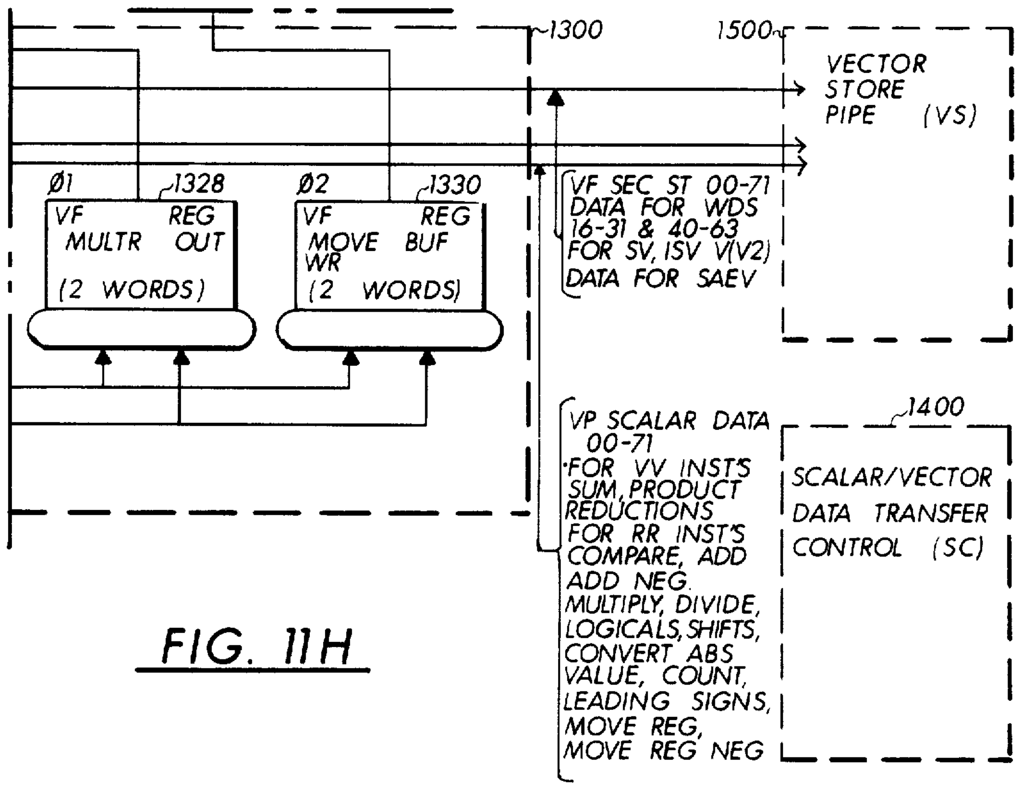
FIG. 11A through FIG. 11H, when arranged as shown in FIG. 11, comprises a logic block diagram of the Vector Processor Module (VPM) illustrating in more detail the logical arrangement and functioning of the sections illustrated in FIG. 9.
Figure 11:
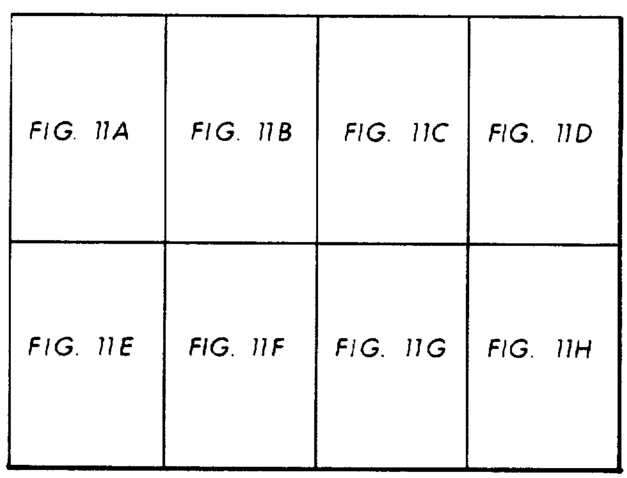
Figure 11A:
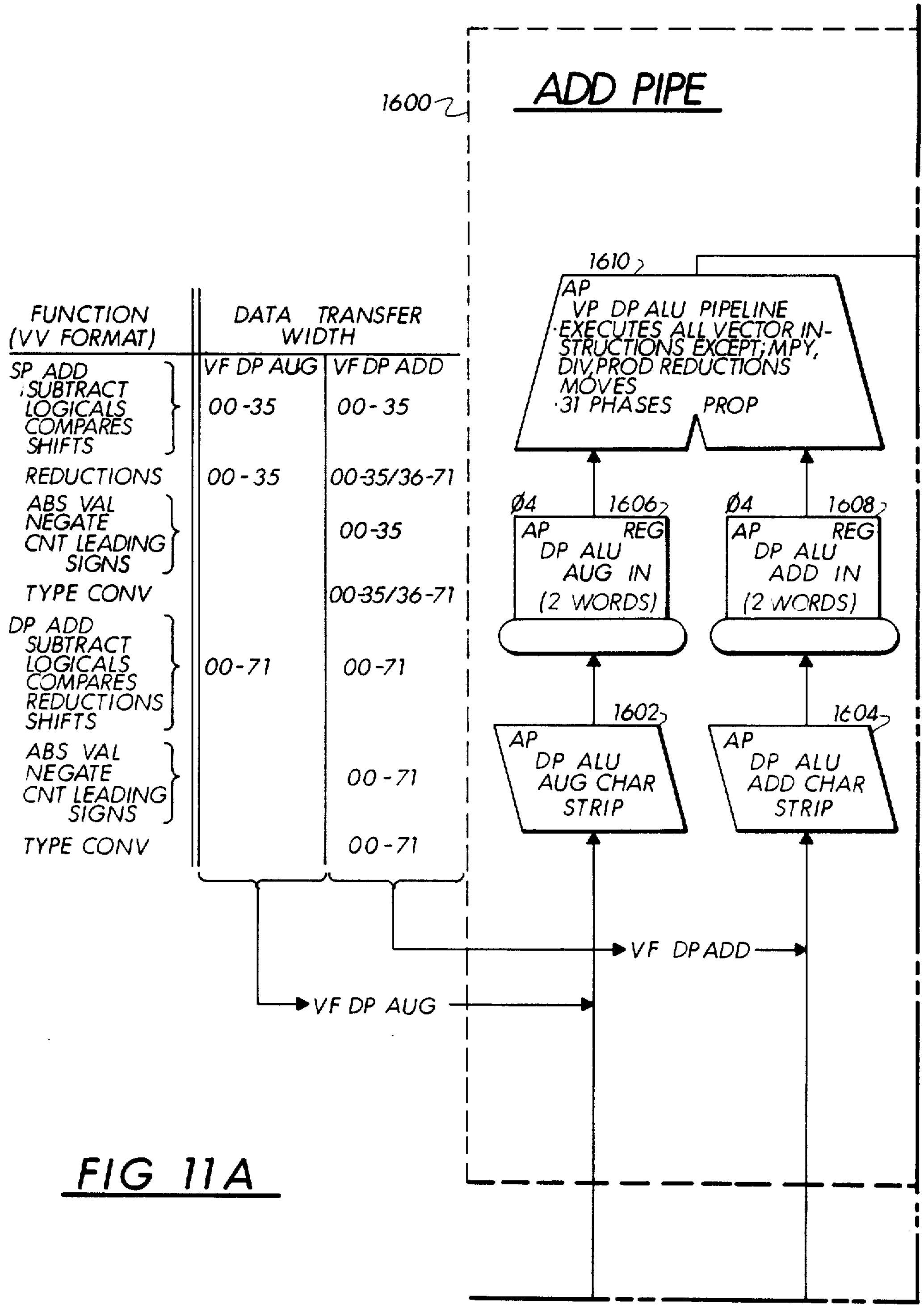
Figure 11B:
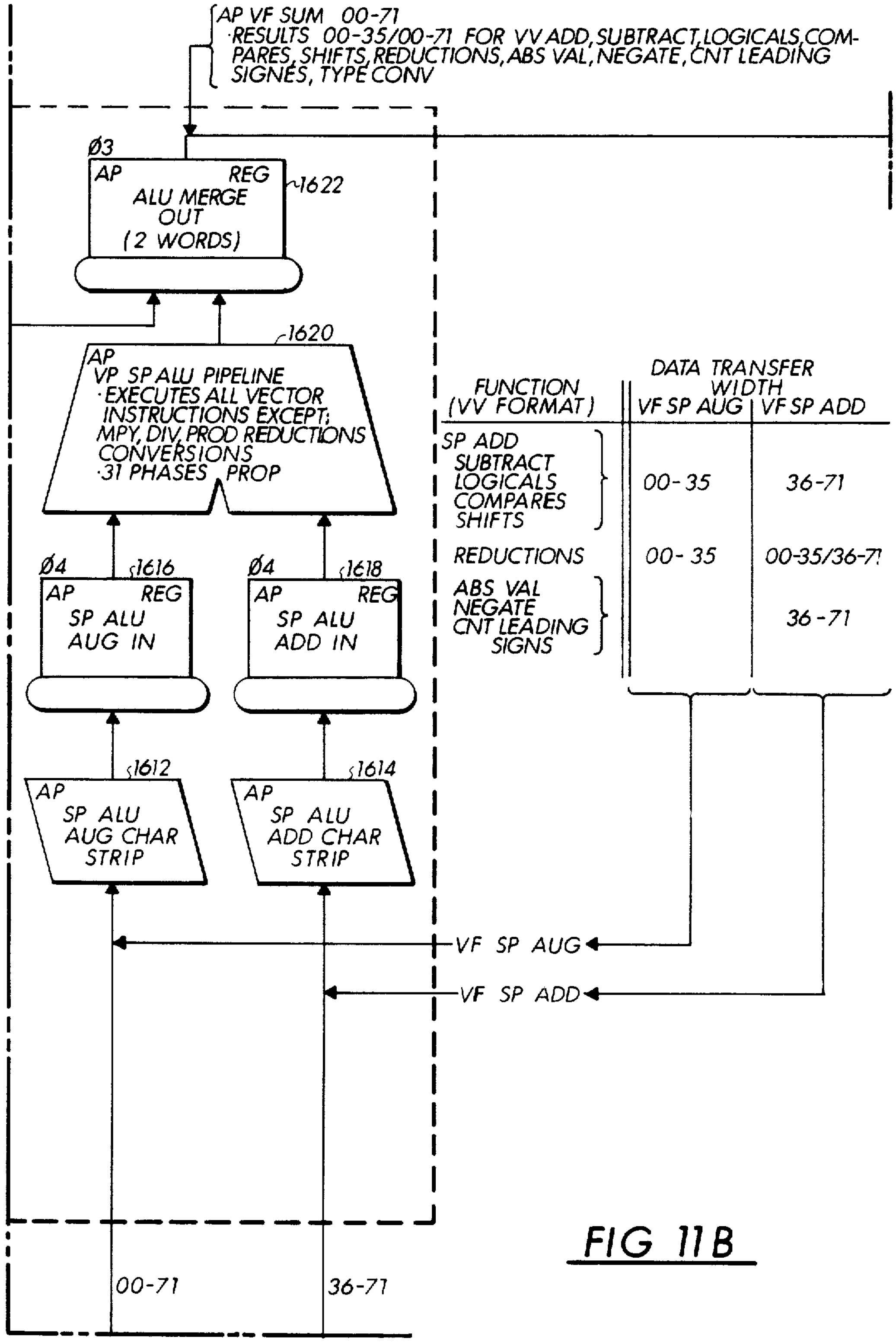
Figure 11C:
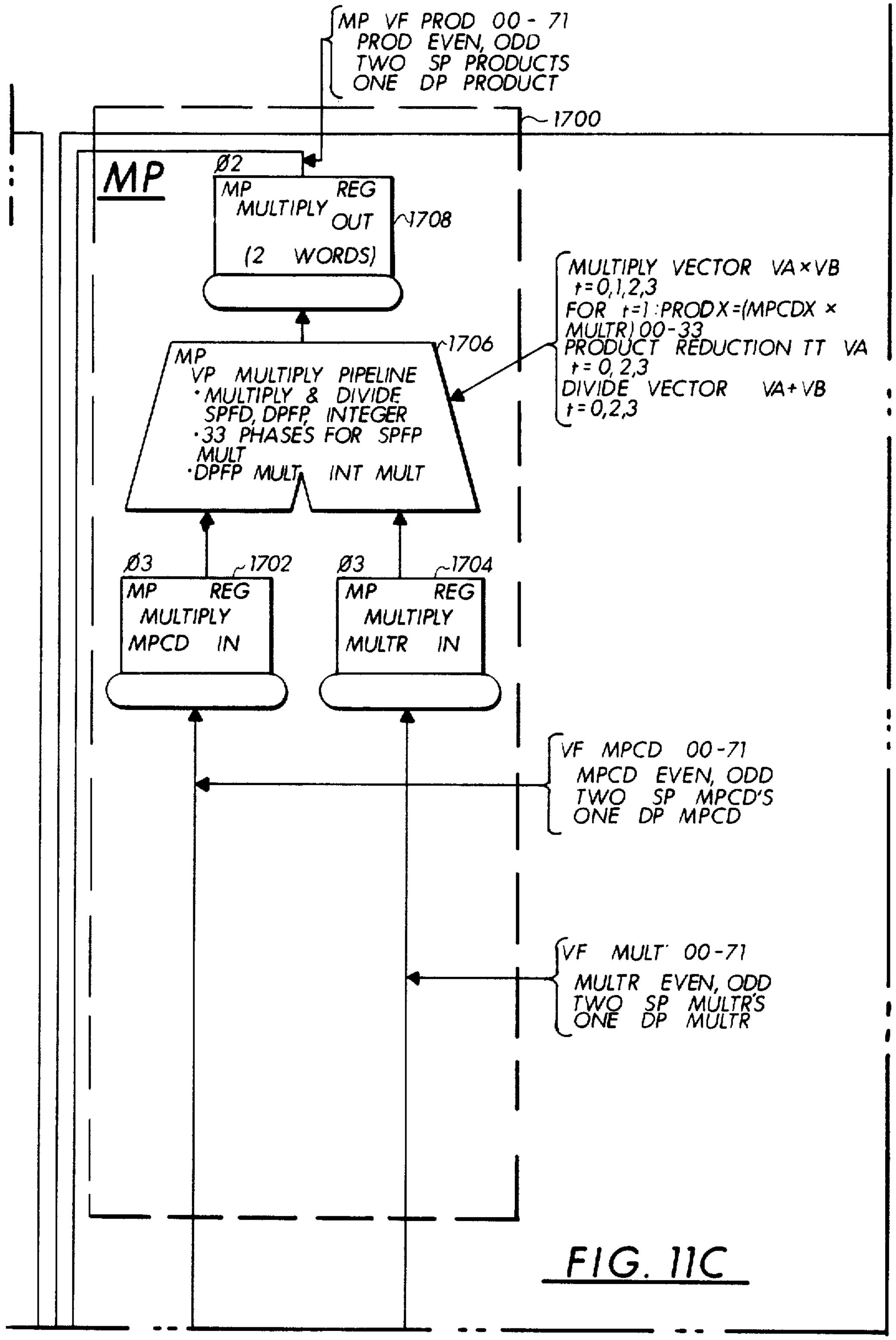
Figure 11D:
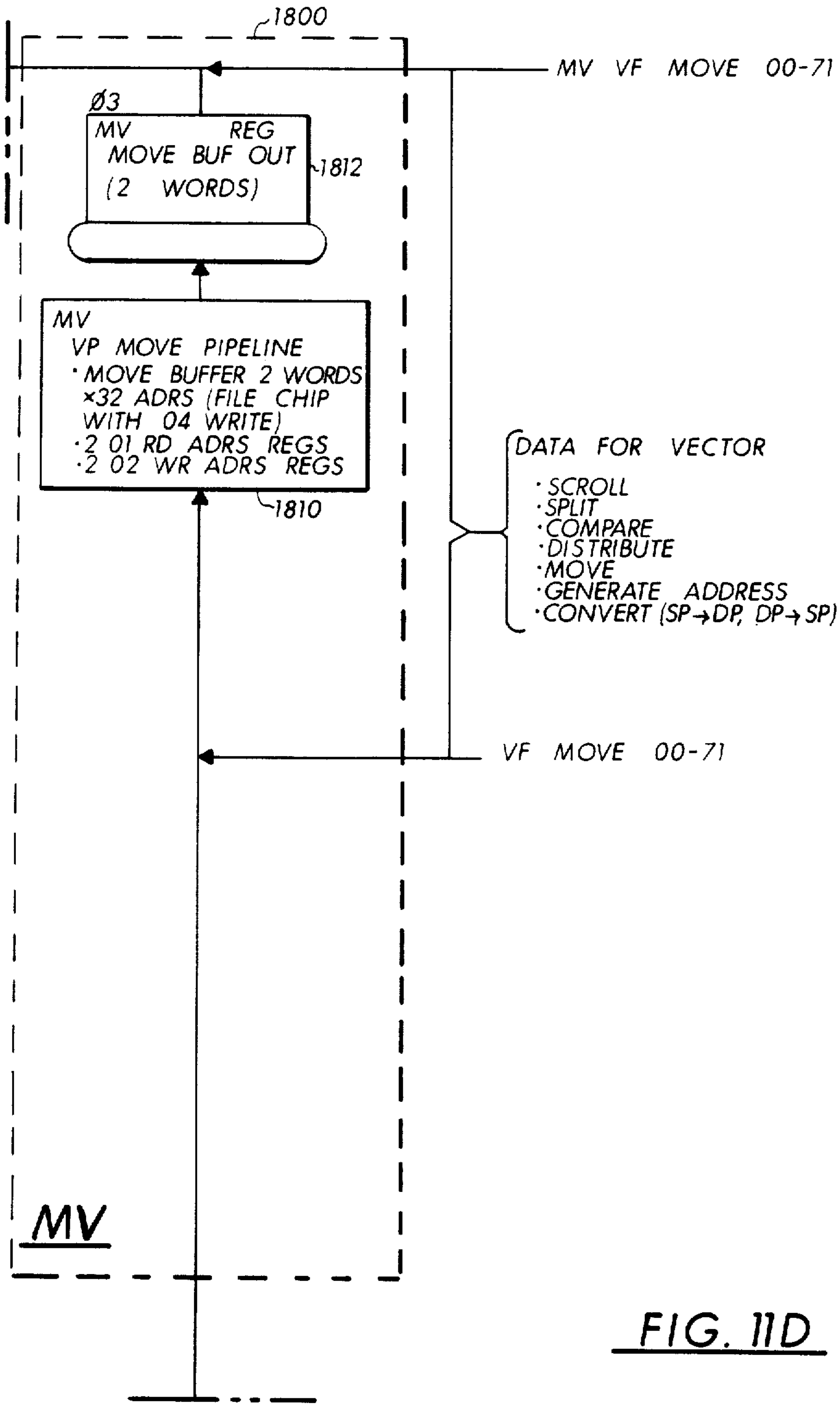
Figure 11E:
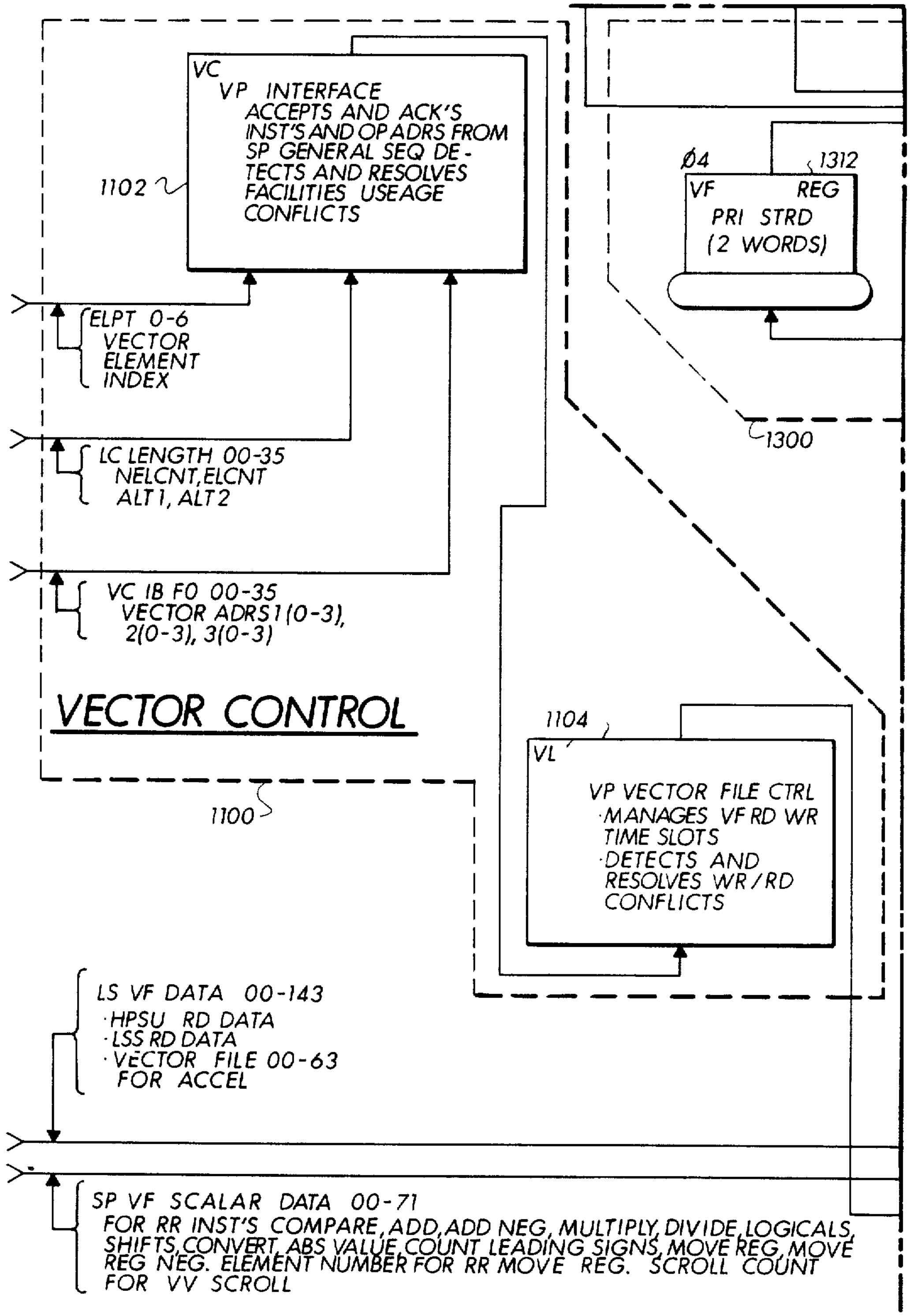
Figure 11F:
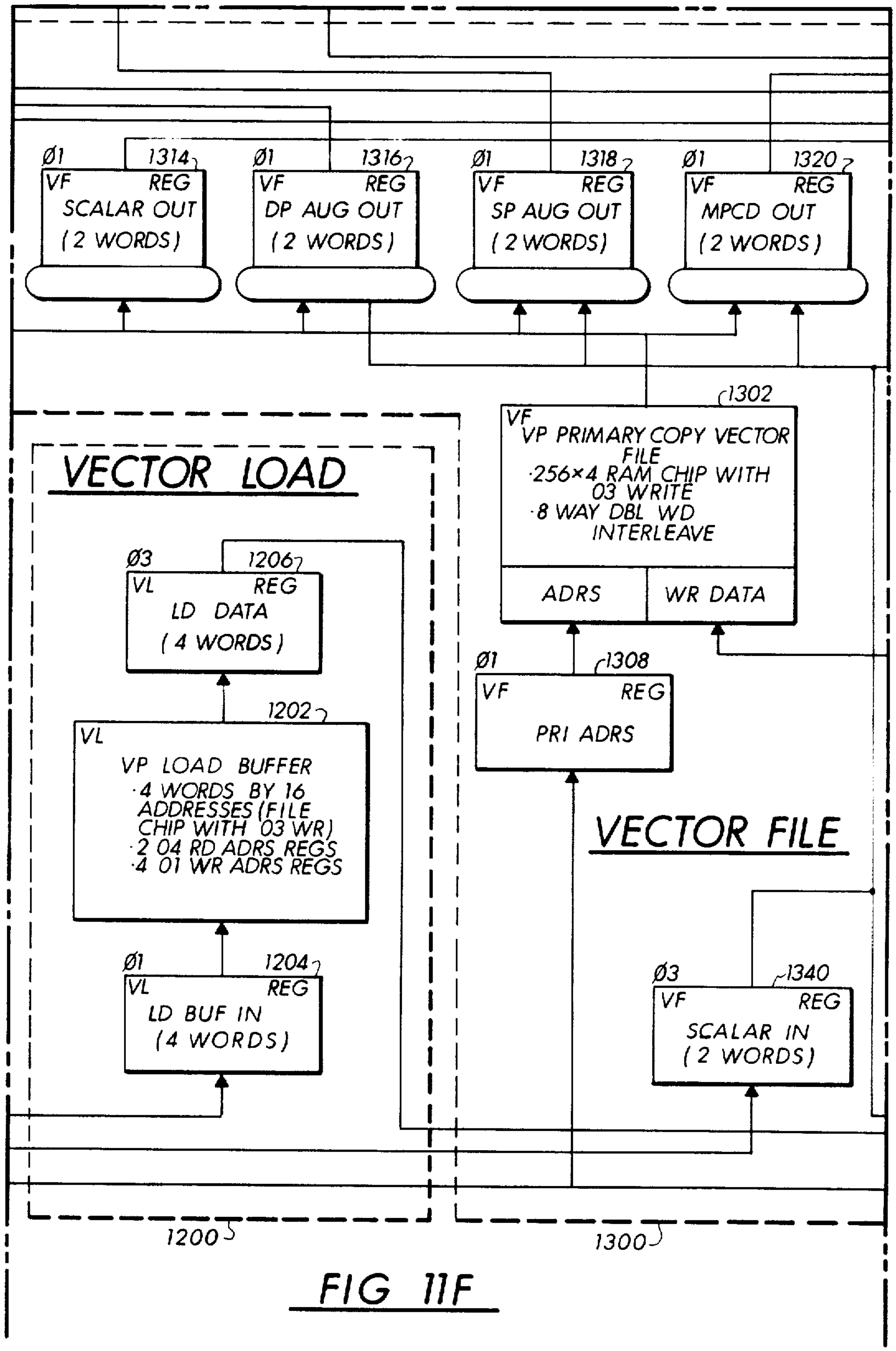
Figure 11G:
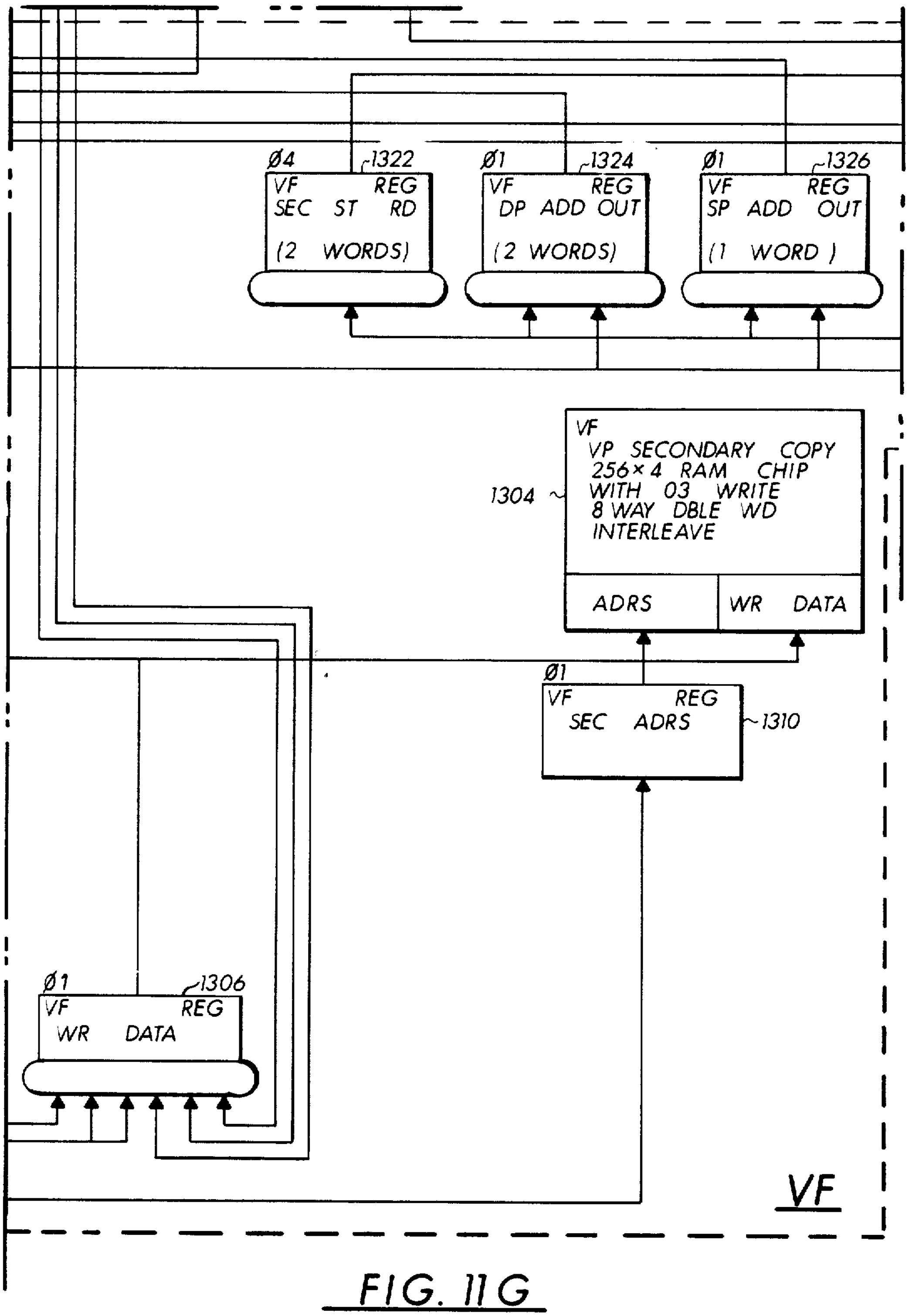

FIG. 11A through FIG. 11H, when arranged as shown in FIG. 11, comprises a logic block diagram of the Vector Processor Module (VPM) illustrating in more detail the logical arrangement and functioning of the sections illustrated in FIG. 9.

a. Vector Control (VC)

The Vector Control (VC) section is shown enclosed in dashed block 1100, and includes the VP INTERFACE 1102 circuitry which accepts instructions and Element Pointer, Element Count and Abort information from the Scalar Processor Module 150, the Instruction Flow (IF) 400 and the Loop Control 1000. It also acknowledges instructions when they are placed into execution. The VP INTERFACE 1102 also forms the second instruction for multiple-pipe instructions where two pipelines participate in execution of certain instructions, such as single precision conversions or the indexed Load Vector. The Vector Control (VC) section 1100 also includes the VP Vector File Control 1104 which reserves the Vector File time slots that are required for instructions. The pipelines themselves are released when the instruction is finished. It selects Vector File address per time slot management assignments and detects logical data usage conflicts.

b. Vector Load (VL)

The Vector Load (VL) section is shown enclosed in dashed block 1200, and includes the VP Load Buffer 1202; Load Buffer In Register (L.D BUF IN) 1204 capable of handling four words; and a Load Date Register (LD DATA) 1206, also capable of handling four words.

c. Vector File (VF)

The Vector Files (VF) section is shown enclosed in dashed block 1300, and the storage is implemented from 256 by 4 RAM chips. They are organized on a word-pair basis with an 8-way double word interleave, such that during any clock cycle up to eight((8) Reads or Writes are being accomplished.

The VP Primary Copy Vector File 1302 and the VP Secondary Copy 1304, each selectively receive data from the WR Data Register 1306, and are provided addresses from Primary Address Register (PRI ADRS) 1308, and Secondary Address Register (SEC ADRS) 1310, respectively. The VP Primary Copy 1302 provides operands for the Primary store Read (PRI STRD) Register 1312; the Scalar Out Register 1314; the Double Precision Augend Out (DP AUG OUT) Register 1316, the Single Precision Augend Out (SP AUG OUT) Register 1318, and the Multiplicand Out (MPCD OUT) Register 1320. The VP Secondary Copy 1304 provides operands for the Secondary Store Read (SEC ST RD) Register 1322; the Double Precision Addend Out (DP ADD OUT) Register 1324; the Single Precision Addend Out (SP ADD OUT) Register 1326; the Multiplier Out (MULTR OUT) Register 1328; and the Move Buffer Write (MOVE BUF WR) Register 1330. For example, as will be later discussed the VP Primary Copy 1302 provides the operands for the Add Pipe 1600, the Multiplicand for the Multiply Pipe 1700, and the Scalar Data Out, which is data going to the Scalar Processor Module. It also provides the primary store data for Vector Stores. This is routed to the Store Buffer 802 in the Scalar Processor Module.

The purpose of two copies in the VP Primary Copy 1302 and the VP Secondary Copy 1304 is to enable the simultaneous reading of two operands. For example, the VP Primary Copy provides the Augends for the Add Pipe 1600 and at the same time the Addends can be read out from the VP Secondary Copy. Likewise for the Multiply Pipe 1700, the Multiplicand is read from the VP Primary Copy 1302 of the Vector Files, while the VP Secondary Copy 1304 provides the Multiplier. Additionally, data is provided to the Move Pipe 1800, which only gets one operand, and also to the Scalar Primary or Secondary Store Vector instructions. The data is routed from here to the Scalar Processor Module into the Store Buffer 802. This works in conjunction with the Primary Store Data Register 1312 so that data can be transferred at a rate of four words per clock cycle. There are really eight (8) copies of this Write data, one of them being associated with each of the 8 blocks of the primary and secondary RAMs. Both the Primary and the Secondary copies of the Vector File are always written at the same time. That is, the same file, or elements of the same file, are always written at the same time, so that they contain identical data. The source of operands for writing into the Vector Files is, of course, in the Scalar Processor Module. This may well be the result of an RR format instruction. As will be discussed later, there are two inputs coming from the Load Buffer 1202. This Buffer is loaded by Load Buffer Input register 1204 and executes the Vector Load instructions and represents the fact that there are four word transfers per clock cycle. There is input to VP Primary Copy and VP Secondary Copy from the Multiply pipe 1700, and there is also an input from the Move Pipe 1800 and from the Add Pipe 1600.

d. Add Pipe (AP)

With reference to the Add Pipe 1600,there are both single precision and double precision arithmetic operations performed by this Arithmetic Logic Unit (ALU). Consider the double precision ALU pipeline first.

The double precision pipeline includes an Augend character Strip (DP ALU AUG CHAR STRIP) Register 1602 which receives its input from the Double Precision Augend Output Register 1316 of the Vector File and a corresponding Double Precision Addend Character Strip (DP ALU ADD CHAR STRIP) Register 1604, which receives its input from the Double Precision Addend Output Register 1324. The output of registers 1602 and 1604 are respectively sent to the DP ALU AUG IN Register 1606 and the DP ALU ADD IN Register 1608, which provide inputs to the VP DP ALU PIPELINE 1610. It executes the majority of the vector instructions except for Multiply, Divide, Product Reduction, Moves, Vector Load and Vector Store instructions. The double precision pipe is used for both double precision and for single precision operand types, both floating point and integer. It is capable of accepting operands each clock cycle and it provides results starting 31 phases later. Each clock cycle thereafter, one result per clock cycle is provided, either single precision or double precision.

A similar single precision pipeline includes a Single Precision Augend Character Strip (SP ALU CHAR STRIP) and Single Precision Addend Character Strip (SP ALU ADDEND CHAR STRIP) Register 1614. Also there are corresponding Single Precision Augend In 1616 and Addend In 1618 input Registers which enter the VP Single Precision ALU Pipeline 1620. Vector File Output Registers SP AUG OUT 1318 and SP ADD OUT 1316 provide the inputs to the Character Strip Registers 1612 and 1614, respectively.

The outputs of the Double Precision and Single Precision ALU Pipelines 1610 and 1620 are merged in the 2 word ALU Merge Output Register 1622 which provides the final input to the Write Data Register 1306. As to the single precision operation, it is similar in operation to the double precision pipe but its instructions are of the single precision data types. The single precision pipe also produces one result per clock cycle.

Both the single and double precision pipelines accept data and both produce a single precision result each clock cycle. When operating on double precision data types only, the double precision pipeline is executing and it accepts one pair of double precision operands each clock cycle. Of course, it can produce only one double precision result per clock cycle and this is always stored in the Vector Files at the rate of two words per clock cycle.

e. Multiply Pipe (MP)

The Multiply Pipe 1700 executes Multiply, Divide, and Product Reduction instructions with single precision floating point, double precision floating point and single precision interger data pipes. Note that the double precision integer type is missing. That is because the propagation time from the receipt of operands to results of the operation is the same as that for the Add Pipe, namely 31 phases. In the Vector Files the propagation time is 9 clock cycles from the reading of the operands to the writing of the results of that particular pair of read operands. The Multiply Pipe produces one double precision result per clock cycle or two single precision results per clock cycle. The Multiplicands and the Multipliers are received from the MPCD OUT Register 1320 and the MULTR OUT Register 1328, respectively, via MULTIPLY MPCD IN Register 1702 and MULTIPLY MULTR IN Register 1704, and enter the VP MULTIPLY Pipeline 1706. The Multiply Output Register 1708 provides the signal to the Write Data Register 1306.

f. Move Pipe (MV)

The Move Pipe 1800 (MV) is constructed such that concurrent Read and Write operations are allowed. It is organized two words wide by 32 addresses. The Move Pipe executes Move, Compress, and Division distributed instruction. It also participates in single to double and double-to-single precision conversions. The Add Pipe 1600 actually does the execution of the conversion portion and the Move Pipe 1800 participates in proper storing into the input of the Vector Files 1300. The VP Move Pipeline 1810 is basically a Move Buffer two words wide times thirty-two addresses long. It operates with a Move Output Buffer Register 1812 to provide a further input to the Vector File Write Data Register 1306.

g. Vector Store (VS)

The Vector Store (VS) 1500 section is primarily a control logic so there is only an entity shown as such on FIG. 11. It controls the movement of data from the Vector Files 1300 to the Store Buffer 802 in the SPM. It executes Store Vector, Index Store Vector, Store All Writing Elements, and participates in the execution of the Index Load Vector instruction. It is also capable of transferring data at a rate of four words per clock cycle. It is capable of reading two words each clock cycle and providing a total of four words per clock cycle. The Vector Store 1500 section provides and controls the interface into the Scalar Processor Module. The Store Buffer section essentially controls the writing of the data that is being transferred into the Vector Files and also controls the writing of it into itself. The Store Buffer 802 logic in the Scalar Processor Module, then reads the data from the Store Buffer and transfers it to the High Performance Storage Unit or the Local Store whichever the destination might be.

Referring back to the Vector Load section 1200, the VP Load Buffer 1202 is organized into four words by 32 addresses. It is constructed of circuit chips to provide the concurrent reading and writing of data. Data from Local Store 300 section and Scalar Processor Module originates from either the High Performance Storage Unit or the Local Store, and data is transferred into the VP Load Buffer 1202. During any given transfer from one to four words can be transferred, and transfers, of course, can occur in every clock cycle. Data from the Load Buffer is transferred into the Vector Files 1300 in four word wide segments, hence it is capable of transferring four words per clock cycle into the Vector File. The purpose of the VP Load Buffer 1202 is to match the data transfer rate into the Vector File. Therefore it can be accepted at any rate from one to four words per clock cycle. The Vector Load 1200 section also executes Vector Load Index Vector instruction and also the Load Alternating Elements Vector instruction.

h. Scalar/Vector Data Transfer Control (SC) The Scalar/Vector Data Transfer Control (SC) section 1400 is the Scalar/Vector Data Transfer Control logic that is primarily the control logic so there is only an entity shown on the block diagram of FIG. 11. The Scalar/Vector Data Transfer Control section controls the moving of G Register operands for vector format instructions. It can specify G Register operands and controls the transfer of that data to and from the interface to the Vector File 1300. The data comes from the scalar Processor Module into this section and from there it can be routed to any of the pipelines. For example, assume that the Multiplicand for the Multiply instruction, is specified as a G Operand and the data is to be transferred into this Multiplicand Register. By holding this data there for the duration of the Multiply instruction, the contents of the G OP Register is replicated into a vector. The scalar/Vectór Data Transfer Control controls the reading and the writing of Vector File operands for RR format scalar instructions that specify the elements within a Vector File. The data transfer path for data going from the Vector File into the Scalar Processor Module travels from the Vector File via the SC. This interface is sent directly to the Scalar Processor Module. If the results of an RR format scalar are to be written into a Vector File the data would come by this interface. In that case, the data would be read into the appropriate element as specified into both the Primary 1302 and Secondary 1304 stores of the Vector File 1300. An additional instruction that the Scalar/Vector Data Transfer Control participates in is the Generate Index Vector. This is where data for the Index is generated in the SPALU within the Scalar Processor Module. This data is transmitted over this interface and ultimately written into the VP Primary Copy Vector File 1302 and VP Secondary Copy Vector File 1304 sections.

7. Operation

Examples of several types of operations will be described.

a. Acceleration/Deceleration

Initialization of the logic of the SP will be described and an example activity will be given. An activity is a basic unit of work for the Scientific Processor 22. An activity is started by the Host Instruction Processor 10 preparing for an activity. The Host will usually only prepare an activity once but it may get involved again because the activity may not be completed on the first time that it was active on the Scientific Processor. The Host has to alert the Scientific Processor of the existence of that activity each time the activity is made active. This initiation of an activity is called "acceleration". The term "acceleration" means bringing.to the Scientific Processor Control Block 500 all the necessary information about an activity contained in the High Performance Storage Unit 16 into the Scientific Processor. After describing initialization, the execution of some of the instructions of the example activity will be discussed, and finally several example instructions will be described to illustrate how the Scalar Processor Module 150 and the Vector Processor Module 162 work alone or together to execute such instructions. The reasons to terminate that activity will be noted. Basically, an External Interrupt initiates such a termination. The activity may or may not be completed at the point of interrupt. Finally, "deceleration" or terminating an activity of an activity will be described. The term "decleration" is just the reverse of acceleration. During deceleration all of the data is returned from the Scientific Processor back into the High Performance Storage Unit.

b. Power On

DC power on is initiated from a System Support Processor (SSP) 34. This is the normal method of turning on the DC power, however, power can also be controlled locally at the Scientific Processor. The path by which the SSP initiates this is by the Maintenance Control Interface of the Unit Control Module 170 including the Power Coupling Control 174 and the Unit Support Controller 173, and Cooling Control which actually controls the power supplies. As a portion of the power up sequence, the power up master clear is issued from within the Scalar Processor Module and the Vector Processor Module. This places all the logic in a known condition. For example, all logic circuits are cleared. This master clear single places the SP in a dormant state. This dormant state is also entered with a power clear signal.

c. Processor States

There is a total of eight (8) Scientific Processor states Each of the eight (8) states will be described. Only certain actions are allowed within states and only certain transmissions between states are allowed. The state is maintained in a Register within the Control Block 500 section in the Scalar Processor Module. The dormant state is the first state during which initialization takes place. The second state is from power up master clear, when the only function or activity going on is that certain interrupt state is made. This is the focal point for most states in which the decision is based upon what the previous state was and the type of interrupt that occurred. Receipt of an external interrupt causes the machine to enter the third state, herein called the acceleration state. The acceleration state loads the activity from the HPSU into the SP. After loading the activity, the normal or usual next step is to the execution state, herein, the fourth state. It must be noted here that a major difference exists between an internal and an external interrupt. If the interrupt is internal the SP itself can take the necessary actions to resolve the interrupt (the fifth state), whereas an external interrupt means that the SP must be exited and the host IP must take the necessary action to act upon the interrupt (the sixth state). The suspend state is the switch state and is entered from the acceleration, deceleration or execute states even if an initial program load occurs. Of course, some other system action is necessary to exit this state. Finally, there is the inoperative state or eighth state, which is entered upon the occurence of certain hardware errors referred to as fatal errors. An example might be a parity error in the instructions from the instruction translation logic.

d. Initialization

Initialization is done by the SSP (See FIG. 5). It is done by the maintenance control interface of the Unit Support Controller and from there the path is to the Scan Set logic within the Scalar Processor Module and from there, of course, to the Vector Processor Module. One of the functions accomplished during initialization is the writing in all of the RAMs within the VPM and SPM of a correct parity. For example, all O's with correct parity are written into the RAM's. Some of the internal memories are constructed of file chips and those are master cleared by the power up master clear. They do not require any initialization because they are already cleared to a correct state. The microcode is also loaded into the microcode RAM's of the Add Pipe (AP) 1600 section, the Multiply Pipe (MP) 1700 section, and the Move Pipe (MV) 1800 sections. RAM chips are used for all microcodes so they must be reloaded upon each power up. The macrostack is also loaded. This is in the Control Block 500 section of the Scalar Processor Module. It is similar to the microcode in that it uses RAM chips. The macrocode is used for performing state transitions and many of the actions the code is actually transferred from the macrostack RAM (See 504) in the Control Block section to the Instruction Buffer 402 within the Instruction Flow 400 section. From there it is executed in the normal fashion just as any code would be.

Part of the initialization load includes the Mailbox Pointer Register 716 shown in FIG. 12 in the Address Generation 700 section. This is the real address of the Mailbox which is actually located in the High Performance Storage Unit. Also, the initialization switches the logic to Normal mode from the Maintenance mode. It also raises the available lines which allows or enables interfaces to other system units such as the HPSU. Note that at this point the processor is still in the dormant state.

Considering an example activity, the first step is for the Host IP to prepare the activity. The Host IP does this once for each activity. If the activity is completed on the first pass or the first time that it is active on a Scientific Processor then the SPCB may be altered for subsequent passes. One of the steps in building the activity is to build a Scientific Processor Control Block (SPCB) (See FIG. 12) for an activity into the HPSU. The SPCB contains either the information or the necessary pointers to the actual information necessary to execute an activity on the Scientific Processor. Also, the Host alters Mailbox word 2 shown in FIG. 12 to the SPCB that it has just constructed. It sets the bit 0 of FIG. 12, which is the valid bit (V) to indicate that there is a valid SPCB available and then it writes the Link Address (bits 6–35) which is the first address of the SPCB. After having completed that, it next sends an interrupt signal to SP by the Universal Processor Interface to alert the SP of the existence of this activity. The SP thereafter receives the Universal Processor Interface Interrupt from the Host IP. The SP CB 504 section in the Scalar Processor Module monitors the Universal Processor Interface Interrupts. Upon receiving a UPI, the microcode is transferred from the macrostack in the SP to a page of the Instruction Buffer 402 of the IF 400 section, an the necessary execution is started to handle the UPI interrupt. One of the first steps is to switch the SP from the dormant state to an external interrupt state. Next, the Mailbox word two is read from the HPSU. The word two contains the valid bit that was just read, indicating the existence of a valid SPCB. It also contains the linking address referring to the real address of the SPCB. A test is then made on the valid bit to determine if it equals 1, and a test on the linking address to determine if it is on a sixteen word boundary. The UPI is acknowledged if the results of these tests are satisfactory. The contents of Status Registers 0 to 3, which are SPCB words 8 through 11, are transferred to words 4 through 7 of the Mailbox and a UPI is sent to the Host. Next the UPI is acknowledged and then the Mailbox word 3 is written to contain the same data as the Mailbox word 2. Also the hardware Status Registers 0 to 3 are cleared which are SPCB words 8 through 11 and words 4 through 7 of the Mailbox. Then a switch is made to the acceleration state.

FIG. 12 shows how the SPCB was located. Register 716 represents the Mailbox Pointer Register in the Address Generation section of the Scalar Processor Module. It was initialized by the SSP 36 during the initialization sequence. The Mailbox Pointer Address is used to locate the Mailbox in the HPSU. The Mailbox has 8 words in it (0–7). Here, for example, interest is in word 2. Bit 0 of Word 2 is the valid bit (V) and the remainder of Word 2 is the link address which locates the Scientific Processor Control Block which is also in the HPSU. During the sequence just completed, the contents of word 2 were transferred to word 3. In this case, the bit 0 of word 3 is referred to as the Executing bit and, of course, this address is then a link so that the Host knows the exact location of the Scientific Processor at this point.

There exists in the SPCB in the HPS important information that is required at this time. For example, the SPCB has up to 144 words in it, words 0 through 15 are various pointers and registers and words 16 through 143 comprise the Activity Segment Table (AST). First entry in the AST are four words which are the Local Store segment of the Activity Segment Table, and additional entries are defined by the AST length which defines how many entries there are, up to the total maximum of 32. In word 5, are the real addresses of these Register Save Areas. The real address of this RSA in the HPSU will be discussed in a moment.

Next, consider the steps of acceleration. Now that the SPCB has been located, the first step is to read words 8 through 15 and place them in the hardware Status Registers 0–3 which correspond to SPCB words 8 through 11 and are available immediately. Proceed next to read words 0 through 7, and word 6 is then tested for specifying the length of the AST. The SP entries, which are SPCB words 16 through 143 are then read. The SP specifies the number of four word AST entries. Next the Register Save Address Pointer, which is SPCB word 5, is tested to see if it is on a 16 word boundary. The Register Save Area Pointer is the Real Address of the Register Save Area and the High Performance Storage Unit. Next reading of the Register Save Area data from the HPSU into the registers and files within the Scientific Processor is started. The Register Save Area contains the Vector File data which are Vector Files 0 through 15. They are located in the Vector File 1300 section of the Vector Processor Module. The G Registers 902, that is G Registers 0 through 15 are two words wide. They are located in the SPALU of the Scalar Processor Module. The Vector Length (VL) and Element Length (EL) Registers 1002, of which there are eight (8) each are located in the Loop Control 1000 section of the Scalar Processor Module. Next are the State (S) Registers, of which there are sixteen in all which are located in the SPCB 504 of CB 500 section of the Scalar Processor Module. The Mask Register (Seen 602) includes words 4 and 5 of the State Registers and both word 4 and 5 go to the Mask Processor 602 and the Jump History File (See 504). This Jump History File contains 32 files and it goes to the SP CB 504 for Control Block 500 section. Next, the Local Store segment address base, which is found in AST (See 702) word 0, is tested to see if it is on a 16 word boundary and the length to see if it is on a 32 word boundary. Then up to the first 4K of the Local Store segment of the HPSU is sent to the actual Local Store 300. The Local Store segment can be less than, equal to, or greater than the 4K words, however only up to the first 4K words are transferred.

Now the switch is made to the execution state. At the start of execution for the sample instruction, the first step is to transfer the SPCB word 12, which is the Program Address Register (PAR) to a hardware Program Address Register 410 in the IF 400 section of the Scalar Processor Module. This is actually accomplished by a Jump to an External Segment instruction. Next, an attempt is made to read the instruction in the Instruction Buffer 402 that was pointed to by the PAR. In this case, a "page miss" is received because there are no instructions currently resident for this program or activity that caused the present acceleration. The 16 pages of instruction in the Instruction Buffer 402 are always invalidated prior to accelerating an activity. Therefore upon starting execution of any activity a "page miss" is generated. The mechanism for generating the "page miss" is a "page miss" sequence provided for the acceleration Upon receipt of a "page miss", the Instruction Flow (IF) 400 section sends the virtual address of the instruction to the Address Generation 700 section. The instruction addresses in the Instruction Buffer are all on a virtual address basis. The only time that real addresses are dealt with is when pages of instructions are fetched from the HPSU. The Address Generation section searches the Activity Segment Table (AST) 720 and translates the virtual address to a real address Basic execution consists of examining each AST entry in order starting with the first entry. A hit is made on the segment name, when the eighteen (18) most significant bits of the virtual address is equal to or greater than the Lower Segment Name (LsN) and less than or equal to the Upper Segment Name (USN) within the AST entry. The LSN and the USN are contained in word 0 in each AST entry. Once a hit is made, the rest of the translation is completed. Once the address is translated a stream of requests are issued at the rate of four words/-block or four instructions/request until a total of 64 requests pass into the High Performance Storage Unit for a page of instructions. When the data comes into the Scalar Processor it is routed to and written into the Instruction Flow Buffer (IFB). In this case, the instructions are loaded into page 0 which is the address range 0 through 255 of the Instruction Flow Buffer. The next page that is loaded, would go into the next sequential page which would be page 1 that is addressed. This sequence would continue. Next, the Content Addressable Memory (CAM) 414 would be updated. The CAM entries are associated with each page, and include setting the valid bit and writing the most significant 28 bits of the instruction virtual address into the search field entry into the CAM. Since this address is now in the CAM, any request to read out this address will now be successful. The first instruction is looked at next.

e. First Instruction

If it is assumed that this first instruction is an RR instruction, then it has an RR format as shown in FIG. 13. This is a 36-bit format with the various fields illustrated. The f field is the OP code field and it would be equal to 142 which is the OP code for an RR format add. The t field is three bits long. For the example, t is equal to 0 and this specifies a single precision integer data type. Other values that this might have is a 1 which would denote double precision integer data. A 2 would specify single precision floating point data type and a 3 would specify double precision floating point data. Values 4 through 7 are reserved. The r1 field for our example instruction is the Operand number 1, and Augend Register, for the instruction example, is equal to 1. This is G Register Number 1. The r2 field, which is 4 bits long, specifies one of the 16 G Registers. This is for Operand Number 2 which is the Addend and, for example, this might choose G Register Number 2, the next two bits are unused in this format. The r3 field is 4 bits long and is the Operand Number 3 field. It is the subregister where the result of the add will be placed. For example, if G Register number 3 is used, the next 5 bits are unused. The next bits are the S1, the S2, and the S3 bits. If it is assumed that they are all equal to 0 then this specifies that the data is to be read from the G Register and the result written into a G Register. A value of 1, in any of these cases, would indicate an output from the Vector Files of the Vector Processor Module. That completes the format for the first instruction.

To follow through with its execution, the instruction is issued from the FO Register of the IP section. This is the first function execution station in a decoded form. For the example instruction, the SPALU 900 of the Scalar Processor Module completely executes such an instruction and no other section participates. In fact, they are not even aware of its existence. Next look at FIG. 14 which shows the execution of the first instruction. It depicts the SP ALU 904 which represents the combination of ALUs utilized by the Scalar Processor Module. Operation is started by a reading of the Operands. For a Read address, the Addend is read first, so the r2 field address is applied to the G Register read address. This address is controlled by the Scalar Processor ALU 900 (See FIG. 11) which sequences the logic. The address for r2 is then applied from the r2 field. This is the Addend address and it is passed to the G2 Register. The data and the address register are clocked on a phase 2, so two phases later on phase 4, the Addend data is clocked into the Augend Register 908. From there it is passed through the SP ALU 904 section. This SP ALU 904 is constructed of the ALU gate arrays and they have a capability of passing data through them undisturbed. So, the data is passed through to the SP ALU Output Register 910. It is clocked there on the following phase 3. Meanwhile, sequencing logic for the SP section has moved the read address for r1, which is the augend, into the G Register 1. On the second clock phase 4, the Addend which was up in the SP ALU Output Register 910 is passed down into the Addend Register 906. At this point the SP ALU function code is changed to indicate an Add function. These two quantities are then added together and the sum is clocked on the next phase 3 into the SP ALU Output Register 910. From there the data is applied to the Write Data input of the G Register file 902 and the write address is sequenced to the write address input of the G Register file 902.

f. Second Instruction

While the first instruction was being read, the program address to the G Register was incremented by one, addressing the next sequential address. When the first instruction is issued, the second instruction is being read and the next sequential program instruction, in this case the second instruction is passed into the FO Register 408 in the IF 400 section. If it is assumed that the second is the same type as the first instruction then the format for the first instruction will be the same for our second instruction except that the S3 bit will be set to a 1. For the first example S1, S2, S3, were all 0's, however, for the second instruction only S1 and S2 will be equal to 0 while S3 will be equal to 1. Continuing with the execution with the second instruction, the S3 bit is equal to 1, and the result of the Add operation is sent to the Vector Files 1300. The result is sent to the Vector File into the element selected by the Element Pointer. The instruction is then decoded and issued to the Loop Control (LC) 1000 of the SPM. It is also sent to the VC 1100 section of the Vector Processor Module. The functions that are performed are specified by the Loop Control (LC) section of the Scalar Processor Module, which selects the Element Point. This element data is from one of the eight (8) EL registers which has been selected by the Current Element Pointer Register, the CELP (see 1002). The SP ALU section forms the sum and just as it did for the first instruction it sends it to the G Register 1. G register 2 also forms a sum and sends it to the Vector Processor Module via the Augend Register. Referring back to FIG. 14, it is seen how the data is routed. In FIG. 14, for execution of the first instruction, it was seen that the sum was formed with the Augend while the Addend was actually formed in the SP ALU. It is then transferred to the SP ALU Output Register and, in this case, because their destination is to be the Vector Files, the data path is via the Augend rather than through G Register file. The output of the Augend Register is a direct path to the Vector Processor Module.

Continuing on with the second instruction, the Vector Control (VC) section of the Vector Processor Module receives both the decoded instructions and the Element Point data at the same time. Usually the instruction is issued to both the Scalar Processor Module 900 section and to the Vector Control 1100 section of the Vector Processor Module at the same time. However, in some instances, the instructions are received in a displaced or asynchronous manner. In this case, the VC section then proceeds to search for a time slot and assigns it to the SC pipe to allow it to gain access to the Vector Files during that period. The Vector Files can be doing up to eight (8) Read and/or Write operations simultaneously. However, when an instruction is received by the Vector Control section, usually both the Read and the Write time slots are reserved for a given operation. The time slot mechanism keeps track of the particular pipes to which the slots are assigned. Also, whether this particular logic is used for a Read or for a Write operation, they are also used to select the appropriate Read or Write address and for applying this to the addressing mechanism within the Vector Files. The VC section also establishes the Vector File addressing for this particular operation on behalf of the SC pipe. File number 3 indicates where the sum or result is to be written. The decode instruction is sent to the SC section and when the VC section reserves a vector file time slot the operation is started. Whenever the SC 1400 pipe is not busy, and it so signifies, it starts by acknowledging the Vector Control section. For example, it may be started immediately when none of the time slots are in use or able to reserve first available ones and the SC pipe 1400 is inactive. When the Vector Control 1100 section receives the acknowledge from the SC pipe it, in turn, acknowledges receipt of the instruction to the IF 400 section of the Scalar Processor Module and terminates itself. At this time it is ready to accept another instruction from the IF section of the Scalar Processor Module. If that instruction were for a different pipe then it could also be immediately started. When the SC pipe has started it will write the data into the Vector Files when the sum data from the Scalar Processor Module is available and the Vector File address is equal to the address specified by the Element Pointer. The Vector File proceeds on down through the address sequentially i.e. element 0 and 1 during the first clock cycle, and elements 2 and 3 through the second clock cycle, and so forth. When the SC has successfully written the data, it acknowledges this to the Scalar Processor Module. It then releases the Vector File time slots. The time slots are always reserved for a pipe by the Vector Control section and released by that pipe whenever it is completed with the operation. The SC pipe 1400 then terminates itself and at that point it would be ready to accept another instruction or operation.

The block diagram shown in FIG. 15 shows the data transfer path from the scalar Processor Module to the Vector Files. The input represents the data from the Augend Register of the Scalar ALU. The data is then transferred into the Vector File Scalar Input Register 1340 and from there into the Vector File Write Data Register 1306. It is then written into the VF Primary RAM 1302 and the VF secondary RAM 1304 at the same time.

g. Third Instruction

The third instruction is also started while the second instruction was being read, and the address in the G Register is incremented by 1. At that point the next sequential instruction is ready to be read. This would be the third instruction. When the second instruction is issued by the Instruction Flow section, the third instruction is read into the FO Register 408. As an example, assume that it is a Vector Vector (VV) format Add instruction as shown in FIG. 16. The basic operation of the Vector Vector Add instruction is to add the first element of the vector specified by the V2 Register to the first element of a Vector File specified by the V1 Register and take the sum of that and write it into the first element of the Vector File specified by the V3 Register. Referring to FIG. 16, the f field is equal to 042, which is the Operation code for a Vector Vector Add. Next, the t field, which is three bits long, will be assumed to be equal to 2, which specifies single precision floating point data operation. The other possibilities are for the t field to be equal to 0 which would specify single precision integer data operation; a t field equal to 1 which would specify a double precision integer data operation; or a t field equal to 3 which would specify a double precision floating point data operation. Fields 4 through 7 are reserved. The V1 field specifies one of the 16 Vector Files. Assume, for example, a Vector File four (4), which is the Augend file. The V2 field is 4 bits long. It also specifies any one of the 16 Vector Files. In this case assume a five (5) for the Vector File Register. This is the Addend file. Next, is the l or left field. It is a two bit field which specifies the Element Count, and is the number of elements to be processed for a given Vector instruction. The l (left) specifies where or how the Element Count is to be derived or selected. A zero (0) means that the l (left) count is from the Remaining Length (RL) field of one of the eight (8) VL Registers in the Loop Control (LC) section of the Scalar Processor Module. If the RL field is equal to or greater than 64, the Element Count selected is 64, but if it is less than 64, then the Element Count is whatever the RL field specifies. Some of the other possibilities are for l (left) to equal 1, which specifies the next Element Count (ELCNT). This is formed by subtracting the strip size, which, in this case, is 64 from the number remaining in the left field. The value of two for the l (left) field would specify the alternate (alt) 1 field of the VL Register while an l (left) value of 3 specifies the alt 2 field of the VL register. The V3 field is a four bit field which also specifies one of the 16 Vector Files. For this example assume a Vector File six (6). This is the location into which the resulting sum of the addition is written. The S1 and the S2 fields, are for this example assumed both to be equal to one (1). This specifies that the data is to be read from the Vector Files. In other words, the Augend and the Addend are coming from the Vector File 1300 rather then from the G Registers 902. A value 0 for S1 and S2 denotes G Register data. The C field is 2 bits in length, and assumed to be a value of 3 for this field example. It specifies that the elements of the Vector should be processed with ones in the Mask Register. Other values that the C field may be are zero (0), which specifies that all elements in the Vector should be processed; a one (1) which indicates that only those elements whose corresponding position is at 0 in the Mask Register should be processed; and C field equal to 2 and 3 which have already been discussed.

Next, consider the execution of the third instruction. First, the Instruction Flow 400 mechanism issues an instruction to the Loop Control (LC) 1000 section and to the Mask Processor (MK) 600 section. Both of these sections are in the Scalar Processor Module. The instruction is also sent to the VC 1100 of the Vector Processor Module. The function that the Loop Control section performs is to take the Element Count from the Remaining Length (RL) field of the EL register selected by the Current Vector Element Pointer (CELP). If the RL field is equal to or greater than 64 then the Element Count is 64, otherwise it uses the actual value of the RL field. The Mask Processor selects the first two mask bits of the Mask Register and presents them to the Add Pipe interface. These first two mask bits are associated with the first two elements of the Vector File. Continuing along with third instruction then, the VC section receives the decoded instruction and the Element Count at the same time. The VC section searches for and reserves a vector time slot for the Add Pipe (AP)1600. The pattern is two adjacent slots, first the Read and then the Write time slot. If the pipe is unable to start because it is busy then the time slots just reserved are cancelled and the process is repeated by reserving and cancelling until the pipe is able to start the execution of an instruction. The VC section also establishes the necessary address information on behalf of the Add Pipe for the reading and writing of operands from the Vector File. For example, this would be V4 and V5 for the two read operands, the Augend and the Addend respectively. V6 is the destination location for the result of the Add operation. The VC section also loads these file numbers V4, V5, and V6 and initiates a Conflict Detection Operation for the Add Pipe. The Conflict Detection Operation consists of testing to see if any earlier instruction is using the same files. It also tests to determine if it has completed its operation on the elements that are in process. The effective result that the Conflict Detection and Resolution Mechanism (see 1104) must produce is to indicate the completion of execution of each instruction prior to the start of the next instruction. Continuing with execution of the third instruction, the Add Pipe starts operation when the Vector File time slot is reserved and the pipe itself is not busy. It sends an acknowledgement signal to the Vector Control section. Upon receipt of the acknowledgement, the VC clears the busy designator and terminates itself. At this point, it is ready to receive another instruction from the IF section of the Scalar Processor Module. Meanwhile, the Vector Files are reading two elements each from file V4 and V5 during each clock cycle. The operands from V4 are read from the VP Primary Copy Vector File 1302 and the V5 is read from the VP Secondary Copy 1304. The data is then routed to the Add Pipe 1600 by the Vector File Addend and Augend Output Registers. The Add Pipe sequences the Mask Register and decrements by two the Element Count during each clock cycle. When the Add Pipe started execution of the instruction, it also received a copy of the Element Count, which it keeps decrementing until the instruction is terminated or completed. The Mask bits are provided for Mask Processor, 602, two bits at a time and they are necessary to sequence each clock cycle until the instruction is completed. The Vector File writes 2 sums into the V6 Register each clock cycle, starting 9 cycles after Vector File Read operation. When the Add Pipe decrements the Element Count equal to 0 , the instruction is completed. At this point, it releases the Vector File time slots, notifies the Mask Processor to switch to the next instruction, and terminates itself. It is now ready to start a new instruction. At this point all of the Augend and Addend Read operands have been read from the Vector Files and provided to the data path of the Add Pipe. The operands for the last 9 cycles, that is a total of 18 Augends and 18 Addends, are still progressing through the various stages of the Add Pipe and will continue writing results into the Vector Files for 9 additional clock cycles. The pipe actually could start another instruction if the operand for this new instruction follows along behind the operands of our first instruction.

h. Fourth Instruction

For the example, assume that the fourth instruction is the same as the third except that the S2 bit is 0. This specifies that the OP 2 source is a G Register rather than a Vector File. In this case it would be from G Register G5 and the value is replicated to form a vector. This operation is referred to as a G OP and its transfer is shown in FIG. 17. Referring again to FIG. 16, remember that the bit that is different is the S2 bit. In the third instruction it was said to be equal to a 1, now it will be equal to 0 , which as noted, will denote data from a G Register. Returning to the execution of the fourth instruction, the Instruction Flow 400 section issues the instruction in a decoded form to the Scalar Processor section, to the Loop Control section, to the Mask Processor and to the Vector Control section and the Vector Processor Module. The Scalar Processor is reading the contents of the G5 Register, sending it to the SC 400 section of the Vector Processor Module. This is the same data path which was used for writing the sum of the second instruction, which had an RR format, into an element of a Vector File. Meanwhile, the Loop Control section forms the Element Count in the same manner as for the third instruction. Meanwhile, the Mask Processor selects the first two bits of the Mask Register and presents them to the Add Pipe. The Vector Control 1100 of the Vector Processor Module receives the decode instruction and the Element Count at the same time. The SC section also receives the decoded instruction, essentially in parallel with the VC section, and it recognizes the existence of a G OP and therefore sets what is known as G OP wait designator. This designator prevents the Add Pipe from starting the instruction and the Vector Control 1100 section from acknowledging an instruction. If necessary, the SC pipe then waits for the G OP data, the arrival of which is asynchronous with the instruction in that the G OP data could have arrived before or after the arrival of the instruction. When the data is available, the SC section transfers the G OP to the Vector File double precision and single precision Addend Registers 1324 and 1326.

FIG. 17 shows the data path of the G Register data. G OP data from the Scalar Processor section of the Scalar Processor Module enters the Vector File Scalar Input Register 1340. From there the data is routed to the Double Precision Output Register 1324 and Single Precision Output Register 1326 of the Vector File. It is transferred by the SC section when the Clock Enable (CE) signal is applied to both of these Registers. This data is held within these Registers by setting the Clock Enable designator. Ultimately, the Add Pipe 1600 will clear or release that designator when it is done executing this Add instruction. A further Clock Enable (CE) input is applied to the Scalar Input Register 1340. This is necessary because the data arrives asynchronously. If the SC Pipe has the instruction prior to the time that it is told what to do with it, the instruction is held until it is given directions. Next, the SC Pipe clears the G OP Wait Designator and terminates itself. The G OP Wait clearing operation allows the Vector Control and Add Pipe to proceed. Basically the rest of the instruction is similar in execution to the third instruction, the Vector/Vector Add instruction. To accomplish the execution of the fourth instruction; the Vector Control section searches for and reserves a Vector time slot until such time as the Add Pipe itself is ready to start. The Vector Control 1100 section also establishes addressing for the Vector File, 1300 as well as the Reading and Writing of the operands for V4, which is the Augend. Notice that V5 is missing because the V5 operand is already locked up in the Addend Output Registers. V6 of course, is the destination where the sum is sent. The VC section also loads the V4 file number for the Read operand and again for the V6 file numbers for the Write or destination operand. The Add Pipe starts when the Vector File time slot is reserved and when the pipe itself is not busy with another instruction. It signifies that it has started its acknowledge signals to the Vector Control section. In turn, the Vector Control section acknowledges the receipt of the instruction by clearing the Wait Designator and terminates itself. Meanwhile, the Vector Files have been reading two elements from Vector File V4 during each cycle. This V4 data is the Augend data and is read from the VP Primary Copy Vector File 1302. In this example, the VP Secondary Copy, 1304 is not needed because the Addend operand has already been derived from the G5 Register. The Add Pipe sequences the Mask each clock cycle and decrements the ELCNT by two each clock cycle. The Mask essentially accompanies the associated element through the various stages of the Add Pipeline. Meanwhile, the Vector starts writing two sums in the Destination Register each clock cycle and it starts time cycles after the first operands are read from the Vector Files. It represents the length and time slot of the data path. The Mask bits are used to control writing of the associated elements into the Vector File at this point. The Add Pipe performs an operation whether or not the Mask bit orders it and the Mask bit is only applied when the data is to be written into the Vector File. When the Add Pipe decrements the Element Count to 0, it releases the VF time slots and the Clock Enable signal that was holding the G OP in the Vector File single precision (SP ADD OUT) 1326, double precision (DP ADD OUT) 1324 Add Output Registers is removed. The Mask Processor is switched to the next instruction and it terminates itself. Finally, the operands to the last 9 cycles are still progressing through the various stages of the Add Pipe and will continue writing results into the Vector File for the 9 additional cycles.

i. Activity Stop

The stopping of an activity will be discussed next and is best begun by an explanation of interrupt signals. There are basically two kinds of interrupts; internal and external. An external interrupt means the Host processor must take some action, since the Scientific Processor itself does have the capability of handling these interrupts. There are two broad categories of external interrupts, those caused by erroneous operations of either hardware or software, and those that are provided for during normal system operation. An example of erroneous hardware operation is a parity error detected on the data transfer between the various registers within the Scientific Processor. An example of a software error might be shown by the Register Save Pointer which indicates that the Register Save Area (RSA) was not on a 16 bit, 16 word boundary when that check was made during the acceleration sequence. The normal system operation external interrupts includes those necessary for system operation and/or those that one might expect during normal operations. An example of normal external interrupt is the Generate Interrupt instruction (GI). The GI instruction is included in code for an activity for one of two reasons. One reason occurs at the end of an activity when all of the codes have been successfully executed. A second reason is to allow the placement of calls within the code before this activity is necessarily completed when this code is used to call upon the Host processor. Another example of an external interrupt occurs when the counter counts down or is decremented down to 0. At that time an external interrupt occurs and this is the reason for decelerating an activity. For the example activity, assume that a GI instruction has been encountered.

After the GI instruction is issued the Control Block section which recognized the external interrupt issues a halt to the Instruction Flow section causing it to halt the issuing of instructions. Thereafter, enough time is allowed for those instructions already in execution to be completed. Next, the execution state is exited and the external interrupt state is entered. The Instruction Buffer 402 in the IF section 400 is validated and the contents of the micro stack is transferred to one of the pages of the Instruction Buffer. First the program address is transferred from the PAR to the SPCB word 12. Bit 17 in the hardware Address Register 0 is also set and this denotes that the source of the external interrupt was a Generate Interrupt instruction. The external interrupt state is exited and the deceleration state entered. Of course instructions from the micro stack code are still being executed in one of the pages in the Instruction Buffer. The next activity is the storing of the Local Store state data into the High Performance Storage Unit along with the address where the data is to be transferred. This is done by the Local Store Segment Address which can be found in the ASTO entry, i.e. the word 0. Next all of the Register data is stored in the HPSU via the Register Save Area Pointer, which is located in SPCB word 5. The data that is stored in a Register Save Area is the Count in the Vector File. In addition, eight (8) vector left and eight (8) Element Pointer Registers from the Loop Control section of the sixteen (16) State Registers and this includes the Mask Registers from the Control Block section as well as the 32 Jump History File entries from the same section. The contents of all of these Registers are written into the Register Save Area Address in the High Performance Storage Unit. Next, the SPCB words 8 through 15 are sent to the HPSU via the Mailbox Link Address Pointer. Next the executing bit is transferred. This is bit 0 of the Mailbox word 3 in the HPSU. It is located by the Mailbox Pointer Register in the Address Generation section. When the status registers 0 through 3 are transferred into Mailbox words 4 through 7 again in the HPSU, then a broadcast is made via a Universal Processor Interface interrupt to the Host processor and a switch from the dormant state is accomplished and the deceleration of the activity has been completed.

To recap the description thus far, the Host processor has been preparing an activity for execution on a Scientific Processor. The Scientific Processor has been alerted by the Host of the activity by the UPI interrupt. Next, the Scientific Processor received the Universal Processor Interrupt and started acceleration of the activity by transferring data into the internal register files of the Scientific Processor. Four example instructions were followed through execution showing how the Scalar Processor Module executed instructions. The Vector Processor Module was also described with an example given of how it executed a Vector/Vector Add basically by itself. Further, a variation to those two instructions was described using both the Vector and the Scalar Modules in the execution of instructions. Finally the reasons for terminating an activity were described, followed by the explanation of the deceleration of an activity back to the High Performance Storage Unit.

F. Scientific Processor Detailed Description

Having described the functional subsections of the VPM and the SPM, and having described over-all functional interrelationships and operations, each of the functional subsections will be described further as to operation and structure. In the following descriptions, reference numerals will be related to the ranges for each functional subsection, as set forth in FIG. 8 and FIG. 9.

1. Scalar Processor Module in Detail a. Instruction Flow (IF)

1. Overview

Figure 18:
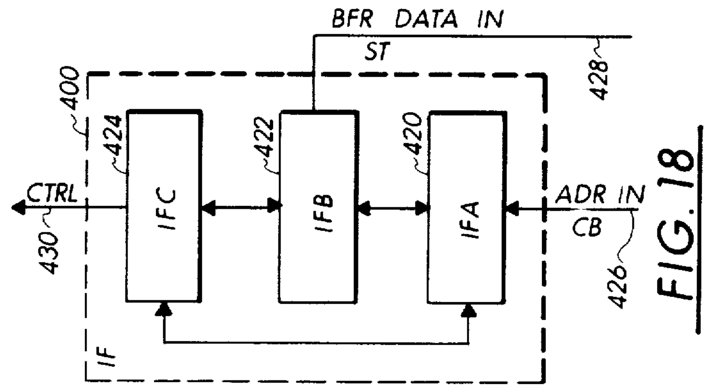
FIG. 18 is a simplified block diagram of the Instruction Flow (IF) section of the SPM of the Scientific Processor.

An overview of the general operation of the IF 400 section will be presented initially with block diagrams and later operations and controls will be reviewed in detail. FIG. 18 is a simplified block diagram of the Instruction Flow (IF) 400 section of the Scientific Processor. The IF logic section consists of three subsections. They are: (1) IFA 420, which is the Instruction Flow Address subsection; (2) IFB 422, which is the Instruction Flow Buffer; and (3) IFC 424, which is the Instruction Flow Control.

The address usually comes to the Instruction Flow Address 420 section on line 426 from the Control Block (SPCB) section, the data to IFB section from the Instruction Buffer comes on line 428 from the Storage Buffer section; and finally the Control from the IFC 424 section is sent on line 430 throughout the whole machine. In the IF physical partitioning there are four circuit cards, F4, F5, F6, and F7. The F4 card is called the Program Address card and it contains Program Addressing logic, a Content Addressable Memory (CAM) addressing logic and also Control logic. Card F5 is called Program Address Capture card and it contains Program Address Registers, Address Registers and a Comparator. The F6 card is called Instruction Buffer Word 0 and 1 card, and it contains an Instruction Buffer for Word 0 and Word 1 and associated Address Input and Output Registers, Illegal Instruction Check Memory, Translate RAM (XRAM) and associated XRAM gate arrays. The F7 card is called the Instruction Buffer Word 2 and 3 card. It is almost the same as the F6 card except for some control logic.

(2) Program Addressing

Figure 19A:
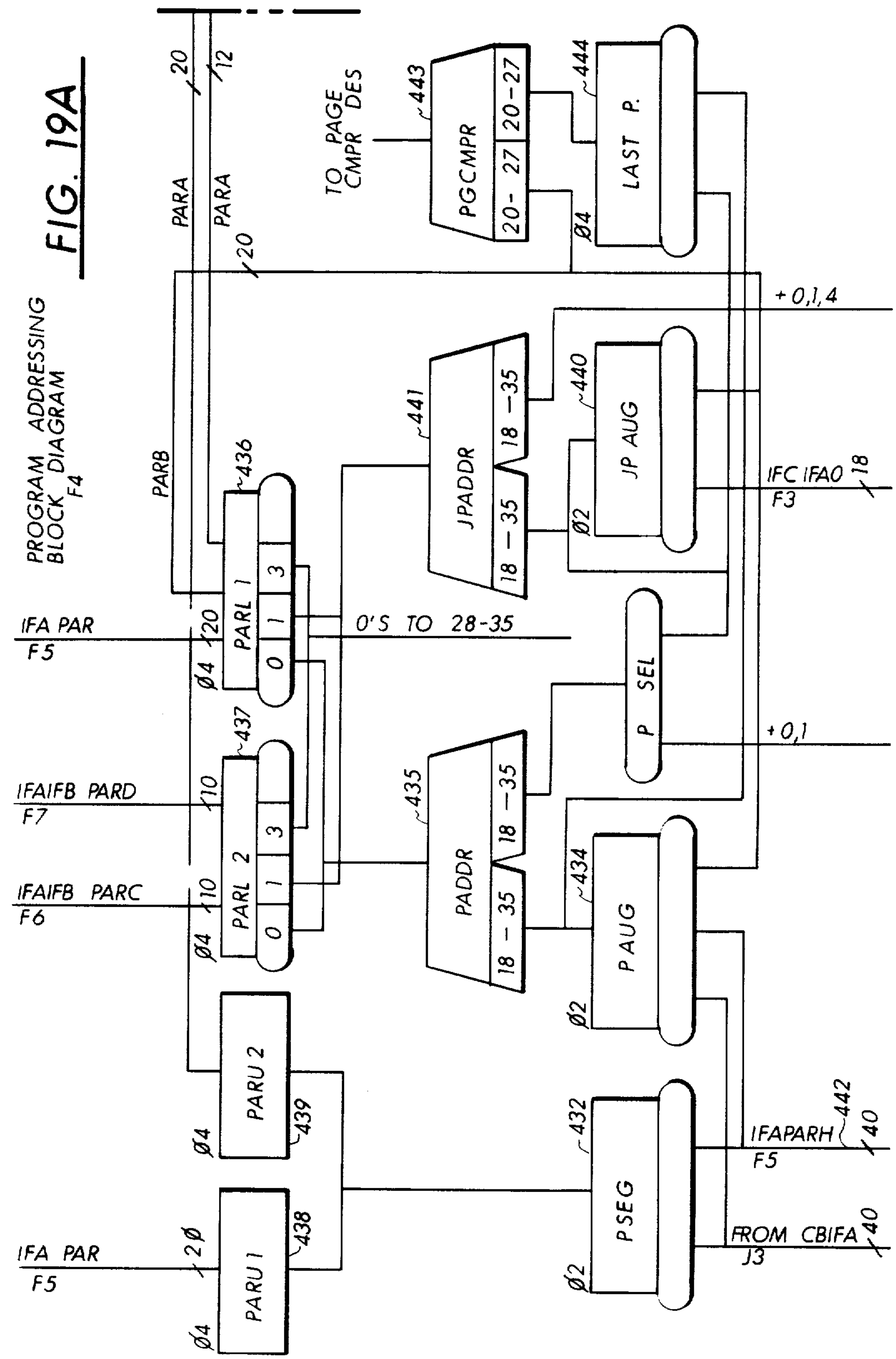
FIG. 19A and FIG. 19B, when arranged as in FIG. 19, is a logical block diagram showing the program addressing portion of the Instruction Flow section of FIG. 18.
Figures 19, 19B:
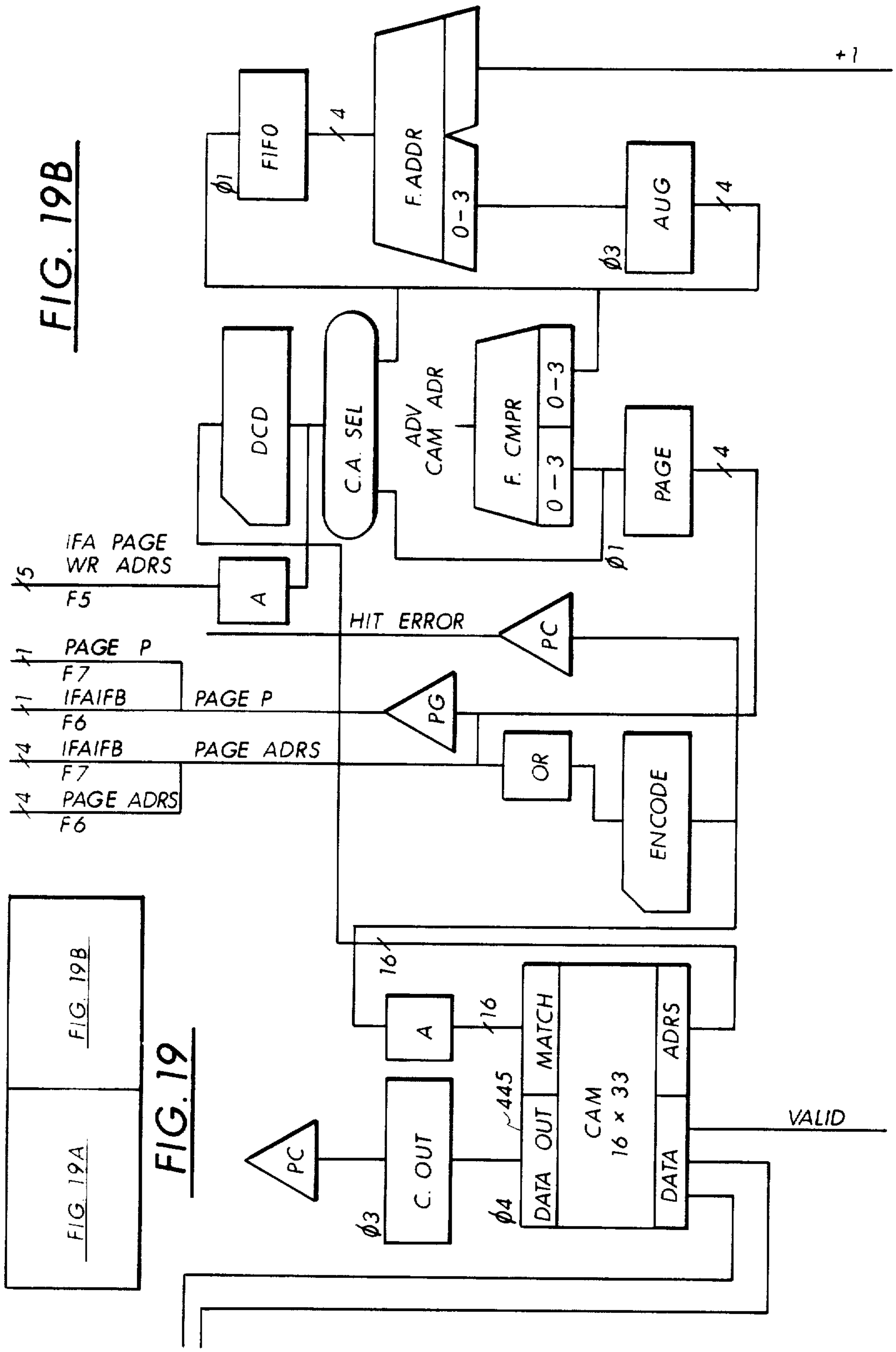

FIG. 19A and FIG. 19B, when arranged as in FIG. 19, is a logical block diagram showing the addressing portion of the Instruction Flow section. The Program Addressing circuit contains normal instruction addressing and includes a Program Segment Register (PSEG) 432 and a Program Augend Register (PAUG) 434. The instruction address arrives first from the Control Block section. A Program Adder (PADDR) 435 is where the decision is made whether a 0 or a 1 is added. The Program Address Register, which is really two registers PARL 1 436 and PARL 2 437. PARL 2 is really a copy of PARL 1 and it contains bits 27 through 35, while PARL 1 contains bits 18 through 35. On the left is the PAR buffer, which includes a PARU 1 438 and PARU 2 439. Normal addressing then is for the Augend to go through the PADDR 435 to the PARL 1 436 and PARL 2 437, and then from the PARL 1 and PARL 2, goes back to the PO again. After that it returns to the PAR again plus 1 to PARL and so on. The upper address, bits 0 through 17, remain the same throughout the task. All the addressing instruction for Jump External Segment or Interrupt does is to change the upper address.

The next item is Jump instruction addressing. Near the bottom of FIG. 19A is the Jump Augend register (JP AUG) 440. The Jump Address itself is 16-bits wide, and is the U portion of the instruction itself. The Jump Address initially enters the Jump Augend Register 440 and is set at 0. It goes from the Jump Adder (JPADDR) 441 to the PARL 1 and PARL 2, and then back for another Jump. It does this twice and then normal addressing starts.

The Retry Address is stored on card 5 and it enters as shown in FIG. 19A as IFA PARH 442 (Program Address Register H) and that is where the Retry Address resides. A Page Comparator (PGCMPR) 443 enables the generation of an Address and an Add instruction every 30 nanoseconds. In this Page Comparator bits 20 to 27 of the Program Address Register are compared with the bits 20 to 27 of the Last Page Address Register (LAST P) 444. This is done every time a transfer is made. If a comparison is made, the instruction can continue at a 30 nanosecond pace. If the comparison is not made then the PARL is blocked. That address in PARL is frozen and it must then be determined if a comparison is made. If comparison is met, then the miss sequence is continued and a 30 nanosecond segment is skipped. If they do not compare, then a miss is generated which goes to IFC section. The IFC section will determine whether or not this Jump will be taken. The CAM 445 shown in FIG. 19B is 16 addresses deep and 33 bits wide. It contains bits 0 through 27 of the Program Address Register plus the four parity bits and the validity bits. It is written into during the miss sequence when a new page is brought into the buffer. The addressing of the CAM 445 is first-in, first-out (FIFO) and the addressing to accomplish this is on the right side of the block diagram of FIG. 19B.

(3) Program Address Capture

Figure 20B:
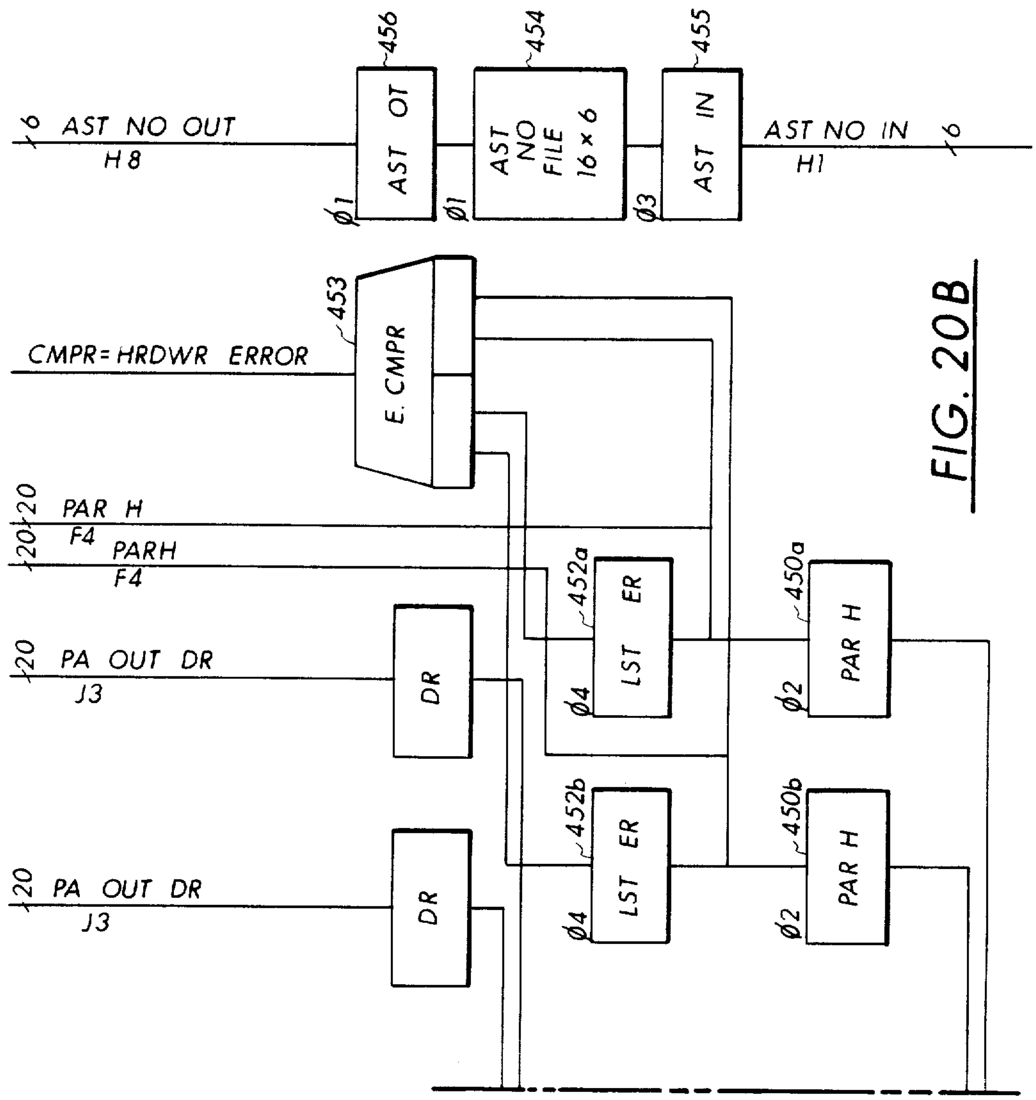
Figure 20A:
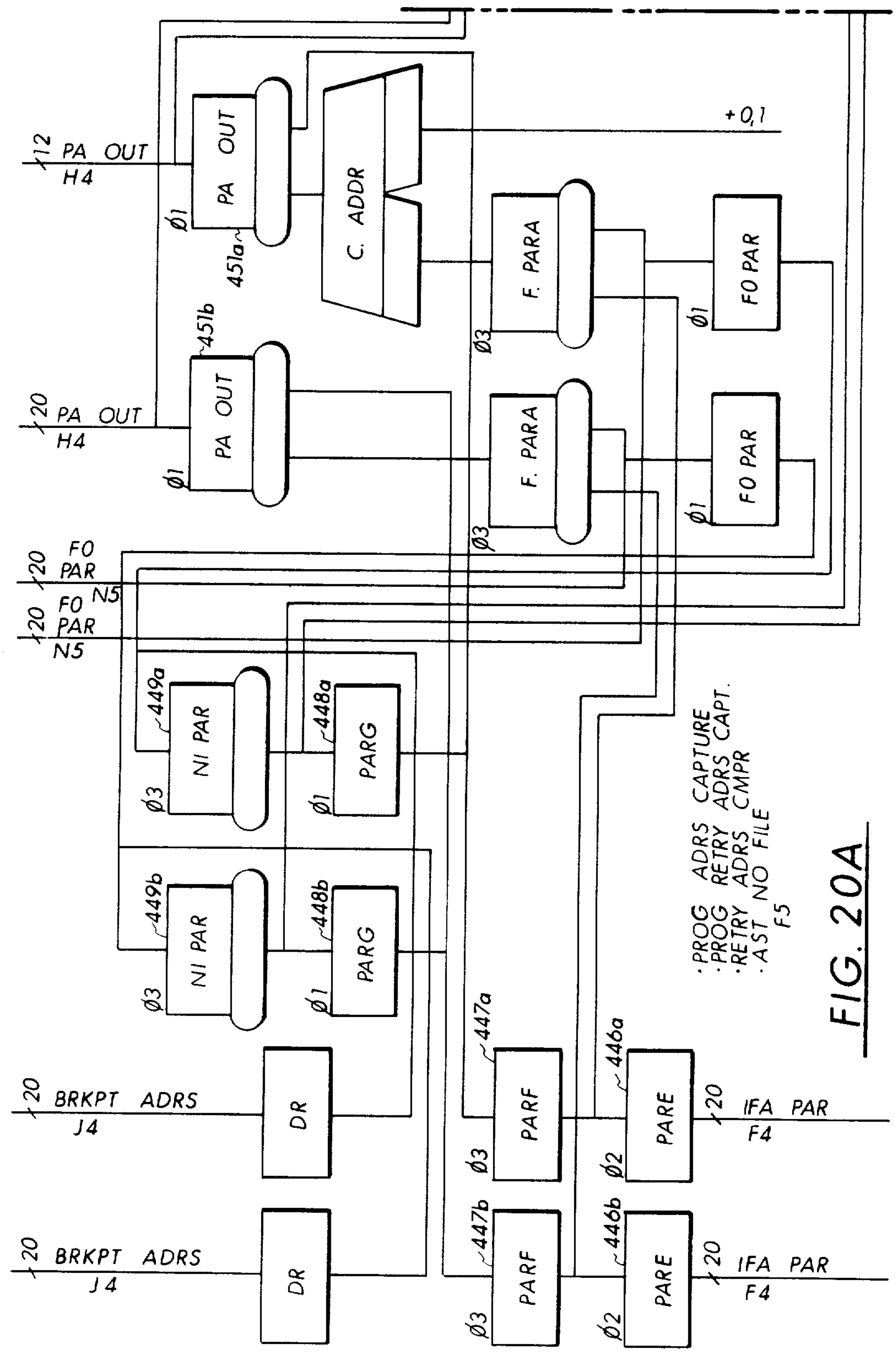

FIG. 20A and FIG. 20B, when arranged as in FIG. 20, is a logical block diagram showing how addresses are captured, and how the Address Segment Table is organized. There are a number of registers needed so that one may keep track of the location of the instruction. For example, Program Address Register E (PARE) 446*a* and 446*b* corresponds to a hold register. This is a buffer register and is the first register where the instruction will appear. The path is from PARE to PARF 447*a* and 447*b*, then to PARG 448*a* and 448*b*, and finally to the Next Instruction Program Address Register (NI PAR) 449a and 449*b*. At this time the instruction would be issued in IFC but the Address of the instruction appears in this Register, and the Address goes farther to Program Address Register H (PARH) 450*a* and 450*b*, and Program Address Register Out (PA OUT) 451*a* and 451*b*. If, for example, there is a Jump instruction, there is a Jump History File required and the Jump Address must be stored. It would thereafter go to CB section and be placed into a Jump Register File.

There is also a pair of Lost Error Address Registers (LSTER) 452*a* and 452*b*. During the time when a parity error occurs in an old register and when a Jump sequence is entered by the Control section, these two registers are compared by E COMPR 453. If a comparison is made, then it is the same Address that has twice failed to the same instruction and this will generate a Halt operation.

The Address Segment Table (AST) 454 number file is used exclusively by the AG 700 section. The data comes from AST IN 455 and returns via AST TO 456 to the AG section.

(4) Instruction Buffer (F6/F7)

Figure 21:
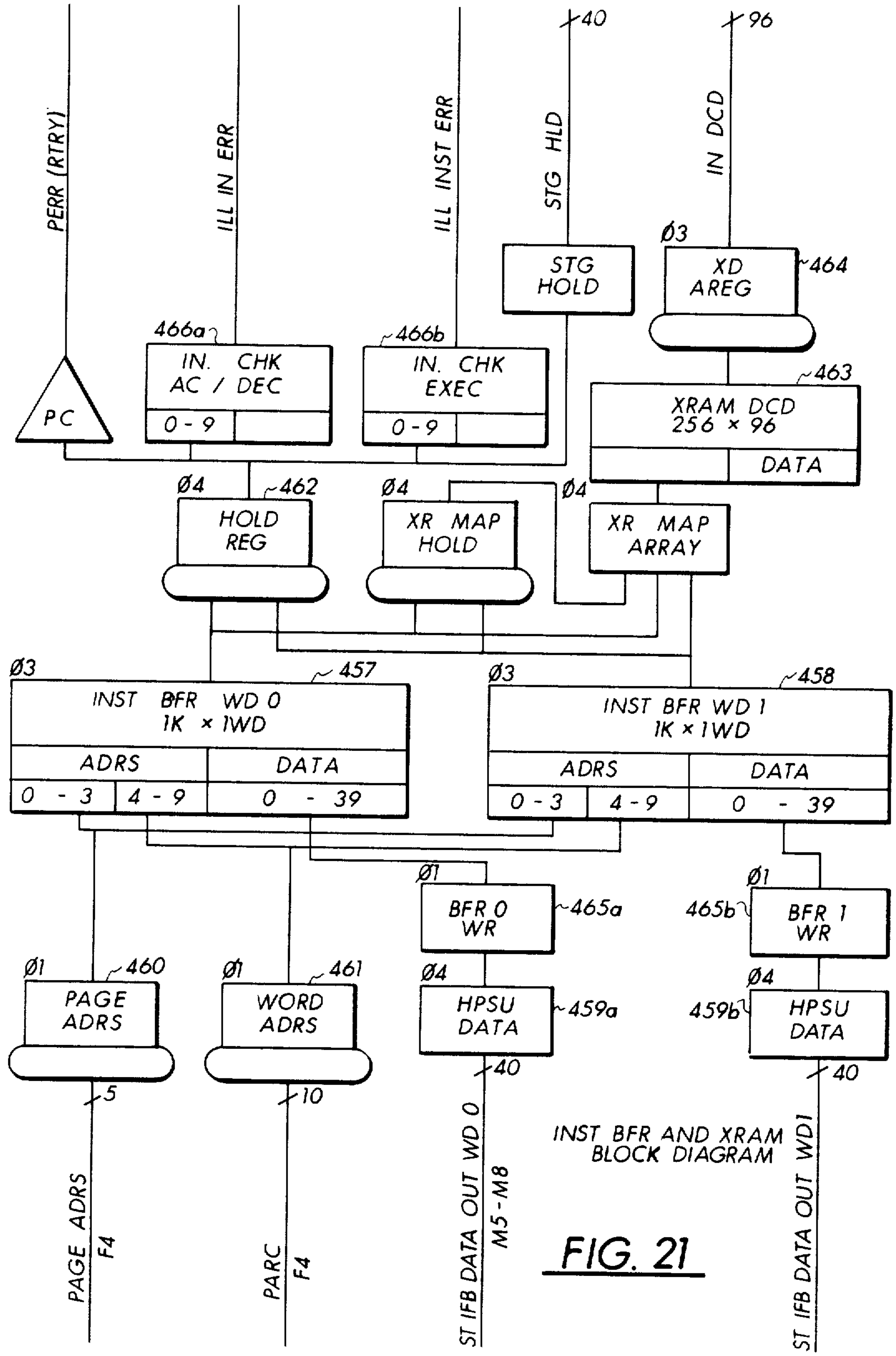
FIG. 21 is a logical block diagram of the instruction buffer and the Translate RAM (XRAM) of the buffer section (IFG) of the Instruction Flow (IF) section of the Scalar Processor Module (SPM)

FIG. 21 is a logical block diagram of the Instruction Buffer and the Translate RAM. There are two Instruction Buffers (INST BFR WDO) 457 and (INST BFR WD 1) 458, and each is a 1K by 1 WORD (40 bit) Buffer. There are separate data Input Registers (HPSU DATA) 459*a* and 459*b* for each buffer. Both buffers use the same Address Registers (PAGE ADRS) 460 and (WORD ADRS) 461, and both are sharing the same Hold Register 462. There is one Translate 256×96×RAM (XRAM) 463 on each card and one 96-bit Translate Register (XD AREG) 464 on each card.

The HPsU Data registers 459*a* and 459*b* receive data from the Store Buffer section. This data is passed into Buffer Write Register (BFRO WR) 465*a* and (BFRl WR) 456*b* and from there it goes into the Buffers 457 and 458, respectively. The two Instruction Buffers are identical except for the positioning, and, of course, this positioning determines which Buffer is going to be read into the Hold Register 462, which represents the output register for the two Buffers.

There are also two Instruction Check Memories (IN CHK) 466*a* and 466*b*. One is used for acceleration and the other for the normal execution of the instruction. The parity of the instruction is also checked. If the parity bit fails, then the run sequence is stopped.

(5) Virtual Address (VA)

Figure 22:
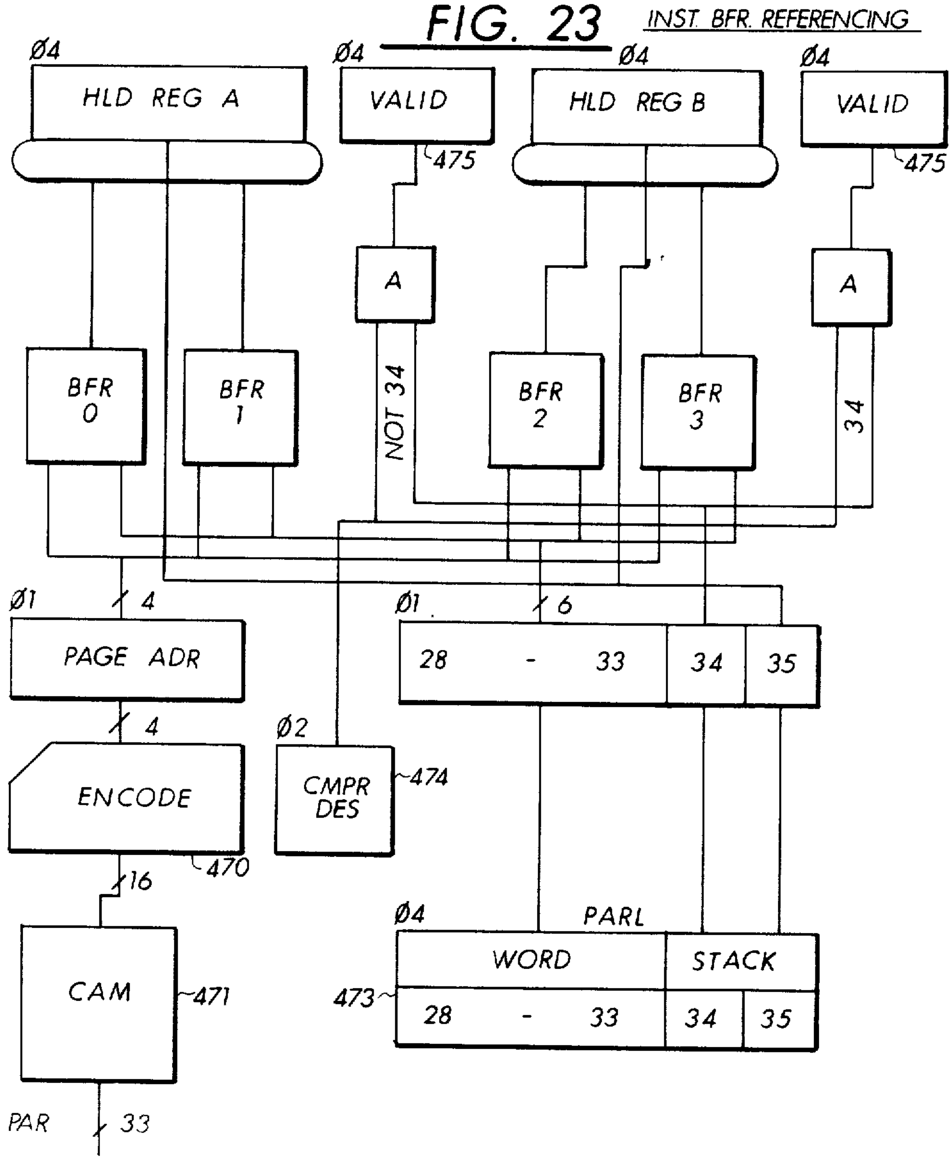
FIG. 22 is a pictorial diagram illustrating the 36 bit Virtual Address format used to reference the IFB portion of the Instruction Flow section of the SP.

A discussion of the operation will be given next. If a Virtual Address (VA) is being used throughout the addressing section or buffer section, it is the 36-bit Virtual Address that is used for Instruction Buffer reference. A format of this address is shown in FIG. 22. The upper 18 bits are called the Segment Address. These are bits 0 through 17. Bits 18 and 19 are always 0, and there is a detection apparatus associated with these bits. If either bit or both become 1 an External Interrupt will be generated. Bits 20 through 27 are the Page Address and they are the bits that are being compared constantly to see if there are still referencing the same page. The Word Address is bits 28 through 33, and these are the bits that are directly transferred to the Buffer Address Register. Bits 34 and 35 are the Buffer Stack Address and they determine which buffer is going to be physically used, since there are four buffers, 0, 1, 2, and 3. Buffer 0 contains word 0; buffer one contains word 1; and so on.

FIG. 23 illustrates the referencing operation of the Instruction Buffer. The Encode 470 logic will encode 16 outputs from the CAM 471 into four bits and, of course, the one that is generated at the time will be the one that will encode into four bits and will represent the page address of the buffer. The buffers are numbered BFR 0, BFR 1, BFR 2, and BFR 3 and represent the word in the buffer. The Word Addresses come from the Program Address Register Lower (PARL) 473 and includes bits 28 through 33. The Stack is represented by bits 34 and 35. The operation starts with a look at the Compare Designator (CMPR DES) 474. If the Compare Designator is set and if, for example, word 2 is being selected, then bit 34 is set, since the Compare Designator 474 with bit 34 represent the Enable signal for the validity bit (Valid 475). Then it would go to the Next Instruction Register and the next instruction is issued.

Figure 24:
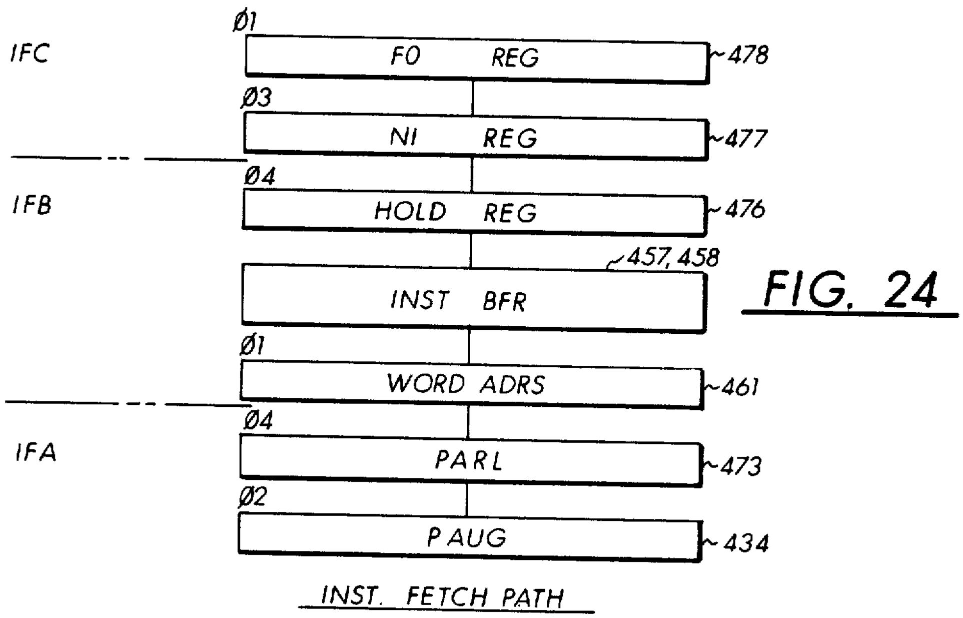
FIG. 24 is a simplified block diagram of the Instruction Fetch path through the IFA, IFB and IFC portions of the Instruction Flow section.

FIG. 24 illustrates the instruction fetch path. Starting with the P Augend Register 434, next go to the Program Address Register Lower 473, that is the Instruction Buffer Word Address 461 of IFA. The Instruction Buffer IFB 457, 458 itself is next, and is where the instruction first appears in the Hold Register 476. From here the instruction goes to Next Instruction Register 477 then to the add FO Register 478 where it is issued into execution.

Figure 25:
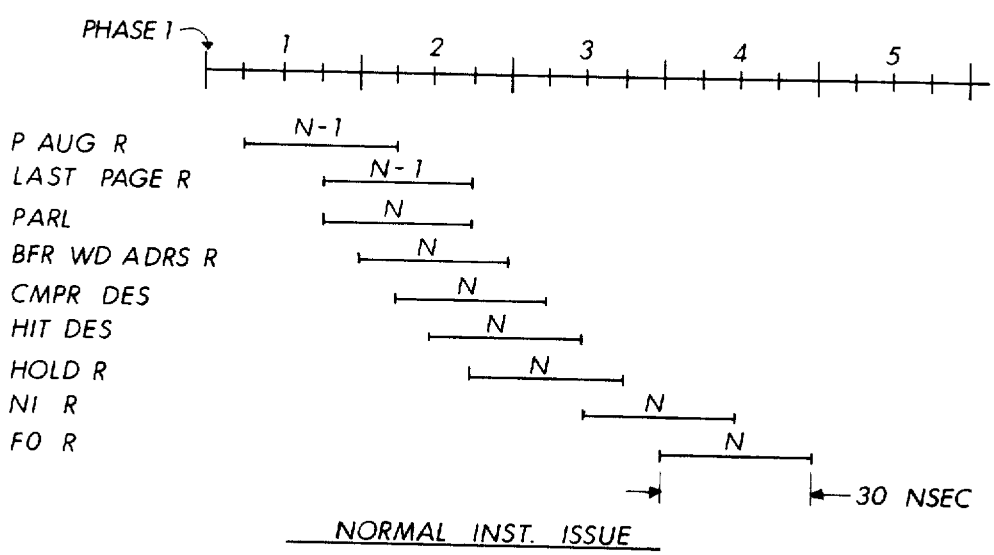
FIG. 25 is the timing diagram used for the normal issuance of an instruction.

The same sequence as in the diagram of FIG. 24 is shown by the timing diagram of FIG. 25. Starting with the P Augend Register, with an address which is N-1 in this case, on phases 2, 3 and 4 the contents of P Augend Register are being transferred into Last Page Register. On the same phase the P Augend plus 1 is transferred into Program Address Register (PAR). One phase later, on phase 1 of the next clock cycle, this address is transferred to the Buffer Word Address Register. But note that on phase 2 a comparison is being done and bits 22 through 27 of the Program Address Register are being registered. Bits 20 to 27 of the Last Page Address Register contains the final address. The instruction waits in the Hold Register at this time. Since the Compare Designator is set, the Validity bit is also going to.be set and the instruction proceeds into the Next Instruction Register and from the FO Register into execution. Each of these cycles represented here is 30 nanoseconds in duration. There are a number of sequences that control the address and Instruction Buffer. They include the New Address sequence, the Miss sequence, the Buffer Load sequence, the Loss sequence, the Buffer Load sequence, the Read/Write sequence, the Abort sequence, the Run sequence and the Jump sequence. All of these sequences except the Jump sequence have a separate timing chain noted herein as TC.

New address timing chains are initiated by the CB section and executed by the IFA section. At this time it brings in the new address for either New Tasks or Internal/ External Interrupts. These could be used for deceleration or acceleration as well as Load Addressing Jump or Jump to External Segment instructions. If the new address timing chain is used for the first time after the Interrupt Clear or Master Clear signals, it will automatically generate a Miss. If new address timing chain is not used after the Master Clear, it may be used a second or third time. This could be caused by an Internal or an External Interrupt. It then starts a timing chain. The Miss timing chain is initiated by the IFC/IFA Start Miss operation. The code of the Miss timing chain indicates that there was no match made in the CAM. When this happens a New Designator and a Miss Reading Designator is set which tells the Control section that Miss is pending. It is up to the Control section to make a decision as to whether or not a Miss or an Abort operation will be taken. Assuming, in this case, that the Miss is taken, then the timing chain is started. The Miss Address is in the Program Address Register where the Miss is the first to be recognized. Next, bits 28 through 35 of that address are cleared out because the AG section is not required by those bits. It places a Miss Address in the Output Register and it notifies the IFC that the address is ready. Next, it places Program Address Register bits 0 through 27 plus 4 parity bits plus a Validity bit into the CAM and places the PARL into the Jump Augend Register in preparation for the buffer load, which will follow in this sequence.

While the CAM was being loaded it also read out the data from the CAM via the CAM Output Register and the parity was checked. If the parity is satisfactory it will continue, but if not, an interrupt is generated. The upper four bits, bits 0 through 3 of the buffer are on cards F6 and F7.

The next sequence to be followed is the Buffer Load sequence, which is initialized by an AG IFA Data Acknowledge Designator. Now it will load the Miss sequence in Buffer Load sequence. Everything is stopped and awaits the receipt of an Acknowledge by the AG section from the HPSU. Loading is started once the Acknowledge signals are generated. The loading start causes the address in the Jump Augend Register to be incremented by four (4) and sent to the PARL. This operation is repeated 64 times. On cycle 64, the AG 700 section comes up with the AG IFA last acknowledge signal and this signal will start an Acknowledge sequence. An End Buffer Load sequence places the P Augend Plus 0 into the PARL. The PARL augend contains the address of the Miss instruction. Also, this places the P Augend Register into the Last Page Register, allowing the Page Compare sequence to be initiated. An Abort sequence is initiated by the IFC section by sending two IFA Abort signals. The contents of the P Augend Register Plus 0 is the placed into the Program Address Register.

(6) Jump Sequence

FIG. 26 is a timing diagram of the Jump sequence. It starts with a clock cycle 4, because it takes about three cycles for the P Augend to get to the Function Register (FO). The Jump instruction first appears in the FO Register at the time that the Jump sequence is about to start. The IFC IFA New Instruction Designator tells the IFA section that a New Instruction is starting. The next signal IFC IFA F0 Jump Designator tells the IFA section that it is a Jump instruction. The numbers shown inside the clock cycles represent the numbers that appear on the left of the figure, and represent the signal that generates that pulse. For example, the first one is IFA PARL select address 00 and inside the pulse are written 1 and 2. This is the add condition of IFA IFC, IFC IFA New Instruction Designator and IFC IFA F0 Jump Designator, that causes this pulse to occur. Also on the right side there is a note that says these designators must be set to repeat the Jump sequence.

There is also a Last Page Designator which designates a selection switch into the Last Page Address Register from the Jump Augend. Now the data bits 20 to 27 that are being put into Last Page Register are coming from Jump Augend instead of the P Augend Register. The Jump Sequence Designator B is also used as a Jump Target Bit Data, however, if Page Compare is not made on Jump Target Address, then that sequence is repeated for one more cycle. This is the same operation as a normal operation. The CAM is checked to see if the page is in the CAM. If it is, then the sequence continues.

The last Jump Sequence Designator is designator F, and corresponds to the Last Page Designator. When active, the rest of the designators are going to be cleared out, and the Jump sequence is completed.

FIG. 27 is a flow chart of the Jump sequence. This flow chart corresponds to the timing chart of FIG. 26. On cycle 4, phase 1, FO is equal to a Jump instruction that starts the Jump sequence. After the Jump Target Address is received in the Jump Augend Register it is transferred to the Program Address Register (PARL) and that occurs on cycle 4, phase 4. Next, the Page Comparison is done wherein bits 20 through 27 of the Jump Target Address in the Program Address Register is compared with the Last Page Address Register, which contains the address which it receives from the P Augend Register. The star (*) indicates that a Jump has been taken, and () indicates a Jump not taken. On Jump, the Jump Augend Plus 1 address is sent to PARL. If a Jump was not taken (), the P Augend is sent to the PARL. This makes it clear that a Jump is not to occur and the generation of jump addresses ceases. If the Jump is to be taken, then the contents of the Hold Register is transferred to the Next Instruction Register. However, as previously noted if a Jump is not taken then the Next Instruction Register will be transferred to the F Register.

In normal addressing, the difference between the "NO" path and the "YES" path is that in the "YES" path a Jump Augend Plus 1 to is sent to the PARL. Next, the Jump Augend is sent to the Last Page Register. The next step, where the Jump target is sent to the Hold Register, is the same for both the "YES" and the "NO" paths. If it is a valid jump target bit, then the Program Address Register Lower (PARL) is transferred to the Jump Augend and on cycle 6, phase 4, transfer the Jump Augend to the Last Page Register. A Jump Augend Plus 1 to Program Address Register is again the accomplished if Jump is taken, however, a P Augend to PARL is done if the Jump is not taken.

Figure 28:
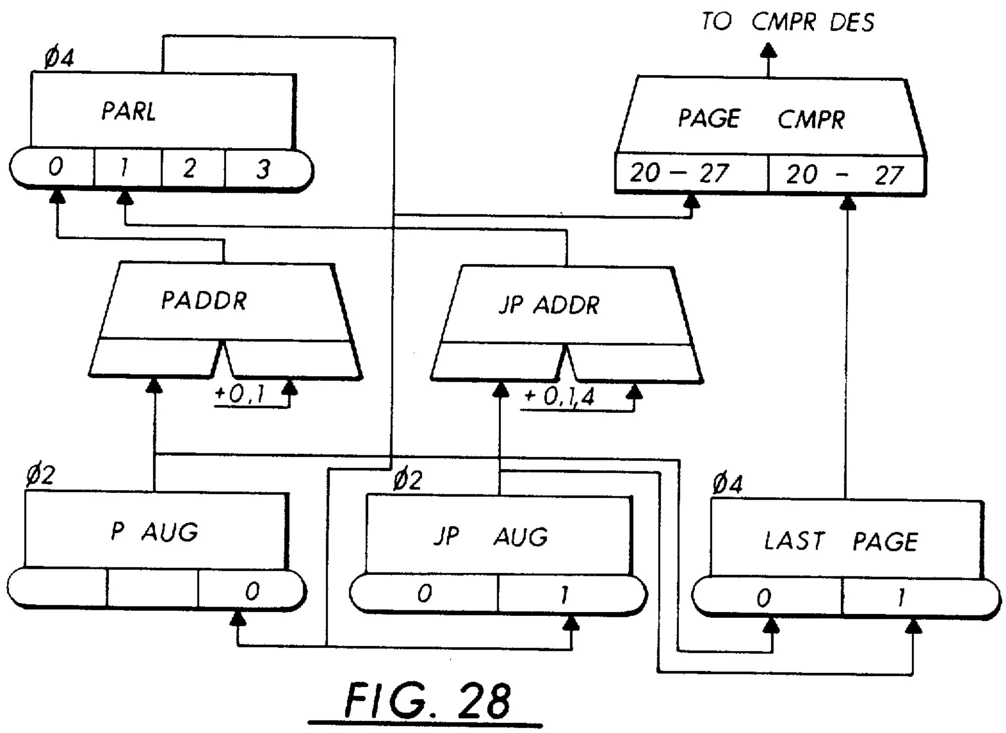
FIG. 28 is a logical block diagram corresponding to the flow chart illustrated in FIG. 27.

The block diagram shown in FIG. 28 shows the sequence of this page comparison. First, the selected P Augend input is sent to both the P Address Register and the Last Page Register. Similarly, the JP Augend is sent to both the JP Address and the Last Page Register. The PARL selects either the P Address or the JP Address to send to the Page Compare register. The Program Address Register (PARL) contents are compared with the contents of the Last Page Register received from the Jump and from the P Augend Register. If the comparison is made, we continue feeding single addresses until we have a Jump Target Address plus 2, which is then transferred into the P Augend Register and we proceed with normal program addressing. If comparison is not made, then we go to the CAM and if we find the address in the CAM, then we just skip one cycle and continue on. However, if it is not found in the CAM, a Miss indication is generated.

Figure 29:
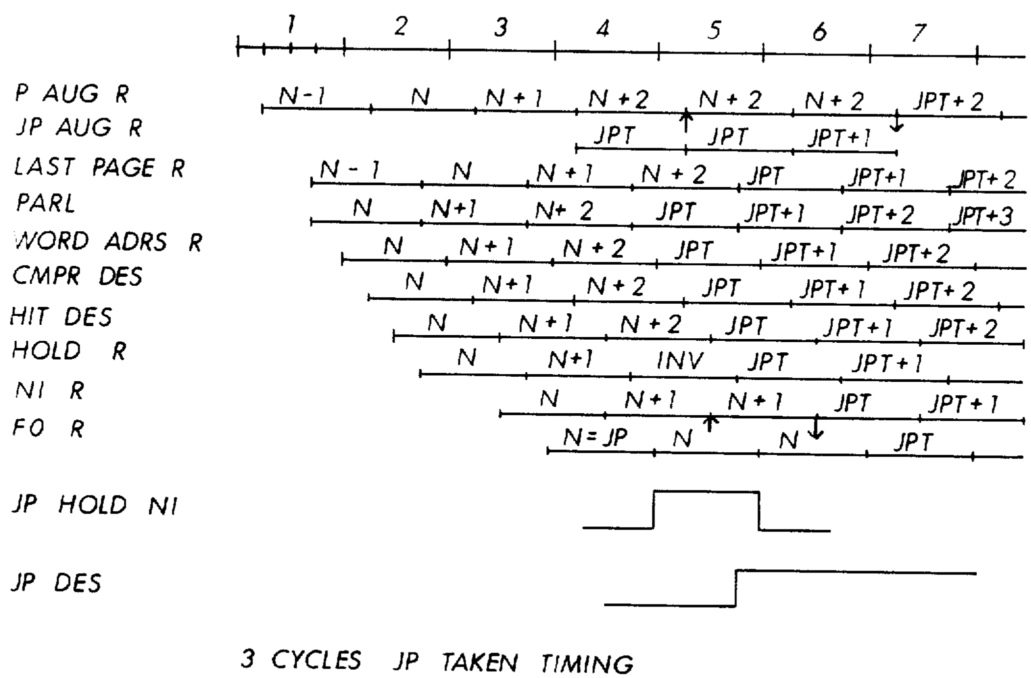
FIG. 29 is a timing diagram of the logical block diagram of FIG. 28 for three cycles when a jump is taken.

Next is the timing diagram of FIG. 29 which illustrates the case where a Jump is taken. We start at cycle 1, phase 2, with the address N-1 in P Augend Register. The add address is transferred to a Page Register on phase 4 and N-1 address is transferred to Program Address Register and also to the Buffer Word Address Register. Then, the comparison is performed on phase 2 and we assume a compare has been made. The Hit designator is then set, and the register receives an instruction which is for the N address. It is called an instruction in this case. It proceeds to the Next Instruction Register and finally to the Function Register. If the instruction happens to be a Jump instruction it is issued. On the following phase 2, the Jump Target Address appears in the Jump Augend Register and it then proceeds to Program Address Register just as a normal instruction would respond to a normal address. Here it would remain for as long as necessary to make the decision for a Jump to be taken or not. Since the assumption was made that the Jump was taken the instruction proceeds into the Next Instruction Register and from there into the Function Register for issuance. Once it is known that the instruction was a Jump instruction, instead of putting in a Hold Register N+2, which could possibly generate a retry, we simply load that instruction, because the address N+2 is being saved in the P Augend Register.

Figure 30:
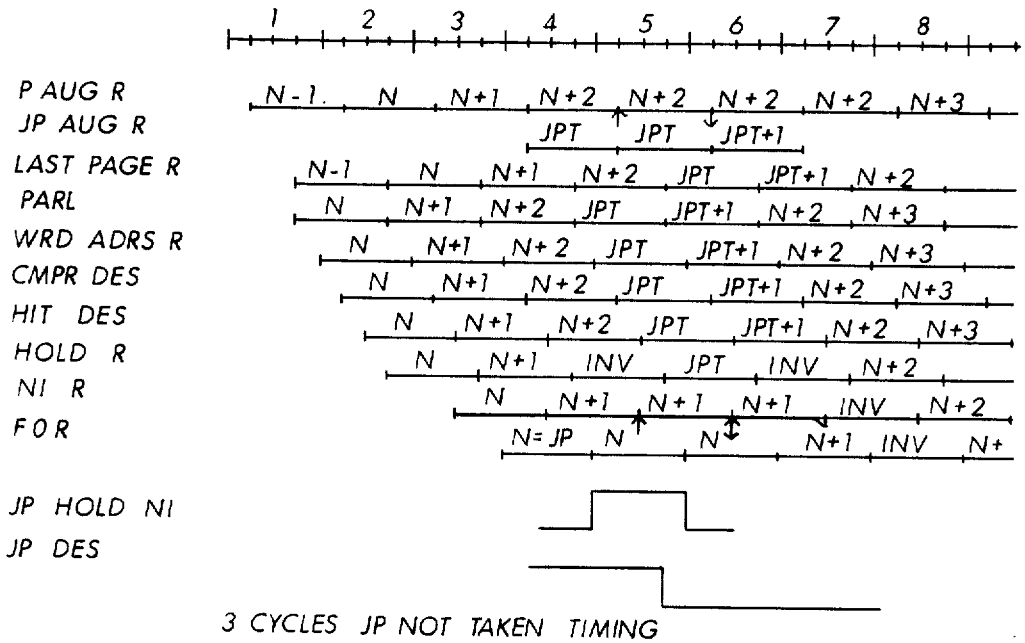
FIG. 30 is a timing diagram corresponding to that shown in FIG. 29 for the same three cycles when the jump is not taken.

FIG. 30, illustrates the case where a Jump is not taken. Here again we start at the N−1 address in the P Augend Register and proceed to the Last Page Register and from there to the Program Address Register, the Word Address Register, the Compare Designator, the Bit Designator, the Hold Register, the Next Instruction Register, and finally, to the FO Register, where the Jump instruction is issued. Here again there is a Jump Target Address in the Jump Augend Register. It is assumed that the Jump is going to be taken so a Jump Target Address is placed in Program Address Register where a decision is awaited. In this case, the decision is that the Jump is not taken, since the Jump Designator is shown going down. Since the Jump was not taken, the next (N +1) instruction, which was in Next Instruction Register, is preserved in the Next Instruction Register for one more cycle. The N+1 instruction is issued in the FO Register and instead of putting the Jump Target N+1 in the Hold Register, since the instruction is not going to be taken, the location is invalidated. At the same time, instead of transferring the Jump Target N+2 instruction in Program Address Register as was done in previous timing diagram, the N+2 instruction, which is the next instruction, is executed after the N+1 instruction. That address is placed in Program Address Register and we continue down the line until that instruction is issued.

Figure 31:
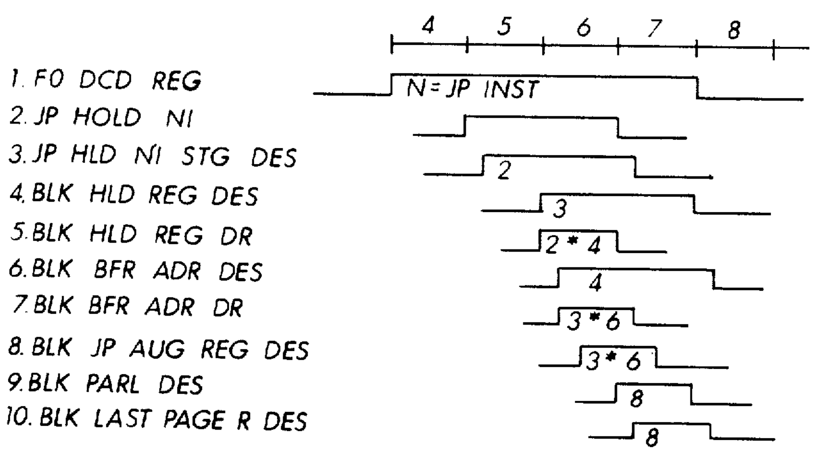
FIG. 31 is a further timing diagram showing designators which are being used for blocking registers for the jump instruction.

Consider the designators which are being used for the Blocking Registers for the Jump instruction as shown in the timing diagram of FIG. 31. Also shown are some designators that block the registers during the Jump sequence because it is not possiblie to pile up address upon address. Operation must await the Jump decision since it cannot be predicted. The minimal time for the Jump instruction is 3 cycles, which is 19 nanoseconds. The maximum is not specified since it could be many cycles.

The F0 decode register comes with the jump instruction along with a control bit which indicates a Jump hold. This signal causes a block to be placed first in the next instruction. We can then set up a next instruction storage designator. The reasoning for the number inside the clock cycles are the same as before in that they represent the numbers in the left and correspond to a signal name that generates the shifting of that signal i.e. going up or down. First, the Jump Hold Next Instruction Designator is set and this is a result of Jump Hold 9 Designator. That causes the Block Hold Register Designator to go up, but that alone does not block the register, which requires a Jump Hold 9 and Block Hold Register Designator. It is the end condition that produces a block on the Hold Register in this case.

The Block Buffer Address Designator is needed for as a Block Hold Register Designator. Here again to block the buffer address word address on the buffer cards is noted as signal three (3) and signal six (6) which are Jump Hold Storage Designator and the Block Buffer Address Designator respectively. The subsequent one has the same inputs as the previous one. Finally, the last two have as their input the number eight (8), which is the Block Jump Augend Register Designator. This has been prepared for blocks of Jumps which are resolved in four cycles, since if it was for Jumps resolved in three cycles you would not see the single cycle block because they do not appear.

Figure 32:
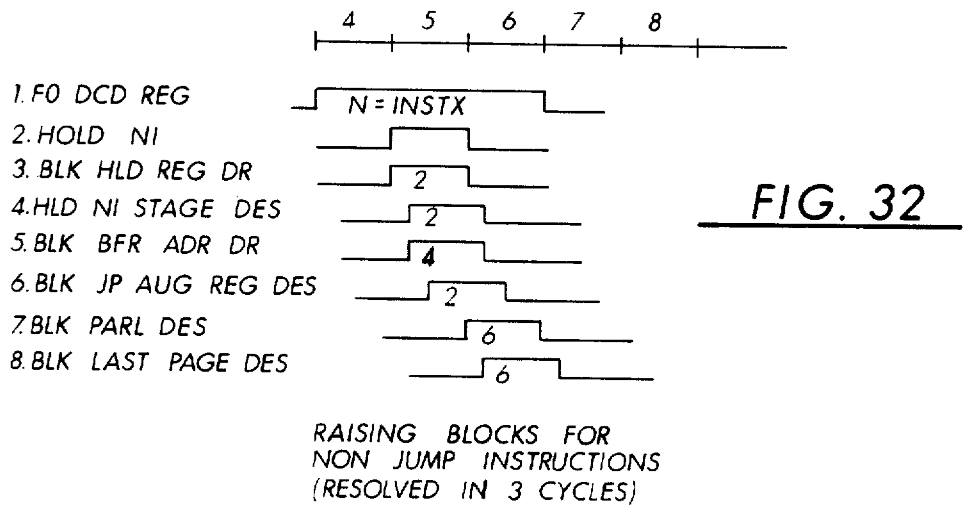
FIG. 32 is also a timing diagram which is practically identical to FIG. 31 except that the blocking starts one cycle sooner in this instance.

FIG. 32 is a timing diagram which is almost identical to FIG. 31 except that the blocking starts one cycle sooner, and is resolved in three cycles. It is started on cycle 4 and it goes to cycle 7, but here the N instruction is in the F0 Decode Register. The shifting of this signal from low to high indicates that the instruction is going to take longer then the usual one cycle, and the registers must be put in order, or it is..necessary to start blocking them in order. This, of course, is the same as was described before, when blocking was done in a predetermined order.

(7) Functions

Let us consider next the operations performed by the Instruction Flow section. The Instruction Flow (IF) issues instructions to the SPM and VPM. As a result, it has to resolve instruction issue conflicts. The IF also sequences the scalar instruction pipeline which includes the F0, the F1, and the F2 Registers. The IF also selects the scalar instruction operand source. In other words, it sets up the Selector Address Register. Other sources that are selected by the IF are the elements from the Vector Files, an operand from the High Performance Storage Unit (HPSU), an operand from the Local Store and an operand from the Data-in Buffer. So the IF determines whether to get the operand from the Data-in Buffer or directly from the HPSU interface. The IF also decodes instructions and it executes Jump instructions. It initiates the Interrupt process by determining when and how the Control Block detects an Interrupt. Once an Interrupt is detected, the IF ceases issuing instructions and waits for all of the issued instructions to complete their operation. It then causes the CB to proceed with the Interrupts. Lastly it controls the starting and stopping of instruction execution. These are commands arriving from the SSP or the panel/maintenance operations.

(8) Partitioning

The partitioning of the IF is broken down into three sections as previously noted. The Addressing section or the IFA; the Buffer section, or IFB,where the instructions are held; and the Control and Decode section, the IFC. Primarily, the IFC section will be discussed.

Figure 33:
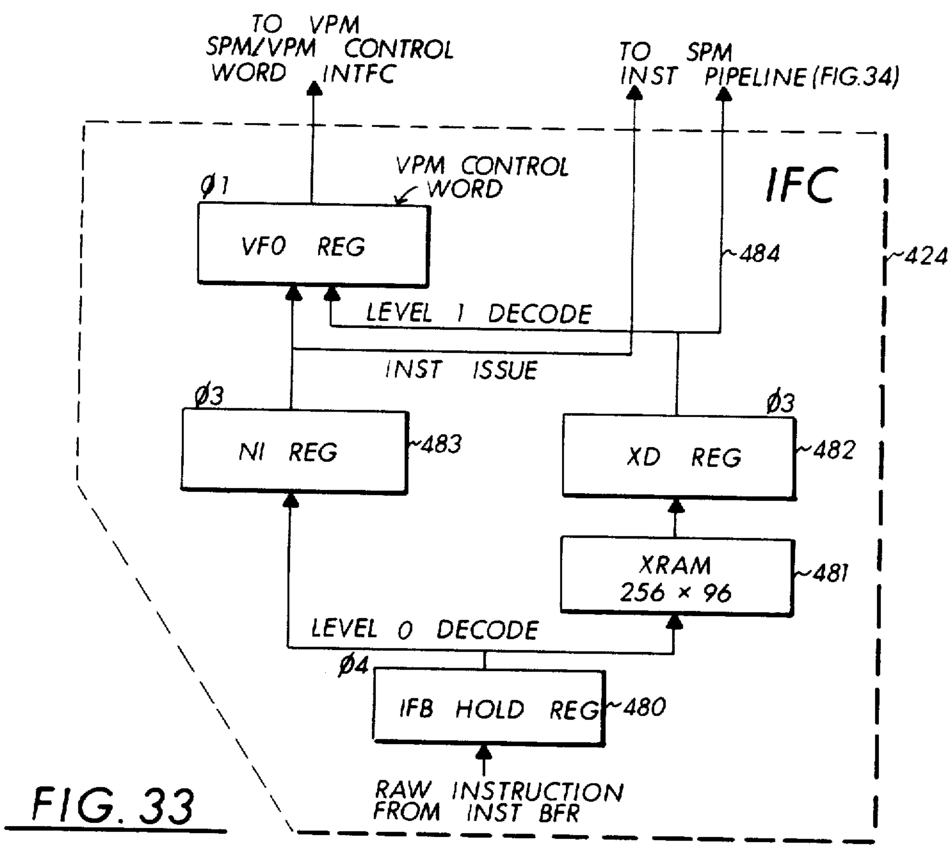
FIG. 33 is a logical block diagram illustrating the path of a raw instruction from the IFB to the VPM and the SPM via the translate RAM.

Consider first, a general overview of the IFC section as shown in FIG. 33. The raw instruction is read from the Instruction Buffer and is clocked into the IFB Hold Register 480 where the first level of encode is started. This is called the Level 0 decode. An address is generated by a map gate array. This array is called the translate RAM (X RAM) 481 map gate array. The X RAM is addressed and produces 96 bits of information. Twelve of these 96 bits are parity bits. The remaining bits are clocked into the Translate Decode Register (XD REG) 482 as shown in FIG. 33. A raw copy of the instruction is in the Next Instruction Register (NI REG) 483. At this point, the instruction is at Level 1 decode and it must be determined whether to issue the instruction to the Vector Processor Module or to the Scalar Processor Module. If the SPM is selected, the instruction enters the Scalar Processor Module (SPM) pipeline 484. The SPM instruction pipeline is shown in FIG. 34, and starts with the FO Instruction Register 485, and the FO Decode Register 485*a*. When a Level 1 decode instruction is received, the Raw Instruction (RAW INST) is carried along because it is necessary to continue decoding the instruction at the different levels. The Level 2 Decode 486 is started and at this level it is determined where to issue the instruction, that is, whether to issue it to the SP section, the LC section or the CB section. At the F0 level it is also determined if an operand is going to be fetched from the HPSU, or possibly an address translation (AG) is needed. Level 3 Decode 487 is continued and the instruction is dispatched to a F2 Register 488 which all sections have. This is where the actual execution of the instruction takes place, that is in the SPM instruction pipeline. The Level 4 Decode 489 and the F3 Register 490 are internal controls for the IF and they are, of course, in the IF section and are necessary to finish the execution of non-overlapped instructions.

(9) Operation Control

Figure 36:
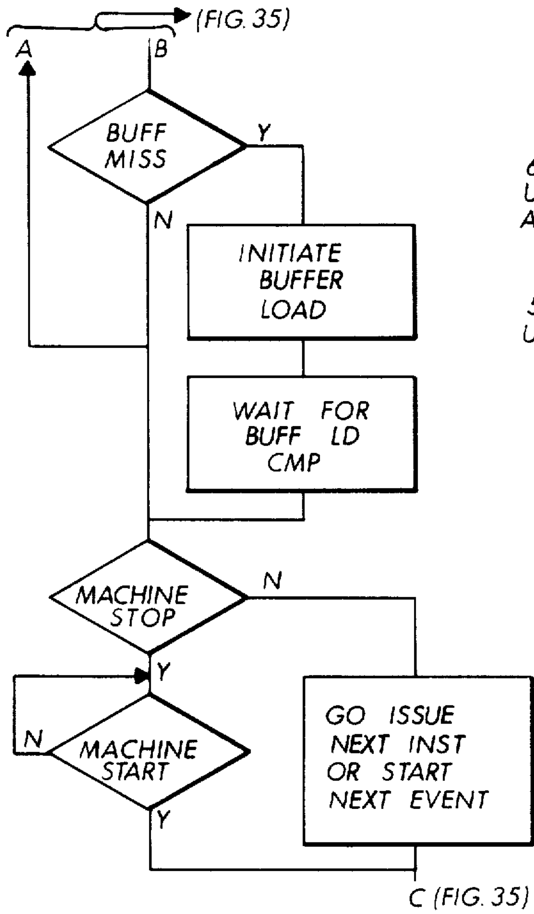
FIG. 36 is a second flow chart which must be combined with FIG. 35 at the A and B points noted and returns to point C, (the input of FIG. 35) to form a loop.

The IF operation control looks at it and how it determines the order of things that must be done. FIG. 35 and FIG. 36 together are a flow chart of events and sequences that occur. IF may have to initiate a Buffer Miss (BUF MISS), or an Interrupt (INT) process, or it may have to stop the machine. First, then, IF determines whether it has an Interrupt (INT) pending or not. If there is an Interrupt pending, the Y path is taken and it determines if there is a Buffer Miss (BUF MISS) outstanding. If there is a BUF MISS outstanding it Aborts that Buffer Miss (ABORT MISS). In other words, it starts the Interrupt process. If the Last Instruction that was executed was a Jump Taken (LAST INST UUMP TAKEN), the Y path is taken and the Return Address (RETURN ADRS =PAR) is the Target Address. In other words, the Return Address is now equal to the PAR. If the Jump was not taken, the N path is taken and the Return Address is PAR plus 1. Now this is for deceleration information or if an Internal Interrupt is to be recognized and it is desired to return to the main line code. If an External Interrupt (EXT INT) is received, the Initiate Macro Code Load is initiated for deceleration. However, if it is an Internal Interrupt, SP transfers the contents of S8 to a Program Address Register (S8 TO PAR), and the Fetch First Instruction is issued. Now referring to FIG. 36, the interconnection with FIG. 35 are points A, B and C. This interconnection forms a continual loop, and the IF is actually in this loop looking all of the time.

At a point after the Macro Code has been loaded an External Interrupt is done. Consider next whether the machine is actually going to stop or if there is an SSP command for the machine to Halt (MACHINE STOP). If not, the N path is taken to go to the next instruction is issued, or the next event is started, whatever the case may be. (see block 491) If it is an Internal Interrupt (the B input) IF checks if there is a Buffer Miss (BUFR MISS), and if so the Y path causes the Initiate Buffer Load, and after initiation, waits for its completion. If the machine is going to Stop, or if it has been commanded to Stop while the buffer was being loaded, of course, the same process is repeated. If the machine has been commanded to Stop, the next instruction is started and if so return to point C.

Figure 37:
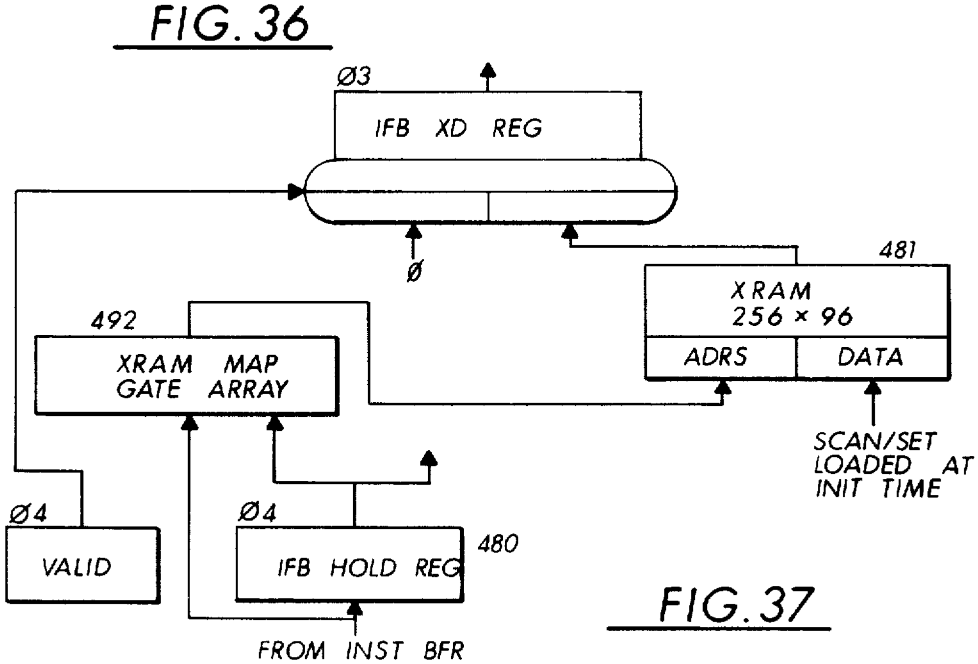
FIG. 37 is a logical block diagram illustrating an overview configuration of the Translate RAM with an erroneous instruction having just entered the IFB hold register.

A general overview of the XRAM 481 will now be given with reference to FIG. 37, where the IFB Hold Register 480 has just received the wrong instruction with a 7 bit OP code entering the XRAM Map Gate Array 492. The OP code is looked at and is mapped directly into the XRAM. Now if this were a valid instruction in the IFB Hold Register 480, then the contents of the XRAM are clocked into the SP Register. However, if it is not a valid instruction, then 0's are clocked in until a valid instruction enters the IFB Hold Register. Now this either means that we have an Instruction Buffer Miss or have just ordered a Jump instruction which was not taken. In this machine it creates a gap, or places an invalid instruction in the pipeline. Now the XRAM is loaded at initialization time by the SSP and it is never altered during actual execution by the machine.

Figure 38:
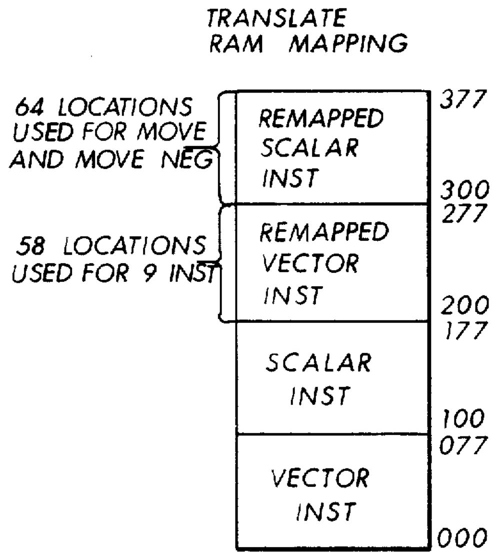
FIG. 38 illustrates a simplified block diagram of the mapping of the Translate RAM.
Figure 39:
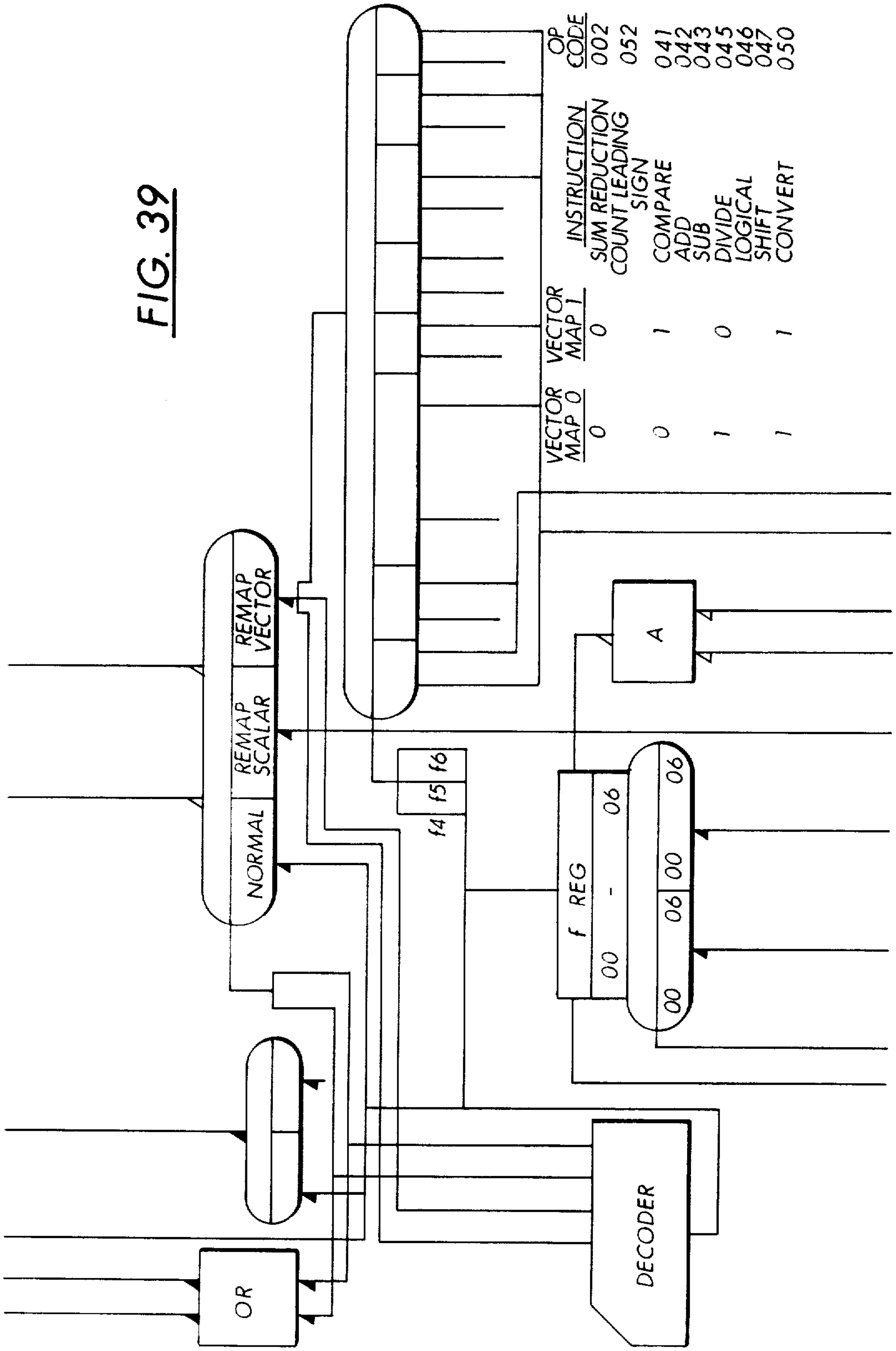
FIG. 39 illustrates a logical block diagram of the SP Control via the XRAM Map gate array.

Basically the XRAM 481 is divided into four sections as shown in FIG. 38. The upper two portions are used if it is desired to use remapped instructions. In other words we go into address 200 and above. If it is desired to use a directly mapped instruction the lower half of the XRAM is used. Directly mapped vector instructions occupy the bottom portion of the XRAM while Scalar instructions occupy the next quadrant. The third quadrant is the remapped vector instructions and there are nine instructions that are mapped and they utilize 58 locations in this quadrant. In the remapped Scalar instruction there are two instructions that are remapped, a move and move negative and all 64 locations are used. The XRAM map gate array is shown as a logic block diagram in FIG. 39.

FIG. 40 is a simplified block diagram showing pictorially the contents of a remapped memory containing the remapped Vector instructions, and FIG. 41 is a table showing the addresses of the remapped Vector instructions. These converted addresses are the result of the translation of the RAM addresses and the generation of the converted addresses by the XRAM Map Gate Array. The Map Gate Array, as previously noted, is shown as a logical block diagram in FIG. 39.

Now look at the interface timing signals illustrated in FIG. 42 between the IF and the Vector Processor Module.

These signals are represented as a timing diagram in FIG. 42. The clock cycles are the top line and they start at phase 1 of clock cycle 1. Each clock cycle has a phase 1 to a phase 4 and then another clock cycle is started on phase 1. One line from the bottom is the IFC VFO Register and it is loaded with the Vector Control word and the issue line is raised as denoted by the filled in square and the Vector Control section clocks it into the receive register if it is available. In other words if there is not a previous instruction being held in there for some reason, it responds immediately with the fact that it has received the instruction by sending back a VC IFC Instruction Receive Designator which is shown on the second line. Now the IF can issue instruction to the vector side at a 30 nanosecond rate, that is it can fill the pipeline at a 30 nanosecond rate. However, the VC can dispatch these control words at a 60 nanosecond rate. Within the IF there is a designator that detects when that interface becomes busy shown at line 3 of the FIG. 42 and keeps the VF0 from being clocked during a period of time until the VC has time to dispatch the control word that it currently has in its Vector Control instruction register. Another condition that can occur during instruction issue time is the entry into a VP issue wait condition. Consider that a vector instruction is issued to the vector side and some conditions are not valid or some values or parameters that are needed by that vector instruction to execute are not valid. If VF0 is available, the instruction will be clocked into VF0 and the IF will enter the VP issue wait condition. In other words, it will start its VP issue wait timing chain and that timing chain will remain running, holding that control word in VF0 until that condition is resolved and then the issue line is raised to the vector side issuing that instruction. Now if the next instruction is Scalar it will continue issuing instructions to the Scalar side, however, if the next instruction is a Vector instruction or a dual module instruction, of course, that instruction is going to be stopped in the NI register and held there until the VP issue wait condition is resolved in the VF0. The VP issue wait conditions will now be described.

As was noted before, a Vector Control word is held in VF0 until a condition is resolved and then the issue is raised to the Vector Processor Module. VP issue wait conditions are dependent upon the instruction type, vector instructions, for example, if the L count is not valid and they are using an Element Count (LCNT), or a Next Element count (NLCNT), then they will not issue. But it is possible to go into a VP issue wait condition if the F0 is available. Alt count is another case of a Reduction instruction in progress. If there is a Reduction instruction running in the machine and another instruction is available to be issued, then issuance of that Reduction instruction is held up until the first one finishes.

Generally speaking, then the validity of the various parameters in the machine are monitored so that the IF can quickly determine whether to issue the instruction or not.

Additional instruction issue control designators are the mask designators. There is a mask vector busy designator which says that the mask (MK) is being read by some vector instruction or that some pipe is using the mask. The IF sets this when it issues the vector instruction and the MK clears this designator when the pipe is finished with the mask. When a move instruction is issued that sources the mask, the mask is set through the source busy designator.

Figure 45:
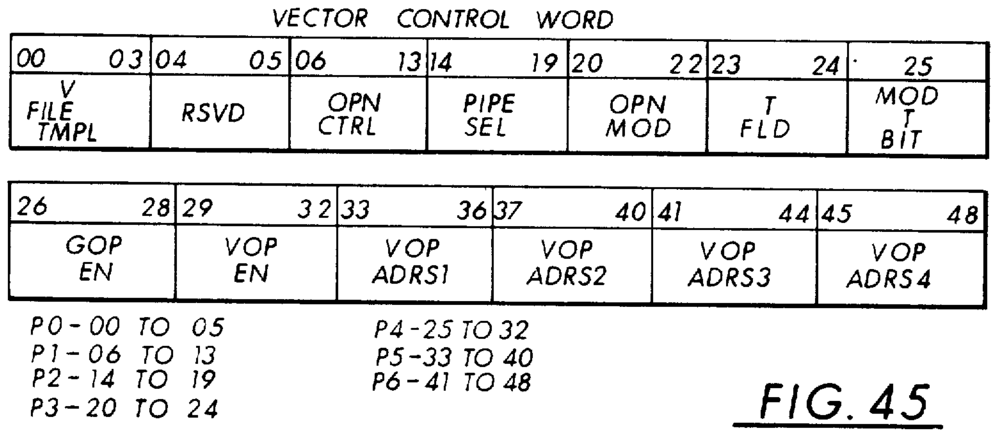
FIG. 45 is a pictorial diagram illustrating the format of a Vector Control Word.

Next, FIG. 45 is the format of the Vector Control word, There are bits 0 through 48 and we have 13 fields, 7 parity bits, and FIG. 45 shows the fields and which field the parity bit covers. First we will talk about the Vector File template. The Vector File template is in the translate RAM which leads directly out of the translate RAM and is carried along with the instruction. It is clocked into the VF0 register and issued to the Vector side. Now the Vector File template is used by Vector Control to determine if there is a time slot available on the Vector File wheel. Bits 4 and 5 are the two reserve bits RSVD. Next is the operation control field. This includes bits 6 through 13 and depending upon the pipe select field and whether it is a load or store or RR format, determines the use and the meaning of this field. Now if it is an add, a Multiplier or a Move Pipe it has a control store staring address. If it is a load pipe, bits 0 through 4 are not used, and bit 5 is only set by the Vector Control Module. Now if it is a Vector Load, bit 6 will be set and if it is an alternate Vector Load then bit 7 will be set. So this identifies the load operation. RR format bit 0 is set if it is a Scalar move, but if the RR format instruction requires a source element count or element pointer, then bit 1 is set. If it is a destination element pointer, bit 2 is set, while bit 3 is set if the source element is forced to zero. These bits are used in a move instruction.

The next field in the Vector Control word is the pipe select field which includes bits 14 through 19 of the Vector Control word format. This is a master bit field of 6 bits. Bit 0 of this field is set to select the Add Pipe and bit 1 is set to select the Multiply Pipe. The Move Pipe is select by setting bit 2, while bit 3 and bit 4 correspond to the Load Pipe and the Store Pipe, with bit 5, the RR format pipe. Next, refer to the three bit operations modifier field. A value of 0 in this field indicates an absence of modification in the instructions. A value of 1 is reserved and a value of 2 indicates that the instruction is a generate index vector.

The next field in the format of the Vector Control word is the 2 bit T field, bits 23 and 24. In this 2 bit field a binary integer 00 means a single precision operation integer 01 double precision; integer 10 a single precision floating point; and finally integer 11 indicates a double precision floating point operation. These bits come directly from bits 8 and 9 of the instruction for Vector instructions. If it is a Scalar instruction with an RR format for a dual module instruction, bit 23 is the source t bit and bit 24 is the destination t bit.

The next field is the modified t bit which is bit 25 of the Vector Control word. This defines to the pipe how the received element count should be treated i.e. whether as a double precision number of not. For example, a double precision vector multiply integer is treated as a single precision operation and the results produced are single precision . Next consider the G op enable bits 26 through 28 in the Vector Control. The setting of a G op enable bit specifies that the vector instruction has selected a G register. This is referred to as a broadcast G register. It is a group of Vector File elements. This group is either 32 or 64 elements depending on the operation of a single or double precision operation. The G op 1 enable bit specifies that op 1 is a G register which gets its add and its operand from an AG register. It gets its element counts from a G register.

Next, is the V op enable field which includes bits 29 through 32. This is a four bit field which provides an address which points to the Vector File.

Figure 44:
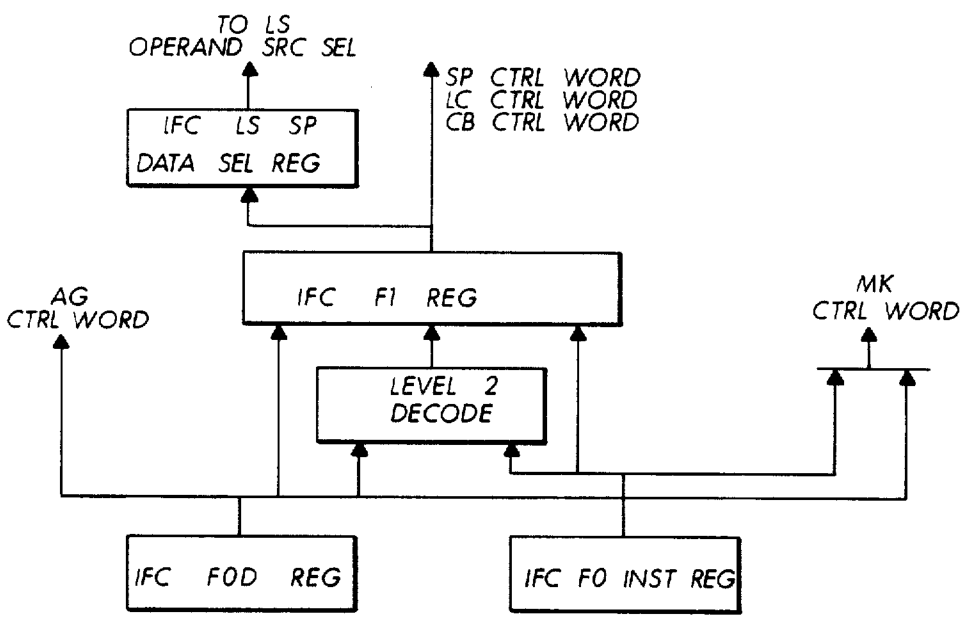
FIG. 44 is a logical block diagram showing the sequence necessary to accomplish a level 2 decode operation of the IFC control information.
Figure 46:
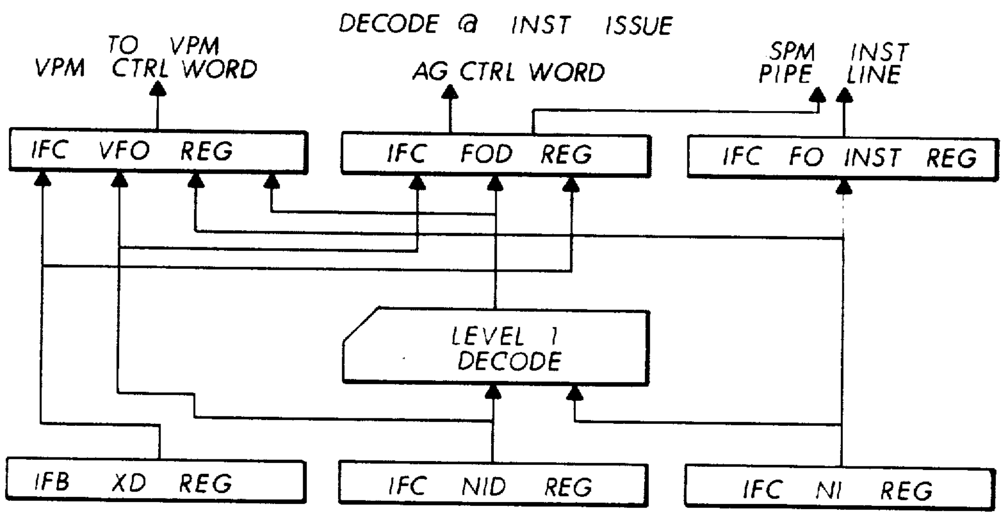
FIG. 46 is a logical block diagram of a level 1 decode operation at the issuance of an instruction.
Figure 47:
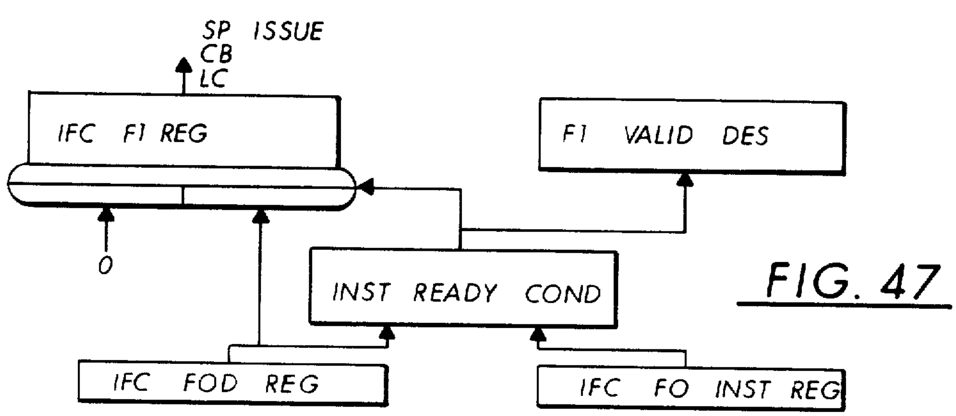
FIG. 47 is a logical block diagram illustrating instruction ready conditions in the IF section.

The Scalar instruction pipeline will be discussed next. As shown in FIG. 46 the Level 1 decoder goes into the IFC FO D register and that comes from the Next Instruction Decoder (NID) register and from the IFB XD register. From the IFC FO D register, the Address Generation control word information is issued. The only place that this is sent is to the Address Generation section of the SPM. The reason for this is to initiate operand fetches as quickly as possible because that is the longest time throughout the HPSU to read back an operand. Also requested is an address operation, so the AG section has to go through and translate the address if address translation is required. The next thing to be done at this level is to do a level 2 decode as shown in FIG. 44. At this point the control words are generated for the Scalar Processor logic section and for the Loop Control logic section and for the Control Block logic section. Also generated at the F1 time is the Local Store information or the operands source selection. Now this F1 register is a phase 3 latch, while the IFC LS SP data select register latch is a phase 4 latch.

Figure 43:
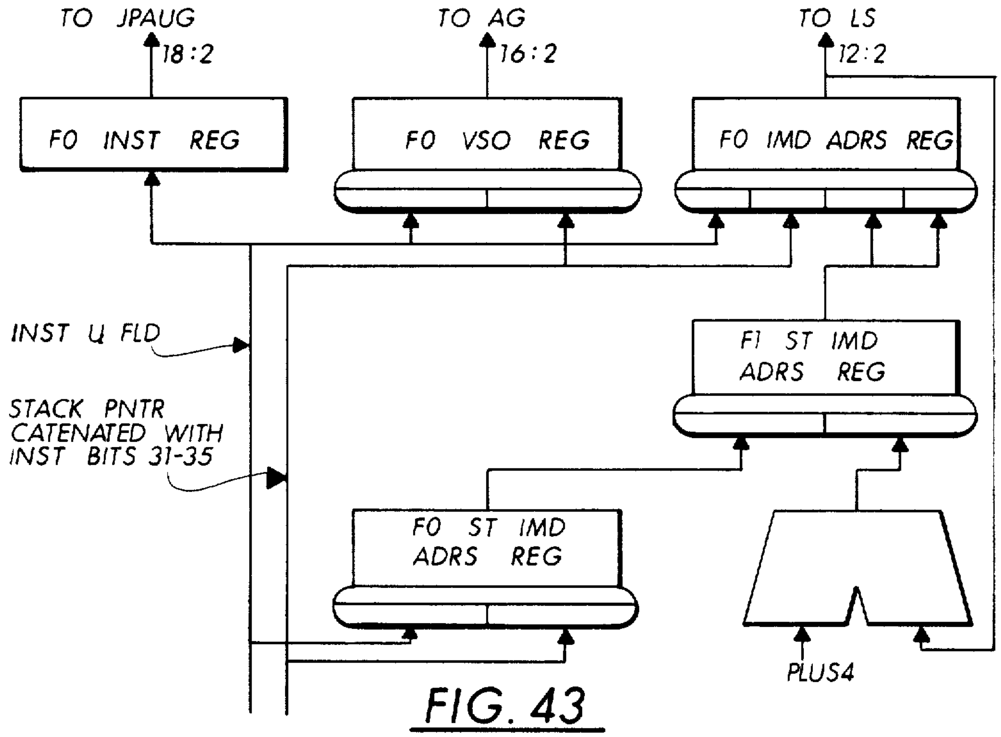
FIG. 43 is a logical block diagram illustrating the distribution of the addressing and offset information for jump instructions.

FIG. 43 illustrates the distribution of addressing information and offset information for jump instructions. The F0 instruction register is where bits 19 through 35 of the instructions are transferred to the jump augend which is in the IFA. A total of eighteen (18) bits are transferred with two bits of parity and that goes directly over to F4. That is considered in many cases to be the U field of the instruction. Now basically in the virtual segment offset (VS0) register 16 bits of information are captured and two bits of parity are transferred to the AG section with the virtual set and the offset. Depending upon whether the instruction is in the RS format and if B is equal to 0 through 14, the U field is then transferred. However, if it is an RS format and B is equal to 15, the stack pointer is taken to generate the virtual segment offset. Basically the stack pointer is 11 bits and this together with four bits of the instruction (bits 31 to 35) are used to generate the virtual segment offset. Also generated is the F0 immediate (IMD) address register and that is for the Local Store address. Note here that correct addressing is often referred to herein as immediate addressing. This information is held at S0 time for any store immediate instruction. Now this store immediate address is held in the F0 and when the store media transfers into F1, the F1 level of the instruction pipelines it. This address is then transferred in the F1 store immediate address register and finally the address is returned to the F0 address register and is then sent to the Local Store.

Address Generation control word will now be discussed. This control word is 22 bits in the FOD including its issue signal. The rest of AG control word, bits 22-32 is at the F2 level and it is 11 bits long. Now this information is R register update and invalidate information. Of course storage operations are initiated at the F0 level so the operand is returned to Scalar as quickly as possible. The first bit is the issue line which is a 30 nanosecond pulse that tells the AG that a valid control word is sent. Now, if the next bit is set it says that an instruction buffer miss has been detected and the IFC has issued all valid instructions of the pipeline. In other words, the pipeline has been flushed and the addressing section of IF has made a buffer miss request to the IFC. The IFC notes its presence and has no more valid instructions. From this it knows that there is a buffer miss available. The IFA then starts the buffer miss by getting the address ready for the AG. It is now time to do the miss request. The IFC then issues to the AG when the instruction page miss request bit is set in the control word. Bit 9, which is the generate address bit is also set.

The next bit is the AST load. Now the Activity Segment Table in the AG contains the information necessary to translate virtual addresses into real addresses. This bit is really used at acceleration time. Thus, it is used when an acceleration signal loads the AST table into the AG. In other words, at acceleration time the LS is brought in and placed in the AST table. Now the AST table has 32 inquiries and it is four words per inquiry. The load break point bit is set when it is desired to load the Break Pointer Register in the AG. In this way, the AG takes a virtual address and translates it into a real address. It then puts that real address into the Break Point Register, so that an operand break point operation may be done. Bit four of the AG control word is a bit that indicates that this is an accelerate or a decelerate instruction. There are six (6) instructions that have been defined and are used in the macro code for acceleration and deceleration, and this bit will be up for each one of those instructions. Bit 6 will be set for any store instruction and that includes any Vector or Scalar store instruction. The next bit is the multi request bit and it is set for Vector format instructions or for load or store G multiples or loader store Loop Control. Single requests are Scalar requests for a load G or store G. External immediate address, bit 08, says that it is an RS format with B equal to 0 or 15 and the address is greater than 4096. This is the external Local Store segment which is in the HPSU. The generate address bit 9 is set at any time that it is necessary to generate a real address from a virtual address. When the U field offset bit 10 is set, it specifies that there is a U field offset that must be added to the real address when it is generated. The mailbox address, bit 11, for acceleration/deceleration purposes selects a mail box address so that the mail box may be addressed when the machine is being accelerated or decelerated. The last R (real) address bit 12 is again used for acceleration/deceleration and it is used to denote a continue operation. This is used when a Local Store operation is being stripped as in a Vector operation. It orders the use of a G register with a last address that was stored in the address register rather than the given starting address. Bit 13 is a t bit from the instruction that indicates whether it is single or double precision operation. The next bit is the J bit or the set and clear bit. The operation modifier field includes bits 15–17 which together provide 8 codes. If the code is 000 it is normal; if it is 001 it is an index, a 010 (2) is an alternate, if an 011 (3) it is never used, if a 100 (4) then it is a Vector Store broadcast operation, where a G register is taken and written as a number of element counts into the HPSU. If it is a multiple operation, a load is indicated by the code 101 or store a G multiple or load a store Loop Control. A 110 code is a 6 and it is a test or set instruction and if it is a 111 a diagnose read or store instruction is specified.

The next four bits are bits 18–21 and tey are the real address registers which are shadows of the t registers. Now if a G register, which has a virtual address in it, has been once translated then the information is stored away and the real address register and a real address register bit is set indicating that this is a valid real address. Each time a request is made to an AG, the real address is taken out of the control word and the real address register is checked to see if it is valid. If it is, it says that it is not necessary to search through the AST until the virtual address is resolved. This speeds up the performance of the machine. Bit 22 comes from the F2 register level and it says that an R register should be invalidated and the address is contained in bits 23 through 26. So the R register update enable bit will be set and whether an add or a subtraction is made to it, that bit will be set and then the update address will be in bits 29 through 32, and that is how the R register is controlled in the Address Generation section.

Figure 48:
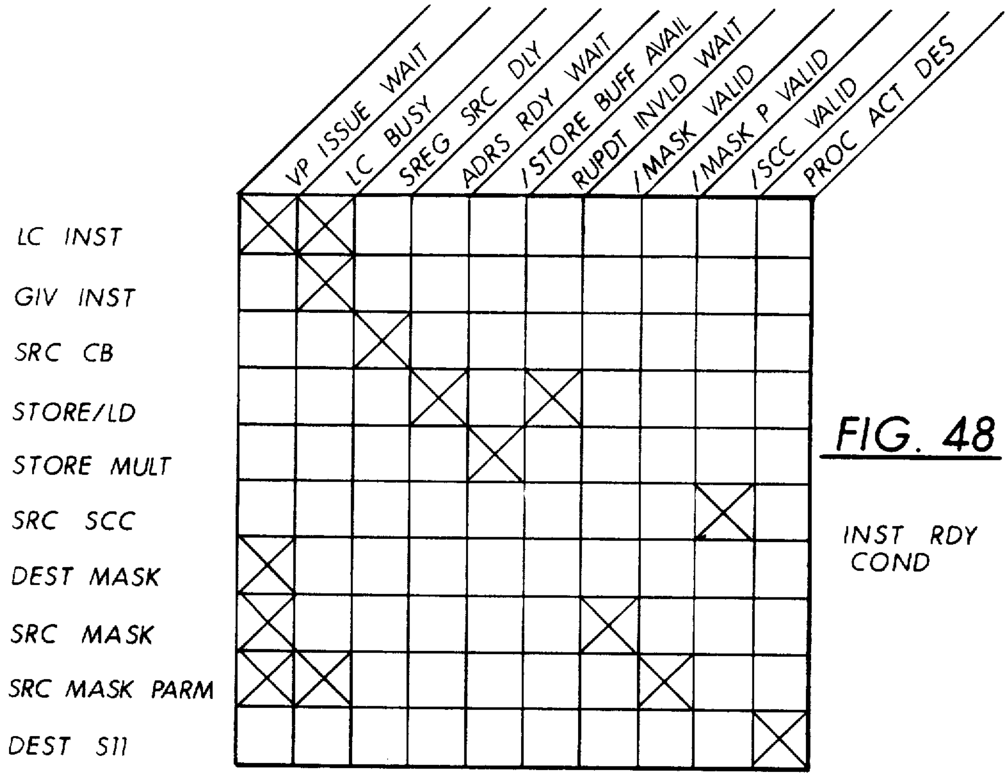
FIG. 48 is a table corresponding to the FIG. 47 which indicates in tabular form the instruction ready conditions.

Next, consider FIG. 48 which is a table illustrating instruction ready conditions in the IF section. They will hold the instruction in F0 and will not allow it to go into F1 or the control word. First a word about the control word instruction. They are actually interchangable at this point in the instruction pipeline of the SPM. If there is a Loop Control instruction or if the LC is busy and we are in a VP issue wait, this will keep the instruction ready condition from coming up. These conditions are marked as crosses in the table of FIG. 48. In other words, the LC is currently executing an instruction that has just been issued to it, and the LC busy timing chain in the IF is running. The next control word cannot be dispatched to the LC until the LC is no longer busy. The next instruction noted in the table is the GIV instruction. If LC is busy, the GIV instruction requires a link parameter. So it is assumed that the length is being changed from the GIV and it is held in the F0 instruction until the LC becomes available and then the instruction is allowed to be clocked into the F1 register and F1 becomes valid at that point. With the Source (SRC) CB, instruction we have what is called an S register source delay. If we have just destinated an S register in the CB we cannot immediately source any of the S registers in CB for one full cycle. This is due to an address conflict. The address ready wait signal is a one that comes back from the AG. It tells us that the address has been resolved. In other words, an address was translated during address translation, so issue is delayed or the instruction is held from going into the F1, until the address translation has occurred. The next conflict is an R register update and invalidates wait. These are the R registers in the address generation that are copies of the G register in the SP. If there is an invalidate or update going on the instruction cannot be allowed to become valid until the update and invalidate are finished. The next instruction is the store multiples, in other words, the store Loop Control or store G multiples. The store buffer must be available before these instructions can proceed into the F1. They could be held up by the store vector that is actually occupying the store buffer and they must wait until that store vector has finished before they can actually be involved in the store Loop Control or in the storing of the multiples to proceed. The next instruction is one that sources the Scalar condition code. In the IF there is a single designator that tells us whether these code bits are valid or not. These bit designators clear when an instruction is issued that is destinating the Scalar condition codes. It is set when the information is written into the Scalar condition code bits. It then sets the SCC valid designator in IF. When the source mask parameters are used as a source, there are cases where the length is needed in order to determine these source mask parameters and also to determine if the mask parameters are valid. The last instruction is the destinate SII or a move designator 11. If the processor is active it is not possible to destinate SII and this is the mask register for internal interrupts which places the machine into a slow or a fast mode. So once a move is made to SII the instruction waits until the processor is available and then the instruction proceeds.

Next, the contents of the Scalar Processor control word will be reviewed. The first bit or signal in the Scalar Processor control word is the issue line. This bit is set to indicate that a valid control word for the SP is in F1. The next bit is the RR format bit and this specifies that there is an RR format instruction in F1. The integer addend group bit specifies that the instruction has logical compare shift addend integers, subtract integers or divide integers, and since it is an instruction for the integer ALU it requires two operands. The next bit (3) is a floating addend group and it has the same meaning as the integer addend group except that it means that there are two operands required for the multiply, the add floating point, the subtract floating point, or the divide floating point. The next 18 bits (4–21) are instruction select bits. They are the master bitted field of the instruction that is actually being executed for the SP. In other words it is an add, a subtract, a multiply or a divide instruction. The next bit (22) is the test bit, and this specifies that a test instruction is destinating the scalar condition code bits. Bit 23 is the multiple instruction. The bit 24 is a conditional jump bit and it indicates that an initial jump instruction is being executed. Bit 25 is the R update enable, it specifies that when the operand is retrieved an integer add or an integer subtract must be also transmitted to the Address Generation section so it can update its own R register. The next three bits (26–28) comprise the t bit field of the instruction and they identify the instruction type that is being executed for the instruction. The next two bits are bits 29 and 30 and they comprise the convert 3 field or the J bits for the GIV instruction. They identify the destination T field. Bit 31 identifies that it is a move negative, in other words, we are going to negate the sources operand in the move instruction. Bit 32 is the V to V transfer bit where S1 equals 7. The next group of bits comprise bits 33–35. This is a field of result bits. This field identifies where the results from the SP are going and they are sent. The next field comprises five bits 36–40). It is the operand wait field. It is a master bit field, and it describes the results of this group as well as their destinations. The next field includes bits 41–43 and is the jump select field. It is a C field conditional jump and it is forced to a code of 6 for an IJL increment or for a DJG decrement. This C field sets up the jump detect gate arrays in the integer ALU section or the SP section and it specifies the condition that is being tested for on the conditional jump. Now the bit 44 is a C field of conditional jump equal to 7. Bit 45 specifies that there is a G register that is required for address translation and must be read out in the G register stack and then sent over to the Address Generation section. The next four bits 46–49 comprise the G register address and these bits come out of the F0 level so if there is an address generation request to the G register stack, it takes priority over any operand request to the stack.

The next field is a 2 bit master bit field. It indicates the destination when the G register is being read. Bit 52 is the G1 address valid bit and it states that there is a G register address for op 1 that is valid. The next four bits (53–56) are the actual G register address for the operand. Bit 57 is the G2 address valid bit. The same applies for the next four bits 58–61. These are the addresses of the G register containing operand 2 for that operation. Bits 62 and 63 are the write and the lower G register enable. Bit 62 is the write enable bit for the upper 36 bits of the G register and bit 63 is the lower enable for the lower 36 bits of the G register. The final four bits (64–67) are the addresses of the G register. This is the destination G register where the results are being written which results specify whether we want to write in the upper half or the lower half or both halves of the register simultaneously.

The next control word that will be discussed is the Control Block control word. As usual bit 1 is the issue line which says that there is a valid control word in F1 for a Control Block. Bit 2 is the enable scalar condition code designator. It enables scalar condition code bit and when this bit is active we are writing the scalar condition code for the compare instruction. The bit (2) says that a diagnose instruction is being executed. Bit 3 is the load address and jump bit. This bit is set for a load word address of jump instruction. The JSX bit 4 is next. This is the jump external segment instruction. Bit 5 is the GI macro instruction. Bit 6 is the LS pointer bit and it is set for an advance or retract local store. Whether an advance or a retraction operation is determined by the modifier bit, bit 7. Next is bit 8, which is the decode of the B field in the RS format instruction. It says that the B field is equal to 0. The bit 9 is the source enable bit. This specifies that a CB register has been selected as a source by the move instruction or the macro store. Keep in mind that the macro store has a special acceleration/deceleration instruction used in the macro code. Now the source select field comprises the next four bits (10–13). It specifies the register that is being sourced within the selected register set. Bit 14 is in the destinate enable bit. This specifies that a Control Block register has been selected as the destination for a move or macro load. The destinate select bits 15–18 select the register that is to be written. It is a four bit field. Bits 19–21 comprise the register set select field. It specifies the set of registers that are being destinated or sourced and a value of 0 in this field says that the S registers are being selected.

The next field includes bits 22–24 and is a conditional jump C field. This is a C field out of the conditional jump instruction. It specifies the conditions that are needed to test the operand during a conditional jump. The interrupt control lines are shown by bits 25, 26. These are again used for acceleration/deceleration operations. The final 27 bit is a mask move bit. The Control Block data out register selects data from the Mask Processor when this signal is active.

The next control word to be considered is the Loop Control word, or control word LC. Again the issue line is bit 0. It says that there is a valid control word in F1 for Loop Control. The first bit is the Begin Vector Loop instruction, a BVL. Next is the adjust loop pointer, it says that a jump loop register pointer instruction is being executed. The t bit is bit 3 and that is the least significant bit of the t field from the instruction. The E field is next and it includes bits 4–6. It selects the VL register entered by the BVL. It also selects the VL register for the adjust loop register pointer instruction and selects the EL register for entry by the BEL. This field also sets the current element register for the adjust loop register pointer instruction. The P field follows and includes bits 7 and 8. It is used by the loop control jump instructions JVL, BEL, or JEL and identifies the particular loop control jump that is being executed at that time. All loop control jumps are under one op code and this field specifies the selected loop control jump. It also specifies the type of adjust loop register pointer. Bit 9 is the store bit. It indicates that a store loop control instruction is being executed. Bit 10 is the load bit, or load instruction and it says that a load loop control is being executed. Next is the move source enable bit 11. It indicates that the LC has been selected for a bimove instruction as a source add the next two bits down select the value to be read from the Loop Control. If the move source field of bits 12, 13 depict a 0, the L field, the length parameter value, selected by the L field of the move instruction is being sourced. If the move source is a 1 then the strip side is being selected. A two says that the MEC value is being selected, while a three says that the element point value is being selected. Bit 14 of the Loop Control word is the move destinate enable bit. This bit is active or set when a loop control is destinated with a move instruction. Bit 15 specifies the register to be written and also whether a write operation is to be executed. Bit 16 is a Loop Control jump bit. It specifies whether or not a loop control jump instruction is executed. This specific jump instruction is specified by the P field. The last two bits, 17, 18 are the length field. It specifies the length parameter that is being selected, whether the element count is 0; 1 is the next element count NCNT, while 2 is ALT 1 and 3 is ALT 2 count.

To summerize these control words, the operation and the instruction pipeline has been optimized to keep the SP sections filled with instructions. This is the key that should be kept in mind. If the control word is dispatched to the SP section, then the go instruction from the SP section dispatches the next control word, if the bit F1 is valid.

Figure 49:
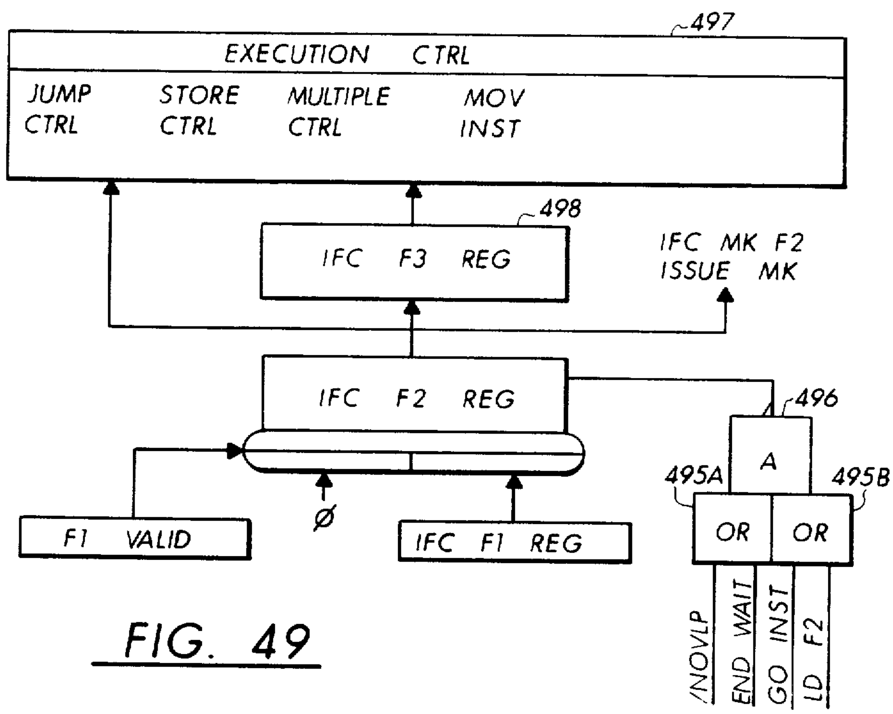
FIG. 49 is a logical block diagram illustrating the operation of the F2 register; which F2 register is present in each section of the machine.

Next consider the operation of the F2 register as illustrated in FIG. 49. Each section of the machine has an F2 register, even the IF section has an F2 register and basically it is the F2 register of the IF that is to be discussed. Notice the plurality of OR gates 495*a* and 495*b* and the AND gate 496. These gates provide the enable for the F2 register. The selector address enters the left side of the F2 register and indicates that F1 is valid. Now when F1 is valid, the F1 register is read, however, if F1 is not valid then the inactive state of the signal prevails. Refer again to the enable signal where there is a GO instruction OR'ed with an F2 input signal. Either of these signals are AND'ed with either a NOVLP (no overlap) or OR'ed with an End Wait signal. Various combinations of these input signals are used to load the F2 Register. Now when a nonoverlapped instruction (NOVLP) gets into the machine, it occupies the instruction pipeline totally all the way from F0 to F1 clear into F2. When that nonoverlapped instruction is completed the F2 register is purged, F1 is now invalid and zeros are selected for the locations. When Load F2 returns together with an End Wait condition or a nonoverlapped instruction F2 is again purged. Actually what is happening is that F2 is being cleared out at the same time that F0 is being loaded with the same instruction.

The Execution Control section 497 of the IF section is shown at the top of FIG. 49. Included therein are the jump controls, the store controls, the store instruction controls, and the multiple instructions. In other words the load G multiple, the storaging multiple, the load loop control and the move instructions. These are all nonoverlapped instructions. The IF section also has an F3 register 498 to complete the execution of nonoverlapped instructions.

Consider finally instruction pipeline sequencing. Now there are 5 timing chains that control the sequencing of the instruction pipeline. There is also a next instruction timing chain which runs unless the F0 wait timing chain is running. In other words, the F0 wait starts and the next instruction timing chain is shut down.

Figure 50:
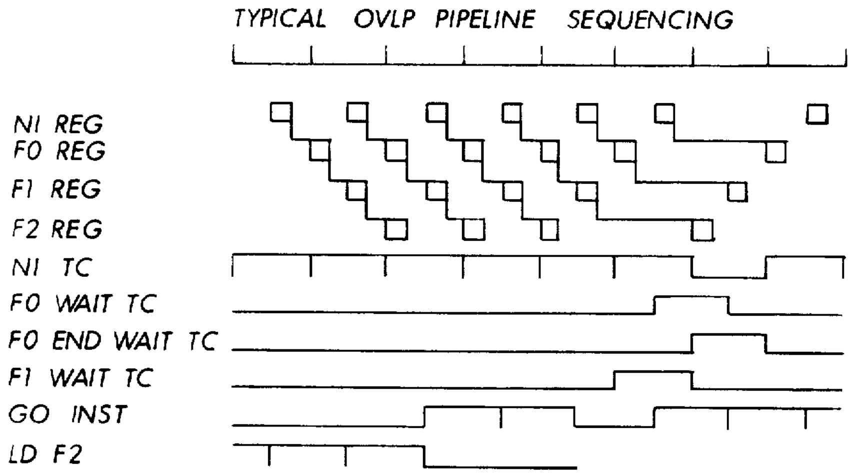
FIG. 50 is a timing diagram showing the sequencing of a typical pipeline for overlapped instruction.

FIG. 50 illustrates a typical sequencing timing diagram of a pipeline for overlapped instructions. Notice that the NI register is continually loading until all of a sudden the pipeline stops for a cycle. The same sequence occurs with F0, F1, or F2 also notice that the NI timing chain is running all of this time and when this condition occurs, this causes F1 to wait. In other words, a GO instruction has not returned. Remember that an F1 timing chain will fire if F1 is valid and when F1 is valid the F1 timing chain is fired. This, in turn, will cause the F0 wait timing chain to fire and when this wait condition is terminated then the F0 end terminates the F0 wait timing chain and instructions continue. Notice also that the GO instruction returned. Also notice that earlier in the sequence, a plurality of load F2 instructions occurred to cause a number of issue signals to be sent to the SP. The SP returns a GO instruction by keeping the pipeline full of instructions.

Figure 51:
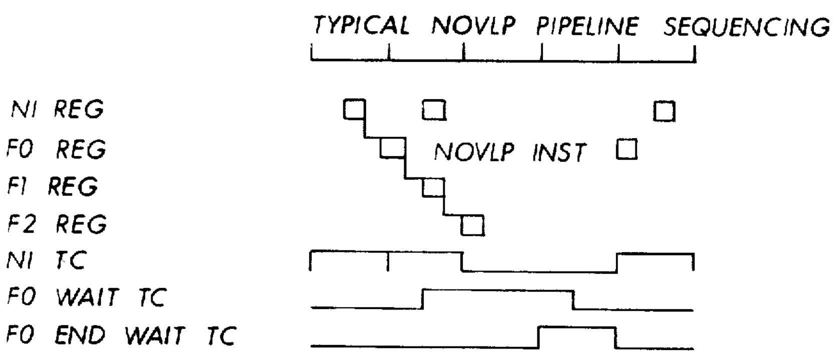
FIG. 51 is a timing diagram of a typical non overlap pipeline sequence.

Finally consider FIG. 51 which is a typical nonoverlap pipeline sequence timing diagram. Typically the move instruction or jump instruction takes 90 nanoseconds and once a nonoverlapped instruction gets into the F0 then it occupies the instruction pipeline for the duration of the instruction. So this is a nonoverlapped instruction in the NI register and it finally gets issued to the SP SPM and it moves on into F1 and F2. Of course, it next moves to the pipeline based on the previous instruction. This, of course, is for a best case i.e. where there is no delay through the pipeline. Finally, it arrives at F2 where the execution of the instruction is completed. It is important to remember that the F0 register when it is in the nonoverlap condition of the following phase 3, the F0 wait timing chain will be fired and the F0 wait timing chain remains running for the duration of that nonoverlapped instruction or until it is terminated with the F0 wait signal. When this fires, then the F0 wait timing chain ceases and the NI timing chain starts running on to the next cycle while the F0 register is loaded with the next valid instruction. This is the typical sequencing of a nonoverlapped instruction in the pipeline.

b. Address Generation

Figure 52:
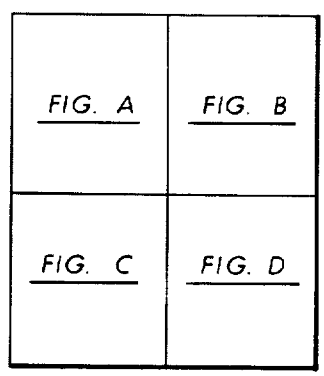
FIG. 52A, FIG. 52B, FIG. 52C and FIG. 52D, when arranged as in FIG. 52, is a detailed logical block diagram of the Address Generation section of the SPM.
Figure 52A:
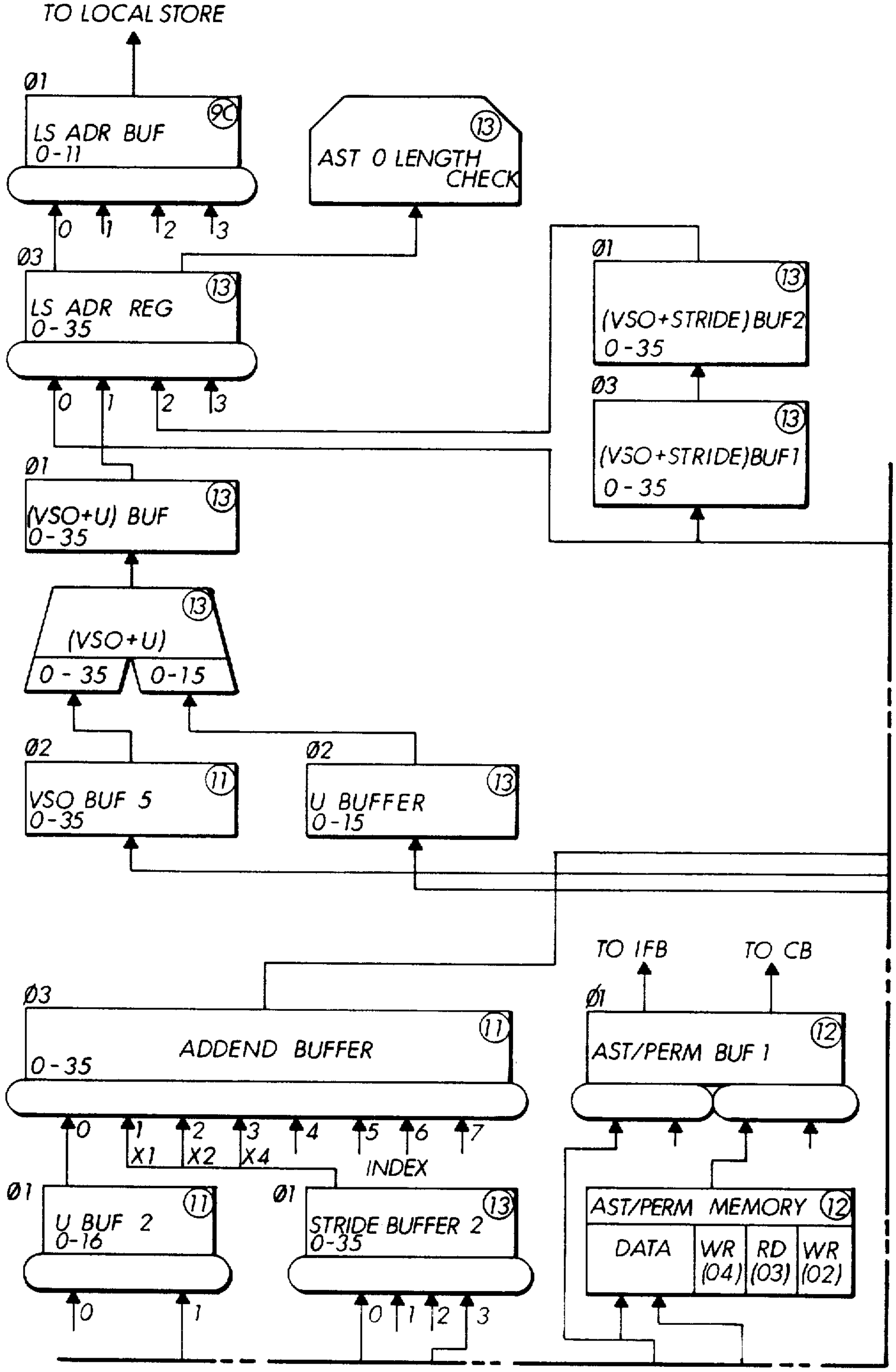
Figure 52B:
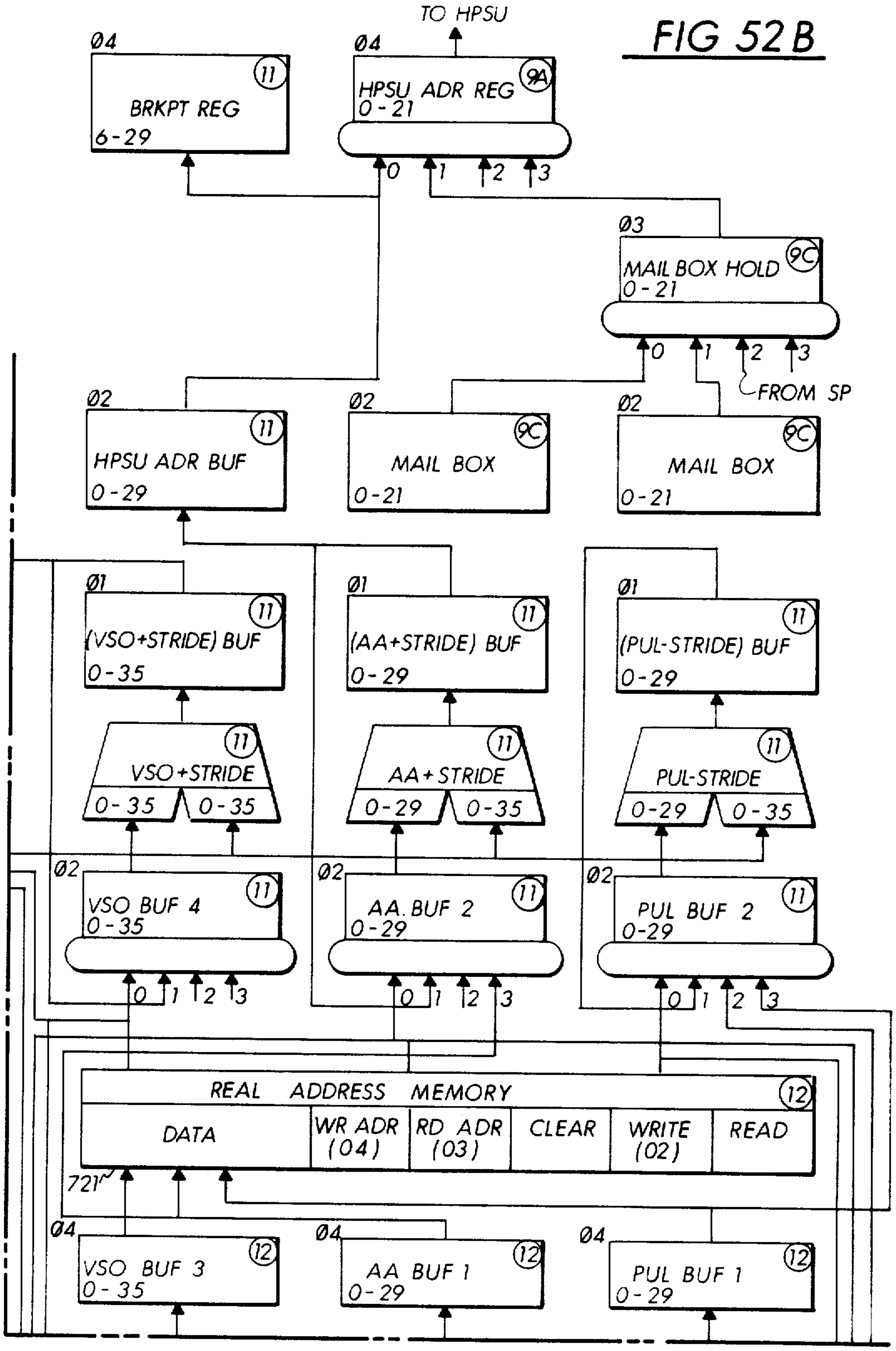
Figure 52C:
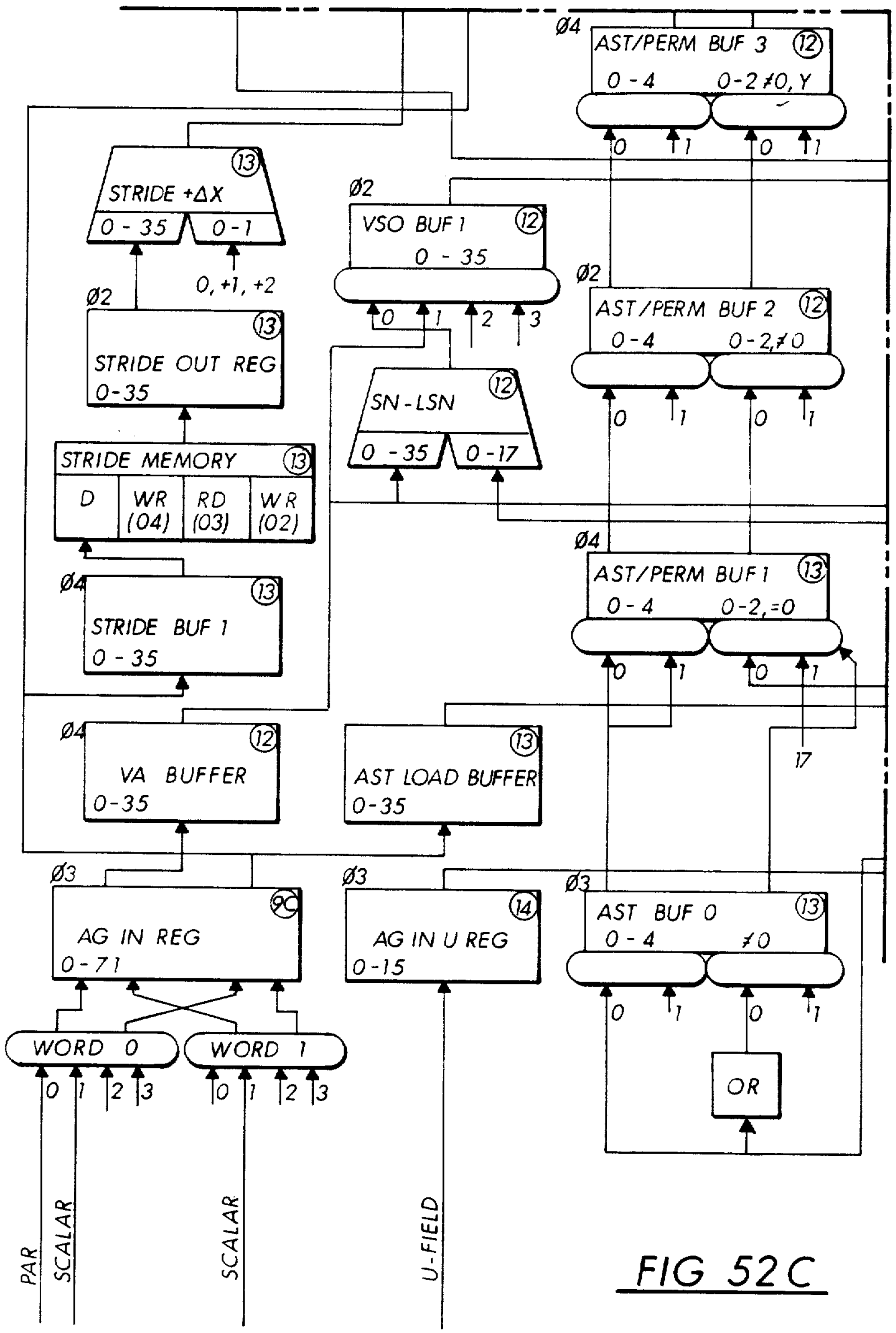
Figure 52D:
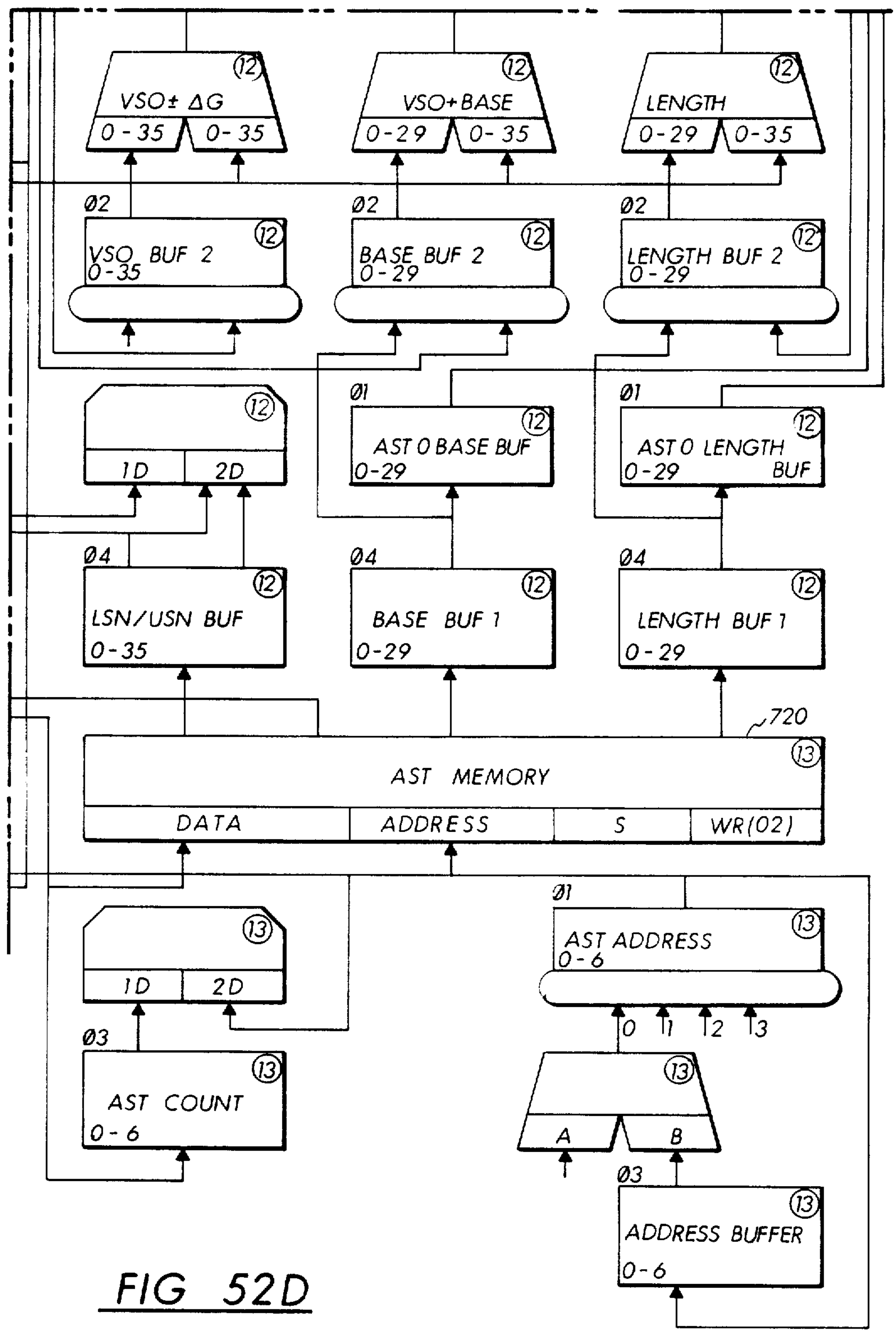

A major portion in any discussion of address generation is translation. The relationship between the two is illustrated in FIG. 52A through 52D, when arranged as in FIG. 52.

Figure 53:
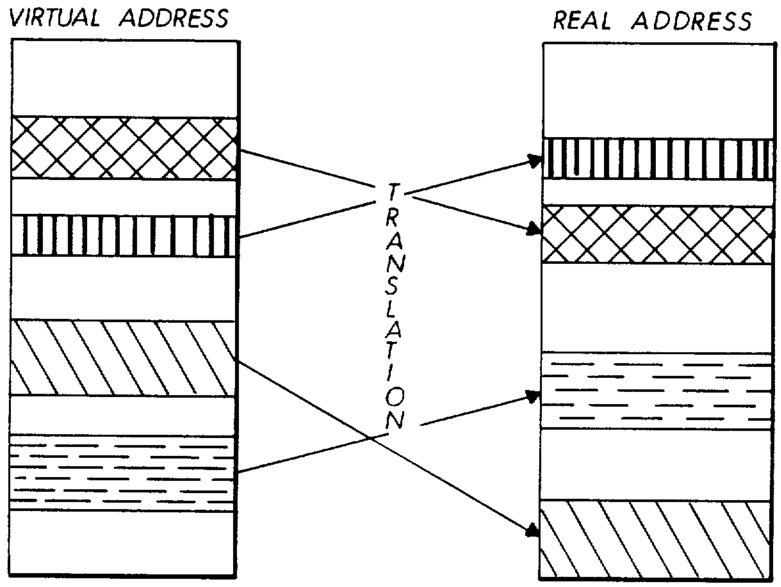
FIG. 53 is a pictorial block diagram illustrating the translation of a virtual address to a real address in the HPSU.
Figure 54:
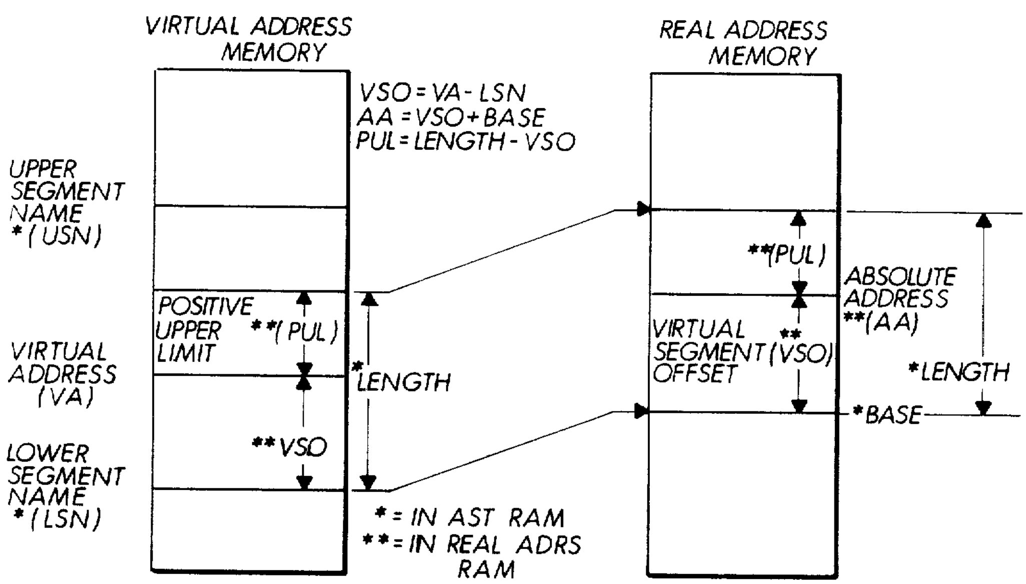
FIG. 54 is another more detailed pictorial block diagram illustrating more specifically how the translation between virtual address and real address is accomplished.

The subject of translation starts with a plan to take a virtual address, which is any address covered by the machine, and translate it into a real address which is within the range of the HPSU. As shown in FIG. 53 each block of virtual addresses translates into a specific block of the same size of real addresses. FIG. 54 is another more detailed illustration of how the translation between virtual addresses and real addresses is accomplished. The Virtual Address block consists of a Lower Segment Name (LSN), or lower limit, and Upper Segment Name (USN),or upper limit. From the virtual address that is given, an offset (VSO) is calculated. This is a distance from the lower limit to the virtual address. Also given is a length, and from the virtual address, the lower limit and the length, a Positive Upper Limit (PUL) may be calculated. This is the distance (PUL) remaining in the segment. All of this may then be translated into the base absolute address and the upper limit in the real address. The Lower Segment Name, the Upper Segment Name and the Length are stored in an Activity Segment Table (AST).

Figure 55:
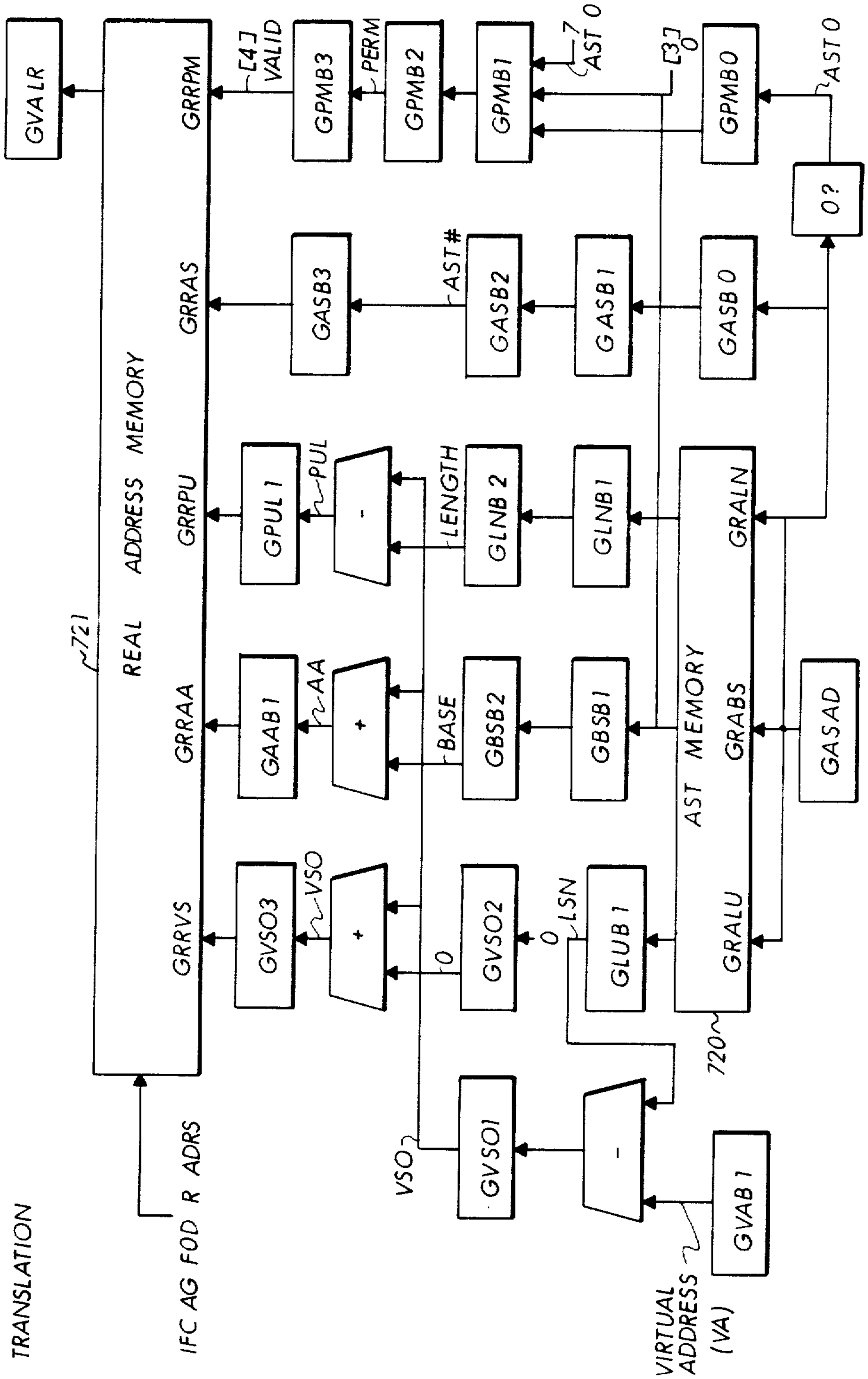
FIG. 55 is a logical block diagram showing how the address translation is logically accomplished via the loading of the AST memory.

FIG. 55 is a logical block diagram showing how the address translation is accomplished via loading the AST memory 720. To accomplish a translation, first the AST Memory 720 has to be loaded. This is done by an acceleration operation which will be discussed in detail later. Once this AST Memory 721 is loaded, a virtual address is brought in, and a translation is done. To do this, we first come up with an Absolute Address, an Offset and a Positive Upper Limit to store in the Real Address Memory 721.

Figure 56:
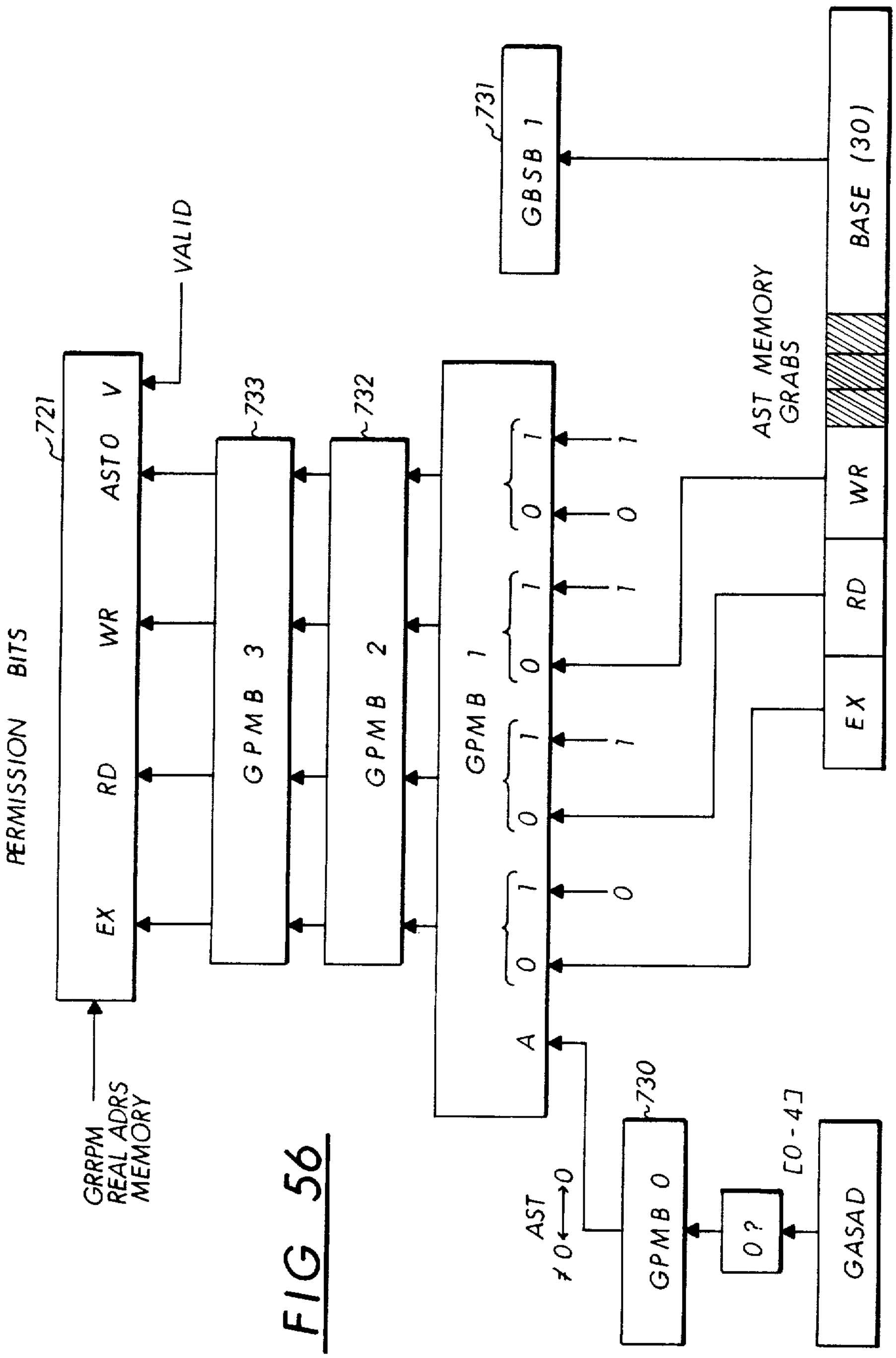
FIG. 56 is a logical block diagram showing the creation of the permission bits in the various register levels between the AST memory and the real address memory.
Figure 57:
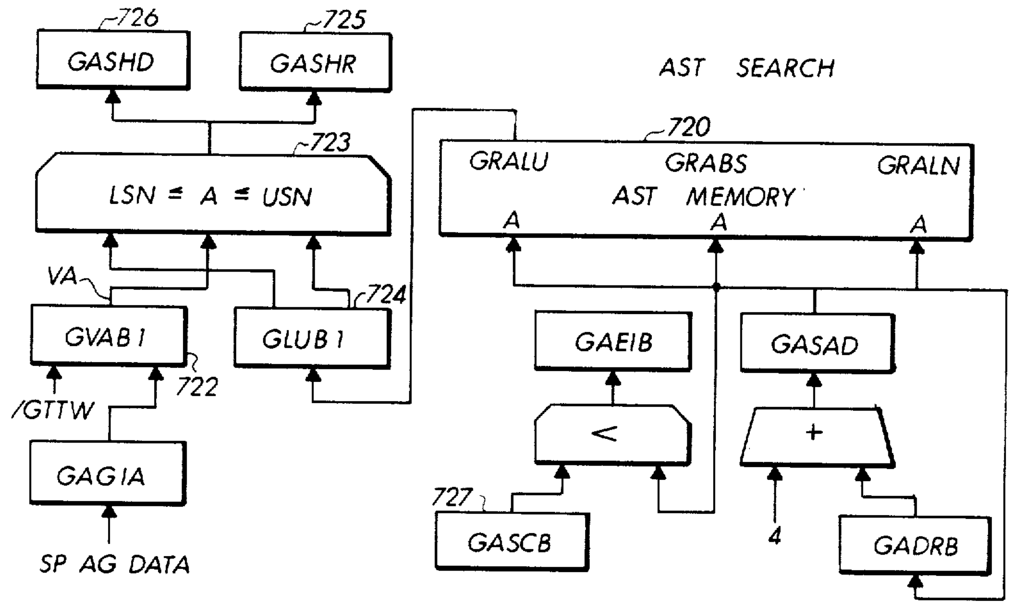
FIG. 57 is a logical block diagram showing the logical path required to accomplish an AST search.
Figure 58:
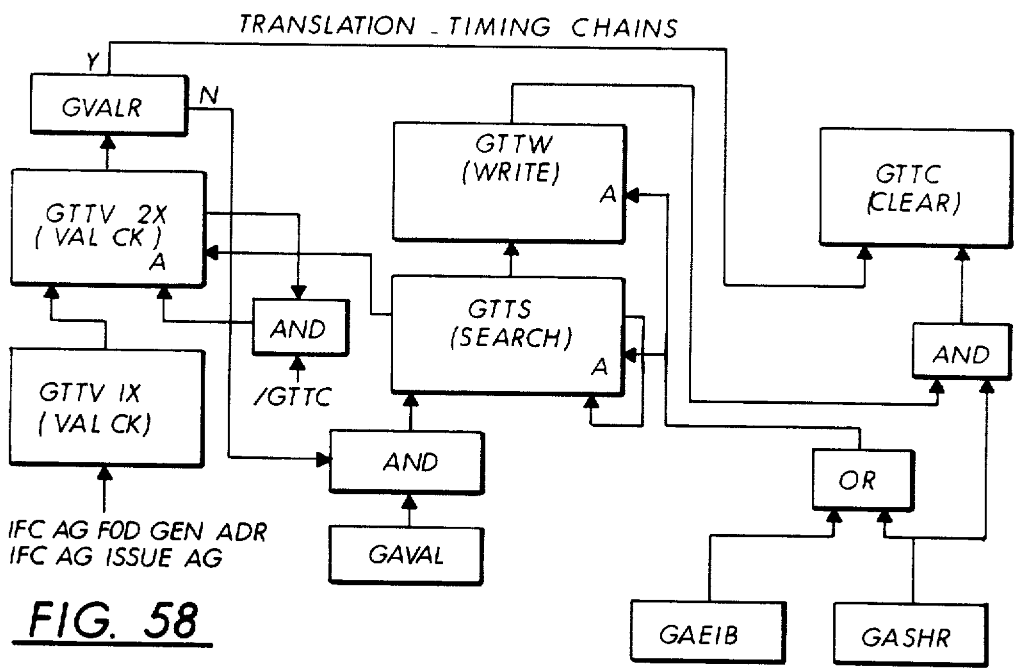
FIG. 58 is a logical block diagram illustrating the translation validity timing chain.
Figure 59:
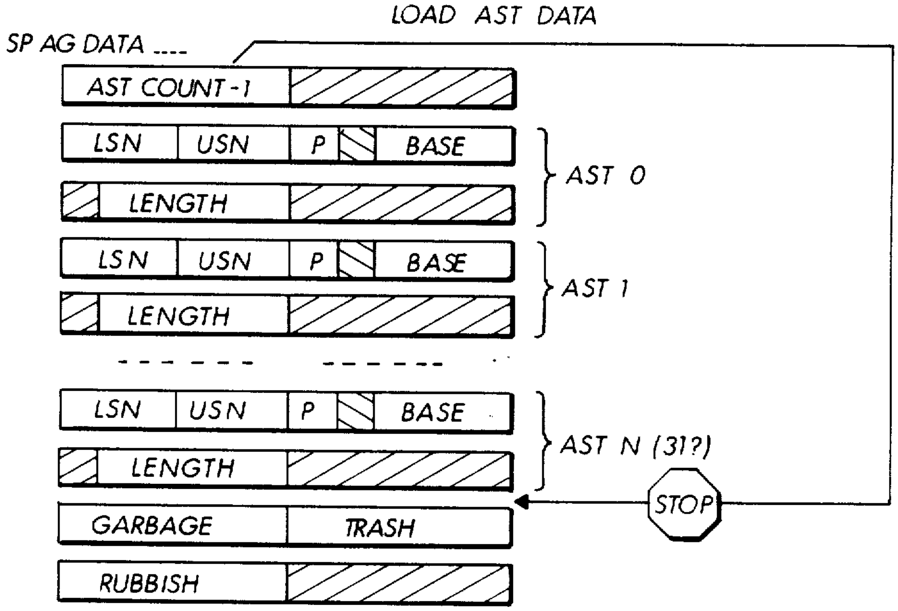
FIG. 59 pictorially illustrates the loading of the Activity Segment Table.
Figure 60:
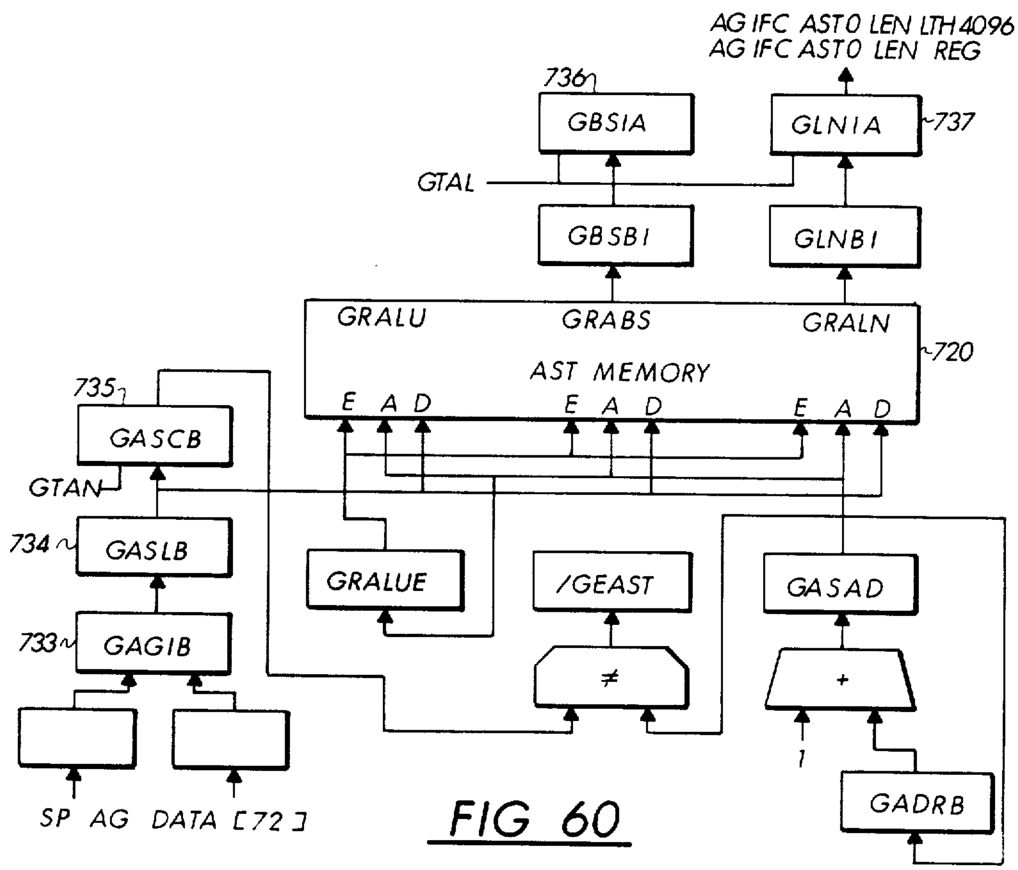
FIG. 60 is a block diagram showing how the loading of the AST is logically accomplished.

FIG. 56 illustrates creation of permission bits. The first thing that is done on a translation operation is to read the Permission (PERM) bits shown in FIG. 56. Next, we check to see whether the R-Register is valid. A particular R Register is pointed at in the Real Address Memory in order to read out the Valid bit. If it is valid, this indicates that the address has already been translated and the information in the Real Address Memory is good and we can go on from there. However, if R is not valid, we have to do an AST search. To do this we have to search the AST memory and look for an entry that corresponds to the incoming address. This is shown in FIG. 57. The virtual address arrives and is stored in the input register of the Address Generation (AG) section. From there to the virtual address buffer one 722 and then applied to a compare circuit 723. The AST counter starts with a ST zero and counts through the AST memory 720 reading both the lower and upper limits of each AST entry that is applied to the lower and upper buffer one register 724. The lower limit is compared with the virtual address and with the upper limit. Eventually it is expected that an address or a lower and upper limit will be forced so that the address is between them. When that happens the proper AST segment has been found and the AST hit register 725 and the AST hit delay registers 726 will be set. If an ST hit is not found, that is, if lower and upper limits for this particular address are not found, the AST number will eventually exceed the AST count which is stored in a count buffer 727. When that happens we will get an interrupt which will stop the AST and send an error message back to the other sections. This counter is also used for loading the AST memory where each of the three sections are loaded separately. So when the AST memory is being read we are not using the lower two bits of the counter. This is the reason that the counter adds four each time it goes through the cycle. Once we have the AST entry, assuming that one has been found, the AST address goes to AST buffer zero. The bits that have been used for the address are also checked to determine if they are zero. If they are, a bit is set in permission bit buffer zero 730 (FIG. 56) indicating whether or not it is AST zero. Next, the virtual address is applied to an adder with the complement of the lower segment limit and subtracted. This gives us the virtual segment offset. This indicates how far above it is to the virtual address from the lower segment. The virtual segment offset is then applied to three adders. By passing through virtual segment offset buffer two, we wind up with a virtual segment offset. Next, the base address arrives from AST memory. Base buffer one 731 (FIG. 56) and two are added to the virtual segment offset to give us the absolute address. The length signal passes through the length buffers one and two where the virtual segment offset is subtracted from the length giving us the remaining distance in the segment. This defines the positive upper limit that goes to the positive upper limit buffer one. These three pieces of data are stored in a real address memory at the selected R register address. The AST number goes through AST buffer one, two and three and finally enters the AST entry of the real address memory. The permission bits are actually stored with the base address. Those three bits, the execute permission bit, the read permission bit and the write permission bit enter the permission-in buffer one and on through the permission bits to the real address memory 721. If, in fact, AST zero is chosen, the read and write permission bits are set to one to execute permission to zero because we cannot execute from the AST zero. Thereafter, the AST zero bit is set to a one and those bits enter and are stored as permission bits. In addition, when a translation is done a valid bit is stored that indicates that the entry is valid when a later translation is attempted on the same R register. Consider again the permission bits shown in FIG. 56. There is the execute bit, the read bit and the write bit, these are the permission bits. They go to permission buffer one address input zero and along with a zero it indicates that this bit is an AST zero entry. This is so whether we are going to local store or not. When the permission bits are read from the AST memory, the AST address is checked for zero. If it is present it shifts the address select of the permission buffer one from input zero to input one. In any case whatever bits are selected as permission bits, go through the permission bit buffer two 732 and permission bit buffer three 733 and into the real address memory 721 permission bits along with the valid bit. From the IF AG there is a generate address bit and an issue AG bit. This starts the translation validity check timing chain, shown in FIG. 58, which starts a second cycle of the same timing chain. At this point a looping operation is started. Next, a validity check is made to find out if the contents of the R register are, in effect, valid. If they are, a translation will not be done, rather, the translation clear timing chain is started and if that timing chain does not break the loop, the validity check is continued. If R is not valid it will come to a register which tells us that SP AG data is available and valid. That information will start the search timing chain. Once the search is started the validity check is aborted and the search timing chain supplies the continuous pulses necessary to do an AST search and a translation. This will continue until either an AST hit is made or we run off the end of the AST memory. This run off causes an AST end interrupt buffer. Either one of those signals can abort the search and write timing chain. A hit will start the clear timing chain, however, if we abort because of an interrupt, the clear timing chain is not run, rather an error signal is sent. In addition to loading the real address memory, the SP AG data entering will be loaded into stored memory for use during vector operations. The data information is a seventy-two bit double word. The upper half of that double word contains a virtual address that concurrently goes to virtual address buffer one. Data contained in the lower half of that word goes to stored buffer one. If a translation search timing chain is not being run, the data is locked in store buffer one. However, when a hit is made the write enable input is activated for the stored memory and the same R address that points to the real address memory now points at one of the addresses in stored memory. At that time the data is entered as one location in stored memory for each R register corresponding to an address location of the real address memory. A translation cannot be done without having loaded the AST, the Activity Segment Table. FIG. 59 illustrates the loading of AST data. It is done once during an acceleration operation. It is done through an SP AG data register. As shown in FIG. 59 the first piece of data that comes across is an AST count minus one. This indicates the number of valid AST entries that we are going to have. They can be up to thirty-two AST entries, zero through thirty-one. The next two double words contain the information for AST zero. The first, or upper portion of the first word contains the lower and upper segment limits. The lower half of the first double word contains the permission bits and the base real address. The next double word from SP AG data contains the length. This uses only thirty bits, the remaining bits are unused. The second half of the second double word is unused and it is a dead cycle. The next two double words contain the entry for AST register one and so on up to the AG to keep track of the count and stop loading AST entries. Because the SP and the IF are not performing as Address Generators data keeps coming across even though it is not useful to the AG. Also because of this, it is necessary to keep track of it and stop it at the appropriate time. The way the AST is loaded is shown in FIG. 60. It is done with SP AG double word data. Each time it comes across it selects one-half of a word or the other to go into the AG input register 733. From there it will go to the AST load buffer 734. The load AST number timing chain runs for only one cycle, that is all that is required to load the first word that comes across which contains the AST count. At that time the AST count buffer 735 is loaded. This is the number of valid AST entries and they will stay here until another acceleration is done. This same count buffer 735 tells us when we are finished loading the AST and the same count buffer that tells us while doing a translation that we have run out AST entries to search, so that number stays in the machine until another acceleration is done. This counter keeps running, each time incrementing by one rather than by fours, since only the upper bits are being used to select an AST address. The lower bits are running the enable register which enables one of the three write enables E of the AST memory 720, either for the lower and upper limits, the base real address or the segment link. The data is entered at the appropriate time through the AST load buffer 734 and is applied to all three data D inputs. At the appropriate time, when the proper write enable is active, the data will be present at the input for that entry and the address A will be there for that location in the AST memory and the data will get loaded. At the beginning of this operation, when the count becomes equal, the AST memory is cleared and then filled. At that time the counter gets reset to zero and actually reads AST zero. On the last pass of the timing chain, the base one A register 736 and the link one A register 737 are enabled with the data from AST zero. This data is used for transmitting data to the Local Store from AST zero without having to do a translation. The IF is told the AST zero length. If the length is less than four K the LS handles it but if the length of AST zero is greater than four K then the segment is greater than the LS and it is necessary to go to the HPSU because the Local Store can only hold four K of the segment.

The timing hain that controls the loading of the ST is triggered from the control word by AST load disk from FOD and an AG issue as shown in FIG. 61. Starting with a load AST wait timing chain, the second cycle of the wait timing chain cycles within itself. That is, it sets up a loop. The wait two timing chain is also started. These loops will essentially run forever until they are externally halted. This loop is waiting for SP AG data available that indicates that we now have valid AST data entering the AG-in register. This will set the data available designator, which finally will abort this timing chain and start the length timing chain. The length timing chain will only run once. We will look now at the rest of those timing chains as shown in FIG. 62. The length timing chain loads the AST length, the 2X wait timing chain that has been running forever will still continue to run, and will be checked to see if wait two timing chain has been halted by a data available signal. If data is still available, the AST write timing chain is run. This is a two cycle timing chain that actually writes the AST data, the reason that it's two cycles is because there are two halves of the word to look at and then it will start the last pass timing chain but since an AST is set while this operation is being done the last pass timing chain will always be aborted so that the pulses will be starting and going into the last pass timing chain and getting aborted. When the AST memory is finally filled or emptied of AST entries, an AST is cleared that aborts the write timing chain. This stops the abort on the last pass timing chain and allows it to go to completion. This, in turn, aborts the wait timing chain which stops sending pulses. Finally, an IFC address ready signal is sent that tells us that the Address Generation sequence is done with the load AST and therefore may continue with other operations. If we are loading a full AST that is only thirty-two entries, the operation can wind up taking about 130 cycles or more because there are thirty-two entries of four cycles each plus additional housekeeping chores. The AST address counter is shown in FIG. 63. It loads the AST. The counter is running for both load AST and for translation. All seven bits of the counter are run in a loop. If a translation operation is being done, a translate search timing chain disk register is being run. The write control is not set so the low active output will be set. This is wired to the appropriate bit of the adder and a four will be added each time around. We also increment the AST number one address at a time and those bits are taken together and if none of the bits are set then this will tell us that we are looking at the zero address in the memory or AST zero. When doing an AST load the upper bits are used as the counter to increment this memory but now it is necessary to spend four cycles on each address, that is, each of the the three entries are loaded plus a dead cycle for the unused information from SP AG data. So one of these segments will be running on the AST write time chain which will set the write control designator so only one is added to the counter each time around. When loading of the AST is stopped these time chains will cease and again the counter is cleared with a zero. The lower two bits $2^0$, $2^1$ are applied to the two OR gates along with a pulse from one of the AST write time chain segments.

Figure 64:
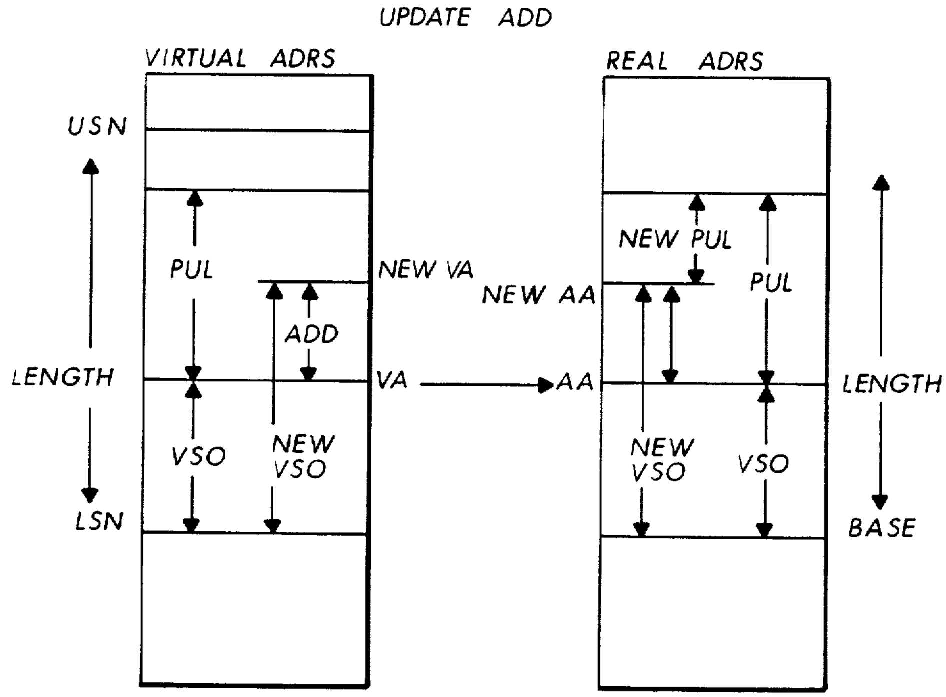
FIG. 64 is another simplified pictorial diagram of the translation operation between a virtual address emory and a real address memory which further shows an update add operation.
Figure 65:
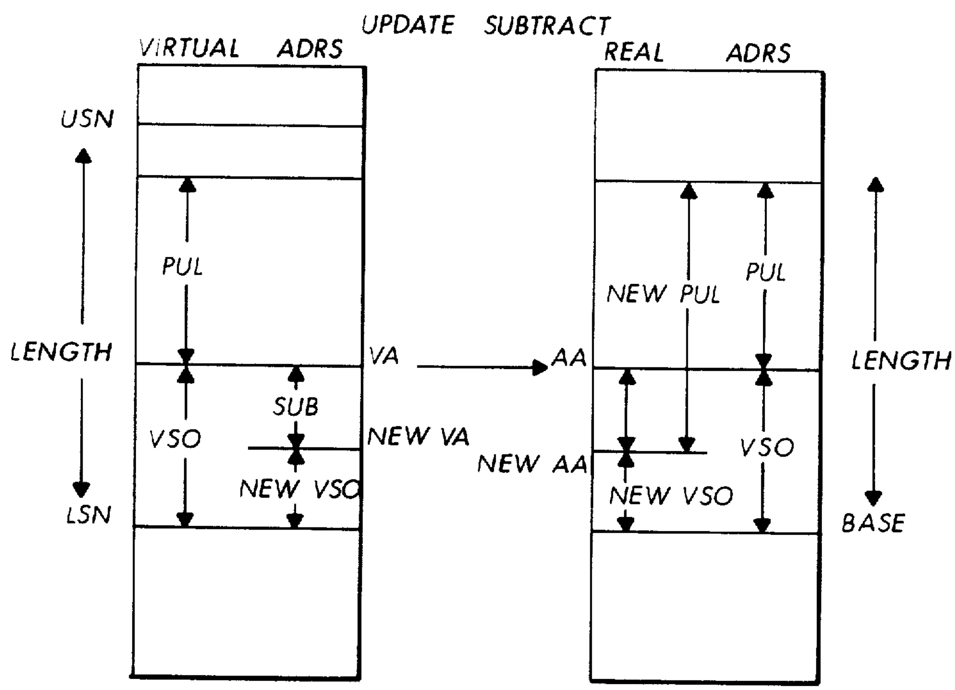
FIG. 65 is a pictorial diagram similar to that in FIG. 64 which further shows an update subtract operation.
Figure 66:
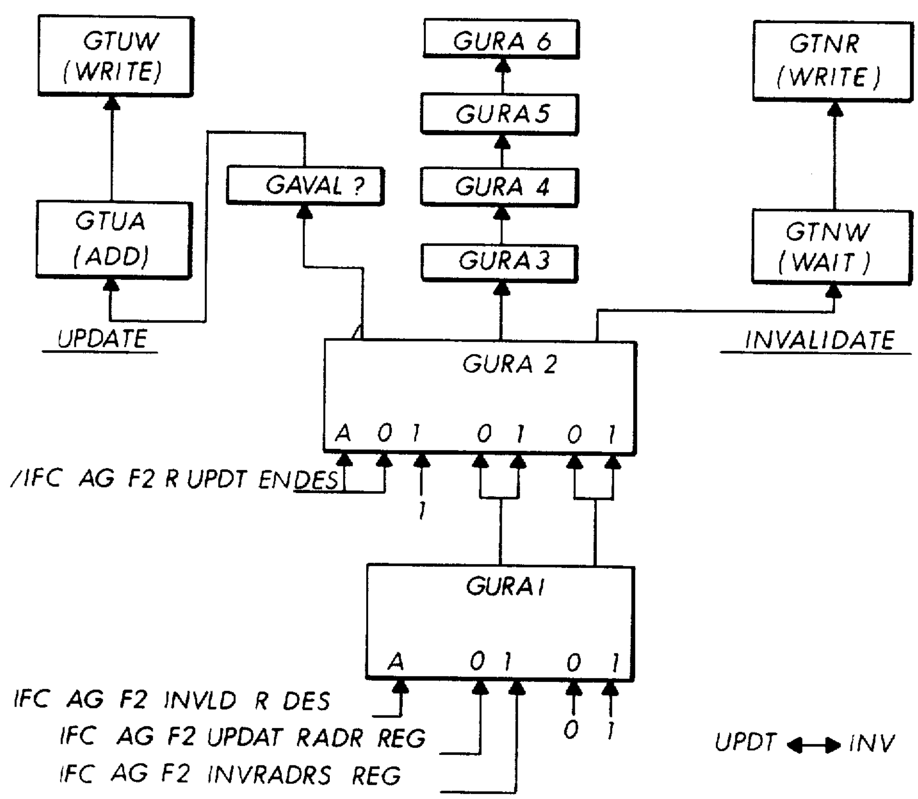
FIG. 66 is a logical block diagram illustrating several timing chains used for update and invalidation operations.

Two other operations will now be discussed that take place in connection with translation. They are the update and the validate operations. With the update the data translated data in the real address memory is translated, since it is desired to change the virtual address to the new virtual address, without doing a whole new translation. This is shown in FIG. 64 as an update ADD operation. It is desired to change the data since most of what already exists is usable. So the add information is brought in again through SP AG data and through the AGN register. That tells us the amount that must be added to the old virtual address to get to the new virtual address. Now, from FIG. 64, this number is taken and added to the old virtual segment offset (VS0) to get the new virtual segment offset. Now if that same add information is taken and added to the absolute address the new absolute address is obtained. Conversely, if we subtract it from the old positive upper limit we get the new positive upper limit so the information is from the real address memory. That is, the absolute address, the new absolute address, the new virtual segment offset, and the new upper limit are gotten from the old absolute address and the old upper limit simply by having this small amount added to the virtual address. An update subtract works exactly the same way as shown in FIG. 65, except this data now must be subtracted from the virtual address, subtracted from the absolute address, subtracted from the virtual segment offset to get a new virtual segment offset and further added to the old positive upper limit to get a new positive upper limit. FIG. 66 illustrates the block diagram of the logic necessary to perform an update or an invalidate operation, while FIG. 67 illustrates a more detailed block diagram of the invalidate operation of the Real Address Memory 721.

Figure 67:
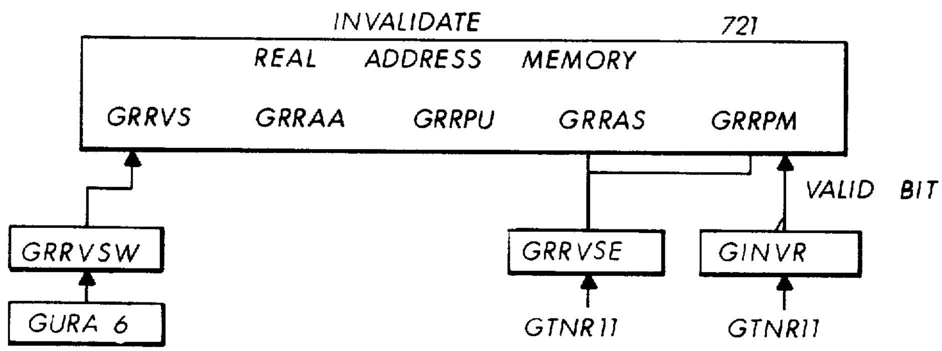
FIG. 67 is a pictorial representation of a simplified block diagram of the input information signals to the real address memory during an invalidation operation.
Figure 68:
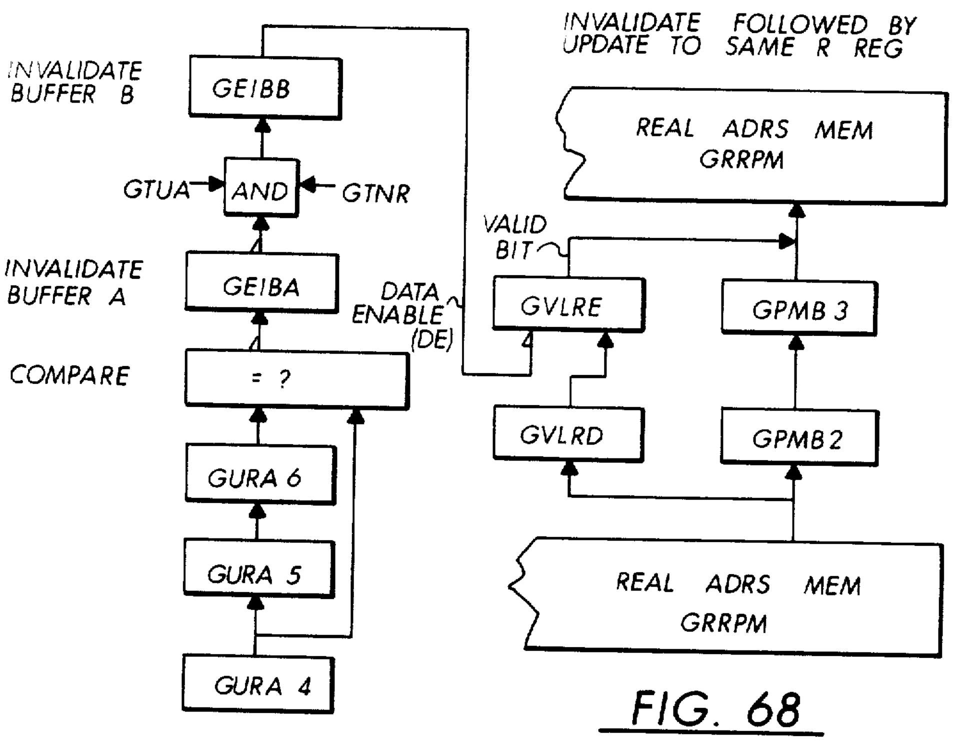
FIG. 68 logically illustrates an invalidate operation followed by an update operation to the same R register.

If it is desired to invalidate translated data presently in the Real Address Memory 721, as shown in FIG. 67 it is necessary to update R address register with the new address. To do this, the invalidate write timing chain enables the AST number and the permission bits of the Real Address Memory. That timing chain, in turn, sets the invalidate R register. The low active output is then written into the valid bit which clears it. This indicates that all of the data for that R address is now erroneous and requires a new translation. For example refer to FIG. 68 and consider that an invalidate update signal is received by the update R address 6 (GURA6). A cycle later the update R register will be an update R address 4 (GURA4). At the same time if those are equal as indicated by the compare circuit the low active from that comparator will set a zero which will clear the invalidate buffer A (GEIBA). The output will then become a one indicating that an invalidate and/or update operation one cycle apart is going to the same address. If, in fact, the invalidate signal is first, the invalidate A write will be done at the same time that the update add is being accomplished. If both of those bits are set that says that the timing chains have occurred in the correct sequence and the earlier invalidate buffer B register will be done. This disables the data enable DE on valid R register E (GVLRE) which, in turn, writes a zero into that register. This clears the valid bit and the update is completed.

Figure 69:
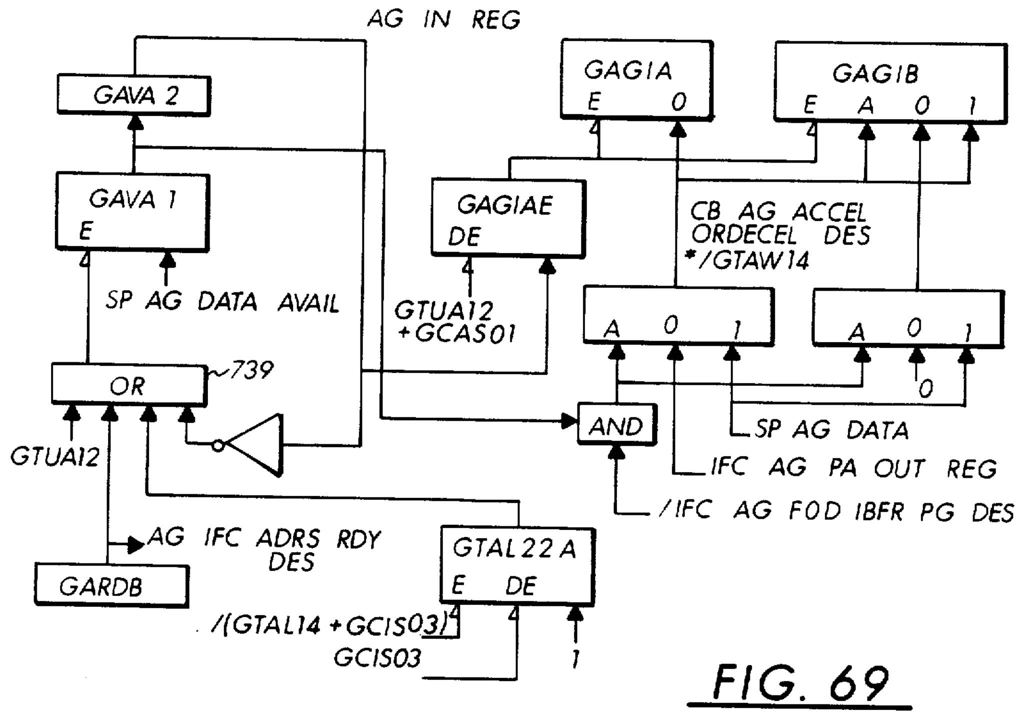
FIG. 69 is a detailed logical block diagram of the input register configuration for the Address Generator (AG).

The AG IN register is shown in FIG. 69. This register can get a little confusing, since there are a number of things that happen here. The first problem is that SP AG data continues even after it is no longer desired, so it is necessary to control the data into the AG IN register. This is done by the SP AG data available signal. It tells us that there is valid data on the SP AG line. What happens is the SP GA data available bit sets the available one designator (GAVA1) which, in turn, sets the available two designator (GAVA2) and comes around and clears the OR gate. So at this point there is no output from the OR gate. The low active output goes high and locks the available one designator. So what has been done is that the loop is locked and no more data can be clocked in until the OR gate is unlocked. The available two bit is also latched into the address enable (GAGIAE) register locking the door behind the data. The signal that normally unlocks the AG IN register is the sending of the address ready signal back to the IF. This tells the Address Generator that the operation is completed. It also sets the OR gate 739 and clears out the data available by unlocking this loop and setting up for the next piece of data.

The address ready signal is not sent in the case of an update because an update always takes two cycles. Since the address ready signal is not sent, there is not a mechanism to unlock the door for the AG input data. To accomplish the unlocking an update timing chain signal is applied to unlock the loop immediately so that it is not necessary to wait for this to propogate through the loop. One other situation is possible to unlock this and that is when an AST load is being performed. Remember that when the AST data was being loaded, all of the AST entries through SP AG data were being brought in. A loading we continued by the presence of the AST bit and the AG control word which keeps the loop unlocked. When the AST load operation is completed, an address ready signal is sent to unlock this loop and the AST load control bit in the timing chain goes away.

So once an AST load operation is completed the door is still open for new data to enter. The next issue clears this and allows this to operate as it normally would for all other operations. The AFG load is only done once during acceleration and will not be done again until an acceleration operation is repeated. We also use the program address out register for some other operations other than those where we are getting an address from SP. Anytime that SP is going to be used for the input and we have data available, we set this latch and its output is applied to the address selecting SP AG data coming in. When a load AST is ordered, that is an acceleration operation, there is a CB AG acceleration or deceleration of data, so there is the option of selecting word half select zero or one on the AG input register B (GAGIB). In other words, we can select the upper or lower half of SP AG data. That selection, when we are doing the load AST, is done by the AST write timing chain. Since this is a two cycle timing chain each portion runs every other cycle, so DTAW 14 is active and it alternates every other cycle. This has the affect of switching AG IN register B (GAGIB) back and forth between the lower and upper half words to select the portion of the SP AG data that is desired.

c. Scalar Processor

The next section that will be discussed is the Scalar Processor Logic Section 900 of the Scalar Processor Module 150. More particularly, the Scalar Processor Control section will be described. Next the major components in the Scalar Processor will be listed. A control overview will then be described and then a high level data path model will be presented. It is from this model that the detail algorithms were designed and so they also will be covered.

The following instructions have their primary execution done in the Scalar Processor. The obvious ones are the arithmetic instructions. The add, the subtract, the multiply, and the divide, also the extract magnitude for absolute value, the extract sign count, the logicals, all six of the compare instructions, the conversion instructions and the shift instructions.

The Scalar Processor contains the G registers so it is involved in the load and store operation but it does not do the address generation portion of load and store. The Scalar Processor is also heavily involved in all of the move scalars, in fact, every move scalar in the machine goes to the Scalar Processor with the exception of the Loop Control or Loop Control moves. Conditional jump is also done on the Scalar Processor section as are the IJL and DJG diagnose, read diagnose, write diagnose and the computational portion of a generate index vector instruction are also done there. The instructions for which the SP plays a minor role are all VV format instructions except for the compress vector and distribute vector. Its role in the VV format instruction is basically to read out data to be sent over to the Vector Processor or to store data away in the G registers from the Vector Processor. The SP also plays a minor role in the load loop control and store loop control, load address and jump, jump to external segment and generate interrupt instructions. It is also involved in all of the macro instructions from the SP Control Block section.

The major components in the Scalar Processor section are the G registers, the integer ALU, the floating point ALU, the multiply unit, and the issue control section. The issue control section is the major element in this description, since that is where all conflict resolution is accomplished.

Figure 70A:
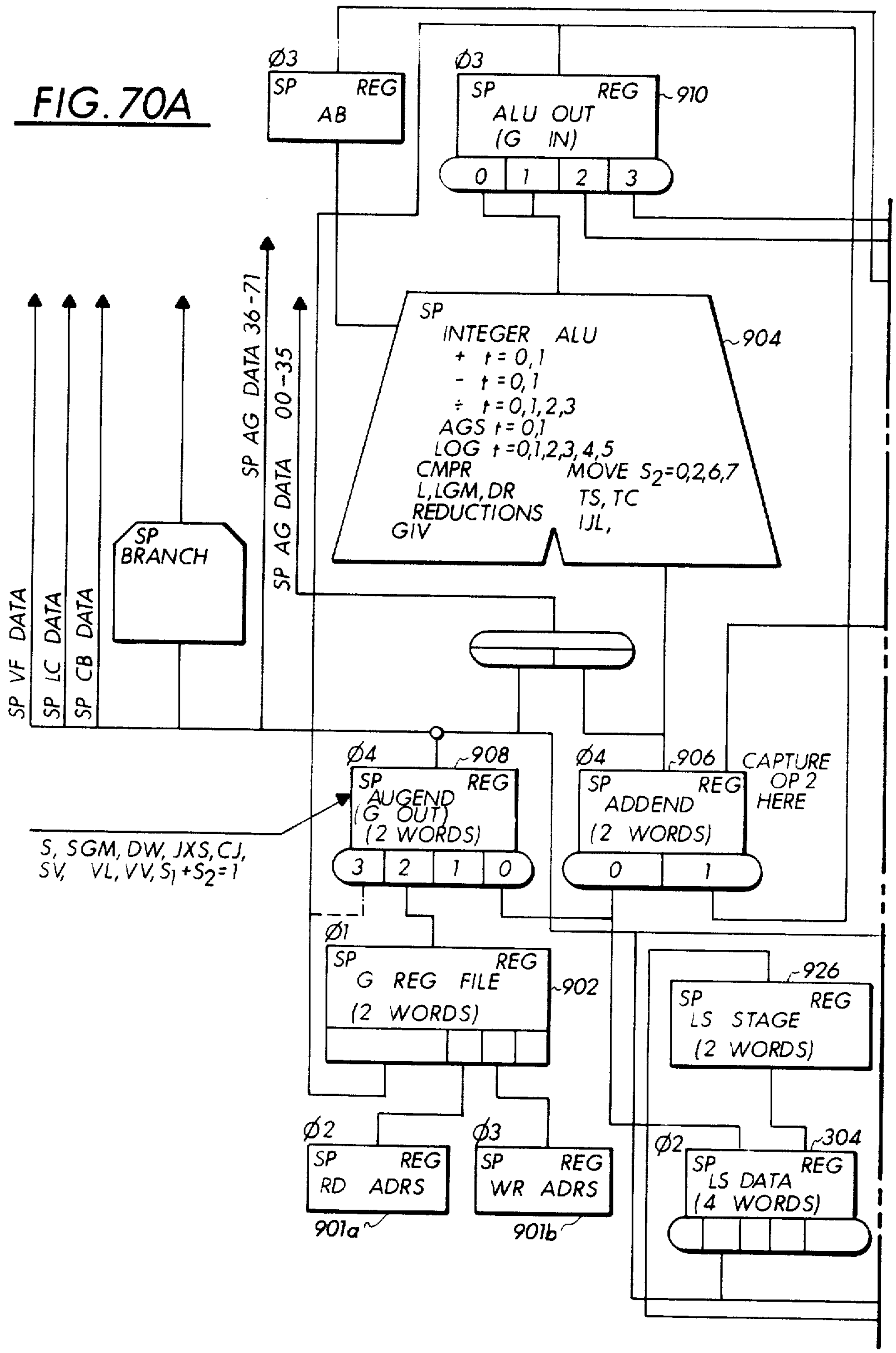

FIG. 70 is a high level drawing of the Scalar Processor section. In each large box the instructions done by the hardware are indicated.

Figures 71, 72:
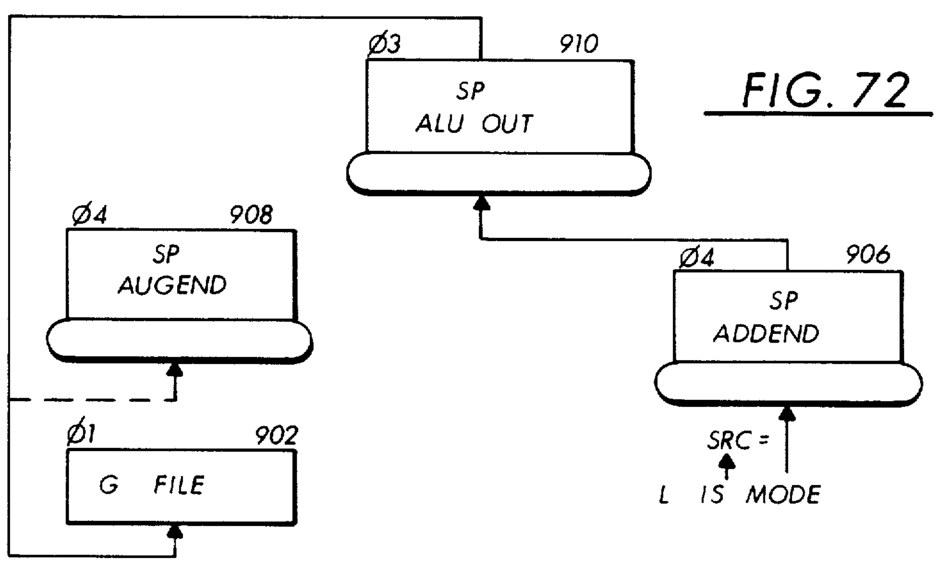
FIG. 71 is a table listing the eighteen master bits, received from the IF section, the receipt of these master bits cause the issuance of SP designators.
FIG. 72 is a logical block diagram illustrating the logical path followed by a source instruction, which is basically a load G instruction.

With reference to this FIG. 70, a control overview of the Scalar Processor section will now be described. We will start off with two of the most important features. First, the Scalar Processor section must get an issue SP designator from IF before it executes any instruction. The instruction that is done is one of the 18 listed in FIG. 71. In order to do an instruction, the instruction must be issued together with one of these 18 master bits. No more than one of these eighteen master bits can ever be set simultaneously. The second important feature is that the Scalar Processor section can be requested at any time during the G read out of Address Generation. While it may occur at any time, it attempts to do that as soon as possible and, in fact, it makes an attempt as soon as this signal is set. So it really has 19 things to do, the 18 master bits above plus the Address Generation G read out. As mentioned only one master bit can be set at a time, however, the AGl G address can be set when the SP has an instruction in its F2 register bit because it can have an instruction in the F2 register there are conflicts that must be checked before an attempt is made to read out the G register when the G conflicts are in the use of the augend. The augend register 908 is essentially the output register, but since it has other uses, there maybe a conflict in the augend usage. For example, there can be a valid instruction in the F1 that has not reached the Scalar Processor when a request is made to read out of the G register for Address Generation. The instruction that is presently in F2 may not have issued and there could be a conflict with the destination of the add instruction. There also could be an instruction in progress, so there could be a conflict with that instruction. In any case, it is readily seen that there are many possible conflicts for the reading out of this G register that have to be resolved. Generally what is received from the control unit are master bits. Remember that along with the master bits we also get some parameters to tell the Scalar Processor what to do on a given master bit instruction. For example, if it is an add, it is still not known what kind of an add operation it is in i.e. an integer or a floating point. Consequently, it is necessary to get the T field to break that down. Also it is not known from the master bit if we are to store the results in the G register or send it off to the Scalar Processor Module or to the Vector Processor Module, so along with the T field an SPM or a VPM result designator is sent. For conversions, a T3 field is sent which indicates the type of conversion. For these reasons additional parameters We will now step through the data path for several of these instructions. One of the master bits shown in FIG. 71 is the SRC master bit. Actually this means the source and to the Scalar Processor section the instruction is basically the load G instruction. So the logic for this instruction is shown in FIG. 72 which illustrates the load instruction and the data comes into the Scalar Processor through the addend register 906. It then passes through the ALU into the ALU-out register 910 and then loops back into the G file 902. Essentially the ALU-out register 910 is the input for the G registers. A dotted line is shown for a path into the augend register 908. That path is shown because some of the parameters that come with an SRC instruction tells us that this is really not a load G multiple, rather this is a Move instruction, which should be sent to another unit through the augend register 08. It therefore tells us not to store the G register. The instructions that are mapped onto the SRC instruction are the load instruction, the load G multiple, the diagnose read instruction, all VV format reductions, and all moves for which the source of data is either a G register or V register.

Figure 74:
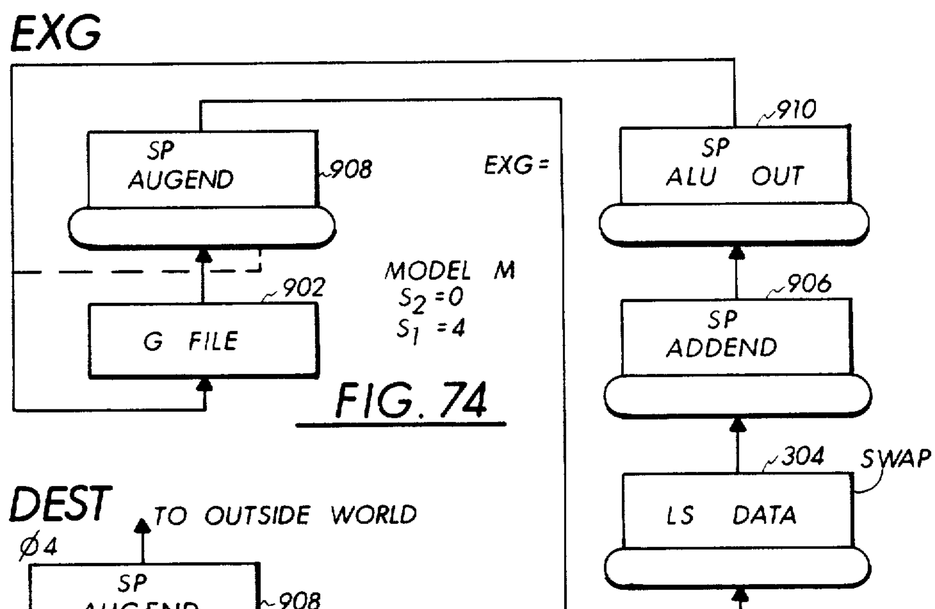
FIG. 74 is also a logical block diagram showing the data path followed in response to an exchange G register (EXG) instruction to accomplish a move scalar operation causing a move from the right half of the G register to the left half.
Figure 73:
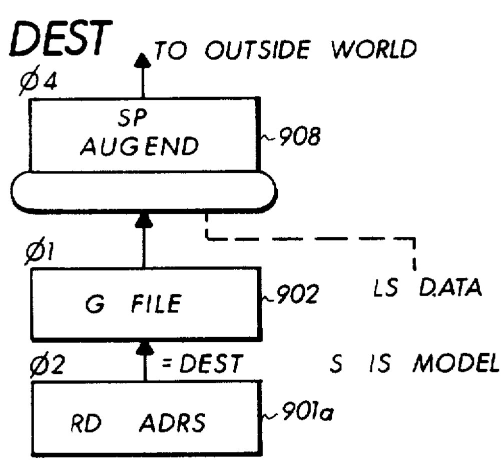
FIG. 73 is a logical block diagram showing the data through the G File in response to a destination (DEST) master control bit received from the IF section.

The next instruction is shown in FIG. 73 It is a master bit instruction called the destination (DEST) instruction. The logic for this instruction is the G File. All that is being done is the read address is applied to the G register 902 and the G register 902 is read out to the augend register 908. The SP augend register 908 is essentially the G output register and from there it goes to the outside world and the outside world includes Loop Control, the SP Control Block section (SPCB), the Local Store, the Address Generation section, and the Vector Module. An option is available here which allows us to put the data from the Local Store (LS) into the SP data register. This is illustrated by the dotted line. The instructions that are mapped to the DEST logic are the store instruction, the jump to external segment instruction, the conditional jump instruction, the store vector instruction, both the RS format and the RR format diagnose write instructions, the load loop control instruction, the store G multiple instruction, and the macro load and initialize AST instruction. The next master bit instruction is the EXG instruction shown in FIG. 74. The model for this instruction is the move scalar with S2 equal 0 and S1 equal 4. This causes a move from the right half of the G register to the left half of the G register. This path is as follows, the G register 902 is read out into the augend register 908 and from there the data goes to the LS SP data register 304 where the swapping is accomplished. From there it comes back through the addend register 906 through the ALU out register 910 and back into the G file 902.

Figure 75:
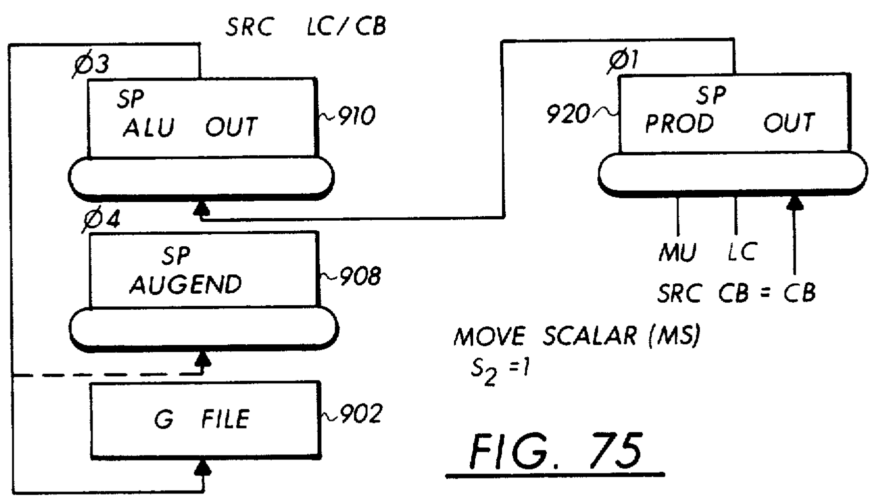
FIG. 75 is a simplified logic diagram illustrating the data path of a source Loop Control (LC) and source Control Block (CB) instruction through the SP.

The next two master bit instructions are shown in FIG. 75. It is the source LC and the source CB master bit instructions. The data comes from the Loop Control section or the SP Control Block section. In the instruction illustrated, the move scalar with S2 equal 1 means that the source for the move is an S register. So the data path comes from the CB section to the Scalar Processor section where it enters the product out register 907. The data goes through that register through the ALU-out register 910 and into the G file 902. The instructions that are covered by either one or both of these master bit instructions are all of the moves with S equal to 1 or to 5, the store loop control instruction, the load address and jump instructions and the macro store instruction.

Figure 76:
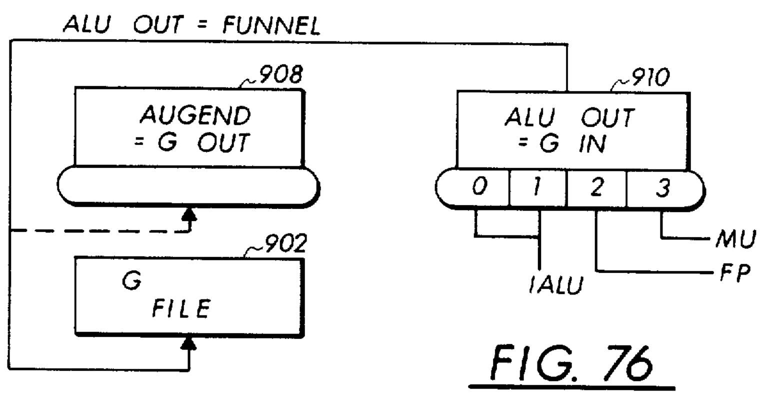
FIG. 76 is a simplified logic diagram illustrating that the ALU bit register of the SP basically funnels all information in. the Scalar Processor.

FIG. 76 illustrates that the ALU-out register 910 is basically a funnel for data into the Scalar Processor section. The ALU-out register 910 has as one of its inputs the multiply unit MV. Another input is the floating point unit FP and another input is the integer ALU. Now the moves that came from the SP addend, for example, came from the integer ALU. All of the integer instructions are done in the ALU, so all of these instructions are funneled through the ALU-out register 910. The floating point instructions are done in the floating point unit except for the multiply instructions and all of those instructions funnel into the ALU-out register 910.

The next aspect of control is the so-called conveyer belt concept. Generally when an instruction is started in the Scalar Processor it is indicated by a special signal called a GO instruction. A GO instruction loads information about the instruction onto the conveyer belt. As soon as the information gets onto the conveyer belt it advances without stopping. There are no enables needed on the conveyer belt. The signals in the conveyer belt are indicated by RCXXPH where XX goes from phase 30 all of the way down to phase 2. It decrements every two phases and thus goes from phase 30 to 28 to 26 down to phase 2. Long instructions start at phase 30 and take approximately 8 cycles to complete. Basically this conveyer belt controls the ALU-out, and one of the most important things that it controls is the ALU-out register 910. It also controls the selector associated with the ALU-out register. The conveyer belt carries destination information for the instruction. From the ALU-out register 910 the results may go to a G register in which case the very last item on the conveyer belt applies i.e. the upper and lower G write enable signals are sent. Alternately the results could go to the Vector Processor because it may be an RR format with a vector V op destination or a V op result, in which case the upper and lower write enables would not be set but rather the BPM result indicator would be set to cause a wrap around through the augend register 908. It could also be a move to the Scalar Processor section but not to a G register in which case, the SPM result designator would be set. Any of these three different alternatives may occur and they are mutually exclusive. Finally it should be mentioned that the conveyer belt contains the G address for writing, in case a write operation occurs.

Figure 77:
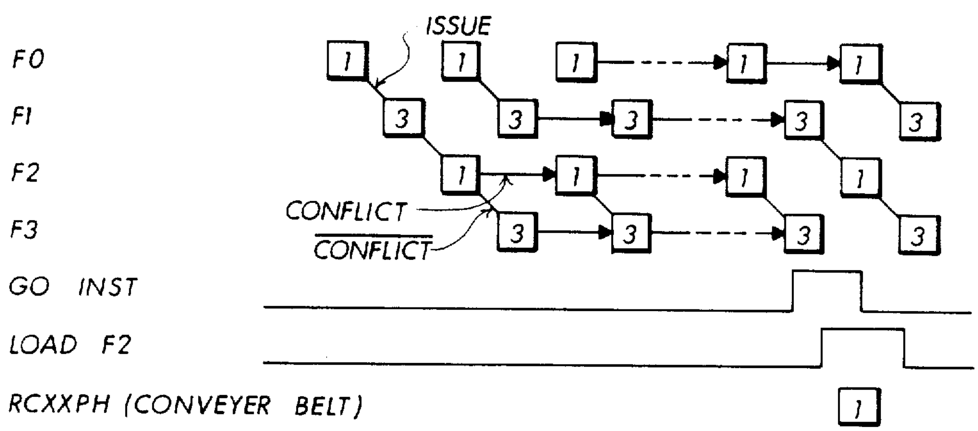
FIG. 77 is a timing diagram illustrating the basic instruction flow from the main instruction register F0 in the IF section to intermediate holding registers F1, then to register F2 in the SP section and finally to register F3.

Referring to FIG. 77 there is shown a timing diagram illustrating the basic instruction flow from F0 in the IF section, the main instruction register, to an intermediate holding function register F1 and then to the F2 register. The main portion of F2 is in the SP section but there are small pieces of F2 in the other sections, however, reference is made to that portion of F2 that is in the SP now. When the instruction gets into F2 it gets there only if the issue bit is set in one of the master bits. It may not issue right away because there may be conflicts. For example, we may wish to read the G register, however the correct contents are not available yet. Or perhaps we may want to use the contents of the ALU-out register 910 at a time that has already been claimed by a previous instruction. Or maybe we may want to use the augend register 908 and that is claimed by a simultaneous address generation request. In any of these instances it will set in the F2 register while it is waiting for conflicts to be resolved and this is indicated by the arrow in the dotted lines. It is merely waiting for the conflicts to be cleared. Once this happens, a GO instruction will come up at phase 3 when the conflicts have been cleared and the instruction will actually go into execution. Shortly after that load F2 will become active and load a new instruction into the Scalar Processor section indicated by a final one on the F0 line. After which the conveyer belt, indicated on the left by an RC XXPH, will be loaded with data to control that instruction.

Figure 78:
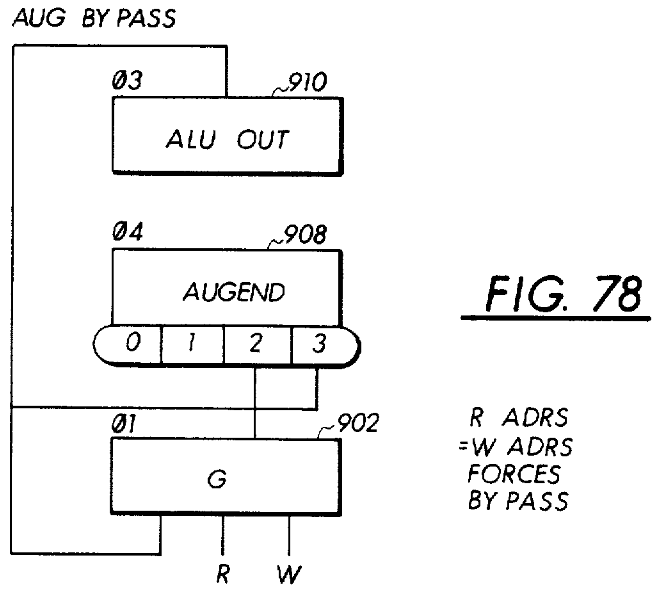
FIG. 78 illustrates a simplified block diagram of the Augend By-pass lock necessary to force a bypass of the result data of a given instruction into the augend.
Figure 79:
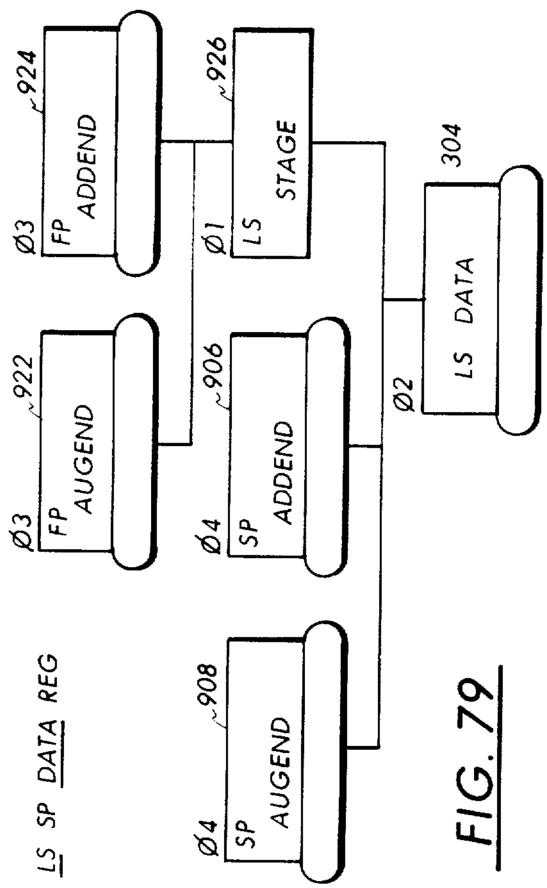
FIG. 79 hows a block diagram of the logic necessary to provide the Local Store data register of the Scalar Processor, which register provides the input data to the Scalar Processor.
Figure 80A:
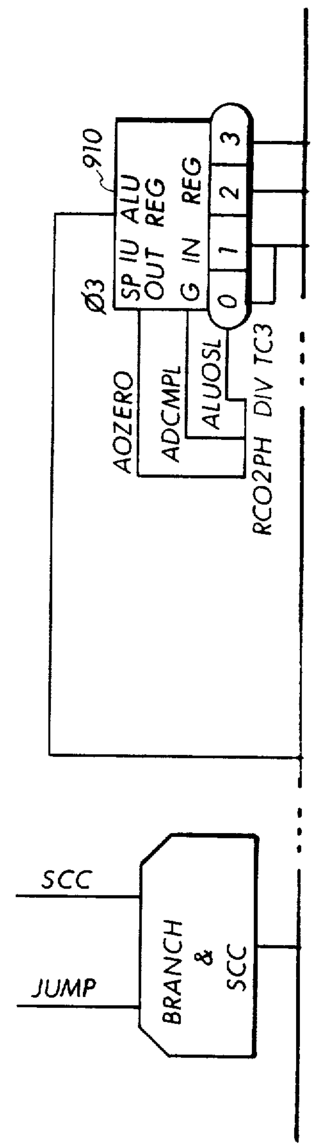
Figure 80B:
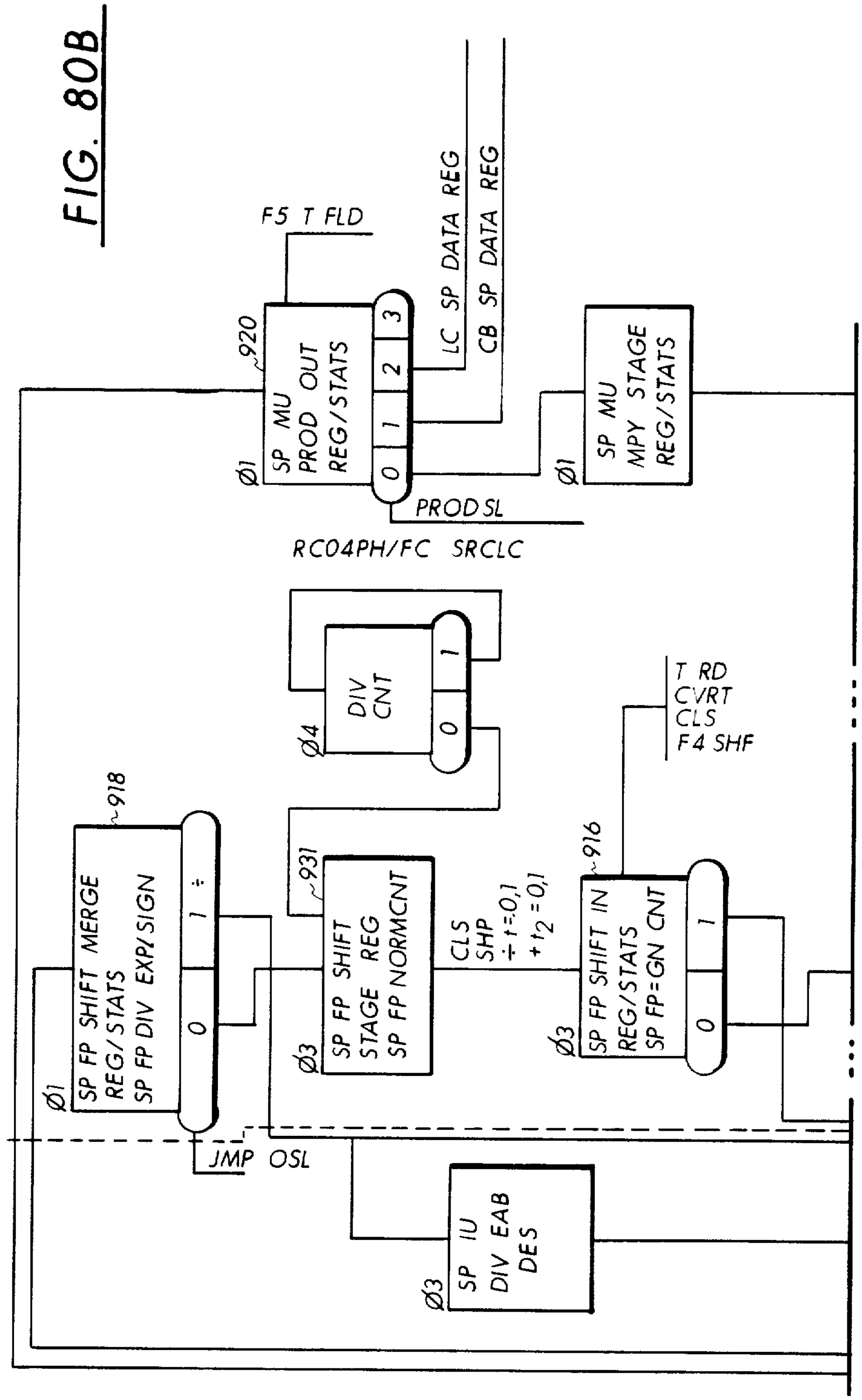
Figure 80C:
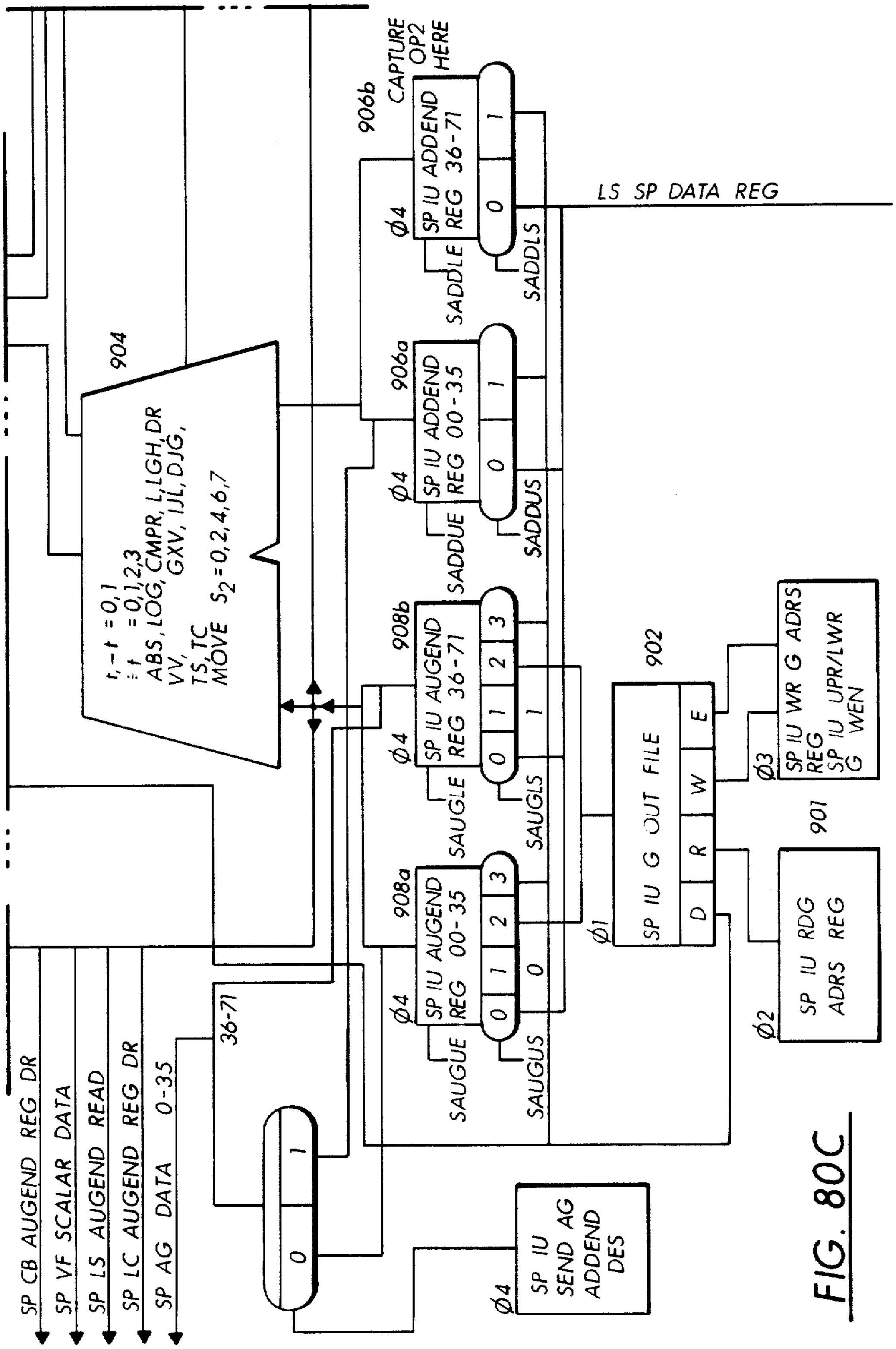
Figure 80D:
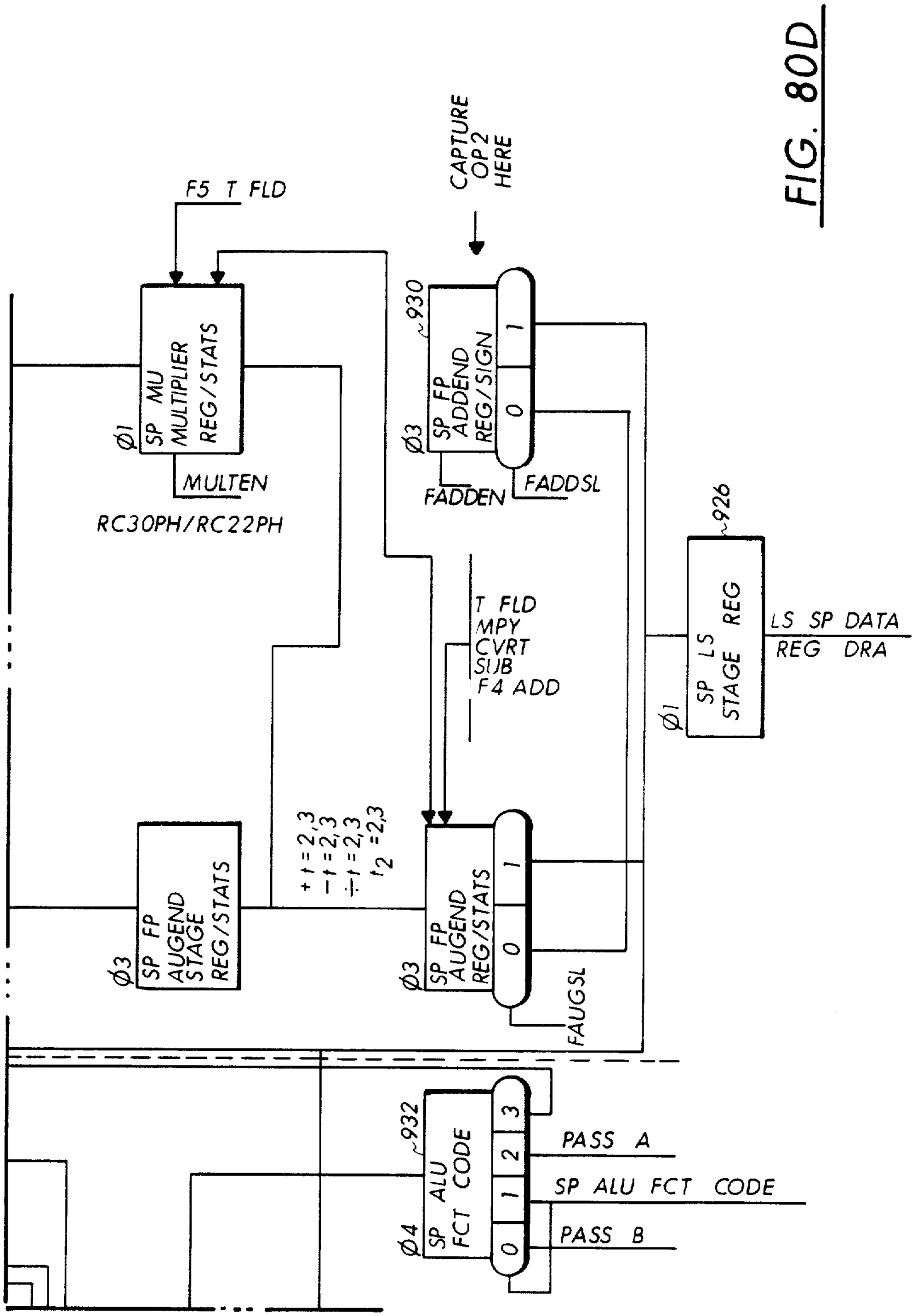

In order to speed up instruction issue in the Scalar Processor section, it is possible to force a bypass of result data of a given instruction into the augend register 908. This is shown in FIG. 78. When the read address for the current instruction is the write address for the previous instruction, this forces a bypass on the augend 908 so that the data can be put into the G register 902 on phase 1 but the previous phase 4 has already been wrapped around to the augend register 908 and it is ready to be used. If this bypass were not done it would be another 3 phases before the data could be read and put it into the augend. A cycle is gained on any instruction with a G register conflict Now to this point it has been shown how moves work in the Scalar Processor and how the data exits the Scalar Processor. However, not much has been said about data entering the SP. The principle source of the data for the Scalar Processor is the Local Store (LS) SP data register 304. It has paths directly into the SP addend register 906 as shown in FIG. 79 and directly into the SP augend register 903 as well as into the SP section where there is a staging register 908. From there it goes to the FP addend and FP augend registers 922, 924.

Figure 80:
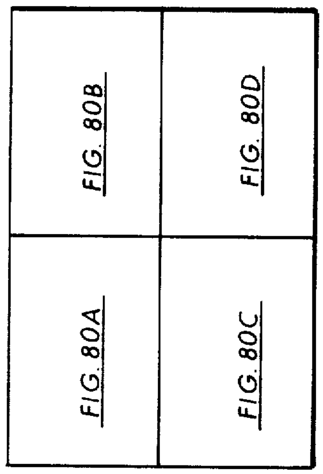
FIG. 80A, FIG 80B.
FIG. 80C and FIG. 80D, when arranged as in FIG. 80, is a more detailed logical block diagram of FIG. 70, which logically illustrates the Scalar Processor.

FIG. 80 illustrates a more detailed high level logic diagram of the SP. On the left hand side of the figure is the ALU logic while generally on the right hand side is the multiply and the floating point logic. The SP multiplier product out register 920 has the LC data and the CB data as inputs with a T field controlling the register. To the left of the multiply unit is the floating point unit ALU. Looking at the FP addend register 930 for a moment, there is noted a term which says capture op 2 here. This is a very important control feature for either the multiply unit or the floating point unit. Consider, for a moment, that we have a situation requiring two operands and, in fact, a more a typical case would be two operands with the op 2 from the instruction. This is captured in this register so that there is an addend enable. Also a select input to the operands can come from the G register which is in select position one. It could also come from a multiple store through the stage register 926 in the lower right hand corner. This is the other select position. So there are two important controls that enter this register as far as issue control goes, one being the addend enable and the other the selector. To the left in the high level diagram of FIG. 80 the result is computed in the ALU-out register 910 just as in the multiply. An important control function here is whether or not we are getting an output from the G register for the op 1 or data from the Local Store for op 1. Since that is controlled by the AG selection logic, it must be set by the control input. The instructions that are performed by this logic section are floating point add and subtract and conversion where the floating point convert means that it starts with a floating point number but may end up with either a floating point result or an integer result. Also, the operand preparation for divide is started here. Those results are sent up through the pipeline to the shift merge 918 and over to the ALU 910. Returning to the shift-in register 916, this is where it converts and it starts and ends with integers. Shifts are also taken care in this logic section and integer divide operations are initiated here. There is a normalization count shifter 31 directly above the shift in register 916. This is also used for computing the shift count for the post normalization of floating point adds so several of these elements have duplicate uses here.

There is a real need to model the divide operation very carefully because it is not of pipeline construction. It is a long instruction which is controlled by timing chains. It uses both the integer ALU and the floating point ALU. The one (1) input to this circuit is basically shifted to the left each cycle. To the left of the dotted line in FIG. 80 is the integer ALU which requires the most control from the Scalar Processor control section. First, there is the ALU function code apparatus 932 which performs all of the logical adds and subtracts. It also covers the case where augends are passed through the ALU as well as the addends. There is a pass A input and a pass B input to this function code logic circuit 932. There is also a selector on the function code input because on divide, an add or subtract operation is performed depending upon the end around borrow. This necessitates that an end around borrow signal is entered into the function code circuit 932. Moving again to the left are the addend registers 906 and **906*b*. They are shown as an upper (bits 36–71) and a lower (bits 0–35) half because they are, in fact, controlled separately depending upon the instruction. Again the op 2 signal is captured here if there is an op 2 for the instruction that is using the integer ALU. There is control for the enable on both upper and lower registers. The zero (0) inputs using the ALU enter from the Local Store data register 304. Moving again to the left are the augend registers. These registers also are illustrated as having an upper half 908*b* and a lower half 908*a* indicated by bits zero to 35 and bits 36 to 71. Basically it has a four way selector. The control on the upper and lower halves are different so that there is an enable signal for both the upper and the lower augend registers 908*a* and 908*b* and also a select signal for both the augend upper and the augend lower registers. The inputs follow a wrap around path from the ALU to the input number 3 and number 2 is placed into the G register itself. Input number 1 is a constant which acts for the generate index vector instruction. When the constant is one it is used in the generate index vector instruction as opposed to the right half of the G register where the zero input is the Local Store. Above these registers is the integer ALU 904. All of the instructions that use this integer ALU 904, are listed there. It should be noted that every S2 move has a zero, a two, a four, a six and a seven location option. At the top of the FIG. 80 is the ALU-out register 910 and, as noted previously, it is basically a funnel. Its path three is from the multiplier, and the path two is from the floating point ALU. Path 3 also includes the moves from the loop control and CB section while path 2 contains only the floating point numbers. Path 1** contains the integer ALU instruction result but it also contains the move results. These moves are not processed here they simply are passed through. The three controls to the ALU-out register are from the conveyer belt namely signal RC02 PH and also by divide timing chain. The output of this ALU-out register goes down and wraps around to the augend registers, to the addend registers and, of course, reads the G register. On the extreme left is a list of all of the varied places that the augend data is sent. The conditional jump is sampled off the augend register and that is sent through combinational logic and causes many signals to be sent over to the IF section to do the final resolution of the jump over there. The same thing is true for the compare, it runs on the same logic and the scalar condition code SCC bits are sent over to the CB section.

Next the data is sent to the CB section, the Vector File of the Vector Processor Module, to the Local Store and to the Loop Control section. Finally, the data is sent to a G register for Address Generation purposes.

Figure 81:
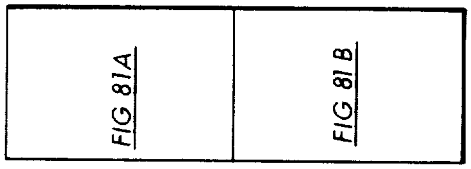
FIG. 81A and FIG. 81B, when arranged as in FIG. 81, is a more detailed logical block diagram of a pipelined sequence of registers into which are entered the particular parameters from the instruction. These registers require no enable signals associated with the register string to pass the register contents along, one register to another in response to each phase. This sequential string of registers are collectively referred to herein as a "conveyor belt".
Figure 81A:
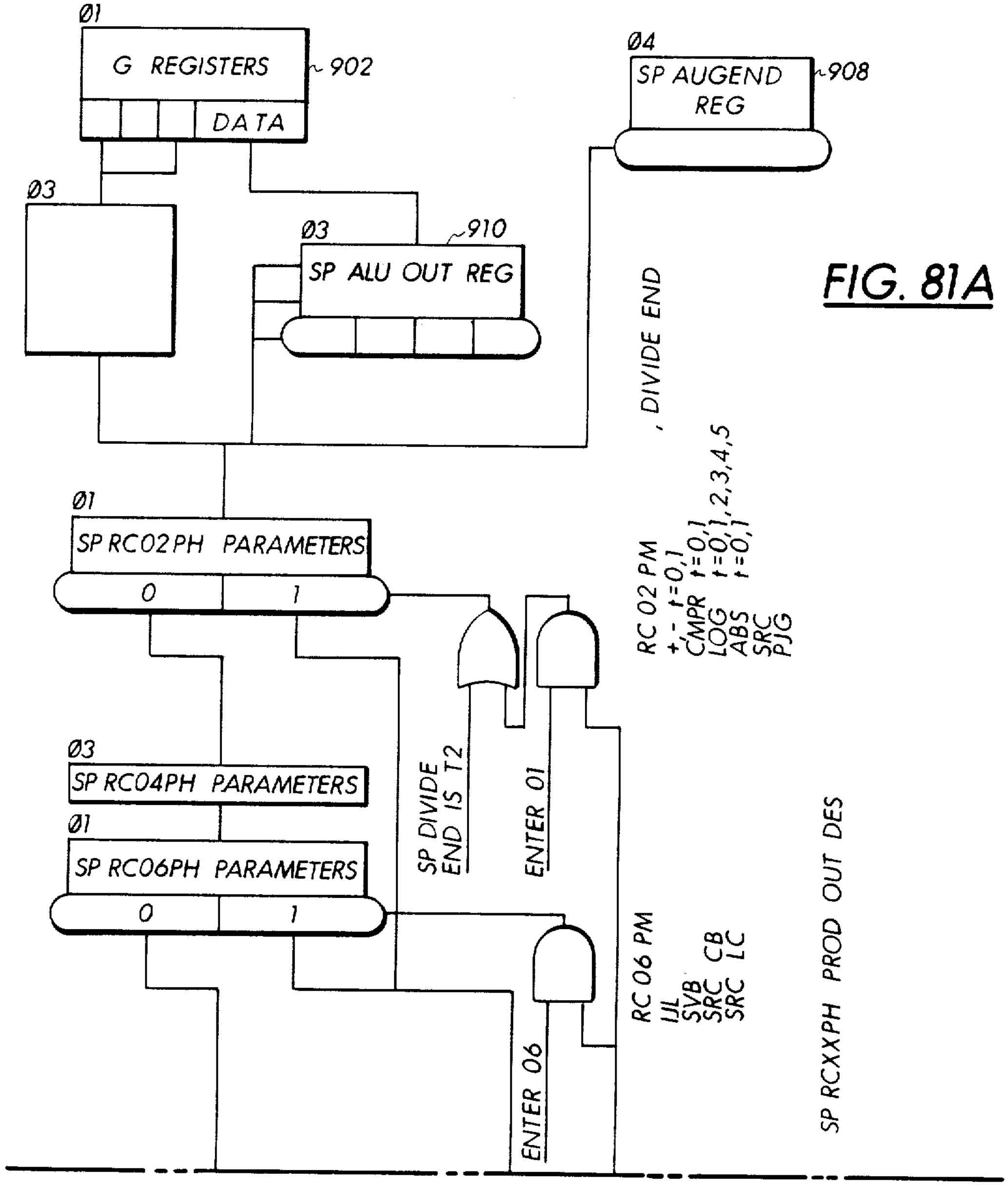
Figure 81B:
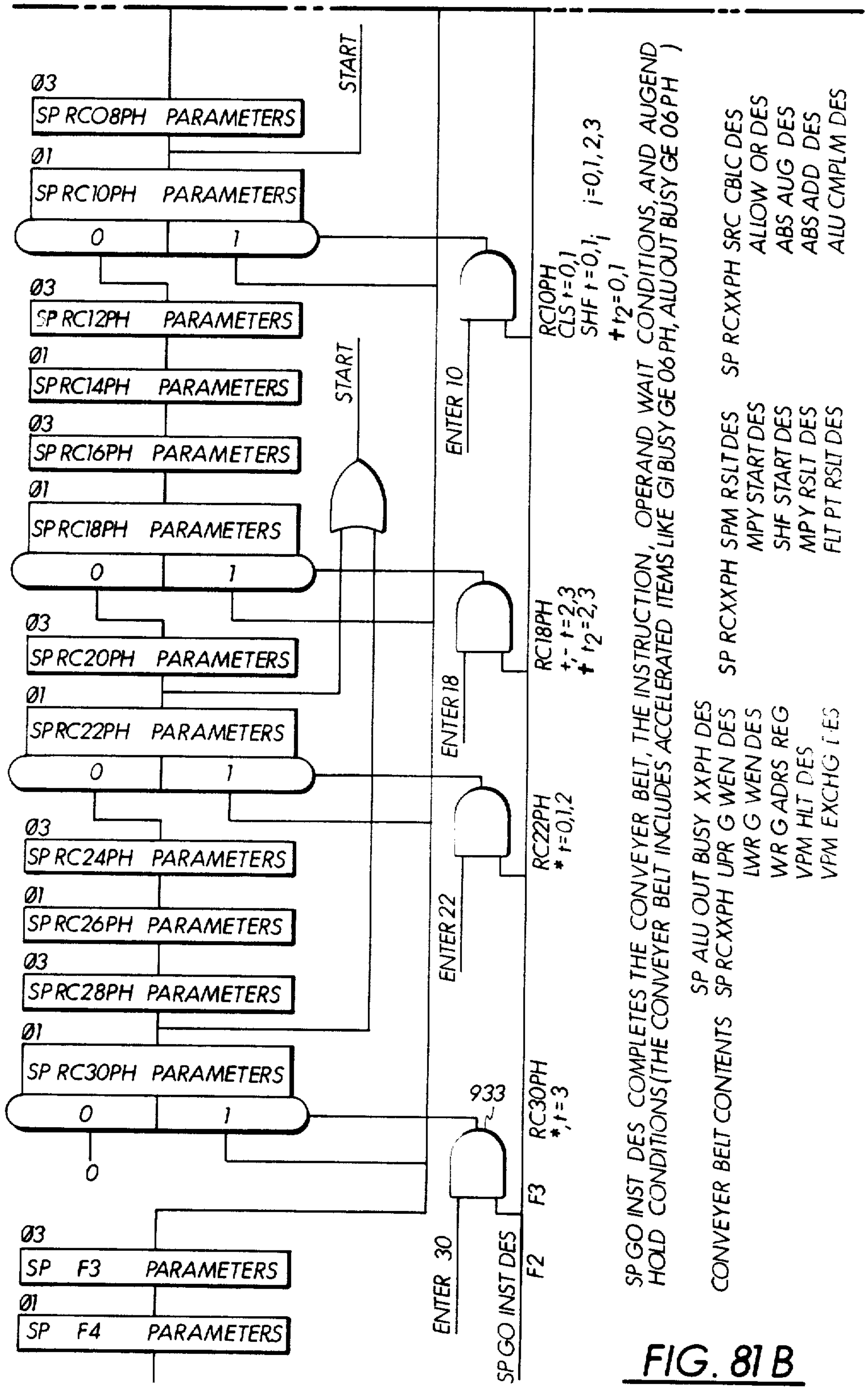

Refer next to FIG. 81 made up of FIG. 81A and FIG. 81B which illustrates the important features of the conveyer belt. First, at the bottom of the figure the data gets entered into the conveyer belt as parameters from the instruction. This is indicated as SP F2 parameters. From there, the SPF3 parameters are simply staged. There is no enable on the F3, but it is F3 that is entered into a conveyer belt. The most important signal that is entered in is the SP ALU-out busy access PH designator.

Returning to the first stage of the pipeline, consider that a multiply instruction signal is entered. If all of the instruction conflicts have been cleared for this multiply operation, then RC 30 PH is entered. The AND gate on the right has as an input an enter 30 and if the designator is present, this gate gets set to 1. If it does not get set to one then a zero is entered into the conveyer belt. Looking all the way to the top on this FIG. 81 there is shown that about 8 cycles later, the RC 02 PH control signals leave the pipeline and control the ALU-out register. If it was a multiply operation, for instance, a selector would have to be forced to three because that is the select input position for the multiply unit. That data would be arriving at the time for the multiplier. Looking at the pipeline, it is seen from the flow of data through the pipeline that there are no enable signals on this pipeline.

The most important signal, as previously mentioned, is the ALU op busy signal. This says that the ALU-out register 910 is busy, so the next instruction cannot be started. If it is not busy then the contents of the pipeline are meaningless at that stage. Of course, there is always an address in the register but that does not matter. What is important is whether or not there are write enable signals.

Figure 82A:
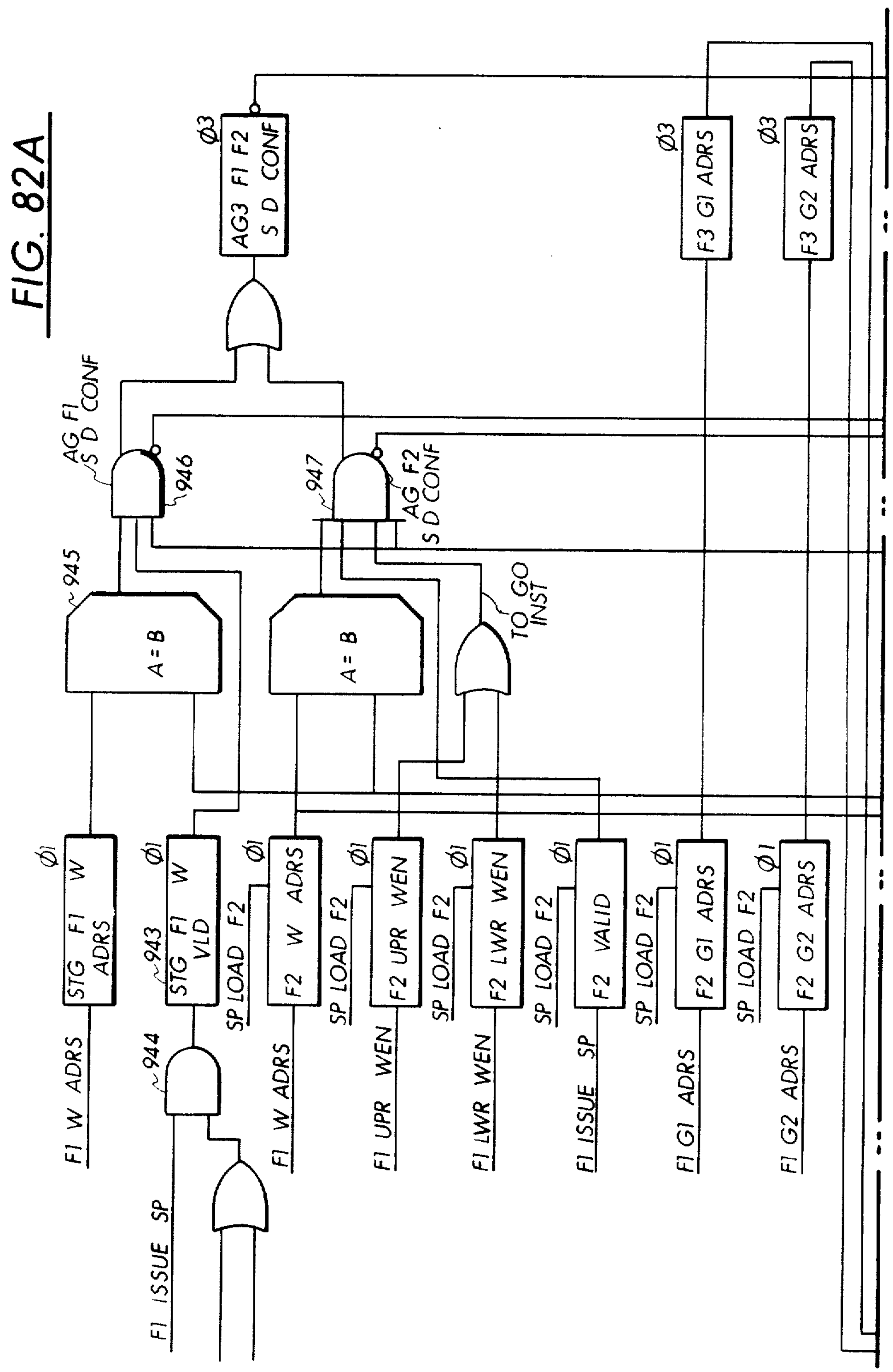
FIG. 82A, FIG. 82B and FIG. 82C is a detailed logical block diagram which illustrates the G read address logic used in the control of the GO instruction.
Figure 82B:
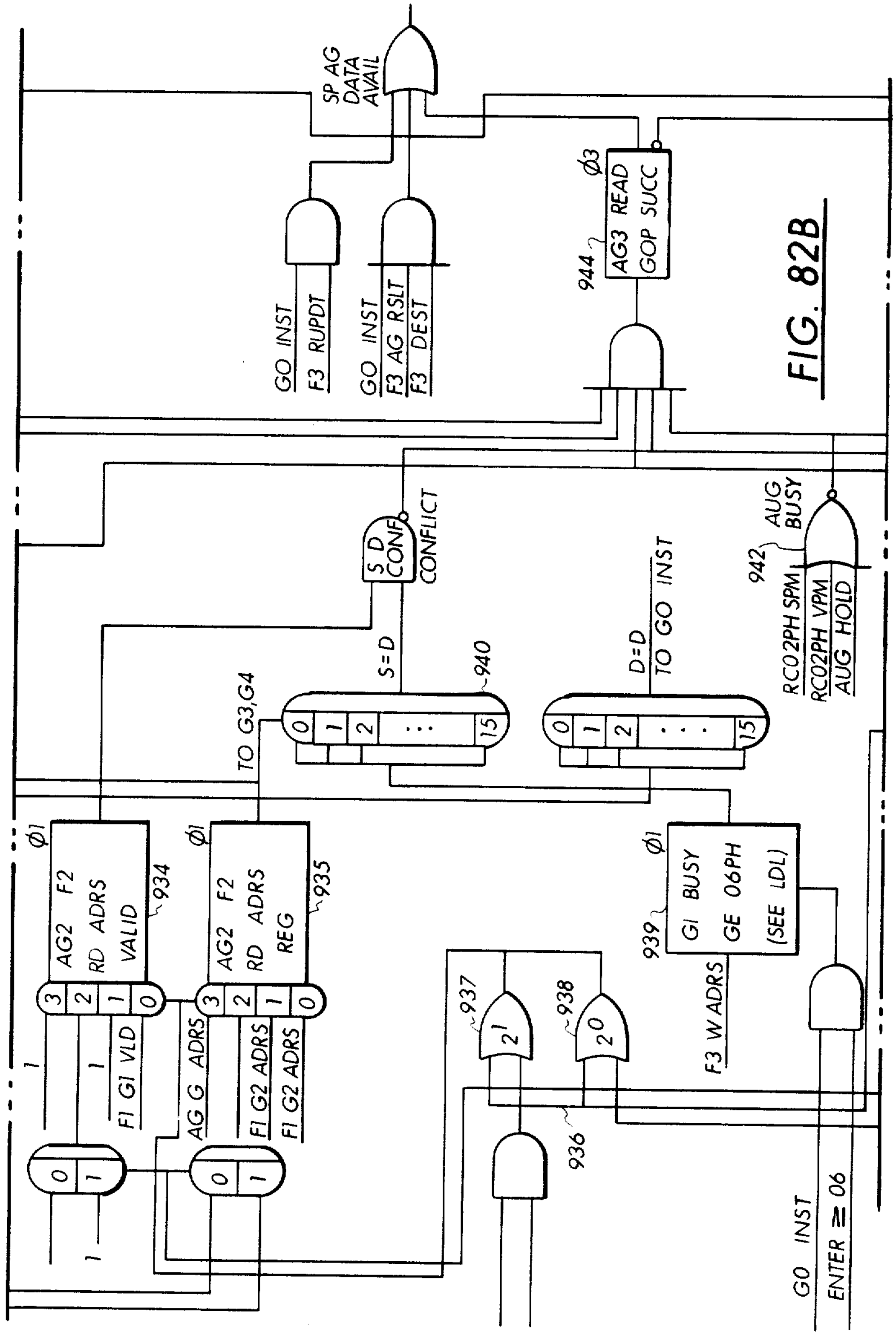
Figure 82C:
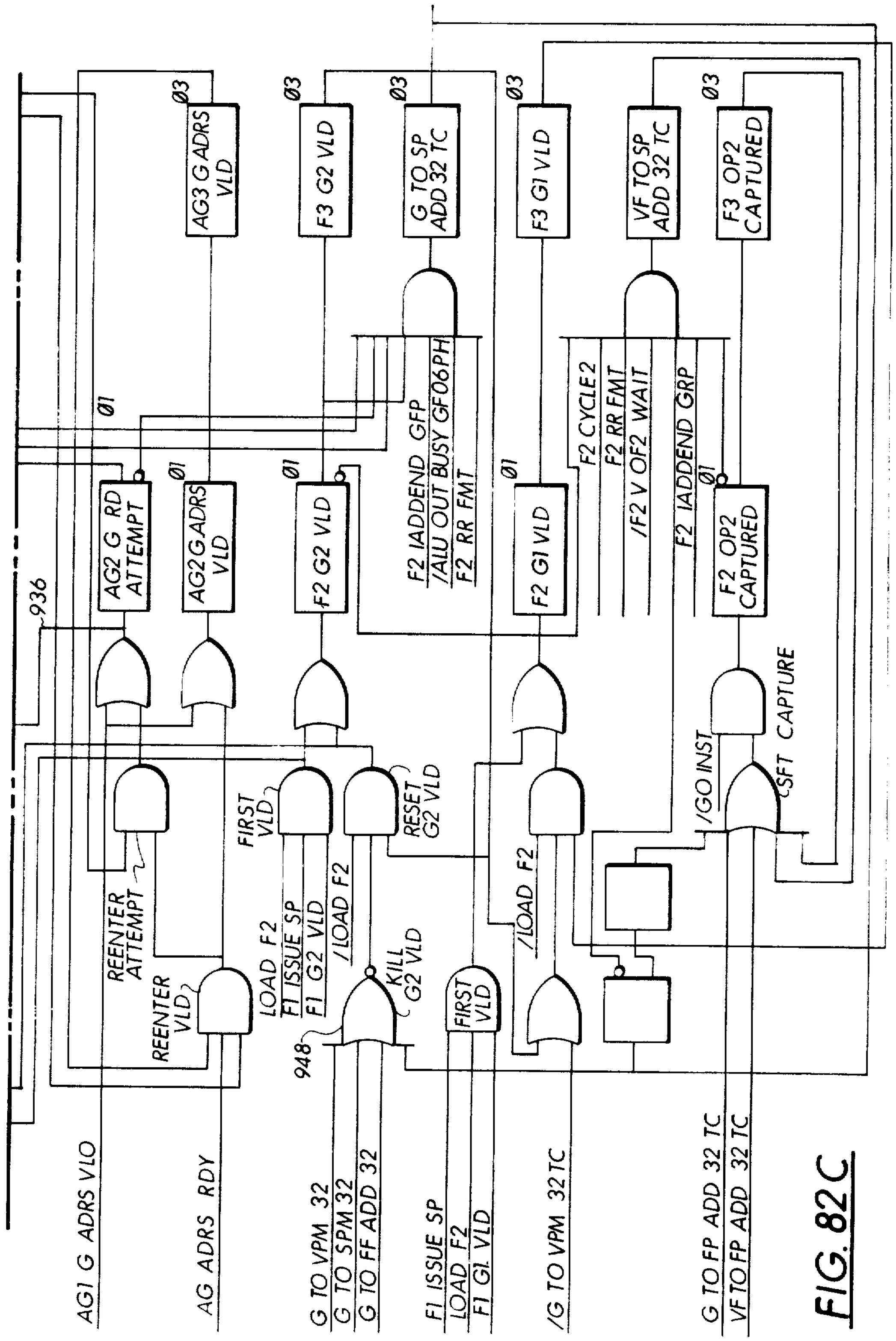

Refer next to FIG. 82 which includes 82A, 82B and 82C and illustrates the G read address logic. Near the center of FIG. 82B is shown an AG2 F2 read address valid designator 934 and an AG2 F2 read address register 935. This is probably the most important part of the control circuit shown in the figure. These control signals are associated with a GO instruction. Now whenever a signal from the IF section orders the read out of an address for address generation, then this must be done as soon as possible no matter what else is being done. This is a 30 nanosecond pulse that is only sent once. So what must be done is to set a designator, called a G reattempt designator. This may not be successful, and it may have to be repeated. Note first that there is a line 936 coming from the input of the read attempt designator that goes into the two OR gates 937, 938. These OR gates are the selector addresses on the AG2F2 read address register 935. This signal forces both of these gates to one and thereby forces the address to a three. Meanwhile over at the address register there is a three and we get the AG one G address. So it is forced to pickup the address immediately. It also forces a one into the address valid designator 934, so now, the address is known to be valid and available. Next, that address is read. If there was a register in the conveyer belt that is to be written some time later, then it can not be read until it gets written. So that means if we were to work strictly off the conveyer belt, it would be necessary to do 7 compare operations, however, there is insufficient time to do this. So the busy bits are accelerated. A master bit is sent for each key register which says that this register is going to be written into at least six phases from now. This is what GI busy GE equal to 06 PH means in that register block 939. In other words, there are 16 such bits and one for G zero and one for G1 etc. For example, if there is a G zero bit in there and if it is set, this means that G zero will be written six phases or later. It is acceptable if it is to be written two phases from now because this is wrapped around into the augend register. But if it is going to be written six phases or later, it is not ready for it. So a lookup is done of those busy bits with the corresponding selector 940 to find out if a conflict exists. In the case of S=D, D means that there is a source destination conflict.

Assume that the other conflicts were resolved, then this AG3 Read GOP success designator 941 is set. The Augend Busy Condition is set if there is a result in the conveyer belt that wants to send data to SPM through the augend register. If there is a result in the conveyer belt that wants to send data to the Vector Module through the augend or if there is an AUG hold condition, we may have to hold data in the augend register and send it to the Vector File. But note that the AUG Busy gate 942 cannot be busy if we are to successfully read out a G register, since that would block the read GOP success output from register 941.

Looking at the upper left hand portion of the FIG. 82A, there is the stage F1 write valid register 943 with its preceding logic which says that F1 issue and the instruction is valid. With the write enable signals at the AND gate 944, it is essentially a gate saying we have a valid instruction which has write enable signals.

First the address is staged, next the address is passed into a comparator 945 to see if the address we wish to read is the same as the address that we want to write from the instruction that has not been seen. If it has not been seen, it is better not to read it. In any event, a potential conflict exists. This goes into the AG F1 source destination (SD) conflict AND gate 946, with the same sequence occuring in AG F2. These two AND gates 946, 947 are activated to go down and block the AG3 read GOP success designator. If all of those conflicts clear, then a read G op success designator is received and if it sets the AG data available gate at the output, then the addresses on the augend will be correct for reading from the G register.

Another point that should be pointed out is that there is a G 2 address valid designator and the logic is such that the first G register to be read is always in G 2. Thus, for example if an instruction required two addresses to be read, the instruction would not issue until at least a G 1 valid designator or the G 2 valid designator drops and any time G 2 is read G 2 valid signals are killed off via the OR gate 948 shown. The inputs are as follows: the G 2 valid signal gets killed off if we have successfully read out to the VPM. This is a accomplished via a timing chain.

An overview of the Floating Point Unit will now be presented. The function and the organization of the unit will be described.

Figure 83:
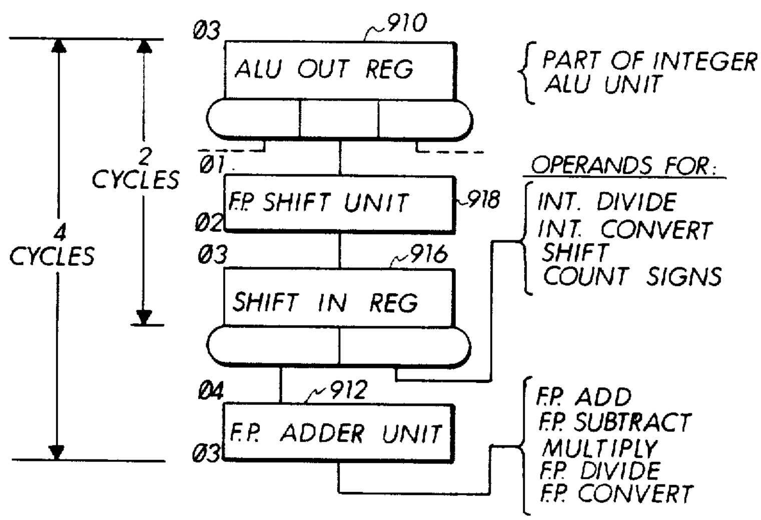
FIG. 83 is a simplified block diagram showing that portion of the Scalar Processor which refers to the Floating Point Unit including the common ALU out register.
Figure 84A:
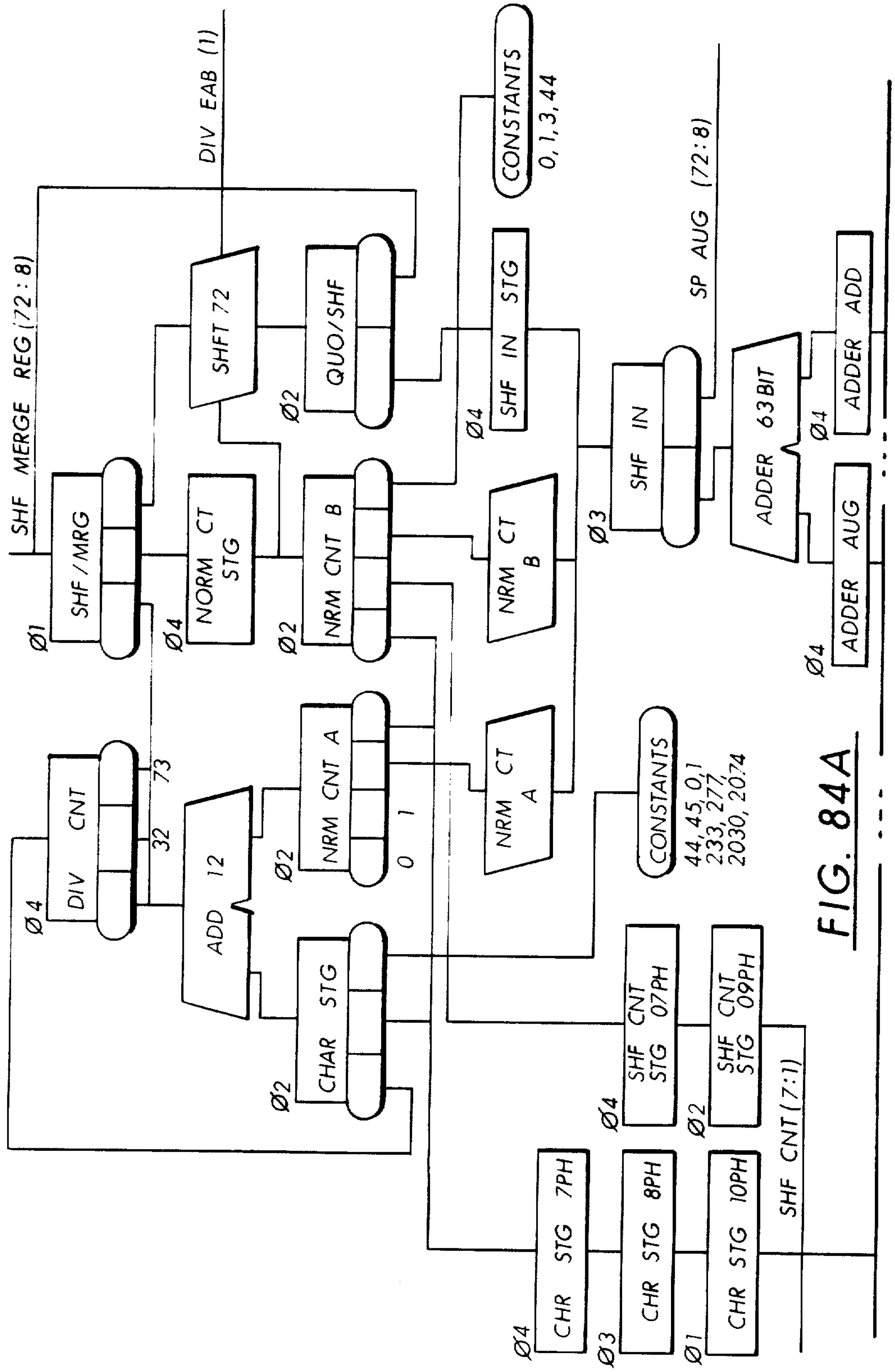
FIG. 84 and FIG. 84B, when arranged as in FIG. 84, is a logical block diagram of the data path through the Arithmetic Logic Unit (ALU) of the Floating Point Unit of the SP.
Figures 84, 84B:
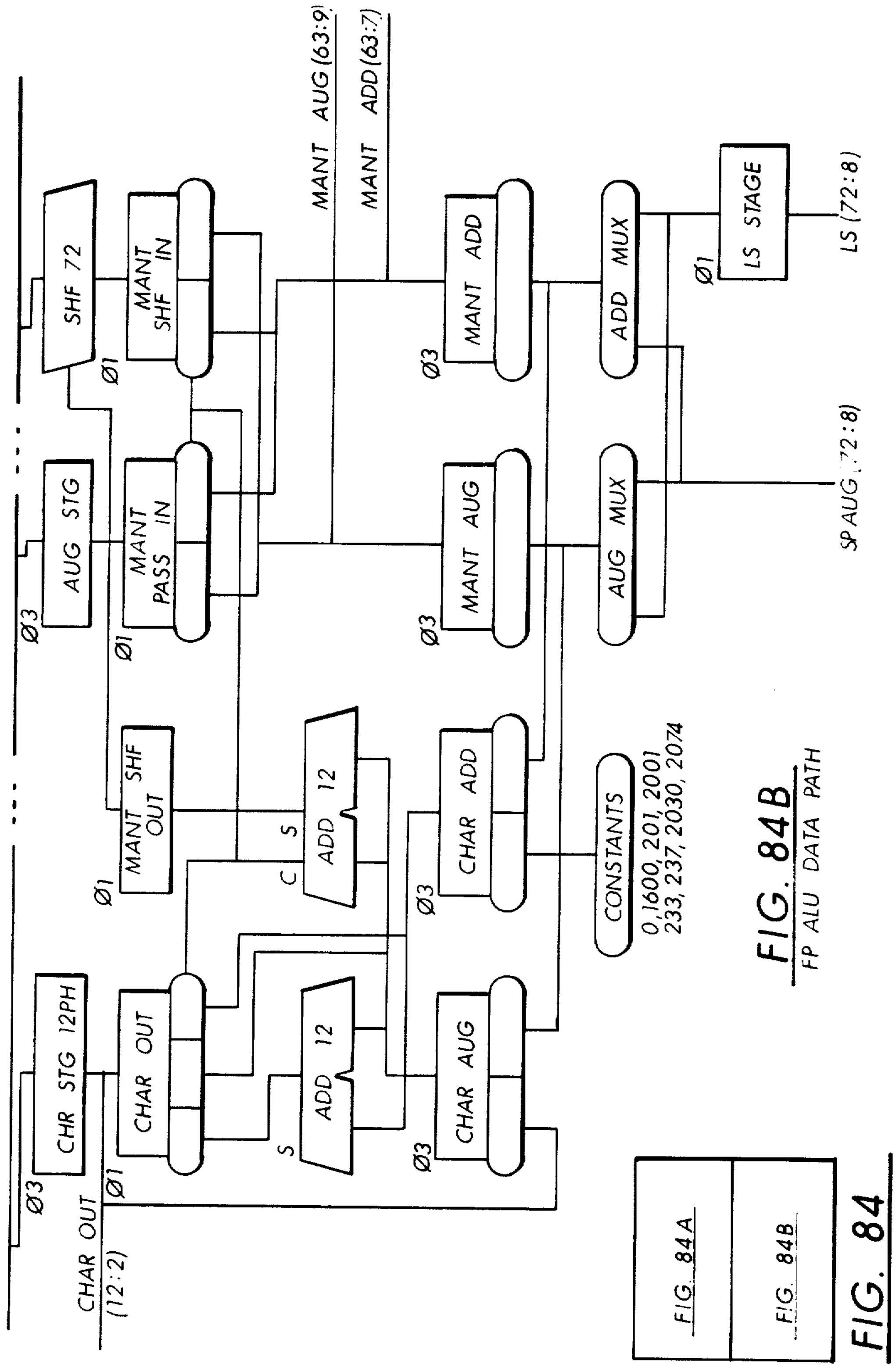

The Floating Point Unit performs the floating point addition, the floating point subtraction, 16 different conversion type instructions, the count leading signs instruction, the shift instruction. It also assists in multiplying and divide instructions of both the integer and the floating point type. The floating point unit has a 30 nanosecond clock as does the rest of the SP. It is fully pipelined except for the divide instruction. A new instruction can be accepted every cycle and it takes two cycles to complete an integer operation and four cycles to complete a floating point operation. The internal data is two words wide and the upper word of the two word path is used on a single precision instruction. A very simplified block diagram of the Floating Point Unit is shown in FIG. 83. The floating point operations, or operands for floating point, i.e. add, subtract, multiply, divide and convert enter at the bottom of this figure into what is loosely called a floating point adder unit 912. This is where the exponent processing and the mantissa arithmetic occurs. It then passes up through the shift-in register 916 and to the FP shift unit 918 where post normalization occurs in the case of floating point add and some processing in the case of the convert. All the results are then sent to the ALU-out register 910 which is part of the integer ALU unit. As is seen, for floating point operations the total time spent in the floating point unit is four cycles. Operands for the various integer operations that are taken care of are the integer divide, the integer converts that are from integers to another data type shift and the count signs instruction enter directly into the shift-in register 916 bypassing the floating point adder unit 912. They then go to the SP shift unit 918 and again out to the ALU-out register 910 and spend a total of two cycles in the unit. FIG. 84 is a much more detailed block diagram of the Floating Point Unit, however, it follows along the same description as FIG. 83.

Figure 85:
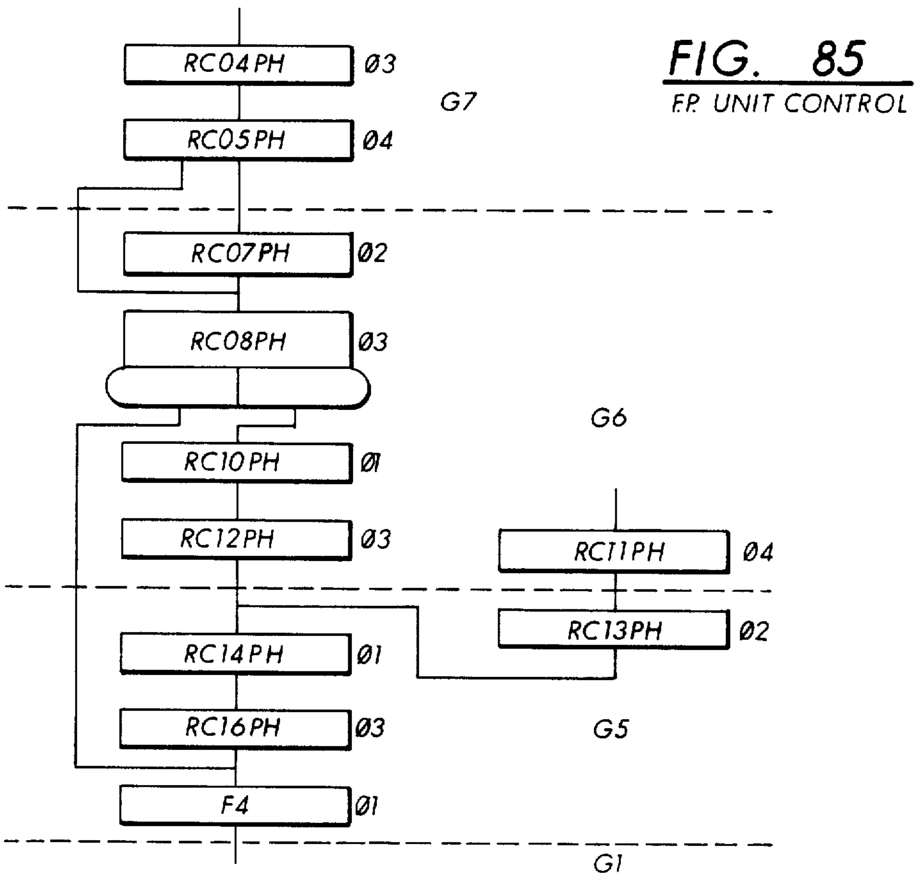
FIG. 85 is a simplified logic diagram of the pipeline control used in conjunction with the Floating Point Unit.

As shown in FIG. 85 the Floating Point Unit is controlled by a pipeline control. The data-in pipeline with various control bits enter at the bottom of the figure, indicated as card G1 below the dotted line. They enter into a register called the F4 register on phase one. For example, these bits might be a bit indicating an add, a bit indicating a subtract and a bit set for each of the other instructions. There are also bits for the data type. Basically the information that enters indicates what instruction is being done and what type of data is being used. These bits are clocked every other phase of the pipeline and there are registers on the right side for timing reasons to get them on the correct phase. There is a register, for example, on phase 2 and one on phase 4. When integer operations are being done, this is where the operands are integers. This is so whether or not the results are floating point. Since the floating point adder section of the SP unit was bypassed in the data path logic, the corresponding control registers in the control pipeline are also bypassed so the selector takes the control bits directly from F4 and pipes them along to the selector of RC08PH. The nomenclature used here for register names is very similar to the nomenclature used in the rest of the Scalar Processor particularly in SP control. Since the ALU-out register is the destination for most of the data it is also the time reference for everything that happens. Therefore, the various registers have been labeled in the control pipeline according to how many phases ahead of the ALU-out register they are. For example, the RC04PH register is four phases ahead of the ALU-out register, meaning that whatever is happening, when this is clocked it will ultimately wind up in the ALU register. This system is then stepped backwards to RC 05, 07, 08, and 010 and so on all the way down to RC16PH, which means that if an add instruction is clocked into this register, the result will be there 16 phases or 4 cycles later, since there are 4 phases per cycle. The very first register has a different name F4 and that is to correspond with the various instruction issue registers in the machine i.e. F0, F1, F2, and F3. This one would correspond to F4 which would be two cycles after F0. The various control registers that look like registers on this diagram actually are made up of groups of designators that are located throughout the logic and no where will they be called registers. So the control is very simple it just follows the data along in the pipeline.

Next it is intended to go through the instructions that the floating point (FPU) unit handles one by one and explain each step of the processing. The add-subtract instruction is probably the most complicated one aside from divide and will be considered first since it will familiarize the reader with every register in the machine.

Figure 86:
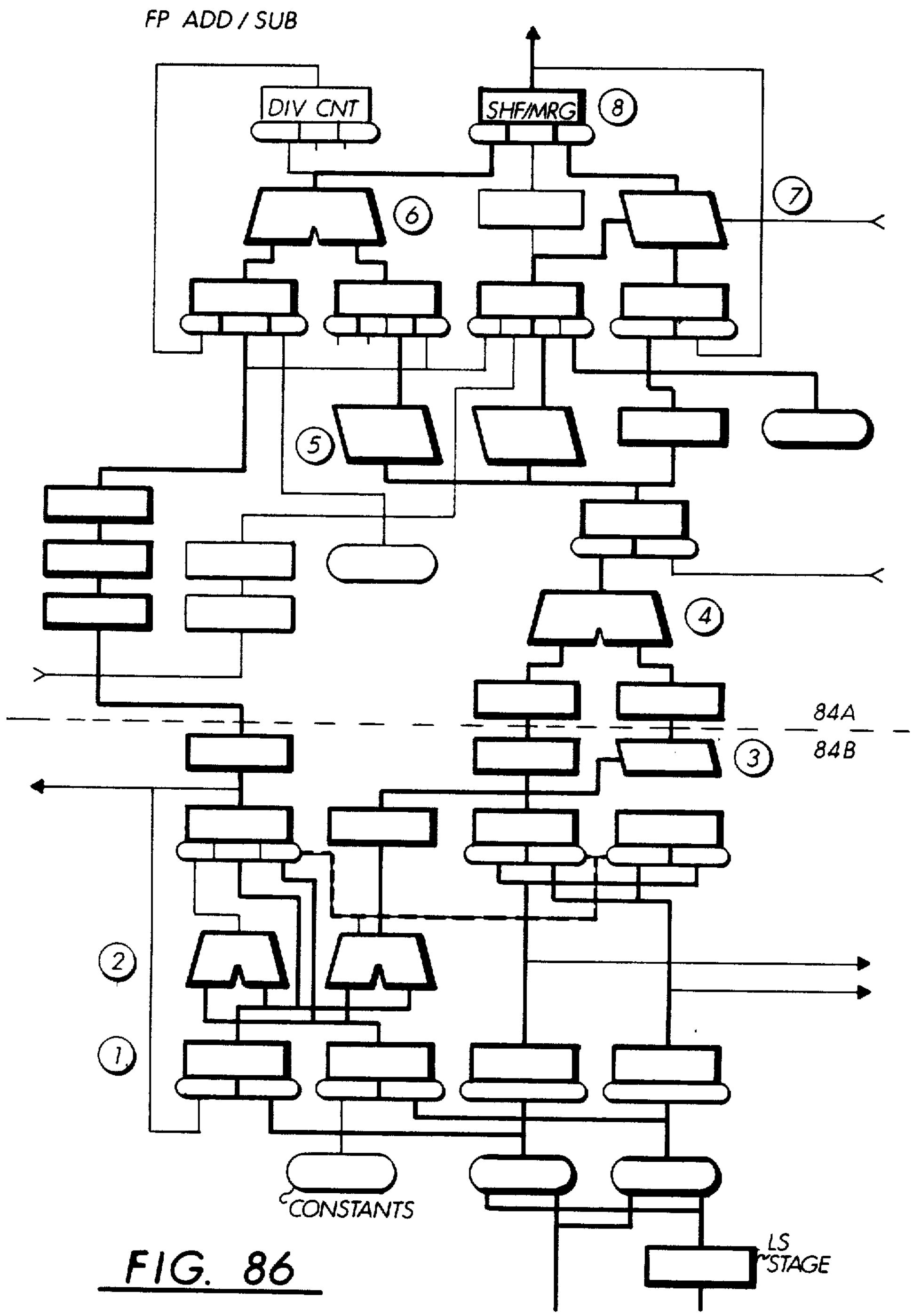
FIG. 86 is basically the logical block diagram of FIG. 84 with the Floating Point Add/Subtract portions shown in a darkened condition for emphasis.

First consider FIG. 86 and refer to number 1 in the lower portion of the figure. Initially note that FIGS. 86, 87, 88, 90, 91 and 92 correspond exactly with FIG. 84, however, without any identifying description. The darkened passages through FIGS. 86, 87, 88, 90, 91 and 92 identify various passes used in various operations and will be described accordingly. Initally, the operands are made positive. Next, the exponent and the mantissa are separated and the sign is saved in the sign processing logic. Then, subtract the exponent and keep the larger of the two exponents and that occurs in the characteristic adder at point 2 on the FIG. 86. The larger exponent is the one that will ultimately be processed for the use as the result exponent. The mantissas is then aligned by shifting right the one associated with the smaller exponent by the difference between the exponents. The shift is accomplished by reference to number 3 on the FIG. 86. Since the shifter is only on the adder side of the mantissa adder, the two mantissas must be interchanged if we want to shift the augend. If the addend is shifted, it is passed directly to the shifter. However, if the augend is shifted then we have to interchange the two and that interchange will affect the operation that is done in the adder. It also determines the resulting sign, so the sign processing logic must keep track of the consequences of that interchange. In the 63 bit adder shown as number 4 in the FIG. 86 we add or subtract the aligned mantissas and determine whether or not an overflow has occurred. The only time this adder performs a subtract operation is during an add or subtract instruction. Then whether a subtract operation is performed is determined by the parity of the subtract instruction, the sign of the augend and the sign of the addend. An add or a subtract operation, in turn, determines.the operation of the mantissa adder. The next thing that must be done is to normalize the result. To do this, all that need be done is to count the number of signs in the sum, however, whether or not that is used will depend on whether there was an overflow. For a moment, consider characteristic processing. What is done here is to take the original exponent which is the larger of the two exponents on the input operand and add one to it, if there was an overflow in the mantissa. Alternately, you subtract the norm count since we are adding one to the result, because an over flow is taken care of by right shifting the results of the add to get the overflow bit back into the mantissa. Otherwise, the result of the add operation is normalized. This means a left shift by the amount of the norm count must be done and this must be subtracted from the exponent. Now if when a one was added to the exponent, the exponent itself overflows, then an overflow has really happened or it it underflows as a result of subtraction in norm count then there really was an underflow and a bit is set indicating that an overflow or an underflow occurred. To review, the result is sent from the adder to the norm count. It is then duplicated for error checking and the norm count is added or subtracted. If there was an overflow instead of a shifting in the norm count or adding in the norm count a constant of one is added and a switch is made to the add mode from the subtract mode. Meanwhile, the norm count goes up to the post normalization shifter and this is left shifted by the norm count. However, if there was an overflow the constant of one comes in from a constant generator into that register. Now that post normalization has been accomplished, and an overflow and underflow detection has been accomplished the exponent and mantissa are merged in the shift merge register, which is the output register on the Floating Point Unit. If the mantissa is negative, in other words, if the result of adding the two mantissas produces a negative number then the exponent must be negative so the exponent is included at this point, so that the two match in parity. Then, in the ALU-out register the results of the correct one compliment notation of the correct sign by either complimenting it or not complimenting it are stored in that register. By examining the results of the norm count it is possible to tell whether or not the mantissa was all zeros. If it is, then the ALU-out register is cleared.

Figure 87:
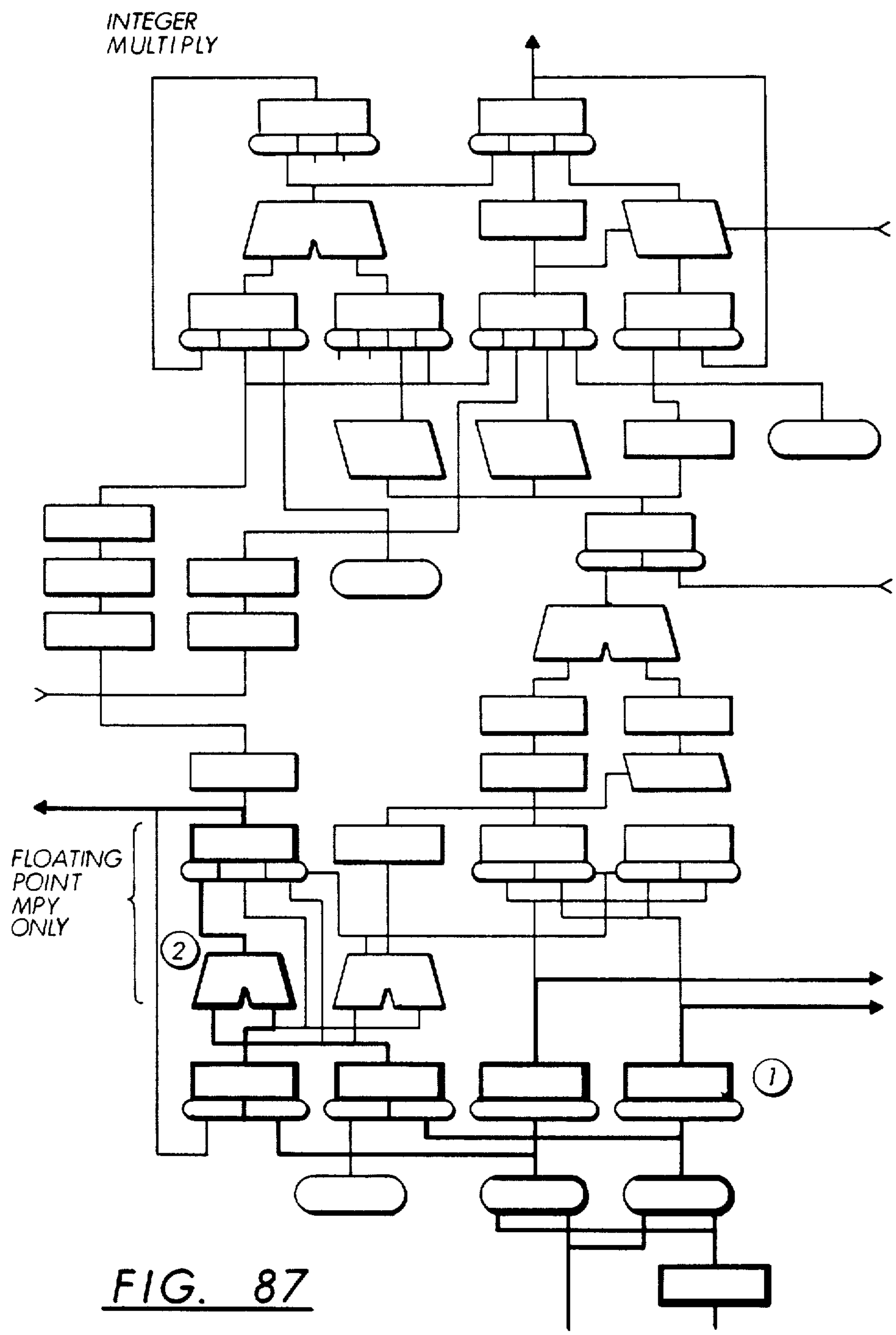
FIG. 87 is again the logical block diagram of the FP ALU data path of FIG. 84 with the multiply portion of the diagram shown in a darkened condition for emphasis.

As shown in the Multiply logic diagram of FIG. 87 the integer multiply is accomplished by making the operands positive. They must be single precision operands and they are positioned in a particular position in the word. The position is not necessarily where a mantissa would appear or where an integer would normally appear. They are positioned correctly for the multiply array and then the sign of the result is computed and the multiplier and multiplicand are sent. The sign of the result is available from the multiply unit where the multiplication is done. This is the same place where the overflow and underflow conditions are detected and the bias on the exponent is corrected. For a floating point multiply operation, the same thing is done. The operands are made positive, the exponents are separated and the mantissa is repositioned in a slightly different position than what it was for the integer multiply operation. Another determination is whether it is double precision or single precision operation because you are allowed to multiply double precision numbers in floating points. Next, the sign of the result is computed which is simply the exclusive ORing of the two input signs. The exponents are then added in the characteristic adder. The multiply unit also takes care of the subtracting out the excess bias by simply adding them.

Figure 88:
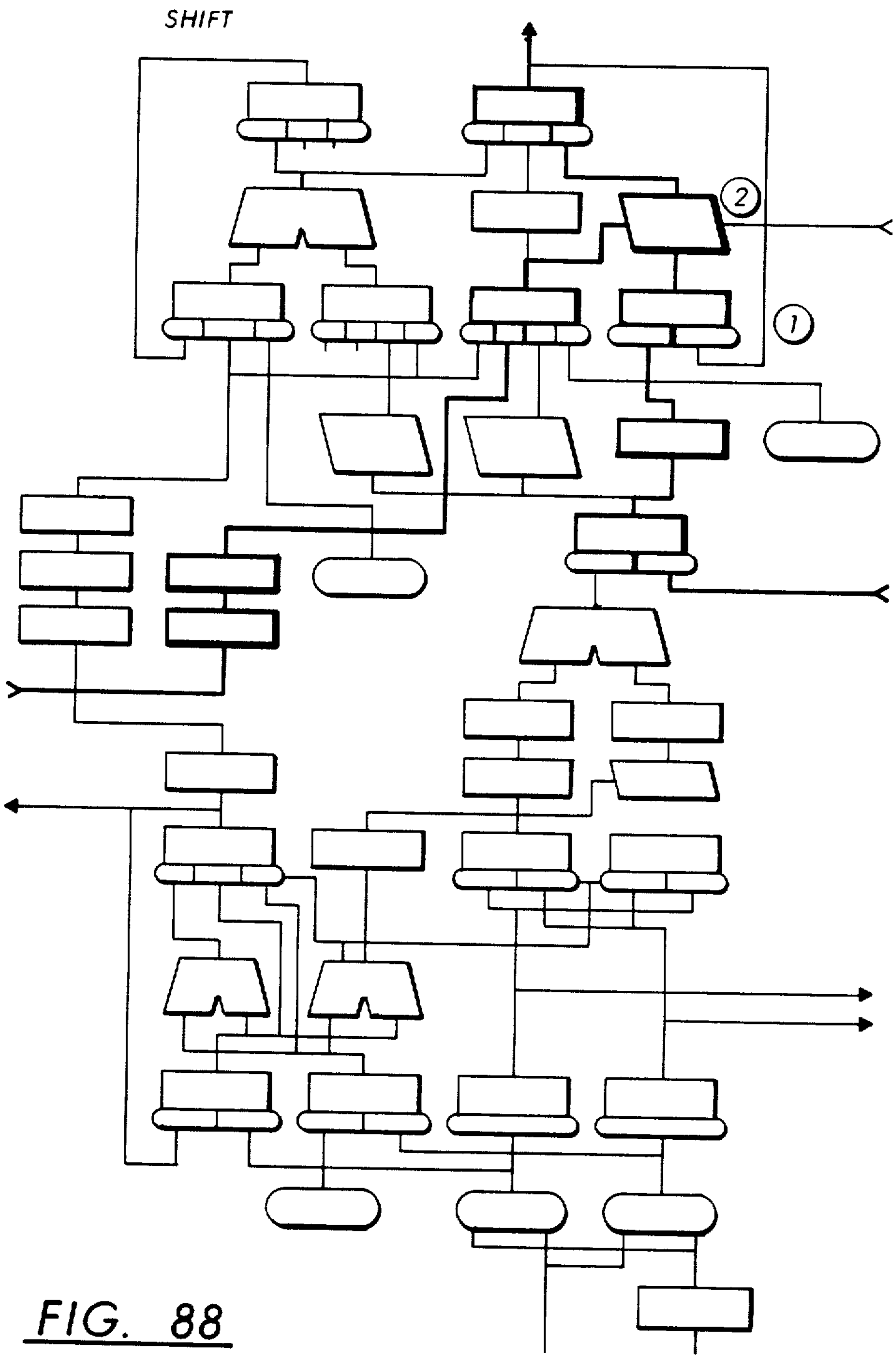
FIG. 88 is a further repeat of the logical block diagram of FIG. 84 with the shifting portion of the data path shown by darkened lines for emphasis.

Consider FIG. 88. As previously noted, this is the same block diagram shown in FIG. 84 but now with emphasis on the shift operation. For a single precision circular left operation, the shift quotient shift register is used. While for a double precision word we take a single precision operand and duplicate it so that when a circular left shift in single precision is done, we are actually doing a double precision left shift which appears circular. For single precision right or left shifts the lower half of the word is filled with signs.

Another simple instruction that is dealt with is count leading signs and this is accomplished simply by computing the required count necessary to normalize the number. We simply count the number of most significant identical bits minus one because the count is the number of bits other than the real sign bits. The normalized count logic has no parity though it is duplicated and the results are compared for error detection. Next the results of the normalized count or leading sign count are sent out as a single precision result to the upper half of the shift merge register.

The next instructions are convert instruction types of which there are sixteen (16). FIG. 89 illustrates the sixteen types of conversion instructions. The sixteen type converts are from any of the four data types to any of the four data types. Remember that you can convert from single precision integer to single precision integer and these are equivalent to move instructions. However, you cannot provide unnormalized data to a convert instruction when you are converting to a different type. All four of the conversion instructions from integer to integer are similar, integer to floating point are similar, floating point to integer are similar and floating point to floating point are similar. There are only four basic different instruction profiles for the sixteen conversion instructions. Subtracting the shift count from the constant, and this happens in all four cases of converting integer to floating point, there are four different constants depending on the kind of conversion that is being done. There are a total of 233 octal as a constant and this minus the shift count gives us the exponent for converting from single precision integer to floating point. Converting from single precision integer to double precision floating point is the same except that the bias is 2000 and since the exponent is bigger the binary point is not moved as much (only 30).

Figure 90:
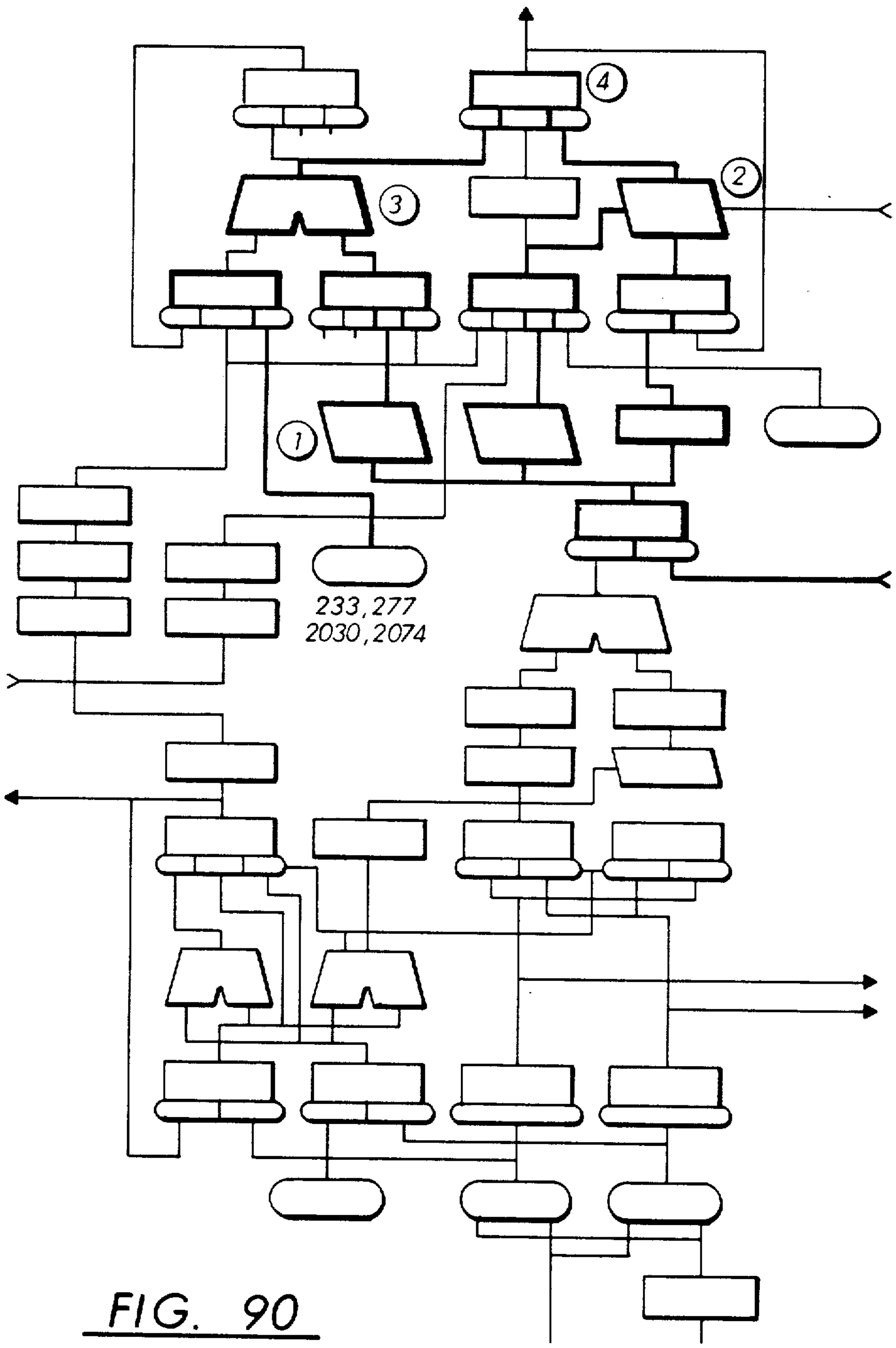
FIG. 90 is the same logical block diagram as FIG. 84 showing the FP ALU data path with the integer to FP conversion logic circuitry shown darkened for emphasis.
Figure 91:
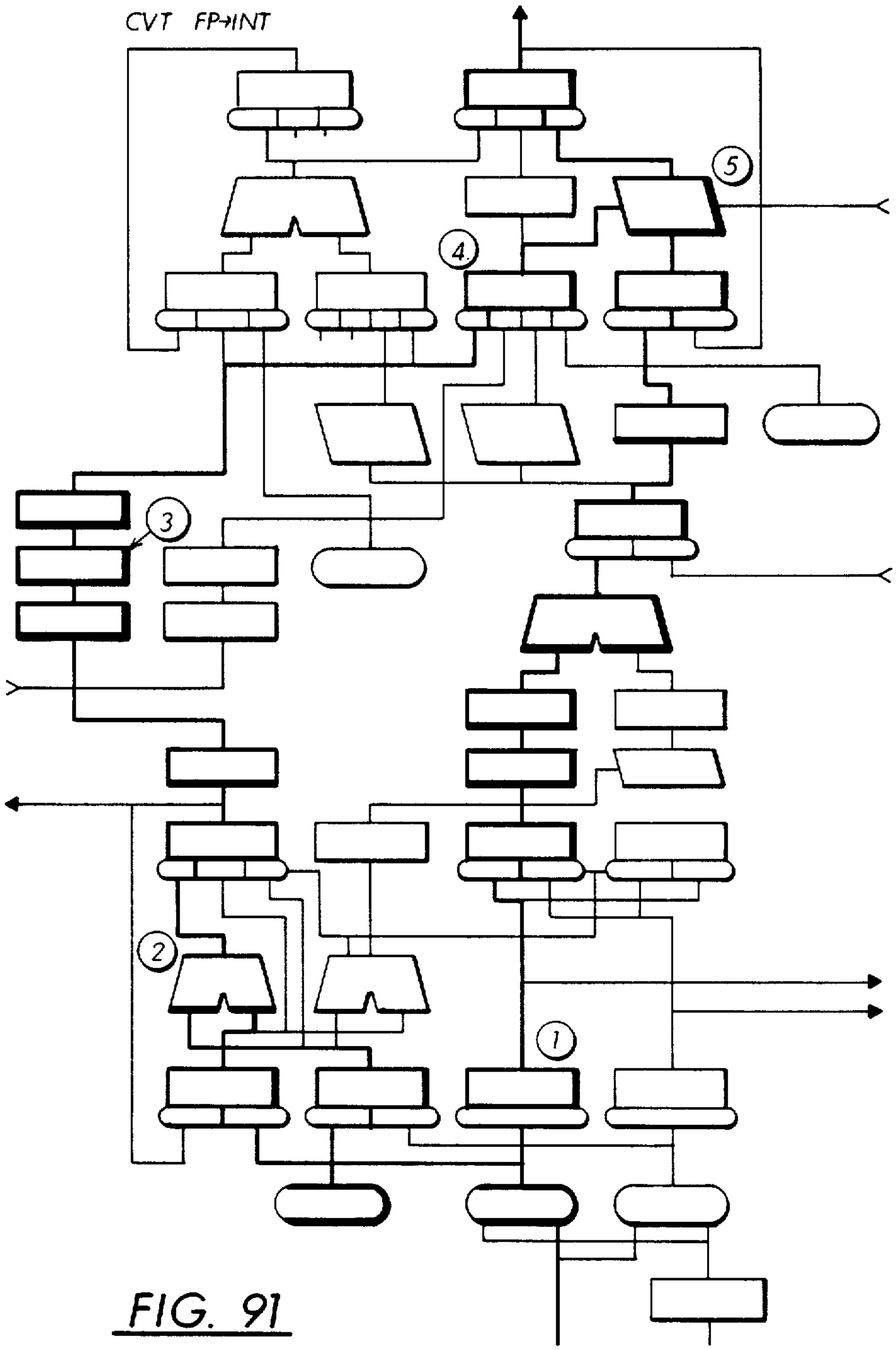
FIG. 91 is also the same as FIG. 84 showing the FP ALU data path with the FP to integer conversion logic circuitry shown darkened for emphasis.

The other two types of converting integer to floating point shown in FIG. 90 are the conversion from the double precision integer to a single or double floating point. In converting from double precision integer to double precision floating point the double precision bias exponent is 2000 octal. Converting from a double precision integer to a single precision floating point is accomplished in the same way, 200 is the single precision floating point number bias, and by moving to point 77 and shifting to normalize, was have 277 octal minus the shift count. Floating point is converted to integer by the use of the block diagram shown in FIG. 91. The operand enters at the bottom of the FIG. 91 and the first operation performed is to make all floating point operands positive. Next, while keeping track of the sign, the exponent is separated from the mantissa. Then the constant is subtracted from the exponent to form a shift count. Because the shifter can only accept positive shift counts the shift count is made positive. Next, at one of the staging registers labelled number 3 on the block diagram of FIG. 91 the right shift designator is set, if it is necessary to make a positive from a negative number. At this point, integer overflow is also determined by detecting that the shift counter was too great. Next, the mantissa is shifted to form an integer. Then, because it is a positive number the location is zero filled. It is not necessary to sign fill, since, in effect, that is being done by the zero filling operation. If the original operand of the ALU-out register in negative it must be returned to the negative form. This shift count is accomplished by taking an exponent and removing its bias. Then, thirty-three (33) octal is subtracted because the binary point is being returned so that the exponent is a minus 233 octal. If this number comes out negative a right shift is done. It is converted to a positive number for the shifter and then the right shift designator is set. For single precision floating point to a double precision integer conversion the bias is subtracted from the exponent and the point is moved seventy-seven (77) places for an exponent minus 277 octal. This is the amount that the mantissa is shifted. For converting a double precision floating point number to integer single precision integer you remove the double precision exponent bias by 2000 octal and the binary point is shifted 30 places so that the shift count is equal to the exponent minus 2030 octal. A double precision floating point (DPFP) to a DP integer, again the double precision bias of 2000 is removed. Next, we move the binary point by 74 places and then subtract 2074 octal from the exponent to get the shift count.

Figure 92:
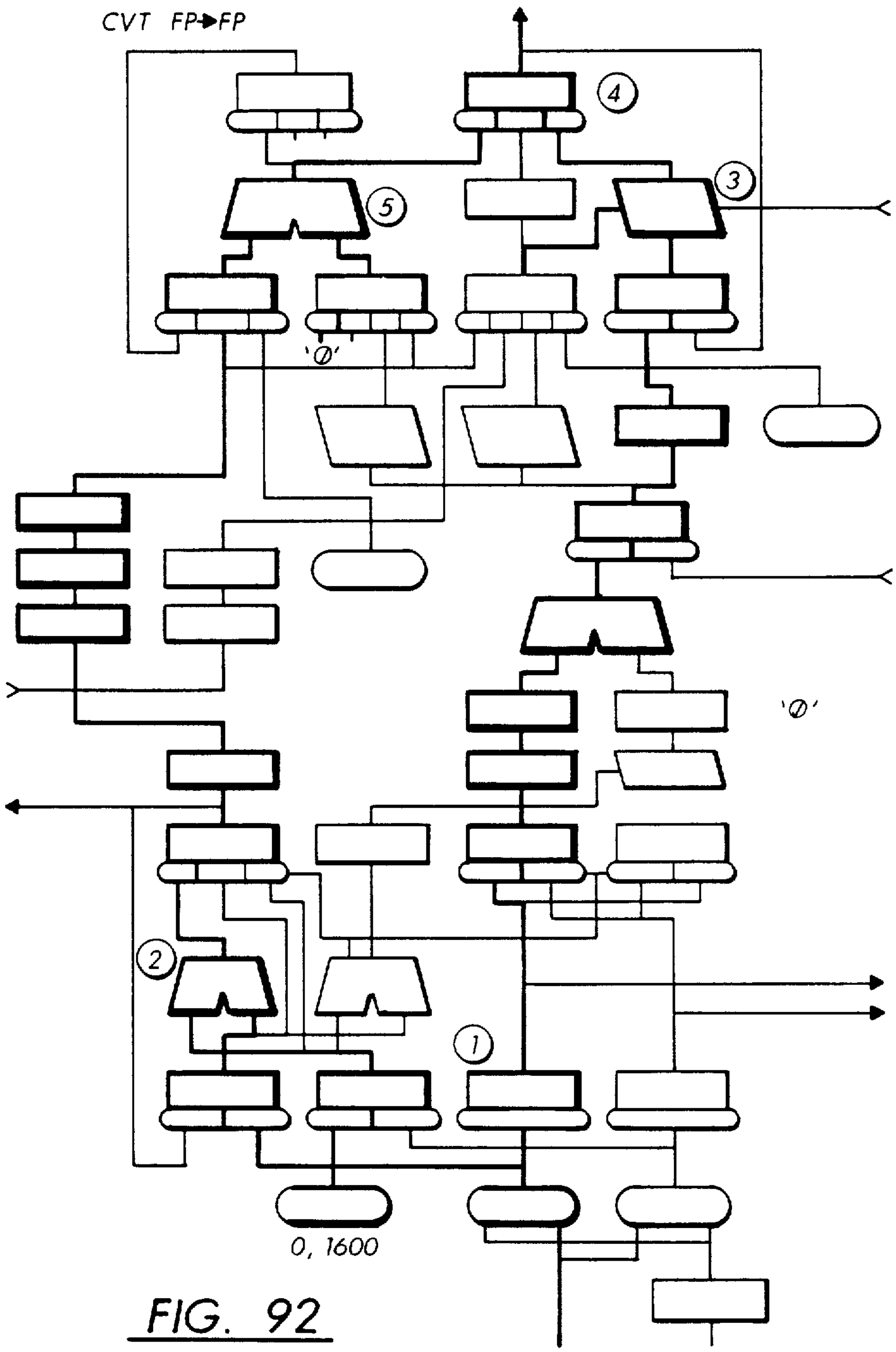
FIG. 92 is also the same as FIG. 84 showing the FP ALU data path with the FP to FP conversion logic circuitry shown darkened for emphasis.

The final conversion type is conversion from floating to floating point. This is shown in FIG. 92. The operands enter at the bottom via the characteristic and mantissa augend and addend registers. Just the exponent is processed and then everything is staged on up to the shift unit where the rest of the convert instruction occurs. First, the operand is made positive and the mantissa is separated. The mantissa is then shifted with a zero fill by three or not shifted at all, depending on the conversion type. The exponent and the mantissa are then remerged. Characteristic overflow or underflow is detected which can only occur if the conversion is from double to single precision. Then the ALU-out register is zeroed, if the mantissa was zero.

To accomplish this conversion the shift count is set to zero and the new exponent is equal to the old exponent. For converting single precision to double precision floating point a right shift by 3 is made and then the new exponent is developed by taking the old exponent and removing its single precision bias. The double precision bias is then added, which means that 200 octal is subtracted and then 2000 octal is added. So the resulting exponent is the input exponent plus 1600 octal. For converting from double to single a left shift of 3 is made because the exponent is three bits smaller. The new exponent is the old exponent minus double precision bias plus single precision bias which works out to the exponent minus 1600 octal. So we have the same constant we just control the sign.

Next is the divide instruction. We will point out some of the important features here of the divide and, in particular, what part of the divide instruction is taken care of by the Floating Point Unit. The control of the floating point during divide is performed by timing chains in the Scalar Processor unit. The fact that the divide instruction cannot be pipelined makes important the function of the Scalar Processor control section in keeping other instructions out of the floating point unit until a divide operation is complete. The reason the divide instructions are not pipelined is because the divide algorithm is iterative and the registers are reused.

The third section on the Floating Point section of the Scalar Processor will be devoted to division instructions. Mainly, the discussion will be on timing and control of the device. As in the case of the other Floating Point instructions, the study of the timing is essential to the understanding of the register usage and scheduling during a divide operation. This is of particular importance in divide because of the fact that substantially all of the registers in the Scalar Processor are used in the divide operation. In fact, some of them are reused several times. The various divide operations that are in the Scalar Processor are single precision integer, double precision integer, which is special in that the dividends can be double precision but the divisor and the quotient are both single precision numbers. Both the Floating Point Unit and the integer unit perform important roles in divide and, of course, the control portion of the Scalar Processor handles all of the control for the divide. The Floating Point Unit prepares the operand which includes making positive both the integer and the floating point divide numbers. This simplifies the arithmetic. First the exponent mantissa is separated in the case of floating point number. In the case of integer numbers they are normalized. This is accomplished by shifting so that there is only one sign bit at the most significant bit. The digit count, in the case of an integer divide, is variable depending on the operands. Whereas, in the case of Floating Point that is determined only by the operand type. The divide count is decremented each cycle and the end of the divide is detected when that count is decremented to 0. In the case of floating point divide the exponent of the result is computed, while in both FP and Integer the sign of the results are computed. The quotient bits are accumulated, one per cycle, and the quotient is computed in the Integer ALU unit. Divide faults and other arithmetic faults are detected and at the end of the divide operation the quotient is restored to correct the ones complement notation because the computed sign of the result has been saved and if it was negative complement the computed quotient with that result.

The role of the Integer ALU will compute a partial remainder and from the sign of that determine the quotient bit. Next, it will shift the partial remainder left one bit and determine whether the next partial remainder will be developed by addition or subtraction. This is done via a non-restoring algorithm. Basically, the Integer ALU will do a one bit shift in an add or subtract operation every cycle. It totally passes control during this operation to SP control. The Integer ALU does the repetitive subtract operation to develop the quotient bits.

To achieve the divide operands, you divide A by B, where A is the numerator and B is the denominator. Further, A is the dividend and B is the divisor and these various terms are used interchangably in various places throughout this description. During operand preparation the divisor follows one cycle behind the dividend through the Floating Point Unit. The operand is prepared sequentially rather then in parallel. First, the dividend goes through and then the divisor follows one cycle later. Control of the Floating Point Unit during divide is not pipelined but it is by timing chain (TC) in the SP control unit. A divide operation must always be complete before another operation can start up in the Floating Point Unit.

FIG. 93 is an illustration of the timing of an integer divide. The first two cycles of the divide are under SP control and represents the time during which the divide instruction is in the F0 register. The operands reach the Floating Point Unit at cycle 3 TC of the divide operation and the next 6 cycles (through 8 TC) of the divide are under control of timing chains in the SP control section.

Although four cycles are shown there are actually more timing chains in this depending on what phase that the timing chain is controlling. If it is controlling a phase register then the timing chain must become active on the preceding phase 2 and so on. So there may be two or three timing chains that control things happening in cycle three and the same with all of the others. This timing chain just stays continuously active for as many cycles as it takes to complete the interation portion of divide. After the start of the interation, there are two timing chains controlling cycles 7 and 8. At the very end of the divide, again there are additional items that must be controlled so there is another timing chain where it is indicated that this is the last cycle of the divide timing chain.

The Floating Point Unit has a plurality of initial cycles which are concerned with operand preparation and the remaining cycles are concerned with quotient computations. Also note that the timing chains are in the SP control section.

The Floating Point divide operation shown in FIG. 94 has two additional cycles. Remember from other Floating Point instructions, that the Floating Point number is due to go through a longer path in the Floating Point Unit. The same longer path occurs for the divide Floating Point numbers that come into the Floating Point addend and augend registers and also the integer numbers that come in through the shift-in register. This adds another two cycles, so instead of having four cycles before the divide count down is started, there are 6 cycles. In addition, further decisions are needed once the count down is started. There are three more timing chains that are initiated once the count down is started. But there is still is a divide count down timing chain and a divide in timing chain. Notice that the timing chains have different names for Integer and Floating Point. In other words, there will be an Integer divide 3 cycle timing chain and a Floating Point divide 3 cycle timing chain. This simplifies the decoding in the Floating Point Unit otherwise they would have to end the timing chain with an operand type everywhere it was used. So separate timing chains are initiated. There is no need to make a distinction here because Floating Point and Integer divide are actually, as far as the divide interation is concerned, identical except for the number of cycles.

In integer divide, the operand preparation is as follows. First, each of the operands are captured. Next, the leading sign count to each operand is determined and the leading sign count is saved. Each operand is then normalized, so there is a single leading sign bit. Next, the operand is sent to the ALU-out-register where it is made positive. This is done in sequence.

Figure 95:
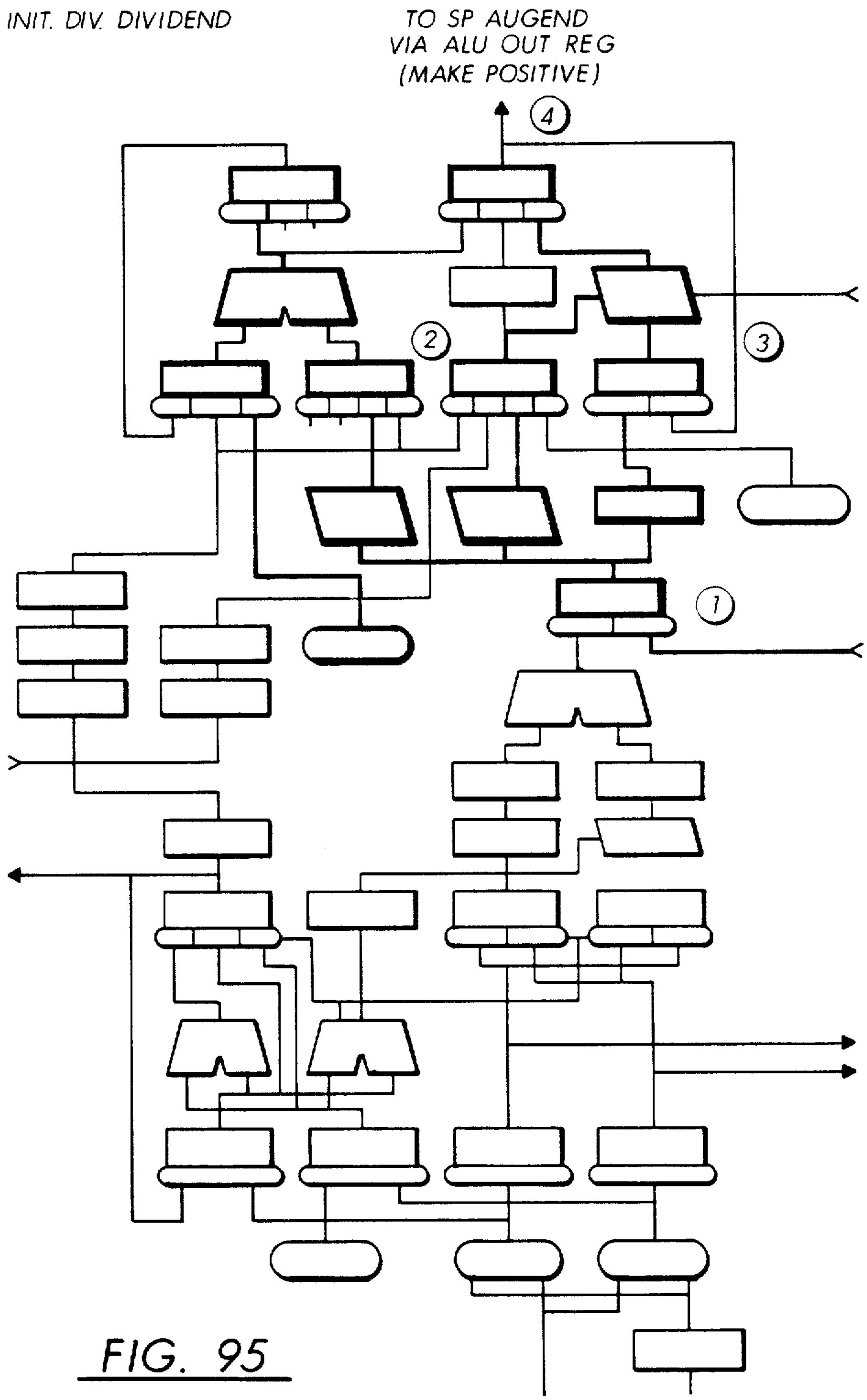
FIG. 95 is again the same logical block diagram as FIG. 84 showing (the FP ALU Data Path with the circuitry used by the integer division dividend shown in a darkened condition for emphases.

Refer to FIG. 95, where the Integer Divide dividend operation is illustrated, using the FIG. 84 FP ALU data path. The dividend enters via the shift-in register and passes on up through the shifter where it is normalized and then out to the ALU out register. Eventually, the dividend resides in the SP augend register. The sign has been captured as the number was entered and when it gets to the ALU out-register it is made positive. The sign is saved internally so that when the next operand is received both signs are used to compute the sign of the result. The norm counters are used for two things. One copy is used to compute the shift count so it is known how much to shift the dividend to normalize it. The other copy is added to a constant, either a 1 or 45 and it is saved in the divide count register for the next stage of the divide count computation.

Figure 96:
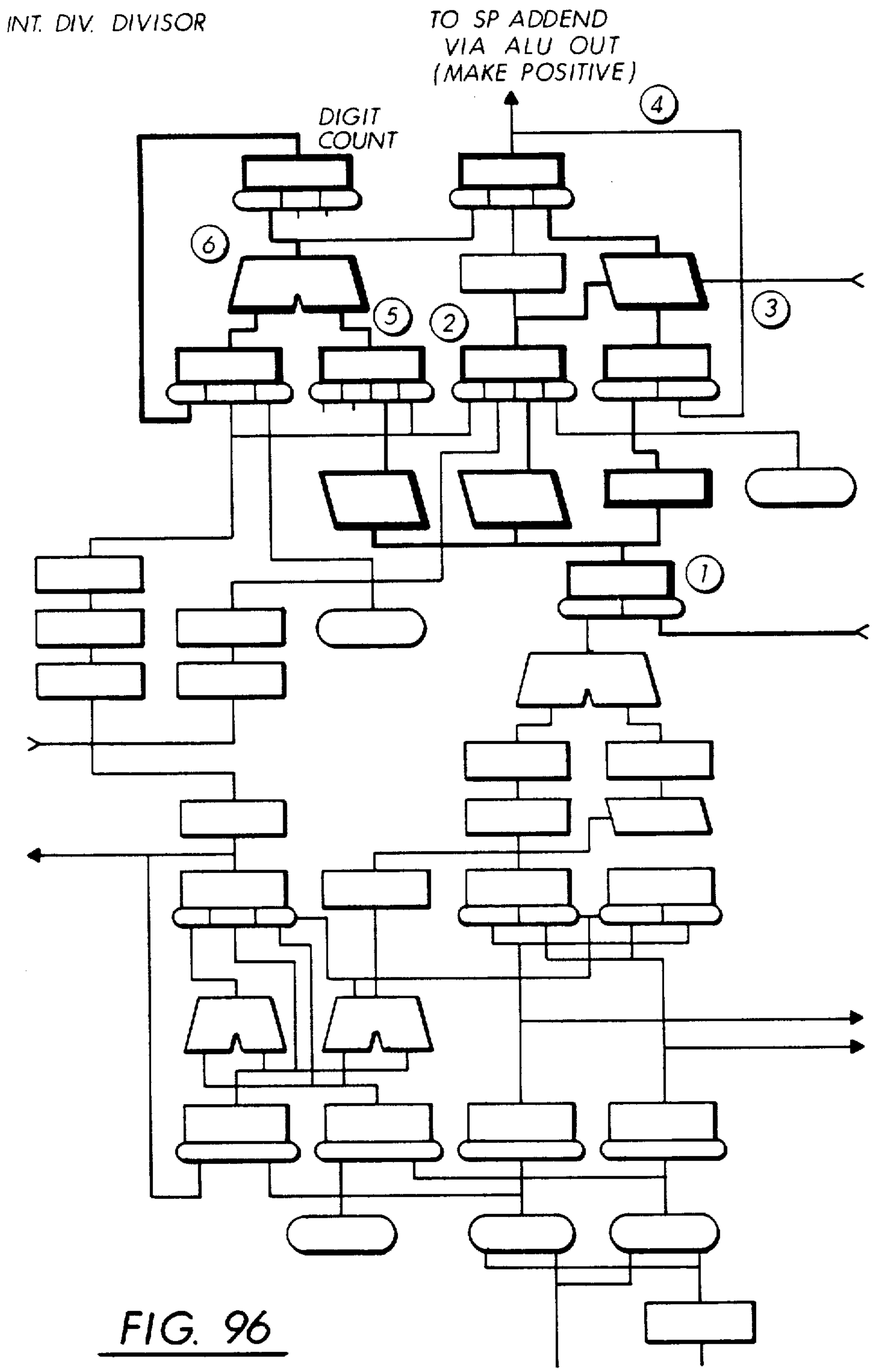
FIG. 96 is again the same logical block diagram as FIG. 84 showing the FP ALU Data Path with the circuitry used by the integer division divisor shown in a darkened condition for emphasis.

The first part of the divide count calculation is one cycle behind all of this. Refer to FIG. 96 where the divisor enters through the shift-in register. It is normalized and converted to a positive number in the ALU out register. It eventually resides in the FC addend-in register where it is held for the entire divide. The divisor is being decremented each clock time and it stays in the addend register for the entire divide. In addition to using the NORM count to compute the amount of shift, the NORM count is also brought in and combined in the adder with the previous NORM count and that results in a digit count for the divide operation. After both operands have been received by the Floating Point Unit the divide count is set during the divide.fault if the leading sign count of the second operand is equal to the word length that indicates that we have a plus or a minus 0. Its occurance is detected on the NORM count A register. We compute the iteration count from the leading sign count. In other words the number of quotient digits are essentially computed by subtracting the leading sign counts. In the case of double precision the 37 is added, because there are 36 bits in the word. This occurs as soon as the divisor is received. The sign of the result is completed by taking an exclusive OR of bit 0 of the dividend (not shown) and the bit 0 of the divisor. This is saved in the flip-flop designator (not shown) until the very end of the divide operation.

Refer next to FIG. 97 which is the timing sequence of the integer divide count calculation. In the illustration, the notation K is the number of leading signs in the divisor, L is the number of leading signs in the divisor and M is the number of digits in the quotient. M is computed, in the case of single precision, simply be subtracting K from L and adding one (1). So the number of the digits in the quotient is equal to one plus the difference between the number of digits in the two operands. This is equivalent to taking the difference between the number of leading signs. In the case of double precision, since the dividend has an extra 36 in it, thirty-six (36) is added to the divide count to account for those extra bits that are to be processed. So instead of the formula being L minus K plus 1, it is L minus K plus 37. One and 37 are the constants that are to be generated in the logic in the first stage. In the first cycle the constant is added to the NORM count of the first operand and the next time around the second operand is subtracted.

NA is for the NORM count A register. DC indicates the divide count register and CS is for characteristic stage register all of which is shown along the left side of the timing diagram of FIG. 97. To start this part of the instruction, there are shown cycles 3, 4, 5, and 6. During cycle 3, there is the NORM count or the digit count of the dividend in the NORM count A register and actually the NORM counters are producing the leading count sign count minus 1, so it is K-1. A constant of either 1 or 37 depending on whether a single or a double precision operation is placed into the characteristic stage register and they are subtracted and the difference is loaded into the divide count registers. On the next cycle the NORM count A register with L minus 1 which is one less than the leading sign count of the divisor, and one cycle behind the dividend, arrives at cycle 4. There we have K minus 1 or 37 in the characteristic stage register and L minus 1 in the NORM count A register. These two are subtracted and the results loaded into the characteristic stage register on the next cycle. This results in the digit count which is the L minus K plus either 1 or 37. During phase 4 of cycle 5 the number of iterations of the divide in the divide count register and from there on, one is subtracted each time. So the digit count is in the characteristic stage register, one (1) is subtracted entering divide count and then back to the characteristic stage register and one (1) is subtracted again and so on. This will continue for as many cycles as there are in the divide operation. Of course, at the time that the divide count is computed it could be less than or equal to 0 and this means that the divide write is ended at that time. These calculations apply specifically to the Integer divide operation.

Meanwhile, as shown in FIG. 98 the calculation of the exponent of the result is being calculated. In this case, there is the difference of the exponents returning to the characteristic augend register where the bias is added. The two exponents are subtracted thereby cancelling out the bias so a correct bias exponent is gotten for the result. Further, the bias again added in since, in fact, the exponent plus 1 is really desired. So either 201 or 2001 octal is again added. Once this is computed the exponent A minus B plus bias plus 1 is passed through the entire unit and into the shift merge register 918 which corresponds to the output register of the Floating Point Unit.

An example of the divide operation of the non-restoring division algorithm is shown in FIG. 99. Assume that a division is being accomplished for six bits plus sign. Assume further that the division operation has the decimal 19 divided by decimal 3. This, in binary, is 0010011 being divided by 0000011. The result, of course, is six or binary six which is 0000110 with no remainder. If this were being done in Floating Point, the result would be to the nearest whole integer. To do this, we normalize the first one and the second one so that we have one sign bit and the first significant digit of each operand. In keeping with the notation 19, herein called A, it has a digit count of $K=2$, while 3 or B has a digit count of $L=5$. Since the digit count is equal to $L-K+1$, then $5-2+1=4$ for a digit count. This means that there will be 4 bits in the quotient. The first quotient bit can be 0 in this case but it also can be one depending on what these two numbers are. So there are potentially four bits in the quotient. This also means that there is a four cycle iteration getting one quotient bit each time. Assume that the binary point is after the sign bit just to keep track of the division between the separation between the actual number and the sign, of course, as long as the binary points are both in the same place it doesn't matter where they are put. For this example, assume that the binary point is after the sign for convenience. The SP Augend is therefore 0.100110 and the SP Addend is 0.110000. Keep in mind here that the top number of each operation is in the SP Augend register and the bottom number is in the SP Addend register, with the result appearing in the ALU out register. So, the first thing that is done here is to subtract the adjusted divisor from the adjusted dividend. This gives a partial remainder and the partial remainder can have either a positive or negative sign depending on whether or not the divisor fits into the dividend.

Next, consider non-restoring division, i.e. where the number does not fit as shown in FIG. 99. In this case, the next cycle will be an add rather than a subtract, and it is always controlled by the sign of the partial remainder. If the sign of the partial remainder is 1, and the quotient bit is 0 then the next operation will be an add. The partial remainder is then shifted by 1 to the left and, of course, to sign fill. Once again, the divisor is subtracted to produce a new partial remainder. This time it so happens that the sign of the partial remainder is positive. This means that it does fit, so next quotient can be set equal to one and on the next iteration, a subtraction is performed. Again a left shift be 1 bit in sign fill is performed and the partial remainder is again put into the SP Augend register This left shift occurs in the ALU out register. Again there is positive partial remainder. Quotient 3 is a one and another subtraction is then performed for the final cycle. This time the partial remainder is positive which means that there is a 0 quotient bit and nothing more need be done. Despite the fact that if one could have continued and computed more bits they would have been meaningless and the fact that there isn't a partial remainder simply means that the 19 divided by 3 is not exactly 6.

To perform restoring division the operation starts out the same way. The divisor is subtracted from the adjust divisor and then the dividend is adjusted to get a negative partial remainder. This indicates that the first quotient bit is going to be a 0. Because the divisor does not fit into the dividend, the dividend is restored to its original form. Any time there is a negative partial remainder, another operation is added to restore the dividend or partial remainder back to the original, after which it is shifted left again by one bit and the subtraction is attempted again. This time the result of this subtraction turns out to be positive and since there is a 0 sign, the quotient bit is a one. The remainder of this sequence proceeds exactly the same as the operation of the non-restoring division. The last quotient bit is a 0 but it is not necessary to restore in the last cycle since no further bit need be computed. The non-restoring division operation is faster than the restoring operation because the extra restoring cycle is not required after every unsuccessful subtraction and restoration, as required in the non-restoring division operation. In restoring division, the dividend is restored and then multiplied by 2, after which the subtraction operation attempt is repeated. In non-restoring division, a subtraction is made from the dividend, if that was unsuccessful, an equal number is added again.

Figure 100:
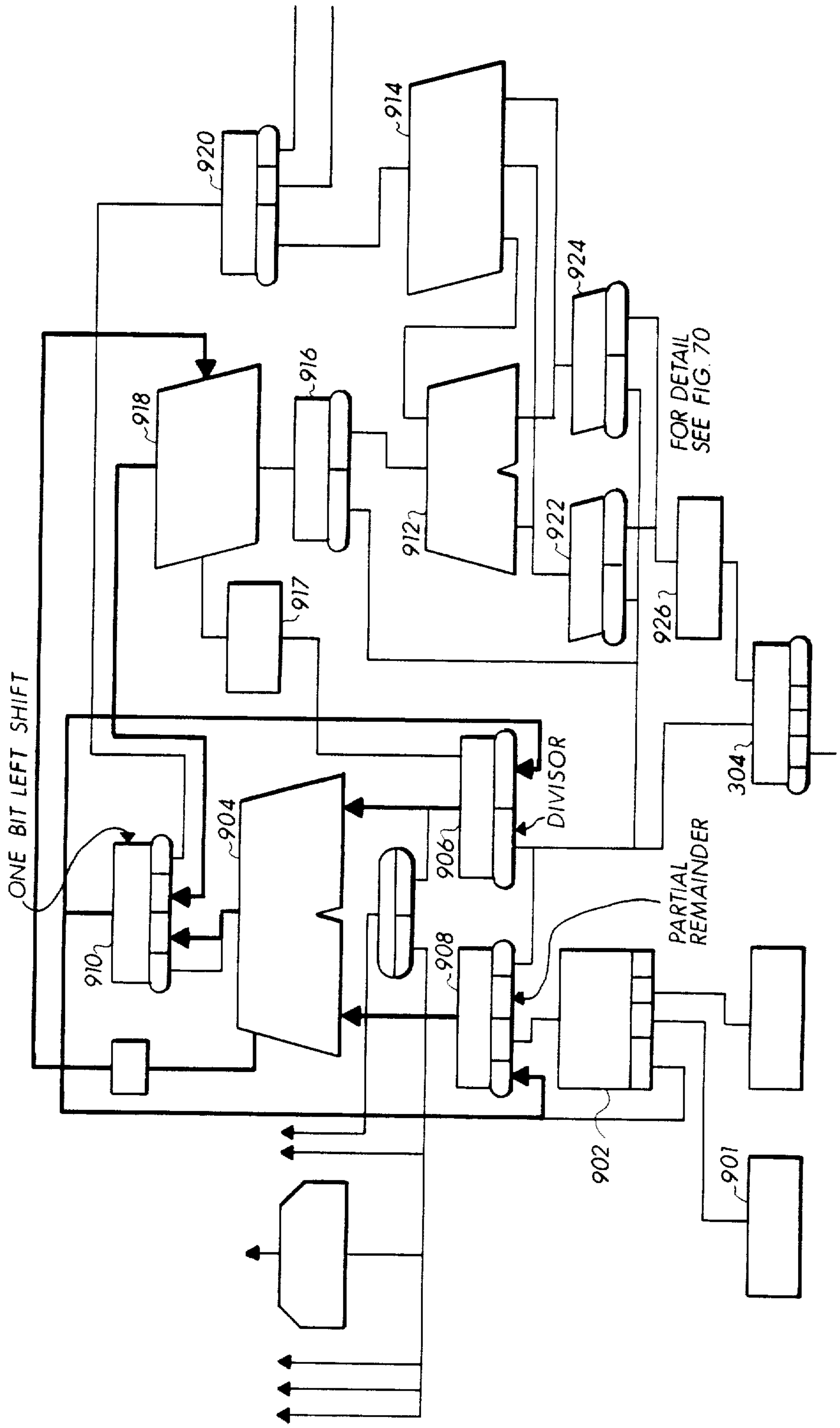
FIG. 100 is the same logical block diagram as that shown in FIG. 70 showing the Scalar Processor with the circuitry used by a division operation shown in a darkened condition for emphasis.
Figure 101:
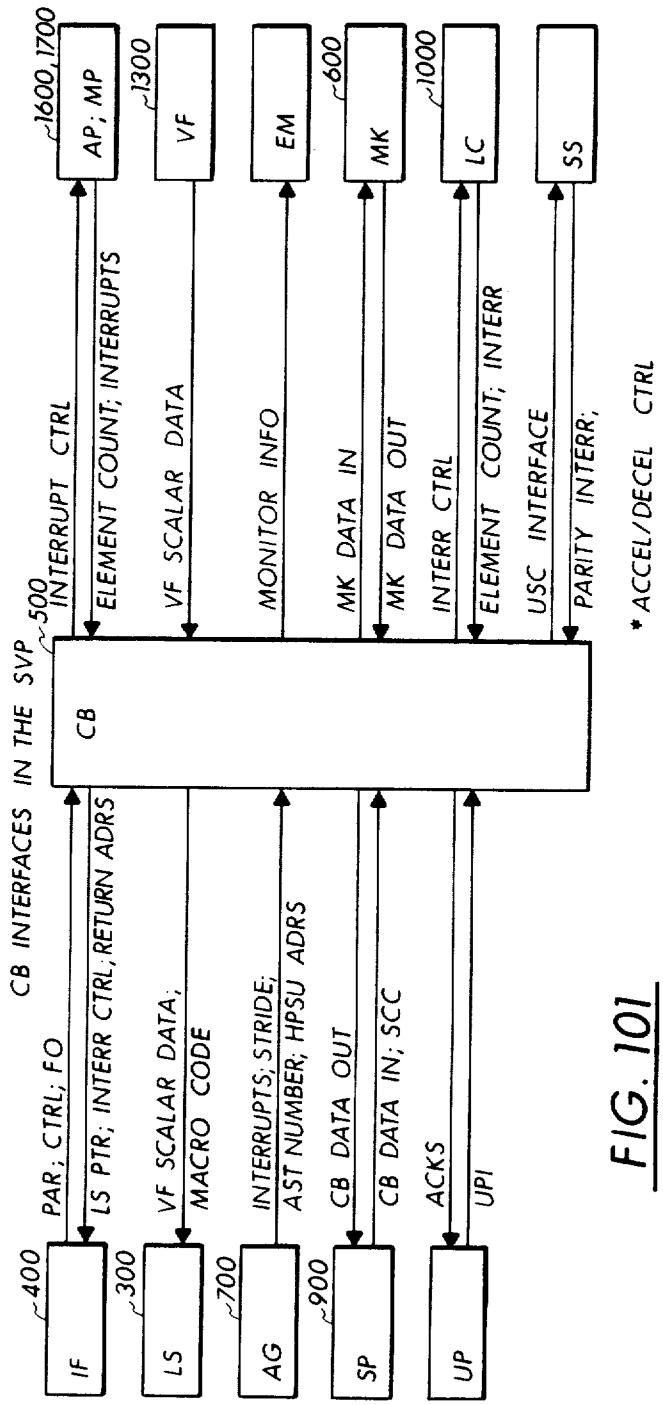

This is shown on FIG. 100 where the iteration is occurring on divide. The quotient is accummulating on the shift merge register and the shift merge register is then transferred down to the quotient shift register. On the next cycle, it is passed up through the shifter to the ALU out register where it is left shifted 1 bit and the quotient bit is added in the right.

d. Scientific Processor Control Block (SPCB)

First of all, the Control Block (CB) 500 may be defined as including SPCB registers and State registers. These registers have the address pointers, state information and hardware status for interrupts. The state information is used for controlling the activity on the Scientific Processor. It also includes a jump history stack or file which keeps track of jumps during the execution of a user program. Further included is the state and macrocontrol logic that handles the acceleration/deceleration operation of the SP through macrocode. Now, in more detail, consider the sixteen SPCB registers. The first five registers 0–4 will not be discussed because they are either unused or reserved for software. Register 5 contains an address which is to be loaded as a new activity into the SP. There is an area in the HPSU that has the contents of the Vector Files and the register of the SP stored in the HPSU. Register 5 contains the real address pointing to that area. Register 6 includes a speed control bit. This is bit zero of that register and it tells the SP whether to run in overlap or nonoverlap mode. It also has Activity Segment Table (AST) entries. When a new activity is loaded into the SP it is accompanied by the loading of the translation section called the Address Generation (AG) section. This Register 6 indicates the number of entries that are going to be loaded. Register 7 has a virtual address of the internal interrupt handler. If an internal interrupt is encountered while the SP is processing this register, it indicates the address of a software handler for that interrupt. Registers 8 through 11 are hardware status registers (HSR). They basically hold error information which helps the host processor analyze the situation after a program is off loaded. SPCB Register 12 is the Program Address Register (PAR). This contains the address to start a new activity. All new activities are started at a virtual address. Register 13 contains AST reference indicators. Whenever the AG performs an address translation it sends over the number of the entry that it used to complete the translation plus a master bit which is set in Register 13 corresponding to that entry. Register 14 is skipped and will not be discussed here. Register 15 is a quantum timer which is initially loaded with some value by the host and then is decremented from for each instruction that is executed.

Next, look at the sixteen SP state or S registers S0 to S15. Again there are several that are going to be unused or reserved for software so the first registers to consider are Registers S4 and S5. These are the Mask Registers. The Control Block does not have any real connection with them except to act as a conduct to pass the data over to the Mask Processor which handles all of the operations with the S4 and S5. Register S6 has the scalar condition code bits. This is a two bit field that is set following the compare instruction. Register S7 is the Local Storage Stack which provides an addressing location into the Local Store. Register S8 has the internal interrupt indicators so if an internal interrupt is encountered the corresponding bit is going to be set in S8 register telling us which interrupt occurred. Register S9 is an interrupt instruction. When an internal interrupt occurs, the instruction during which the interrupt occurred is stored. Register S10 is the External Monitor register. It feeds data to the External Monitor (EM) section to control that portion of the logic. The CB only passes the contents of this register on to the EM. Register S11 is the internal interrupt mask register. It controls the handling of the internal interrupts. Register S12 is this internal interrupt return virtual address. When an internal interrupt occurs in S9, the instruction is stored away. In S12, we store the address plus one for a return address. We will skip S13 for a moment. S14 is the break point address and S15 is another timer. It is basically a cycle counter and is initially loaded with some value and thereafter counts down for each cycle. If it goes below zero it causes an internal interrupt. In which case, the return address is placed there instead of in S12. Next, consider how the CB fits into the rest of the Scientific Processor so far as interfaces are concerned. There are quite a few interfaces into and out of the Control Block. Many of them are concerned with the interrupt logic so we will start there with reference to FIG. 101. Referring to the upper right of the figure, the Add and Multiply Pipes 1600, 1700 of the Vector Processor Module sends interrupts back to the CB 500. They also send the element count on the vector instruction where the interrupt occurred. The scalar data from the Vector Files 1300 just passes through CB 500 and over to Local Store 300. The EM is where the register S10 comes into play passing the data over to this section. The Mask Processor 600 uses CB as an input/output source while the Loop Control 1000 sends over interrupts and receives control. The Loop Control 1000 also sends over an element count which is used in the quantum time for instruction value calculations. Scan Set (SS) collects all the USC errors in the SP and combines those and sends those to a single register of the CB interrupt logic. It also provides the USC interface to accomplish maintenance functions, some of which are handled in the CB while on the other side, the Universal Processor Interface provides an interface from CB to the host processor.

The Scalar Processor 900 also provides the input-/output for the CB. All of the data entering or leaving the CB passes through the Scalar Processor. It also sends over the scalar condition codes following a compare instruction. The Address Generation 700 section sends over quite a few external interrupts and also the AST number which was put into the SPCB register S13 as AST indicators. When we have an interrupt that concerns the HPSU or the MUA, we store away the HPSU address and the AG 700 sends that to the CB. It also sends information on how we are stepping through the memory. This information is used in the quantum timer for instruction value calculations. The Vector File Scalar Data passes to the CB Load Store. Also the macrocode which does the acceleration/deceleration is held in memory in CB. It eventually is held in the instruction buffer as it passes through to the Local Store 300.

Figure 101:
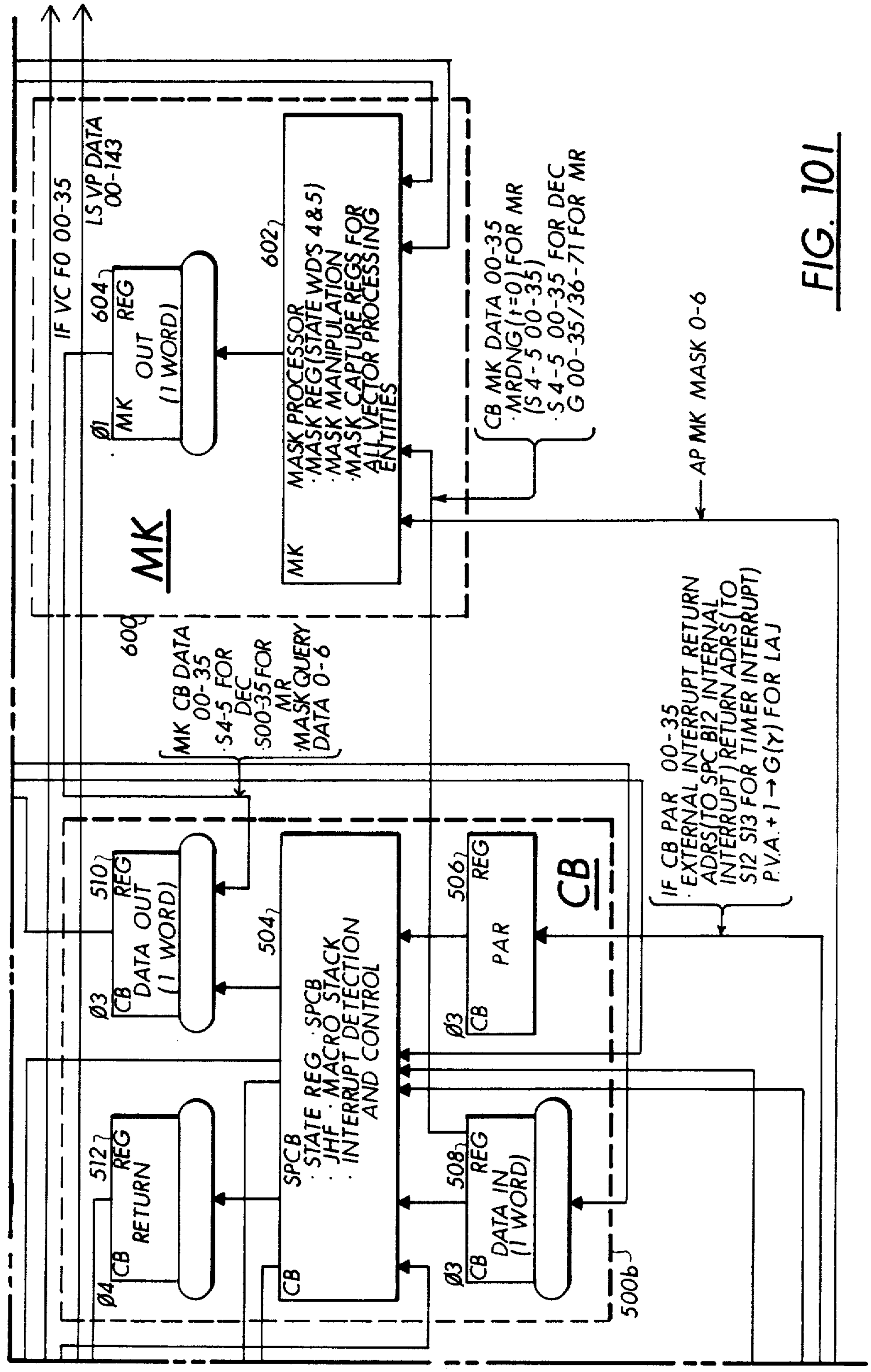
FIG. 101 illustrates the CB interface lines used in interconnecting the CB within the SVP.

The last section of FIG. 101 is the IF section 400. First, it sends over the control bits for any execution of instructions. It also sends over an encoded copy of the F0 register where the instruction itself is again used in the quantum timer instruction value. It is further passed over to the External Monitor interface. The contents of the program add register are sent to the CB for interrupt status capture. The Control Block 500 sends over in S7 the Local Storage Stack word and in that word there is a pointer which sends them over to the IF. Also, there is the interrupt control from CB 500 to the IF 400 and the return address. When a new activity is started we have a start address which was in SPCB S7. It is passed from CB 500 through the return register over to the IF 400.

Figure 102A:
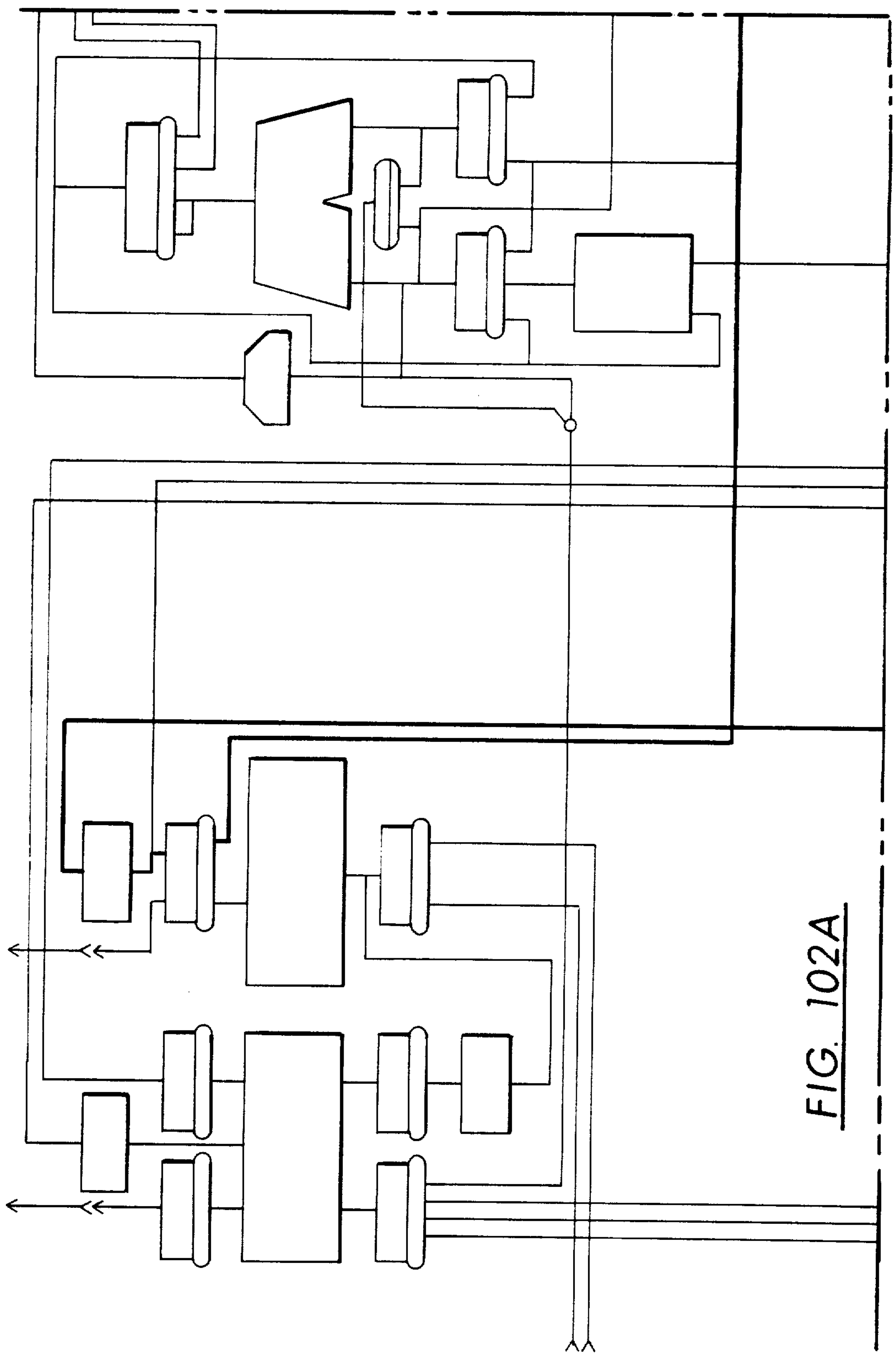
FIGS. 102A–102D, is the same logical block diagram as that shown in the drawings organized by FIG. 10, showing the Scalar Processor Module, however in this FIGURE, the CB portion of the SPM is darkened for emphasis.
Figures 102, 102B:
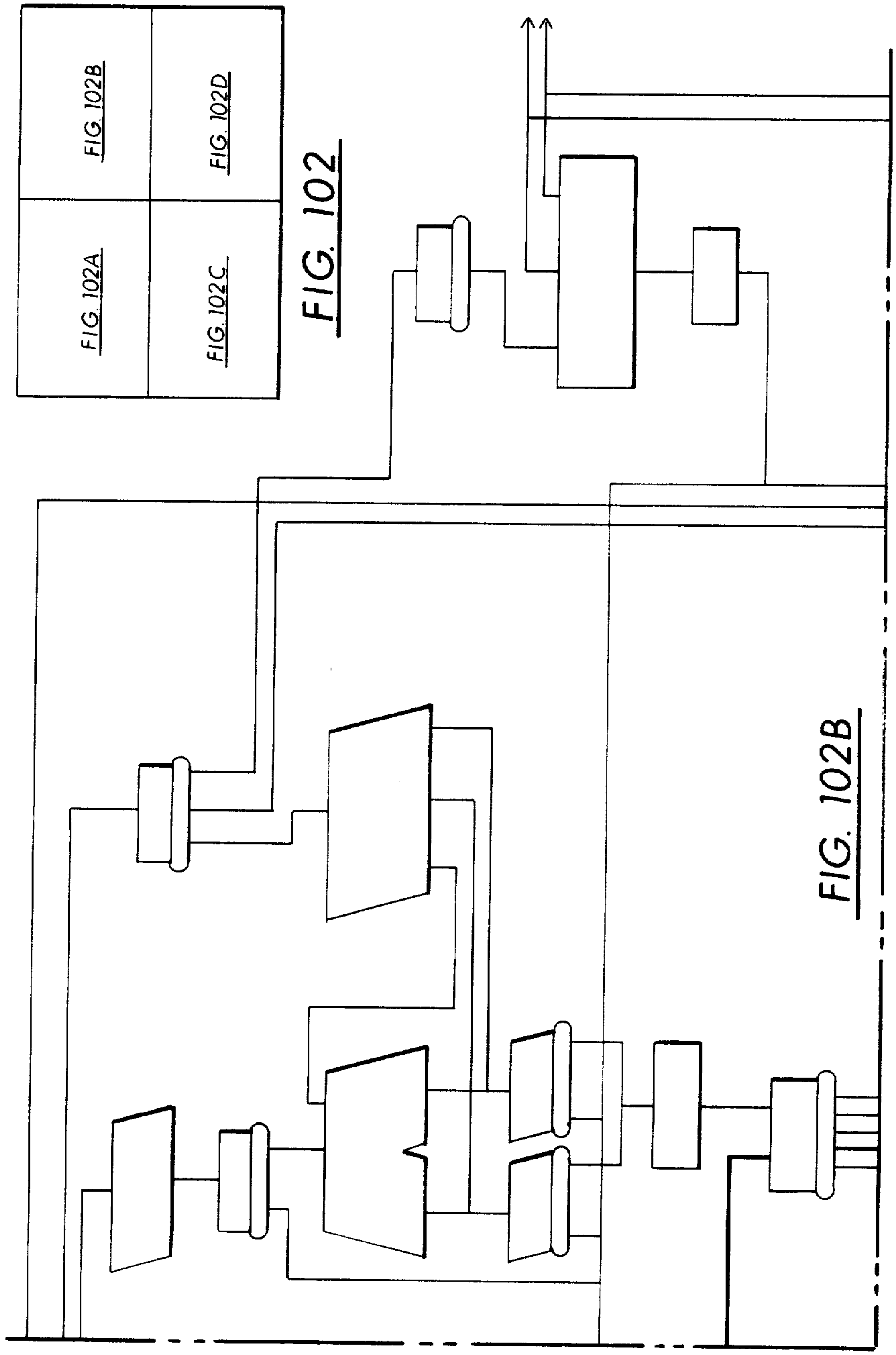
FIG. 102, which includes
Figure 102C:
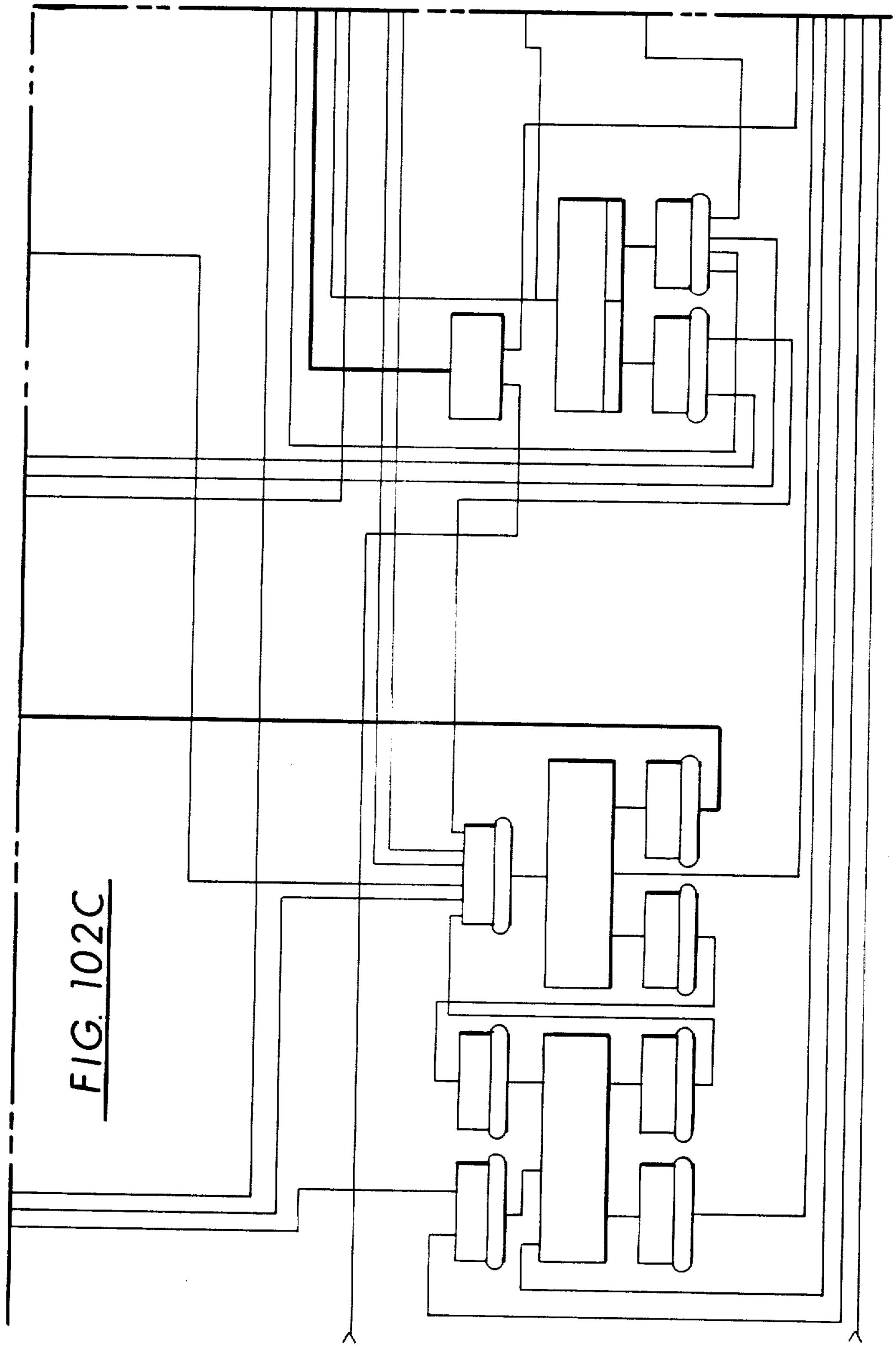
Figure 102D:
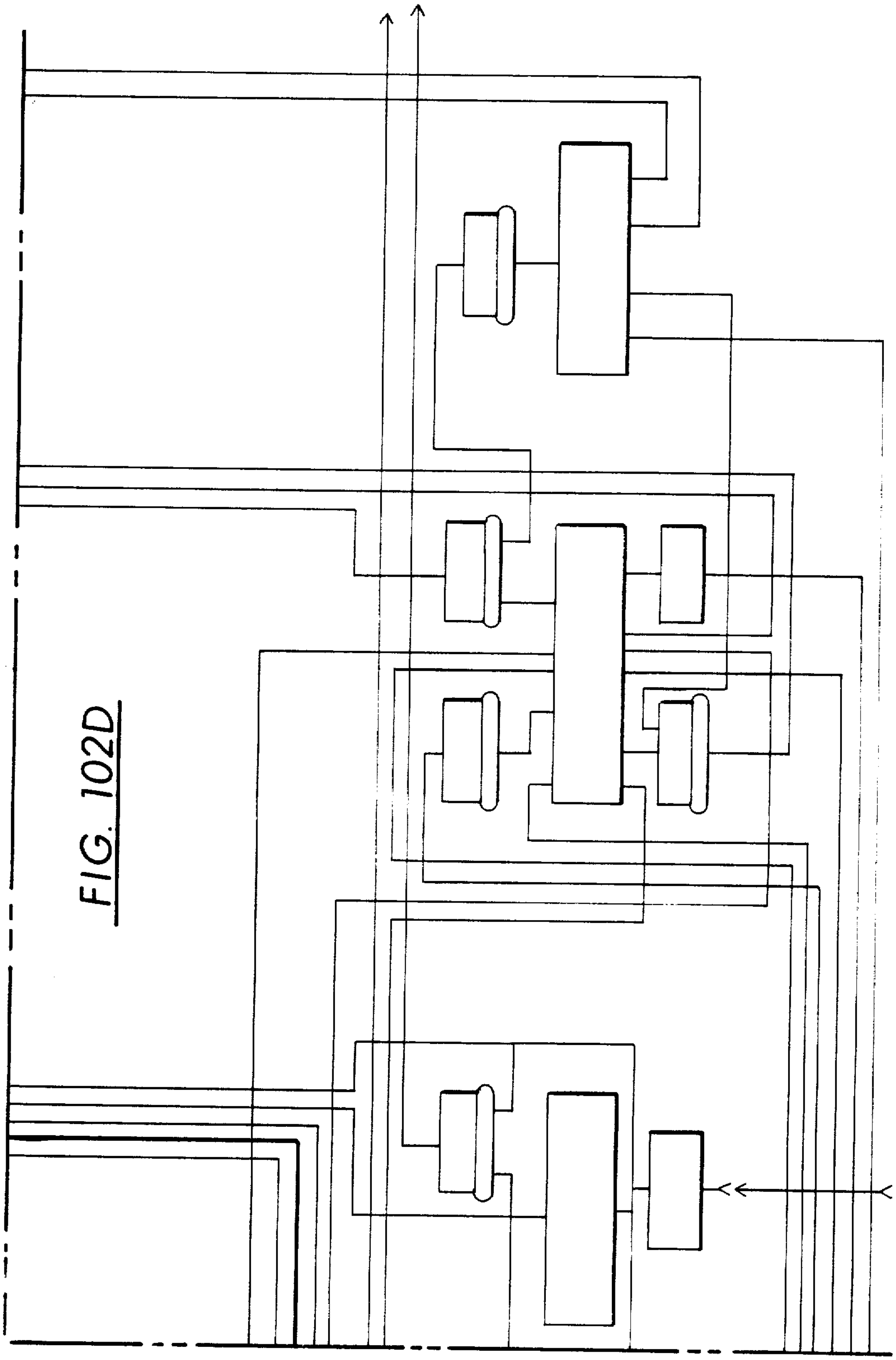
Figure 103A:
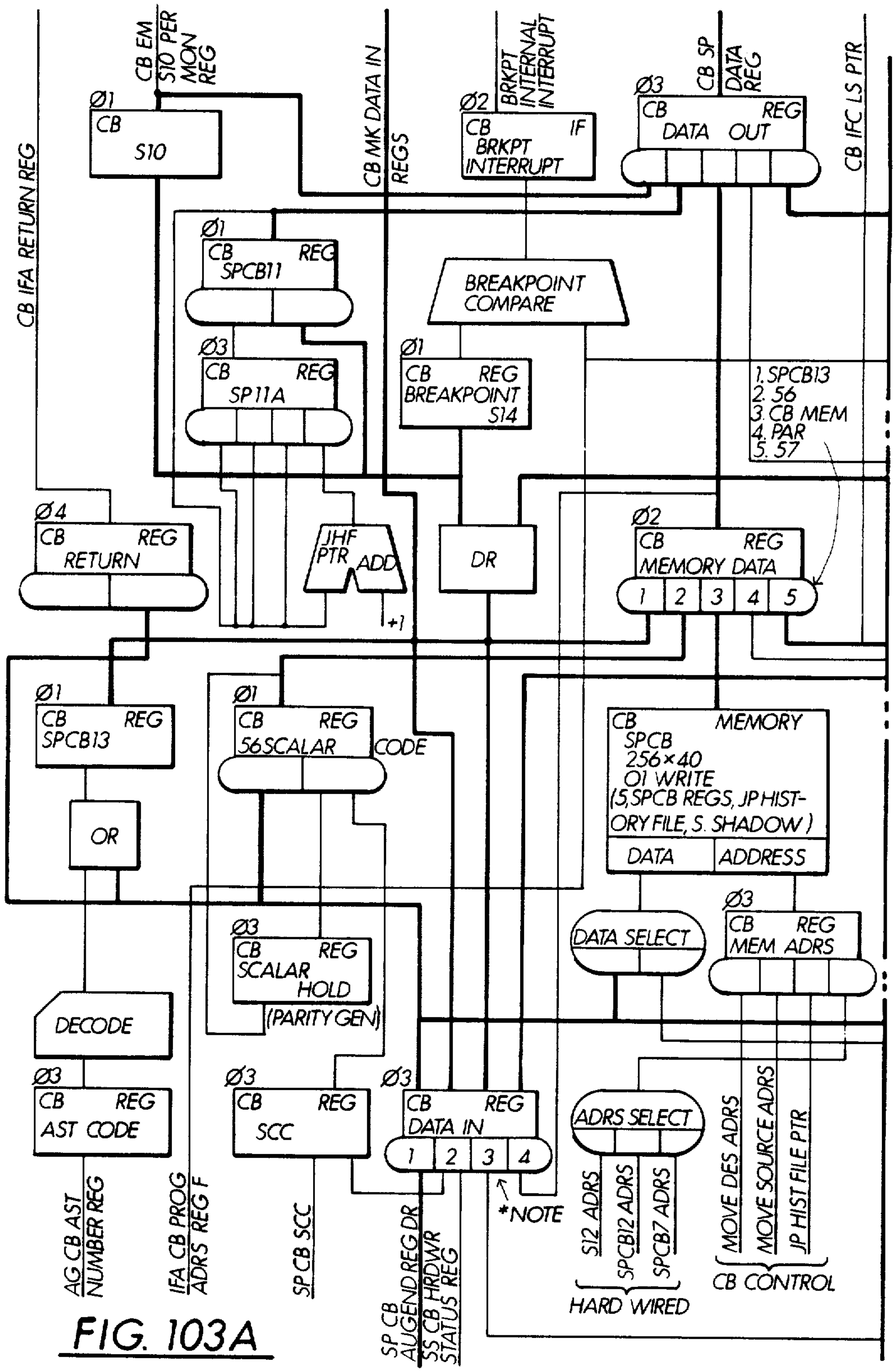
FIGS. 103–103C are a more detailed logical block diagram of the Control Block (CB) itself.
Figure 103B:
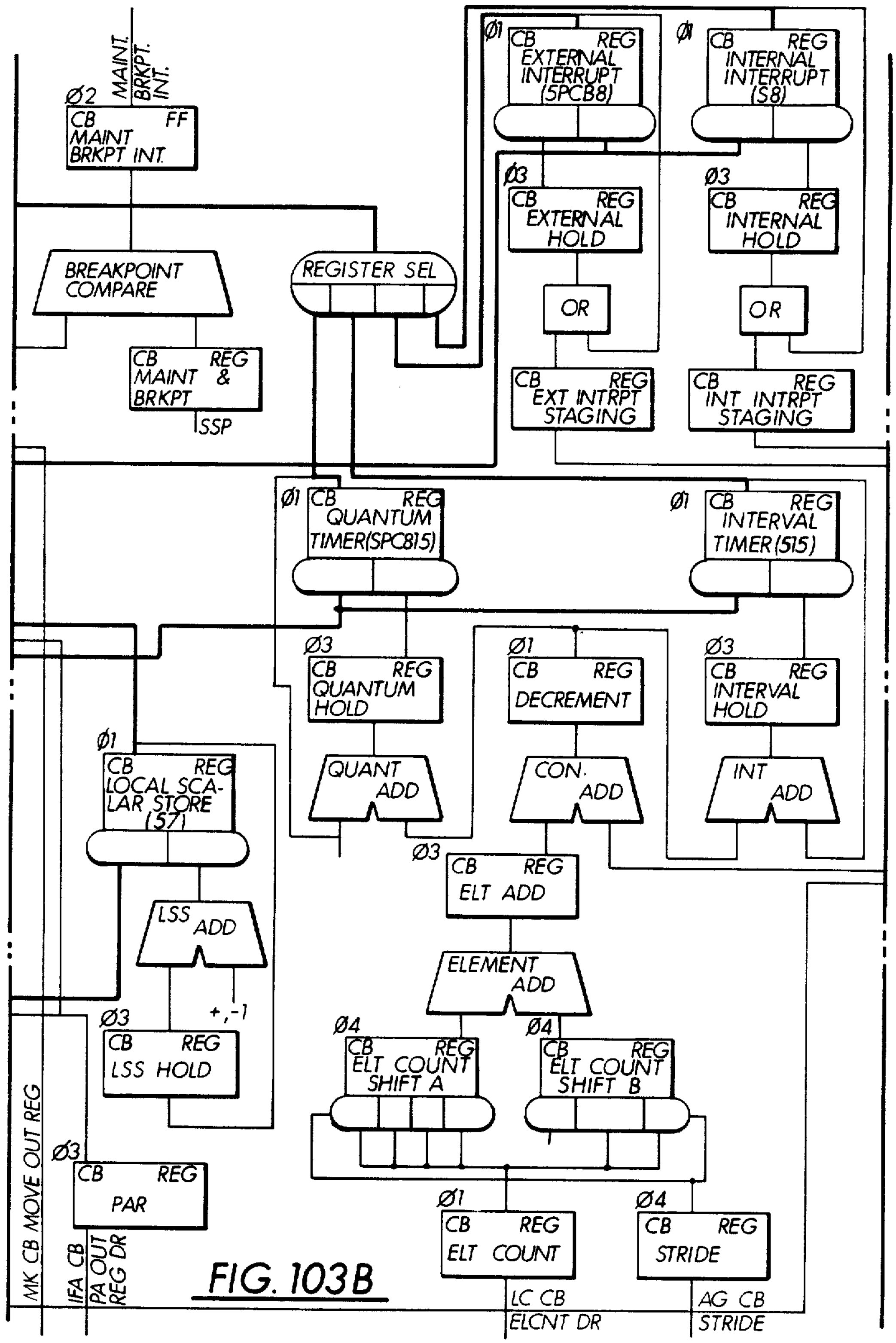
Figure 103:
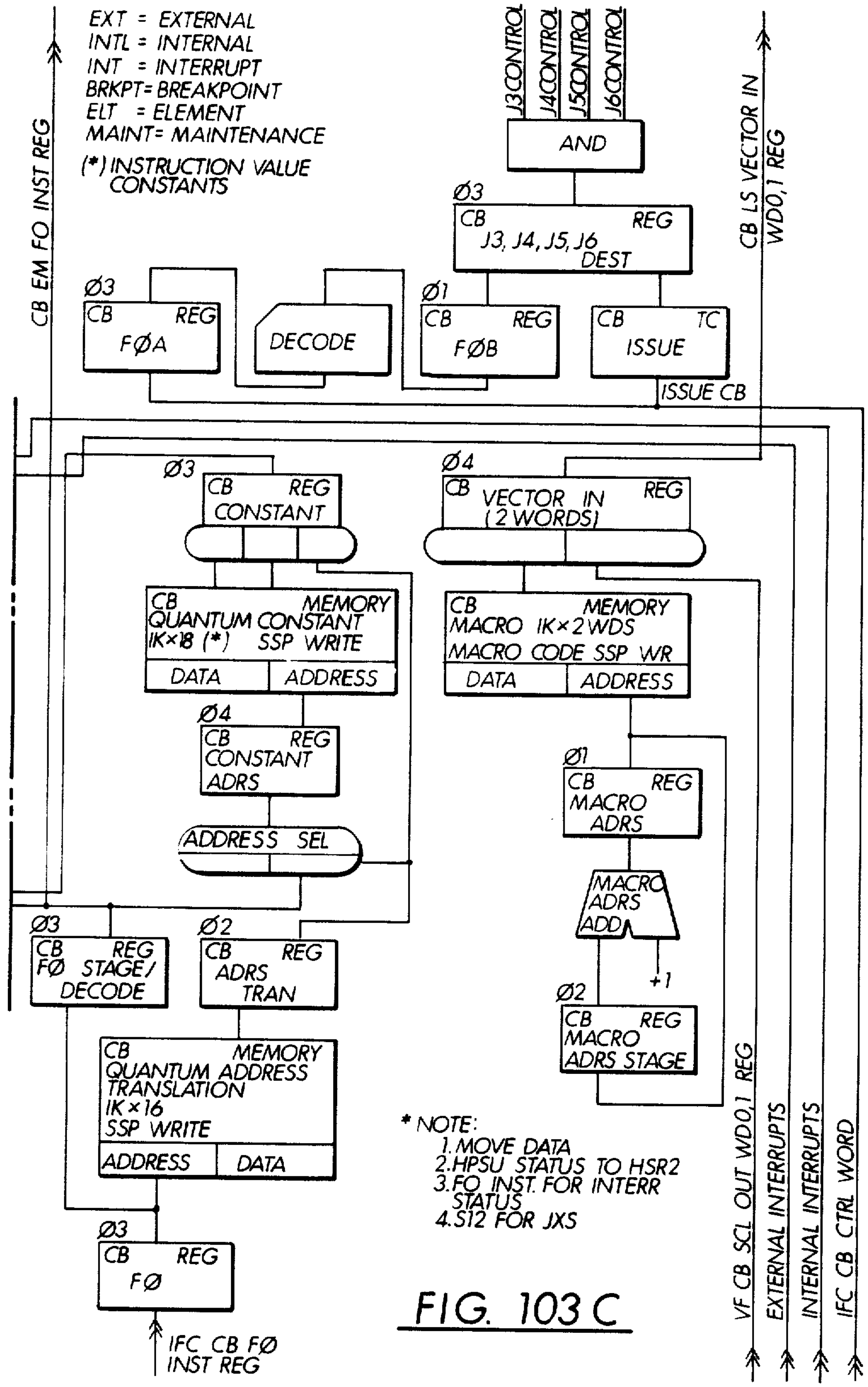

A look at FIG. 102 shows how the CB is incorporated into the Scalar Processor. (This is basically FIG. 10 with the darkened line of the CB.) It is in the lower right hand corner next to the Mask Processors. FIG. 103 is a block diagram of the CB. Sections of this block diagram will now be discussed in detail so this block diagram may be used as a reference.

Figure 104:
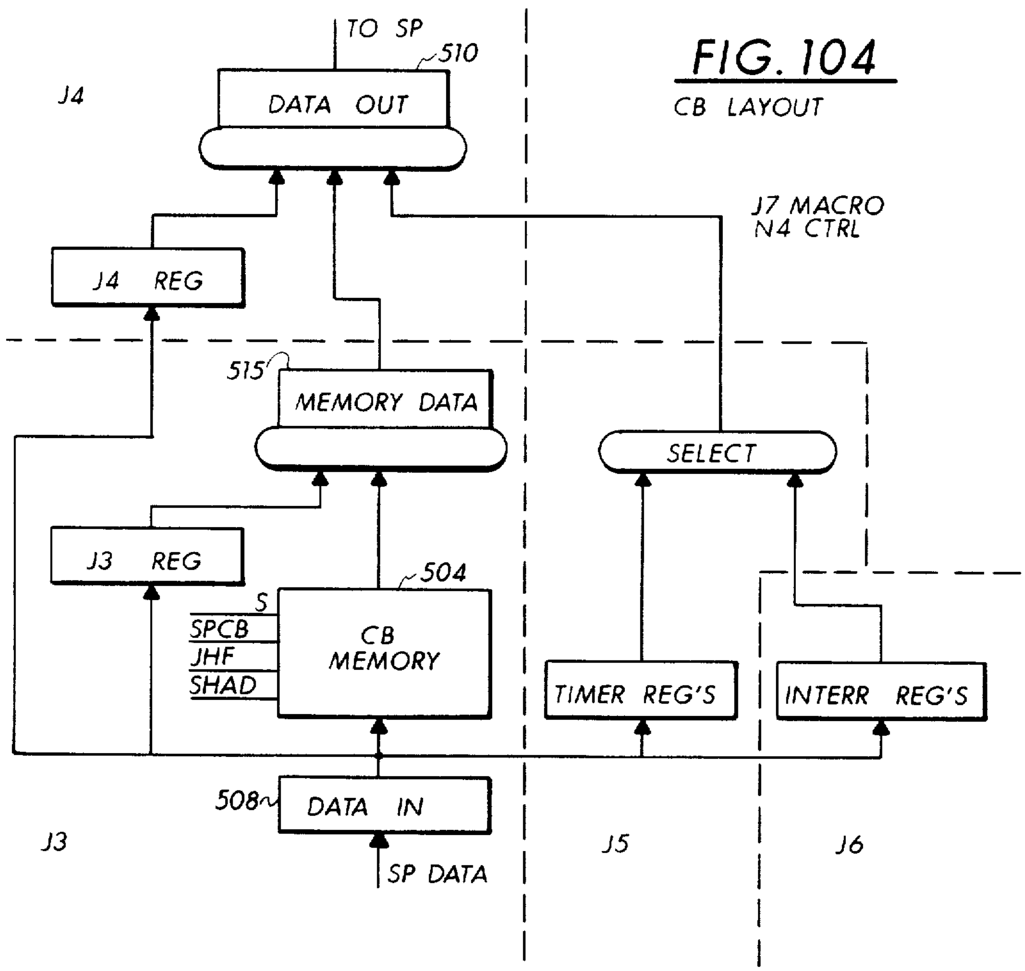
FIG. 104 is a simplified logical block diagram showing the physical layout of the Control Block and the particular circuits involved.

FIG. 104 illustrates roughly how the CB is physically partitioned. In the center of the CB is a CB memory 504. In this memory are the S registers, the SPCB, the jump history file and also some S shadow registers. The main data passes from SP through a data register 508 and into this CB memory. In addition, to this memory there are several registers SPCB or S registers that are pulled out in parallel to the CB memory. When data is brought in under normal conditions it would be coming in from the data in register 508 into CB memory 504. However, if it is a special parallel register then the path would be from the data in register 508 to whichever parallel register is selected.

When these locations in the CB memory are also written into concurrently, it is really just a dummy location however, it is easier just to let the CB memory be written into than to try to block it out.

The particular cards involved have been noted starting with card J3 up through card J6 shown in FIG. 104. In addition there is card J7 which handles the macrocode acceleration/deceleration operation. Card J7 is a shared card that has the CB control on it.

Look next at some of the instructions that the CB handles. Most important, are the move instructions. These instructions involve the S or State registers. In addition, there are some special instructions such as macroload (MARL) and macrostore (MARS) but these are only for use during the acceleration and deceleration process, however they look very similar to the move instruction and they allow movement into and out of the S registers. So with these, the move and the macroload, the stores are able to gain access to all of the CB registers.

Figure 105:
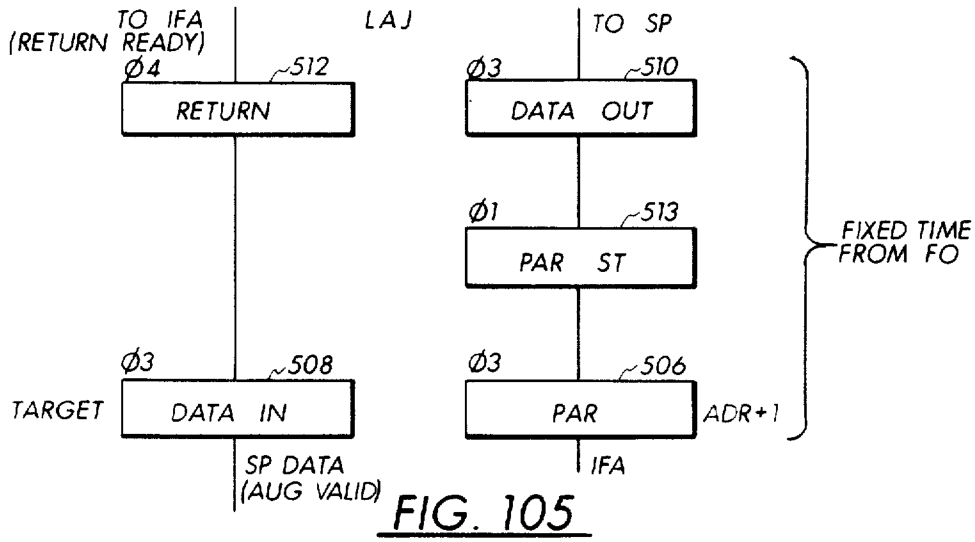
FIG. 105 is a simplified pictorial block diagram of the logical steps taken during a Load Address and Jump (LAJ) instruction.

The LAJ instructions are defined through an RS format. It says that when the LAJ is executed the following address and that address plus one should be moved into a G register. GX, called for here, is defined by the rl field in the instruction. The jump address or the target address is defined by the b field and the q field where GY is defined by b is going to be added to U for the target field. The involvement of the CB in this instruction is to take this G portion of the target address and pass it from the G register and the Scalar Processor to the IFA section. At the same time, the address plus one is taken and passed from the IFA up to SP. On the particular data pass involved here consider FIG. 105 where the G portion of the target address comes from the G register and Scalar Processor to the CB data in register 508 and then to the CB return register 512 which is connected directly to the IFA. The SP informs the CB that the address is available through a control signal register valid and, in turn, the CB informs the IFA that a new address is coming over with a return ready control signal. The other portion of the pass is the address plus one which is stored in a G register, the address plus one is brought in from IFA to CB registers PAR 506 and the PAR state register 513 then to CB data out register 510 and finally to the SP or G register.

Figure 106:
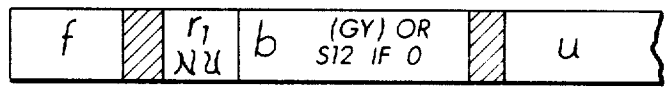
FIG. 106 illustrates the format of the Jump External Segment (JXS) instruction.
Figure 107:
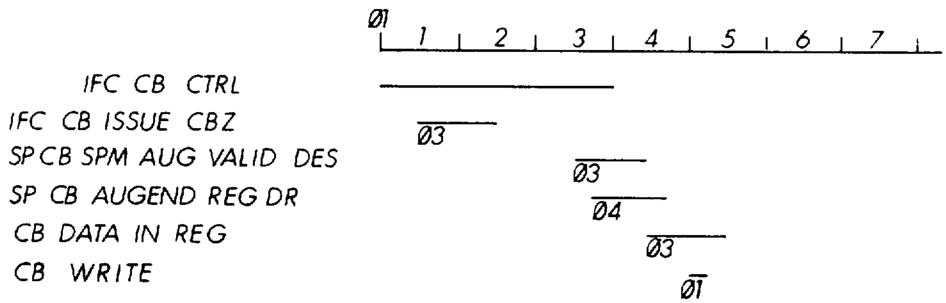
FIG. 107 is a timing diagram showing the sequence of signals which occur during a move destination to CB instruction.
Figure 108:
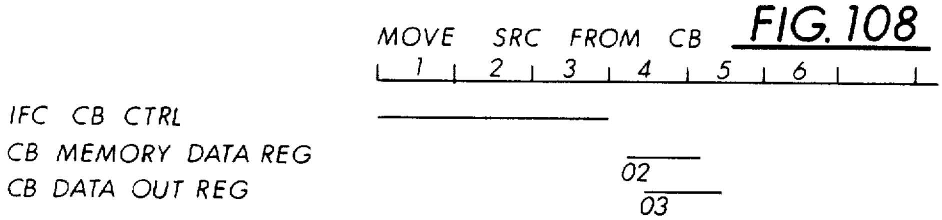
FIG. 108 is also a timing diagram which illustrates the signal sequence during a move source from the CB instruction.

The next instruction is called the jump external segment (JXS). This looks very similar to the LAJ instruction except the address plus one is not shared with the G register. In the RS format shown in FIG. 106, the rl field is not used; however, the b field again specifies a G register to be added to the u field for the targeted address. A timing diagram is shown in FIG. 107, illustrating the move destination instruction to CB. The control signals arrive from the IF at F0 time and the IFC holds these move instructions for three cycles as shown in the top timing line. At phase three, following the F zero time, the CB receives an issue signal. The CB will recognize it as a move destination and from that point on the CB has to point for the SP to signal that the move destination data is available at the SP output register. At that point, the CB can take the data and load it into the CB data in register 508 on phase 3. On the following phase one, the data will be written to the destined register. The move from CB, shown in FIG. 108 is simpler. Starting again in F0 time the IF holds the instruction for three cycles and then the CB has a fixed amount of time from F0 to produce the data on the output register. Again there are no control signals from CB to SP informing it that the data is available because of an instruction set up. It is a fixed time from F0 to CB data out.

Figure 109:
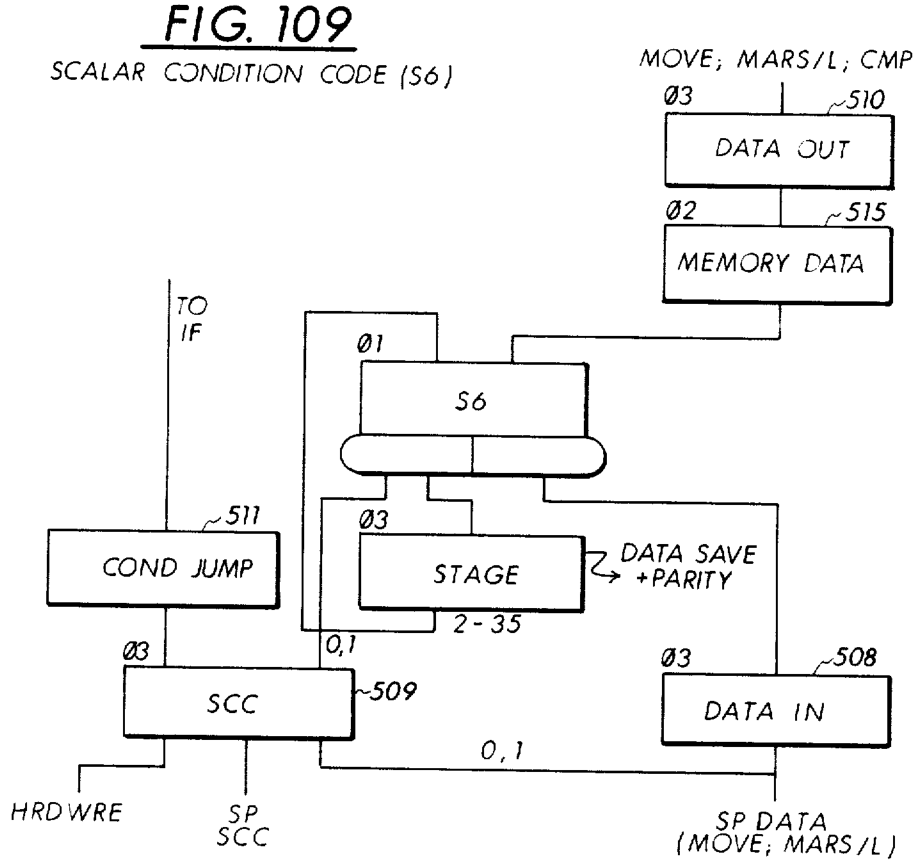
FIG. 109 is a logical block diagram showing the data path during a scalar condition code instruction.

Consider next, the parallel registers and their detail logic, as well as the instructions that are going to affect them. The first register S6 is illustrated in FIG. 109. It holds the scalar condition code. The two bit field that was sent over from SP is now in the state register so a move instruction may be accomplished. On a move or macroload instruction, this circuit is selected. It is also fed from the SP data. The SP sends over two bits by the state register 509 then up to S6, where it is combined with bits two to thirty-five of S6. A loop parity is generated and the result is returned to S6. In addition, this state register 509 also feeds the conditional jump logic 511 which is only used to a condition jump instruction in the IF on the SCC bits.

Figure 110:
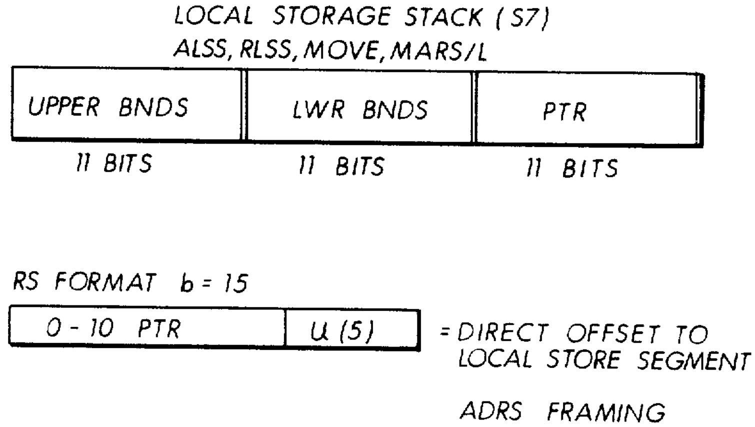
FIG. 110 is a pictorial representation of the local storage stack (LSS) instruction word format.
Figure 111:
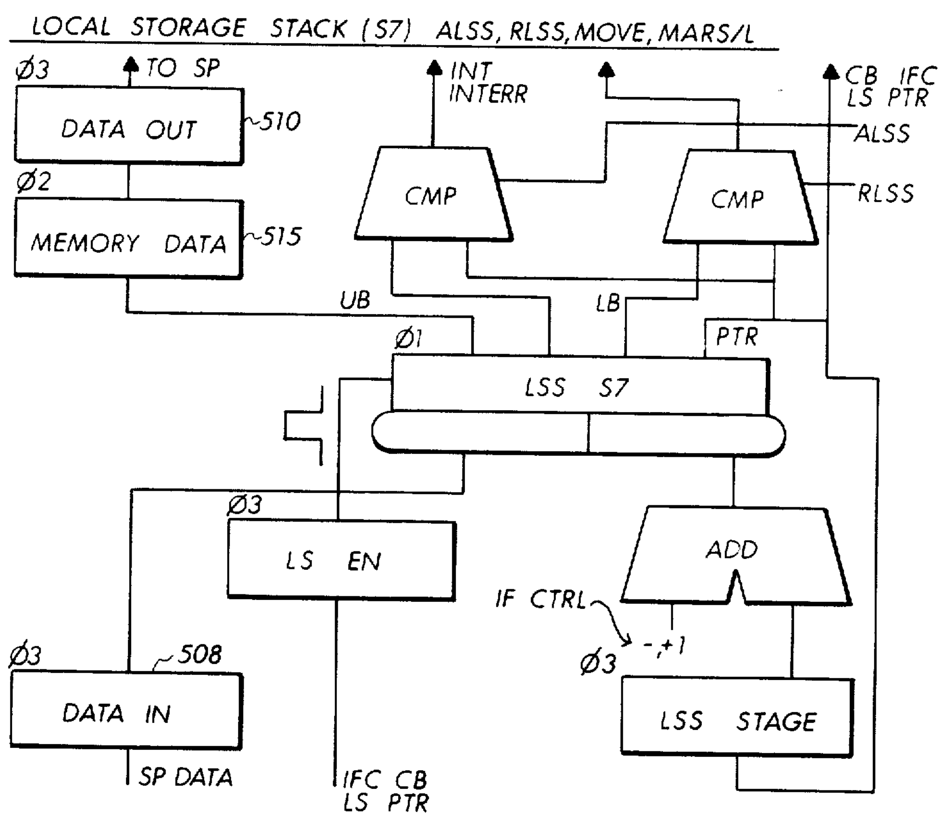
FIG. 111 is a logical block diagram of the circuitry used in the implementation of the LSS instruction of FIG. 110.

The next word is the local storage stack (LSS) S7 word. It is shown in FIG. 110. This word register provides an addressing scheme into the Scientific Processor. In the format shown there are three eleven bit fields. They are: (1) a pointer, (2) an upper and, (3) a lower bounds field. An RS format with 6 fields is also shown and is used for a b equal to 15. The direct offset to the local store is calculated using the eleven bit pointer with the 5 bits of the U field. With this particular word the CB may update the pointer and feed it to the IF. The logic is shown in FIG. 111. When S7 is loaded, the data is sent from the register to memory data out 515 selecting around the CB memory, then to the data out register 510 and back to the SP. Whenever this pointer is updated it must be checked to see that it did not go out of bounds.

Figure 112:
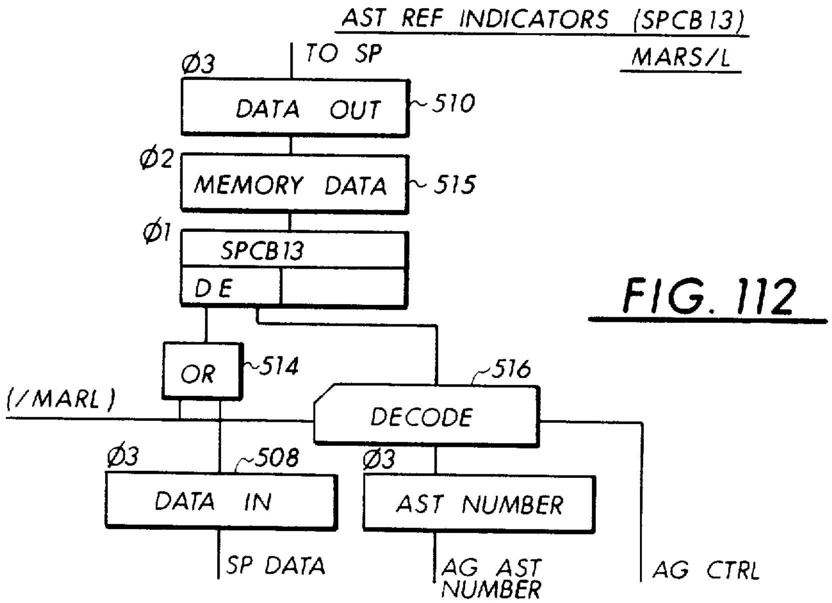
FIG. 112 is a logical block diagram of the circuitry used to implement the AST reference indicator, also referred to as the SPCB 13 parallel register.

The next parallel register is SPCB 13 shown in FIG. 112. This SPCB register 13 is initialized by doing the macroloads. This enters the data in register 508 through the OR gate 514 to register SPCB 13. When a macroload instruction is executed the input is brought low and all of the decode outputs are forced to be low. This allows data to come into the OR gate 514 and set the master bits that would be on the macroload. When not doing a macroload it forces the outputs of these OR gates to be high and then the Decode 516 is controlled by control functions from AG. Also when we are not doing a macroload operation, the AG feeds the AST number that is used to accomplish an address translation. It is fed into the Decoder 516, which is enabled by the AG control. This number is decoded and appears as an enable signal to a particular master bit of SPCB 13.

The next register is S10 and is illustrated in FIG. 113. It is the External Monitor register. It shows a rather simple path which is considered to be self explanatory. HSR 3 or SPCB 11 is another parallel register and is shown in FIGS. 114 and 115. The format is shown in FIG. 114 and the logic in FIG. 115. It is a Hardware Status Register and it captures error information or status bits that are going to be used by the host after the activity has been taken and loaded back to the SP, so that the SP may be evaluated.

Regarding the format shown in FIG. 114, the first 22 bits are the HPSU address and when there is an error concerning the HPSU, or the MUA, an address is captured where the error occurred. Also captured are bits saying that the MUA, the HPSU or the SP detected an error. There are four multiple uncorrectable errors that can be sent from HPSU which are also saved in HSR 3. The same operation is done with a LAJ or JXS instruction. This bit is set and bits 31 to 35 indicate where the jump points to the stack pointer and a jump operation is accomplished.

The logic for HSR 3 is shown in FIG.·115. This is either HSR 3 or SPDB 11. Loading or initializing of this register begins through the same path as data in to the register it is read from SPCB 11 to data out to the SP. Now the other input to this is where the status is updated. The second mux input is a LAJ or JXS or diagnose input. The last input is for a jump where the jump history file is updated.

The next register is break point register shown in FIG. 116. It is register S14. From the data in register 508 the output is sent to S14. Then to data out 510 and back to SP. The actual break point function is performed by sending an output of S14 to a comparator 517. An IFA signal from the Program Address Register is used to compare the two S14 inputs. If a comparison is made, the break point flip/flop 519 is set. This output is then immediately fed back to IF as the break point interrupt signal. This stops the IF.

Figure 117:
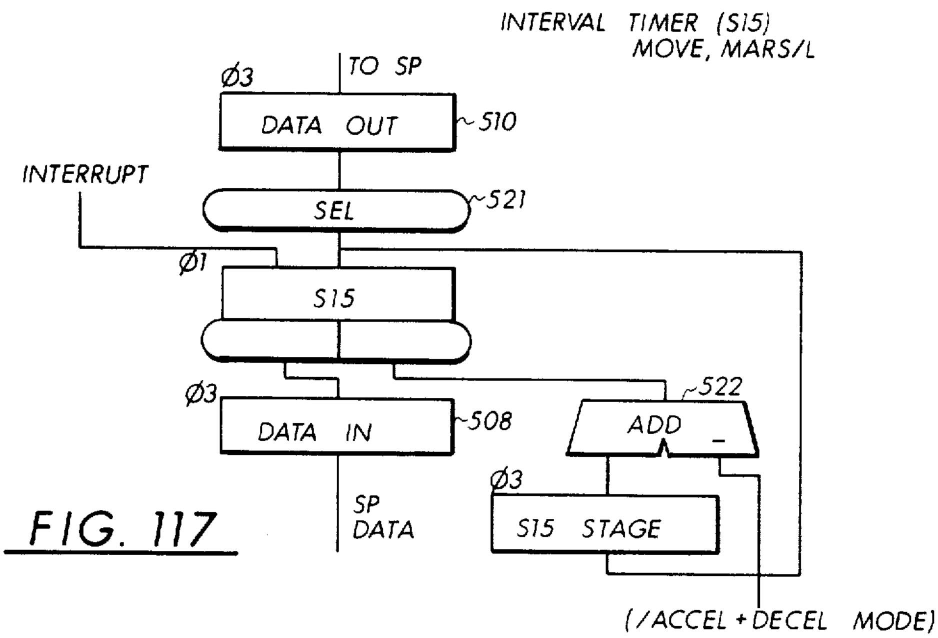
FIG. 117 is a logical block diagram of the circuitry associated with the internal timer state register S15.

The register S15 is shown in FIG. 117. It is basically a cycle counter, which counts down for each cycle during the execution of an activity. It has two mux inputs. The first mux is used to move data or do a macroload. From the data in register 508, the data is sent to the S14 register. It then passes through a selector 521, the data out register 510 and back to the SP. This internal timer is not operational during the acceleration/deceleration mode. If this counter should go under zero then an internal interrupt is generated. ·

Figure 118:
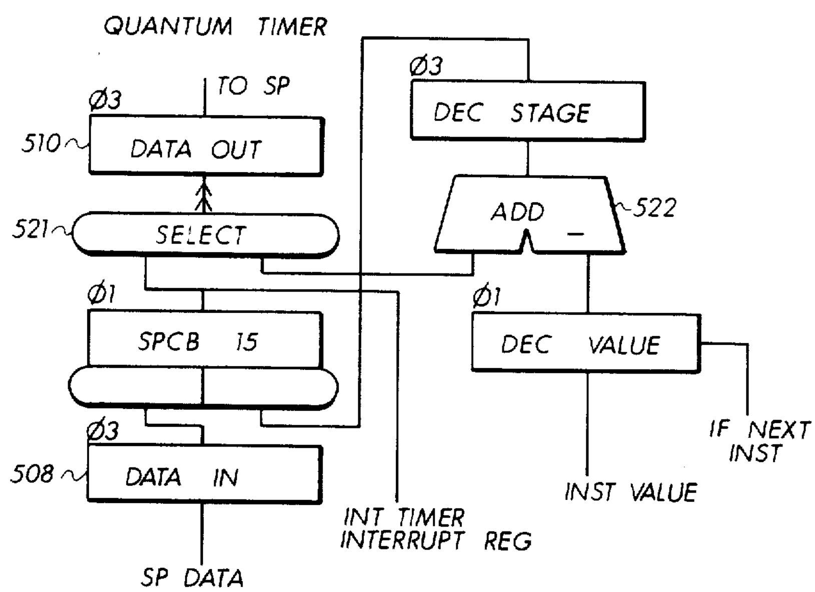
FIG. 118 is a logical block diagram of another timer circuit, called a quantum timer which illustrates the logical circuitry associated with the SPCB 15 register.

Another timer is shown in FIG. 118. It is called the Quantum Timer SPCB 15. This timer is initialized with some value from the host processor. It then decrements for each instruction that is executed and the actual value that is going to be decremented is not the same for each instruction. We have to calculate a value and we start off with each instruction being assigned some base value set up time. This is independent of the instruction time since it always takes some minimum time to execute it. In addition to that base value there was going to be other variables that may be added to the execution time. One of these variables is the element count. Certainly on a vector instruction it may take longer depending on the element count involved. Further it will vary if a trip to the HPSU or the LS is necessary. There are many other variables. For example, whether one, two or four words are taken at a time.

Referring to FIG. 118 the SPCB register receives data for the initializing or a macroload instruction enters through data in register 508 to the SPCB 15. Thereafter it passes through a selector 521 and finally back to the SP via the data out register 510. Now this decrement value register is going to be loaded with the instruction value that has been calculated. When an instruction has been issued it is enabled into the DEC value register by a control signal from IF. This signal indicates that the next instruction has been executed. So now the new value can be calculated. This updating continues for all instructions that are actually calculated. This instruction is calculated by the IF sending over an encoded copy of the captured instruction into the SPCB register. This is shown in FIG. 118.

When no further translation or calculation of the instruction is needed, the constant value is taken and fed to the decrement register. The output of this decrement register updates the SPCB 15. When further calculations are required we look at the particular instructions to see if an element count or a stride is required 523 as illustrated in FIG. 119. The last field 524 goes over to selector which selects a memory address.

Refer next to FIG. 120 which illustrates the source of the calculated value. An element count input arrives from loop control 525 along with a stride input from the AG 526. This allows the strude input to modify the element count in the element adder 527. Finally, the instruction value 528 comes out and goes back as an instruction value to the decrement value register.

There are two types of interrupts associated with this Scientific Processor. They are: internal and external. These are derived from how the interrupt is handled, when we have an internal interrupt there is an internal software routine in the SP that can handle the interrupt. External interrupts are always handled by the host processor. First, consider internal interrupts. When one occurs there are four options available that can be chosen to handle the interrupt. First of all, it can be ignored completely. This means that execution will just continue. Secondly, it could be handled either externally or internally. Internally meaning that the software routine would be used to handle it whereas externally would mean that it would be handled the same as an external interrupt. i.e. the host process would handle it.

Figures 121, 122:
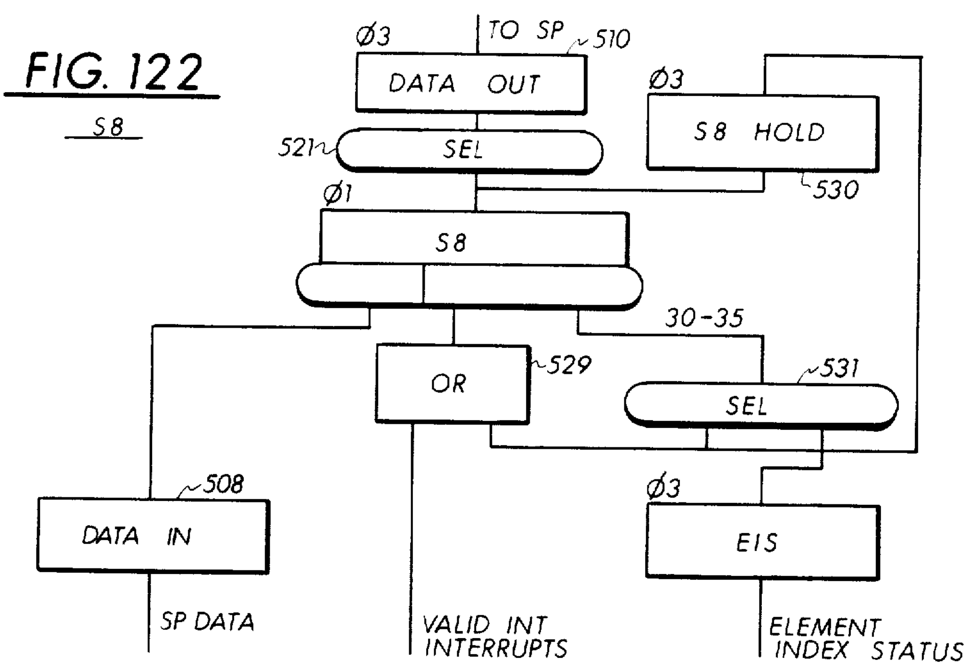

The third option would be to handle the internal interrupt either synchronously or asynchronously. Synchronous meaning that the machine is constrained to run in the mode that it was in when the interrupt occurred, asynchronous meaning that the information captured is undefined. While asynchronous is a faster operating mode, the captured information would not be valid. We can control which option that is selected through the masked register (S11). Register S11 has two bits allocated for each internal interrupt so, for instance, if we wanted to ignore internal interrupt zero we would take bit zero and bit 18 and set them both to zero. To ignore the first internal interrupt bit one and bit 19 would be set to zero. So two corresponding bits in S11 are set as determined by what control is desired. Next consider the types of interrupt signals that are possible as shown in FIG. 121. Remember that bits 30 to 35 are an element index status. When an interrupt occurs that involves a vector instruction and an element count the particular element count where that interrupt occurred will also be saved in bit locations 30 to 35. The register S8 logic is shown in FIG. 122. This is where a move or a macroload may be accomplished while saving the normal path of data into S8 and then reading it through the S8 register and back to the SP. The OR gate 529 is where we actually capture the internal interrupts. Now assuming that an interrupt does occur it would come in through the OR gate 529 as a valid internal interrupt. This means that they are not ignored, since if they were ignored there would be no input. Therefore the interrupt comes in through the OR gate 529 into register S8 while the other input from the OR gate 529 is being fed from S8 to the hold register 530 and then back into the OR gate 529. In this way we can capture new interrupts plus hold the old ones. The selection is made in the element index status in the bits 30 to 35 when it is required to capture that particular data.

Figure 123:
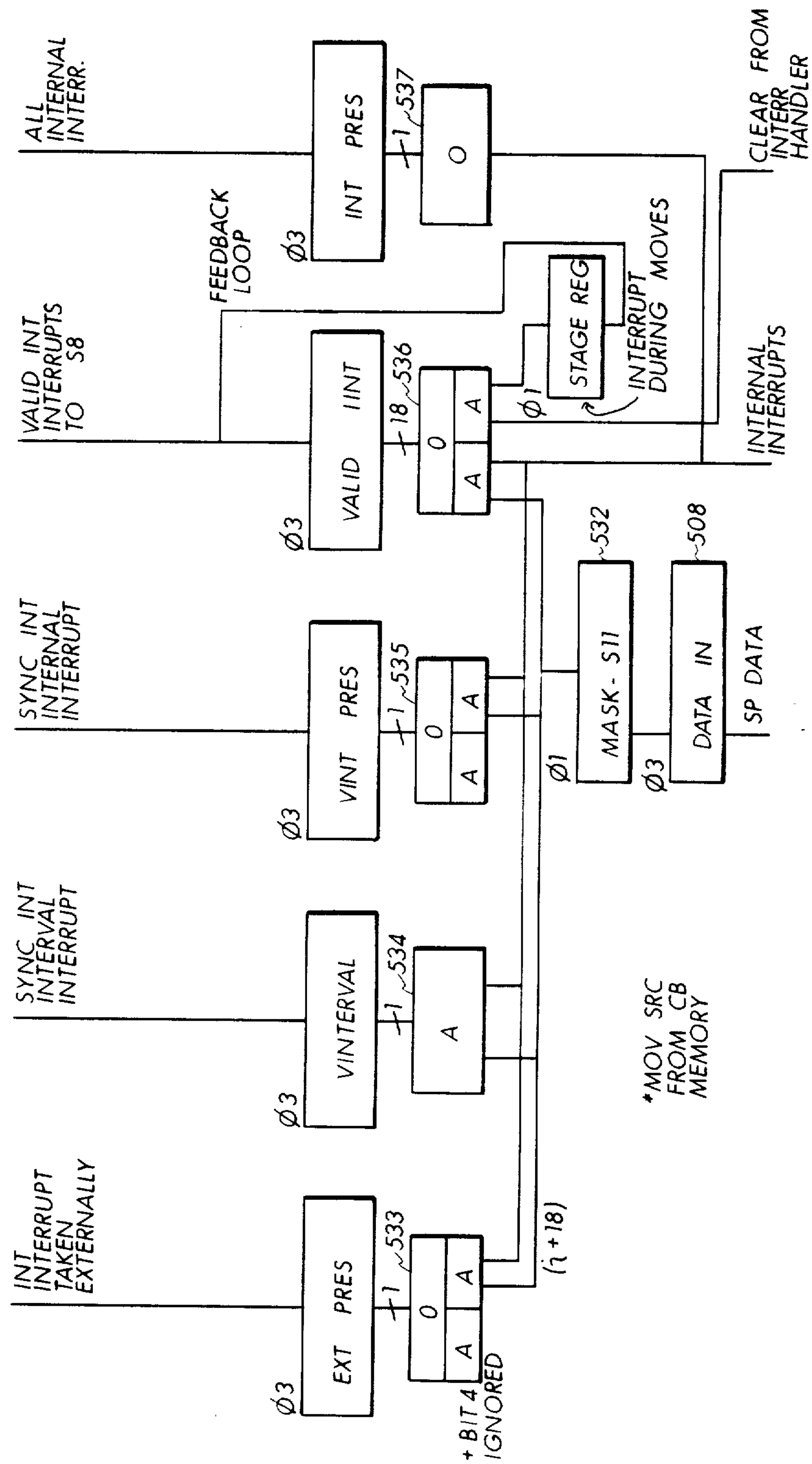

Let us now consider where the valid interrupts originate. Look first at the Mask Register 532 in FIG. 123. This register is not to be confused with registers S4 and S5. They are interrupt mask registers. In an S11 register a move is accomplished in Mask Register S11, 532 via the data in register 508.

In this particular instance, Register S11 is being read so we must go back to the CB register to obtain the MOV SRC information.

This register S11 is only used as a format on its output. Valid internal interrupts are entered into the AND-/OR gate 533, 534, 535, 536, 537 along with certain mask bits. These are considered allowed interrupts. They are fed into register S8. In addition, there is a feed back loop through the stage register FIG. 123. This loop is here to catch those interrupts that occur during that one cycle move. Now once an interrupt is received, it is locked in so that there is a clear input to it.

After an internal interrupt is captured a timing chain is initiated to do the handling sequence. At the end of the timing chain, the feed back loop is cleared out of all previous internal interrupts. Now at the same time that these interrupts are allowed into register S8, certain designators are set. The setting of these designators indicate the path of that interrupt, so interrupts are being recognized and captured. The first internal interrupt received externally (EXT PRES) shown in FIG. 123 causes the internal interrupt to be set and be recognized as external. Whether it be asynchronous or synchronous this flip/flop is set which then starts the external interrupt sequence. Adjacent to this designator is the internal interval interrupt designator. This designator is set whenever there is an interval time internal interrupt and it is necessary to differentiate between all of the other internal interrupts and the interval one.

Figure 124:
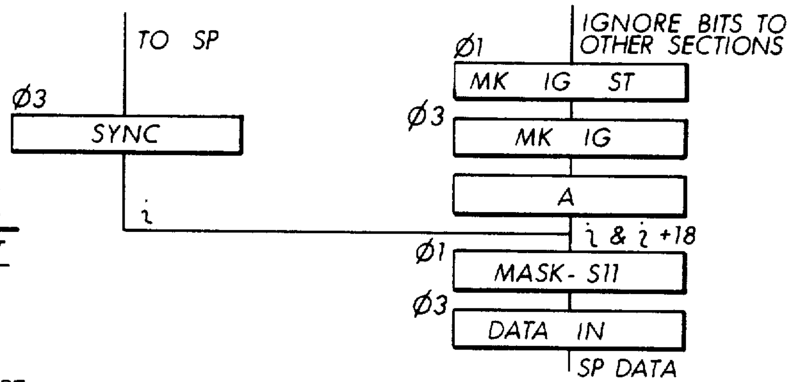

Further, as shown in FIG. 124, on the S11 register there is a fan out from it because all of the various sections of the SP that might generate an interrupt must know whether it is going to be ignored or not. So now assume that we have captured the internal interrupt and it was to be synchronously taken internally and something must be done with it now that it has been captured. This is the overall sequence for the handler on all internal interrupts, after they have been captured.

First a stop signal is sent to the Instruction Flow section, since the occurrence of an interrupt should cause a cease in instruction execution. At that point, the CB has to wait for the IF to complete the execution of all the instructions that already have been issued. When the execution of these instructions is completed, the interrupt proceed signal returns and the CB has to load the status signals from the interrupt register. Also it takes the address of the instruction that the interrupt occurred on and puts it in the state register S9. It adds one to that address and places that in S12.

Figure 125:
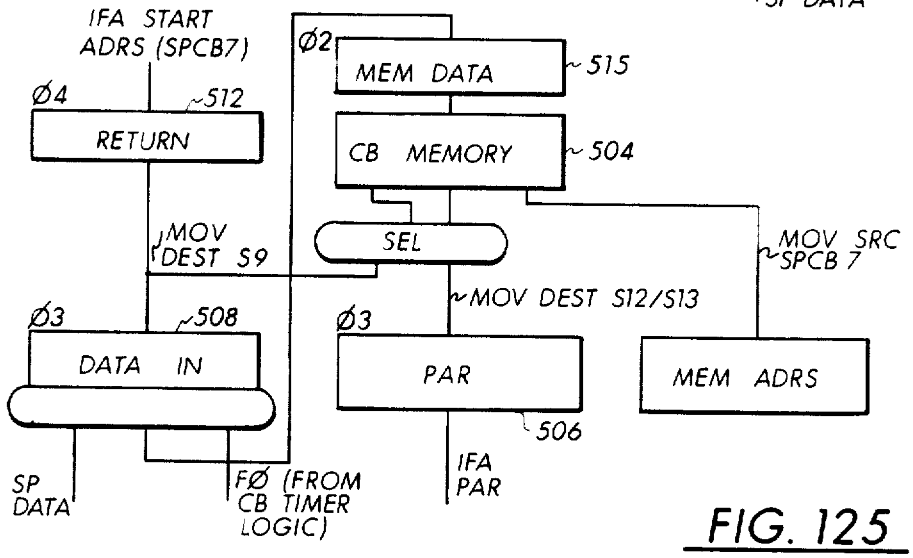

Referring to FIG. 125, the status loading of registers S9, S12 and S13 and also this reading of register SPCB 7 is handled by CB through hardware. The overall idea is to have CB memory simulate instructions coming from IF. To do this a move destination is sent to S9 and a move destination to S12 and a read instruction, which would appear to be a read source, sent from SPCB 7. This is done to eliminate the extra logic needed to handle the interrupts since the CB already had all of the necessary logic to accomplish the moves. Now the handler logic is made up primarily of the timing chain shown in FIG. 126. In the lower left hand corner, the first piece of timing chain 538 is started by having an internal interrupt present with the system in the execute mode. This means that we were executing the user program plus there has to be no external interrupts present. External interrupts always override internal ones so assuming this is so, the timing chain starts up and immediately sets the designator 540. This disables the timing chain. No more than one interrupt is handled at a time. The first one must be completed before a new one is acted upon. Now this timing chain feeds down and restarts the timing chain. The chain splits and feeds back upon itself. The reason for the splitting it is that it is going to wait for the IF to complete the execution of all of those instructions already issued. When that occurs the interrupt proceed returns an these two logical circuits start up in a looping fashion with one feeding one side and the other coming back and feeding the other side.

This looping action continues and feeds the counter 539, which starts counting. The logic shown in FIG. 127 actually feeds the control bits to the CB control section, so that the count is going to come in through the decoder 548 to these four AND gates 544, 545, 546 and 547. For instance, on the first count of one it is going to select a first AND gate 544 and the timing chain will put a timing pulse through and at the same time this would have been selected over to the multiplexer 1. So now, the control bit is being passed for a move destination to S9 and these lines will act like the issue line coming from the IF to the CB. Counting is continued through the remaining multiplexer selectors and those instructions occurring are actually executed. Every two cycles a new select is accomplished and now the flip/flops are set. If an interval internal interrupt is present, then that flip/flop is set however, for any other internal interrupt the corresponding flip/flop is set and the corresponding state register is loaded.

Figure 126:
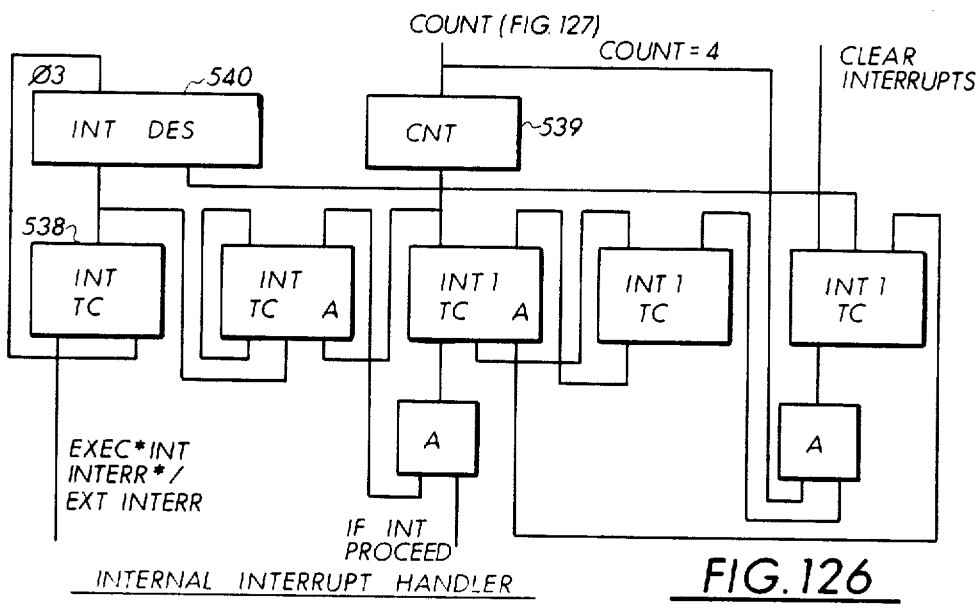

Going back to FIG. 126 where we left the timing chain looping and counting, when the count gets up to four which corresponds to the last multiplexer and the selection has been made, the timing chain is started. This, then goes back and shuts off the looping action and also returns to reset the flip flop so that the timing chain may be reenabled. Now there is one additional signal that emanates from here. When the Mask Register was discussed earlier and the interrupts captured in a loop, remember that when a move to S8 was made there was not a loss of any of those interrupts. This was because the loop was locked and needed a clear signal was needed to unlock it. This is where the clear signal originates.

The last thing the handler accomplished was to pass the address received in SPCB 7 register to the IFA. One of the first things done when an internal interrupt is received is to send over a stop signal to the IF. The logic is shown in FIG. 128. Whenever there is present an internal interrupt and another interrupt is received whether it be internal or an internal taken as external, the inputs to OR gate 541 set the designator 542 which then goes through another OR gate 543 and then to the IF to stop it. The other input to this OR gate 543 is for external interrupts stops.

Slow mode is a mode of execution where we have completely nonoverlapped instructions. It also is associated with the S11 registers so it should be covered here. Whenever there is a designator which is fed over to the IF, the CB signal starts executing nonoverlapped instructions. So if any of the bits 5 to 13 of the mask register S11 are set, then it automatically sets slow mode. The setting of one of these bits also indicates a desire to run in the synchronous mode. Synchronous here means that we want to capture the correct instruction in the return address. In order to do that on one of these particular bits 5 to 13 we have to force slow mode in order to capture the correct data. Also if bit zero of SPCB 6 is set, then we must first initialize this register which will cause the whole user program to run in slow mode.

The other class of interrupt signals are external interrupts. First consider some major points about them. The external interrupts are always handled by the host processor after the SP has completed deceleration. The external interrupt bits are in register SPCB 8. During the actual deceleration itself the register data is moved from the SP back to HPSU by macrocode which is a software routine which includes SP assembly instructions plus special instructions only used during acceleration and deceleration. This macrocode is actually going to do the acceleration and the deceleration. It is loaded into the instruction buffer through what appears to be a normal page load. From there the IF takes control and starts executing this macrocode to actually accomplish the acceleration and the deceleration. This macrocode is a fixed program that is loaded into the machine. It resembles microcode. In the lower left hand corner of FIG. 129 there is staging logic much the same as existed in the internal interrupts. Now the external interrupts are fed through the staging logic through an OR gate into an EI capture register and then into the register SPCB 8. This is the indicator register for the external interrupts. In addition to this input to the OR gate, there are two more inputs where SPCB 8 is fed back to the EI capture register 550 so while new interrupts are captured the old ones are retained. There are basically three interrupts that cannot be lost while this register is being initialized with macrocode. There are (1) power loss; (2) hardware check and (3) universal processor interrupt. These three inputs enter the EI capture register 550 and then into SPCB 8. The register SPCB 8 is initialized when a macroload instruction passes through the data-in register 508 and directly enters the SPCB 8. To read it with a macrostore we go from the SPCB 8 register back through the data-out register 510 and through the SP. There is additional logic also coupled to the output of register SPCB 8. First is a normalizer circuit 551 that feeds into the EI number register 549. This actually captures or sets the number on the first external interrupt that occurs in SPCB 8. This is stored in hardware status register 2 (HSR2). This corresponds to SPCB 9. It allows the host after a deceleration operation, and during the analysis of the information obtained, to go and look at these particular fields of HSR 2 where the external interrupt number 8 to 13 occurred. Also on the normalizer circuit 551, there is a count active (CNT ACT) line which is active when an interrupt is present. This means that if we are presently doing an acceleration operation the presence of an active signal will activate the AND gate 552 and provide an interrupt which causes deceleration of the present activity.

Figure 129:
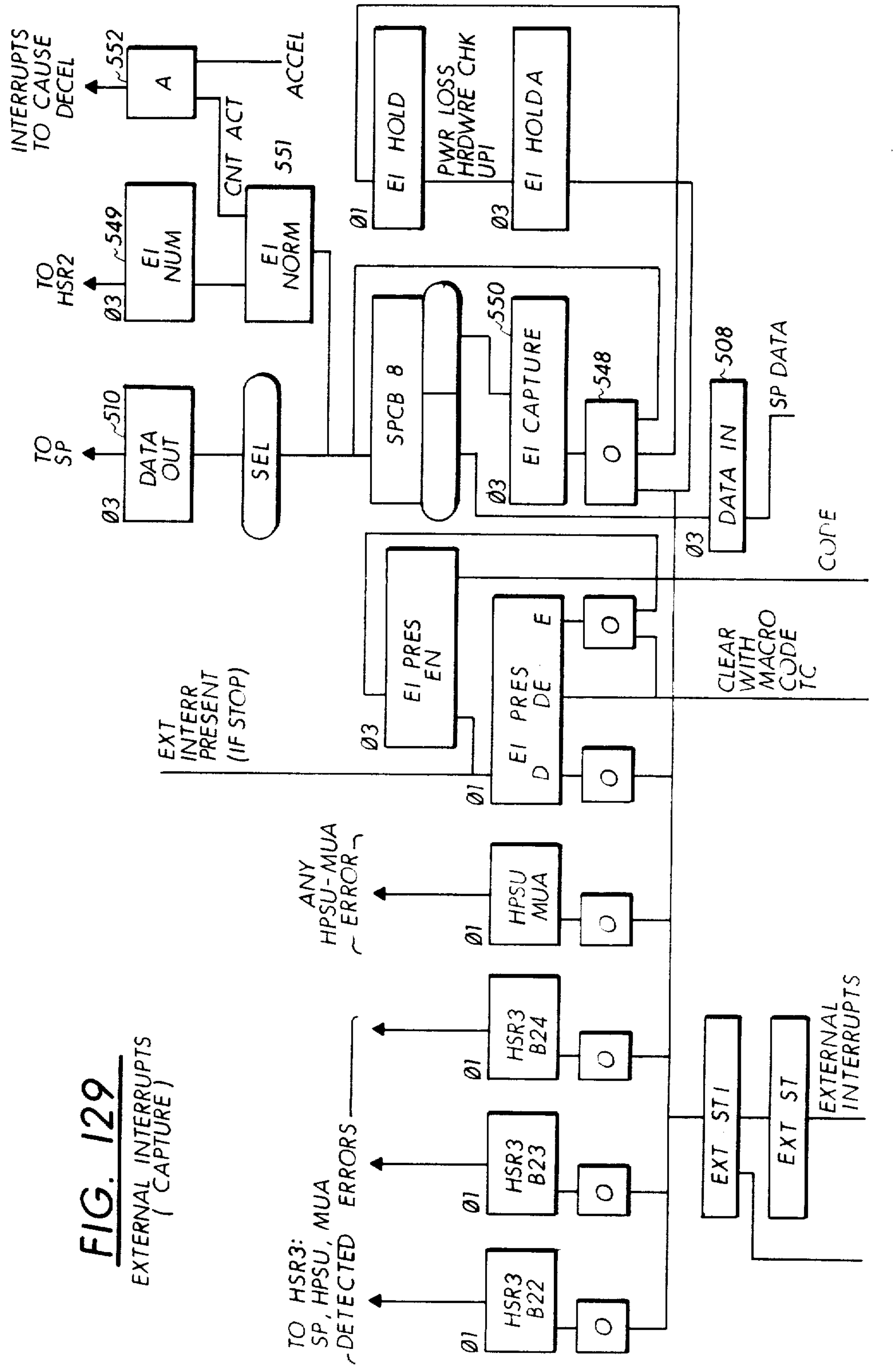

Next, in the center of FIG. 129, there is a stop logic signal sent back to the IF section. This stop circuit stays locked until the microcode timing chain starts up. After an external interrupt is captured the hardware handling portion of the interrupt is done by the macrocode timing chain, so the timing chain comes along and clears out the stop so that the IF is now allowed to proceed to enter the macrocode load into the instruction buffer. When the macrocode has been loaded there is now a window through which we can actually enter the macrocode to get a picture of the SP to see our present location, the kind of interrupts that might have occurred an information to determine our future location. The additional HRS3 registers on the left are now in the SPCB 11 and illustrate detected errors in the SP, the HPSU and the MUA.

Next, consider the external interrupt handling procedure for the external interrupts. First, the external interrupt signals are captured. Next, the IF is stopped. Thirdly, we wait for instructions for the interrupt to proceed. Through the macro timing chain, the SPCB next will cause a page miss with a new address being placed in the SPCB return register. Next, we wait for the miss operation to proceed and then the data path is selected from the SPCB to the instruction buffer to load the macro code. The macro code is then sent to the instruction buffer to duplicate the Address Generation control signals. The IF then takes control and executes the code and finally the deceleration operation initiated.

The next thing that must be determined is how we get this macrocode, presently resident in the CB, over to the instruction buffer. Looking at FIG. 130 which includes FIGS. 130A and 130B as shown, in the lower left hand corner of FIG. 130B, with an external interrupt present and being in the execute mode, the operation starts with the logic circuit of the timing chain. As in the case of an internal handler, it sets a designator which disables its start so that only one interrupt may be handled. We proceed along waiting for the IF proceed signal. We must also check to confirm that the- internal interrupt handler is not running, because if it has started, then we must wait for completion.

So now assuming that OR gate 553 is reached, an IF CAM clear signal is transmitted. The purpose of this is to send over a two cycle clear signal to the IF section. This determines whether the CAM or the page locator CAM is in the IF to indicate where the next page resides. The CB sends over to the IFA a return ready signal 554 saying there is a new address coming over and we should start at that address. That address is generated through the return register 555 for loading the macrocode in the return register 555. The address sent over has the most significant bits set high and the rest are set to zero. The address is slightly arbitrary because all that is wanted is something in there that is not all zeros. This is so because we have cleared out the CAM so it is all zeros, so anything that is in there other than all zeros is a new address. This new address forces a page miss and this causes the IF to go into its page miss sequence. The CB must wait for this sequence to be completed. This wait is accomplished with a further logical timing chain. This timing chain is also used to select the data path for the actual macrocode load. When the IF does come back with a ready signal for the loading of the page, the macro 5 TC sequence starts another repetitive looping action. This looping action continues until an enable signal 559 is received by an address register 558 on every cycle. It is initialized at zero and it is incremented by one on every cycle. The address register feeding the memory holds the macrocode. So now we have a looping action, where we are actually entering the addresses. Every cycle two words of macrocode of this memory 556 are dumped into the vector-in register 557. This is the same register that transfers data from the Vector Files over to the Local Store. The macrocode is fed in two words at a time, every cycle, then its passed to the LS:SP data register 304. From there when we come out of that register, it is sent over to the Instruction Buffer 402. This LS:SP Data Register 304 is a four word register. In one cycle two words are entered. During the next cycle the other two words are entered, so we get four words stacked up. These four words are sent to the HPSU data register 806 and then to the Instruction Buffer data register 810. From there it goes to the IF write data register 404 and finally into the Instruction Buffer (IB) 402. So, the macrocode has been taken from CB and sent over to the Instruction Buffer 402. Returning to the macro address incrementing operation, this process of incrementing by adder 560 is continued until a count of 128 is reached. This means that 256 words have been accumulated, which, of course, corresponds to one page into the Instruction Buffer 402. This one page is all that is used for macrocode. At this time, we start up the end load timing chain 560, which then comes back and shuts off the looping action and in addition, comes back to this flip/flop which disables the macro timing chain. As was previously noted, the CB takes in and duplicates the signals which would normally go from AG to IF during a page load. After this is completed, the CB sends over a last data signal and at that point the IF will load in those four words and take over control of this process. The CB is out of the sequence at this time. It has loaded the macrocode into the Instruction Buffer 402 and now the IF, 400 takes control and starts executing it.

There are seven states in which the SP 22 may be operative. These seven states will now be described. First is the dormant state. This state might also be called the wait state, since the SP 22 is still operative, but is waiting for something to do. This condition may be entered upon the occurence of a clear signal at the conclusion of a power up sequence or upon the completion of a deceleration operation. In either event, the host processor 10 is informed of the situation and the SP 22 waits for further instructions from the host.

The next state is the external state. The external state is a decision making state, in that we will look at the conditions of the host 10 and see whether we should be accelerating or decelerating. It also is a state switching condition, in that, when we are in the external state, we may go to the other states as they are required.

The accelerate stat is the next state and this is a state where we would actually be loading the data that is stored in the HPSU 16 by the host 10. We will be loading the G loop control registers, the S registers, the SPCB registers, the history file registers, the vector file, the activity segment table, and the AG for address translation. Also up to four thousand (4K) words will be placed in local store 300, i.e. the internal local store 300 of the SP 22.

The decelerate state may be considered to be the direct opposite of the accelerate state, except that we do not have to decelerate everything that we have accelerated, such as the AST table.

The execute state, is next and it is entered whenever we are actually going to start executing the user program. It is also entered when we do the software portion of the internal interrupt handler. The internal state is entered when we are handling an internal interrupt. The internal interrupt timing chain when it has stored away the status data, will then pass the address necessary to bring in the software handler. It then switches over to the execute state. The last state is the inoperative state and it means exactly what is says. The SP cannot do anything in that state. Something has happened that it could not understand or respond to, so the SP enters this inoperative condition where the host cannot restart the SP. This occurs when an obvious error has been made. The only way to get out of this state is to do a reset clear operation or a power up clear operation.

Next to be described are the details of how the host processor 10 sets up an activity for the Scientific Processor 22. A simplified block diagram is illustrated in FIG. 131. First of all the host has to come into the HPSU 16 and set up a mail box area 562. This mail box 562 is the only communication link between the SP 22 and the host 10. Initially, a real address is placed into word two of the mailbox of the HPSU. This real address is going to point to an SPCB area. This is the beginning of the actual data that we are going to want to load into the SP 22. There is a function code setup in the first two bits of the word two and if that function code happens to be a three, then the SP will actually continue the acceleration operation and load the remaining data. This address points to the SPCB area 563. Now in this SPCB area, there are more addresses. SPCB 5, for example, is a real address that points down to the Register Save Area 565 (RSA) which now contains the Vector Files, the GS loop control and the jump history file. In addition, starting at word 16, we have the Activity Segment Table AST in the SPCB area. This is the table that is loaded into the AG so it can do its address translation. In any event, in word 17 of the Scientific Processor Control Block 563 resides a real address which points to the Local Store data 564. Word 8 indicates the length of that segment. With this, the host 10 has enough setup information to load all the registers plus the Local Store 300 in the SP 22. It also calls in the SPCB 12, and it sets up a real or a virtual address and directs the start of execution. So now the SP 22 has the setup information to preload and to start executing the activity. After the mail box 562 is set up with the same address and it is loaded into a hardware register in the AG, our link is from this AG register to the mail box 562 in the HPSU. From there we can pick up the rest of our data. These mail box registers can be initialized through the host processor. As previously noted, it is initialized through the function code in word two of the mail box 562. So if, for example, we see a function code of one it would tell us to take the address and place it into this mail box. This allows the host to dynamically change the location of the mail box.

Acceleration is actually the process of loading an activity into the SP. It is initialized by the SP being in the dormant state, and the host sending over a Universal Process Interrupt. When that occurs, we are going to load the macrocode through the same path that we just talked about when we were about to decelerate. The only difference between the two is that the macrocode memory is divided into two parts. The upper portion being the deceleration code and the lower portion being the acceleration code. The host tells the SP to start up a new activity, so we just switch down to the accelerate code and the remaining activity is loaded into the Instruction Buffer via the path previously discussed. The only difference is that one bit must be selected to determine the upper or lower portion of the 1 K memory. Assume that the host has told .it to start. We load the code and the IF starts taking the control and executing the macrocode to actually do the acceleration. Thus, the overall sequence of acceleration is as follows. First we have to go and locate the mail box that the host has setup for us. Next, we start bringing in the address from the SPCB area. This points us to the different register data. After that we load up the Local Store 300 with all the register data in the Register Save Area 565 and then we start loading the Vector File 1300. While we are loading the Vector Files 1300, we start taking the data out of Local Store 300 and putting it into the SP registers.

Consider that the number of words that are to be brought in, is in the Loop Control section 1000. They are specifically in the loop control shadow register. There are normally eight loop control registers that are going to be used in a normal activity. They are setup in a memory that is 16 words deep. The CB sends to the Loop Control section a special control signal which indicates that we are accelerating or decelerating. It also tells us to switch, not to the normal registers, but to what will be called herein shadow registers. Now these shadow registers are loaded at initialization time with all of the necessary constants that are needed for a acceleration/deceleration operation. It was impossible to generate those particular constants as they were needed while we were doing an acceleration or a deceleration, since, during that time, we do not access to any constants except through initialized memories. This is the reason that the shadow area in the loop control is setup. Now remember there are not only loop control shadow registers, but there are also S shadow registers which are handled much the same way.

Now we can finally get to deceleration which is the operation where we actually take the activity and transfer it back into the HPSU. Deceleration is often started by the capturing of an interrupt while the SP is in the execution mode. Another option would be for the host to actually cause a deceleration. This would occur if a Universal Process Interrupt signal was received from the host processor while the SP was executing. Another option might be if we were accelerating and we had some kind of interrupt. This Would also cause us to go back and perform a deceleration operation. Basically, deceleration is the reverse of acceleration. That is, we take the data that we loaded and load it back into the same place in the HPSU. Now, we already have the required addresses for storing this data. These addresses, including the real address, the Local Store address and the link and Eegister Save Area addresses are in the SPCB 5 in the CB section. Looking at the overall sequence of a deceleration, first of all the Local Store data segment zero is taken and put back into the HPSU. Next, the Vector Files are dumped and, at the same time, because the Local Store has been emptied we can bring the register data into the Local Store again using it as a temporary buffer Now after this storing of the vectors has been completed, the register data is placed back into the Register Save Area 565. This will tell the host via a UPI interrupt that the operation has been completed and the SP will return to the dormant state. For a deceleration operation to start, the Local Store data must be returned to the HPSU. This is accomplished by getting the deceleration information from the Local Store and specifying an HPSU address and the Local Store starting address The data is then taken from Local Store and passed back to the HPSU. The number of words to be transferred is specified by the Loop Control section. This operation is started by taking the first 64 words from the Local Store back to the HPSU. Next, the JVL counter decrements the 64 count from the Loop Control value. This goes into a continuing deceleration instruction from the Local Store. It uses the same continuation of the AG address and continues along with three JVL instructions continually dumping the Local Store data back into the HPSU. Th Vector Files are then taken and emptied into the HPSU. To do this the normal store vector instruction is used with the link from 64 coming from the Loop Control shadow register. The address that is stored in the Vector Files is in the beginning address of the Register Save Area 565 in HPSU. This address in the RSA is in SPCB 5 so a macrostore instruction is used to take that data and put it into Local Store and then turn around and move the Local Store information back into the G register for the Store Vector instruction.

Finally consider the block diagram of the CB control shown in FIG. 132. Basically, the control signals arrive on IFC CB control line 566 and enter the FOA register 567. From there, the address function brought in from the IFA is decoded 568 and goes into an FOB register stage 569. These decoded bits are then separated and go a particular card housing the destination registers 570 and including parallel registers 571. Each card has at least one of these destination registers. At the same time that the control function is arriving, the IFC sends to CB an issue line 572. This starts up the issue timing chain 573*a*, 573*b* and 573*c*, which will spin waiting for the SP to indicate that the data which is being sent to you is valid 574. This timing chain 573 then issues a write pulse 575 for the CB logic. A write pulse designator register is on each board to indicate the register that is to be written and also provide an enable signal to that register or to the CB memory 576 as a write enable signal 577. In addition, the FOB register 569 also provides an enable to the memory address register 578. It eventually goes directly to CB memory 576. The control functions are also selected by the FOB register 569 for the JXS instruction, the LAJ diagnose instructions and jump taken instructions.

e. Local Store

The following description will be an overview of the Local Store logic section 300 of the Scalar processor Module 150. The purpose of the Local Store 300 will be set forth and then the Local Memory itself will be described. We will review how the Local Store may be accessed and the various interfaces in and out of the Local Store will be reviewed. Finally, another smaller memory called the input buffer will be discussed.

Architectually, the Local Store 300 is defined as a large internal storage facility providing fast access to scalar operands. When an activity is switched onto the Scientific Processor 22, data from the Local Store segment in the HPSU 16, which is defined by the first Activity Segment Table entry, is loaded into this Local Store located in the Scalar Processor Module 150. Physically this is a 4,096 word memory and the Local Store segment as defined by the first AST entry can be larger or smaller than the 4,096 words. However, if it is smaller than the 4,096 words, then the whole segment will be loaded into the Local Store memory of the machine. If it is larger than 4,096 words only the first 4,096 words will be loaded into the Local Store memory. Any references to data beyond the first 4,096 words is made by referencing the HPSU. This is illustrated in FIG. 133. First, assume that the overall space represents the memory space of the HPSU 16. From address 1,000,000 in the HPSU is the Local Store 300 segment defined by the first Activity Segment Table entry. In the present case it is drawn as being larger than 4,096 words. Now when the activity is switched onto the Scientific Processor, the first 4,096 words are loaded into the Local Store memory 300 and any references beyond that have to go to the HPSU. Another thing that should be noted here is that as the activity is being processed, and the data is being loaded into the Local Store memory 300, it is being changed or operated on and there is no attempt at that time to update the memory back in the HPSU 16. It is only when the activity is completed and deceleration of the activity occurs that the HPSU 16 is updated. Everything that was in Local Store 300 at the conclusion is returned to the same location of the HPSU.

A simplified block diagram of the Local Store (LS) 300 is shown in FIG. 134. The heart of the Local Store section is the Local Store Memory 301 of 4,096 words. Another smaller memory called the Input Buffer 360 is adjacent to the Local Memory Store 301. Interface to the HPSU is via the HPSU in data register 308. The Local Store memory is four words wide as seen by the LS in data register 302.

It should be noted that the HPSU interface is of odd parity and differs from the rest of the machine which has even parity. The LS VP output data register 310 goes to the Vector Processor 162. This is referenced as VL because it enters the Vector Processor via the Vector Load (VL) section 1200. Again it is four words wide and it is an 8 to 1 selector register.

On the far left is the LS SP out data register 304*a*. It is a two word wide interface and it goes to the SP section in the Scalar arithmetic section of the Scalar Processor. It takes a one word operand for a single precision scalar operation. If it is double precision, two words will be used. This is a 16 to 1 selector register. Also from this register, two words go to the Store Buffer (ST) logic section 800 via a driver.

In addition to these first two words to the ST interface there are two words from the LS ST out data register 304*b*. The interface to the ST section then is two words Wide and this is a 4 to 1 selector register.

In a deceleration operation everything is loaded into the Local Store 300 and from there the information goes through these two registers 304*a* and 304*b*. All four words are used at one time and then go to the ST section From the ST section there is the output data register to the HPSU.

There is also a four word interface via line 808 from the ST section 800 into Local Store 300. It enters the LS in data register 302 and that is used for buffering the store vectors into the Local Store memory. On the far left is a two word interface from the CB section. To the right of the input buffer 306 are two LS status registers, 305, 309 a status register A 305 which is the staging register and a status register B 309 which is the actual holding register for status. This latter register 309 is used when there is a reference to the HPSU and the HPSU detects erroneous parity on the write data, the address or the write controls. At this time, the HPSU status is sent back in the word zero position instead of the data. It also sends back another line saying that something wrong has been detected on the interface. This will enable the capture of that status information that is sent back in this status register B. This error will also cause the transfer to an interrupt sequence and it will be read out through the LS SP out data register 304*a* so that it may be identified. On the upper right hand corner of the FIG. 134 is shown a table of how the Local Store is placed on the four cards of the machine.

The basic purpose of the Local Store is for the storage of the operands and scalar information but is has other purposes also. Another purpose is for the temporary storage of data for acceleration. For example, when an activity is switched onto the Scientific processor, the first thing that is done is to go and obtain the mail box as previously described. The referenced four words are gotten from the mail box and are first placed in a Local Store for temporary storage.

Also brought in during acceleration are the Activity Segment Table data and all of the registers are loaded for entry first into the Local Store from where it is used as needed. When the Local Store is used for deceleration just the reverse of the acceleration operation takes place. The data is put in Local Store and then returned to the HPSU. A third purpose of the LS is for operands for scalar instructions. When properly utilized this provides fast access to the Local Store for scalar instructions. It can also hold operands or Vector instructions.

Refer next to FIG. 135 which illustrates how the Local Store memory is split up. It is divided into four blocks of word zero, word one, word two and word three, each block has 1,024 words with 36 bits of data and four bits of parity. The data inputs, of course, are separate, but the address is common to all four words so that when you read Local Store you will receive a block of four words. You can access the same or a different address from each block. The address is shown at the bottom of the FIG. 135 along with the word select bits. The first ten bits of the address are the left most ten bits of the address. They are used to address the memory and the least two single bits 10, 11 are the word select lines and are in the Local Store section itself. The word select bits control which word that is to be written. Everything else is controlled externally and arrives via external lines to select the words that are desired to be read. These are selected externally by control signals from other logic selections. Also the word select bits are combined with the valid bits, the masked bits and others to control the data flow into and out of the Local Store memory. This is also done externally to the Local Store.

The Local Store memory has a cycle time of thirty (30) nanoseconds. The memory is constantly being read, and it is just a matter of whether the address is changed every cycle that makes it possible to read various selected locations. A block of four words may be read at one time. Also any combination of a four word block may be written at a time. That is, you can write all four words or you can write any word or any combination. You may write word zero; one; two; or three during scalar operations. For single precision you will always write one word at a time to be determined by the word select bits. However, for double precision scalar operations words are written in pairs.

In the vector operations, however, the writing is determined by the valid bits among the masked bits. There you may write any combination of the four words at any one time.

Consider next how the Local Store is accessed The first way is with Scalar instructions using the RS format as shown in FIG. 136. The function field of the RS instruction format shown is 7 bits. This determines the kind of instruction to be done. Basically, the t field, in so far as the Local Store is concerned indicates whether a single precision or a double precision operation is to be performed. The r1 field contains four bits and specifies the source operand for operand 1. It also indicates the location of the destination operand after the operands have been operated upon. The B and U fields together form an address for the operand 2. Now if B is zero, a special case, and U is less than 4,096, then the U field directly forms the address for the Local Store memory. If U is greater than 4,096 it still is going to go to the Local Store, but now it has to go via the HPSU because that data is not presently in the Local Store memory. Rather that data is in the HPSU and only the first 4,096 words have been loaded into the Local Store memory. If B is 15, the eleven bit pointer in S7 with the five right most bits of U, catenated on the right, form the Local Store address. Once again, this occurs only if its value is less than 4,096.

Thus, so long as the address is less than 4,096, the instructions may be cycled at a 30 NS rate. Now there is one more way of using the RS format. This is in using the Local Store as the source or destination for the operand. If B is one to fourteen, then the virtual address (VA) is generated and masked into the Local Store segment and the Virtual Segment Offset (VSO) plus U is less than 4,096 then this forms a Local Store address. In this method of addressing, the cycle rate is substantially reduced. It may take as many as five cycles between references to the Local Stores. This method passes through the Address Generation (AG) section.

Finally, there is one other way to access Local Store. That is, it may be accessed with the Vector instructions. This is similar to the B equals 1 to 14 on the scalar instruction in that first of all there is not a direct access to Local Store on vector as it is with the scalar instructions. So for Vector instructions, the map is in the Local Store segment if the Virtual Segment Offset (VSO), plus or minus a stride, is equal to or less than 4,096 then this will form the Local Store address. In this way, Vector instructions can use Local Store for the source or the destination of Vectors.

Refer next to FIG. 137 which will be used to describe the interface to the word zero and word one. What is shown here is how the data is selectively passed through the register. There are several combinations in which the data can be transferred through this register. As shown in the table on the right of FIG. 137, the data can be passed straight through wherein the A input is directed to word 0 and the B input is connected to word 1. Alternately you can broadcast A. This means that the A input is sent to word 0 and word 1. Conversely you can broadcast B and put B to word zero and B to word one. Another selection that may be made is to cross both of them over and send B to A word zero position and A to the word one position.

FIG. 138 illustrates an example of a gate array. In this gate array there will be bit zero of the word zero and it is also bit zero of word one, but in the overall Scientific Processor you will see bit 0 as bit 36 because of the interface to the SP section. This is because instead of being split up in two words, it is bit 0 to 71, whereas in the SP section you will see it as bit 0. As shown, each gate array generates the same bit for word 0 and word 1 so that on each card there are ten of these gate arrays. There are 9 bits of data and one parity bit. The inputs shown are the actual 16 inputs. These sixteen inputs enter the LS SP out data register **304*a* and the 0 position will be the data arriving from the Local Store memory itself, i.e. word 0 bit 0. Coming into the 1 position will be data from the Local Store data memory word 1, bit 0. Into the two position, from the Local Store data memory is word 2, bit zero. The three position receives word 3, bit zero. The fourth position will receive data from the HPSU input data register word zero, bit zero. Positions 5, 6, and 7 will respectively receive bit 0 from words one, two and three. Then in position 8 is the CB interface word zero bit zero, while nine receives it from the CB interface word one bit zero. The CB interface remember is just two words. In the tenth position is the SP augend data bit zero and then in the 11th position is the Local Store status register bit zero and that comes from a corresponding status register shown earlier. In the 12th through 15th positions, information arrives from the input buffer memory and th input buffer is split up the same way as the Local Store memory. That is into a four word wide memory. Remember that all of these can be crossed over as explained earlier. Then to the word one position on the right side, where you will notice that all of the odd positions of the 16 way selector are left open while the even positions 0, 2, 4 etc. are connected. In the zero position are the Local Store data word 1, bit 0. Note that it enters here from two places. It also arrived on the other selector in position 1, whereas here, it enters position 0. The same thing occurs with the word 3, bit zero as it also does with HPSU word 1**, bit zero.

Now the address for selecting the 16 way selection, also comes from the SP logic section and note that in the middle there are dotted lines indicating that the same address lines control both sides. There are two separate selection lines entering it, so when you are selecting zero on one side, you are selecting zero on the other side as well.

Next, refer to FIG. 139 which illustrates the other two words to the ST interface, i.e. words two and three. Now, remember that this interface to the ST section, includes words two and three. Referring again to FIG. 134 this is the LS ST register 304*b* with a 4 to 1 selector. Now this has the same possible combination of data transferred as words zero and one, but it only has a four way selector for selecting the data desired to pass through this register instead of 16 separate inputs. Now once again the cross over control and the enable signal arrives from the Instruction Flow Control (IFC) logic section of the machine.

To briefly review the data input to these two words, the Local Store data memory word 2 comes into the zero position of the A selector and the HPSU data word 2 comes into the one position of the same selector A. Word 0 of the SP data, this would be the SP augend, enters position 2, while the CB word zero enters the third position. On the B side, the LS data word three, the HPSU data word three, the SP data word one, and the CB data word one respectively enter positions 0, 1, 2, and 3.

Next, the interface to the Vector Processor shown in FIG. 140 will be described. Basically this may be called the Load Store/Vector Load (LS VL), which is shown as register 310 in FIG. 134. It is four words wide and goes to the Vector Processor. Notice that the selection control is from AG. Because of the relationship between Vectors with the stride and the starting address, this will be explained in detail when the AG section is described. We can, however, review the eight inputs that enter this register, together with the eight way selector. First, we have Local Store data word zero which enters the zero position. Next, the Local Store data word one comes into one, and Local Store word two arrives at position two with Local Store data word three entering position three. HPSU data word zero through three enter positions 4 through 7. This relationship is the same for all of the inputs since all four words are identical as far as the data that enters into the zero position etc. The reason for having each word of Local Store in the HPSU entering each position is because of the starting address. The starting address can start on any particular data word, zero, one, two or three. If it starts on word 3, word 3 has to go to the word zero position and then the order of selection is controlled from the AG section.

The detail of the input data register 302 of FIG. 134 to the Local Store interface is illustrated in FIG. 141. First, consider the write data register. The data path is four words wide and a four way selector register is used for selection. In the zero position of the first selector is the ST in data word zero, while entering the zero positions of remaining three selectors are ST in data words 1, 2, and 3.

Similarly, the HPSU in data words 0 through 4 enters position 1 of each of the selectors, while the SP in data words 0 and 1 enter positions 2 of each of the selectors. Positions 3 of each of the selectors remains open and are not used. Once again the cross over control is the same here as on the earlier selectors and once again the cross over control in the address used to select the input data is controlled from the SP section.

Refer next to FIG. 142 which illustrates the Local Store Write Pulse Generation. From the four AND gates across the top of the figure are provided words 0, 1, 2, and 3 write pulses. These four AND gates receive a common wide phase 01 as an input. A wide phase one is used because a minimum pulse width of 6 nanoseconds is required, while the minimum pulse width of a normal phase one is only 5 nanoseconds.

Shown in FIG. 142 is the Local Store write control register which generates the enable signals to write into the Local Store. These are controlled separately so that you can select writing into just word zero or word one or word two or word three or any combination thereof. A table is shown on the lower right hand side of FIG. 142 which indicates what each of the various combinations of bits from the IFC provide. For example, a 00 indicates the selection of either a Vector operation or else an idle condition. The combination of 01 is a single precision IFC address, while 10 indicates a single precision AG address. Finally, a 11 indicates a double precision selection. When you are in an idle condition no input signal is active and no write operation to the Local Store is done. When the input word selection bits are 10 and 11 and they enter the decoder, then the selected line becomes active and the selected word is written into the Local Store.

Entering the position 3, note that it is going to write a pair of words at a time so that double precision may be performed. It is either going to write word zero and a one, or its going to write words two and three and if you are selecting the 3 position, you are going to write one of those two pairs. Once again there is a select line on this and that comes from the IFC also. Note that the selected address bit 10 from IFC or AG determines whether you are going to write word zero on one. Thus, you will look at bit 10 from the IFC section or from the AG section and then if bit 10 is there you will write words two and three, if bit 10 is not there, you will write words zero and one.

The Input Buffer 306 of the Local Store 300 shown in block diagram form in FIG. 134, is shown in detail in FIG. 143. As shown in the figure, it is divided up in the same way as the Local Store memory in a word zero, word one, word two, and word three. But notice here that there are only 16 words in each one, for a total of 64 words in the Input Buffer. The bits of data and parity correspond to those of the Local Store. Now the data input to the Input Buffer 306 comes directly from the HPSU in data register 308 and note there is a separate write and read address for the Input Buffer. The write address counter and the read address counter is the same for all four words. The input data from the HPSU in data register 308 are word zero, word one, word two and word three. The Input Buffer is made up of 16 by 4 file chips and it has a 30 nanosecond cycle time. You may change the address and get new data every 30 nanoseconds or you may write into it every 30 nanoseconds. You may also read and write in the same cycle and this is because of the way that the memory chip is made. If you start a write operation it will latch up the read data from the address that you were previously reading and this enables you to capture the data at that address, read it and this information may be written during the same cycle. It should be repeated that it has separate read and write address counters.

Further, you may read or write a block of four words simultaneously, while the read operation is substantially the same as the Local Store memory. Also, the address counters simply increment by one and merely wrap around the address zero to basically operate in a first-in first-out manner. Finally, the purpose of the Input Buffer is for temporary storing scalar operands when they are retrieved from the HPSU. All scalar operands are written to the Input Buffer when they are retrieved from the HPSU. All scalar operands are written to the Input Buffer when they come back from the HPSU, they are written into the HPSU buffer and recall that where scalar operands are entering from the HPSU via the HPSU in data register they will be written into the Input Buffer unconditionally.

Returning to FIG. 134, notice that there is another path in the HPSU in data register 308 for these operands to be used immediately at the SP out data register 304*a* so data that is written into the Input Buffer 306 may or may not be used there. The only time that the data will be used in the Input Buffer is if there is some kind of a conflict and the data is returning from the HPSU and being written into the Input Buffer. When the conflict exists, the data can not come straight from the HPSU in data register 308 and you then must read it out of the Input Buffer 306.

f. Store Buffer (800)

FIG. 144 is a basic block diagram of the Store Buffer ST section 800. It is basically an interface between the Vector Processor Module 162 and the HPSU 16. It also forms a data passage for movement of scalar data from the G registers to the HPSU. To start, the input data from the Local Store or from the Vector Files enters the Write Data register 804 and takes four words from each one. This register 804 scrambles or unscrambles the data to put it in the proper format for whatever type operation that is desired. It also peels off two of the words for index type operations and sends them over to the index buffer 810. The index buffer 810 is part of the Store Buffer section 800 but it is physically located in the Address Generation section 700. The heart of the Store Buffer section 800 is the Store Buffer 802 itself. It is a block of temporary storage used while we are getting ready to transfer the data over to the HPSU 16. Another register called the Read Data Register 806 selects the four words and aligns them for storage on whatever address type boundary the words are supposed to be stored on. The data can go from this register 806 either to the HPSU 16 for regular type storage instructions or to the Local Store 300. For acceleration/deceleration operations the data can be sent to the Instruction Flow section 400. The control of the Store Buffer section 800 is controlled either by Vector Store 1500 for all writing operations, since the Vector Store 1500 controls all of the signals that deal with writing. It also controls the reading out of the Store Buffer 802, by the read control 801 via control signals from the AG. There is, of course, some interaction between the read 801 and the write 803 controls to keep from over running the write information into the read area.

The write data register 804 shown in FIG. 144 is broken down as shown in FIG. 145 so that there are two primary words 813 from the Vector Files 1300 and two secondary words 814 from the Vector Files 1300 coming into a selector 815. Now this selector 815 is used to unscramble the data for the various types of vector store instructions For normal store vector it selects via 815*a* the primary data for straight through passage and it stages the secondary data via stages 816, 817 so that it is delayed by one cycle prior to entering selector 815*b*. For store alternating, or indexing, it selects the secondary data 814 for straight through operation. The Local Store data is brought in for the storing of G multiples. Normally, the Local Store data is brought straight through register 818 to the output register, but for a store G multiple it works very similar to a normal store vector. The output can be crossed over in register 818 to unscramble the data. This is necessary to get the words lined up correctly in the store buffer 802 for store vector and index store vector instructions. This is the reason for the selector also being included in the index data. For store alternating, the data passes straight through and does not have to be unscrambled in any way. The data enters four words at a time, two words 813 from the primary Vector Files and two words 814 from the Secondary Vector Files so there are always four words at any one time even from Local Store 300.

Figure 146:
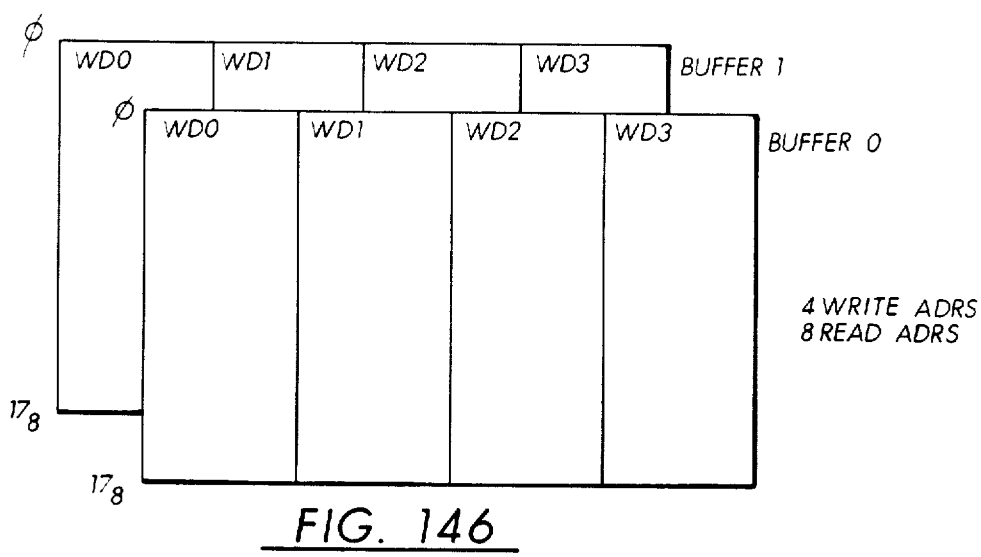

The Store Buffer 802 is broken down into independent memories or buffers as shown in FIG. 146. They are buffer 0 and buffer 1. Each memory is four words wide. Each word is a 40 bit wide word which is 36 bits of data with 4 bits for parity. Each has zero through seventeen (17) ($0-17_8$) octal memory locations. It is broken down in this way so as to speed transfers through it. Thus, you can be loading one buffer while you are reading out of the other. Since the words are sent across four words at a time, and basically in two word groups, there are four write addresses. For buffer 0 there is a single address for words 0 and 1, and another address for words 2 and 3. A duplicate set of two write addresses are needed for buffer one. Since the words can be read out independently, there are eight read addresses. There is one for each word for both buffer 0 and 1 for a total of 8 read addresses. Because of the varying strides that may be used, you may get anywhere from one to four words out at one time. In the case of an index store, only one word may be gotten out at a time which makes it rather slow to do index type instructions.

The output register as shown in FIG. 147 is basically a nine way selector, the ninth input is the data from the Local Store 300 which is used anytime you are doing a scalar type instruction. Since that data is passed through, the word zero stays with the word zero, word one stays with the word one, word two with word two and word three with word three. When a vector type instruction is being done, the word that comes out on any particular request from the buffer 802 does not necessarily correspond. The read toggle circuit shown in FIG. 149 determines which buffer that is being read. It determines which of the two buffers that is being selected. Next, the two bits originally from the AG arrive from the selector memory and the selector memory basically controls how the data is transferred. The selected words, in turn, determine which word from the store buffer 802 that is going to be selected for that particular word because of the varying address boundaries. They do not always correspond. The data coming from the register is even parity for Local Store and the Instruction Flow Control section, where as previously noted, in the HPSU, it is odd parity.

The most important signal in the Store Buffer section 800 is the ST AG store start enable designator, the circuit for which is shown in FIG. 148. This signal tells the AG when there is valid data in the buffer and when the buffer is ready to receive data for storage. This signal is generated when an overflow or a zero condition on the element count, which is an abort condition, is received on line 819. It forces signal 818 to be set so that the AG can be shut down. This signal is also forced if there is a last pass condition set in register 820 and the last pass flip-flops are set by a last pass signal from the VS. When the AG completes the reading of the section it sends a last pass signal which clears this flip-flop so that this store start enable designator will be set when the ST VS has finished loading. It will be cleared when the AG completes the read operation. The other condition which causes signal on line 818 to be set is where there is a long element count and it is not desired to wait for the VS to finish loading it. There is an offset counter 821 in the lower left hand portion of FIG. 148 which is preset to three, which is the minimum offset that is needed to be generated so that you will not read data that has not yet been written. This counter is then compared in comparator 822 to the buffer bits. Note that the least significant bit of the write address is dropped i.e. only bits 0-4 are sent to the offset counter 821. When the write address of counter 823 is greater than the offset counter this signal is set and this permits the storage of the data. When the last pass comes through it is blocked until all of the data may be read without having to stop. This count ensures that if a conflict is received while you are loading the store buffer, the write addresses will stop. However, the offset counter 821 will continue to count along with the read address. If this catches up with the write address it stops in time so that if a conflict occurs the data does not get read out before it has been written. It therefore not only allows you to start early but it also provides insurance that you do not over run the write with the read when there is a conflict condition.

Another important signal is produced by the read toggle circuit shown FIG. 149. It determines which buffer you are reading from. The write operation is totally controlled by the Vector Store (VS) but the read AG has no way of knowing which buffer it is reading. This requires the Store Buffer to have sufficient intelligence to inform the AG which buffer is being read.

This information also allows the switching to the next buffer. In the case of a store operation, the read toggle circuit allows the alternating between the buffers. Referring to FIG. 149, if the read address in counter 824 is equal to 15 or if you are at the last address and the last transfer flip-flop 825 has not been set, then this allows the automatic switching into the next buffer. This logic section (Store Buffer) is only for the alternating of the store under normal conditions as in a store vector or an index store vector instruction. Note that Vector Store and Store Vector terms are used interchangeably.

FIG. 150 is a timing diagram that shows the basic functions of a Vector Store. The primary store vector signal from the VS initiates the loading of a buffer. It basically initiates the write enable WR EN. There is a primary and a secondary store vector to keep all four words from becoming confused. At the same time that the primary store vector starts, the write toggle switches to the buffer selected for writing. In this case it is going to be an order to write in buffer zero so it is an initial condition. It will switch from a one to a zero at the beginning of the instruction signal. Consider that buffer zero is to be loaded. A cycle after the store vector has been initiated, the write enables are actuated. This allows the writing of the first two words into the Store Buffer. Now since the normal store vector operation is being done, the data from the secondary is delayed by one cycle so that it can be unscrambled and written into the buffer while the format is written into the HPSU. So at this time two words from the primary file are being written into address zero of the buffer. The store vector toggle signal starts up with the write enable signal and it toggles to allow the cross over to separate the words by controlling the input register. On the first write operation, location zero of the second buffer is addressed. The data from the second transfer is received from the primary side and the first transfer from the secondary side is written into words two and three address zero. The data from the primary side is written into address four. This basic process of jumping up the addresses and writing in four words at a time is continued on until the 17th and 18th transfer is made. At that point half of the buffer is filled and sixteen write operations have been performed. Before this there were effectively only four words available, but now instead of having just eight words available, there are 16 because of the way the data is transferred from the Vector File. It is at this point that the offset counter 821 is at a number less than the write address counters so the offset compare circuit 822 is set and a cycle later the store start enable FF 826 is set. This allows the read process to begin. The write operation continues and three cycles later the first read request is received. The first address will be zero and four words at a time are written into the Vector File, or into the HPSU. If there are no conflicts, the read and write operations occur uninterrupted. After the last transfer from the Vector Files to the Store Buffer, and that signal lasts for one cycle, the last transfer flip-flop 825 is set. This last transfer forces the store start enable circuit to be continuously set thereby preventing a conflict from causing a break in the write operation sequence. However, the read sequence may be interrupted because of delays in receiving requests via the HPSU acknowledge lines.

FIG. 151 illustrates three tables for a normal store vector operation. They are a Vector File Data table, a Write Data register table and a Store Buffer table. The data is transferred as follows: First, the data has to be unscrambled and because normal store vector operation is being performed, whether it is double precision or single precision, 72 bits are sent from the primary and 72 bits are sent from the secondary. For a single precision operation, you get words zero and one and words sixteen and seventeen. Since all four of these words need to go into address zero in the Store Buffer, the secondary is delayed a cycle so that they may be sequenced. It is physically impossible to write two addresses at one time so the secondary is delayed to allow time to write that. So words zero and one and words 16 and 17 are sent, with words 16 and 17 being delayed by one cycle. On the next cycle, words 2 and 3 and words 18 and 19 are sent. Words 16 and 17 are written into location zero and one and words two and three are written into locations two and three. For proper location in the sequence words 16 and 17 go into address four of the Store Buffer. On the next transfer words four, five, eighteen and nineteen are written and this continues on down until you have transferred as many words as are desired to be written. In the figure there is shown the transfer of 64 words but if less than that are to be written you just ignore the values that are not to be written. So, for example, if you have less than sixty-four, say 62 words are to be transferred then the final transfer would not be done and the secondary store vector signal concludes one cycle sooner.

The values that are written in the table are the actual words that are being sent from the Vector Files, so zero and one are words zero to one from the Vector Files, while numbers 16 and 17 are words 16 and 17. To place them into proper order, 16 and 17 would fall in address four of the Store Buffer and that is what is shown in the Store Buffer table of FIG. 151.

The tables shown in FIG. 152 illustrate a store alternating element operation with a Store Buffer table and a Switch Buffer table. It is used when writing vector arrays so that a real and an imaginary value may be described. Two vectors of equal size are being physically transferred. The primary words are the real values and the secondary the imaginary ones. You have a one to one correspondence real to the imaginary for each of the words. Since there is that correlation you do not have to scramble anything so all four words are written at the same time. Thus there is zero one written into address zero one, zero one. The same thing with words two and three. It continues on and you fill up the one buffer when 32 transfers have been made from each of the Vector Files. At that point the Vector Store causes the buffers to be switched and it toggles over to the next buffer. This second buffer then continues filling up. During the store alternating, you must also toggle from one buffer to the next during a read operation. No attempt has been made to differentiate as to which buffer is which because it could be either one. It is not necessary to write into a zero first then one, it just takes them in the order of whichever one is empty. On an indexed store shown in FIG. 153 you are sending data and indexes simultaneously and the indexes are always 32 bit values. The data can either be double precision or single precision, so when you have double precision data the index values will finish in half the time that it takes to do the data values, so the index buffer is completely independent as far as the write from the Store Buffer and so for normal single precision one, you have data word zero and one and index values zero and one written more or less at the same time. They are written into two completely independent buffers as shown in FIG. 153 but they are physically written at the same time. Because words zero and one are written into locations zero and one and words two and three now also have to be written into words two and three, the toggle that was in effect for a normal store vector to unscramble the data is also used for this operation. This is also true for the index values. The Index Buffer has two words, it is the same physical size as the Store Buffer. It includes addresses zero through 17 octal, but it is only two words wide which is why only two words are sent over to the index buffer at a time. However, because it is necessary to write four words to an address in the Store Buffer, the index values are switched back and forth. To do this a selector is tied to the same toggle line of the register that sends the data to the index buffer. In the VF Data Out register shown, the data bounces back and forth, all of the primary values, but none of the secondary values are ever written into the Store Buffer. To do both, it is necessary to have two cycles per address location to load the Store Buffer. This is one place where an index store slows down because only two words are written at a time. Another place that it slows down operations is in the index values. Another offset counter in AG keeps track of how many index values you have written and the index values must be a given distance ahead before you can start generating addresses from these index values in order to use them to do a store. This is another place where the operation slows even more.

The final place that the index store slows down operation occurs because you can only generate one address at a time to the HPSU or to Local Store so only a one word transfer may be done each time. This effectively slows down operations to 120 nanoseconds per cycle as soon as you try to do an index store.

g. Loop Control

The inclusion of the Loop Control logic section in the present Scientific Processor is motivated by the fact that the machine is a Vector Processor. This means that instead of taking data A and data B and adding them together putting the results in data C it takes a whole array A and adds it element by element to array B and then places the results into array C. Further; its inclusion comes from the fact that in the Scientific Processor, vector arithmetic is done on a register to register basis. In the present machine there are special registers called vector registers which hold vectors of data or arrays of data and the arithmetic is done a vector register at a time. Now since you cannot, in general, place an entire array into a vector register at one time, and further since you almost never have an array that exactly fits into a vector register, a vector operation must be done in pieces. This is sometimes called herein strip mining or doing a vector in stripes. The terms strip or stripe will be used often herein and this piece by piece operation will be the topic of discussion and the terms are interchangeable.

First, let us discuss a fairly simple example. Suppose you have two statements of FORTRAN do loop 10 for I=one (1) to a thousand (1000) over three arrays A, B and C. This is done by adding B and C arrays, element by element, and placing the result in array A. Since the vector registers in the present processor are 64 elements long, the entire 1000 element arrays will not fit in the vector registers so you have to do them in strips or stripes and the last strip is going to be an odd size because the entire length of 64 does not divide evenly into one thousand. The way that this will be processed is to do a first strip of 64 elements and a next strip of 64 elements and keep doing these strips of 64 elements until you get to the last piece which is going to be 40 elements long.

Consider that this first instruction is a Build Vector Loop Entry (BVL) and that this BVL is one of the loop control instructions. Now recall that the loop is going to be done over a thousand elements and so the Begin Vector Loop, in this case, is going to be passed a constant length of a thousand and this will be set up in the loop control instruction. The necessary registers to do the vector loop over arrays are going to be a thousand elements long. Now when we come to this load vector instruction this will take data found in the address G1 register and load the elements from there into vector register V1. Now, an implied operand in this load vector operation is the length of the vectors. The vector lengths come from the Loop Control section and in this case the vector lengths are going to be called an L count (ELCNT). If a vector instruction is being done, the L count gives the number of elements you wish to process on this pass through the vector loop. All vector instructions are going to be done using the length of element (L) count.

Consider next an overview of the Loop Control operation. Generally what does the Loop Control logic 1273 section do and how it is split up? A basic outline is illustrated in FIG. 154 and will be used for the overview. First of all are the Loop Control (LC) instructions which are executed by the Loop Control mechanism. The Load Loop Control and the Store Loop Control instructions are used for loading up the entire state of the Loop Control files from memory and storing them back into memory.

The Loop Control participates in Scalar arithmetic operations when you are doing Scalar arithmetic on vector elements pointed to by the element pointer.

Returning to FIG. 154, there are shown the two main sections included in the Loop Control. They are: (1) length and pointer interface section 1008 and (2) LC operations section 1010. Now the LC operations section 1010 comprises the logic for doing the instructions that Loop Control executes and it includes the files for the Loop Control data. The length and pointer interface contains the logic for the instructions in which the Loop Control participates. So you can see that there is a physical breakdown across the functional lines of Loop Control. There are also generally shown the interconnections that Loop Control uses to communicate with the outside world. The data that Loop Control needs to execute a Build Vector Loop (BVL) instruction or to execute a load loop control instruction or to receive move data always enters via the Scalar Processor. This is the only data interface that the Loop Control has with the outside world. Likewise data leaving the Loop Control for the memory or for transmitting move data goes through the Scalar Processor. There are no other direct connections to any of the other data interfaces of the Scientific Processor. The only other interface of any kind is via the control words which come from the Instruction Flow Control section 424 to control the operations accomplished in the Loop Control 1000. All calculations done by the Loop Control instructions are done in the Loop Control operations section 1010.

After the length and the pointer information has been calculated in the LC operation section 1010 it proceeds over to the length and pointer interface 1008 where it is available for use in those instructions which require it. So the instructions enter through the instruction stream in which the Loop Control must participate. The control which arrives from the Instruction Flow Control section 424 essentially comes from the Instruction Buffer 810 and goes to the length of pointer interface 1008. What is actually occurring here is the decoding of the length field of the instruction. From the length pointer interface 1008 are lengths and pointers which go off to the various other sections of the Scientific Processor which are actually executing the instruction which has been issued. There are two separate control interfaces and it is important to differentiate between them. As shown in FIG. 155, the first interface is the control information for the instructions in which the Loop Control is participating and the other is a control interface for the instructions which the Loop Control itself is required to execute. These latter instructions are under its own control.

The first interface is the Instruction Flow Control section 424 which is managing the issuing of instructions in the Scientific Processor and it controls the instruction path that is being followed. The IFB or the Instruction Flow Buffer section 422 is the second interface and contains the instruction caches in its P counter previously described. It provides the instructions that go out to the Instruction Flow Control 424. The second interface from the Instruction Buffer enters the length and pointer interface 1008. A broad arrow provides the control interface from the Instruction Flow Control 424 to the length and pointer interface 1008. Within the length and pointer interface occurs the decoding that goes along with the instruction. This part of the Loop Control is tracking the Instruction Flow Control issue pipe line. It is sending out the appropriate length of pointer to the instructions that are currently flowing through the Instruction Flow interface as it issues instructions to the rest of the machine. Now control words come out of Instruction Flow Control and go off to various sections of the machine and the Loop Control word comes from Instruction Flow Control. It comes through the outer path 1019 to the Loop Control operation section. This is where the control words initiate the Loop Control instructions that allow the Loop Control execution instruction to enter. Also note the data interface 1020 from the Loop Control operation section 1010 goes up to the Scalar Processor (SP) 900 and data returns from the Scalar Processor 900 back into the Loop Control operation section 1010. The other section of the machine which the Loop Control interfaces with are shown across the top of FIG. 155. These logic sections are the ones which require length and possibly pointers to execute the instructions that they are receiving from the Instruction Flow Control section. Among those are the Mask Processor 600 which requires lengths and pointers primarily for move and jump instructions and the Vector Control interface 1100 which, of course, needs length to do any of the vector operations and requires pointers to fetch elements from the Vector Files to be sent over to the Scalar Processor scalar operation. In this case the pointer is used to give a vector element.

Another section is the Address Generation section 700 which uses the length to execute the load vector and store vector instruction. These latter are vector operations and they have a length which goes with them. This tells them, via the elements, the sections for which the AG must generate addresses. It also provides store and load information. The final logic section is the Control Block (CB) section 500. It provides the length supplied to the CB and is done mainly for accounting purposes. There is a register kept in the Control Block section 500 called a quantum timer which decrements for each instruction that is executed and the amount that it decrements for vector instructions depends partly on how many vector elements that are being executed. Thus, the element count (ELCNT) basically goes over into the Control Block section 500 for purposes of deciding how much to decrement that counter.

Returning to FIG. 154 consider again the length and pointer interface 1008. First of all the length and pointer interface provides length information to all vector instructions. It provides the pointer to arithmetic operations performed on vector elements. It also provides the length and/or pointer to all move and jump instructions that use the Mask Processor and its functions. The length and pointer interface also must track the instruction issue pipe line shown in FIG. 157 because it is, in essence, a part of the instruction issue pipeline. It is not in the Instruction Flow Control section but it duplicates many of the registers contained therein for delivering the length and pointers to the instructions as they need them. This is so because these lengths and pointers become available out of the length and pointer interface at the same time the control word becomes available out of the Instruction Flow Control section.

Referring next to FIG. 156 there is shown the Scientific Processor instruction format, we have the L field which is a two bit field that selects a vector length. The two bits provide four signals named the element count (ELCNT), the next element count (NELCNT), the ALT 1 and the ALT 2. Part of the t field also goes along with this. The t field is a three bit field which designates the type of data upon which the instruction is going to execute. The least significant bit (LSB) of the t field indicates whether a single precision or a double precision field is applicable and that goes into the length and pointer interface of the LC. If you have an element count that is too large for the instruction that is being done, the Loop Control uses this LSB bit to trim the element count to 32. The length and pointer interface processes this least significant bit (LSB) of the t field along with the L field to select one of these lengths. These length indications come up at the same time as the control word is made available from the Instruction Flow Control section and both are delivered to the receiving section.

Next, consider FIG. 157 which illustrates the instruction issue pipeline. Instructions enter at the bottom from the Instruction Buffer 422 which is a cache containing up to 4 K instruction words and enters the hold register. They flow from the hold register 1011 into the next instruction (NI) register 1012. If they are heading for the Vector Module they go through a register called VFO register which is merely the vector FO register, however, if they are headed for the Scalar Module they pass through the FO register 1014 and usually through the F1 register 1015. The control words are issued to the Scalar Module out of the F1 register 1015 and to the Vector Modules from the VFO register 1013. This is a fully pipelined instruction issue section and it is possible to issue instructions at a rate of 1 per cycle providing there are no other conflicts within the machine. For example, at some particular phase 4, the pipe could read a load G instruction into the hold register 1011. At the next phase 3 it can move into the next instruction (NI) register 1012 and in the following phase 4, another load G instruction can enter the hold register 1011. At phase 1 this will move into the FO register 1014 and on the next phase 3, if these instructions are not blocked for some reason this load G instruction will move into F1 1015. The following load G instruction will be loaded and in the next phase still another load G can enter the hold register 1011. It is readily seen that instructions can flow through this part of the pipeline at a rate of 1 per cycle.

Now for vector instructions, they follow the first part of the pipeline in the same fashion. They also start out in the hold register 1011 since all instructions arrive there from the Instruction Buffer. They then move into the next instruction (NI) register 1012 and at the following phase 4, provided the rest of the registers are free to issue a vector instruction to the Vector Processor. For example, an add vector on phase 1 will move into the VFO register 1013. In the following phase 3, this instruction will issue across to the Vector Module and this add vector instruction will move into the next instruction register (NI). Now because of the way the interface between the Vector Module and Instruction Flow Control operates, the VFO 1013 is always tied up for two cycles when issuing a vector instruction. So on the next phase 1, this add vector instruction in the next instruction (NI) register 1012 is not allowed to move into VFO 1013 but will hold there for a cycle. Notice that the instructions move through hold (HLD) register 1011 and next instruction (NI) register 1012 in order but because of the fact that the instructions are split and follow different paths after next instruction register 1012 they can get out of order once they have passed through there.

In some cases there are instructions which are sent to both the Scalar Processor Module and the Vector Processor Modules. These are called dual instructions. For example, the load vector instruction requires participation by both sections and both the Vector Module and the Scalar Module require that vector control and the vector load section of the Vector Module participate in its execution. It also requires the Address Generation which gets its instructions from the Scalar Module. So this instruction must hold in the NI until both the FO and VFO register are free. At that point, the appropriate decode from each side goes into FO and into VFO at the same time. So the key points to be made here are first that the instructions stay in order through the next instruction NI register 1016. Next, if there are no conflicts the rate through FO and F1 can be as high as one per cycle, although it need not be if the Scalar Processor or other processors which take control words from FO and F1 are not ready.

Next, the maximum rate through the vector FO latch VFO 1013*a*-1013*n* is one every two cycles, although it need not be that high if the Vector Module is busy and backed up. Finally, the FO 1014 and the VFO are, in most cases, completely independent and instructions can go through them independently.

Parts of this instruction issue pipe are in the Loop Control (LC) section as shown in FIG. 158. Corresponding to the NI register, there is also a small next instruction (NI) register in the length and pointer interface block diagram. The length field and the t field enter the NI register from the hold register. Part of the VFO also exists in Loop Control as does part of the FO register. Information from the NI or the FO registers select, in the F1 register, the desired length information received by the F1 register. So information coming from the Loop Control and going to other sections of the machine is coordinated with the VFO going to the Vector Control (VC) section and to the Control Block (CB) section to do the accounting of the vector instructions going through there. This information also includes the lengths that were calculated in the Loop Control operation section and selected in the VFO. It was based on information in the next instruction latch 1012. The Vector Control section of the Mask Processor includes pointers which are calculated in the Loop Control operation section and are coordinated in the VFO register. For Scalar instructions or operations which require lengths, the length field and the t bits enter the NI latch 1012 pass through the FO register 1014 selectors and into the F1 latch 1015. From there are lengths going to the Mask Processor for move and jump operations. There are also lengths going to the Address Generation section for load vectors and store vectors. Further, length information is sent to the Scalar Processor to generate index vector instructions. Although this is a vector instruction most of the actual work of generating the address is done in the Scalar Processor and therefore the Scalar Processor requires the length in order to execute that instruction. Now since none of the controls for any of the NI, FO and F1 registers is in the Loop Control, the control information comes from the Instruction Flow Control section.

Two registers, not in the IFC section, that exist in the Loop Control section are the NI delayed latch 1017 and the NI stage latch 1016. The reason is that a vector instruction can pass through the instruction pipeline, via the NI and into the FO and hold there for various reasons. One possibility is that one of the data items that is required for a vector instruction is not ready. For instance, you may be waiting on mask data to get loaded into the mask or you may be waiting for some loop control data to be calculated. A BVL instruction, for example, especially if the length that was being used is coming from the HPSU. To do this, the data must come from the HPSU via the Scalar Processor, then on to the Loop Control. The Loop Control section has to calculate the element counts and the next element counts and send them over to the length and pointer interface of the LC. It is easily realized that delays occur quite often where it is necessary to wait for calculations to be performed on the data passing through the pipeline.

At this point, the other section, of the Loop Control operation section, of the Loop Control will be discussed. Now recall that in the length and pointer interface, control is from the Instruction Flow Control Section. So the LC contacts the IFC and receives the length and t field bits from the Instruction Buffer and receives the lengths and pointers from the Loop Control operation section. Now the Loop Control operation section contains arithmetic generation, this is the part of the logic that does loop control arithmetic. It also contains the Loop Control files, i.e. all of the controls for the instructions that the Loop Control executes.

The following is a short outline of the LC operation section, what it contains, what it accomplishes and what it executes. Those instructions under its own control are the Build Vector Loop (BVL), the Jump Vector Loop (JVL), the Begin Element Loop (BEL), the Jump Element Loop (JEL), the Adjust Loop Register Pointer (ALRP), the Load Loop Control Register (LLCR), and the Store Loop Control Register (SLCR). It also contains the files that are defined, the vector loop files and the element loop files, as well as the pointers in those files i.e. the CVLP pointer and the CELP pointer which point to the current vector loop and the current element loop.

Also included is the arithmetic logic to calculate the lengths and pointers and the control for the execution of those instructions which it executes. Now the Loop Control Vector Loop (LC VL) files 1043 and the registers are illustrated in FIG. 159. They consist of the MZ or the strip size file 1019, the remaining length (RL) file 1020, the ALT 1 file 1021 and the ALT 2 file 1022. Also there is a pointer, the CVLP or current vector loop pointer 1023, which points to a common slice across all of these files. This indicates which of the current entries in this file that are used for the current execution level in the desired loop. There are also registers in this section which contain the currently active copies of all of these files. There is the MZ 1024 or current strip size register. Also the current remaining length (RL) register 1025 which usually contain the current next remaining lengths, a current copy of the element (L) count 1026, a current copy of the next element count 1027, a current copy of ALT 1 1028, and a current copy of ALT 2 1029.

The strip size or MZ file refers to the loop that is be set up with the BVL instruction.

As shown in FIG. 160 a very similar arrangement occurs with the Loop Control element loop (LC EL) files and registers. There is the MEC file 1030 which is the maximum element count file. The maximum element count is set up by the Begin Element Loop instruction at the beginning of the loop and it determines how many times it will go through the loop. Simultaneously, it clears the ELPT file 1031 entry that is being used and each jump element loop increments the element pointer and the corresponding element pointer file entry. The currently active copies of MEC 1032 and ELPT 1033 are kept out in active registers and, of course, there is a current element loop pointer (CELP) 1034 which points into the part of the file that is currently being used.

Next, representative instructions will be discussed in conjunction with the Loop Control logic section. In addition, Loop Control synchronization with the Instruction Flow Control will be described so that Instruction Flow Control can know when the lengths and pointers are ready to be used by the instructions. We are also going to talk about the Scalar Processor synchronization. Data comes from or goes to the Scalar Processor from the Loop Control section and there is some synchronization required at the data interfaces and so we will be talking about what synchronization is required to handle those data exchanges.

The first instruction for discussion is the Build Vector Loop (BVL) instruction shown in FIG. 161. This instruction starts by getting data 1035 from the Scalar Processor. This data includes the total element length of the vectors which are to be executed. Also included is a t bit 1036 which is issued to the Loop Control or to the Instruction Flow Control section. This, of course, enters into the calculation of the element counts (ELCNT) 1026 and next element count (NELCNT) 1027 and the E field 1037 of the instruction control word is received from Instruction Flow Control. That information enters the Current Vector Loop Pointer 1023 and becomes the new file pointer into which you are going to build the vector loop entry. The E field 1037 in this instruction is just another name of one of the general register fields. Now the t bit 1036 that comes in from the control word (CW) is copied into the MZ register 1024 and it is eventually written into the file 1019.

When the data finally arrives from the Scalar Processor, it is initially trimmed to a 30 bit length. The vector loop entries only have room for 30 bits of the remaining lengths for the vector, so only vectors with that many elements in them may be done. Whatever elements that remain are sent to the remaining length (RL) register 1025. If there are any bits set, among those upper six bits, it causes an overflow interrupt condition which prevents the calculation of a negative 0, thereby sending it over to the Loop Control section. Early in the execution of the BVL instruction the old element count 1038 is copied into the ALT 1 register 1028 and the old ALT 1 register 1039 is copied into the new ALT 2 register 1029. This is only used in more advanced code optimization techniques. The calculation of the element count and next element count is more interesting. First of all consider the remaining lengths. The RL field 1025 and the MZ field 1024 are compared to determine the smaller of the two 1040 and it becomes the element count 1026. Now to refer back to the original plan, if you have a vector length of 100 and the single precision vector, the maximum number of elements (the MZ) 1024 also called herein the strip size is 64. Since 64 is smaller than 100 that is the value that is going to be selected for the element count 1026 and that is the value that is going to be used for this pass through the loop. Now on a single precision operation if a BVL with the length of 17 occurs the strip size is set to 64, since this is the maximum number of elements that could be done in a strip. The remaining length of 17 really means that only 17 remain to be done so the smaller of the two (17) is placed into element count 1026 and that is the number that is to be done this time through the loop. Now the element count is to be subtracted 1041 from the current remaining lengths so that whatever remaining elements are performed on this pass through the loop is subtracted from the remaining length. The same type of minimum operation is performed with the strip size, and the minimum 1042 is RL minus the element count. This becomes the next element 1027 or the number of elements that can be done the next time through the loop.

Note what happens with the JVL instruction shown in FIG. 162. It actually subtracts 1041 the elements from the remaining lengths 1025 and stores the result as a new remaining length **1025*a*, and that is the next element count 1027. This is actually implemented in Loop Control by having the LC continuously looking ahead to the next JVL instruction to occur. So instead of stopping with a subtraction 1041, a new NELCNT 1027** is formed by actually calculating the lengths that remain after the next JVL is executed and storing that number in the JVL register. It is seen from this description that there is always searching going on in the Loop Control section, and this means that care must be taken before concluding some of the operations, since all discovered inputs must be included.

Now the value that is actually kept in the Loop Control file for the remaining length is the value that you would expect after the execution of a BVL instruction. This is the next remaining length value. It is only after this value has been written into the LC file and the LC file has been updated that it actually calculates the new remaining lengths that are stored into the active registers. In effect, this is just a look ahead to the next JVL instruction, since it is assumed that this is the next instruction, and that is what usually happens.

After the new strip size information is received to do a remaining length operation on the CVLP from the control word and the new ALT 1 and ALT 2 is received, all of this information is sent to the file. Next, the CVLP comes from the file address as does the RLMZ on an ALT 2 transfer. This is all written into the file.

Now the Build Vector Loop (BVL) instruction of FIG. 161 accompanies the Jump Vector Loop (JVL) instruction of FIG. 162 and they close the Begin Vector Loop. The operations defined by the Begin Vector Loop in the Loop Control operation is as follows. The next element count is already in existence since a BVL was just executed and it sends copies directly into the element count register.

In the case where the Jump Vector Loop (JVL) instruction is not taken none of the elements are processed on the next trip through the loop.

Refer now to FIG. 163 which is the Adjust Current Vector Loop Pointer (CVLP) instruction sequence. This sequence allows a change of the Current Vector Loop Pointer so as to read a new set of Vector Loop entries, a new strip size, a new remaining length, a new alternate ALT 1 and a new alternate ALT 2 length and size are read into the active registers.

First, a new E field 1037 is received from the control word from the Instruction Flow Control. This field moves into the Current Vector Loop Pointer (CVLP) register 1023 and that is used to address the file 1043. It reads a new value of ALT 1 1028 and new value for ALT 2 1029. It also reads new values for remaining lengths 1025 and strip sizes 1024. The minimum 1040 of the remaining lengths (RL) 1025 and strip size (MZ) 1024 enter the element count register (ELCNT) 1026. The remaining length 1025 is subtracted 1041 from the ELCNT 1026 and the minimum count 1042 between that difference and the strip size becomes the next element count 1027. The result of that subtraction is also stored in the remaining length register **1025*a*** so that we are prepared for the next JVL instruction. The main items to be remembered about Loop Control are; (1) it is always in the BVL/JVL sequence; (2) it is always assumed that a Jump Vector Loop instruction is about to occur and that the jump is going to be taken; and (3) it includes the values that are necessary to execute the Jump Vector Loop precalculation.

Moving next to the Begin Element Loop (BEL) instruction shown in FIG. 164 together with the Jump Element Loop (JEL) instruction taken (FIG. 165) and (JEL) not taken (FIG. 166), the Begin Element Loop is started by taking a length field (L) 1044 out of the control word. This control word (CW) is an F1 time control word and it includes a length field (1) for a Loop Control instruction.

Now this length field (L) is used to make a selection 1045 of what is to be stored in the Maximum Element Count (MEC) register 1032. The selections include: the Element Count 1026, the Next Element Count 1027, the ALT 1 1028 and the ALT 2 1029. Now, at the same time, the Element Pointer (ELPT) register 1033 is cleared to 0 because as we go through a BEL/JEL loop, this register (ELPT) 1033 is incremented by one. These successive numbers are used to fetch successive elements out of the Vector File **1043*a*. After both the MEC 1032 and the ELPT 1033 registers have been calculated, the Vector File 1043*a* is written into at the file address noted by the CELP 1034 which address originates from the E field 1037** of the control word.

Now the Begin Element Loop instruction, as was mentioned earlier, is a jump instruction because if you start at an element count of 0 that means that it is not desired to process any elements so a jump is performed to the Instruction Flow Control to start the loading of a new sequence.

The Instruction Flow Control (IFC) calculates the new number in the P counter and everything else that is necessary to perform the jump. When the Jump Element Loop is taken the path is shown in FIG. 165. It is a simple illustration. It takes the ELPT 1033 and adds one to it and then returns it to the ELPT 1033, as well as writing it into the Vector File. Now when the Jump Element Loop instruction is not taken the path is shown in FIG. 166. It is very much like the adjust CELP where we start with an E field 1037 from the control word. That information goes into the Current Element Pointer (CELP) 1034 which addresses the Vector File 1043*a*. Finally the data in the file is loaded into the MEC 1032 and the ELPT 1033 registers.

The next instruction to be considered is the Load Loop Control Register (LLCR) instruction. As previously mentioned, all of the data that ever enters the Loop Control comes from the Scalar Processor. This is shown in FIG. 167. While the double word is 72 bits wide as far as a programmer is concerned, in order to save a few pins on cards it was decided to eliminate the 0 zone of the word and only send 62 bits. So the O'are eliminated in this data transfer from the Scalar Processor to the Loop Control and the parity bits, instead of being on the normal 9 bit boundaries is kept on a per field basis.

The new CVLP and CELP pointer information is then loaded and passed to the pointer load register 1046. The MZ field from this double word comes through the RL field. The RL field is coupled to receive the contents of the active RL register 1025 and also for the ALT 1 field, the ALT 2 field, the MEC field and the ELPT field. They are all read from the Scalar Processor interface into the active registers. Thereafter, the active registers MZ 1024, RL 1025, ALT 1 1028 etc. are written into the files as shown. The MZ, RL, ALT 1 and ALT 2 are defined to be part of the VL file 1043*b* and they go into the VL file location as addressed under the control of the CVLP 1023. As this loading is going on, these pointers are initially cleared to 0 and are incremented by 1 as the data is loaded into the selective entries of the EL file 1043*a* and the Vector Loop file.

The next instruction to be discussed is shown in FIG. 168. It illustrates a move operation being done where the destination of the move is in the Loop Control section. The move destination Loop Control section receives its data either internally or externally. External data from the outside world always enters from the Scalar Processor via the remaining length (RL) registers 1025. On an internal loop control move, if the move is to the Loop Control section, the move data enters through the internal move data register 1045. The input selection 1046 is made and it goes into the move data register 1047. So that no matter where the data originates, it eventually enters the move data register 1047 and from there goes to an active ALT register 1048. The only things that are movable during Loop Control operations are the ALT 1 and ALT 2 fields.

Now after the Move operation has progressed far enough so that it has stored the data into the appropriate ALT register 1048, the CVLP 1043 is used to address the file 1043*b*. The data is then written into the Vector Loop file at the address location under the appropriate ELCNT 1026 entry. The CVLP 1023 is used to address the file and since all instructions in Loop Control terminate by (1) a comparison operation 1041 with a JVL instruction and (2) a subtraction operation wherein their remaining length is subtracted from the JVL instruction, it is necessary to presubtract the ELCNT 1026 and return it into the remaining length registers.

The next Loop Control operation is the synchronization of the LC section with the Instruction Flow Control section. The Instruction Flow (IF) synchronization may be divided into 3 parts. The first part is to determine the time when the lengths and pointers are available for use. Remember from the previous discussion about the issue pipeline that if a vector instruction arrives for execution but the required length was not available its issuance was prevented. To achieve synchronization, of course, this prevention must be communicated one to another. A second part of the IF synchronization is to determine when the Loop Control section is busy, and the third part is to determine how the instructions issue. Each of these parts will now be discussed. Unlike most other sections of the machine, the Loop Control section is not a pipeline. The Loop Control section does only one instruction at a time, and the instruction moves through the IF section completely pipelined, but as the move operation, from the F1 register, enters the Loop Control section, the instruction is executed by itself, and so while the Loop Control control logic can control the rest of the machine, doing anything that it wants to, it can only handle a single instruction at a time.

The Instruction Flow Control keeps track of the resources required for each instruction before that instruction can issue. First, however, each vector instruction requires a valid length. Now if a vector instruction comes up and the length is not valid, the instruction will be held in the VFO register as was previously discussed. The IF section must know when the length of that instruction again becomes valid so that the instruction can issue and move out of the VFO and be executed in the Vector Control section. To do this, the instructions move through the instruction issue pipeline by having the IF clear a flipflop for a particular resource when the ELCNT validates the length. However, it is the responsibility of the LC to set up again when the length becomes valid.

For example, as shown in FIG. 169, assume that we are calculating in the ELCNT register. The contents of the ELCNT register is going to be resolved on a phase 3 and again there will be a valid length in it. The earliest that the VFO could issue this instruction is 2 phases later, at the next phase 1. There is a signal coming from the Loop Control section to the Instruction Flow Control section called the ELCNT valid signal. This ELCNT valid signal is a one cycle pulse which precedes by 6 phases the earliest possible use of the ELCNT signal itself.

After the data for the Build Vector Loop arrives at the Loop Control section and enters the register that it requires, in order to calculate the ELCNT, the ELCNT valid pulse should drop to a low condition. It should have been up for a cycle before the ELCNT register contents were interpreted. Two phases later the VP issue signal will go to a high condition and this instruction will move across from the Instruction Flow Control section to the Vector Control section. There are 3 basic valid pulses from the Loop Control section. First, are the ELCNT valid signal which controls the element count (ELCNT) and the next element count (NELCNT) signal and second is the ALT count valid signal which is used to indicate that an ALT register has just been made valid. Finally, there is the element point (ELPT) valid signal which is used to indicate that the element pointer has just been made valid. There are two ALT registers which operate together on a valid signal and two ELCNT registers which taken together produce a valid signal. This means that if the element count is invalid and you have a vector instruction that wants to use an ALT count as a length it may issue one even though the one requiring an element count or a next element count may not do so. Of course the same holds true the other way around. The element pointer valid controls the element pointer and has the same timing relationship, except that it applies to the ELPT register.

The Instruction Flow Control uses the condition, of having a valid designator which produces a low signal, to imply that the Loop Control is busy. This means that the Loop Control section still has not finished its calculation and is therefore busy and it cannot not take another instruction.

Consider next, FIG. 170 which is a timing diagram illustrating the issuance of an instruction. There are a few ways that an instruction can issue and this holds true throughout the Scalar Processor. This discussion applies for any section that takes control words from the F1 latch. In such an event, there is always going to be an F1 issue signal and there are also going to be two other signals. One of these others is the load F2 signal which comes from the IF, and finally is the SP GO instruction, which comes from the Scalar Processor. These latter two signals arise as the instruction moves from the F1 register which, you will remember, is the last register in the Instruction Flow Control instruction issue pipeline. It then enters into the F2 register which most logic sections use as their first stage of instruction execution control. So the only way that an instruction may be issued is if there is an F1 issue and either a load F2 or a GO instruction. A load F2 signal and a GO instruction cannot arise at the same time, one or the other may issue the instruction; however, there is always an F1 issue signal. Basically these signals come from the Scalar Processor section. At the same time that there is an F1 issue signal to the Scalar Processor, there is also a load F2 signal. The GO instruction that the SP section provides moves the instruction out of the F2 register and along the SP instruction issue pipeline. Since the IF section does not know when that will happen, the SP sends this instruction back to the IF and the IF takes that as a cue that whatever was in the F1 has just been issued. In a sense, the load F2 has been issued to start a stream of completely overlapped instructions. These instructions are going to be executed at a rate of one per cycle and they move through the instruction pipe at one per cycle. As this stream enters the Scalar Processor section and starts issuing instructions, they are continuously fed into the Scalar Processor section with the GO instruction. Since these are basic signals that are used to coordinate other instructions issued from the F1 register to the F2 register, all sections which take control words from the F1 must use the load F2 instruction and the GO instruction as signals to issue their instructions. This does not apply just to the Scalar Processor even though that is their primary application. So the load F2 signal comes from the IFC GO instruction which, in turn, comes from the Scalar Processor. The load F2 and the GO instruction are mutually exclusive signals and as mentioned either may cause the issuance of the F1 signal.

Scalar Processor synchronization is only necessary for data transfers because the data interface to the Loop Control arrives entirely via the Scalar Processor so the synchronization with the Scalar Processor automatically coordinates data transfers. Most of these transfers are initiated by augend valid signals. The load loop control and store loop control first start a GO instruction.

Now the augend register in the Scalar Processor is a general purpose transmitter substantially coupled to almost every other section that requires data from it. Therefore, the augend valid signal is a basic coordination signal throughout the Scalar Processor Module. As shown in the timing diagram of FIG. 171, the augend registers operate on a phase 4, one phase earlier, the augend valid signal has gone high so on a phase 3, just prior to augend register being made valid, the augend valid pulse will be elevated. Now, in most cases, the receiver latch is the remaining length register and a three phase decision is made between the augend register and the receiver latch. This allows only one cycle to get the augend valid pulse from the Scalar Processor. During this period these latches must be enabled so that they are ready to receive the data. Generally, this is the timing that is repeatedly seen as a standard data transfer mechanism. Loop Control uses this data transfer coordination on the Build Vector Loop instruction. Remember that the original remaining lengths whether they were from the Local Store or the HPSU, are calculated in the Scalar Processor. After coming from a G register they will all pass through the Scalar Processor and end in the RL register by way of the augend register. Also any move data entering from the outside world must first be translated via the Scalar Processor and only then will it go to the Loop Control. So the Loop Control is coordinated and the augend is valid.

The timing diagram of a GO instruction, in conjunction for the LLCR and the SLCR instructions, are shown in FIG. 172. The augend GO instruction is also used to coordinate the Load Loop Control and Store Loop Control instructions. Now this is a somewhat non standard use of the GO instruction but it is used in the Loop Control for performance reasons. It operates in the following manner. When the Loop Control knows that it is going to make eight (8) double word transfers for a Loop Control, it brings up a condition called the wait/go instruction condition. This condition starts at phase 3 and stays active throughout the entire load loop control process. When the GO instruction comes up, there is a corresponding timing change in the Loop Control, called the Load Loop Control Timing Change LLCR TC shown as the bottom timing diagram of FIG. 172. For each GO instruction a Load Loop Control Timing Chain is seen following behind it. The presence of this Load Loop Control Timing Chain means that you have just received a GO instruction from the Scalar Processor and there is a Load Loop Control instruction in process.

In a natural load loop control you will see eight (8) GO instructions, in addition, to the one upon which the load loop control instruction might have been issued. Load loop control instructions may issue either on a load F2 or on a GO instruction. However, it is always subsequent to that that eight (8) more GO instructions. The reason that this particular data transfer is coordinated on a GO instruction, and is not coordinated on an augend valid signal in Loop Control, is that the augend valid signal is not given enough time to provide all of the enable signals that are required in Loop Control.

To be more specific of the details within the Loop Control, the vector register length overflow interrupt and related topics will now be discussed.

First, consider what causes this length overflow interrupt and where it comes from in the instruction. The element count zero or the element count abort are related to this interrupt and cause similar things to happen. The effect that this interrupt has on the Vector Control section, on the Scalar operands in the machine, on the Mask Processor and on the Address Generation section will also be discussed.

Basically this interrupt is caused by an element count that is greater than the t bit field for a particular vector. This means that either a single precision vector operation is being performed and the element count that is selected has a value greater than 64 or a double precision vector instruction is being done and the element count is greater than 32. A combination of these operations is also possible.

Another way that this interrupt may occur is where the element point is greater than the t bit field to indicate an RR format operation. To explain, this will occur where an element pointer greater than 63 has been selected and a single precision arithmetic operation is being performed on a vector element. It will also occur if the element point is greater than 31 and a double precision arithmetic operation is being done on a vector element.

A further cause for the occurence of this interrupt is where a mask parameter (Mask PARM) has been selected and the element count is greater than 64. A still further cause is where a jump operation is being done on the mask and the element counts that are selected are greater than 64. Remember that all of the jumps that select the mask use an element count since they are treating it as a bit vector of the length element count. Note also that jumps on individual mask bits use the element pointer, if the element pointer selected is greater than sixty-three (63).

Consider next, the ELCNT ZERO/ELCNT ABORT instructions. The terms ELCNT count abort or ELCNT count overflow are used interchangably so the term ELCNT count abort is often used throughout the machine as a signal name. First of all, if the element count is 0 or if a Vector File length overflow is received the instruction is called a no operation (no op). This instruction then has the same effect as doing nothing, since the pipelines of the Scientific Vector Processor never run. Thus, if an add vector is selected with an element count of 0, the Add Pipe will never start or if you do an overflow or a vector move with an element count of 0 it will never run. Exactly the same thing is true for the Multiply Pipe. In this situation the instruction is aborted as it is issued.

As the instruction moves from the VFO out to the Vector Control that part of the instruction is thrown away and that is what is meant by the instruction being aborted as issued. So the instruction becomes a no op although it does take longer then doing a regular no op in the machine but it has the same effect and again if the length=0 it is handled like the overflow or the ELCNT abort in the machine since they are both no ops.

Next, consider the affect of the Loop Control on the Vector Control section as illustrated in FIG. 173. There the instruction receive latch 1049 shown has the control word entering from the VFO. An abort designator 1050 is controlled in exactly the same as the instruction receive latch in Vector Control and has the same timing. The element count 0 and the element count abort lines generated in the Loop Control are generated essentially at the same time as the VFO. They are stored together in the OR gate 1051 to become an abort designator 1050 in Vector Control. The Vector Control uses this to key the rest of the operations in the case of an element count 0 or an element count abort. Vector Control has to change the interpretation of the instruction receive because it is necessary to go through the required operation to change the instruction into a no op instruction.

Now scalar operands and aborted instructions fall into three different categories. First of all, there are the broadcast G's as vector operands. Any vector operand in the Scientific Vector Processor selects a G register to be replicated or broadcast to other parts of the machine to make up the Vector to be used as part of the Vector operation. In that case the G register that is coming across from the Scalar Processor section to the Scalar interface on the Vector Module has to be thrown away along with the instruction. Now since Broadcast G vector instructions are coordinated at the data interface after the issue, it takes special logic to take in the G register operand in the Scalar control section when it gets there. Another instruction that is thrown into this catagory is the Generate Index Vector instruction because the data that is being generated to fill the vector register and the generate index vector are generated by the Scalar Processor. The Scalar operands are also involved in this abort or element count 0 instruction.

In the present case, it is an abort on the element pointer instruction because when there is a Scalar instruction referencing a Vector element for a Scalar move or Scalar arithmetic, the element pointer selects a particular V register element and goes through the Scalar interface section of the Scalar Module over to the Scalar Processor. Since the coordination is at the data interface this operand is thrown away along with the instruction. The third variety of Scalar operands involved here are the reduction operation results. It has a vector length of 0 on a reduction operation. This produces a single Scalar result which is sent over to the Scalar Processor to be stored in a J register. It also has to be handled in the case where there is an element count of 0 when the element count overflows.

Since the two instruction issue registers in the IF pipeline FO and VFO, are independent of these operations, the Vector operation can issue an instruction to the Vector register of the Vector Control section to start processing and also one to the Scalar Processor to read the G operand necessary for the Vector operation. The instructions can issue independently so the destruction of the contents of the G register happens at the data interface in the Scalar Control section at a later time. The Scalar Control section aborts this instruction for the Vector Module; however, the Scalar Processor section and the Instruction Flow section are not at all effected by an element count of 0 or an element count overflow and they issue as if the element count was normal.

Now the Generate Index Vector instruction is placed into this catagory by the test and loop control logic to see if the element count is 0 or if the element count is going to overflow. If the element count going to the Scalar Processor section is zero it is forced to be a one so that a single data transfer always occurs on the generate index vector even if the vector length would indicate the instruction should be a no op. This allows the Scalar Control section in the Vector Module to have a data operand to coordinate on and execute the instruction completely.

If there is a Vector instruction which has a V register operand and a broadcast G register operand and it is producing a Vector result there are a number of different machine paths possible; each of which will produce an abort operation. Now, first of all, the Instruction Flow section is going to wait for both the FO and VFO to be simultaneously available because this is a dual module instruction. When they are both available, the add vector will move into the VFO and an operation called a read G op to the Vector side will enter the FO in the Scalar Module. This will cause the G register, Gl, which is used in the Vector side to be read out of the Scalar Processor and sent over to the Vector Module. The two pieces of instruction become independent and can issue independently. The add vector moves across from the Vector Module as soon as the ELCNT count is ready and it can start the abort sequencing at that point. A following Vector instruction can then move through NI and FO and this later allows bit coordination to happen at the Scalar interface. This add vector maybe returned to the VFO, but the Scalar Processor is free to run and this allows a completely overlapped operation. If there are other completely overlapped Scalar operations occuring it can move into the F1 and the F2 register of the Scalar Processor, since the G operand can be read and sent over to the Scalar Control section before this add vector has actually been issued to the Vector Module.

When an element pointer is used to select the Vector operation, the operand FO and VFO are tied together. This means that the abort is made easier to handle because since the FO and VFO are tied together, the Instruction Flow Control can handle all of the necessary processing and control needed to abort the instruction. The abort happens for the Scalar Module as the instruction is moving from the FO into the F1 latch and it happens again for the Vector Module as the instruction is moving from the VFO into the instruction receive latch. Because of the way that reduction instructions are handled in the Scientific Vector Processor, the reduction instruction is similar to the selection of an element of the Vector register using the element pointer. This allows the same sort of control to apply.

The next thing to be described is the affect of aborted instructions upon the Mask Processor. Its first effect is to block the issuance of the regular Mask (MK) vector. The Mask Processor gets a copy of the instructions, the Vector issues and a pipe selects a pipeline interface to feed the mask bits. The Mask Processor then shuts down its pipeline interface. It also causes an instruction aborted condition to come up, if appropriate, or a compare aborted instruction designator to be initiated in the Mask Processor because the Mask Processor has special handling to do if there is the instruction issue to the vector compare. As required, the Mask Processor will insert a mask valid signal to be returned to the Instruction Flow Control. For instance, if it was a compare operation that was being performed, a new mask signal is generated, and as previously noted, the pipelines will not run during an aborted instruction. Since it is never started, a pipe complete signal is never sent and this necessitates the sending of a mask valid signal which would normally come at the completion of a Vector compare. This, in turn, requires a long-winded logical sequence of a no op instruction wherein all of the calculations of the necessary parameters of the Mask Processor are redone to handle an abort case.

So four signals: (1) the mask valid, (2) the stat valid, (3) the compare complete and (4) the clear mask busy are used to coordinate the Mask Processor and the Instruction Flow Control section. They must be synchronized or phased in, where a Vector instruction which references the Mask is being thrown away.

An aborted instruction also has an effect on Address Generation. The abort or element count 0 takes effect after the Address Generation has completed a translation process but before the Address Generation section makes a request to memory. A Vector Load operation requires a base register containing the data from a G register in the Scalar Processor. The Address Generation section first takes that G register which contains a virtual address and translates it into a read only memory address. That is one way to speed up the throughput of the machine. If the element count is not available at the time the load vector is issued, the Address Generation section will still start performing the translation process. So, at least that part may be done before the element count is ready and this allows the start of memory requests. At the time that it is ready to make requests, it checks the element count and if the element count is 0, or the element count is in an overflow condition, the instruction is thrown away at this point in Address Generation. However, if the element count is a reasonable size, then the AG goes on to make many requests to the memory section.

In all cases that have been described, the Loop Control sends separate abort and 0 signals off to the Vector Control section and the Instruction Flow section and it OR's together these two signals and sends them to the Mask Processor and to the Address Generation section. This interrupt signal originates in Loop Control and these signals are brought up and then propagated throughout the rest of the Scientific Vector Processor, shutting down sequences in various parts of the machine just as they are getting started in most cases.

A Vector abort interrupt occurs when there is an element count that is too large for the associated t bit field of the instruction and an order for Vector Processor Module issue is made or the Scalar abort signal is present. This means that something is being done to a move or a conditional jump instruction is being issued. The abort signal that is sent to the Instruction Flow Control section causes a state in the Instruction Flow called hold for interrupt. The hold for interrupt logic causes the IF to stop issuing instructions as soon as possible because it is known that an interrupt is arriving even though it has not passed all of the way through the Control Block section. As previously stated, the instruction that is currently in the next instruction latch of the Instruction Flow Control at the time the hold interrupt is initiated will not issue. The Instruction Flow Control will then wait for the interrupt signal from the Control Block section to be activated. This causes the IF section to wait for the entire machine to return to normal operation. Any time an interrupt pulse arrives from the Control Block section to the Instruction Flow Control, there is an interrupt process. The Instruction Flow Control section waits for the entire Scientific Vector Processor to return to normal and then tells the Control Block Section to proceed with whatever interrupt handling that happens to be necessary.

Finally, the Loop Control section also participates in acceleration and deceleration of the Scientific Vector Processor. It has a shadow copy of all of the files which are selected for most Loop Control instructions during both acceleration and deceleration operations. As to the Loop Control, the acceleration and deceleration codes stores constants. For example, the acceleration code loads the vector registers from the activity Control Block by doing Vector Loads under the acceleration load, so the constant lengths of 64 can be stored in the Loop Control section and used for these Vector Load instructions of the acceleration code. Also there are lengths which are kept in the Register Save Area (RSA) which the acceleration code must calculate. For instance, the Local Store area of the Scientific Vector Processor which can be up to 4 K but need not be, has its lengths stored in a Register Save Area and only the amount of Local Store that is being used is actually accelerated from the Register Save Area and the instruction which accelerates the Local Store are very much like Vector Load instructions except that they have a different destination. That is, instead of destinating in a vector register, the destination is to be the Local Store area of the RAM which is in the Scientific Vector Processor. Loop Control is substantially a normal operation during acceleration with two minor exceptions. First of all, for most Loop Control instructions, the shadow area of the Loop Control files is chosen. Secondly, the JVL instruction in acceleration load does not update the copied file of the remaining lengths. So, if you go into a BVL/JVL loop in the acceleration code, only the active copy of the remaining length which is kept in a register external to the file is going to be updated by the subtraction and that goes on in the JVL instruction. To accelerate the Local Store, the BVL operation uses the calculated length of the Local Store. It brings the calculation length into the shadow area of Loop Control file and also into the active remaining length register. The acceleration of Local Store instructions is done under the control of a Jump Vector Loop instruction. This is an acceleration load which does not write back into the file but continues decrementing the active remaining length register. For deceleration, an Adjust Loop Control instruction is used to read the length which was stored in the file by the BVL, but not modified by the JVL, to start the same sequence again and decelerate the Local Store segment.

h. Mask Processor

Although the Mask Processor 600 may appear insignificant to the overall system, it is, in fact, operative at the very center of the Scientific Vector Processor universe as shown in FIG. 174. Note that the Mask Processor 600 is the large block in the center of the system connected to the various other system blocks. As shown in the FIG. 174 it is connected to the Address Generation section 700, the Add Pipe 1600, the Move Pipe 1800, and the Multiply Pipe 1700. These blocks are logically on the Vector side. Actually, of course, the Add Pipe 1600, the Move Pipe 1800 and the Multiply Pipe 1700 are located in the Vector Module 162 while the Address Generation (AG) section 700 is located in the Scalar Module 150, but as far as the Mask Processor 600 is concerned, these sections are all associated with Vector operations rather than with Scalar operations. The Instruction Flow Control Block (CB) 500 is shown as a divided block to indicate that it actually has two, more or less, separate sides or sections. One side is associated with Vector operations which sends control signals to the Mask Processor 600 while the other side is associated with Scalar operations which sends control signals from the Mask Processor 600 for the Scalar instructions in which it is involved. Actually, it also receives data back from the Mask Processor 600 which indicates whether or not it is ready to proceed to the next instruction. The path of the Scalar data in and data-out of the Mask Processor 600 goes through the SPCB section which is shown on the FIG. 174 as the CB section 500.

The Mask Processor participates in the following types of instructions. Its primary purpose is to aid in the control of Vector instructions and so the most important Mask operations are the Vector instructions and there are a number of them. Most of these instructions fall into the category of generic Vector operations. These are either Vector Loads or Vector Stores or various pipeline operations like Add, Multiply or Move. A few of the instructions require some special handling because of what they have to do or how they are implemented in the Vector Module and so they also will be mentioned. A few extra features are required in the Mask Processor that are not required for the regular generic instructions. The compare instruction is a particularly important one in that it is the one vector operation that returns data to the Mask Processor (MP). The Mask is set by the compare instruction as has already been mentioned, the Vector Load and Vector store instructions. In execution; however, these are generic vector operations, and they will be discussed in the implementation area separately because as far as the MP is concerned, they are implemented in a slightly different way than the pipeline Vector instructions.

On the Scalar side, are the Move operations. First, is the Mask Move operation which is used when it is desirable to load the Mask with an arbitrary bit pattern and then store it again. There are also some additional features for extracting information from the Mask and these are called the Mask parameter moves. Finally, the Scientific Vector Processor may be effected by the contents of the Mask by some conditional jumps that test the Mask values. This is a summary of all of the instructions that involve the Mask Processor 600.

First of all, consider Vector operations. As previously noted, the Scientific Vector Processor is a Vector machine and it is the Vector operations that are the key to its performance. The machine is organized around its Vector operations and its Vector File and in a typical Vector operation, all of the elements of a Vector File are exercised as the same operation applies to all of them. A typical Vector operation involves the contents of two Vector registers as input to a device that produces the contents of a third Vector register as an output. Vector Files have 64 words and these may be treated as 64 single precision elements or 32 double precision elements. It takes 32 cycles to do a generic Vector operation. Two single precision elements or one double precision element may be handled each cycle. So, regardless of whether you are doing single or double precision operations, the time required is 32 cycles.

FIG. 175 is a block diagram of a generic pipeline. It may represent an add, a multiply or a move pipeline and conceptually it can load and store operations. There is shown the control logic 1052 and the pipeline 1053 of execution which actually performs the operation. The execution logic is fed to the Operand register from the Vector Files, and it produces an operand which is written back into the Vector Files 1300. The pipeline is two words wide, and if single precision operations are being performed then each one of these operands is actually two separate single word operands. However, if we are talking about a double precision operation, then each operand is made up of two words to supply one double precision operand. Similarly, the result is either two single word results or one double word result.

Consider pipelines for a moment. A great speed improvement is achieved because the pipe logic is operated to pass operands through very quickly to produce a steady flow of results at a high rate. But when this programming approach is actually used with the Vector instructions, it is often undesirable to do exactly the same thing to every element of a file. If it is desired to do very different things to different members of a file, then Vector logic would not be used. In many cases, however, it is desired to do practically the same thing to all of the elements of a file, with only occasional exceptions The classic example of this is in the area of divide faults. Suppose, for example, that two Vector Files full of data are being divided one by the other. Further, suppose that it is likely that the divisor will contain zeros in some positions. For present purposes it may be decided that you would like to replace the results of these divisions by zero with the largest possible floating point number. This would be a typical thing to do in such a case. If you let the divide operation run normally, the divide pipeline will detect these divide faults each time the zero divisors occur. Since you would like to suppress those errors and be able to handle those elements a little bit differently from the rest, a procedure that might be used would be to block the execution of a divide for those elements, while allowing the division to proceed normally for the other elements. There is problem with doing this, however, in the case of the present Scientific Vector Processor since its Vector Files are organized in such a way as to allow very high speed access. However, remember that you have to access them in a very smooth, very regular pattern, these are not random access files, and can only be accessed in a continuous stream. Similarly, the final results must be produced at exactly the right time and in the correct order so that the Vector File is ready to see them. The only kind of control provided in the present Scientific Vector Processor is its ability to suppress operations for specific elements. Conceptually then what is done is this. The elements are brought in from the Mask Processor to act as a Write Enable signal for the Vector Files. In this way, the results from the elements that we want to suppress are not written back into the file. Now, in the case of the divide, there is an additional feature present, since it is obviously necessary to block the error indications that might be produced by the element of an operation which is being suppressed. So, FIG. 175 shows signals coming from the Mask Processor as input control signals to the Vector Files. In fact, they also enter the regular control logic and that would suppress the error signals that come from this pipeline to the rest of the machine. This explanation gives a general picture of how the Mask is used in a Vector operation.

Physically, the Mask is a device for preventing or blocking the write back of the result of an operation. For example, in the case of a Vector Load, the Mask is used to prevent the changing of the Vector File that is being loaded into the element that we desire to block. In the case of a Vector Store it prevents the writing into memory for those masked elements of the operation. Most of the Vector operations involving the Mask follow this basic pattern, and that is why FIG. 175 is referred to as the generic Vector operation. Of course, the details of the various pipelines are different, since the actual length of time the instructions take to execute are different, but the pattern is more or less the same. The details of each of the various pipelines will be discussed later.

Variations of the Mask instructions are communicated in the instruction format to the sections of the machine that are involved. The Vector instruction format is shown in FIG. 176. The relevant fields in the Vector instruction are the t and C fields. The t field specifies the operand pipe for this instruction and there are three bits which allow eight possible values, however, only four are actually used in the present system. When the t field is zero or two, a single precision operation is indicated. This may be either single integer or single floating point. If the t field is a one or a three then a double precision operation, either double integer or double floating point is ordered. Thus, the low order value of the t field is a single or a double flag. This is referred to in the logic of the present system as the modified t bit. The C field of a Vector instruction is a two bit field and it specifies whether the Mask is to be used in the execution of this instruction and if so, how is it going to be used. If the C field is a zero or two, this denotes that all elements of the Vector are to be operated upon. This is done by writing all of the results of all of the elements without using the mask. The C field of one specifies that the Mask is to be used to control the operation and the results will be written only for elements which correspond to zero bits in the Mask. If the C field is three, this implies that the Mask will be used to control the operation and the results will be written for elements that have ones in the masked bit. One point that is worth mentioning at this time is that the control of vector operations is on an element by element basis not on a word basis. The Mask register 1054 is 64 single bit elements for a single precision vector operation. Each bit of the Mask is used to control the corresponding bit of the corresponding element in the vector operation. Just as the words of a Vector File are labelled zero to 63, the Mask bits also ar labelled, left to right, zero to 63. In a double precision operation there are still 64 words in the Vector File, but there are only 32 logically separated elements. That is, there are more Mask bits than are needed to control a double precision operation. In this operation, we start with bit zero of the Mask and use the first 32 bits in the Mask to correspond to 32 elements of the Vector operation, so in a double precision operation, only the first half of the Mask is used.

Conceptually, to control a Mask operation, the Mask bits are peeled off two at a time for a single precision and one at a time for double precision. They are first compared with the C field to decide what to do with them, and a write enable signal is then generated for the pipeline. This operation is implemented by placing the selection logic in the Mask Processor on the Scalar side and sending across only the needed bits at the proper time. In fact, the pipeline does not even know when the Mask is involved in a particular operation since the C field is not sent to the Vector side at all. The pipeline considers that every Vector operation could be logically masked and does so.

If the C field is a zero or two, it thereby specifies that the Mask is not to be applied in controlling this operation. It then sends over signals that cause the write operation to occur for every element. Thus, the effect of not masking the pipe operation is achieved, even though the pipeline is continuously applying the Mask signals to its write control logic.

In terms of the signals that go back and forth between the Scalar Processor and the Vector Processor, the Mask Processor signals are always sent over for use on the Vector side. A zero signal from the Mask Processor means that the result is to be written and a one means to mask off the result. If the C field is a zero or a two, this implies that the transmitter is using all of the bits of all of the elements in the operation. If the C field is one, this denotes an operation where there are zeros in the Mask. If the C field is three, the operation is specified as having ones in the Mask.

This relationship between the Vector operation and the Mask Processor may be summarized in the following way. The Mask Processor is the write control for the Vector results, and it sends over a signal for every Vector operation. This is necessary because the pipeline can block the operation or the data may not be available. The pipeline is dependent upon data coming from memory or from the Vector Files and it has to synchronize itself with external events. Similarly, the Mask Processor provides the mask bits which have to be synchronized with the data flow. The pipeline, in turn, sends a signal to the Mask Processor that says that good data is now flowing and this causes the Mask Processor to send over successive bits to the Mask register. If we are operating upon a single precision operation, then two bits are sent over every cycle. However, if it is a double precision operation, then one bit per cycle is sent. Actually two copies are sent, one for each of the two words in the pipe. No information about the length of the Vector operation is given by the Mask. Length information is another way that a Vector operation may be controlled. It is not necessary to do it for the entire Vector register but it can be done for a given length. In such a case, the pipeline knows when the Vector operation is done, since the length has expired and a signal is sent back to the Mask Processor indicating completion.

Included in the control logic are the two bits of the t field. One is always used for the Move Pipe and the other for the Multiply Pipe. These are variations that are needed to handle the special Vector operations.

The next operation, that is slightly different, is the compare operation. It is the only Vector operation that can actually set the Mask. In the case of the regular Scalar compare instruction there is only a single result. That is, the items compared are equal or not equal or they are smaller or greater than a reference value. The same operations are available on the Vector side, but of course, on the Vector side there are 64 separate results in the case of a single precision or thirty-two separate results in the case of a double precision operation. In any case, these results are stored using the Mask Processor. During a compare operation on the Vector side, the ALU pipeline produces signals that say whether or not the compare condition, whatever it was, is true or false for a particular element. Those bits come back two at a time, for a single precision operation, to update the Mask. That is, they change the Mask to correspond to the compare results. For example, if the result is true, that corresponds to a one which sets the corresponding Mask position. An important point here is that the update is masked. The result of a compare operation is the changing of the Mask and it operates exactly like the other operations where the write operation is controlled by the Mask bit. It is also possible that the compare instruction can be masked, and it works in exactly the same way as the other Vector operations. If you have a C field equal to zero or two this means that everyone of the compare results is applied to the Mask. By the way, the length field is also applied here so if the operation is for seventeen elements then only 17 elements of the Mask are changed, and these individual bits are modified to reflect the result.

Consider the example of the divide faults. The actual sequence implemented, if it were desired to suppress all divisions by zero, is to do a Vector compare against zero. This includes finding a Mask where all of the zero divisors occurred, then using that Mask to control the actual divide in the Vector operation.

In the load and store operations, instruction are generically similar to the other masked operations. They are done in the AG section on the Scalar side instead of being done on the Vector side and there is a different interface used there. In this case, the operation is not nearly as smooth as in the case of the pipelines because, depending on the length of the strip being used and also on whether there are single precision or double precision values, you can actually write different numbers or words every cycle. Since you can write one, two or four words, you are consuming different numbers of Mask bits in an uneven pattern. There is not sufficient time for the AG to indicate the number of Mask bits needed this cycle, thereafter we send the information down to the Mask Processor, strip out a specified number of masked bits, process them, and then return them in time to make the AG run at the maximum speed of four words per cycle. In view of this time constraint, there is no choice but to send the entire Mask to the Address Generation section and allow the AG to strip out the bits it needs. Since, as far as the AG is concerned, it works the same as Vector operations, the Mask is always applied. Thus, if the C field is zero or two then all of the bits are forced to be zero. It is also worth noting here that the convention of zero indicating a write operation is also used here. This is a universal convention and all of the interfaces that use Mask bits follow that convention.

Figure 177:
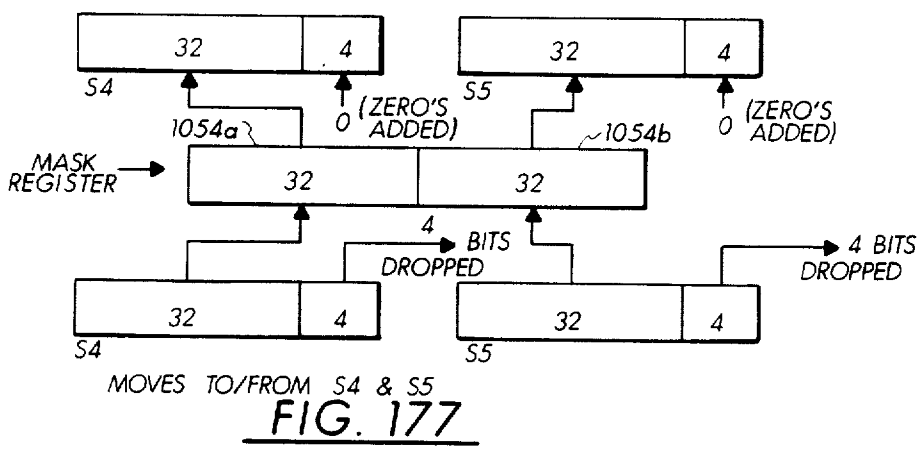

It is necessary to be able to use the Mask bits in ways other than for controlling Vector operations. Clearly it should be possible to store a Mask bit produced by a compare, and return to it for later use. Loading and storing of the Mask register is done by a Scalar Move instruction. The Mask registers are shown in FIG. 177 as registers S4 and S5. The Mask register 1054 in the Mask Processor shown in FIG. 177 is only 64 bits long. The contents of register S4 enters the left side of the Mask 1054*a*, and the contents of S5 is moved to set the right half of the Mask register 1054. Now the Scalar Move instruction, is one word wide, and it moves 36 bits. However, as we see in FIG. 177 the Mask register is 64 bits wide and it is convenient to talk about it as two separate 32 bit groups 1054*a* and 1054*b*. This means it takes two sequential moves to actually load or store the entire Mask register. Of course, if you are doing double precision operations you only need the left half of the Mask anyway, so only one of these moves is needed. Register S4 and S5 are each 36 bit entities of which 32 bits are Mask bits and the 4 bits at the right end are unused. If you move to S4, these 4 bits of the moved word are thrown away. As shown, a 36 bit quantity is moved to S4, but only the left most 32 bits go into the left side of the Mask Register, and the other four bits are thrown away. Similarly, in a move to register S5 you take the left-most 32 bits of S5, and move it to the right most 32 bits of the Mask and then drop the other four bits. If later you move from that S4 to a G register, then the left most 32 bits of the Mask are sent to make up the left most 32 bits of a 36 bit word and additional zeros are appended to complete the 36 bit word. In a corresponding way, the right most bits of the Mask from S5 have four zeros added when it returns to a G register. It is important to remember that those four bits do not exist and they must be traced.

In summary, we have seen how the Mask Processor can control Vector operations. We can either load the Mask, or save the Mask contents for later use.

To review, return for a moment to FIG. 174. That figure shows the Mask in the center of the Scientific Vector Processor universe, coupled to all of the different logic sections, the AG, AP, MV, and MP sections that are involved in Vector instructions. The IF section is also shown and it is involved both in Vector and in the Scalar instructions. Finally, the Control Block (CB) is shown as the Scalar input and output path to and from the Mask Processor.

Now look at FIG. 178. It is remarkably similar to FIG. 174. FIG. 178 is a block diagram of the internal organization of the Mask Processor. Notice also that it greatly parallels the view of the Mask with relation to the outside world. That is, there is a central Mask register. This is the actual Mask register where the valid Mask information is currently being stored. Note also the blocks that are labelled AG, AP, MV, and MP. These blocks do not refer to those sections, but are actually interfaces to those sections. These interfaces are all obviously involved in Vector instructions. Note also that the pipeline interfaces, that is the AP 1057, MV 1058 and MP 1059 interfaces have essentially identical logic circuitry with only minor differences between them. Even though the instruction of the load and store vector appears to be very similar to the pipeline operations, the AG interface 1056 is logically quite different. The logic block labelled load control is involved in both compare and move operations to the Mask register. Also included is a signal from the Add Pipe interface 1057. At the top of the FIG. 178 is an output interface 1060 that goes to the Control Block. It is used for move operations from the Mask from the S4 and S5 registers. The Mask information goes out through that interface. There is a second path entering the CB out register from the block labelled PARMS 1055. These are the Mask parameters. The CB may select either the Mask register contents or the Mask Parameters via its input multiplexor. Now, the block which corresponds to the line that goes back to IF in the earlier FIG. 174 is the logic block labelled jump. The Mask participates in a number of types of jump instruction and so there is logic to do that, which obviously depends upon the Mask contents.

FIG. 178 is an overall block diagram of the organization of the Mask Processor and we will now discuss each section in turn.

The first section, central in the FIG. 178 is the Mask register itself 1054. It is important to note in the area of design tradeoffs that there is only one Mask register. This is not obvious if you look at the present overall system architecture, since you could have multiple copies of the Mask register contents. In particular, if you consider that Vector operations take a relatively long time to execute, it would make sense for the timing issue vector operation to capture the Mask control that are appropriate to that execution, hold them until needed and then use it for that operation. This was not done, however, and there is only one Mask register used and the various pipeline interfaces take bits out of that one register. This means that you have to interlock all changes to that register with all operations that read it. Another point, worth noting, is that the Mask register 58 includes eight parity bits. It is the only register in the Scientific Vector Processor that has a parity bit for every eight data bits. The standard convention is one for every nine data bits or for submultiples of nine such as for every three bits or six bits. The reason for this eight bit parity is that the Mask register is loaded in 32 bit portions. There are 32 left bits and 32 right bits and in the compare instruction, the Mask is updated one bit at a time as the compare instruction is executed. As these bits are changed in the Mask register, it is necessary to update the corresponding parity bit of this group of bits. It is readily seen that it is easier if there are eight bit portions rather than nine. In this way you can take the bit address, drop off the bottom three bits, and use that as a pointer to the parity bit.

This brings us to the AG interface 1056. Of all of the vector interfaces, the AG interface is conceptually the simplest, from the Mask Processor 600 point of view. The reason is, that when the vector instruction is issued, the Mask is set to zero if the C field specifies that all of the elements in the operation are to be used. It is either issued untouched or it is complemented, depending on the value of the C field. Remember, a zero bit in a Mask element causes a write operation to be performed in the corresponding element of the Vector operation. So the 64 Mask bits with the parity bits are sent to the AG section and the AG section handles the execution. Now, unlike the pipelines, which operate on the data very smoothly since they either have data running through them or not, the AG may stop from time to time. Thus, the AG section operates on one, two or four words per cycle depending on how many words are being loaded in the Vector. In view of this, it is realized that you do not know ahead of time how the Mask bits are to be selected or used. There is not sufficient time for the AG to indicate the number of Mask bits that are needed during this cycle, and send this information to the Mask Processor for selection and then return the selection to the AG. So the processing is up to the AG and the Mask Processor sends the entire mask over to the AG. It is sent over with the 8 bit parity, since it is only used internally and need not be converted to nine bit parity.

Since the C field is constantly changing as Vector instructions or Scalar instructions flow to it, the AG section may be depended upon for knowing when there is a valid instruction being issued and thereby latch the data at the right time.

In terms of implementation, the gate arrays shown in FIG. 179 are used. There are multiple word selectors which use a partial four way multiplexer on the input. As far as the SVP is concerned there are just nine bit latches that have one control that says to latch zeros and another control that says to latch the complement of the input. The C field is decoded into those two signals directly.

Next, consider FIG. 180 which essentially is a block diagram of the control outline for a Vector Pipe interface. Remember that there is one set of this logic circuitry for each one of these three pipes. First, there is a control staging register 1066 that stores the C field and the t field bits. Entry of new valid bits determines whether there is anything worthwhile here or not. There is an active control register 1067 which holds the instructions which are actually to be executed. The C file and the t bits go off to the remaining logic of the other pipes. There is a counter 1068 which receives a t bit and the output of the zero counter and produces an index. This is the bit which is an index of the pair that is operating on the 6 bit counter. The rate a which the index counter counts up is controlled by the t bit. It is either incremented by one or two bit per cycle depending on whether a single or a double operation is being performed. Double operation is when we increment one bit per cycle, and a single word operation is where two bits are incremented at a time and sent over a pair of lines. There is a control line that comes from the pipeline which causes the Mask to sequence. Essentially this is the enable signal to the counter and it says that there is, or will be, valid data flowing through the pipeline. In view of this, the index should be incremented and successive bits should be sent over. There is a new Mask signal that comes over from the pipeline and when it occurs it indicates that we are at the end of the operation. It also enables the active control register and if there is something presently in the staging register it moves up into the active control register. If there is nothing in the staging register, then the valid bit is cleared out and we know that nothing is to be done with this pipeline. When the new signal arrives, the counter is zeroed on the next cycle, so that the synchronization of Mask operations with the Mask Processor and the pipeline is done at the end of each Vector operation rather than at the beginning.

Returning to FIG. 179 there is illustrated a logic diagram of the control for each one of these pipeline interfaces. It may be thought of as a data path for the pipeline interface. At the bottom is the Mask register 1054. This is a low active copy of the Mask. It should be mentioned that when the Mask register is referred to, there are actually low and high active copies of it. It is the low active copy that is used here. From the Mask register, there are two 16 by two bit multiplexor data arrays 1061 and 1062. That is, 32 Mask bits in pairs, 16 pairs in each multiplexor. These are standard gate arrays with a multiplexor input. Each one of these blocks has two 16 by one bit multiplexors. Conceptually you get a pair of bits as an output. The output signals are low active at this point. They are each passed into an OR gate 1061, 1062 to compliment them. This results in four two bit wide output signals. There is actually a parity bit with each one of these pairs so there really are three bits. Next, there is an eight way selector circuit 1065 which is fed with the high word or bit of the index register. This is the circuit that selects whether we are going to have the left half or the right half of the Mask and the C field. The C field determines whether we are going to have zeros or the complement of the two copies of the Mask. The C fields of zeros or two corresponds to the open input, and the high word bits goes into the bottom half of this selector, so we get the high order output on the bottom and the low order outputs on the top. The C field of one corresponds to the low order Mask and a C field of three corresponds to the high true copy of the Mask and this selects the appropriate pair. In a double precision case, in each vector operation, there is only one vector element per cycle, it is two words wide and it takes up the entire pipe.

Because of this organization, two copies of the Mask bit are acquired, and we have to increment the Mask by one to acquire successive elements on each cycle to send two copies of it. This essentially describes the operation of the generic Vector operation. The three pipeline interfaces have substantially the same logic with only minor differences. For example, the zero line for zeroing the counter 1068 in FIG. 180 only occurs in the case of the AP pipe. The other difference between them has to do with the relative length of the pipes. The Move pipe, for instance, has a very short length. The bits that are sent over from the Mask arrive at exactly the instant they are needed, without any delay whatsoever. The control for the three pipelines is also uniform. Similarly, the control occurs at the same time relative to the start of an operation for each of the three pipes. The actual time that the Mask bits are needed is different, because the Add Pipe and the Multiply Pipe are several cycles long, so that these signals actually have to be delayed.

Refer next, to FIG. 181 which illustrates a delay circuit using a 16×4 bit register file. There are actually quite a number of signals that have to be delayed for a number of cycles. As shown, there are 21 bits actually delayed for six cycles.

The delay circuit of FIG. 181 uses a 16 by 4 bit register file 1069. Remember that there is parity bit on all of these signals so we can check to make sure that no bits were dropped in the files. The final difference between these pipe interfaces is that the output of the Move Pipe going directly over to the Vector Processor Module while for the Add and the Multiply Pipes it passes through the delay circuit shown in FIG. 181.

The next topic for discussion is the relationship between the pipeline interface and the Vector Module. Particularly, we will describe how everything is kept together and only the appropriate Mask bits are sent over for a particular Vector operation, at the same time that the pipeline is doing that Vector operation. FIG. 182 illustrates this. On the left is the Vector File Zero (VFO) register 1070, from which vector instructions are issued. The Vector Control section 1100 of the Vector Module 162 receives the vector instruction and there are three pipeline control sections that control the execution of those pipelines. Over in the Mask Processor 600, there are three register pairs, each having a staging register 1071, 1073, 1075 and an active register 1072, 1074, 1076. Also included is the logic, which was discussed earlier, that controls the pipeline interface logic. There is one set of these registers for each one of the three pipes and there is an input receiving register 1077. Now assume that a Vector instruction comes along. The Vector instruction goes into the VF zero register 1077 and then across to the Vector Control 1100. It also goes to the Mask Processor 600 and is latched into the receiving latch 1077. It immediately floats up to the staging registers 1071, 1073, 1075 and along the pipeline. It immediately starts flowing into the active registers 1072, 1074, 1076, while the pipeline, sometime later, starts the process as the control flows back to the pipeline and into the interface.

At the end of the operation, a signal arrives that indicates completion. The new Mask signal enters and conceptually, the operation flows from the end of this sequence into history. Now consider the case where a sequence of Vector operations is received. The first one is issued and goes up as before and down into the pipe where it starts execution. The second Vector operation in the sequence can be issued immediately through the same pipe. If it is issued through a different pipe it just flows through here in the same way and the previous situation where one pipe was utilized is repeated. However, assume that this Vector operation is for the same pipe. In this case, it comes up to Vector Control, but the pipe is busy so it remains there. Similarly, in the Mask Processor 600 it flows into the staging register 1071 where it awaits execution at the instant that the previous operation is done. However, it is stopped until this operation is finished. Then it will move down into the pipe control and it will leave the staging register 1071 and pass into the active register 1072. This transition has to be done very quickly because the pipe control is trying to keep the pipes busy and the two operations are put together one immediately behind the other. There is no data flow for the last element of the first operation it just enters the pipe. In the very next cycle, the data for the first element of the second operation is received and the Mask must be ready to switch those things very quickly. If the IF 400 does not get an acknowledgement signal from Vector Control 1100, the Vector Control can not accept the instruction, because it is still holding the previous one. Now the obvious thing to do at this juncture would be to wait before causing the Vector Control section 1100 to issue the next instruction to the Mask. The Vector Control would correspond to this staging register, but as it happens, in order to do that the Mask would have to know when the Vector Module has completed its instructions. This would require very complex timing circuitry. Instead, as soon as the instruction comes into the VF zero it is latched, and at the time of loading an issue valid pulse is received immediately. Now it may not be actually accepted until some later time; however, upon acceptance, the staging register 1071 will be completed and will move up to the active register 1072. This will then indicate that this latch register is available. This is how the synchronization is done and it is important to remember that it is done at the end of the operation. This is the last thing that happens after the index is sent back to zero to prepare it for the next operation. No handshaking of any kind is done between the Vector Module 162 and the Mask Processor 600. It merely states its readiness to do certain operations. Intercommunication is initiated by issuing the instructions in the same sequence to the two modules and then relying upon the fact that for every instruction that is issued to the Vector Control section 1100 there is a corresponding instruction issued to the Mask Processor 600. Further, for every operation which the Vector Control completes there is a corresponding signal sent over to the Mask Processor.

Next, we will discuss the loading of the Mask register 1054. One way to load the Mask is obviously with a compare operation but another way is to load the Mask with a move operation. As was mentioned previously there is a single Mask register 1054 and so the two ways of loading it are related to each other. FIG. 183 illustrates the loading of the Mask register. It has a high active and low active output as marked at the output and is 64 bits wide. The simplest way to load it is with the move operation. When a move occurs, the parity correction 1078 (from nine to eight) previously mentioned is made because the CB portion is 32 bits wide and it is the top 32 bits of a 36 bit word. It also has the usual nine bit parity, whereas here an eight bit parity is utilized.

This logic is 32 bits wide and is actually wired into a 64 bit input in two places. Each bit can go either to the left half 1054*a* or the right half 1004*b* of the Mask Register 1054 depending on where the move is desired. On a move sequence it is desirable to allow the move to happen on the slowest cycle sequence of the data move. In this way, you may move the next piece of Mask information into the Mask register while the previous one is being used. When you are finished with the previous Mask operation you can swiftly switch to the new one. In order to do this as shown in FIG. 183 a staging register 1079 is needed to capture the data in the Mask logic. Thus, the Move instruction runs for three cycles. First, the data arrives, it is caught in the staging register 1079 and then checked to see whether or not the Mask register 1054 is busy. It is important to keep track of whether anyone is actually reading the Mask, i.e. any of the three pipelines. If nobody is using it, then it is loaded immediately into the appropriate half of the Mask register 1054. If it is already being read, the data is trapped in the staging register 1079, where it remains until the Mask Register 1054 is free and then it is moved up.

Next, consider the compare operation. It is a very complex operation, because two bits are received at a time and it is necessary to update the Mask register. However, it is not desired that an entire 64 bit operation be done. Also we don't want to shift the Mask around and end up with it being only half updated. Known combinational logic is used to update eight bits at a time with multiplexors and selectors so that you do eight bits with a first group and then eight bits are done in a second group. It comes down to first storing the Mask, which is actually eight individual latches, and each latch has eight data input and eight enable signals.

To do a compare operation, we must first determine if this compare result changes the Mask bit. If it does, we have to load the other of the two bits. Individual logic is not needed on each data line to identify the data loaded into it, it is only necessary to enable it. As long as the data on the line is the other bit, we take the low active copy of the Mask Register 1054 and wrap it around the staging register 1079 as shown in FIG. 183.

Since we have all of the control logic necessary to do a compare operation, we do so and then take the compare results which indicate whether zeros or ones are desired in the Mask. These results are then compared with the data already in the corresponding Mask positions, and if they are the same, nothing need be done. However, if they are different they must be flipped. If we are doing a single precision operation, these pairs just float through very nicely. But in a double precision operation you have to either toggle each of the bits or steer them to right bit of the Mask. When this is completed we have two signals. One is an index signal that indicates which pair we are talking about and we have two additional signals that say which of the odd or even bits in the pair go into the appropriate locations. The index bit is used to select one of these four groups and this produces the 64 enable lines that are needed to toggle the bits. Now remember that the right and left half must be loaded for performing move operations and control lines are included that can flip each of the bits and these are used for the loading of the right and the left halves of the Mask register 1054.

Consider next the jump operations. Basically there are two types of jump instructions. One is the bit jump and the other is the length jump. The bit jump is easy because there is an ELPNT register that selects one of the bits of the Mask register and we adjust according to that bit. The ELPNT output is taken and sent to the selector to provide bit selection. Also there is the C field which is applied to an eight way multiplexor and it produces ones or zeros depending on the selected bit.

The length jump is more complex because it uses the ELPNT to select a section of the Mask register to which the tests are going to be applied. Remember that the zero test is always the true case. Also there is a multiplexor which selects the eight different conditions which is controlled by the C field. Therefore, the whole operation of whether or not all the bits are the same, turns into a simple comparison between two numbers, one number previously calculated, which is the position of the first different bit and the other number which is the one received from the Loop Control which is the length that is to be processed. Basically, two signals must be considered. First, we must determine the left most bit and second whether all of the bits are the same. In this way the jump may run at full speed and the Loop Control sends over the valid count and the results are produced. The Mask Processor is not aware that the jump is taking place. A field of the instruction is sent over on the jump instructions. This is the C field that indicates what is being done. The Mask register is continually looking and selecting the appropriate jump control signals to determine if you are doing a jump, and it is up to the jump logic to look at the bits at the time that the Mask register sends them over.

The final portion of the Mask Processor is the Move portion. This is the section that moves the Mask parameters (PARMS). There are three elements of information in this Move portion. The first is the count of the ones and zeros. Secondly, is the position of the first one or zero and the final element needed is the position of the last one or zero. It should be initially noted that whenever the Mask register is changed, a file is built. Next, we precompute the characteristics of this particular Mask for every 4 bits down the Mask. In this way we know the position of the last bit 1 before bit 16. We also know the position of the last zero bit before bit 16. Further, we know how many one bits are set in the first 16 bits of the Mask. This information is stored away in this file 1082 and for every four bits down the Mask. When it is known how many one bits there are in the first 17 bits of the Mask, the ELCNT is taken and sent to two locations. The top four bits are indexed into the file to find out their value. This is shown in FIG. 184. We take the same four bits to run into a 16 by 3 selector 1080 which selects the three bits between 16 and 20. Simple combinational logic 1081 takes these three bits and these two input bits 5, 6 and determines how many of those bits are meaningful.

A simple review of this may be helpful. There are six of those Mask parameters. If you look at the way that they are coded in the instruction, the lower bit specifies whether you are talking about zeros or ones. The high order of the two bit selects which of the three previously noted elements that is desired. There are three sections of logic in the Mask Processor. One does the position of the first bit, one does position of the last bit, and one does the number of bits. The zero or one is fed in as a parameter where the ELCNT count indicates the number of bits. It is only necessary to keep track of the number one bits and the field. If you want the number of zero bits, this goes into a function code apparatus into an adder that subtracts the number of one bits from the total number of bits in the field and that gives you the number of zero bits. This is how the Mask Parameters are accomplished.

Although it has been alluded to earlier, note here specifically that there is very little formal control going on with the Mask processor. Generally it is up to the IF section to know when to issue the various instructions and in order to do that the chart shown in FIG. 185 is presented. As shown, there are six designators which correspond to the vertical columns of the chart which keep track of the state of the IF and the MK sections at any given time. Then, depending on the instruction classes which correspond to the horizontal rows, it is shown how the instructions interact with the designators to keep track of what is happening at the appropriate time. For example, there is a designator which says whether the Mask is valid and that is shown in the third column. Now, looking at the third row of the instruction class, it states that the destination Mask should be moved. Since this indicates that the present mask is invalid, the IF section clears the mask. When the move is complete, the Mask section sends the signals that cause it to be set. If the Mask is invalid then obviously nothing can be done that refers to the Mask and consequently it is necessary to wait before a Move Mask is issued.

2. Vector Processor Module In Detail a. Vector Processor Module Operation

First, the eight logic sections of the Vector Processor Module block diagram shown earlier in FIGS. 9 and 11 will be discussed. Following that, the Scalar Processor Module to Vector Processor Module interfaces will be briefly reviewed. After that the Vector Files will be described in more detail, since it is important to understand the organization of the Vector Files before describing any of the other logic sections within the Vector Processor Module. Next, the Vector Control (VC) section will be explained, and finally, some example instruction sequences, as well as the instructions necessary to tie it all together will be discussed.

The Vector Processor Module (VPM) block diagram, previously discussed and shown in FIG. 9, shows a general layout. The actual detailed logic diagram for this block diagram is shown in FIG. 11 and it follows the layout of FIG. 11.

As shown in FIG. 9, there are eight logic sections in the VPM. They are:

(1) the Vector Control Section 1100; (2) the Vector Load section 1200; (3) the Vector Files 1300; (4) the Add Pipe 1600; (5) the Multiply Pipe 1700; (6) the Move Pipe 1800; (7) the Vector Store 1500; and finally (8) the Scalar Control section 1400.

Referring back to FIG. 11 there is shown a detailed logic block diagram of FIG. 9. It has a layout which closely follows that of FIG. 9 and the should be considered together. Starting with the Vector Control (VC) section shown in FIGS. 9 and 11, the VC section receives and acknowledges instructions from the Scalar Processor Module. The Element Count (ELCNT) and the Element Point (ELPNT) also accompany the instruction. The Vector Control section assigns and manages the Vector File access time slots and detects Vector File logical usage conflicts.

The instruction is received via an interface from the Scalar Processor Module. The Vector Control word, the Element Count and the Element Point, in addition to other control signals all arrive in parallel along with an instruction issue signal which results in the interface being active. This activity indicates that there is an actual instruction on the line to be executed.

The Vector File addressing control is shown beside the VC section in FIG. 9 and 11. It manages the Vector File time slots and forms the Vector File addresses and also detects logical usage conflicts.

The Vector File section 1300 shown in detail in FIG. 11 is the implementation of sixteen 64 word Vector Files. There are two complete copies of each of these files; a primary 1204 and a secondary 1206 copy. This allows us to read operand pairs for each of the pipes. For example, the Add Pipe 1600 can be read and added and at the same time the multiplicand and a multiplier can be executed for a multiplication operation and so forth. The Vector Files 1300 are organized on an eight way interleave and each of the eight blocks can accomplish an independent read or write.

The primary copy 1204 of the Vector File RAM's are constructed of 256 addresses by four bit RAM chips.

The address input is applied to the Vector File address via the primary address register 1210. They are clocked in on phase 1. There are eight of these address registers, one for each of the eight blocks of the Vector Files. This allows an independent read or a write operation.

Across the top of the VF section of FIG. 11 are shown a number of output registers. They are the read output registers for the various pipes. Over to the left there is the Primary Store Read Register 1214. This is used by the Vector Store Pipe to provide read data from the Vector Files and then transmitting it to the Store Buffer in the Scalar Processor Module during the execution of store type instructions.

The next register is Scalar Output Register 1216 used by the SP pipe for reading operands from the Vector Files and sending them to the Scalar Processor Module. These are Vector File operands for RR format scalar type instructions.

Next we have the double precision augend output register for the Add Pipe. The output of that register goes over to the Add Pipe. To the right is another augend register 1220 for the single precision augends.

Continuing across the top is the Multiplicand Output Register 1222. It provides multiplicands to the Multiply Pipeline.

Returning to the Vector File RAM 1204, the input on the lower right of the RAM's the write data input. It arrives from the Write Data Register 1208. There are actually eight copies of the write data register, one for each block of the Vector File RAMs as shown later. This allows independent read and write operations of any combination within the eight blocks. There are six inputs of data into this write data register 1208. They come from five of the pipes. They are: (1) the Add Pipe 1600; (2) the Multiply Pipe 1700; (3) the Move Pipe 1800; (4) the Vector Load Pipe 1200 which has two inputs to allow a high transfer rate of four words per clock cycle; and (5) the Scalar Control Pipe 1400. The Vector Store Pipe 1500, of course, does not have an input because it only reads from the Vector Files. It does not write into the Vector Files.

Also shown is the secondary copy 1206 of the Vector File RAM's. It is identical with the primary copy 1204 in every way. It has the same data, same addressing mechanisms and so forth. The address input is on the lower left hand portion of that block. Following back it goes to the Vector File secondary vector address register. Typically operands are being read. For example, for the Add Pipe, an addend is being read. The augend address and this address will usually be in a different file. They would normally be reading the same numbered elements but from different files.

On the lower right is the write data input. There is only one set of write data registers since identical data is being sent to the primary 1204 and to the secondary files 1206.

Moving to the output of the secondary Vector File 1206 there are again a number of output registers. There is another, or a secondary Store Read Register 1224 and again this provides the capability for the Vector Store Pipe 1500 to be reading four words per clock cycle and thereby achieve a higher data transfer rate.

Next is the Double Precision Add Output Register 1226 which goes to the Add Pipe 1600 and is used for double precision operations. The Single Precision Add Output Register 1228 also goes to the Add Pipe 1600 where it is used exclusively for single precision operations. The Multiplier Output Register 1230 goes to the Multiplier Pipeline 1700 and finally the Buffer Write Register goes to the Move Pipe 1800. That completes the Vector File section 1300.

The next section to be discussed is the Add Pipe (AP) 1600. The AP section is in the upper left hand corner of the main block diagram shown in FIG. 11. The Add Pipe is also known as the ALU pipeline. It executes the majority of the vector instructions. This includes ADD, SUBTRACT, LOGIC, AND, OR, EXCLUSIVE OR, SHIFTS, CONVERSIONS and REDUCTION operations. All operands are read from the Vector Files 1300 with the exception, of course, of G operands. For sum reductions the result goes over to the Scalar Module 150 and to a G register. Beside that all of the operands are from the Vector Processor 162. Data that the Add Pipe 1600 operates upon are single precision integer, double precision integer, single precision floating point, and double precision floating point. The execution rate is 66 megaflops for single precision operations and 33 megaflops for double precision operations.

The Add Pipe ALU pipeline 1618 of FIG. 11 is a double precision pipeline. It executes all vector instructions except the Multiply, Divide, Product Reduction and the Move operation. The latency time is 31 phases. It has two input registers. The Augend Register 1614 and the Addend Register 1616. Below are the Alignment and Characteristic Strip Logic 1610, 1612. The input into these registers comes from the Vector File output registers previously discussed.

The output of the ALU Pipeline goes to the ALU merge output register 1630, the output of that then goes directly to the Vector Files 1300 with results to be written there.

Moving over to the right is the single precision ALU pipeline 1628. It also executes all vector instructions except the Multiply and Divide, Product Reductions and Conversion operations. Just as with the double precision pipeline there are two input registers. There is an augend register 1624 and an addend register 1626 and below that the Characteristic Strip Logic Registers 1620, 1622. The inputs to this logic are from the Vector File primary/secondary output registers 1204, 1206. To avoid the direct output of the pipeline, a Write Data Register is inserted, the output of which goes to the Vector Files.

Next consider the Multiply Pipe section 1700 (MP) which is outlined at the top center of the block diagram of FIG. 11. It executes Multiply, Divide and Product Reduction instructions. Again, all Vector File operands are from the Vector Files. Data types read are single precision integer, single precision point and double precision floating point. Note that MP does not operate on double precision integer operands. The execution rate for the multiply section is 66 megaflops for single precision operation and 33 megaflops for double precision operations.

The Multiply Pipe 1700 has two input registers. They are (1) the Multiplicand Input Register 1710 and (2) the Multiplier Input Register 1712. These registers receive inputs from the Primary Vector Files and the Secondary Vector Files Output Registers previously discussed.

Moving to the output of the Multiply Pipeline is the Multiply Output Register 1716. The output which goes directly to the Vector File Write Data Register 1208 as data to be written into the Vector Files.

Next consider the Move Pipeline section 1800 which is in the upper right hand corner of the block diagram of FIGS. 9 and 11. The Move Pipeline 1800 executes Move instructions and the Generate Index Vector Instruction and participates in execution of double precision to single precision conversions, and single precision to double precision conversions, along with the Add Pipeline 1600. The data path includes a file chip buffer memory and indeed the buffer memory resides on the Vector File cards. It is constructed of 16 addresses by 4 bit file chips with simultaneous read/write capability so that data can be written into and read from the Move Buffer simultaneously. The input into the Move Buffer comes directly from the Secondary Vector File Move Buffer Write Register 1232 and the output is from the Move Buffer Output Register 1812 of the output of Move Pipeline 1800. From there it goes directly into the Vector File Write Data Register for writing into both copies of the Vector File.

Now look at the Vector Load Pipe section 1200 (VL) which is in the lower left hand corner of the block diagram. The Vector Load Pipe participates in the execution of Vector Load operations; Index Load Vector operations; the loading of alternating elements; and the executing of vector instructions which carry the load data from the Scalar Processor Module into the Load Buffer 1236. It then transfers the data from the Load Buffer 1236 into the Vector Files 1300. The data types that it is concerned with are single and double precision. The data transfer rate is four single precision words per cycle or 133 megawords. The load buffer 1236 is constructed of 16 addresses by four bit file chips. The Load Buffer physically resides on the Secondary Vector File cards. The input register 1234 into the Load Buffer 1236 also resides on the Vector File cards. This data comes directly from the Local Store Section 300 of the Scalar Processor Module 150. However, it can be either Local Store or HPSU data.

Moving to the output of the Vector Load Buffer, the Vector Load Data Register is discussed next. The output of that register goes to the Vector File Write Data Register 1208 for input data into both the primary 1204 and the secondary 1206 copies of the Vector Files.

The Vector Store section 1500 is in the middle right portion of the block diagram of FIG. 11. It participates in the execution of Store Vector, Index Store Vector, alternating elements vector and the index load vector instructions. It reads data from the Vector Files and transfers the data to the Store Buffer in the Scalar Processor Module. From the Store Buffer the data will be sent to the HPSU 16 or to the Local Store 300. There really is no other data path for the vector storage section. The only data path are the two output registers on the Vector File cards, as you will recall there was one on the primary and one on the secondary cards. The primary SP read register and the secondary SP read register and the rest of the logic really consists of control logic and most of the control is devoted to actually writing the data into the Store Buffer in the Scalar Processor Module. Some of the control information passes along the cables with the data to the Scalar Processor Module.

The last pipeline is the Scalar Control (SC) Pipe 1400 which is shown on the lower right hand of the FIG. 11 block diagram. The SC section control 1400 is the input/output to and from the Scalar Processor Module.

For executing Scalar instructions, it reads and/or writes operands from the Vector File for RR Format Scalar instructions. It also moves G operand data from the interface to which ever pipe is to receive the G register data or the "G operand data". The SC section does not have an extensive data path. There are really only two registers. The Scalar Read Register on the Primary Vector File Cards from which the data goes directly via the cable to the Scalar Processor Module. There is also another Scalar input register on the Vector File Cards. The input of which comes from the Scalar Processor Module. From there the data fans out to several places. One of them is to the Vector File Write Data registers for data that is to be written into the Vector File Primary and Secondary RAM's. This output is the result of the RR format of the Scalar instructions and the result is sent to the Vector File. Also the same data path is used for transferring G register operands to the pipelines for G operands. Some additional operations that the SC pipeline does is to participate in the generation of the index vector instruction in the Scalar Processor Module and the generated data is transferred to the Move Buffer 1812. The SC actually causes the transfer to the Move Buffer and from there the vector data is written into the Vector File Primary/Secondary copies. The SC pipeline 1400 also transfers the results of reduction operations. These include product reductions and minimum or maximum reductions, which are executed by the Add Pipe and the Multiply Pipe. Also included are the transfer of results across the interface to the Scalar Processor Module.

Next to be discussed are the Scalar Processor to Vector Processor Module interfaces shown in FIG. 5. Block 162 represents Vector Processor Module. The other block 150 represents the Scalar Processor Module. Between them are the various lines which denote the interfaces. There is shown an interconnection 192 between the Vector Control or VC section of the Vector Processor Module and the Instruction Flow Control (IFC) and the Loop Control (LC) of the Scalar Processor Module. The Vector Control (VC) interface 192 receives decoded vector instructions from the IFC and element count and element point information from the Loop Control. The maximum rate for these instructions is one to a clock cycle. The Scalar Processor Module 150 actually can provide these instructions at the rate of one each clock cycle but the Vector Processor Module 162 can only accept one every two clock cycles. The instruction or the Vector Control word, as it is actually called, is 49 bits of data control information plus 7 parity bits. The element count information, which comes from the Loop Control, is 7 bits plus one parity bit, the element point which also comes from Loop Control is 6 bits plus one parity bit and additionally there are two control signals, one of which is the element count equal to 0 signal and the other one is a element point or element count out of range abort signal. Additionally, there is a vector issue line and there are actually four copies of that signal for additional drive and the presence of the instruction issue signal denotes that there is an active instruction available and ready for the Vector Processor Module to accept.

Moving on down to the interconnection 198, there is illustrated the Vector Load (VL) connection to the Vector Processor Module 162. On the Scalar Processor Module 150 side; the connection is to the Local Store (LS) section and to the Address Generation (AG) section. The Vector Load interface 198 receives load data from the HPSU or the Local Store section. The data path is four 36 bit words plus 6 parity bits (per word) wide. From one to four words can be transferred during each clock cycle. The maximum word transfer rate, at four words per clock cycle, is 133 megawords. The next lower interface 200 is between the Scalar Control (SC) section of the Vector Processor Module 162 and the Scalar Processor (SP) section of the Scalar Processor Module 150. The Vector Scalar data is really two interfaces in that data transfers occur in both directions. It can transfer one element either single precision or double precision in either direction. That is two words for double precision, of course. Each of the data lines passes two words plus 6 parity bits wide. The Vector File read operand is produced if reduction instructions are sent from the Vector Processor Module 162 to the Scalar Processor Module 150. G operands are also produced from that instruction and Scalar instructions are sent from the Scalar Processor Module to the Vector Processor Module via this interface 200.

Another interface 194 is shown connected to the Pipe Mask in the Vector Processor Module 162. It really includes the Add Pipe, the Multiply Pipe and the Move Pipe. Each pipe has an individual interface to the Mask Processor section of the Scalar Processor Module. The Mask Processor Vector Pipeline interface transfers the architectural mask to the pipes. The interface to each pipe is two mask bits wide plus certain control signals. The results of the vector compare instructions are sent from the Add Pipe to the Mask Processor. All of these transfers can occur during each clock cycle.

The fifth interconnection 196 is the interface between the Vector Store (VS) section of the Vector Processor Module and the Store (ST) of the Scalar Processor Module. The Vector File Store interface transfers store data from the Vector Files to the Store Buffer in the Address Generation section. From there the data goes to the High Performance Storage Unit (HPSU) or to the Local Store. The data path again is four 36 bit words plus 6 parity bits per word. The actual transfer rate is four words per cycle or 133 megawords. This interface is also used to transfer the index vector from a Vector File to the index buffer in the Address Generation section. The index vector is used by the Indexed Load vector and Indexed Store vector instructions.

Moving down to the next interconnection 202, there is shown the Scan Set (SS) interface. It goes from the master card of the Scalar Processor Module to the slave Scan Set card in the Vector Processor Module. The Scan Set data transfer and control interface is actually bidirectional.

Moving further down, there is shown the clock interface connection 204. Here the card in the Scalar Processor Module is the master clock card and the card in the Vector Processor Module is the slave clock card.

The last interconnection 206 illustrates the External Monitor interface. It monitors certain logic points in the Vector Processor Module. That information is then sent over to the External Monitor logic in the Scalar Processor Module and from there it is sent out to the External Monitor Control panel where a customer can attach external monitor devices to monitor the performance of the Eagle subsystem. These are all passive interfaces.

Next, consider the Vector File (VF) section 1300. The 16 Vector Files of 64 words each are an architecture entity. For single precision operation, each word is an element and for double precision operations two words or double words are required per element. Each file is understood to hold elements of a single vector. This is a specific vector register. All of the Vector File references start at the first word or element of a file. The Add Pipe, Multiply Pipe and the Move Pipe both read and write operands that are in the Vector Files. Additional sources of operands are in the G register operands (or G ops). They can be used instead of read or source Vector File operands. For sum reduction, product reduction, minimum or maximum reduction, the single result goes to a G register. The result of vector/vector comparison instructions executed by the Add Pipe go directly to the Mask Processor rather than to the Vector Files or to the G registers. The Vector Load (VL) section loads data into the Vector Files from the HPSU or from the Local Store. This is the primary method of getting data into the Vector Files. The Vector Store section stores data from the Vector Files to the SP store buffer and from there the data again goes to the HPSU or to the Local Store. This is the primary means of transferring or storing data from the Vector Files. The Scalar Control (SC) Pipe read and/or writes Vector File operands for RR format Scalar instructions. Typically several pipes can be active at the same time requiring a high data transfer rate to allow reading and writing operands for each pipe during each clock cycle.

Next, refer to the Vector File data arrangement of FIG. 186 which illustrates how the Vector Files are organized. The Vector Files are constructed of 256 address by four bit RAM chips. The 16 files of 64 words each are in the top quarter of the RAM. One of these sixteen files comprises the first 64 addresses of the Vector File RAMs and is shown to the right of the RAM. The overall file is presented as eight blocks wide. Each of the eight blocks being four rows long by two word columns wide. The two data words, 0 and 1 are contained in the first row of the first block. Following along the top row of all eight blocks are words 2 and 3, 4 and 5 and so forth, up to words 14 and 15. This continues along the second row of all eight blocks 23, 24, 25, 26, 27, 28, 29, 30, and 31. The third row includes words 32 to 47 and the fourth (bottom row) contains words 48 to 63. This completes the 64 word file.

There are four rows which are referred to herein as passes, so there are a total of 4 passes. Also, the words that are shown within each box are paired for double precision operations. For example, the first box has words 0 and 1 and they are paired together as a single element for double precision operations. For single precision operation, of course, each one of the words is treated as a single word and is a separate element. This would be element 1, element 2 and so forth, for a total of 64 elements for single precision operation. For double precision operations, there is maximum of 32 elements for the entire file. There would be 15 more blocks like this to represent the other 15 files within the Vector File RAM. This is just one of the sixteen (16).

FIG. 187, in the lower portion 1350, illustrates the format used in the addressing of the file, i.e. for the entire Vector File. This is how a single element can be uniquely addressed. Bits 6 through 11 define the 64 words within a single file. The bit 6 and 7 defines which one of these four passes that is being considered, i.e. pass 0, pass 1, pass 2, or pass 3. Bits 8 through 10 are the Read/Write Block Number. This refers to one of the 8 blocks from 0 through 7. The bit 11 refers to the even-/odd bit (E/O). It selects either the even word within a pair or the odd word. So, for single precision operands any one of 64 words can be selected by using this bit.

Moving to the more significant bits, bits 2 through 5 represent the File Number and this is the number that appears in the instructions. They will select one of the 16 files within the Vector File RAM.

Next, look at the shadow area address field, which is bit 0 and 1. Because the data is 16 words wide as shown there are eight (8) blocks (Block 0 through Block 7). That is, two words per block for 16 words and only four RAM addresses in the Vector File is used per file. Multiplying 16 files times 4 passes 64 addresses are used within the Vector File RAMs for all of the 16 Vector Files. This leaves 3 quarters of the RAM addresses unused.

This address field is referred to as the shadow area and is used as a hardware scratch memory. It is used for certain extended and multipass instruction execution, such as reduction and divide, and for,. single to double and double to single precision conversion instructions. The areas are allocated with the shadow area as being addresses 01, 10 and 11. Shadow address area 01 is allocated to the Multiply Pipe and areas 10 and 11 to the Multiply Pipe. They are allocated separate areas to avoid conflicts between the pipes in the utilization of the shadow areas.

Next refer to the middle of FIG. 187 for a simplified block diagram of the Vector File organization. The eight (8) blocks (Block 0 through Block 7) of the Vector File 1372, 1374, 1376, 1378, 1380, 1382, 1384 and 1386 are shown horizontally across. They represent the Vector File RAMs. The data word pattern is repeated here. Again there are the four passes going across so that all of the data words for one file are illustrated. The additional, fifteen (15) files continue on in the address range of the RAM chips. The address input is shown at the bottom of the RAMs. Each one of these blocks has an address input and an independent address register. The address registers 1352, 1354, 1356, 1358, 1360, 1362, 1364 and 1366 are activated or clocked on phase 1. The address is sent from vector control to the first Vector File address register 1352 for a Vector File operation. For example, a read address is sent into in this first address register 1352 on a given clock phase 1. It is referred as Vector File block 0 1372. The data is read out and clocked into the Augend read register 1390, on the next phase 4.

For the next clock cycle, the address is propagated from the register 1352 to the next register 1354. There are intermediate clock phase 3 registers between all of these registers, which are not shown. They are essentially not functional registers in that they are there to make the clock scheme work. On a given clock phase 1, the example read address is gated into the first register 1352. On the next clock phase 3 that address is clocked into these intermediate registers. On the following phase 1, the address is at the next address register 1354. This address register 1354 is for Vector File block 1. Words 2 and 3 are read from the RAM. The data goes up to the AP Augend Read Register 1370. Each successive clock cycle, the address propagates down by one address position so that it takes a total of eight clock cycles to read all of the blocks. On the eighth cycle words 14 and 15 will be read from Vector File 1386 block number 7. The RAM data goes up into the AP Augend Read Register via the rightmost or eighth input.

The eight (8) input multiplex (MUX) 1388 represented at the bottom of the AP Augend register 1390 receives the pipe read block number counter bits 8, 9 and 1O, as the MUX address from register 1350. A counter which starts at zero and advances each clock cycle is used to form this portion of the address. For example, upon starting to read a Vector File, the counter is zero, selecting as an input a block zero into the augend register 1390. For the next clock cycle the counter is incremented to a value of one so that the mux address is one and this selects as an input from this Vector File 1374 block 1 words 2 and 3. On the third clock cycle, the mux address is incremented again to select the third input from Vector File 1376 block number 2 to words 4 and 5. The counter continues incrementing each clock cycle until it reaches Vector File 1386 block 7, at which point words 14 and 15 are read into the augend register 1390. The counter then reverts back to the value of 0 thereby pointing again at the input from the Vector File Block zero. Meanwhile, a new address is being formed, the pass number field of register 1350 has been incremented at that point to a value of one. The new address is transferred into the address register for Vector File block zero by the Vector Control address selection mechanism. The process is repeated for the next 8 clock cycles until words 30 and 31 are read from block 7. The address at the end of each pass is discarded and a new address is formed for the subsequent pass. The pass number will be equal to 2 for the third pass and the read counter will again have been reset to 0. During the third pass words 32, 33, 34, 35 and so forth will be read with words 46 and 47 being read during the eighth cycle. The pass number is incremented to a value of 3 for the fourth pass.

During the fourth and final pass words 48, 49, 50, 51 and so forth will be read with words 62 and 63 being read during the last cycle. It takes a total of four passes at eight cycles per pass for a total of 32 clock cycles to read out all of the elements of one file.

Next consider FIG. 188, which shows all the Vector File read registers. The left hand column 1391 represents the five pipes that read operands from the Vector Files. The center column 1392 shows the read registers that are on the Vector File primary cards. The rightmost column 1393 shows the read registers that are on the secondary Vector File cards. The Add Pipe, for example, has an Augend read register on the Vector File primary cards and an addend read register on the secondary cards. Both augend and addend read operand word pairs are read at the same time and sent to the pipe together. Likewise, with the Multiply Pipe, the primary has a multiplicand read register on the primary and on the secondary a multiplier read register. The Move Pipe has only one read register and it is located on the secondary card. The Vector Store Pipe, as previously noted, has two output registers one on the primary cards and one on the secondary. Each of these registers is capable of reading two words from the Vector Files per clock cycle. The Scalar (SC) Pipe has only one read output register which is on the primary cards. The SC Pipe actually can accomplish two reads, however, they are done serially using the single read register. The primary and the secondary both have four registers and that is done so as to equalize or limit the loading on the Vector File RAM's. All of these registers could be in operation during each clock cycle if all of the pipes were active. Each could be reading any of the 16 Vector Files. No two pipes can ever be reading the same element or word of any of those files.

Next the Vector File write data organization is shown on FIG. 189. Across the top, although not all shown, there are a total of the previously shown eight Vector File RAM's. Also shown are the data words 0, 1, 2, 3, 4, 5, continuing across to words 14 and 15 and through 3 additional passes for a total of 64 words contained in one file.

Each RAM has an address input which is not shown on this diagram. The write data input of each RAM is connected to a Vector File write data register which is clocked on a phase 1 as were the address registers. The write data registers 1353, 1355, 1357, 1367 are shown with their 6 data inputs. Each one has the same inputs. For example, the leftmost input represents data received from the Add Pipe. The data fans out to the mux input 0 of the eight write data registers. The results of the Multiply Pipe goes to the data MUX 1 input of all eight write data registers. The next input is the result data from the Move Pipe into input 2. The next two inputs are assigned to the Vector Load Pipe. It has two inputs so that it can write two words on each of these inputs for a total of four per clock cycle. They are referred to as the input A and input B. The last input is from the Scalar Control (SC) Pipe. The Vector Store Pipe, of course, does not have an input because it only reads the Vector Files. The input into the left side of the multiplexors is the Write MUX address Select. It comes from a counter and other logic within the Vector Control section. As a write operation progresses through the eight blocks of Vector File RAMs, the mux address will also be advanced in the same manner. For example, if result data is being written from the Add Pipe, then the MUX address sent to the block 0 write data register must be zero. Write data words 0 and 1 from the Add Pipe would then be clocked into this register on a clock phase 1. For the next clock cycle, words 2 and 3 are written. The MUX address into the block 1 Write Data Register must be 0 so that data from the Add Pipe is gated in at clock phase one.

Next refer to FIG. 190. This is a simplified block diagram of a typical Vector File RAM with associated address, write, read and output registers also shown.

Starting with the Vector File RAM 1372 the address input arrives from the address register 1352 which is clocked 01. This is typical as each of the eight blocks of the Vector RAM its own associated address register 1352 and write data register 1353. Additionally, the write enable input which controls actual writing into the Vector File RAM 1372 is also shown. Writing into the RAM actually occurs on a clock phase 3 which provides a two clock phase propagation from both the address register 1352 and from the write data register 1353 to the RAM. The Vector file read registers are dedicated to specific pipes. The register shown 1390 could be, for example, an augend read register. The read registers are all clocked by a clock phase 4, providing for a 3 clock phase propagation from the address register to the read registers. The other 7 inputs into the read register 1390 come from the other seven blocks of Vector File RAM's. The read register MUX address input comes from a counter within the Vector Control section as shown in FIG. 187.

The counter is also associated with a pipe. For example, if the counter is associated with the Add Pipe then is provides the MUX address for the augend and addend read registers. The counter starts at zero and increments by one each clock cycle. After reaching a count of seven, it restarts at zero for the next clock cycle.

The output of the read register, for most of the pipes, and for the Add and Multiply Pipes especially, goes to another intermediate clock register 1389 at phase 1 as shown. That provides for a one phase clock propogation from the phase 4 read register to the phase 1 output register 1389. There are various sources of data that input into this output register 1389. One source of data is G-register (G op) data for those vector instructions that specify aG register operand. The G op data is transferred into the output register 1389, and once transferred into there, the clock enable line is disabled so that the register will hold the data. The clock enable data is disabled by the SC pipe, as soon as the G op data is transferred into the output register. The G op data is held there until the clock disable is cleared by the pipe, when it is done with the G register data. So there is dual control of the output register clock enable. The SC pipe disables the clock enable, and the pipe reenables the clock.

Another source of data into the output register 1389 is the data for reduction instructions. This data requires manipulation under control of the pipe associated with the output register during execution of reduction instructions. There are actually two inputs for reduction data here so that there are actually a total four inputs into the output register in some cases. The Add and Multiply Pipes do reduction operations. For the case where G op data is transferred into the output register 1389 the SC pipe controls the MUX address input. During reduction instructions the pipe is executing the reduction controls, the output register receives the MUX address from the VC. It manipulates this MUX address to select one of the two sources of reduction data.

Next refer to FIG. 191 which shows the Vector File time slot pattern definitions. There are a total of 8 defined Vector File time slot patterns. They are numbered patterns 1, 3, 4, 5, 6, 7, 8, and 9 (no number 2). Across the top we have the 8 slot numbers 0 through 7 and these correspond essentially to the 8 blocks in the Vector Files. The Vector File time slot assignments are actually maintained in the Vector Control by the time slot registers. Pattern 1 is used by the Vector Store Pipe. It only reads Vector File data and moves it to the store buffer. Both the primary and secondary copies of the Vector Files can be read simultaneously so that only 1 time slot is required for both operations. This pattern is also used by the Add Pipe for vector to vector comparison instructions where data is only read and there is no writing of result data into a Vector File. The result of the comparison goes to the Mask Processor in the Scalar Processor Module so a write time slot is not required.

Pattern 3 is the main and most heavily used pattern. It is used by the Add and the Multiply Pipe for most of the instructions such as add, subtract, multiply logicals and so forth. For example, during the read time slot for the Add Pipe, the augend and addend are read in parallel, one from the primary and the other from the secondary copies of the Vector Files. The latency time of both the Add and the Multiply Pipes are nine (9) clock cycles. So nine (9) cycles after the operands are read, the result is ready for writing into the Vector Files and this write time slot allows that.

The next pattern is pattern 4. It is used by the Vector Load Pipe for load vector instructions. Each one of these time slots allows us to write two words into the Vector Files for a total of four words per clock cycle.

Pattern 5 is used by the Move Pipe for the compress instruction exclusively.

Pattern number 6 includes read operation followed by a write operation. This is used by the Move Pipe for all of the other instructions that it executes. It is also used by the SC pipe for all of the read/write operations.

The next pattern is pattern 7. It is used by the Vector Load Pipe for the load alternating element instruction. Again there is a two word transfer during each of these for a total of four words per clock cycle. The difference between this pattern and pattern four, which is also used by the Load Pipe is that the load alternating element vector instruction provides writing into two different files.

Moving next to pattern 8 there is also shown a read and a write slot which is again used by the Add and Multiply Pipes. There is one pattern up front which is vacant, this pattern is provided for execution of certain extended or multipass instructions such as for the divide and conversion instructions.

The last pattern is pattern 9 and it is used by the Add and Multiply Pipes for reduction operations. Again there is a space up front to allow the pipe and the Vector File output data register to be conditioned for the reductions, which are multipass instructions. Some of the data is staged which results in a delay in the writing. The reason for the additional gap between the read and write time slot is that the data requires additional manipulation.

Next, shown in FIG. 192 is a timing diagram illustrating a typical Vector File addressing for either the Add or the Multiply pipe. For our example we assume that a vector add instruction is being executed. The timing sequence depicts the address operation and what each of the eight (8) Vector File blocks are doing at a given time. The top line, for example, depicts the activity of Vector File block 0 for both the primary and secondary copies. Likewise the activity of blocks 1, 2, 3, 4 and so on for the 8 blocks is also shown on the seven additional lines. Each line is marked to depict clock cycles. The time of each segment represents one clock cycle. Each clock cycle segment then illustrates any activity that a Vector File block is doing at that time. For our Vector Add example, then as the instruction is started, the elements of words 0 and 1 of both the addend and augend are read from the Vector Files . The first segment of the top line shows the read address as it is first entered into the Vector File addressing . For the next clock cycle then the address is sent down to the address of Vector File block number 1 and during this second clock cycle then words 2 and 3 are read and sent to the Add Pipe. During the third cycle then Vector File block 2 will be busy and so forth for the duration of the 8 clock cycles. During the eighth cycle words 14 and 15 will be read and also at this time a new address for pass 2 will be formed in the Vector Control addressing section. The address from Vector Control is then sent into the Vector File block 0 address register. This is the beginning of pass 2, which starts by reading words 16 and 17 and sending them off to the add pipe. The second pass continues for a total of eight clock cycles. The diagram only shows two of the four passes that would occur for a full 64 element vector. The Vector File time slot patter for this operation is 3 which specify adjacent read write time slots. During the second clock cycle a Vector File write address is also formed, however, it is not really used for our example. The latency time of the Add Pipe is 9 clock cycles. The first result data will not be ready until 9 cycles after the first read operands are read. Writing into the Vector Files may occur during the first pass but it would be for a previous instruction.

On the right is shown the AP sum write pass 0. This is for the starting of a write operation for our example add instruction. At this time results of element 0 and 1 which were read during the first clock cycle are written. These results are written in word 0 and 1 of the destination Vector File. The next clock cycle results are written in words 2 and 3 and so forth. This continues for a total of four passes and it goes on for one pass beyond the reading.

To review for a moment, the Vector Files are comprised of eight (8) independent blocks, each capable of reading or writing each clock cycle. There are two complete copies, a primary and a secondary copy so that operand pairs can be read at the same time for the various pipes. For example, the read augend and addend or the multiplicand and multiplier can be read at the same clock cycle. The writing of data into the two copies occur concurrently.

Next an introduction to the Vector Control (VC) section 1100 will be given. It receives and acknowledges instructions from the Scalar Processor Module. All instructions are decoded and issued into execution by the Instruction Flow Control (IFC) section within the Scalar Processor Module. The instructions are actually held in the instruction buffer register in the Scalar Processor Module. Instructions are initiated into execution in the order specified by the program in execution. The IFC section decodes the 36 bit architecturally defined vector instructions of a program into a 49 bit Vector Control word (VCW). The VCW is often called an instruction in the context of the Vector Processor Module. Also accompanying an instruction issued to the Vector Processor Module is the element count (ELCNT), the element point (ELCP), element count equal to 0 and the ELCNT or ELPT abort signal. These are sent from the Loop Control (LC) section 1000. The architectural mask is also available at the same time the instructions are issued, however, it is not used until instruction execution is actually started. The mask is sent directly to the pipe in the Vector Processor Module that is executing that particular vector instruction. The Instruction Flow Control also sends 4 copies of the Vector Control issue designator. It denotes that an instruction is available to the Vector Processor Module for execution. The Vector Processor Module acknowledges each instruction to IFC as it is passed on to one of the 6 pipes for execution. Two pipes participate in the execution of certain instructions. In those cases the issuing of the acknowledge is delayed to the Scalar Processor Module until both pipes are started. Only one instruction or VCW is received from the IFC for each double instruction. The second instruction or VCW is formed within the Vector Control section 1100, the total instruction is then acknowledged after both of those have been placed into execution.

Another function of the Vector Control is to manage the Vector File time slots. The Vector File time slots refer to the eight (8) independent Vector File blocks. This mechanism in the Vector Control keeps track of which of the 8 blocks are assigned or unassigned and to which pipe and also whether a read or a write operation is desired. The time slots are assigned by the Vector Control section at exactly the same time that the pipe operation starts execution of that Vector Control word or instruction. Vector Control then maintains that assignment until it is released by the pipe to which it has been assigned. This occurs whenever the pipe finishes execution of that particular Vector Control word or instruction.

Another function performed by the Vector Control section is the forming and selection of Vector File addresses. It also includes sufficient drive to fan the address out to the six Vector File card pairs. The Vector File time slot management mechanisms is used to form and select the Vector File address. The address is formed from the file number and other address information, such as the pass number, which comes from the pipe. Once formed, the address is sent to the Vector File block 0 address register. There are two selector mechanisms one for the primary Vector File and the other for the secondary Vector File.

The fourth function that the Vector Control section performs is the detection of vector register logical usage conflicts.

Consider FIG. 193 which is a simplified block diagram of the Vector Control section. There are three blocks that represent what is to be discussed. They are: (1) the instruction receive and acknowledge control block 1110, shown on the left; (2) the Vector File time slot management mechanism block 1112, shown in the middle; and (3) the Vector File address selection mechanism block 1114, illustrated on the right.

First, the instruction receive and acknowledge control block includes the facilities shown within that block 1110. They are: (1) the instruction receive and the element count (ELCNT) registers (2) the element point (ELPT), the element count equal to 0 and the element count out of range abort signals into the receive registers. The inputs into those registers are shown across the bottom of FIG. 193. The Vector Control word or the instruction shown is an input which comes from the Instruction Flow Control (IFC) in the Scalar Processor Module.

The element count (ELCNT) and the element point (ELPT) inputs come from the Loop Control (LC) section of the SPM. In addition, there are the element count equal to 0 and the element count, or element point on a range abort signal which accompanies those signals.

There is only one stage of these registers, the instruction is clocked in and held in those registers until passed on to a pipe for execution. There are multiple outputs from the instruction received register which holds the Vector Control word or instruction. The data fans out as shown to the six (6) pipes. Both the Vector Control word instruction and the Element Count or Element Point signals (in case of the SC pipe) fan out to all of the pipes. Additionally, the source and destination Vector File numbers for Vector Control are sent off to the conflict detect logic. Likewise, a line is shown indicating the file numbers going from address selection 1114 over to the Vector File time slot block 1112. This is done so that there is another copy of all of those file numbers held there which are used to form Vector File addresses. Another output is the Vector File time slot pattern that is specified or requested for the particular Vector Control word or instruction. This is sent from block 1110 over to the Vector File time slot registers in block 1112.

The instruction receive and acknowledge control block 1110 also accepts inputs from each of the six pipes to acknowledge the start of execution of a Vector Control word or instruction. This signal, in turn, is used to acknowledge to the Scalar Processor Module that the particular Vector Control word or instruction was successfully placed in operation and to supply an additional one as available. An exception with this is where two pipes participate to execute an instruction or Vector Control words. The second Vector Control word is formed in the Vector Control logic after the initial one received from the Scalar Processor Module is issued to a pipe. The pipe that accepts this instruction acknowledges it in the normal manner. The acknowledge signal is used to initiate formation of the second instruction that is then issued to in a normal fashion. Once the second of the two is acknowledged by the other pipe the Vector Control section acknowledges the instruction.

Returning to the Vector File time slot file mechanism 1112 as shown in FIG. 193. First, is the Vector File time slot pattern search is performed. This is continuously searching for all eight of the defined Vector File time slot patterns. The search goes on during every clock cycle whether instructions are pending or not.

The next feature is the requested Vector File time slot pattern decode. The Vector Control word or instruction includes an encoded Vector File time slot pattern number. This is one of the eight defined patterns and it is shown here as coming from the instruction receive register Vector Control word. This input is into the Vector File time slot management logic. It is decoded and compared to the search patterns. When the required pattern is found available by the pattern search, then a reservation is made. The reservation is actually made by writing into certain of the eight Vector File time slot registers. At this point, if the pipe is able to start, the reservation stands. However, if the pipe was unable to start, because it was already busy executing a previous instruction, or for any other reasons, then the reservation just made is cancelled. During the next clock cycle the requested pattern is again compared to the search patterns to see if available. If so a reservation is made. If the pipe is again unable to start, that reservation is cancelled and the process continues every clock cycle until the pipe is able to start execution. In that time the reservation will stand and it will be maintained until the instruction in the pipe has finished the execution of that instruction or Vector Control word. It then releases the Vector File pipe time slots. For example, for a vector add instruction, the Add Pipe will release the read time slot as soon as it is done reading all the Vector File source operands. The write time slots will be released at a later time when the Vector File write is completed.

In the remaining block 1114 of FIG. 193 are the Vector File address selectors. The first entry is the file number registers. There are read and/or write operand file number register(s) for each pipe. The operand 1 and operand 2 file numbers which are source operands. The operand 3 and operand 4 are write or destination file numbers. Those registers are loaded upon start of execution of a given instruction and are held until the instruction is completed. They are released or cleared by the pipe finishing the instruction.

Also included are the primary and secondary Vector File address select registers. The MUX address of both of those selector registers is under control of the Vector File time slot 0 register. The encoded pipe number field of the time slot registers is used for the MUX address. In addition there is a bit which denotes whether the time slot is to be used for reading or writing. This bit is further used as an additional MUX address bit and in that way it selects the appropriate file numbers whether it is to read or to write for the pipe in question. Also the MUX address accepts inputs from each of the six pipes for they define additional information as the pass number and the shadow area address. The address is sent to both the primary and secondary Vector File cards, and is fanned out to all of the 12 cards, six for each file.

Next are the Vector File read register MUX addressing counters. There are five counters. The load pipe, of course, does not have a read counter because it does not perform reading of the Vector Files. However, the other five pipes do have a read counter dedicated to each of them. The counter is reset to zero at the start of each instruction in order to be sychronized with the Vector Files and the pipe. This counter is incremented by one each clock cycle. After reaching a count of seven it restarts at zero and continues until a new instruction is initiated into execution in that pipe. Once the instruction is completed by that pipe, the counters keep on counting but they perform an operation called herein a don't care operation.

Last are the write register MUX address counters. There are six of these counters, the Vector Store Pipe does not have one because it does not perform writing into the Vector Files. The Load Pipe has two counters and the other pipes have one each for a total of six. These write register MUX counters have outputs which go to the Vector File write data registers to select the proper write data input from the pipe in question. The counters are initialized at 0 just prior to the first Vector File write data being available. They are continuously incremented each clock cycle thereafter. When the instruction completes execution of that instruction the MUX counter is cleared by the pipe in the manner similar to releasing the Vector File time slots.

Next, refer to the block diagram shown in FIG. 194 which indicates FIG. 194A and FIG. 194B. It is partitioned by a dotted line to show where this logic resides on circuit cards. The logic to the left of the dotted line is on the VPM Instruction receive interface card. The logic to the right of the dotted line is on the Vector File address select card and the remaining logic at the top center Scalar Processor operand control card. Starting at the lower middle left with the instruction receive register block 1115, the inputs shown are the decoded instructions which are the Vector Control word and the instruction available. This comes from the Instruction Flow Control section of the Scalar Processor Module. The issue designator is shown coming into the instruction active logic block 1116. The instruction receive register block 1115 contains a register with 49 bit Vector Control word and 7 parity bits. The adjacent block 1117 represents the element count (ELCNT) and the element point (ELPNT) receive registers. It also includes ELCNT equal to 0 designator and the ELCNT or ELPNT out of range designator. The input is from the Loop Control section in the Scalar Processor Module. All of this information is registered on designaters in the Scalar Processor Module clocked at phase 1 and the registers and designators here are clocked on phase 3. So there is a two clock phase propagation across the cable into a Vector Processor Module. The Vector Control word and element point information are held in these registers until the instruction is successfully passed onto a pipe for the start of execution. That is depicted by the input going to both of these registers which is the clock enable to hold the instructions or the ELCNT, ELPNT until it is passed on to the pipe. Over on the middle left of FIG. 194 is the instruction and acknowledge control 1118. It has inputs from the instruction active designator and also it accepts an acknowledge signal from each of the six pipes to denote that the pipe has accepted and started a given instruction. This the output then goes back to the Scalar Processor Module to denote that execution of that instruction has started. To the right is the Vector File time slot requested pattern decode 1119. The Vector Control word has a 3 bit encoded Vector File time slot pattern field. This pattern is then decoded into one of the eight defined Vector File time slot patterns. The output of the decode goes to the Vector File time slot reservation control 1120.

Central to FIG. 194 are the Vector File time slot reservation registers 1121. There are eight of these time slot registers labelled 0 through 7. They are connected together serially in a circular fashion. The major ones are clocked on a clock phase 1. However, there are also intermediate registers for each of these 8 registers that are clocked on phase 2 and on phase 4. So there is a total of 24 registers. The Vector File time slot pattern search means 1123, performs a search each clock cycle, from the contents of those various registers for all of the eight (8) defined time slot patterns during each clock cycle. Reservation information is moved from register to register each clock ,cycle, so the available patterns may change from cycle to cycle. Each eight (8) clock cycles, the reservation data is back to where it started. The output of the time slot pattern search 1123 then goes into the reservation control 1120. Here it is compared to the requested pattern for this given instruction. If that pattern is available, then a reservation is made by writing into the appropriate reservation registers 1121. The format of these registers will be described later. The reservation is now made and at that point a time slot reserved signal 1124 is broadcast to the pipes to indicate that the reservation was successfully accomplished. The pipe has meanwhile received the Vector Control word instruction. The pipe can start execution when the time slot is reserved. If the pipe was unable to start at that time because it was busy with the previous instruction, an acknowledge is not sent to Vector Control. In which case the Vector File time slot is cancelled by cancel control 1125. This cancellation consists of actually clearing the time slot registers of the information that was just written. The sequence continues with the searching for patterns and it continues making a new reservation each clock cycle until such time as the pipe does acknowledge. When an acknowledge signal is received from control 1118, the reservation is let stand.

These Vector File time slot reservation registers 1121 maintain the reservation that was just made for the pipe until such time as the pipe finishes the instruction. The pipe will then release the Vector File time slots. The release comes from the pipe time slot release control 1122 and goes directly to the time slot reservation registers 1121. The pipe remains sychronized with the time slot reservation registers until release.

Next, consider the Vector File addressing mechanism shown to the right of FIG. 194. The instruction Vector Control word or instruction has the source and/or destination Vector File numbers. They are held in the file number registers 1126 for use by the Vector File address select registers 1127, 1128. File numbers are shown as inputs to these address select registers. Additional addressing information comes in from the pass number line and the shadow address file select from each pipe. It also goes into both the primary and secondary select registers. The remaining input comes from Vector File time slot reservation register 0, 1121. The encoded pipe field select and the write bit are used as the MUX address for the address select registers. The address select register is clocked on phase 3. The output has a fan out drive to the Vector File address registers on the six Vector File card pairs. It goes to the address register for Vector File block 0. Eight (8) clock cycles later the time slots have moved around and are back to where they started. Usually the pass number would have been incremented.

Refer to the Vector File Write Data Register MUX address counters 1129. One of the inputs into these counters comes from the Vector File time slot reservation registers. The output of the MUX counters is sent to the Vector File Write Data Register MUX address to select write data that is going into the Vector Files from the proper pipe or source. There are six counters. The Vector Store pipe does not have one but the Vector Load has two and the other pipes have one each. The counters are initialized at zero (0) and are sychronized with the start of writing into the Vector Files. The counters are thereafter incremented by one by each clock cycle. They count up through 7 are reset back to 0 and then count up to 7 again. They continue doing this until such time as the pipe is through with the instruction. It will then issue a clear to its appropriate counter. The final block on FIG. 194 is the Vector File Read MUX address counters 1130. There are five of those counters. The Vector Load pipe does not have one. These counters, as the write counters are dedicated to individual pipes. The output of these counters goes to the Vector File Read Output Registers at the output of the Vector File RAM's and control the MUX address to select the read data from the proper block of the Vector Files. These counters are also initiated to 0 at the beginning of the instruction to be sychronized to the reading of the first elements of the Vector File. They continue incrementing each clock cycle, they increment to 0 through 7 are reset to 0 and continue recycling.

Refer to the time slot register Format shown in FIG. 195. It has an eight (8) bit format, with the 0 bit on the left. This is the write bit and it defines whether the time slot is for a Vector File read or write. Its primary use is for Vector File address selection, however, it is also used to determine whether to initialize a read or write data register MUX address counter.

Bits 1 through 3 comprise the encoded pipe select field. This field specifies to which pipe the time slot is assigned. This field is used for Vector File address selection to select which read or the write MUX address counter to initialize. Bit 4 is a reserve bit. It indicates whether the time slot is actually in use. Its primary use is for the time slot pattern search mechanism. The pattern search logic looks at this bit to determine whether the time slot is actually in use. Bit 5 is for automatic release. It is used by the AP and MP pipes to either release or re-reserve a write time slot. If another instruction is not waiting to start, the time slot is released or cleared. If an instruction is waiting to start, then the same read and write time slots can be reassigned to the new instruction. The latency time of the AP and MP allow up to 8 cycles overlap between adjacent instructions.

Bit 6 is used to initiate either the read or write MUX address counter. For a read operation the initiate signal at the start of the instruction is just in time to control the pipe Vector File read MUX address for the first word read from the Vector File RAM's. This bit 6 is discarded upon moving from Vector File time slot register 0 to 7, so that the counter is only cleared or initiated once for each instruction. The counter increments each clock cycle thereafter from 0 through 7 and goes back to 0 and then increments up through 7. This is continued for the read counter until the next instruction comes in. After the particular instruction is completed, of course, it is a don't care operation. For a write operation, the counter is also initiated just in time to control the Vector File write data register MUX address throughout the proper pipe, the result data is sent to the Vector File block. The counter is then incremented each clock cycle, from 0 through 7, and starts over again at 0 and continues doing this until the pipe completes the instruction at which time it clears or deactivates the counter.

Bit 7 is used to delay the initiation of the read/write MUX counter. It serves the same function as bit 6 but allows for delay in initiating the write MUX counter. It is used for the AP and MP pipes to delay the initiation of the write MUX counter for eight (8) cycles. The bit is shifted from the bit 7 position to the bit 6 position upon advancing from time slot register 0 to time slot register 7. It remains in the bit position 6 for one pass through all of the time slot registers. The next time it goes from time slot register 0 through 7, bit 6 is discarded. So the write MUX counter is only initiated once per instruction.

The last bit is bit 8. It is the temporary reserve bit and is only in some of the time slot registers and then it only resides for one clock cycle. It is used by the pattern search for the reserve and cancel reserve situation. This bit is used to override the reserve bit, which is bit 4, for the subsequent pattern search if a cancellation occurs. It is necessary because the search is done from a clock phase 2 register and a cancel is not done until later. Again, this bit is only in certain time slot registers. It is related to the Vector File time slot patterns and specifically to those patterns which reserve adjacent time slots.

Finally, a few additional points on the Vector File time slots. There are, of course, eight (8) of these time slot management registers. They correspond to the eight (8) blocks of Vector File. The eight (8) time slot registers are connected together in a circular fashion and will some times be referred to as the merry-go-round.

Next refer to the block diagram of FIG. 196 which includes FIG. 196A, FIG. 196B and FIG. 196C and illustrates the Vector File organization and the addressing mechanism. On the left hand portion of the FIG. 196 are the time slot registers 0 to 7 which have just been described. Note that the output of time slot register 0 has its output connected to the input of time slot register 7. The registers are connected together in a serial fashion, 7 goes to 6 to 5 to 4 to 3 to 2 to 1 and finally to 0. There is also some intermediate registers, since only the phase 1 registers are shown. There is a clock phase 2 register and a clock phase 4 register in addition to the ones shown. There are over 20 time slot registers in this total mechanism.

The output of the time slot 0 register is connected to the Vector File address select register, as previously noted. There is a primary and a secondary address select register although only one is shown on the diagram for simplicity. The time slot registers are on the Pl card and the address select registers on the P2 card. The inputs to the Vector File address select registers are the file numbers for the op 1, op 2, op 3 and op 4 for each pipe. The op 1 and op 2 are read operands and op 3 and op 4 are write destination operands. There are file number registers for each of the six (6) pipes. The other input into the Vector Files select register is from the various pipes themselves. They are the pass number and the shadow area address.

Once the address has been formed it is sent to the address register is for Vector File RAM block 0. It starts by reading words 0 and 1 out of the Vector File RAMs. The output of the Vector File RAM then goes to the read output register which is a phase 4 register. In the diagram this is the Vector File Augend Read Register. It has an 8 input MUX with each of the inputs coming from various blocks of the 8 Vector File RAM. Over on the upper right hand there is a table which shows all the various Vector File read registers. The pipes are shown down the left side of this table and the cards are listed across the top.

As previously noted in FIG. 188, the ADD pipe has the Augend Read Register on the primary cards with the Addend Read Register is on the secondary cards. Additionally on the primary cards are the Multiplicand Read Register, the Vector Store Primary Read Register, and the Scalar or Read Register. On the secondary cards are the Addend Read Register, the Multiplier Read Register, the Move Read Register, and the Store Secondary Read Register . The output of the Vector File Read Register goes to the Vector File Augend Output Register, which is a clock phase 1 register. Shown additional inputs are shown into the Vector File Augend out register. They are the G register operands, (G ops), constants for certain instructions such as the reductions. An example might be a 0 for a sum reduction. If there is an odd number of elements, then one element will have to be filled in with a 0. Another source of data is the stage operands for reduction instructions.

Returning to the time slot registers of FIG. 196, particularly to time slot register 0, and assuming that read operation process. The output of register 0 goes to the pipe number register 1131 which is clocked on phase 4. The output of the pipe number register goes into a pipe number decode 1132. What is being decoded here is the encoded pipe select field. Also we are looking at the bit 0, which is the write bit. It denotes whether the operation is a read or write. If the bit is 0, it is a read. Also bit 6 must be examined since it specifies whether the MUX read or write counter should be initiated. Assuming that bit 6 is set, then there is an output from this pipe decode register 1132. For example, assume a Vector add, then this leftmost output line 1133 would be activated and an initiate or a clear signal is sent to the AP read MUX counter 1134. This counter then is initialized at 0. It increments by one each clock cycle until reaching 7 and then resets to 0 and keeps going in that pattern indefinately until the next instruction is started in that pipe. There are also four other counters or a total of five. The Add Pipe, the Multiply Pipe, the Load Pipe, the Vector Store and the Scalar Control Pipe each have one. The counters for the add, multiply and Vector Store pipes control the read registers for both the primary and secondary Vector Files.

The output then of this counter shows this one example coming from the Add Pipe MUX counter 1134, and going over to the Vector File Augend Read Register to control the MUX address. It starts at 0 for block 0. On the next clock cycle it has a value of one to select this input value of two. This continues until words 14 and 15 are read. At which time it would be a value of 7 and then for a second pass it returns to 0 again.

Consider the operation where the first clock cycle has finished words 0 and 1. Meanwhile, the time slot for the Vector File read for the Add Pipe has wrapped around to time slot register 7. It works its way back up to time slot register 0 as Vector File RAM block number 7 is being read. At that time, the Vector File Address for pass number 1 is formed as the pipe would have incremented the pass number by one. This new address is sent up to the Vector File address 0 register and the process repeats itself for 8 more clock cycles. Meanwhile, the AP MUX counter 1134 is counting again and again, and the Vector File time slot registers have worked their way back up for a third pass and so forth. To, complete a 64 element vector add, there would be a total of four passes.

Returning to the beginning of our example Vector Add instruction to where the time slots were reserved, consider in our example of the Vector Add Instruction that the time slot pattern is a three. This specifies a read and a write operation in adjacent time slots. The read time slot is reserved in time slot register 0 and the write time slot in time slot register 1. The reservations actually occur in the phase 1 registers, which are shown.

The write portion of the Vector Add example works as follows, with reference to the timing diagram of FIG. 197. When the time slot write reservation was made in time slot register 1, the write bit and bit 7 are also set. Bit 7 is the delayed initiate signal for the write MUX counter. When the write time slot is transferred from time slot register 0 to time slot register 7, bit 7 is shifted into the bit 6 position. Since bit 7 is now bit 6 it must traverse its way through the time slot registers to the time slot 1 register. So 8 cycles after being reserved the write time slot now has bit 6 set which specifies the initiation of the counter. The encoded pipe field, the write bit, and the bit 6 being set will cause a counter to be initialized. Returning to the pipe number decoder 1136, it is a three input decoder which provides an eight bit output, of which only six bits are used.

Returning to the example of the vector add instruction the Add Pipe line write MUX counter 1136 is initialized to 0 and enabled. As shown in FIG. 196, the 3 bit output of the counter 1136 goes to a AP write MUX decoder 1138. The 8 decoder outputs are connected to the bit 0 input of the 8 encoders as shown. So the Add Pipe counter connects to the bit 0 position on each of these 8 encoders 1140. The encoder 1140 provides a 3 bit encoded output from the 8 inputs. The output of the encoder 1140 goes to one of 8 Vector File Write MUX registers 1144 which are clocked on phase 3. The output of these registers goes to the Vector File cards as the MUX address for the Write Data Registers 1142. For the first write operation of an instruction, it goes to the Write Data Register 1142 block 0. At that time the result data for the first pair of elements for our example Vector Add instruction would just be coming into this register from the Add Pipe. Other write data inputs are from the Multiply, Load, (two from the Vector Load) and the Scalar Control pipes. The Vector Store does not have an input because it only reads the Vector Files.

Returning to the Write Data Register 1142, the Multiply input is sent into the second MUX address input so its MUX address is always ones. The order of the data arrangement into the MUX is; the Add Pipe, the Multiply Pipe, the Load Pipe, the Vector Load A input, Vector Load B input and the Scalar Control input.

The output of the Write Data Register 1142 goes to the write data input of the Vector File RAM. Meanwhile the write time slot then has appeared in time slot register 0, the encoded pipe field is sent to the Vector File address select registers 1352 and an appropriate write file number is selected. In this case, the Add Pipe op 3 file number is selected. The additional address input from the Add Pipe is a pass number. Here, this would be 0 because the first results of the vector add are being written. These are selected and the primary and secondary address selector both have the same address because for a write operation both copies are written. At the same clock phase 1 we have the result data in the write data register 2342 as well as the address in the address register 1352, and perform the actual writing of the results into the Vector File RAM 1372 at clock phase 3. This data would be written into word 0 and 1 of the destination file. The writing into the RAM 1372 is actually done at a clock phase 3. The write enable comes from the pipe and accompanies the data into the write data register 1142.

We have now finished with the writing the first results of the Vector instruction add into the Vector File. Now we will consider, in a little more detail, the write MUX counter and its outputs. For our example, we are using an AP write MUX decode 1138. After writing the first results into Vector File the counter is incremented to by one (to a value of 1). The output of the write MUX decode logic 1138 is also a 1. That is the first or second output that would be present or active. The active line that goes into the write 1 encoder. The write 1 encoder 1150 output goes to the Vector File write 1 MUX register 1151, at phase 3 and from there on to the write data 1 register 1152 for Vector File RAM block 1. At this time, the second results for the second pair of operands have arrived from the Add Pipe and the data will be written into words 2 and 3. Meanwhile, the write MUX counter has advanced to a value of 2 in which case the output that would be active would be a third output of the AP write MUX decode 1138. That one is connected to this MUX 2 encoder 1160 into the bit 0 input position. The decoded output again would be a 0 and it would propagate through to the Vector File write MUX 2 register 1162 and again we will have a value of 0 which would select data from the add pipe, which is the third pair of results. This pattern continues for a total of the eight (8) cycles. At that point, the write MUX counter 1136 resets back to 0 and the first output of the write MUX decoder 1138 would be active. The process would continue repeating every 8 cycles. When the writing is completed the MUX counters are cleared at the end of the instruction. The clear signals shown at the bottom center come from the pipes into the input necessary to clear the write MUX counter. There are a total of six (6) inputs from the decoder 1137 one for each of these counters.

To recap, the operation of the Vector File time slots is as follows. The read MUX counters are initiated immediately upon starting an instruction because we had bit 6 sent in the time slot 0 register. The other information looked at was the absence of the write bit which means that the time slot is for a read. In addition, we also look at the encoded pipe field to determine which counter to initialize. These items are examined and a determination made that the Add Pipe read MUX counters are initialized for our example instruction.

The write time slot pattern was reserved into time slot register 1. With that reservation, bit 7 was set which specifies delayed initiating of the MUX counter. When the write time slot is transferred from register 0 to time slot register 7, bit 7 is shifted into bit 6 position. Advancing each clock cycle it gets back up to the initial starting point 8 cycles later. At that time we have a bit 6 and also the other conditions necessary to initiate the AP write MUX counter.

Refer next to the timing diagram of FIG. 197 which depicts the time slot activity which has just been described. For an example we will consider a vector add instruction. Across the top of the timing sequence we have clock cycles, clock cycle 1, 2, 3, on up to 13. Each cycle has a phase 1, phase 2, phase 3 and a phase 4 and the next cycle starts with a phase 1 and so forth. Only 13 cycles are shown here, however, the instruction would actually continue for 32 cycles of read plus an initial 8 cycles of write, so if the entire sequence was shown it would be over 40 clock cycles long. Only, a portion of it is shown to illustrate the start up. The first signal that we will look at is the issue of the instruction from Instruction Flow Control. The instruction issue register of the Scalar Processor Module is clocked on phase 1 and is active for clock cycle. The output of the instruction issue register propagates to the Vector Processor Module via cables. It goes into the Vector Control section and the next two signals shown relate to the Vector Control section. The first is the instruction receive designator of the Vector Control which is clocked at phase 3. It is set or active for a minimum of one clock cycle. We are assuming here that the pipe was able to start immediately so that the instruction is acknowledged immediately. The designator is set up, or active, for one clock cycle.

The third line is the VC instruction receive register and also sets on a phase 3. However, it remains set for one cycle longer than the instruction receive designator does. To start this instruction or Vector Control word into execution, one of the first activities that occurs in the Vector Control is the reservation of the Vector File time slots. The next eight lines are the Vector File time slot registers which are clocked at phase 1. Time slot registers 0, 1, 2, 3, 4, 5, 6, and 7 are shown. The reservation is made at the next clock phase one, 2 phases after we receive the instruction in Vector Control. A time slot pattern 3 being shown reserved. Shown also is the read time slot in Vector File time slot register 0. The write time slot is shown in Vector File time slot register 1. The time select field, bit 1 through 3 are the same for both of these time slots for the read and the write operations. The reserve bit, of course, is sent to both of them. The other release bit which is bit 5 is a 0. The read time slot and register 0 has bit 6 set, which immediately initiates the read/write MUX counter bit. The write time slot bit in register 1 (bit 6) would be cleared and bit 7 would be set. Bit 7 is the delayed initiate write MUX counter bit. Bit 8 would also be set in the read time slot register as the temporary reserve bit. It is not used here, of course, because we are not going to cancel. Advancing to the next clock cycle we see that the read time slot has advanced or transferred to the Vector File time slot register 7. Each clock cycle the read time slot advances into the next time slot register block until we again return to time slot register 0, eight cycles later. Immediately below the time slot register 7, the AP read MUX counter is shown. The AP read MUX counter is initialized 5 clock phases after the time slots are reserved. The counter is shown initialized to a value of zero and is shown incrementing by one each clock cycle until a value of seven is reached. It is reset to a value of zero for the following cycle and the pattern repeats itself.

Next we will look at initializing the AP write MUX counter which is shown on the next line. The write MUX counter is initialized when the write time slot reservation is in Vector File time slot register 1. However, we do not initialize the write MUX counter when the reservation is made because we have bit 7 set which is a delayed initiate. If we follow the write time slot reservation we see that it is back up to time slot register 1 each cycle after the reservation is made. At that point the write MUX counter will be initialized.

Returning to the block diagram of FIG. 196, we said that the write tim slot bit 7 had now been shifted to the bit 6 position upon transferring from time slot register 0 to 7. When the reservation reaches time slot register 1 we look at bit 0 of the encoded pipe field, which is the write bit which has been set, and the bit 6. Since we have all of these conditions present we can initialize one of these write MUX 6 counters.

Returning to the timing chart of FIG. 197 we can show how the read and write MUX counters relate to the Vector File blocks. Remember that the read MUX counter was initiated at immediately after the time slot reservation. This is depicted by the line reading AP read MUX counter. It is shown as starting at a clock phase 2 of cycle 3. The sequence then is from a phase 1 register to an intermediate phase 4 register and then to a phase 2 counter. So the counter is initialized to a value of 0, one clock cycle, the next cycle initiate is incremented to a value of one, two and so forth until it gets to a value of 7 then it returns to a value of 0 and the process repeats. Meanwhile, look at the Vector File addressing of FIG. 196. Shown there are the Vector File address registers 1352 etc. for the 8 blocks of Vector Files 0, 1, 2, 3, 4, 5, 6, and 7. The read address is formed when the read time slot reservation is in time slot register 0. The output time slot register 0 goes to the MUX address input Vector File address select register. The VF address select register makes the selection of the file number, pass number and the shadow address to form the complete address. It sends this of to the Vector File address 0 register as shown. This just propagates for the next 7 clock cycles through the 7 additional read registers. At that point, this address is discarded. For the next pass the read time slot reservation has advanced back up to the time slot 0 register and again we go to the address selection process and issue a new address for pass. It continues on for a total of 8 cycles and then the process repeats twice more for an additional two passes. The write time slot reservation follows the read time slot reservation by one clock cycle. An address selection process is performed, however, this is a don't care operation at this time as we are not going to start writing until 8 clock cycles later. This address is sent to the Vector File address registers but at least for this instruction these are all don't care operations and no actual writing occurs. There are situations where there could be a valid write operation actually occurring at this point but it would be for a previous instruction rather than the one that we are presently examining. The write MUX counter is initialized eight clock cycles after the read and write time slots were reserved. On the timing diagram it is shown as occuring at phase 4 of cycle number 10. The first value of 0 will be for the first Vector File write and the value 1 will be for the second write and so forth. This counter is incremented through 7 and it is then reset to 0. This process continues for a total of four times for the four write passes. The output of the write MUX counter, goes through the decode, the encode and the write MUX register plus additional logic levels for a total of five phases of logic propagation. The output of the write MUX counter is actually applied to the Vector File write data register to coincide with the arrival of the write address and the write data. The five phases of propagation can be seen on the timing diagram.

LOGICAL USAGE CONFLICT DETECTION AND RESOLUTION

It has been previously discussed that there are four functions which the Vector Control section performs. First, it receives and acknowledges the reading of the instruction from the various pipes.

Next, there was a discussion of the Vector File time slot management function. Further, there was a discussion of the Vector File address selection. The fourth function that the Vector Control performs is to detect logic usage conflicts. The Vector File logic usage conflicts are caused by the fact that there is an overlapping of instructions and by the asynchronism of operations between the various sections of the logic and the system. Several sources or reasons for this asynchronism exists. The most important reason is that in a multiprocessor environment there is a contention for the high performance storage unit (HPSU). The host processors (IP's) and the Input/Output Processors (IOP's), for example, make simultaneous requests and references to the same HPSU storage unit.

Another source of asynchronism is the fact that the Scalar Processor section of the Scalar Processor Module has various execution times for different instructions. Similarly, this same problem occurs within the Vector Processor Module. For example, the Divide operation is accomplished by a multipass algorithm that produces results at the same time as the Add and the Multiply.

The asynchronism associated with the VPM occurs mainly at the various interfaces between the Scalar Processor Module and the Vector Processor Module. This asynchronism not only causes conflicts but also other design complexities between those sections and the interface with the Vector Load section, the Vector Store section and the Scalar Control section of the SPM.

There is another general catagory of conflicts called facility usage conflicts. An example would be where the instruction is held up at the Vector Control section, because the VF time slots are all assigned, even though the pipe bits to execute are free and available to begin execution.

Another consideration regarding asynchronous operation is that the results produced by the machine must be considered as if each instruction is completely executed before starting the next instruction. Further they have to be executed in exactly the same order as specified by the program.

The next point under logical usage conflicts is conflict detection. This operation is used when an instruction is detected which is attempting, via a pipe, to use or alter the Vector File element, while some earlier instruction using another pipe is still using the Vector File. There are also other cases where the Add Pipe and the Multiply Pipe conflict with themselves.

The final area is conflict resolution. Basically this occurs when one of the conflicting pipes waits or freezes for 8 clock cycles at a time i.e. 8, 16, 24 clock cycles etc., until the conflict is resolved or cleared. The reason for this is that when a conflict on a word pair in a Vector File is encountered, it is necessary to pick up a result operation at exactly the same place and that operation reoccurs at an increment of 8 clock cycles.

Consider first the various types of conflicts that must be detected so that we will be able to recognize them. Basically, there are two types of conflicts that can occur. First is a write/read conflict. The way that this operation is written denotes first what is occurring at the earlier instruction and this is the operation that is suffering the conflict. In a write/read conflict, the write operation has not been completed before there is an attempt to read it. The data that is to be altered by this earlier instruction has not been completed and this read operation must be delayed until such time as the writing actually takes place so that the conflict may be cleared.

The second conflict type is the read/write conflict where the earlier instruction is doing a read operation that for some reason is incomplete and some subsequent instruction is attempting to alter that data before the read has actually taken place. In this case the second operation i.e. the write has to be delayed until such time as the read operation is successfully completed.

The third conflict type is a write/write conflict. In this case, some earlier instruction in the program is altering data in a Vector File and a subsequent instruction is attempting to alter the same data. Before the second write operation is allowed to occur, the first one must be completed. If not, the subsequent over writing will not take place. Note that a read/read operation is not a conflict since the data is not to be altered in the Vector File organization and the same element numbers of the same files may be read for various operations of the various pipes.

Consider examples of each of these types of conflicts. The first one shown in FIG. 198 is the write/read conflict and we will look at two instructions within a program. There are prior and subsequent instructions to these two instructions. Although not shown, consider that Vector registers V1, V2, V3 and V4 for example, are being utilized. The first instruction is a Vector Add which is going to take the elements of Vector File 1 and to them add the elements of Vector File 2 and then write the result of that addition into Vector File 3. The second instruction shown is a multiply instruction which, of course, is executed in the Multiply Pipe, and which is going to read the elements of the Vector File V3 and multiply each element by the corresponding element of the Vector V4 and then write the result into Vector V5. The conflict here is between Vector V3 in the Multiply instruction with the results of the Add instruction. The newly written V3 in the Add instruction is used as a read operand for the Multiply instruction. The read operation must be subsequent to the write operation so that the desired information is written before it is read.

The second type of conflict, shown in FIG. 199 is the read/write conflict. Looking at two instructions in the middle of a program, there is again shown an Add instruction adding the contents of Vector register V1 to the contents of register V2 with the result going to register V3. The multiply instruction is V4 times V5 with the results to be placed in register V2. The conflict here resides in the contents of register V2, since while the Add operation is reading Vector File V2, the subsequent multiply instruction is attempting to write into the same V2 file. Since it is our desire to read the present contents rather than the newly written data, there is a read/write conflict. Now the reason for this conflict, is that the Add Pipe may have been delayed is reading those elements since this data in Vector register V1 may have been loaded from the High Performance Storage Unit (HPSU) by an earlier instruction to the Vector Load and for some reason a storage contention was encountered for the storage unit. Since this data was not available to the Add operation, it would have suffered a conflict of its own and there would have been a delay in the reading of data for the Multiply Pipe. An attempt would then be made to overrun the existing data with newly written data and a conflict would occur.

The third and last conflict is shown in FIG. 200 and is the write/write conflict. Again there is an Add instruction followed by a Multiply instruction. An example of this overwriting is where the C field, which specifies the mask operation to be used with the Add instruction, has a value of 0. The C field also specifies that the operation is to be performed on all elements of the Vector. For a C field=0, every element in Vector V3 is to be written. Furthermore, for the multiply instruction, the C field is equal to one. This says to store only into those elements of the destination Vector which elements have corresponding 1 bits in the Mask register. By doing this type of operation they can overlay or merge data in any manner by using the Mask. So for a valid type of operation within a program, the conflict that is encountered is the writing of data into Vector register V3 by the Add instruction and completing it by the time that the Multiply instruction is executed. They have to be done in the proper order so that the results of the Multiply operation show up in Vector register V3 when both of these instructions are completed. The operation then is a write followed by a subsequent write for a write/write conflict.

To look at how these conflicts are actually detected, consider the example instruction sequence shown in FIG. 201. Again we have two instructions, an add and a multiply instruction and look first at the operand destinations. These are referred to as operands 1, 2, 3, and 4. Operand 1 is always the read operand, and so is operand 2. Operand 3 and Operand 4 are destination operands. Operand 3 is common to both instructions. Now as is seen, the actual conflict with these instructions is a write where the Add instruction is writing to the Vector File, and in the Multiply instruction when it attempts to read in that same V3 file. To detect all of the possible conflicts between these pairs of instructions, five conflict detectors are needed. They are two write/read conflicts, two read/write conflicts and one write/write conflict. The first write/read conflict is the one that is actually in the present example. As shown, this is the Add Pipe Op 3 register which, in this case, is the Vector register V3. The read operation is the Multiply Pipes Op 1 register which, of course is the same Vector register V3. Since they are the same register, there exists a potential conflict. The second write/read conflict that is tested for, is again the Add Pipes Op 3 register. In the multiply operation it would be the Multiply Pipe Op 2 register. The read/write conflict that is to be detected is the Add Pipes Op 1 register, which in the present instance is Vector File V1 and the write operation then would be the Op 3 register of the Multiply Pipe which in this case is Vector Register V5. The second read/-write conflict would be the Add Pipes Op 2 register or V2 in this example and the conflict in this case would be the Multiply Pipes Op 3 register V5. The write/write conflict, of course, is the Add Pipe Op 3 and the attempt by the Multiply Pipe Op 3 to over write it. So there are five potential conflicts that have to be detected.

To follow through with additional detail of how this conflict is actually detected, note that it involves the Add Pipes Op 3 File number and the valid bit. The valid bit is part of the Vector Control word that comes from the Instruction Flow Control (IFC) in the Scalar Processor Module. It indicates that the Op 3 is actually going to be used for this particular operation, because the results of a Vector/Vector Add always goes into a Vector File so the valid bit is set. So the valid bit is going to be actually used to enable the logic so that testing may be accomplished.

The other item that is used as a test standard is the Add Pipe Op 3 element counter. In this case, the counter is a late incremented write counter. This counter starts at 0 at the beginning of an instruction and is incremented whenever results are written into the Vector File. This element counter is really a word pair counter, that is, because the words are written into the element into the Vector Files in single precision then it really can be two elements while for double precision each element can be a word pair counter. This late incremented counter is used such that the counter is incremented only when results are actually written into the Vector File.

For testing of subsequent instructions that are actually going to conflict there is an early incremented counter that is applied to this side of the operation. This early incremented counter is incremented at the same time that the corresponding read element counters are incremented. This occurs when we attempt to read the operands for a particular operation.

Note also that the Multiply Pipe Op 1 file number and the valid bit have to be compared against the Op 3 file number when an attempt is made to detect a write/read conflict. Here again the valid bit serves the identical function that it previously performed for the Add Pipe. Of course, there is a valid file number in use when the valid bit is set.

The Multiply Pipe read element counter is also used here. There is only one read element counter because, in most operations, both operands are written at the same time and are synchronized. The element counter denotes our position within a Vector File indicating which elements have been successfully read and which remain to be read for the particular instruction.

There is a bit point that must be in the Multiply Pipe activity snap shot register which indicates the Add Pipe activity. The snap shot register includes an activity bit for each of the pipes in the conflict logic. Upon starting execution of an instruction or of a Vector Control word the other five pipes are examined and if they are active then the corresponding bit is sent back to set the activity counter the significance of which is that there is some instructions that must occur earlier in the program but which is still active in the processor of execution and there might exist a potential conflict with that instruction. Any instruction that starts in the other five pipes after the reading of the Add Pipe register starts is ignored because they are instructions that occur later in the program and therefore cannot be in conflict.

The total equation for the detecting of this write/read conflict is first the comparison of the Add Pipe Op G file number and the Multiply Pipe Op 1 file number for equality. Since they are both Vector File V3, we have met that condition. Next, the AP Op G valid bit must be set, since if that is set this indicates that we do have a valid operation going on for the G Op 3. Further, the Multiply Pipe Op 1 valid bit must also be set since we are doing a read of the Multiply Pipe and the Multiply Pipe Op 1 element counter must be equal to or greater than the Add Pipe Op 3 element counter. As long as the Multiply Pipe element counter is less then the Add Pipe element counter then there is no conflict, however, as soon as it reaches the end points or if it increments beyond the end point then we have an actual conflict occuring. Of course, the Add Pipe must be active in order to suffer the conflict.

Figure 202:
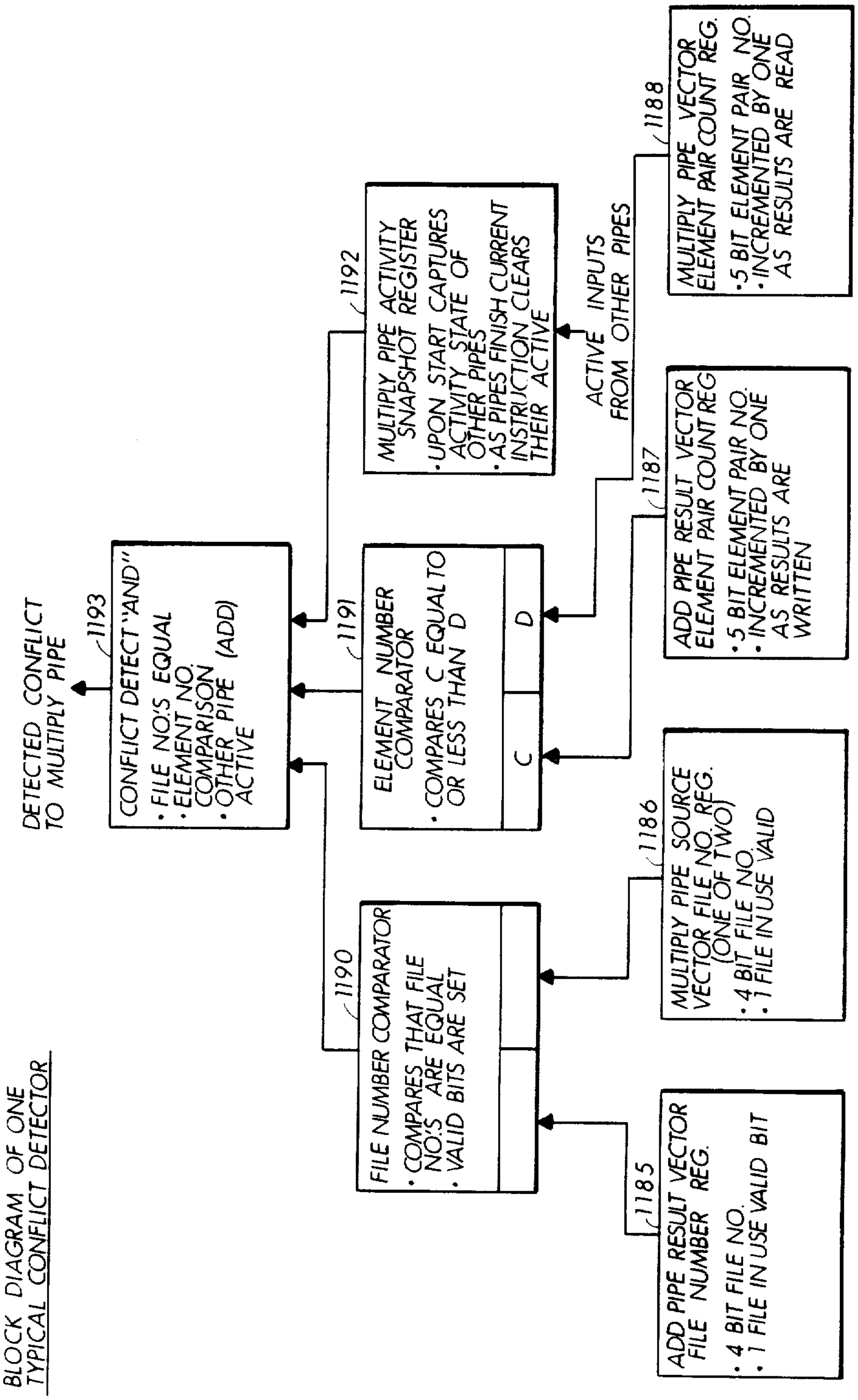

Now look at the block diagram shown in FIG. 202 which depicts this same operation. This is a simplified block diagram of one typical conflict detector, there are many more like this, of course, within the conflict logic, however, we will look at only one of them. Consider the first block on the lower left. It is the Add Pipe result Vector File number register 1185 which is the Op G file number. It is a four bit file number register. Additionally we have a one bit valid bit which denotes that that file is actually being used by that instruction. The adjacent block is the Multiply Pipe source Vector File number register 1186 for Op 1. This is the Op 1 file number, and includes a four bit file number and again a valid bit. Now those quantities are both compared in the block above which is the file number comparator 1190. It compares those file numbers that are equal and the valid bits are also set. If, indeed, they are equal there is an output sent over to the top register 1193. So as far as the file numbers and the valid bits are concerned then there are no potential conflicts. Returning to the lower level, the third block is the Add Pipe result vector element pair counter register 1187. This is a counter that starts at 0 and is only incremented when results are actually written into the Vector File for the Add instruction. It is a five bit element compare counter and it is incremented by one as each of the results are written. The remaining lower level block is the Multiply Pipe vector element pair counter register 1188. This is the read element counter. It is a five bit element pair counter and it is incremented by one as each of the results are read. Those two quantities are then compared by comparator 1191 to those element counts to see if the Multiply Pipe has reached a point where the elements have been written in by the Add Pipe. If so, then we will have an output which indicates a potential conflict.

The third block in the second level is the Multiply Pipe activity snapshot register 1188. It has an input from the other five pipes into this register. Since the Add Pipe was active when we started the multiply instruction we captured its activity bit in this register and since the Add Pipe still has not finished its execution its activity bit would be set. Incidentally the activity bit is clear whenever the add pipe finishes the current instruction. When this activity bit is cleared out and a subsequent instruction is started following the multiply operation the activity bit is not rest. The output of this snapshot register is sent to the conflict detector and we have a conflict if the file numbers were equal. If we do and the other pipe is active from the activity snap shot register then the final determination would be whether the element numbers are equal as a result of the element comparison. This detected conflict goes to the Multiply Pipe and orders it to stop operation and to freeze for at least 8 clock cycles. At the end of the eight cycles, we would take another look to see if the conflict is cleared. It is is still there to freeze for another 8 clock cycles.

Next, we will look at the possible conflicts that must be detected throughout the entire machine. FIGS. 203, 204 and 205 illustrate a set of tables of all of the various conflict detections that actually do or possibly might occur in the Vector Control section. These are all on a single printed circuit board called a P6 card. If you recall we had 2 cards, a P5 and a P6 card whose functions were to detect these conflicts and we are looking now at what is on the P6 card on which we have the write/read and the read/write conflict detectors. Look first at the write/read conflict detectors shown in FIG. 203, which includes the first and second ranks. In the first rank are the main chaining conflicts that are normally encountered in programs, wherein the results of one instruction are used as input/output operands in subsequent instructions. Down the side of the table, write operations are shown as various pipes. Along the top are the read operations to various pipes. These are the ones that will suffer the conflict and the pipes are listed on the side of the table. Within this table where there is an X shown, conflict detection is not necessary. For example, the Add Pipe does not, conflict with itself, nor does the Multiply Pipe. In previous examples, we looked at an Add Pipe Op 3 in conflict with a Multiply Pipe Op 1 or Op 2. A number 6 is noted at those intersections. These numbers in the appropriate boxes have to do with chip placement and there is a number in the box that means that a conflict detector exists at that crosspoint. While the Add Pipe, of course, doesn't conflict with itself it may conflict with the other pipes, i.e. the Multiply Pipe or the Vector Load Pipes. Again, the Vector Load has two operands, so it can be operating on two files, for example, with the load altering elements instruction. Remember that there are two files here and the other file is the SC file. We have a total of 46 conflict detectors in this chart.

There are additional conflicts that are possible when we start to pick up the read/write conflict detectors. Another table shown in the FIG. 204 illustrates these conflicts. While the Add Pipe cannot conflict with itself, it can conflict with Multiply Pipes, Op 1 and Op 2 as shown and with all other listed numbers. We have a total of 43 detectors in this table to detect read/write conflicts. Returning to FIG. 203, consider the referenced second rank write/read conflict detector table. This second rank is for the Add Pipe and Multiply Pipe because of the long latency time. The reason that this is necessary is that it is used when we have several instructions in the same pipe. For example, either to the Add Pipe or to the Multiply Pipe, with some of the earliest instructions having small element counts that might be in the range of 10 or less. In that case, because of the long latency time of the pipe, a series of the instructions to the Add Pipe with an element count of say 2 may be started into the Add Pipe and before the results of the first series of such instructions merge out of the Add Pipe and into the Vector File we could have 4 or 5 additional instructions received. This would require additional conflict detectors for each of those instructions that were being executed.

Referring to the write/read conflict detector shown in the table, note that with both the Add Pipe and the Multiply Pipe, the result operands are called operand 5 (Op 5). Of course, the extension of the Op 3, Op 4, Op 5, and Op 5's are also referred to as file numbers.

Notice that the Add Pipe can conflict with itself in this table and this would be on the first two Add instructions. The second one could use the results of the first Add operation as input/output operands and that is what is being detected here. The other pipes could also be in conflict there, for example the Multiply Pipe, the Load Pipe, and the Vector Store pipe could also be in conflict with that. So there are additional detectors here in addition to the one shown in the first rank of conflict detectors. Likewise, in this case, the Multiply Pipe can conflict with itself so there are detectors there as well. Again this would be the first multiply instruction or the results of it and a second multiply instruction would be represented by the Op 1 and Op 2, its read operand, could be using the results of the first instruction. There are a total of 18 detectors in this second rank table.

FIG. 205 includes three additional tables, and they are possible conflict detectors. The top two are for the Vector Load Pipe and the bottom one is for the Vector Store Pipe. They seek to detect the possibility of the conflict and they do that by comparing file numbers between certain instructions of the Add Pipe, the Multiply Pipe and the Vector Load Pipes. This becomes necessary since when the Vector File time slots are released by the Vector Load and the Vector Store Pipes in a time and manner to overlap instructions these same Vector File time slots can be reassigned to subsequent Vector Load or Vector Store instructions.

The Vector Load and Vector Store pipes run at twice the rate that the other pipes run. The other pipes generally run at two elements per clock cycle or 32 clock cycles for a full 60 element Vector File whereas, the VL and VS pipes can complete a full Vector File in 16 clock cycles.

The P5 card is the other card of the card pair and it has all of the other conflict detection mechanisms on it. This second card is shown in FIG. 206 and has the write/write conflict detectors and, in addition, has the pipe active snapshot registers. The table then shows that the write/write conflicts detectors are organized in the same manner as the previous ones. Here is shown the earlier instruction and the following or subsequent instruction that will suffer the conflict and the various possible combinations of operands that can be in conflict. Notice that this is for the late incremented element counter while the early incremented counter is not for this operation. We have a total of 28 of those detectors. Finally, there is another table shown in FIG. 206 which is a second rank. The Add Pipe, the Multiply Pipe are again seen with the destination operands Op 5. We are again detecting write/write conflicts with those various possible combinations and there are eight additional detectors here. So on this second card P5, there are a total of 36 detectors and since there are 131 on the P6 card there is a grand total of 167 conflict detectors in the total conflict mechanism.

Next we will look at a block diagram shown in FIG. 207 which includes FIG. 207A and FIG. 207B positioned as shown. It is a more detailed conflict detection mechanism. It shows the complete conflict logic and also its partition into the two cards P5, P6. This dotted line down the middle of the FIG. 207 represents the card boundary. Basically the blocks on the left are on the P6 card and the remaining logic is on the P5 card. Starting with the box at the bottom left there is illustrated the file number valid bit registers 1173 Op 1, 2, 3, 4, and 5 for all of the various pipes. The file numbers, of course, come from the Vector Control instruction receive register which holds the Vector Control word. Both the element number and the valid bits are clocked into these registers and handled until the instruction is completed for that pipe. The next block includes the element counters 1174 for the read operands. Op 1 and Op 2 for all of the pipes that perform read operations. For those that do not have two operands the load pipe is a single read counter. The input to increment those counters.comes from each the sequencing control logic of each pipe. They determine when the pipe is going to be incremented. When a conflict is detected the sequence must be stopped from the mask. The other input does this. The counters are initialized to 0 at the beginning of the instruction to represent the first word pair of the particular file. Next is the late incremented element counters 1175 for the write operands which are Op 3, Op 4, and Op 5. The Add Pipe, the Multiply Pipe, both have an Op 3 and an Op 5. The SC pipe and the load pipe have an Op 3, while only the Vector Load pipe has a Op 3 and an Op 4. Finally are the earlier incremented element counters 1176 for the write operations. There is only an Op 3 and Op 4 included here there is is no Op 5 element counters there. These counters are all controlled by the pipe operand sequencing control. The next level of blocks represent all of the conflict detectors. These are special gate arrays that actually make the file number comparison, the valid bit comparison and compare the element counter values which values are being compared to determine whether the actual conflict occurred. Also another input to these gates is from the pipe activity snap shot registers 1177 which are on the P5 card as shown. The output here then enters the consolidation logic 1185. Basically all of these conflicts are brought together into a plurality of OR gates. Some of this OR gating is actually going on in the gate array because there is four detectors in there in addition there is a further level of OR gates. The output goes directly to each pipe and they each have additional levels of OR gates. One of these inputs into the OR gates causes the pipe to immediately suspend operations (freeze) for a total of 8 clock cycles for each conflict which occurs. This other output goes over to the conflict resolution delay sequences 1183 on the P5 card. There is one of these circuits for each of the pipes and what they do is to essentially stretch out the conflict for a full 8 clock cycles.

Consider next, the write/read conflict counter comparators. They operate in a very similar manner to a write/read conflict comparators. The output of this block goes to the OR gates of the conflict consolidation logic and does the same types of things.

Look next at the P5 card. Refer to block labelled file number valid bit registers 1178 for Ops 3, 4, and 5 and notice that there are no read operand counters because this is strictly a write/write comparison. The inputs again actually come from the Vector Control section from the Vector Control word and are clocked at the same time as they were on the P6 card at the beginning of the instruction. Next, there are late incremented element counters 1179 for write ops, Op 3, 4, and 5. They are essentially just another copy used for drive purposes. They are similar to the ones on the P6 card as are the early incremented element counters 1180. They are controlled and initiated in exactly the same manner. The final block represents, as previously noted, the pipe active snap shot registers 1177 and again each pipe upon activation remembers which of their pipes are active. The significance here is that if other pipes are active then that represents instructions that have occurred earlier in the program, so there is an initial conflict there. That register is clocked at the initiation of the instruction. The bits within each activity pipe are dropped out as other pipes complete execution of the instruction that is represented by the input labelled instruction completion from each pipe. Next, refer to the write/write conflict comparators 1184. These are special conflict comparator gate arrays that function in the same manner as the write/read and read/write conflict detectors on the P6 card. Again there is the logic 1186 for consolidating the conflicts by OR gating the possible conflict signals together. This signal goes directly to the pipes and it is ored to, with the other sources of conflict from the P6 card. This output of the conflicts goes to the conflict resolution delay sequence counters 1183 which again stretch out the conflict for a total of 8 clock cycles thereby allowing the pipe to freeze for 8 cycles.

The additional output signals shown include a conflict signal which goes off to the resolution counters and holds the file number register changing data for the element counts used for advancing etc. Also notice that the late incremented element counters are not controlled by the conflict logic because once operands are successfully red from the Vector Files for a given operation, then the conflicts have all been resolved and operations upon those elements at least will be completed. They work their way through the various stages of the pipe and ultimately are written into the Vector File. This process cannot be stopped once it is started.

Next we will look at a timing diagram of a write/read conflict shown in FIG. 208 to better illustrate how these conflicts are detected and resolved. The example that we will be looking at is a timing diagram of an Add instruction followed by a Multiply instruction where the result of the Add is used as an input to the Multiply. This is the standard chaining of the write/read conflict. The top line here shows the instructions being issued over to the IFC or to the Scalar Processor Module wherein the Multiply instruction is issued one clock cycle after the Add instruction.

The next two lines show the Vector Control instruction being received in the Vector Control section. First, the Add instruction and the issue designator for the Multiply and then the Multiply instruction itself. Assume that both of the pipes are able to start immediately so that the Add Pipe starts. The next line shows the Vector File reading pairs of elements for the Add instruction. Thus, during the first cycle reading element, pair 01, then pair 2, 3 and so forth are read. On the 9th cycle reading (11th clock cycle) we see a reading of elements 16 and 17 for the second pass. Then the following line shows the results of the Vector Add being written into the AP Vector File write operation. Because of the pipe latency time we read 9 pairs of elements of the Vector File and at that point start writing the first results of the first element pair into the Vector Files, the result vector of elements 0, 1, and elements 2, 3, and this continues on. Meanwhile, when the Add pipe was initiated, in the execution, the file numbers for its Op 1, 2, and 3 were captured in the conflict logic and that is represented in the AP file register. Assume that we actually do have a conflict here, from the example, this would be Vector File V3. This is the destination register for the Add and also one of the source operands for the multiply operation. We also show the AP Op3 late incremented element counter. Here we see it is starting at 0 at the beginning of the instruction and it remains at 0 until it starts writing first results for the Add instruction into the Vector File. At that point the counter is incremented each clock cycle beyond that and this is continued each time the results are written into the Vector File, until the end of the instruction.

The Multiply instruction is also received at this time and Vector File time slot reservations are immediately established for it and attempts are made to start reading from the Vector File. At this point, the first address and the first attempt to read would have occurred, however, a conflict would have been encountered with the don't care reads. Indeed the next 8 cycles of read are either conflicts or don't care operations. Starting the multiply instruction then at clock phase 1, the file numbers for Op 1, 2, and 3 are also captured. Our Op 1 we said would be Vector File V3 which would be in conflict with the AP's Op 3 which is also a V3. At the same phase 1 time, the Multiply Pipe reads the operand element pair counter which is initialized to 0 and the Multiply Pipe active snap shot register is set. Because the Add Pipe was busy when the Multiply Pipe started, the Add Pipe bit is set in the snapshot register which enables the conflict detectors. So now there is a situation for the conflict. We have the file numbers being compared and since they are both V3, the element counters are equal. Since the pipe is busy a conflict is detected so the bottom timing line is the MP pipe write/read conflict. Since conflict detection essentially takes 3 phases the conflict would occur at a phase 4. It is shown in FIG. 208 as existing for 8 clock cycles. This conflict prevents the use of these operands read from the Vector File. In FIG. 208, these Vector File reads are don't care reads and are disgarded. At the end of the eight cycles the conflict clears and starting with the second pass we actually start reading data from the Vector Files because the first pair results from the Add operation are in Vector V3 register. We start to read these at the very next clock cycle and continue reading elements 0, 1; 2, 3; 4, 5; and 6, 7. This continues as long as the Add Pipe continues writing without interruption.

That completes the description of conflict detection as well as the resolution logic, and indeed, for the Vector Control section. The four functions that the four areas Vector Control section performs have been discussed. The first function included the receiving instructions, the acknowledgement of their receipt and the passing of the instructions off to the pipe. The second function covered the management of the Vector File time slot. Third, was the discussion of the forming of Vector File address and finally the detecting of Vector File logical usage conflicts.

Next, we will consider the format of the Vector Control word in more detail and go through an example translation from a architectural 36 bit instruction to a translated Vector Control word. After that a few example instruction timing sequences will be described. Look first at the Vector Control word format shown in FIG. 209, which includes 209A and 209B positioned as shown. Across the top of the figure is shown the 49 bit Vector Control word plus the parity bits for a total of 56 bits. Starting at the left hand side with bits 0 through 3, is the Vector File pattern. This is the encoded Vector File time slot pattern that is to be used for the instruction. The next bit is bit 4, which is a break point bit and it is used for maintenance purposes for arming a pipe break point. Some of the pipes are under microcode control, while others are hardware controlled. In any event, they require different mechanisms for stopping at various points within the execution of a given instruction. This break point arm identifies the unique instruction out of a program for doing this. Bit 5 is a spare bit.

The next field includes bits 6 through 13 which is an operation control field. It includes a unique definition of the instruction that is about to be executed or an operation about to be performed. For example, it is used by the Add, Multiply and Move pipes as a microcoded entry address. Bits 14 through 19 comprise the next field. These 6 bits are the master bit pipe select. Each of these six bits has an assignment. Bit 14 defines the Add Pipe; bit 15, the Multiply Pipe bit; bit 16, the Move Pipe bit; bit 17, the Vector Load Pipe; bit 18, the Vector Store Pipe and bit 19, the Scalar Control. For any given instruction only one of these is set. The next field, bits 20 through 22, is the operation modifier field. The multiple pass instruction bit which is bit 20 is set for certain instructions that require two pipes to participate in the execution of an instruction.

The T field follows and includes bits 23 and 24. They are from the instruction, the I (Type) field which defines the data type. It is used by the multiply pipe to determine which portion of a multiply product to use. Bit is a composite T bit and it is used to determine if the instruction is basically a single or a double precision instruction. Its main use is to alter the element count (ELCNT). For double precision, the element count is doubled and then treated as if it were a single precision element.

The G Op enable field is next and it covers bits 26–28. Bits 0 and 1 corresponding to bits 26 and 27 denote that either Op 1 or Op 2, or both of them for a vector/vector format instruction, is from a G register. If the bit 2, i.e. bit 28, is set, it denotes that this is a reduction instruction and that there is a G register destination register for the result of the vector operation. Bits 29 through 32 are the V op enable field. There are four bits here and they correspond to the next four fields, the Op 1, Op 2, Op 3 and Op 4 file numbers. This is the field that was discussed previously in the conflict detection logic discussion. It denotes that the corresponding file number is used by this instruction to enable conflict detection.

The next four fields are the file numbers that are derived directly from the instruction. They are the operand 1, 2, 3, and 4 file number fields. The Op 1 and Op 2 fields are read or source operands while the Op 3 and Op 4 fields are destination or write operands. The only instruction that uses the Op 4 is the Vector Load pipe. There it is used for the loading of the alternating element instruction that actually writes into two separate Vector Files. The Op 3 file would be one of the files and the Op 4 file is the other destination file.

In FIG. 210, look at an example translation illustrating how the transaction actually occurs in the Instruction Flow Control of the Scalar Processor Module. At the top here we have an instruction as it would appear in the instruction buffer. It is a typical program instruction of 36 bits. Across the top of this figure are the various fields of instruction, below that is the number of bits in that particular field. A vector/vector format double precision floating point add instruction is used as an example.

The F field is first and is the function or operation code field. The op code for a vector/vector add operation is 42 so we would have a 42 in our example instruction. Next is the T field with 3 bits in it. We have a 3 in that field which denotes that we are doing double precision floating point add instruction. The third field is the Vl field which is four bits wide and it is the Op 1 Vector File address, or the augend file in this case. The next field is the V2 address, again it is a four bit wide field. A G register operand is specified and it is coming from a G register number 5. It is the addend. It will be moved over into the output of the Vector File register and there it is replicated into a vector element, each with the same value.

The next field is the L field. It is a two bit field which specifies which of four possible sources of element count is to be used. For our example, we specified L equal to 0. This specifies the ELCNT as the source. The ELCNT comes from the Loop Control section of the Scalar Processor Module. The other choices would have been the next element count (NELCNT), the alternate element count 1 (ALT2)or the alternate element count 2 (ALT2).

Next, is the V3 or the Op 3 file number register where the result is to be written. In the case of the Vector Add, that always denotes a Vector File. In the illustration we have chosen Vector File 6. The S1 field is the next field. It is single bit field and it defines whether op 1 is a Vector operand or a G register operand. For our example, it is assumed that it is a Vector operand coming from Vector File number 4. The next bit is the S2 field. This is similar to the Sl field and applies to the operand 2 filed. The last field is the C field which is a 2 bit field. This says to perform the process only on the elements in the vector, with a corresponding one in the Mask. So, depending upon the value of the Mask, you will or will not write a given result element into the Vector File. Across the bottom of the FIG. 210 is the same bit layout of the VCW as across the top. The fields show the instruction translated into a Vector Control word. Starting across, we have a 3 for the Vector File pattern, with a zero for the breakpoint and spare locations. This continues across for the same Vector Control as was covered at the top of the page. Following across the bottom then are the same fields as those across the top of the figure.

Next to be discussed is how the instruction operation is obtained. It is shown in FIG. 211 as a timing sequence. It has basically been discussed before and is substantially the same sequence. There are the same clock cycles and phases as before. Starting at the top is the Vector Control register of the Instruction Flow Control and the IFC, VC issue designator. The issue of the instruction causes the issue designator to be set according to the Vector Processor Module directions. The IFC could issue another instruction possibly right at the next clock cycle.

The next two lines denote the instruction of the Vector Control word being received over in the Vector Processor Module in the Vector Control section. The top line is the receive designator and the next, the receive register. At the same time that the element count (ELCNT) is received for the instruction, the element point (ELPT) signal comes over. If a pipe is available or ready to start immediately then this instruction receive designator is up for 1 clock cycle. It may remains up for as many clock cycles as are necessary to get the instruction successfully in operation. The receive register always remains up for an additional cycle beyond that. The reason for this is so the pipe may utilize some of this information out of the instruction receive register for decoding purposes.

On the next phase 1, the Vector File time slot is reserved for the Vector Add operation. Of course, we would reserve pattern 3 which means time slot 0 and time slot 1. There is also an additional designator which denotes that we actually did reserve a Vector File time slot. This additional signal is sent to all of the pipes to denote that a time slot was assigned and they can proceed with the starting of the instruction. Concurrently, since the pipe has already seen the instruction for two phases, the output of the instruction receive register goes directly to the pipe. The pipe responds with the AP VC acknowledge designator at the same phase 1 as the Vector File time slot reserve designator is up. If both those events occur the instruction has successfully been placed in operation. If the pipe is unable to acknowledge because it was busy with a prior instruction then the Vector File time slots would be cancelled. The process of reserving and cancelling VF time slots continues until such time as the pipe is ready. The FIG. 211 shows the Vector File time slot 0 register with the read time slot appearing before the write time slot. From this, the Vector File read address select is formed. The next line shown illustrates the timing of the VC Op 1, 2, and 3 Vector File address registers. It is used for forming these Vector File addresses. They are set for at least one clock cycle where the element count (ELCNT) is 2 or less. If the element count (ELCNT) is more than 2, then they are set for longer periods, up to 32 cycles for a full 64 element vector. The next timing line is the Vector File primary and secondary address select register timing. They are for a clock phase 3 register. Again note that the MUX address of that register is controlled by the Vector File time slot 0 register. So the read address is formed and sent off to the Vector File address register. Two phases later, at the next phase 1, the operands are being read from the Vector Files for the Add instruction. The write address is also formed at this time, however, it is of no consequence, since we are not about to start writing operands for another 8 clock cycles. The Vector File AP read MUX address counter is shown being initialized to 0 at phase 2. Of course, it keeps incrementing 0 through 7 and repeats this process until the instruction is done. The next line is the augend-/addend read registers at the output of the Vector File RAM's. They are clocked in on phase 4. The data is shown for the first and second pair of elements. The next line s the VF augend and addend output registers. These are phase 1 registers. Next is the pipe active snap shot registers which are used in conflict detection.

These registers are clocked at phase 1 and stay up for at least 1 clock cycle depending upon the element count. They may stay up as long as 32 cycles or until the instruction is done. The first possible conflict that could have been detected would have been at cycle 2 phase 4 and it is shown on the next line. Of course, a conflict can occur at any clock cycle, or any pair of elements, during instruction execution. The second to the bottom line is the AP receiving the Vector Control word and the element count receive registers. The bottom line is the element count decrement and test register. It is decremented by two each clock cycle and it is decremented until it reaches zero. So now the pipe has the instruction and the element count and it has already started house keeping operations of the element count.

b. ADD Pipe

To begin with the Add pipeline deals with vectors of both single and double precision. Since the data paths receive this data from the Vector Files, the Add pipe Vector File data interface will be also discussed.

We also will be looking at the various instructions that the Add pipe performs, i.e. additions, subtractions, logical manipulations, etc. Floating point numbers also will also be discussed as well as their various formats.

A simplified block diagram of the Add pipe data path will be reviewed and the flow of data through the data path by the various instruction will be discussed. Finally, we will look at the control of the data path via a simple block diagram.

First, double precision vectors are shown in FIG. 212. Each vector can contain up to 32 double precision elements. The first element is numbered 0, 1, 2, so forth up to 31. Each one of these elements 72 bits wide. If we were going to do a double precision add operation, two vectors are needed, each of the same length. These vectors would be called Vector 1 and Vector 2. During the first clock of the instruction element 0 of Vector 1 is added to element 0 of Vector 2 and the next clock cycle, element 1 of Vector 1 is added to element 1 of Vector 2 and so forth. If we had a full Vector of 32 elements it would take 32 clock cycles to get results of the entire Vector add. The single precision Vectors, shown in FIG. 213 can have a maximum of 64 elements. Each of the elements is 36 bits wide and are numbered 0, 1, 2, 3, and so forth. Naturally we refer to the even numbered elements as even elements, and the odd numbered elements as odd elements. Similarly, if we were doing a Vector add, we need two vectors, we add element 0 of Vector 1 to element 0 Vector 2, element 1 of Vector element 1 of Vector 2 and so forth.

Next, refer to FIG. 214 which illustrates the interface between the Vector Files and the Add Pipe data path. First of all, the vectors are stored in the Vector Files. There are two copies of each vector. As shown, they are the primary copy 1302 and the secondary copy 1304. The data path portion the ALU pipe data path portion is the entire middle section and it actually consists of two pipelines, side by side. The portion at the left is called the double precision pipe, and the portion to the right is called the single precision pipe. The double precision pipe has a 72 bit interface. It can read in two 72 bit words, so that any time that we have a double precision instruction, a double precision add or a subtract or a logical, this DP pipe takes care of it. The single precision pipe is not involved at all. If we have a single precision instruction, we can do two single precision additions simultaneously because the double precision pipe can do one at the same time that the single precision pipe is doing one. So, when looking at the vectors on the very first clock cycle of an instruction, the double precision pipe adds element 0 vector 1 to element 0 vector 2 at the same time that the single precision pipe is adding elements 1 of vector 1 to element 1 of vector 2. Thus, the double precision pipe ends up operating on all even numbered elements while the single precision pipe operates on all of the odd numbered elements. When they are finished performing the add operation they combine the results in a merge register 1622 and the results are written back into the Vector Files via register 1306. From the time that the Vector Files are addressed on a first phase 1 until the results are written on the following phase 1, 9 clock cycles have elapsed.

Next, consider the instruction types. First, is the add vector which can be performed with either single or double precision operands and either floating point or integer. The subtract vector is next and it can perform the same functions. The absolute value function is next and if it has a positive value it just passes through the pipeline. However, if it has a negative value every operand it receives is complemented. The element wise shifts may also be single or double precision. We also have a count leading sign vector which counts the number of sign bits that are the same as the sign bit. The elementwise logical instruction is next and it is either single or double precision and it is either AND, OR or XOR.

The elementwise comparison instruction may be either single or double precision. It performs equality comparisons to indicate equal to, less than equal or not equal relationships. There are twelve different conversion types and there is also a reduction operation which can be either a floating point or an integer single or double precision maximum or minimum reduction. In certain instructions both the single and the double precision pipes participate in the instruction so that there are two results per clock cycle rather than one as would be the case for a double precision instruction.

The floating point numbers are shown in FIG. 215. First, consider the single precision floating point number. These numbers are 36 bits long and the integer bit zero is the sign bit. They have a characteristic which is eight bits wide and a mantissa which is 27 bits wide. If the number is positive, one of the numbers is negative and the characteristic is a biased exponent. The exponent for a number can vary from positive 177 to a minus 200. These are octal values. The characteristic is just the exponent with an octal 200 added on, so the characteristic can vary from 377 down to zero. The mantissa is a fractional part of the number and it is normalized so that the absolute value represented is greater than or equal to one-half, but less than one.

Double precision floating point numbers are 72 bits wide. The format is also shown in FIG. 215 as separate 36 bit words. The characteristic is 11 bits wide and the mantissa is 60 bits including the rest of the mantissa in the second word. Once again the characteristic is a biased exponent. The unbiased exponent itself has values ranging from positive 1777 in octal to minus 2000 octal. The exponent of the characteristic can vary in value from 3777 to zero, once again we are always dealing with positive values for a characteristic.

Next, consider an example of how to generate a floating point number. First, a given number 12 to the base 10, is equal to 1100 to the base 2, which is equal to $0.11 \times 2^4$. Since it is a positive number, the sign bit is equal to zero. The characteristic is equal to the exponent plus the bias. Since the exponent was 4, this is added to the bias, which is $200_8$. This gives a characteristic of 204 to the base 8. The mantissa equals 11 followed by 25 zeros or 6 followed by 8 zeros to the base 8. So, in floating point format there is the sign, which is zero, a characteristic of 204, a mantissa of 6 followed by all zeros. In single precision floating point arithmetic +12 is equal to this value in octal.

Next, consider an example of a Single Precision (SP) floating point addition as shown in the following illustration. To an augend the number 3764 in octal is added an augend to achieve a result. This is done by taking the number 3764 in octal as an augend, and adding to it a negative number. The augend characteristic is equal to 376, a positive value. The mantissa is sign filled with zeroes, since this is a positive value, and so we have zeros where the characteristic was followed by a four and the rest of the number. The addend characteristic is equal to 400 and since this is a negative number, there is a 1 in the zero bit position. Now the addend mantissa, which is negative, is again sign filled, so it is all ones. In this way, we have accomplished the first step in the floating point add operation which is to separate the characteristic from the mantissa. Next, we take the difference between the two characteristics and to do this we take the magnitude of the augend characteristic minus the magnitude of the addend characteristic. The augend characteristic is 376 magnitude minus the addend characteristic 377 gives us a result of minus one. The minus tells us that the augend characteristic was smaller than the addend characteristic. What is needed next is for both numbers to have a common characteristic, the augend mantissa must be right shifted by one place. We can tell by the sign of this characteristic difference which operand has the smaller characteristic and this tells us which mantissa to shift and the one bit tells us how many places to shift it After aligning the mantissas, the next thing to be done is to add the augend mantissa to the addend mantissa, so the ALU gate array of the ALU pipeline is used to perform the addition. It is a subtractive adder, which means that it takes the augend and subtracts the ones compliment of the addend which will give the same result as if they were directly added.

Now we are going to add the aligned augend mantissa to the addend mantissa. We have now added the two mantissas together and next the sum is normalized. Now the sum we have arrived at i.e. the binary point for floating point numbers, is assumed to lie between the last bit of the characteristic and the first bit of the mantissa. If the mantissa is normalized, the left most bit of the mantissa is not equal to the sign bit, so we need to left shift the mantissa by one position to obtain a normalized sum. Since we have left shifted the sum to normalize it, we need to subtract one from the characteristic. Also, since we saved the large characteristic, 377, we subtract one from it to give a value of 376. Now also, the mantissa is negative which means we have to invert the characteristic before we merge the characteristic with the mantissa. To accomplish the inversion the result is one complemented to give a final result of 401 characteristic followed by the normalized mantissa.

To review, first of all, when the two floating point numbers received are to be added we separate the characteristics from the mantissa. Then we take the magnitude of the addend from the magnitude of the augend to create the characteristic difference. If this difference is negative it means that the augend characteristic is smaller than the addend characteristic so we right shift the augend mantissa. However, if the characteristic difference is positive it means that the addend characteristic was smaller than the augend characteristic so we right shift the addend mantissa because we want the numbers to have a common characteristic before we add their mantissas. We then add the augend mantissa to the addend mantissa, after we have aligned the two mantissas by the shifting to generate a sum which needs to be normalized so that the left most bit of the mantissa is not equal to the sign bit. If this requires left shifting to normalize we then subtract that shift count from the characteristic. If it requires right shifting to normalize it, then we add that shift count to the characteristic. The characteristic that we originally save is always a positive value. It is always the magnitude of the larger of the two characteristics. However, if after we have performed the sum we find that the mantissa was negative we invert the characteristic before it is merged with the mantissa to achieve our final result.

FIG. 216 is a block diagram of a single precision Add Pipeline. A single precision pipeline always operates on the even elements coming from the Vector Files which in the case being referred to, is a 72 bit word coming from the Vector files. The most significant 36 bits of this word are referred to as word zero and the least significant 36 bits are referred to as word one. Since the single precision pipeline always operates on the odd number elements it is always dealing with word one coming from the Vector Files.

The augend of word one and the addend of word one enter those corresponding registers at the bottom of the FIG. 216 which Figure includes FIG. 216A, 216B, and 216C, positioned as shown. At this point the characteristic is separated from the mantissa. The characteristic, of the augend enters one register 1625 while the characteristic of the addend enters the other 1626. Similarly, the mantissa for the augend and the mantissa for the addend enter their correspondingly titled registers 1627, 1628. They are also sign filled at this point. The characteristic difference is then generated. This involves a subtraction operation in the SP characteristic difference register 1629. The larger characteristic is in register 1629 and this is all controlled by what is generated out of the ALU. It will tell us which characteristic to save. It will also generate a shift count that will be passed through the shift count stages 1630, 1631, 1632 to a shift matrix. It will also tell us whether to shift the augend or the addend mantissas. At this point, we have registers capable of switching the paths. If it is the augend characteristic which is the smaller of the two then we want to shift the mantissa to the augend operand. This path is followed directly straight up to the shift matrix where it is shifted and sent into the main ALU for the addition of the mantissas.

If the addend characteristic were the smaller of the two, the addend mantissa would be shifted by taking it up one path and it would then switch paths with the augend mantissa and go up to the shift matrix again. Thus, it would switch back to its original path before going into the ALU where the mantissas are added. So far we have separated the characteristics from the mantissa, generated the characteristic difference, which tells us how much to shift the mantissa of the operand is the smaller characteristic, shifted at the,ALU where the two mantissas were added together and that sum is passed through the stages until it arrives at the shift matrix.

To accomplish the normalizing shift, there is a gate array called a normalize count generator. It looks at the sum and tells us the amount of shift that is necessary (left or right ) in order to normalize the mantissa.

Meanwhile, augend and addend characteristic information is being passed through another ALU. This ALU will normalize the characteristic and the characteristic will be staged out of an output. Now, we have the characteristic and the mantissa, two separate entities, they have both been normalized, all that remains is merge the two. Look at FIG. 218 which illustrates the logical diagram where these two are merged together. The single precision characteristic enters as does the mantissa and the two are merged at this point. The merged result is passed through the output register and the output of this register goes back to the Vector Files with the results.

Now for single precision floating point add operations, the double precision pipe is operating on the even numbers at the same time that the single precision pipe is operating on the odd elements. Consider an example. On our very first clock cycle we read out all but zero, the double precision pipe is adding elements zero or vector one into element zero vector two, while the single precision pipe is adding element one of vector one to element one of vector two. These two results exit at the exact same time into a register and element zero will correspond to the most significant 36 bits and element one will correspond to the least significant 36 bits of the 72 bit segment that will be written back into the Vector File. If a double precision add operation were being done, the single precision pipe would not be involved at all and we would use this path to the register. Whatever arrives back from the double precision pipe is written back into the Vector File.

FIG. 217 includes FIGS. 217A, 217B, 217C and 217D, positioned as shown, and illustrates the path for the double precision pipeline. It is 72 bits wide while the path for the single precision pipeline is only 36 bits, logically, however, the two pipelines are very much the same. On the bottom portion of FIGS. 217C and D the augends and addends enter a gate array which separates the characteristic from the mantissa. The outputs of the augend characteristic register and the addend characteristic register enter a characteristic difference comparator 1633. This operation is very much like the single precision pipeline, where we choose the larger characteristic. The characteristic difference output passes through successive stages to the shift matrix. Again we have the same switching registers that we had in the single precision pipeline and we can choose the mantissa of the operand with the smaller characteristic to go into the shift matrix for shifting. A second set of switching registers are included that will switch them back to their original path in the ALU. There we add the two mantissas and pass through successive logic levels up to the normalizing shifter 1634. Again there is the normalized count generator which will tell us how many places we need to shift left or right in order to normalize the mantissa. There is also another characteristic ALU path where we adjust the characteristic. For example, if we had to shift the mantissa right, in order to normalize then we add two to that characteristic. So the characteristic and the mantissa exit their respective registers and are sent over to the SPDP merge logic circuit as shown in FIG. 218.

From this description it is believed readily seen that the two pipelines are very similar for floating point add. They are also very similar for the other instructions that are performed.

Next we will look at the single precision integer add instruction shown in FIG. 219. To do this we basically return to the same single precision pipeline shown in FIG. 216. However, referring to FIG. 219 it has the lines used for integer operations darkened for emphasis. For the integer add instruction, none of the logic that involves a characteristic is used. Basically what happens with reference to FIG. 219, is that the addend and the augend enter the pipe and are marched right along the pipe. They are added in the SP sum adder and passed along the pipe again. The shift count input to the shift matrix is zero and it just passes through this shifter and its output is sent to the SPDP merge circuit as previously discussed. The integer subtract instruction is handled the same as the integer add except for the function code that is being fed into the ALU except there will be a different function code to this ALU. SP logicals and/or, XOR, etc. are also handled like the integer. They just march straight up the pipe till they come to the ALU. At that point, rather than adding or subtracting we just perform an and/or or exclusive OR and the result goes straight out the pipe again.

The absolute value instruction is shown in FIG. 220. Although the figure is the same, the operation is a little bit different because here there is a one operand instruction and we are only working with one vector. If we were doing a single precision absolute value instruction, the shift count is always zero. It will pass directly through into the switch register and this is the important register for an absolute value or a negate instruction because this is where the ones complimenting operation takes place. Look at the sign for absolute value. If it is a negative number, we just one compliment it and that result will be exited. If it is a negate instruction, we will automatically ones compliment the value when it enters this register and that is the output. FIG. 221 illustrates the count leading sign vector instruction in a SP pipeline. This instruction counts the number of bits starting with bit one that are identical to the sign bit and it works on the odd elements. This instruction also switches path. Its count is zero so it passes through the ALU without incident. This normalized count generator is where the bits are counted. The count for the element zero is placed in the least significant 36 bit register. The ALU pipeline writes these results into a scratch pad memory area in the Vector Files and sends a signal to the Move Pipe. It tells the Move Pipe that we have done the count leading sign instruction, and have written it into the scratch pad area. Now, the Move Pipe will take those results, read them out of the scratch pad area, repack them in the correct order and write them in the Vector File where the results were supposed to be written in the first place.

FIG. 222 illustrates the compare instructions passage through the SP pipeline. These instructions involve writing of the results of compare operations into the Mask Processor. If it was found that A and B were equal, then a low bit is sent to indicate equality. There are four different passes that are indicated. They are less than equal, equal or not equal. This is written into the register as the results of the compare operation. If the test was for the equal condition and the two operands were equal, the output would be low. This equivalency signal is sent to the merge card as data that is being sent to the Vector File. The results of the compare operation from the double precision pipeline are merged with the results of the compare from the single precision pipeline and the result of this comparison is sent out to the Mask Processor.

FIG. 223 is the SP pipeline illustrating the passage of data on an SP shift instruction. This is a two operand instruction, the element to be shifted enters the single precision pipeline on the augend out word one register line and takes the path up to the shift matrix. The shift count enters on the addend out word one register line. If follows the path to the shift matrix. This shift count is the seven least significant bits coming from the SP add mantissa register. There is also a block called modify shift greater than 36. Since shift matrix can not handle shift counts greater than 36 and since we could have shift counts up to 72 it is necessary to modify the entering shift count, when it is greater than 36. That is the function of the modify shift greater than 36 apparatus. What this amounts to is having the counter pass through the count 36 twice, thus the shift of 71 is equal to 35, whereas shifts of 0, 36 and 72 are all equal to 0.

The data passes along the path of the darkened line through the SP pipeline and exits for use by the SPDP merge unit. When we have a double precision shift of element 0, then the darkened path shown in the double precision pipeline entitled element 0 of FIG. 224 which includes 224A and 224B and is followed, whereas for double precision shifts of elements 1-31, the path shown in FIG. 225 which includes FIGS. 225A and 225B is followed.

Because of the speed variations between the SP and the DP shift operations, a special buffer is used. This buffer is called the maximum index logic and is illustrated in FIG. 226. It used to store shifts for the maximum reductions. It has inputs of shift count even and shift count odd. The shift count even corresponds to elements zero, two, four, etc. The shift count odd elements come through R+L registers. These are actually register files and they stored the information until we are ready to use it. The first set of data that enters is element one. The shift count corresponding to element one is written into this register file and is immediately read out for elements two and three. Element two is going to be stored for one cycle and element three is going to be stored for three cycles and so forth. They will be read out when we are ready to perform that particular shift.

For a moment, let us talk briefly about reductions. We will be discussing these in more detail when we get into operand sequencing control, but in performing a reduction operation, for example, a single precision sum reduction, we operate on only one vector instruction. We add every element in this vector to produce one final result. If we had a full vector, and each element has a value of one, the final results of this sum reduction would be 64. It is the same thing for a double precision reduction. If we had a full vector, we would be adding the elements zero to 31 together to have one final result of 32. This looks essentially like for sum reduction. In fact, it looks essentially like any kind of sum for any instruction. It is just the addressing that is quite different, except for one thing, and that is the SP pipe operates on augend word zero and augend word one and the SP pipe operates on addend word zero and addend word one. This holds true for single precision sum reductions. If we are doing a double precision sum reduction to the double precision pipe, it looks exactly the same as any add operation. We also have a maximum reduction. In this case, what we want to provide is the index of the element having the largest value. If elements zero through 62 were filled with zeros and element 63 had the value one, our final result would be the number 63. For an end reduction, we are looking for the smallest number in the vector. If we had the same type of example, where elements zero through 62 were filled with zeros and element 63 had the value of one, we would put in an index whose value is zero because it is the first occurrence of the smallest number in the vector. Maximum reduction is the same procedure, however, it is the first occurrence of the largest number in the vector. As far as the data path operation with regard to a maximum reduction, these reductions require multiple passes to the Vector File. Let us again start by illustrating how the data path functions in the case of a reduction. We will start by looking at a DP pipeline. First, the data enters, since it is a double precision reduction, all the information is passed to the ALU. Next, a subtraction is performed and the results are used to tell us whether it is an augend or the addend. If we are doing a maximum reduction, the results of this subtraction along with some other control logic will tell us so. If the augend was larger then we save the augend and write it back into the Vector Files for use in the following passes. If we were doing a maximum reduction, after performing a subtraction the control logic would tell us if the addend was the largest of the two. In this case, we save the addend, and write it into the Vector Files for use on the following passes.

Referring to the DP pipeline shown in FIG. 227 which includes 227A and 227B there is illustrated the maximum staging for the double precision pipe. The bit entering tells us which operand to save i.e. which is the larger or smaller and which one we are looking for. Once again, if the augend were the largest number, and we are doing a maximum reduction, we would choose the augend and we would the path to bring us back to the double precision pipeline. From there, the DP pipe goes to the SPDP merge card and it is written into the Vector File.

As mentioned at the start of this discussion on reductions, there is only one result for a reduction and it is not a vector result, rather it is a scalar result. Thus, this final result is written into the scalar logic of the Scalar Processor.

Let us discuss for a moment FIG. 228 which illustrates how the data path control works. When we receive an instruction from Vector Control, we receive an entry read address which enters a data control RAM. This RAM is 80 bits wide and 256 deep and it contains control words for all of the various instructions. There is one control word for a double precision integer instruction and another one for a double precision floating point add instruction, etc. This exits on a phase one and this corresponds to the time that the data leaves the Vector Files. You may look at it as separate lines, one for each control path. The first register in the data path is a data path single precision pipeline selector register through which data enters. The pipeline control path stage will send a bit over to select the desired path for this register. That bit may be staged along and used again the next time that we have selector register. Conversely, it may be dropped and never be used again. These other bits will continue to be staged along side the pipeline and used to control, for example, the shift matrix. If not, it may just drop and the rest of these bits will be staged and this will continue. In conclusion it starts out when the data from the Vector Files enters the AP pipe and it continues to be staged right alongside the pipeline until it eventually is no longer needed or dropped.

For purposes of clarification, perhaps a brief review of Vector File addressing is in order.

As previously noted there are two copies of the Vector Files. One is called the primary and one is the secondary. The first operation, Op 1 is read from the primary copy of the Vector Files, Op 2 is read from the secondary copy, while Op 3 is written into both the primary and the secondary copies. Each copy of the Vector Files is made up of eight RAMs as previously shown and one RAM is one copy of the Vector File. Each RAM consists of four shadow areas 0–8 of 64 words, and each shadow area 0 is an architectural Vector File accessible to the programmer. Shadow area 1 is reserved for the Multiply Pipe which is used for a scratch pad area and areas 2 and 3 are reserved for the Add Pipe of the ALU, for use as a scratch pad area. Now each of these shadow areas contains one storage block for each of the 16 Vector Files and shown are the 16 files of the single block. When we want to address the Vector Files we have to send over shadow area bits. In the case of an ALU pipe this would either be addressing shadow areas 0, 2 or 3. First, we have to send over a file number. Now, the ALU pipe does not know the file numbers that are being dealt wit, since Vector Control keeps track of those, but the ALU pipe does send a pass number and this pass number corresponds to one of the blocks. If we are reading pass 0, the first RAM would give us elements 0 and 1, if we were reading pass 1 the first RAM would give us elements 16 and 17, pass 2 would give us elements 32, and 33 and on pass 3 elements 48 and 49 would be given. The vector address enters the Vector Files and, as noted, if we were reading pass 0 first, we would read element 0 and 1 in the first RAM. The pass 0 information would be staged to the second RAM at which time we would read elements 2 and 3. From there, the pass number would be staged to the next RAM, and we would pick up elements 4 and 5 and so forth. Before we can address the Vector Files, i.e. before the ALU pipe can actually begin execution of its instruction a time slot must be reserved and the time slot is in station 0. Since the information contained in this register is one, whether we are reading or writing from the Vector Files, since bit 0 is set if we are writing to the Vector File. Bits 1, 2, and 3 are pipe decode signals. They indicate which pipe is reading or writing from the Vector File. Bit 4 is a reserve bit which says whether or not this time slot is actually reserved and bit 5 is an auto release bit. So once the time slot is reserved, and it is in station 0, this address comes down to the Vector File address select register. If it says to the ALU pipe that it wants to do a read operation at this read address, then the ALU pipe will be selected and sent up with the Vector File RAMs. If we are reading an entire vector we start by reading pass 0 which would give us elements 0, 1, 2, 3, 4, 5, 6, 7, this sequence continues for 8 clock cycles. In the mean time, our time slot has been going around this circular sequence as previously described. By the time we have finished reading elements 14 and 15, our time slot is completed. The Vector File address select register will again look at the AP read address register and if it is desired to continue reading that Vector File, we will have changed our pass number to 1. The reading on pass 1 will address elements 16, 17, and 18, 19 and so forth. This continues until we have read the entire vector.

At the end of every instruction, the Add Pipe address registers are cleared. This is because most instructions begin by reading and writing on pass 0 of the shadow area 0. If the address registers have already been cleared we can begin addressing the Vector Files as soon as the time slot has been reserved. So we receive a time slot reserve signal on phase 1 at the same time that the time slot itself is in station 0. Actually we do not go active until phase 3. Following that, it is seen that at the same time we are going active, an address is being read into these registers. This is satisfactory for most instructions because, as noted, we have cleared the address registers and we normally start reading from and writing in to shadow area on pass 0. The read slot is in station 0 and the time slot reserve signal is sent to the AP. Instructions with a phase 3 time slot pattern need an extra cycle up front to do special addressing. For example, when we read from the shadow area, the read slot is actually in station 1 when the time slot reserve signal is sent to the ALU pipeline. This gives us an extra cycle to set up the ALU pipeline real address register.

Next, we want to look at the t designators and the registers for this section of the logic. If we look at it as an instruction start up time phase 1, we have an acknowledge designator which tells Vector Control that we have received the instruction data. This means that we have received the extended sequence bit. This bit is a parameter that overrides the element counter less or equal to 2 which indicates that we are close to the end of an instruction. After we receive an extended sequence designator, we receive an element count. If it is an element count for a double precision instruction, we multiply it by 2 so what we are actually looking at is a word count rather than an element count coming out of the ELK register. Simultaneously, we load a micro code entry address into the operation sequencing microcode RAM.

Referring to FIG. 229, the element counter register (ELCTR) is loaded at phase 2 and that data is obtained from the ELK register it is just a word count. This register holds the remaining word count for the rest of the instruction and it decrements by 2 every clock cycle that we are active. Once the element counter is less or equal to 2 the extended sequence designator is no longer set, we are at the end of our instruction.

Once the active designator register indicates that the pipe is busy the eights counter register is loaded at phase 3. It is initially loaded with a multiple of 8. If its word count is from 1 to 16, it is loaded with a value of 8. If the element count was 17 to 32 it is loaded with a value of 16 and so forth. This is sychronized to the time slot and it keeps track of our location during multiple pass instructions. It also helps us determine when to release these time slots. At phase 4, the microcode data register shown in FIG. 230 will output its data. This register is used if the pipeline is active or is experiencing a conflict. The address register shown in FIG. 230 was previously loaded with the entry address at phase 1 time, and the microcode RAM and the data register which outputs its data on a phase 4 are also shown. FIG. also shows the conflict designator which indicates the presence of a Vector File conflict.

FIG. 231 shows a timing diagram of this sequence. We receive an instruction on phase 3 and the pipeline is currently operating on another instruction. This instruction is acknowledged, and at the same time, a signal is received which tells us that the time slot has been reserved for us. This concurrence allows the pipeline to go active. At the time of the acknowledgement, the entry address is loaded into the microcode address register, and on the following phase 3, the pipeline is activated. The microcode data registers are enabled and we start reading data out of the microcode register. At the time of acknowledgement, the ELK register was lowered and on following phase 2 that data is sent into the ELCTR register. This register begins decrementing by 2 every clock cycle until element counter is less or equal to 2 at which time we can start another instruction. At the time, the ELCTR register was loaded, the value coming out of the ELK register was between 1 and 16 so its counter register was loaded with a value of 8 and that is decremented by 1 every clock cycle. The next line shows when the first address was fed into the Vector File address register and the one below shows when the first address is fed into the Vector File address register. Below that is shown the first output data being sent from the Vector Files to the AP. It leaves the Vector Files on phase 1, the ALU pipe reads it on a following phase 4 and the first result exits the ALU pipeline, at cycle 11, phase 3 for the first instruction. The ELCTR register is now less than or equal to 2. This means that on the following phase 1 the instruction has been received and we can send an acknowledge signal. Thereafter everything just follows along as it did for the first instruction.

FIG. 232, is a block diagram of the data control RAM. The entry address is always the same as the entry address for the operand sequencing microcodes. From that point on, once we have received the entry address we can choose to read either the current operand sequencing microcode address or we can use a jump address as determined by the data control microcode RAM. If we are in a conflict situation or the pipe is inactive, the select address designator is disabled and we have a signal coming out of this address select designator at phase 1. We are just starting the first cycle of our instruction, we have sent an acknowledge signal and received a time slot reservation. This goes active for one cycle which forces a signal out of this register and causes us to read the address that was used for operand sequencing the microcode. The microcode address operand sequencing microcode is then sent to the stage register. If we are beginning an instruction we would be choosing a 1 therein because we have sent an acknowledge signal and a time slot has been reserved. You are selecting path 0 of the address register because the instruction start designator is set for that DC select designator clear. That would, in turn, be fed into the data control RAM. Subsequently the data control RAM determines which address has been selected. If we select either the jump address contained in the data control RAM, or if we want to keep following along, the address is then fed into the operand and control RAM.

FIG. 233 and FIG. 234 are two timing diagrams which show when these element registers count. FIG. 233 shows a single precision add with an element count of 8. We receive our instruction on a phase 3, the time slot is then reserved for us on a following phase 1 so we can acknowledge it. Next, the ELK register is loaded on phase 1, the ELCTR register is decrementing on the following phase 2, the eights counter register is loaded and on cycle 2, phase 3 it starts decrementing by one. At the time that we acknowledge, since the read op counter was previously cleared it retains the value of 0. The same holds true for the read/write register in the op 3 write counter and on the next cycle they begin incrementing by 1 each cycle. Once we have reached the end of the instruction, i.e. the element is less or equal to 2, these three registers are all cleared, but before the Op 3 late counter gets cleared, the value that was in it gets transferred to the Op 5 late counter which begins incrementing 9 cycles after the read/write counters. The read/write counter is always delayed by 9 clock cycles because there is a 9 cycle latentcy through the ALU pipeline. This indicates when we are writing into the file.

FIG. 234 is a timing diagram which shows a single precision to a double precision type conversion. It also receives an instruction on phase 3 of clock cycle 1. In this case, however, for single precision to double precision type conversions, passes are made through a Vector File so we want to reserve a certain portion of that Vector File so that we can do our second pass. The read op counters start counting right away but the read/write counter does not. It does not start counting until we are finished reading that element. Once we read element 0 twice, once for the first pass and once for the second pass then we can release it but not until then. There is an odd thing that happens with this read op counter. During this instruction, it keeps counting past the value it really needs for the first pass. This assumes that we have an element count that is not a multiple of 8 because we can not start the second pass of this instruction until the time slot comes around to the rachet again to start reading at pass 0. So we are always waiting for a multiple of 8 cycles before we start the second pass of this two pass instruction. We have read elements 0 and 1 and elements 2 and 3 and then we wait until our time slot comes up again. We wait for 8 cycles and during this entire time period the read op counter keeps counting even through it really should not. It will keep counting until we start the second pass at which time the read/write counter will start counting. This occurs so long as we are done reading element 0 and 1, and we are done reading elements 2 and 3. Then both the read op counter and the read/write counter are set to be invalid and we are finished reading from the Vector File. Op 3 and Op 5 late counters have been disabled all along because we were writing into the shadow area and we cannot conflict with any one as long as we are writing into shadow areas.

Now once we finish reading from the Vector Files, we notify the Move Pipes that it can start its part of the instruction. It is necessary to wait until the final result is written into the Vector File, since once that has been done, the AP pipe can then send a signal to the Move Pipe that says we are done with that part of the instruction. We also send an element count to the Move Pipe. It will be a minimum of 2 cycles before the Move Pipe sends a signal to the ALU pipe that tells that it is ready to start doing its part of the instruction. It is a minimum of 2 cycles but it could be many more cycles if, for example, the Move Pipe were busy with another instruction. We must wait until they can start this part of the instruction, and once that acknowledge from the Movel Pipe clears our extended sequence designator that allows the ALU pipe to be able to start another instruction. Consequently we stay active this entire time until the Move Pipe acknowledges and then we will either go inactive or start a new instruction.

Consider FIG. 235 which is a pictorial representation of how the eights counter synchronizes the Add Pipe to its time slot. On the left of FIG. 235 are the various element counter values. If the element count in the eight counter is equal to a multiple of 8 then the time slot is from station 0. If it is less than or equal to 6, then we are reading our first two elements. The third two elements are read at the next count and since that concludes the reading we can release the time slot when it gets to station 4 as is shown in the FIG. 235.

This is where the slot is always released whether it is a read or write operation. If a conflict had occurred during this instruction, i.e. during the reading of any of these 6 elements, the pipeline that is holding the release slot signal would have been disabled and the release slot signal would have been delayed by a multiple of 8 clock cycles. Further if it were an 8 cycle conflict, then we would loop around the rachet again picking up the last set of data and releasing the slot.

If there was an element count of 16 at the time that our time slot was in station 0, this would mean that we could read all 16 elements in this one path, and we would not have to start another path. The last two elements would be read when the time slot was in station 1. This means that if no conflicts were possible we could release the time slot in station 4 even though we are still reading from the Vector File because it would not be needed again. However, if conflicts were possible we cannot release at station 4 because if the conflict occurred while the time slot was in any one of these stations we must go around the rachet again to pick up the last sets of data. However, we could not do this if we had already released the time slot. That is why we have the three cases of (1) releasing the slot for an element count less than or equal to 6; (2) for an element count less than or equal to 16 with conflicts; (3) an element count less than or equal to 16 without conflicts. These are the three different cases that will be considered.

FIG. 236 shows the fault report logic. There are four kinds of faults that can occur. They are (1) integer overflow, (2) characteristic overflow, (3) single precision characteristic underflow, and (4) double precision characteristic underflow. These are listed down at the bottom in the DP fault and SP fault registers. When a fault occurs, the AP pipe must report it to the SPCB. It will indicate the kind of fault which has occurred and the element number of the source elements that were processed because of the faults. So, for example, if we were adding the element 7 of vector 1 to element 7 of vector 2 and got integer overflow, the element pointer sent to the SPCB would have the value of 7 and the bit 0. The signal at the top of FIG. 236 is called the APCB interrupt indicator designator. Bit 0 of that designator would be set because bit 0, of course, corresponds to integer overflow, bit 1 corresponds to characteristic overflow, bit 2 corresponds to double precision characteristic underflow and finally bit 3 corresponds to single precision characteristic underflow. In the lower left hand corner of FIG. 236 we have the ELP counter register which generates the element pointer. To the right of it we have a mask fault write register and its block faults in the Vector File writes for elements in a vector that are not to be processed. These bits come from the mask register. One thing that should be mentioned about the mask operation is that the mask register is told when to start a new mask. This always occurs at the end of an instruction and it is based on a fact that the element counter is less than or equal to 2 and is not an extended sequence, so we are done with our instruction starting of the mask.

When we actually start the next instruction we begin to sequence that mask and that is the bit that is seen in the microcode sequence mask. This bit is set whenever it is desired to sequence the mask every time we read two more elements into the ALU pipeline. There is also a bit called the reset mask and operand sequencing microcode and that is used only for single precision to double precision conversions. When we start the second path of the conversion we have to reset the mask to mask out any odd elements that may occur as we are going through. The fault enable register performs the same function. It blocks faults and Vector File write operations but it does this during conflicts when the pupe is inactive and these bits come from the operand sequencing microcode. The DP fault register is masked with the faults reported by the double precision pipes and the SP fault register contains faults reported by the single precision pipe.

A register called an ignore interrupt designator receives inputs from SPCB and it tells the ALU pipe whether or not to ignore a fault. If the computation causes the fault condition, and the fault is not to be ignored, the fault is reported, however, the corresponding result is not written into the Vector File. Now faults occurring during the rest of the instruction are reported and the SP pipe stops writing to the Vector Files for the rest of the instruction. Even if the fault is to be ignored, it is still reported, and we write a substitute value into th Vector Files. For example, in the case of integer overflow, we would write the right most 36 of 72 bits of the results into the Vector File. However, in the case of characteristic overflow or underflow we just write O's into the Vector Files for that element. We continue reporting faults and writing into the Vector Files for the rest of the instruction or until a fault occurs that is not to be ignored.

The AP pipe does not report a fault until the end of the instruction when doing a reduction operation and when it does, the element pointer is not valid. The first fault occurring during the reduction operation is stored in the rank 2 (RK2) write register and exits at the very end of the instruction. In the mean time, the APCB register 1635 provides the original element count and 0's for the interrupt indicators. For our SP to DP conversion, the contents of the rank 2 left register are saved on the first path and used on the second path. The contents of the rank 2 right register is used in a reverse manner. It is used for storing the information corresponding to the first fault that occurs while processing the odd elements. At the end of the instruction, we compare the two element pointers and send the smaller of the two to the SPCB, since we want to know when the first fault occurs.

Next, consider the timing diagram of FIG. 237 which shows the interface signals between the AP and SC for this broadcast instruction. If the ALU pipe receives an instruction that calls for broadcasting the scalar information, the ALU pipelines must take a value from the scalar G registers and use it to create what looks like a vector having identical values. Those values are read into a Vector File AP augend register. At the beginning of the instruction, the AP pipe disables the clock on that register until we are done with the instruction. This causes the constant value to be held in the VF AP data register for the entire instruction. In the FIG. 237, assume that we are sending a signal called the AP SC allow G op load. This tells the SP section that we are finished with the previous instruction, the element count is less than or equal to 2, we are not in an extended sequence and we can start a G op instruction. If we receive an instruction and acknowledge it and it calls for a broadcast scalar, the SC AP G op clock enable set signal will go high. This indicates that we are starting at a G op instruction so that the AP pipe disables the clock. The output of the register is also the output of the Vector Files so that whatever value that was in that register remains there. Once it is no longer needed, i.e., once we are at the end of the instruction, then that signal will be cleared and the clock will then be enabled for the next instruction. In the present case, an add instruction is presented with an element count of 2. This takes two cycles, so the data was read in on phase 1, cycle 4. On the following phase 3, the clock is disabled on the Vector File AP data register which means that the data was held for one more cycle and then the clock is enabled again and we can start feeding the data again for the next instruction.

Finally, in this section we will discuss reduction. Some reduction architecture requires that the adjacent elements be combined pair wise and that adjacent partial sums be similarly combined, until a single result emerges. Thus, we add all of the elements of the vectors together to produce one final result. This requires multiple passes through the Vector Files. Each pass is 16 cycles long, but the number of passes is dependent on the element count. FIG. 238 illustrates a double precision reduction for input data patterns. It shows the various passes that we have to go through. On the first pass elements 0 through 7 and elements 16 through 23 are read in the primary Vector File. At the same time, elements 8 through 15 and 24 through 31 are read in the secondary Vector Files. Also, on the first pass, we are reading from shadow area 0 but we write to shadow area 2, however, on the following passes, we read from shadow area 2 and write to shadow area 2.

To further clarify this operation, consider that on the first cycle we are reading element 0 from the primary Vector File and element 8 from the secondary Vector File. On the next cycle we read element 1 from the primary Vector File and element 9 from the secondary Vector File. Consider the staging registers shown in FIG. 239 which show how we order this data. Once we have read elements 1 and 9 we can send elements 0 and 1 to the pipeline to be added. On the following cycle we can send elements 8 and 9 to be added. The same thing happens all of the way through this pass, we read elements 2 and 10 followed by elements 3 and 11, at which time we can send out elements 2 and 3 to the pipeline to be added. On the following cycle, elements 10 and 11 are added and you end up with a pattern that looks like this in the Vector Files, 0,1, 8,9, 2,3, 10,11 and so forth. When we go to read pass 2 where we read the sum of elements 0 and 1, next the sum of elements 8 and 9, nets the sum of elements 2 and 3, so now we can add the sum of elements 0 and 1 to the sum of 2 and and write the sum of 0 and 1 and 2 and 3 into the Vector Files during the third pass. This is better shown in FIG. 238.

FIG. 239 shows how the data read from the Vector File on the first pass is reordered using the special Vector File output registers shown to the left of the figure. The data is read from the Vector File RAM into phase 4 registers. For most instructions, it passes directly to a phase 1 register and from there to the ALU pipeline. However, for reductions there are intermediate registers that are needed to reorder data that we will be reading from the Vector Files. On the first cycle we read elements 0 and 8 from the primary and secondary files. On the next cycle we read elements 1 and 9, and elements 0 and 8 are staged. On the next cycle, element 1 is fed into the addend register and element 0 is fed into the augend register and this data is sent to the ALU pipeline. Element 8 has switched over to a staging register, and element 9 has been read into the right staging register so that on the next cycle elements 8 and 9 can be sent to the ALU pipeline to be added. Just follow this same routine through the rest of the pass. This is why, for reduction operations, the time slot pattern is a space, or actually a space read space write, there is an extra cycle of latentcy in the pipeline for reduction operations because of this extra staging in the element.

The max/min reductions are much like the sum reductions except that instead of adding two words during a clock cycle, we are comparing two words. We write either the max or the min value back into the Vector File shadow area for use in subsequent passes rather than partial sums. For maximum reductions we also have to keep track of the indices of the values being written back to shadow areas. The index of the maximum values is the final result. We do not want the value itself, rather we want the index of that value. The indices are generated on the first pass. The relevant portion of the logic diagram to accomplish this is shown in FIG. 240. FIG. 241 illustrates a SP and a DP max/min Reduction table and should be considered at the same time as FIG. 240.

On the very first cycle, we will be comparing element 0 and 1, so the Augend register 1638 has the value of 0, and the addend register 1639 also has a value of 0. Thus we have value of 0 exiting the sum register 1637. This is coupled into the DP index register 1636 when we select address two. If we are doing a maximum value instruction, and element 1 was bigger than element 0 we insert a 1 in the least significient bit of the data exiting the sum register 1637. So a 1 is sent from the DP register. For double precision instructions they are always alternating between selecting address 2 and selecting address 3 and this index select designator comes from the ALU pipeline. It is a bit that is set when a maximum reduction is being done. The larger element number is the maximum value that is set if we are doing a minimum value reduction.

On the next cycle, we are reading elements 8 and 9 from the vector, we have read value elements 8 and 9, augend register 1638 remains at value of 0, the addend register 1639 remains at the value of 0 so also is the value of the sum register. However, now we are selecting address 3, so a $2^3$ bit is set here which gives us the base value of 8 which will become the value of 9 if this index select designator 1640 is set. Thus, we can generate the number, either 8 or 9 depending on which one that we want to save.

FIG. 241 illustrates the cycle by cycle value that each of these registers must be to generate indices which correspond to the data that is being operated on. So when we are doing reduction operations the first elements that we add together is 0 and 1. The second pair of elements that we are operating on are 8 and 9 and 2 and 3, 10 and 11, 4 and 5, 12 and 13, and so forth down the line.

c. Multiply Pipe (MP)

The Multiply pipeline (MP) is basically divided into two major areas. First, is the data path which is where the multiply operations are done and second is the sequence control which is where most of the control is generated for the pipeline. In addition to a description of these two areas, we will also discuss other operations performed by this pipeline, namely, division and product reduction.

Initially, let us discuss how the multiply pipeline fits into the Vector Module and also a basic description of a vector.

To begin, FIG. 242 is a simplified block diagram of the Vector Processor Module showing three major sections. These sections are the Vector Control (VC) section 1100, the Vector File (VF) section 1300 and the Multiply Pipe (MP) section 1700. Each of these three logic sections act as independent processors.

In the block diagram of FIG. 242, there is shown a sequence of events. They indicate how we start up an instruction and how we get it to the Multiply Pipe. This sequence of events, first of all, starts with the reception of an issue signal 1103 from the Scalar Processor Module previously discussed. This issue signal enters the Vector Control section 1100 which sends an instruction receive signal 1150 to the sequence control portion 1730 of the multiply pipe 1700. It also sends signals to the time slot logic 1106 to start reserving time slots for the multiply pipe operation which is about to start. The Multiply Pipe 1700 responds by sending an acknowledge signal 1725 back to the Vector Control section. It, in turn, sends an acknowledge signal 1125 back to the Scalar Module. Concurrently, the sequence control 1730 is reserving its time slot and it can start the Multiply Pipe operation. The data path shown in this figure are all two words (72 bits) wide, not including parity. Further, there are two copies of the Vector File, a primary 1302 and an identical secondary copy 1304. They both provide two different operands for multiply or add type operations, which operands are combined in one answer and sent back and written into both copies.

Starting in the upper left hand corner FIG. 243 and across the top are shown a sequence of events as the data path is controlled by the sequence controller. There are illustrated different frames over different periods of time and we are showing these operations over time. In each frame of the top row there is shown the two major portions previously identified from the Multiply Pipe, the sequence controller 1730 or sequencer and the data path 1750. The data path 1750 is itself a pipeline. Basically, data enters, flows through the data path 1750 to produce the computed results. The sequencer 1730 also includes a feedback path upon itself. It defines what state the entire pipeline is in when the operation is being done, that does all the handshaking with the Vector Control section and the data path is the part that is coupled into the file section and it receives data and sends the data results back to Vector Files.

This first frame of FIG. 243 represents an instruction receive signal coming from the Vector Control section to the Multiply Pipe section. It indicates that it is sending a multiply instruction to start. Both the sequencer 1730 and the data path 1750 are blank at the moment because they are idle. Sometime later, the Multiply Pipeline has started the multiply instruction that it has received and has acknowledged the receipt. The sequencer is activated and data has started streaming into the pipeline so that the pipeline is starting to fill. It has not produced any results as yet so no writing is being done. In fact, anything that is in this blank area at this time is invalid. Pretty soon the pipeline is filled and new inputs are streaming in while old results are streaming out. Finally, a new instruction comes along or the present instruction ends. In the present example, a new instruction arrives immediately behind the multiply instruction, so while the pipeline and the control are still doing the multiply operation, a divide instruction enters. The sequencer 1730 knows that it has finished with the multiply instruction and it will accept and start that divide instruction. At this point the pipeline starts to fill with operands for divide and the process repeats itself. Eventually, the instruction will end, and the sequencer 1730 will turn off and the pipeline will empty out. A similar sort of thing occurs when there is a Vector File conflict. The bottom portion of FIG. 243 illustrates this. Basically, a conflict occurs when you have two different pipelines competing for the same Vector File data. The conflict is resolved by holding one pipeline and allowing the other to finish. In the present example, a Multiply Pipe operation is in progress when a conflict signal C is received by the sequencer 1730. This conflict signal is the signal received from the Vector Control section and it essentially tells the Multiply Pipeline either to halt or not, but in any event to treat any data that it receives from the Vector Files as invalid. Meanwhile, the Multiply Pipeline continues flushing out valid results and filling itself with the invalid data. In the next frame, as soon as this invalid data arrives at the end, it will turn off the write control to prevent any writing of the invalid data. It waits out the conflict period in this mode. Eventually, the conflict signal and the multiply operation may resume. Any invalid data will flush out of the pipe prior to the resumption of the multiply operation.

Before going into a more detailed description of the Multiply Pipe, it is important that the nature of a vector be clear in the mind of the reader and for this reason, a brief review of a vector and its characteristic will now be made.

Basically a vector is a column of numbers. Computers in the past, worked with single numbers (scalar) at a time. In the present machine we are dealing with entire columns, however, as far as the programmer is concerned, when we multiply two vectors together, the entire thing happens instantaneously. For example, refer to FIG. 244 where there is illustrated a pair of four element vectors. We will call the vectors VO and Vl. When the programmer desires to multiply VO times Vl, so far as he is concerned all of those operations are happening simultaneously across those two vectors and the results are being stored into the result vector locations specified in the instruction. In reality it would require a prohibitive amount of hardware to do it in this way. What actually happens is the results are sequentially streamed out of the vectors. In the FIG. 244 the first two elements are simultaneously fed into the pipeline, the next pair follow the first pair and so forth. As soon as these results start coming out of the end of the pipeline they are written back into the result vector, so the operation really happens element by element, but it is pipelined so that we do get the performance improvement.

A single vector register is two words wide, each word being 36 bits long not including the parity bits.

The whole vector is 32 word pairs deep, and two of these 36 bit words can be accessed in each cycle. For each cycle, we can read out a pair of words, one from the primary and the other from the secondary copies of the Vector File. For double precision numbers we can read out the 72 bit operand from the primary copy and another 72 bit operand from the secondary copy. To perform the operation on them and store the results back into the result file requires 32 cycles to go through the entire file. This entire file is also called a strip. For single precision numbers, we can read out two pairs of operands per cycle, so we double the throughput capacity.

There are three types of instructions that the multiply pipeline is responsible for doing. First and foremost, of course, is multiply. Secondly is the divide instruction and finally is the product reduction type instruction.

Next, there are four data types that the multiply pipeline is required to operate upon. They are (1) single precision integer, (2) double precision integer, (3) floating point numbers, i.e. single precision floating point. This is a floating point number representing 36 bits, and (4) double precision floating point, which is a 72 bit number. The performance characteristics for the present machine, using these four data types, are as follows. A multiply operation for a single or double precision integer is 66⅔ megaflops (million floating point operations per second). This is the result of having a 30 nanosecond clock and doing two operations per clock cycle. For single precision floating point operations we have the same number since we are doing two pairs of operations per clock cycle. For a double precision floating point multiply operation this is one half of 66⅔ or 33⅓ megaflops since we can only do one operation per clock cycle with our 30 nanosecond clock. For a divide operation it takes quite a bit longer because we have to do multiple passes through the strips of the operands and also through the intermediate results. A divide single precision integer operation is accomplished at a rate just over six megaflops because it requires a total of 11 passes, each of which maybe as much as 32 cycles long. There is no corresponding single precision integer for divide, however, a single precision floating point is somewhat faster since we have only 8 passes rather than 11 passes, however, each of those may still be as much as 32 cycles long. For double precision floating point divide, the performance is a little over three megaflops since that requires ten passes, each of which is 32 cycles long and only one operation per clock cycle may be done.

The third instruction is product reduction and the performance for that is not as straight forward since the duration of that instruction may vary depending on the element count.

The element count is the number that the programmer specifies and he can specify a whole strip of data which is an entire vector. He may also specify two entire vectors to be multiplied or operated upon, or he can indicate any portion of the vector starting at the beginning. He may denote only the first element of all 64 elements. For product reduction the element count can vary from one to 64 and therefore the total timing for the instruction will vary accordingly. The instruction runs as long as specified in the element count.

Next, consider the Multiply Pipe data types as illustrated in FIG. 245. The basic type is the single integer data type shown as third from the top. It is a 36 bit number and the bits are numbered zero through 35. This is the standard ones complement integer data type with the one sign bit and 35 bits of significant data. The single floating point operation data type is shown immediately above the basic single integer data type and again is 36 bits long. There is a 27 bit fraction, 8 bits of characteristic and a 1 bit sign. The double precision floating point data type at the top is the same only it has 72 bits. It has a 60 bit fraction and an 11 bit characteristic with a 1 sign bit. The fourth type of indicator shown at the bottom is a single integer fractional. It is used only for single integer divide operations because of the requirement of having normalized numbers during the course of the divide operation. It looks much like the ones complement integer but the implied binary point is at the beginning, right after the sign, instead of at the very end of the number as with the integer. Therefore, this is actually a fraction, somewhere between one-half and one.

The next figures illustrate the parallelogram which will be used throughout this description. Anyone aware of the multiplication operation is familiar with the parallelogram as illustrated in the following figures.

FIG. 246 illustrates the integer multiply operation using a 36 bit multiplier and a 36 bit multiplicand. In effect, as shown in the figure, the multiplier is considered to be applied at the side of the parallelogram.

FIG. 247 shows the same type parallelogram but bringing down the 9 bit characteristic and sign position to the product.

FIG. 248 again shows the parallelogram bit for a double precision floating point (DP FP) multiplication operation.

FIG. 249 is a corresponding pictorial diagram for a single integer fractional multiply operation.

FIG. 250 includes FIGS. 250A and 250B and illustrates the data path logical block diagram. Before we attempt a detailed explanation, we might just identify, in general, a coupled of areas. Remember that we previously discussed two single precision operations in parallel or one double precision operation. If we look at the diagram it generally appears as two separate pipelines.

The individual pipelines, do, in fact, operate as independent pipelines for single precision numbers. They are completely independent of each other, however, for double precision numbers there is an extra adder at the end to add those two pieces together and give us the double precision result. Now for a more detailed description. First, some of the very key registers are identified. These are the multiplicand in (MPCD IN) registers 1702*a* and 1702*b* and the multiplier in (MULTR IN) registers 1704*a* and 1704*b*. So the reason that each register is split up is because of the selectors 1701 and 703 in the middle portion. They have to exchange those two words for reduction operations. The next rank of registers beyond that are called the multiplicand characteristic and mantissa registers 1709 and the multiplier characteristic and mantissa registers 1710. The characteristic information is stripped off here and sent off to the characteristic pipeline register 1712 which is on the very far left hand side of the figure and they are fed into an ADD/SUB means 1711. To remain with the fraction or the significant information, the data information is latched up directly from the input registers. They are also 72 bits each and in the case of the multiplicand it is right justified, whereas in the case of the multiplier, it is left justified. To right justify the multiplicand is very simple, since the numbered formats are already right justified. For the multiplier we have to left justify these things and put the binary point in the same position for all of the different types to give us four different selector inputs. Now that we have these multiplicand and multipliers justified correctly, we can feed them on to the multiplier arrays. There is one more rank of registers that we have to go through first. These being the multiplicand upper 1713 and lower 1714 registers and they are so labeled. Each of these are 60 bits long because each of the multiplier arrays is 60 bits wide. Also expect 60 bits in the multiplicand, since this is right justified. In the case of single precision numbers we zero fill on the left and for double precision, we use the entire 60 bits. The multiplier upper 1715 and lower 1716 registers are each 36 bits long. They feed a portion to each of the three arrays, since they are only 36 bits deep. These are the numbers that come into the side of the arrays. A pair of reciprocal memory blocks 1717, 1718 are shown in one pipeline. They are used only for certain passes in the divide operation. So instead of selecting information from the Vector File as the multiplier we can select an input from this memory which is an approximate reciprocal. Also shown are shift registers 1719, 1720 which are used for integer divide operations. They are necessary because integers must be placed in a normalized fractional form for the division operation to work. The 60 bit multiplicand register which gates three of those arrays is a 36 by 60 bit array made up of three smaller subarrays and a 36 bit multiplier. This is the information that enters from the side and runs across. These multiplicands 1723, 1724 select either the number directly from the multiplicand registers 1713, 1714 or from the shift registers 1719, 1720 for integer division. Above those three multiplication arrays are a pair of accumulators 1721, 1722. Each of those multiplication arrays produces a 72 bit product and we have three of them that have to be additively reduced into one.

The accumulators 1721, 1722 actually have four inputs. First, are the constants that are fed in for special operations that are required to support the division. Assume for the moment that it is zero and it is for multiplication. The accumulators 1721, 1722 reduce the partial products from the multiply arrays for each half of one number and depending on the format a product register is selected. These are 96 bits wide. Four are used for single precision or integer operations. We right justify the fraction that enters from the product registers 1725, 1726. For double precision, it is passed directly on since another stage or addition is needed. For double precision the extra adder 1727 is used, however, for single precision it is not required. The product selector 1728, 1729 determine whether we are doing single or double precision floating point. These last registers 1731, 1732 are at the output of the pipeline and are 36 bits wide. They select whether we are normalizing or not normalizing and the characteristic is attached at this point.

In summary, the multiplier enters where it is combined with the multiplicand to produce one result. Remember that it was stated earlier that two words of a multiplicand enter as do two words of a multiplier. For single precision operations, they are combined and the net result is a 72 bit product, with word zero of the upper portions operating independently from word one of the lower portion. For double precision, the paths are slightly different, since they require the extra adder at the end of the operation to form the final product.

Next consider the characteristic pipeline of the data path. There are two major pieces of this characteristic pipeline. Basically, these are two adders. One at the beginning of the pipeline and one at the end and they are operated in unison.

Perhaps, a brief review of what a characteristic is will help the following description. A characteristic is basically an exponent which is associated with a number.

It is generally considered in scientific notation that an exponent and a characteristic are the same thing. It is a way of scaling a number, and the fraction is actually the significant part of the number. Characteristics or exponents are always added when we multiply. So the characteristic pipe is basically an adder with a number of staging registers. Previously, the point was made that floating point numbers are made up to two different segments. There is a fraction or a mantissa and these terms are used for the fractional part of the number. Secondly there is a characteristic or exponent part which is the scaling factor. When you multiply two floating point numbers together you multiply the fractions and add the characteristic or exponents. What has just been described is the portion of the pipeline which covers multiplication, now we will describe that part which performs the addition of these characteristics. The characteristic pipeline is simply two pipelines in one, just as the rest of the data path section. Nine bit adder circuit chips and registers are used throughout.

Returning to FIGS. 250A and 250B there are four main parts that are apparent on the data path diagram. First, there is the part called the first adder 1171. In actuality these are two nine bit adders side by side. For a multiply operation, the characteristic is stripped from the multiplicand and the characteristic is also stripped from the multiplier and they are added together. Next, they are sent through a number of characteristic staging registers 1712 etc. These registers are the second major part of the pipeline. There are a number of these registers, since we have roughly 7 cycles worth of time to makeup. At the end of the registers is the third part called the second adder 1733 and it serves the purpose of forming the characteristic which may be needed if you normalize at the end of the pipeline. The normalization operation is the fourth part and it consists of shifting the fraction one bit to the left so that the upper most bit is not zero. This requires an equivalent adjustment to the characteristic and that adjustment needs decrementing by one. So, this second adder 1733 may be thought of as a decrementing or subtracting adder. At the end we need both the answer from the original characteristic adder and the decrementer to go into separate registers 1734, 1735. One is called the characteristic register 1734 and the other the characteristic normalize register 1735. This allows us to select either of those characteristics at the end of the pipeline, depending on whether or not we have to normalize. So for the staging registers and the characteristic pipeline we have an unbiased result characteristics going through and only 8 bits are needed to represent that. Now this may go to the very end of the pipeline where the bias is added back on. This is accomplished by changing the most significant bit and that is the characteristic of the result, so long as there is no normalization. If there is going to be a normalization, the second adder is used. The effect of this is to decrement the characteristic by one, however, the bias is still done at the end of the pipe. This concludes the description of the operation characteristic pipeline. Remember that two of these operations may be going on in parallel for single precision floating point operations and one for double precision.

The divide operation is quite similar. However, the first adder 1711 this time is the subtract operation. Instead of doubling the bias, the bias drops out completely since we have really subtracted it from itself. This number is fed forward to the end of the pipeline or it may be adjusted for normalization. For divide however, instead of subtracting one we now add one and at the very end of the pipeline we add back in the bias. The number from the first adder 1711 is now smaller than the number from the second adder 1733. This implies that we use the number from the first adder 1711 for the normalization for the normalized case and we use the number from the second adder 1733 when we do not normalize. Meanwhile the fractions are being multiplied, as usual, so we still have to keep this relationship, however, the smaller number is not used to normalize. It is quite similar to the multiply operation except that we subtract the increment rather than add the decrement. It should be noted that the bias is just put back in at the end and that is also done by merely flipping the upper most bit and complementing it.

Consider next the characteristic faults that may occur. These form part of the arithmetic faults that are possible in the multiply pipeline. Physically there are two things that can happen when we multiply numbers together. We can have valid results at the end or we can have an overflow of the characteristic or an underflow. An overflow or underflow means that it is not representable in the present format. An example of this would be the multiplying of a number with a very large exponent or a large characteristic by another number also with a large characteristic. What will happen is that we will have a positive characteristic multiplied by positive characteristic to produce a negative one. Normally when we add two positive numbers together you would expect to get positive numbers, however, we got a negative one, so in this case we have an overflow. Likewise, when you are subtracting, if neither of the most significant bits are set and a most significant bit has not been previously set you have an underflow. From this discussion, it is readily realized that something that we must be very careful about with these two adders and the characteristic pipeline is that one may produce a fault (overflow/underflow) and the other may not.

Arithmetic faults produced by the multiply pipeline, in general, are those situations that arise when the multiply pipeline attempts to compute a number which is too large to fit into its representation or two small or in some other way invalid. Examples of this would be the integer overflow. You get this fault when you are doing the single precision integer multiply and your product is going to be more than 36 bits, actually more than 35 bits, not including the sign. This will signal the programmer that he has an overflow and one of the numbers in his result is invalid. The second type of arithmetic fault is division by zero. It is quite clear that when you divide by zero your answer is always undefined mathematically. In fact, the multiply pipeline produces a zero result and flags it.

Another related item to these arithmetic faults is the operation of the multiply pipeline when it encounters one. In summary, these faults produce an effect on the data that is written back into the Vector File and signals are sent back to the Scalar Processor, and to the Block Control. In addition to these arithmetic faults we have masked bits and we have mask ignore bits. These bits come from the control block (CB) section and from the Mask (MK) section and they are produced when the arithmetic faults are produced within the Multiply Pipe section. These three signals working together, define how the write control faults are reported, and also how the Scalar Processor, the element pointer and the error indicator signals are treated. The mask, for example, masks out any possible arithmetic faults and they turn off the write control for particular elements if there is a corresponding mask bit for it. The mask ignore signal on the other hand, causes the arithmetic fault to be ignored if it arises. The write controls are turned off, that is an element is not written, at anytime there is a mask bit and a nonignored arithmetic fault or any other previous error. The zero results are written into the Vector File anytime there is an arithmetic fault, but the write controls may be turned off if it is an unmasked fault. Of course, the different arithmetic faults themselves are reported only if there is no previous error, and only if they are not masked off by the mask bits.

To review a masked bit may come along and it may or may not cause an arithmetic fault. In fact, it will prevent any writing to the Vector File and will prevent any arithmetic faults from being reported or noticed. The arithmetic portion of the data path and its control will now be discussed with reference to FIG. 251. To review very quickly, the data path 1750 includes the multiply arrays, the adders and the characteristic pipeline etc. The sequencer 1730 is responsible for knowing what is going on in the pipeline at any time and receiving and acknowledging information from the outside world. A third portion which should be briefly mentioned is the data path control pipeline 1736. It has been previously mentioned how data streamed into and through the data path that a different operation may follow directly after another. It is readily realized that there are many control points in the data path that must be manipulated, and that is the purpose of the data path control 1736, which is also a pipeline. A number of key control bits are fed into the data path control and they move along beside the data that they are controlling. These control bits are used at the appropriate points to control different registers, and/or selectors in the data path. The sequencer 1730 is responsible for feeding the correct bits to this data path control pipeline at appropriate times. Normally, there are valid signals and they must be meaningful to the control points in this data path as the data moves along. These control bits are listed on the left side of FIG. 251. They include a pass type signal which tells us which pass we are operating on for a division operation. There is a new pass signal which is really a pulse at the beginning of each pass for the divide. There is a force write signal which is used force writing into the Vector File, regardless of masking or any other conditions. There is a last pass signal which is higher than the entire last pass of division operation. This is required because there are some differences in the way the data is handled. In fact, it is the last pass of division operation and it looks like a multiply operation. Finally, of course, there is a parity signal.

To review, we have now discussed how the Multiply Pipeline fits into the Vector Processor Module and how the pipelines are like independent processors themselves. We briefly mentioned how the Vector Control of the Vector File section was organized and how it was connected to the pipeline. Next, the number of data types and the arithmetic operations were described along with some details about the multiply pipeline data path itself. We reviewed the key registers and the multiplier arrays and how they were connected within it. We also discussed their treatment for the different types of data and precision. Finally, the characteristic pipeline and its operations were described and how it contributed to the arithmetic fault logic. Here it was mentioned that there are arithmetic faults and how it was discussed how they affect the writing into the Vector File and the data path control. It was also noted how it was very similar to the other pipelines and how it operated in parallel with the rest of the data path as a very simple staging pipeline of control bits.

Next, we will discuss the sequence control portion of the Multiply Pipeline. We will start with sequence control portion and describe some of the key registers and designators, their purposes and their interconnections. FIG. 252 which includes 252A and 252B is a detailed block diagram of the sequence control portion of the logic. It contains the registers which hold the element counters that perform the handshaking with the Vector Control section. It also essentially holds most of the state registers of the Multiply Pipeline. The diagram is drawn such that registers and designators that are clocked at the same time are in the same horizontal line. First of all, we may start at the phase one time with the acknowledge designator 1737 on the right. This is a designator which informs the Vector Control section that we have received the instruction parameters and the necessary instruction information. At the same time, we also receive the extended sequence-in designator 1738 whose purpose is to signal that the instruction is going to have multiple passes. Thus, we disregard the contents of the element counter and continue with the sequence rather than ending the instruction. In effect, this is a flag which signals that the instruction is going to last longer than the element counter would indicate. Perhaps some of the signals entering the Sequence Controller 1730 should be described. First, is the VC MP ELCNT register signal entering ELK register 1739. This is the element count that is received by the Multiply Pipe. It is sent to the Vector Control section through the Vector Control word. This is where it is obtained in the Multiply Pipe. There is another one bit signal called the move t designator. It tells us whether to double or not depending on whether or not it is desired to convert the signal to a word count to be used in the sequencer. Continuing on with the phase one (01) line, there is a very important register on the left, entitled the microcode address register 1740. This register receives information at a phase 1 time which acknowledges that the received information is the entry address register information. This information is also received, via the Vector Control word, by the Vector Control section; where it is called the control store address. This contains the same information as the microcode entry address and that is where we start our sequence in microcode. Moving up to 02 time, which is the next row up, there is the element counter ELCTR register. This register is loaded with information, such as the load with a word count and as the instruction proceeds through it, it is decremented by two since we are processing two words at a time. As soon as this reaches two or less we are through with the instruction, provided that the extended sequence designator 1741 is clear. Recall that this is the register 1741 that tells us to disregard the ELCTR information and continue to sequence after which this is usually cleared from microcode so that the instruction can terminate normally. This register 1741 is used for all of the instructions for the multiply instruction. It is cleared initially, so that the element counter is loaded and then counts down to two or less which signals the end of the instruction. For divide or product reduction operations, we cannot always immediately end the instruction when this count is down to two, since there may be some sequence remaining. So for the divide and product reduction instructions, this designator is set until it is explicitly cleared by the sequencer to allow the instruction to terminate. However for multiply, which is a very simple single path instruction, the extend sequence designator 1741 is always initially cleared. Moving up to phase 3 (03) time, probably the most important designator in this line is the active designator 42. This active designator 1742 indicates that the sequencer is busy; that the multiply pipe is actually active and it is used to allow a new instruction to either be started or to be disregarded, if we are already busy. This is set only when the multiply pipe is active, otherwise it is always clear.

On that same line, there is a register called the eights counter register 1743. This is initially loaded with some multiple of eight. It is used to synchronize the multiply pipe sequencer to the time slot registers. It is also used the ensure that each of the individual passes of the multiple pass instruction is always a multiple of eight cycles. This is because of the eight cycle time slot register arrangement and the eight cycle ratchet arrangement of the Vector File. In order to do this, we have to synchronize the beginning of that arrangement and make sure to begin at the same place on each eight cycle pass through of the Vector File and the time slot registers. It is also used to release time slots because it is synchronized to the time slot management.

Moving up to phase four time perhaps the most important register in that horizontal line is the microcode data register 1744. Most of the control bits emanate from this register and are sent over to the data path control pipeline. They also control the registers and designators within the sequencer itself. For example, these bits clear out the extended sequence designator 1741 and they allow the element counter to count. There are a pair of data enable (DE) inputs on this register and they are very important. The left one, comes directly from the active designator 1742, and it indicates that whenever the multiply pipeline is not active the date enable is not active and zeros will be issued, so that no control information is allowed to be presented to the rest of the multiply pipeline. The right hand data enable (DE) signal comes from the conflict designator 1745. Basically, this is the signal that is received directly from the Vector Control section which says that there is a Vector File conflict in progress. We must also make sure that this microcode data register is zeroed out during the Vector File conflict so that the sequencer retains its state and does not advance. The conflict designator 1745 is also operative on phase 4. It is just a latched version of the entering Vector File conflict signal. This is used in the multiply pipeline to ensure the retention of the same state.

Before we leave FIG. 252, it might help to very briefly explain some of the loops. Returning to the microcode address register 1740 loop, the RAM 1746 is an address microcode RAM which is a 72 bit wide and 256 word deep memory. The information from that RAM 1746 is latched to the microcode data register and part of that information is a jump address which may be selected instead of going sequentially through this memory.

To do this, we select a jump address field directly from the microcode data and force it into the microcode address register 1740 to cause a jump to an arbitrary location. The other part of this information in this microcode RAM 1746 is a jump condition field which controls the selector which selects a condition bit. Whatever jump condition is latched into the microcode branch designator 1747 controls the selector on the microcode address register 1740 so that we may select the jump address field or the next address field.

In the lower loop the microcode address register 1740 is fed into an augend register 1748 and that, in turn, is incremented in the adder 1749. Actually, the branch designator only selects the jump field or one of two fields.

To start, refer first to FIG. 253 which illustrates the Vector File shadow area concept. This is very important to an understanding of the upcoming algorithms. First, it is important to note that three quarters of the physical Vector File RAM chips are unused. That is, they are neither accessible, nor are they architectural. This leaves three quarters of that physical RAM available for temporary variables and scratch operations. If the Vector File of FIG. 253 is divided into quarters, the first quarter is called the real area and is available to the programmer. It is here that the 16 vector registers of 64 words each reside. This is all that the programmer has access to and yet physically there are four times as much memory as that available in the Vector File section. It is this three quarters of the Vector File that is called the scratch area and it is referred to throughout this description as the shadow area. The first area is called real or architectural and this is programmer accessible. These last three areas are shadow and they are divided among the pipes as follows. The Multiply Pipe has the first shadow area as a full file of 16 vector registers, each with 64 words. The last two shadow areas are shared by the Add Pipe and the Move Pipe and one of their uses for these areas is in the conversion of instructions. This is where the Add Pipe may produce some converted results and the Move Pipe is responsible for moving them. It should be emphasized that the Multiply Pipeline has its own Vector File area and has sixteen 64 word registers to use as scratch area. It is here that the intermediate variables are sorted during the division algorithm.

The product reduction algorithm will be discussed next. According to the architecture, the product reduction must simplify operation. For example, assume that we have an eight element vector. The architecture requires that the product reduction be done in a pairwise operation. First of all, we should describe a product reduction. Product reduction is merely the multiplying of all of the elements of a vector together to form one number. Pairwise operation means that elements zero and one are multiplied together, two and three are multiplied together, four and five and so forth. In this case, we will go up to elements six and seven. These results would be stored in a temporary storage, which in this case, is in the Multiply Pipe shadow area of the Vector File shadow area. These pairwise operations continue until the net result is one number at the end. This pairwise operation is required by the architecture, it is not sufficient to go through and multiply zero times one, take that product, and multiply it be two, take that product and multiply it by three, that is not satisfactory and you must proceed in the pairwise operation with the Vector File addressing scheme as proposed.

First of all, it might help to describe the product reduction in a little more general terms. It is a multiple path instruction that takes more than 32 cycles to go through. Further, since we have many intermediate results to compute, this would imply that our extended sequence designator would be set. For example, if we started out with an element count of 2, this means that we are only going to multiply the first two together and that answer will go to a G register. We do not want to end the instruction immediately since we want to leave that extended sequence designator set. It also turns out that we can save ourselves some complexity in the sequencer by going through this entire strip no matter what the element counter indicates. Each pass through the Vector File is now 16 cycles since two different elements are read at the same time.

FIG. 254 shows the input data pattern for each pass through the algorithms. It illustrates the input data pattern which exists in the file. Thus, you can read across the file element zero and one, two and three, these are the 8 blocks of the Vector File which has been previously discussed. On the next row of the Vector File are the elements 8, 9, 10 and so forth on up to 31. For double precision these correspond directly to the element numbers while for single precision these correspond to element pairs. An advantage of numbering zero to 31 is that you are dealing with the same cycle of data. That is, you are reading out pairs of elements on one cycle, but this figure shows the original input data pattern for product reduction for any instruction and it resides in the Vector File. As product reduction proceeds this pattern changes quite radically. As we go through the first pass of product reduction we read out inputs out of the real area of the file or the programmer accessible area, which, as noted, was that first quarter of the physical RAM chips. Instead of reading 0, 1, 2 from the primary and secondary file we read different elements from the primary and then from the secondary. What actually happens is this. First we read the word zero from the primary and the word 8 from the secondary in the same cycle. On the next cycle, we read word one and nine, and then two and ten. These groups are being read from the real area of the file and they are being read from the primary and secondary respectively. They are now combined, as pairs, i.e. zero with one and eight with nine. The problem here is that zero and one are not read on the same cycle, so there must be some staging registers to take up the slack. FIG. 255 illustrates a block diagram of how these staging registers are interconnected. FIG. 254 pictorially shows the input data patterns for double precision reductions. We read the zero, eight and the one, nine and we combine them to reduce zero times one with the staging and exchange registers, shown in FIG. 255. Next, the eight times nine and the pattern proceeds along with this same action. This pattern repeats zero, one, two, three, four, five on every other bank of the Vector File. Likewise, the eight, nine, ten, eleven, twelve and thirteen pattern repeats and since we are actually combining two of the four rows, only one row remains. That row is not written in the next location but rather at the third location of the file. That is where the elements 16 and 24, 17, 25 information is read, combined and written back into the shadow area. After the first pass of product reduction, the data pattern is shown in FIG. 254. This entire pass took 16 cycles not 32, since we were reading two different locations from the file on each cycle rather than one location from the file.

The second horizontal group of blocks of FIG. 254 illustrates the second pass. From this point on, all information is read and written to the shadow area. Here again, we must take zero and one and combine them with two and three to satisfy the pair wise operation, likewise eight and nine, ten and eleven. This is very similar to the above pattern, except that we have an extra cycle or an extra Vector File slice in between. Because of this similarity we can use the same staging register arrangements using clock enables to hold the information that extra cycle. Note that we can use the same sequence as we had on the first pass by reading this first and second section. Next, we empty the section and then on the next half of the 16 cycle pass you can read the last half of the file. It turns out that it does not cost any extra time to go through this in two passes. Now we must combine zero, one and two with three and they are written into the second block of pass 3 location. A pattern is seen developing here. We read the first operand and wait until we read the second operand and the location where the answer is written is always in the slice back from the second operand. It is also apparent that the number of operands we are dealing with is decreasing by a factor of two with each pass through the product reduction sequence. This continues as the word pairs develop. First, zero, one, two, and three are combined with four through seven and we use that same previous staging register arrangement. When we read elements 24 through 27 according to pair wise operation, this must be combined with elements 28 through 31 and as soon as we get the second operand we can go ahead and perform the multiply and the answer is written into the file. It should be noted here that the Multiply Pipe is responsible for letting the Scalar Control (SC) section of the Vector Module know when the scalar result is ready to be presented to the Scalar Processor Module. To do this we must know exactly where these results are located in the shadow area. The element count register gives us this information. It is very important that the Multiply Pipe be aware of exactly where the scalar results reside. Also indicated on FIG. 254 are the different results for the different element counts. They are indicated with the lines drawn across certain blocks. Thus, the first block of the second pass is where the result of zero times one resides. Likewise, elements zero through 3 would end up in block two of pass 3. This continues with zero through 15 and zero through 31. It should also be noted that this is double precision; for single precision we require one more pass because these are word pairs. Since they are, we would have one more operation to go through for single precision. We must always combine the last word pair down to one word.

Next look at the staging register arrangement of FIG. 255. This configuration is necessary in order to allow the above addressing pattern to happen. The logic registers are shown on the left where the data is received from the VF RAM and is finally sent to the Multiply Pipe as data. While the clock enable is not shown, the addressing pattern will make apparent which ones need to be clocked. Again these are bits that are read from the microcode register which controls these clock enables. It is also important to mention that this data is the output of the Vector File section. It is not in the MP section. Normally for a simple multiply instruction, which does not require staging and exchanging; this path is used. It is only for product reduction that these extra staging registers are required. While there is only shown a phase 2 and phase 4 there are actually five phases between these two. In the present example, we just combine them into one and say that we have a single phase clock. In order to achieve the right combination of operands using the illustrated staging and exchange, recall that on the first pass, word pair zero and word pair 8 are read simultaneously. Remember also that the addressing pattern is different now that we are no longer reading 8 from the primary and zeros from secondary nor are we reading zero from the primary and 8 from the secondary. In this case, on the next cycle, we read one, nine and two, ten and so forth. Beyond this things get more interesting in that zero and eight are fed up to those next two registers and in the next sequence eight travels to the left hand of those two and one is picked up and the zero now proceeds to the output register. Word pair one is sent directly to the output register. So as this pattern proceeds every other cycle it is seen that with an input pattern of zero eight; one, nine and two ten we get an output pattern of zero, one; eight, nine; two, three and ten eleven. From a review of FIG. 255 it becomes apparent how the Vector File, the output registers, and the staging and exchange registers work for product reduction. Remember that it is very important that these registers are used only for product reduction. For all other instructions for multiplying and divide instructions the shorter path is used so there is really one phase.

Next, we would like to discuss a single precision floating point multiply operation. It is very similar to a double precision floating point multiply except that it requires a fewer number of passes since not as much precision is required. It is also very much like the integer multiplier with the exception of the shifting passes required.

Shown below is a table which illustrates the single precision floating point divide operation.

| PASS | INPUTS/ OUTPUTS | REMARKS |
|---|---|---|
| 1 | READ b,b | Lookup $x_O$(b). Subtract characteristics +1. |
| | WRITE 2-b$x_O$ | Clear FLAG. Record DIV by O |
| 2 | READ 2-b$x_O$, b | Lookup $x_O$(b). Subtract characteristics +1. |
| | WRITE $x_1$ | Record OVF. |
| 3 | READ b,$x_1$ | |
| | WRITE 2-b$x_1$ | |
| 4 | READ 2-b$x_1$,$x_1$ | |
| | WRITE $x_2$ | |
| 5 | READ l,$x_2$ | Add $3 \cdot 2^{-N-2}$ to x>; if no normalize of $X_2$, |
| | WRITE $x_2$ | set FLAG. Record OVF. |
| 6 | READ a,$x_2$ | Store lower 2 bits of a. If no normalize of q, |
| | WRITE q | set FLAG. Record OVF and UNF. |
| 7 | READ q,b | Test a-bq (Shift the 2 bits of an according to FLAG). |
| | WRITE — | Store SIGN. |
| 8 | READ q,1 | If SIGN is negative, decrement q. |
| | WRITE q | Output DIV by O, OVF, UNF. 8 PASSES, 8.33 MFLOPS |

as shown in the table there are eight different passes involved. But first let us define a pass. A pass is so-called because it is a pass through a Vector File. More specifically, a single scan through a vector register of the Vector File. A vector is actually stored physically in four rows in the Vector File. Refer for a moment to the product reduction addressing configuration shown in FIG. 254. There are actually four rows (1) zero through 7, (2) eight through 15, (3) 16 through 23, and (4) 24 through 31. It therefore takes four passes across that Vector File to access an entire vector. While a pass may require going through an entire vector, it is a repetitive operation. That is, we may go across the same or a different vectors a number of times. The number of times depends on what operands are being called up, so that each pass through the Vector File may require a full 32, 24, or 16 cycles. Eight cycles was purposely omitted for a very simple reason and that is because the latency time of the multiply pipeline is such that if we try to start a new pass using the results from the previous pass, the previous pass results will not be available since they are not as yet written into the Vector File. Thus, we have to go at least 16 cycles before we can start again. It is worth noting that the Vector File is organized into an 8 cycle ratchet arrangement or merry-go-round. This organization requires that we pick up at exactly the same point that we left off and this only happens at 8 cycle time slot time periods, so the length of these passes is always a multiple of 8 cycles. Now these passes may be longer or shorter say 32, 24 or 16 depending upon the original element count. If we are doing a divide operation with an element count of 1, for example, it does not make such sense to go through the entire Vector File on each pass. So that this does not happen, we always go through sixteen cycle passes, since they are the minimum to insure that results are actually written into the Vector File before we try to read them back again.

Continuing with the description of the single precision floating point divide, on pass 1 we read B from the primary file and also get B from the secondary file. Recall that A is a divisor, we read the divisor in both the multiplicand and multiplier registers in the multiply pipe data path and the net result and the answer that comes out is 2-b$x_O$. To explain this, please look at the above table. In pass 1, we are looking up $x_O$(b) on the multiplier side. Return for a moment to FIG. 250 which illustrates the data path and recall that there is a reciprocal memory 1717, 1718 in the selector. In this case we are selecting the output of the lookup memory in the selector. In this case we are selecting the output of that lookup memory in place of the multiplier itself. That output is the input to the pipe and it is applied to the multiplier array forming B $x_O$. At the output of the multiply array there are those accumulator registers 1721, 1722 where constants are inserted and the product registers 1725, 1726 following that includes a complementary capability. In order to form a complement of two we add a special constant into that accumulator and invoke the complement function on the product register and out comes 2-$x_O$. This takes very little extra hardware to do and it is also something that is needed for division. It should also be noted that in this pass the characteristics are subtracted and one is added to that result. If we do need to normalize we subtract one from that and get the difference in the characteristic. Recall our earlier discussion of the characteristic pipeline. This is the pass where the subtraction operation is needed for the division algorithm. This is floating point division and since we are talking about characteristics, this pass may be 16 cycles or 24 or even 32 cycles depending on the element count. There is another use for the eights counter that should be mentioned. Remember that the eights counter is loaded with the multiple of 8 at the beginning of the instruction and it acts like an element counter and also acts to force each pass. Each algorithm pass is a multiple of 8 cycles so when the eight counter counts down we start a new algorithm pass in the sequencer previously discussed. On pass 2, we read the result that we have just computed and the divisor again. Here again we need the 16 cycle passes for writing 2-b$x_O$, after which we try to read it immediately. If we try to do it eight cycles later as noted, it would not be there. Again we look up $X_O$ (b) so we multiply 2-bxO quantity times X zero rather than B. If you remember the equation, it was X (2-bx) and that gives us our next approximation for X. This new approximation is twice as accurate for the reciprocal as $X_O$ and in this pass we again subtract the characteristics and add one. If we normalize, the add one is removed and we get the difference of the characteristics.

After we have finished subtracting characteristics, it looks just like a series of very simple multiply operations. Except, of course that we have the complement operations coming into play. On pass 3 of the table, we read b and $x_1$ and write 2-b$x_1$ and so forth. We continue with this until we compute $x_2$.

In the multiply pipe, there is an internal memory which keeps the 6 extra bits of the internal or intermediate results for future use. In the very next step these bits are used to produce 2-b$x_O$. This result is read into in the multiplicand register. Again looking at the table, $x_O$ is substituted for b as the multiplier and note again there are no extra bits kept from previous operations since we are at the beginning of the operation. Here b$x_O$ is read indirectly as the multiplicand, and we can use the extra 6 bits from the previous pass 2-b$x_O$. Recall that these internal memory bit are the 6 bits on the very right hand end of the fraction that were normally thrown away. However, in this case, they are kept since we must have something to feed into these augmenting multipliers. The multiplied result from this entire augmented multiplier is $x_1$ and we keep the most significant end bit and the least significant 6 bits, that we normally throw away, and store them back into the memory.

The operation described is for a single precision floating point divide. For a double precision divide operation steps 3 and 4 are repeated one more time for a total of ten passes. Continued study of the table will show the operation for the total of eight passes. They are accomplished in 8.33 MFLOPS.

Returning to the table, consider the fourth pass where we are going to write $x_2$. We are still in the reciprocal generation step and we keep the extra bits of precision from previous passes and allow them to participate in the multiply operation. Step four is where we actually form $x_2$. In step four you read 2-b$x_1$ and $x_1$ and you write $x_2$. In this case, we simply multiply $x_1$ times 2-$x_1$ to get $x_2$. As indicated by the equation the augmented multiplier is working to get that extra precision that is needed. For double precision floating point operation we repeat the previous two operations.

In the seventh pass we perform a simple transformation, since we actually want bq to be as close as possible to a. This is, in fact, what happens in the seventh pass of the algorithm. It should be mentioned that we store a internally in a very small memory in the multiply pipeline. We actually store the least significant two bits of a. We store a in the internal memory in the Multiply Pipe because we only have room to read in two numbers. The two numbers we need are q and b in order to form this complete product, however, q is so close to the desired q that this difference is very small. This would imply that we need only the least significance of bits of a in the subtraction because the rest of the bits will just be copied as a sign bit.

In the last or eighth pass we read q and again that floating point 1. Constants are selected from the Vector File output register when we write it back in the q file where internally we may be selecting this according to whatever the results of subtraction the a minus b q operation was in the previous pass. It should also be mentioned that there is a small memory used to hold the results of that subtraction. In this pass we are not really doing a multiplication, we are just adding the small constant to Q so that we can multiply q by one to have no net effect on it and then add that small constant in at the accumulator register stage.

In division, characteristic faults are computed in different ways than they are for multiply. The end effect is that all of the faults appear to happen in the last pass only, when if fact we made a word overflow or underflow occurring in various earlier passes.

These word overflows and underflows are stored in the divide characteristic faults memory. Likewise there is a divide by 0 memory and it is very simple. All that is needed in that case is a mechanism to detect the 0 diviser and that can be detected at any time during any pass.

Next, let us discuss the reciprocal lookup memory. In actual hardware, it is a RAM, however, because it is only written into upon initialization it need not be. For example, if we have a number, call it b and we have our reciprocal lookup memory. What is done is to apply I bits of b to the memory. If we assume that this bit is always set, then we are working with normalized numbers only. We also assume that the most significant bit is always set. We apply these I bits as an address to the reciprocal lookup memory and it comes out as the reciprocal. If we also assume that there is always a one bit in that position there is no need to store that in the memory. This also turns out to be I bits. If you are selecting I bits here as an address then you want I bits of data. The way these recipicals are computed is to take these numbers, we actually form a floating point reciprocal, and throw away all excess bits and store the remainder into that memory. So we have a one thousand and twenty-four (1024) location RAM which is ten bits wide. There is also two parity bits in the actual implementation too. The reciprocal memory is loaded into at initialization time through the scan set mechanism but after that point it acts like RAM, and it is never modified.

Next, let us discuss very briefly Vector File conflicts and the effects they have on the Multiply Pipeline. We will also talk a little bit about the hardware that this Vector Control section controls, and conclude with the brief description of the time slot mechanism and the micro code fields.

First of all, as described earlier when a Vector File Conflict arrives at the multiply pipeline it is just as if all activity ceases for some multiple of eight cycles. That multiple of eight cycles is used because the Vector File is in the eight cycle loop. We have to pick up exactly where we left off. The state must remain the same though, and for that reason we refer to it here as a conflict freeze.

The data path never stops. It just continues computing numbers, however, the write control bits are shut off in the conflict operation as was described earlier. We will very briefly describe the structures in the Vector Control section devoted to the Multiply Pipeline for controlling these conflicts and for generating them. First it should be noted that the Vector Control section captures the file numbers that are being accessed. It also keeps an element number and a counter register for each of these files to keep track of exactly which element and which file we are trying access. This occurs whether we are reading or writing and it is necessary in order to generate a conflict and to keep the pipes in proper synchronism. These are the Vector Control structures for the MP conflicts in each of the pipes. They all have corresponding structures and they all work together.

As shown in FIG. 256, there are four file numbers and these are stored in OP 1, OP 2, OP 3 and OP 5 registers. The operand is the file number that is being written in the primary Vector File. This is being read from the secondary Vector File. The write operand is the address of the file into which the operands are to be written. The file OP 5 is there to optimize the overlap capability of the machine and we will describe exactly how it is used. Before that, however, let us describe the element number counters (ELNO's). There is a read element and a write element. These counters keep track of which elements we are reading from or writing into, however, there is another type of write element, which we will call a late counter. Finally there is an OP 5 which is also a write early element. These are all counters. That is just plain register counters. The purpose of these two counters is first of all, to count the read counts, to claim elements and to allow the write counter to release elements. So if another pipeline is writing and our read counter comes along at the same time, then this would cause a Multiply Pipe conflict. This counter insures that we do not get out of synchronization. If the write element counter falls behind the read counter, then the read information is valid for our use only. Likewise, the write counter allows another pipeline to come along and write into those elements after we have finished using them. Between these read and write counters all information is valid.

FIG. 257 is a timing diagram illustrating the Multiply Pipe overlap. The use of the OP 5 allows a certain degree of overlap to occur in the conflict logic. That is, it may look like two multiply instructions being simultaneously performed, however, the conflict logic will be capable of handling that situation. Referring to the simple timing chart, of FIG. 257, assume that there is a period where the Multiply Pipe is reading from the file. Some time later it begins writing results back into the Vector File. This time gap is called the latency time of the pipeline. Now another instruction may be started. It may be a short instruction, say for example, the write instruction. These lines correspond to time, the Multiply Pipe is reading from and writing into the Vector File. Below are shown the corresponding OP 1 through OP 3 file numbers and the OP 5 file number. During this period of time, the OP 1 through OP 3 file numbers contain information from the first instruction. As soon as the first instruction is finished a read operation, this information is transferred into the OP 5 file number. This is OP 3 information, contained in the file that it is being written into, is transferred into OP 5 and the conflict logic then attempts to resolve these conflicts using the OP 5 for instruction 1 rather than the OP 3. When the second instruction begins, OP 1 through OP 3 files are loaded. Then the OP 5 file is loaded as soon as it is free from the first instruction. Now it can be seen in FIG. 257 that there is a certain overlap period during which we can not start a third instruction. So the Multiply Pipe sits idle until the first instruction. A very simple way to sum this up is that a second instruction may not start until the first instruction has compled reading. Further, a third instruction may not start until the first instruction is completed writing. This does allow us some degree of overlap. In fact, two (2) instructions worth of overlap. If we did not have this OP 5 available, we could not start another instruction until the first instruction was done writing and that would seriously affect performance. This is the reason for the OP 5 file number. Likewise, there are element counters that correspond to these files. The read OP for instance would correspond to OP 1 and OP 2, and keep track of which elements that are being read. The write OP corresponds to OP 3, which is the file number that is being written. The OP 5 element counter would, of course, always correspond to the OP 5 file number and the conflict signal would be generated from this.

d. Move Pipe

Consider next, the Move Pipe which executes the following instructions. The move, the compress, the distribute and the generate index vector. It also shares execution with the Add Pipe (AP) in single to double conversion as well as in the double to single conversion. For double precision only it counts leading signs. When it works with the Add Pipe, the AP places the result into a temporary location and the Move Pipe will read it out of the temporary location, restructure it and write it back into the Vector File. FIG. 258 shows a basic pictorial diagram of the Move Pipe operation. First, the source vector of the Scientific Processor is illustrated as a vector with a possible 64 elements. These elements are numbered zero to 63. The elements are simply moved from a source to a destination vector from one Vector File to another. There is an element counter that is set in the Move Pipe section by the Vector Control section that indicates the number of actual elements transferred from one to 64. It is also capable of a broadcast G move wherein the source vector is in one G register location which may be essentially broadcast to all of the locations. For example, if we take this G register element and place it in every location of the destination vector this is called a broadcast move. There is also the architectually defined mask register which allows conditional transfer of the elements. If the mask element is one, this enables the transfer of those locations from the source vector to corresponding locations of the destination vectors.

The Compress instruction pictorial is shown in FIG. 259 and is similar to the Move operation except there is a difference in the way the mask is utilized. In this case, we have a source vector of elements zero to 64, only the first 7 elements being shown. The mask elements are also shown with bits of one and zero which correspond directly to each element of a source vector. The Compress operation selects only those elements corresponding to a mask bit of one and writes them into the destination vector. In this case these elements are zero, three and six. The compress instruction may also specify those elements where the mask bit is a zero. In that case, it would choose those elements 1, 2, 4, 5 and put them into the destination vector.

The Distribute instruction shown in FIG. 260 is the opposite of the compress instruction. Here again we have a source vector with elements 0 to 64. We also have a mask vector where we have ones and zeros corresponding to each element of the source vector. In this case, however, where there is a mask bit of one, the source vector elements are taken, in order, and placed in corresponding locations of the destination vector. So the first element of the source is written in the first location and so forth.

The Generate Index Vector (GIV) instruction is shown pictorially in FIG. 261. It generates a vector of indexes. The indexes are defined by a base and a stride. The base is contained in one-half of a G register. The stride can be either another G register or the other half of that same G register. The vector of indexes is generated such that the first element of the vector is simply the base. The second element is the base plus the stride and the third element is the base plus twice the stride and so forth up to a base plus 63 times the stride. In this way we get essentially a vector of uniform distance indexes. The pipe conversion and count leading sign instructions are shown in FIG. 262. For a single to double precision type conversion we have an element source vector with 32 elements with each being single precision or a 36 bit word. The result in the destination vector is 32 double precision elements filling one Vector File, where it takes two locations or 72 bits to fill the whole double precision word. Element 0, 1, 2, and 31 are shown for converting 32 double precision words from 32 single precision words. For a double to single precision conversion, the opposite holds true. In that case, 32 double precision words are held in one vector occupying two words per element are converted to single precision.

The Move Pipe also assists in the execution of the count leading sign instruction for double precision. This is very similar to the DP to SP type conversion. In the count leading sign, double precision vector instruction there are up to 31 elements which are double precision. The Add Pipe will examine these locations and for each element of two words it will do a count leading sign vector. This is a count of the number of bits starting at bit number one and then the consecutive bits following bit number one that are equal to bit zero.

FIG. 263 is a simplified block diagram of the Scientific Processor showing the location of the Move Pipe and its organization. From the horizontal dashed line down is the SPM, 150 while from that line up is the VPM 162. If we assume that an instruction is in the instruction flow (IF) 400 it will be decoded as a vector instruction and issued to the Vector Control section (VC) 1100. The VC will then decode it as a Move Pipe (MV) 1800 instruction. It will provide all of the information necessary to initiate an execution of this instruction. The Move Pipe (MV) essentially has two halves, a move control 1814 and a move buffer 1812. The move buffer 1812 is a temporary location for vectors when we are reading and writing them out of the Vector Files (VF) 1300. The AP 1600 is shown connected to the Move Control 1814 to provide the necessary handshaking for execution of the type conversion. The AP 1600 will provide signals when it has completed the first half of the type conversion, to which the MV pipe will respond. The SC section 1400 is shown because it controls the interface between the Move Pipe and the Scalar Processor section of the Scalar Processor Module. The Scalar Processor Module participates in the execution of the GIV instruction, i.e. generate index vector. The Scalar Processor will read the base and the stride of the G register and generate the index. It will then send them via this path to the Vector File. Recall that we had a vector of indexes with a base plus a stride, a base plus a two times the stride etc. The SP section 900 will generate this vector of indexes and transfer them to the Vector File 1300 via the Move Buffer 1812 then written into the Vector File. To accomplish this there is a certain amount of handshaking necessary to coordinate the transfer of information. This is handled via the Scalar Control (SC) section 1400 of the Vector Processor Module 162.

FIG. 264 is a block diagram of the Move data path. At the heart of this data path is the Vector File 1300. In the VF, recall that there is a primary Vector File 1302 and a secondary Vector File 1304. There are address registers 1308, 1310 for both the primary and the secondary copies for addressing the primary and the secondary Vector Files. The data is read via read register 1801 from the secondary Vector Files 1304 at 04. The data is read and latched and if we are reading from the Vector File where the source is such, versus a t register, that it is to be broadcast, then this path will be selected. Address and Vector File data then will be latched out, selected and transferred to the Move Buffer 1804. If the data is in a broadcast G register or is GIV index data, the generate index vector data that is coming from the Scalar Processor Module will take the right hand path. Thus, the data will arrive on the input line and get latched on the Vector File Scalar-in register 1340 which will be latched and the appropriate path will be selected for the data to be written into the Move Buffer 1804. It will become more obvious later how the Move Buffer operates, however, it is essentially a temporary location for transfers into and out of the Vector Files. The output register from Move Buffer is the Move Buffer out register 1812 which returns to feed the Vector File write data register 1306, which data is then written into both the primary and the secondary copies of the Vector File 1302, 1304.

FIG. 265 illustrates a more detailed block diagram f the Move Buffer 1804. The data path passing through is two words wide and they may be either two single precision words or one double precision word but all data paths are two words wide. This is why the Move Buffer 1804 is divided into two halves. The Move Buffer 1804 essentially has a Move Buffer word zero 1805 and Move Buffer word one 1806 and for each Move Buffer we have a red address 1807 and a write address 1808. Thus, we have a read address word zero 1807 and a write address word zero 1808, a data word zero 1809 and a write enable signal 1811. It is not obvious why there is only one write enable but it will be explained later. So we have essentially two halves, a word one 1806 and a word zero 1805 which are then latched into the Move Buffer out register 1812. Word zero and word one are latched together.

At this time, let us again review how the Vector File is organized as shown in FIG. 266 and 267. Recall, from the earlier discussion on.the Vector File section, that it is organized, from an addressing standpoint, into one real section and three temporary shadow areas. The real section is defined as address zero and the shadow areas are defined as one, two and three. For each of these areas, there are essentially 16 Vector Files, so the real area has 16 Vector Files and each of the shadow areas also has 16 Vector Files. The shadow areas are used by the Multiply, the Add and the Move Pipes for temporary locations. This is where, in the type conversion, the Add Pipe will write the results for the type conversions and then the Move Pipe will restructure them and write them into the real area. So for each of the 16 vector files each one contains up to 64 elements. Recall also that the Vector File is addressed in passes as illustrated in FIG. 268 and is organized in RAM's with 8 blocks. Only 4 are shown and they are for words zero, one; two, three; four, five; on up to 14 and 15.

A single address is passed across all eight in one pass of the Vector File, so consequently there are four passes to addressing one Vector File. For writing, we write word zero one and as we go across it is all synchronized.

To start with, FIG. 268 is a picture showing how the Move operation is executed. If we look first at the source vector, it includes elements one, two; three, four; five all the way up to 63. The Move Pipe section reads it out of the source vector and transfers it to the Move Buffer. It then transfers it to the destination vector. It need not be transferred to the Move Buffer it could have simply gone and bypassed it but for uniformity, we transfer data via the Move Buffer.

In the other instructions like the compress or the distribute where there is not always a simple transfer, we have to use the Move Buffer for temporary location between transfers. The Move Buffer, as noted, is two words by 32 addresses. Under the direction of the Move Control, the Move Pipe will read it from the source and transfer it to the Move Buffer and while it is writing it in the destination vector it will apply the mask. It will also keep track of the element count to make sure of the number of elements that were actually transferred.

The compress instruction is shown in a pictorial illustration in FIG. 269. In the compress case, the mask is organized like a Vector File so that we can immediately associate the mask with the source element. There is a source vector contained in the Vector File showing elements zero, one, two, three, four, five etc. For the example an element count of eleven has been chosen. This means that we only look at the first eleven elements of the source vectors. This is shown by the dotted area. For this instruction, the elements with masked bits corresponding to a one are selected.

The source vector elements that are circled correspond to the mask bits that are one. As the Move Pipe reads the source vector, it receives masked bits from the Mask Processor two at a time so it is reading two words at a tim and receiving two masked bits at a time. If the masked bits indicate two transfer words a selected one is written into the move buffer. So essentially the move buffer will contain the one to be finally written into the destination vector. Therefore, we have elements zero, three, four, eight and nine which are selected and placed into the Move Buffer. Then, on a second pass across the Vector Files, the destination vector is written so that compress instruction comprises two passes across the Vector Files. The first pass consists of reading the source vector and transferring the appropriate elements into the Move Buffer, and the second pass covers the writing of the destination vector. If all of the masked bits are one then all of the elements are chosen and all are placed in the Move Buffer and the end result is a move.

The distribute instruction, element count 11 is pictorially illustrated in FIG. 270. The source vector with 64 elements, the mask bits, the Move Buffer and the destination vector are shown. Wherever the masked bit is enabled that destination vector location is written. So in this case we have the source vector and the mask. Again we have an element count of eleven and what happens here is the source vector is simply read and transferred to the Move Buffer. At the same time, a masked two bits are received at a time corresponding to two words at a time. So the data and two masked bits are received. The Move Buffer is just read out in order placing the elements where the masked bits are noted as ones.

As in the compress instruction where there was a read and a write pass, in order to distribute we can do the sequences at one time because We do not have to wait to find out how many we have actually received before we write the destination vector.

FIG. 271 is a block diagram showing how the indexes are generated in the Scalar Processor Module (SPM). A base is read from one half of the G register and a stride is obtained either from the other half of the data register or it could be the value of one depending on how the instruction is setup. So the base is loaded into the register and the stride and the base are then added in the adder to get a result. Next, the result is recirculated and latched in the first register. For the first time the base was loaded and sent to the VPM. On the second time around, the base believes that the stride value was in there so it was added and latched on the second time around. Actually, during the execution of the instruction there are two indexes generated per cycle element, zero and one. The element zero is just the base value. This base value plus the stride is regenerated at the same time. The index is always single precision so there will be up to a maximum of 64 elements. These elements are transferred to the Vector Processor Module and loaded into the Move Buffer. Thereafter, at the appropriate time it is transferred to the destination vector on the Vector File.

FIG. 272 illustrates the single precision to the double precision type conversion. As in the earlier example we have a source vector with two precision elements zero, one and two, three, all the way up to 31, so there are 32 single precision elements. The Add Pipe will read the source vector and generate a double precision value. So to convert the single precision element zero to a double precision element and write it into the shadow area, a temporary location is needed as previously discussed. The add operation will write all of the even numbered elements zero, two, four, six, etc. into the shadow area 1, 0 in the destination vector number. You will recall that there is a real plus three shadow areas. In each area there are 16 Vector Files, so the real area will contain the source and the destination vector. A t operation will do the type conversion and put it into the shadow area 10, the same will be placed in the destination vector. Now element zero, two, four, six are written in this second shadow area 10, while the odd numbers are written into the third shadow area 11. The Add Pipe will complete this part of th instruction and transfer the element count to the Move Buffer indicating the number of type conversions that were accomplished. At this point, the even elements are in shadow area two and the odd elements in shadow area three. Next, the Move Buffer is initiated. On the first pass, the Move Buffer will read the odd numbered elements in the shadow area and place them in the locations in the Move Buffer skipping a space as shown until it fills the Move Buffer. It will then read the odd numbered elements and fill them in every other location in the Move Buffer. On the second pass, it will read the odd numbered elements out of the second or the third shadow area. Also it will transfer the odd elements on these same positions from the first pass. The Move Buffer will next read the even numbered elements and write them into every other location in the Move Buffer. On the second pass it will read the odd numbered elements and interleave them between the even. Also, on this third pass, the Move Buffer will be emptying itself out and writing into the final destination vector. So on the second reading pass across the Vector Files, the Move Buffer will be writing the odd numbered elements one, three, five, etc. while reading element zero, one, two, three in order and writing them into the destination vector. The mask can be used again to control writing into the destination vector.

FIG. 273 is a timing diagram of the precision type conversion. It illustrates the relationship of the acknowledge signal and the activation signal of both the Add Pipe and the Move Pipe. It also shows the acknowledgement signal of the combined pipes i.e. the MV AP ACK signal.

FIG. 274 is similar to FIG. 272 in that it illustrates a reverse conversion. That is, it illustrates a double precision to a single precision type conversion.

This concludes the third topic of the Move Pipe. We will now cover some of the finer details of how the control of this pipe is executed. At the heart of the control is the microcode sequence logic illustrated in FIG. 275. We have a microcode RAM 1815 which is 48 bits wide. These control signals are then latched by a data register 1816. These bits then go to the write address element counter for controlling the execution of the instructions. There are a number of fields which control the Move Pipe control section. This microcode RAM 1815 is addressed by the microcode address register 1818. Upon starting an instruction, a microcode address is loaded into the address register 1818. The microcode address results will follow a return to what is called the microcode recycling register 1820. This register 1820 is incremented by an adder 1821. If this path is selected, the microcode address is loaded with the incremented address so that we can then sequence through the logic or through the RAM 1815. Next, we have a selector 1817 which decides whether to get the next address (incremented) of the microcode 1821 or select one of the fields of the microcode data register 1816. If we wanted to do a jump, the address for the jump would be selected from the microcode and loaded into the microcode address. The selector 1817 selects the start address both upon initiation of instructions. It will then switch to select either an incremented microcode address or a branch address which is read from the data register 1816. Another of the fields is the branch conditions selector field 1819 which will select which condition that we want to branch on. This will be applied to a select register which will sample a certain conditions. There are 8 conditions that we can branch on as shown in selector branch condition designator 1819.

Next, we will discuss some of the signals involved in the instruction startup. These are initiation signals which are received from the Vector Control section.

You will recall that in the Move Pipe, an instruction is issued from the IF section to the VC. The VC will then decode the pipe to execute the instruction after which it will issue the appropriate signals to execute the instruction. So upon receiving an instruction, the VC will send to each of the six pipes of the Vector Processor a signal saying that we have received an instruction. It also will transfer information pertinent to the execution of that vector instruction. Included in this information are the pipe decode signals. This information dedicates a single pipe as the selected pipe to perform the instruction. Also included is the entering address which is the starting microcode address for the sequencing operation. This denotes which instruction is to be performed. Each of the instructions for the Move Pipe has a unique entry address, so to do them you must provide an entry address which will address the certain location in the microcode needed to execute that instruction. The VC will also send an element count indicating the number of elements needed to transfer the vector. There is also the modified key bit which indicates to the Move Pipe whether it is single or double precision operation. Further, there is a signal that is transferred to the VC in the slot reserve indicator which says that the VC has reserved this slot in the time slot management for a move operation. The move will acknowledge the instruction active VC saying that it is free to execute this instruction and it is started. The active signal is internal to the MV section indicating that we are actively executing an instruction.

FIG. 276 is a detailed timing chart indicating the timing of the move control. It is a sample execution to show the more important signals that are present during the execution of this instruction. First, the instruction is received and next, the time slot is reserved. There are three signals that are sent from the VC to the MV which indicate the entry address, the Pipe code and so forth.

Assuming on this cycle that this timing sequence (VC) receives this instruction and communicates it to the Move Pipe. The Move Pipe seeing that the VC has received an instruction that has been decoded sends out an acknowledge signal which says that it is free to start this instruction. On receiving the instruction and knowing that the pipe is in the time slot pattern, the VC will reserve a time slot and it will be so indicated. Since we have a time slot reserved and the Move Pipe has sent an ACK signal, we can now raise the active signal. The Move Pipe becomes active and the instruction receive signal disappears. This indicates that the instruction has started and it can continue since the information will be valid for one cycle (30 nanoseconds). A portion of the information is the entry address which is transferred to the Move Pipe and this is loaded into the microcode address register. This is labelled E to indicate an entry start. This is the time that the entry is loaded and the data addressed in the RAM. Upon activation the microcode data register is loaded, and this data corresponds to the address. As we sequence through the execution of the instruction we get the next cycle which, if we are moving on the same microcode address, is labeled E plus one (E+1) to reference time. This indicates that this cycle corresponds to the data with the address. For this example, the element counter register containing the element count is sent from the Vector Control (VC). This tells the Move Pipe section the number of elements that are to be transferred. In the example, there are five elements that have been loaded. As the data is transferred from the fields, the element counter will be decremented by two because we are reading two words from the Vector File on each operation. Since we are also writing into the Vector File at the same rate, the element counter register keeps track of the elements transferred.

When the element counter reaches an element count of less than or equal to two meaning that we are transferring our last two elements, the operation may stop since the pass has been completed. There is also shown in FIG. 276 an extended sequence designator which is set to allow for a double pass instruction. For the single to double type conversion recall that it performs two read passes. On the first pass we read from the Vector File and transfer it to the Move Buffer, then on the second pass we write it. Similarly with the compress, on the first pass, we read from the Vector File and put in the Move Buffer. So, what must be done is to look on the first pass of the element counter and decrement it. Then reload it, if it were a two pass instruction, with an element count and decrement it at the conclusion of the second instruction pass. This extended sequence designator is flagged whether it is going to be a one or a two pass instruction. This signal causes every instruction to be set for at least one cycle for a two pass instruction. It is going to be held high during the entire first pass and then when we start the second pass it is lowered. The example is a move instruction which is just one pass, so the extended sequence is just raised for one cycle.

A time slot reservation is discussed next and what it means to the Move Pipe. As previously noted with reference to the time slot logic we have a 8 cycle recirculation register on the left of FIG. 276. Various information is looped through this logic pertaining to what type of slot has been reserved; i.e. a move, an add or a multiply; and also whether it is a write or read slot. A slot in this instance means one position in the register and it is cleared by the appropriate pipe. This information is transferred to the address select register for selecting the appropriate pipe address for addressing one pass across the Vector Files.

For the Move Pipe (MV) there are two time slot patterns as shown in FIG. 277. The move, the distribute, the GIV, the single to double type conversion, and the double to single type conversion instructions are in one time slot pattern and the compress instruction is in the other. For the simple move instruction, the Vector Control will examine pattern slot zero in FIG. 277 to see if they are free and unassigned or assigned. This is necessary because in order for the move time slot adder to be assigned, pattern slot 1 will have to be available. So after the sign of the read slot and a write slot are determined, the next cycle is a read cycle and is recirculated around and applied to select a read address leading from the Vector Files. Three cycles later the write will jump to this point and then recirculate. It is also applied to select the write address. As you recall from the data path description the move reads from the secondary Vector File and then writes to both the Primary and the Secondary files, so the move operation will provide an address for reading out of the secondary and will then write this address in both the primary and the secondary files. Thus, a move operation will provide a read address to be read from the secondary and then a write address. However, it also duplicates and sends this address to both the primary and the secondary for writing in the Vector File.

Figure 279:
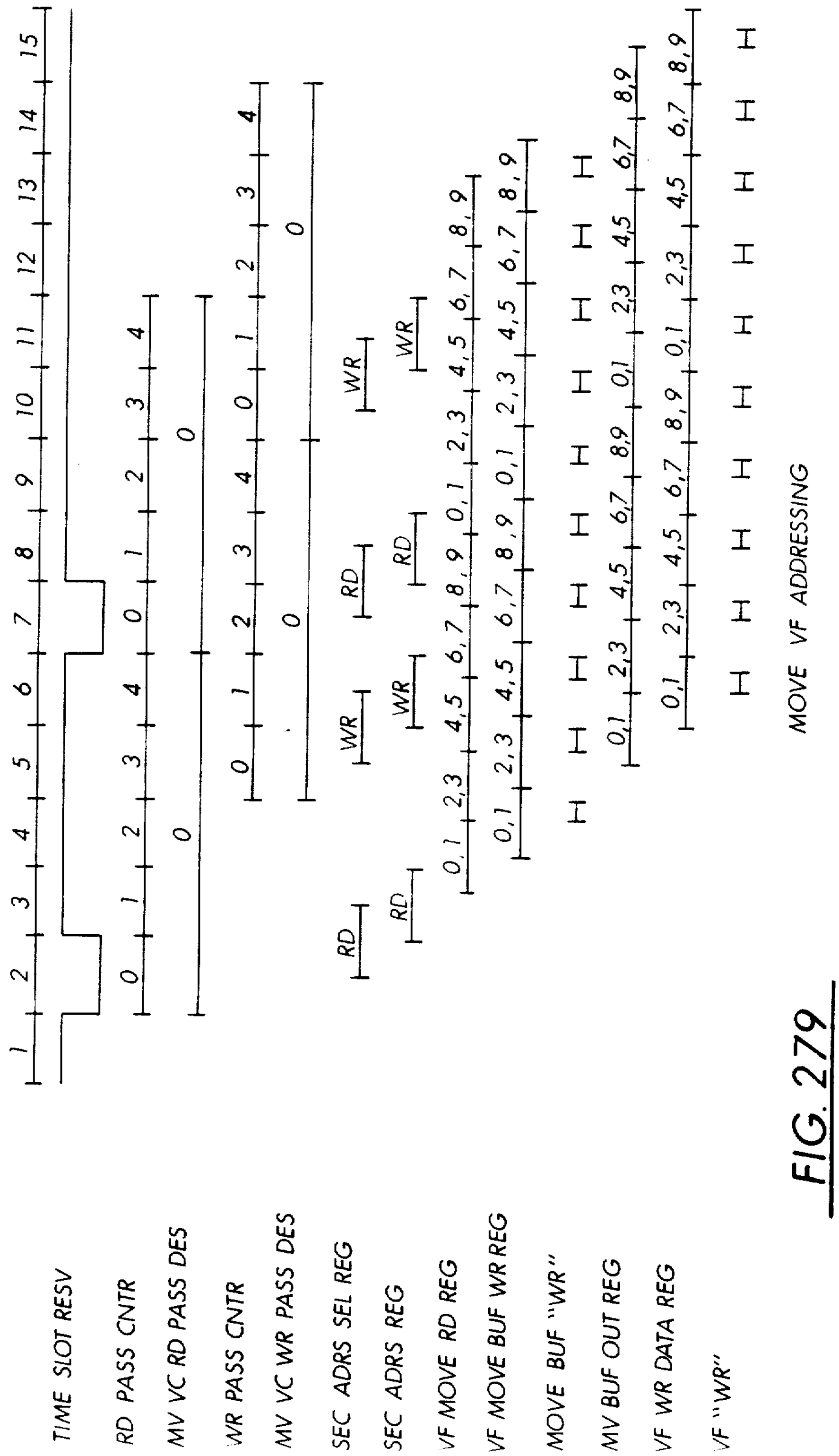

FIGS. 278 and 279 illustrate the Move Pipe Addressing of the Vector File. FIG. 278 is the Format and FIG. 279 the timing diagram. For the read operation, these 8 bits shown in FIG. 278 have been subdivided into three areas. There is a shadow area which is designated by the first two bits. Next are the four bits for the file number for each of the 16 different Vector Files. Finally, the pass number designates which of the four passes across Vector File is desired.

The Move Pipe also keeps track of the location in the shadow area that it is to be read. For example, Vector File address OP two corresponds to reading from the secondary file memory for the Move Pipe. This is a register that is contained in the Vector Control section. The subject of Vector File addressing has been previously discussed, however, it will be reviewed here with specific reference to the Move Pipe. The Move Pipe has multiple horizontal passes and it always goes to the real area. When these two bits are zero the shadow area is read and the OP 3 address, which is another register in the Vector Control contains the address of the file number for writing.

Getting back to the move control timing diagram of FIG. 276 there are shown the time slots zero through 8. A time slot, you will recall, is reserved, and prior to this, no pipes were active from a master clear state, so the read and write slots are assigned at this point. Between the time slot zero read address, and the time slot three write address are nine cycles. As we cycle through the execution of the instruction, the slot is recirculated through the merry-go-round. First the write cycle goes around and then the read operation wraps around on the seventh cycle. To end an instruction, the Move Pipe releases the time slot, and essentially clears it to prevent the transfer of the slot points.

Now, you will recall that the second move is attempting to be executed at this point. So the instruction receive signal has arrived and a slot has been reserved. It now attempts to reserve again for the move or read space write slot, but because we have not sent an acknowledge signal at this point, the slot is cleared and the instruction remains at the VC interface attempting to get initiated. Once the element count reaches less than or equal to two and the extended sequence designator is not set, the end of the instruction flagged so an acknowledge signal is sent. The reason the slot reserve goes high at this point is because it cannot reserve a read space write slot pattern during this cycle. Because the write slot from the previous move instruction is still there it cannot reserve a read space write pattern at this time. This is why no time slot reservation is possible during this cycle.

On the next cycle, the time slots are available so the reservation can be made because the L counter on the first instruction has reached two and does not extend its sequence. We are then acknowledged low and this slot is reserved for a real time slot. This indicates that we have actually started the next instruction so the receive signal may disappear and the VC can accept the next instruction. The entry address is then loaded into the microcode address register during the cycle, but because we are not active no exit data is allowed until we do so. When it is activated, the entry address microcode is permitted to be latched by the data register and sequencing starts. In this second move, an L count of 4 is shown. It is held until we are actually activated and this does not happen until the time slot is reserved. Once we become active, the data register is loaded, the L counter is decremented, and the next microcode is received. The extended sequence, which was set upon receiving the instructions, goes down and the instruction is finished and goes inactive. Sometime later, the read and write slot for the second instruction is released. This short description covers an overlapped execution of the OP 2 move instructions.

Also included for general information, is the address transition state diagram shown in FIG. 280 for each of the instructions.

For example, in the upper left hand corner is shown the transition from the Move instruction. It so happens that the entry or starting address for the Move is an Octal 120. All the addresses are shown in octal. The address will be loaded with 120 then if there is not a branch it will loop until the move is complete. But if the branch is taken, it will go from 120 to 122 and execute for one cycle and stop.

FIG. 281 is an illustration of a conflict. Since conflicts have been previously discussed, this discussion will refer specifically to a Move conflict. In this case, there are two instructions. We have an add operation performed by the Add Pipe doing an add vector. In this case we add one to two and place it in three. Meanwhile, the move is moving it from three to four. What we have here is a possible conflict because the destination of the add is the source of the move information in the Move Vector instruction. So the add instruction will get initiated and start reading at this point. Meanwhile, the source of the addition reads elements $V_0$ and $V_1$ vectors. At some point, approximately 9 cycles later, it will write the result so there is a certain amount of latency from the time it reads to the time it writes. The move operation is initiated as soon as the add operation has been initiated, so roughly two cycles later, the move is started. However, because it is trying to read from Vector File three before the add result is written there, the move operation is in conflict and cannot be read because the results have not arrived. The move is held during this time until the results are written then it proceeds to read V3 after the add has written it and then it is able to write 4, so it is held in a conflict freeze situation until the operand is free. What happens is the address microcode address and the data register is held until the conflict is over, and it then can be started. Another example of a conflict is where the conflict occurs in mid instruction. There is a relationship between the read and the write operations. It reads and writes and then it reads into the conflict, the Move Buffer then empties and once the conflict occurs and is over, it begins reading again and with this latency, writing resumes. A mid-instruction conflict occurs, for example, when a scalar move to or from the Vector File picks an element out of the middle of a vector. The move is started and the scalar which had been attempting to write an element in the same location goes to the middle of an element and this situation occurs.

At this point, it might help to refresh just how the Move pipe (MV) data path is organized. Refer back to FIG. 264 where we show an address register and three phases later on a phase one, the data is read. Two phases later it is latched and written into the Move Buffer. FIG. 279 shows a timing relationship for the addressing of the Vector Files. In a Move time slot reservation, move slots zero and three are initialized. At the start of the instruction a read pass counter and a write pass counter are used to keep track of the position as we read or write from the Vector File. The read pass counter at this point, corresponds to the reserve and the pipe is initialized to zero. As the pipe sequences through a move, the pass counter is incremented by one, it increments up to 31 as it reads across the full vector and we have the usual read space write time slot pattern. Thus, the write operation follows the read operation by three cycles. In this example, the write pass counter gets activated three cycles later. What is shown are two continuous move instructions. The first one is started when the read pass counter is activated for five cycles of execution, which means an element count of ten. The next instruction will then get started and the pass counter is zeroed as it reads across another vector for the second move. This is how the two are put together.

In this overlap situation we are still writing while we start the second read operation. The write operation is still going for the first instruction. The read pass counter has five bits, and counts from zero to 31. As it counts from zero, one of these two bits are used to keep track of the position. While two bits are used to generate the pass, we count from zero to 31 during the pass. Three phases later the data is read out and is transferred for writing to the Move Buffer write register. Now that we have written into the Move Buffer, we begin to read from it in order to write into the Vector File. As we read from the Move Buffer, transfer it to the Move Buffer register, and place it into the write data register, there is a sequential flow of data which is written into the Vector File.

Now we will move on to time slot release section, which is illustrated in FIG. 283. The time slot logic consists of three pipes of release staging. This logic switches between the three pipes for controlling the releasing of the slot. Upon the start of an instruction, a toggle selects which pipe will perform the release. The release information logic is then set and the logic continues staging until the appropriate release. On the next instruction we toggle to three different pipes as each instruction gets started. Since a conflict occurs on the second slot during the execution of the second instruction, the release of the first slot can be accomplished first. The first instruction is not held up and that is why we have three separate pipes. Look first at the condition for time slot release upon the start of a pass. If the element count is between two and six (less than or equal to six) we can release at this point during this pass because we know we will be finished. If a conflict occurs during this time then we will be held for eight cycles and it will not be released. If the L count is between eight and sixteen, then we can release at different points depending upon the possibility of a conflict. Suppose that an L count of twelve for an instruction is present and a conflict occurs during this cycle, we would not have wanted to release our time slot because the next time around we would have lost our time slot and would not have been able to access the Vector File. So if a conflict is possible we must release immediately. If the L count is greater than eighteen then we know we will be going for a second pass. That brings us to the earlier situation where an earlier release is accomplished.

Finally there are element counters and file number registers in the Vector Control section for time slot resolution. There is a timing diagram for an OP 2 counter as shown in FIG. 284. As denoted by an OP 2 instruction for reading an OP 3 file number, an L counter register is used for maintaining the position of the Move Pipe when it is writing into a Vector File.

What is shown in FIG. 284 is a Read OP 2 counter and a write OP 3 counter. For the OP 3 counter, there is an early and a late signal so at this point we have the instruction start. The read counter is then initialized to zero and counts just as the read pass counter does. The write pass OP 3 counter is an early counter for this situation, wherein there is a move for reading and writing during the same passes. The write counter is merely initialized and then starts to count up. If it were like a compress instruction where the read occurs during one pass and the write during another, then these would be completely independent and one would occur during the first pass, while the other would occur during the second pass. The late counter is staggered by three cycles corresponding to the latency of the Move Pipe. This flags the position where we are attempting to write which corresponds to the read slot and this allows execution of the write instruction. The read out counter is used for detecting conflicts where the MV is trying to read. The write early counter is for conflicts against the MV pipe where, for example, a Write/Write conflict occurs. There are various ways to clear the system and allow the following pipes access to the Vector File.

e. Scalar/Vector Control

First, the Scalar/Vector Transfer Control 1400 as shown in FIG. 286 is in the Vector Processor Module 162 and it will be referred to here as the SC, or as the SC card. It is strictly a control type of card and it has no data path of its own. It possesses the ability to control the interface between the Scalar Processor Module 150 and the Vector Processor Module 162. In the case of the G ops, the control decides when the Add 1600 and/or Multiply 1700 Pipes of the VPM 162 are going to be active. The SC controls when these pipes start their sequences and when they look at the data that is passing across the interface. In the case of the V op instruction, the SC section also acts as one of the six pipes of the VPM as well as an interface controller. It is also involved in time slot management and reservation and release control. Further, it looks at conflicts and prevents instruction issuance when a conflict is recognized.

The first type of operation for consideration is called a G register operand or G op. A broadcast G is another name that is also commonly used for this operation. These are vector type instructions which create a vector or a scalar operation and use that created vector instruction to perform functions of add, subtract, multiply and divide. There are three general types of G ops, G op one and G op two (G op 1 and G op 2) are called broadcast G instructions.

The third type is a G op 3. It is also known as a reduction instruction and this is shown in FIG. 287. It is where a vector is reduced to a single scalar value, which is to be sent back across the interface. These G op type operations use three of the pipes of the Vector Processor Module, i.e. the Add Pipe, the Multiply Pipe or the Move Pipe. One of these pipes is active during these operations and these instructions are in the VV format. In operation, we take a value from these G registers and broadcast this single scalar to create an imaginary vector in the Vector Processor Module 162. We take this value from the scalar and create a vector that will have the same value in each of the locations in the Vector Module 162. The pipe, in turn, will take a vector from a Vector File 1300 and add it or multiply it. For example, consider the Add pipe 1600. It will add the first two elements together, find a result and store it into a Vector File 1300. Next, it will take the following two elements and add them. It will add them one by one and store them into a Vector File. There is one thing to remember here and that what we are doing with this G value. This is the same G register value all the way through. We are not putting this G value into a Vector File as such, we are merely holding it temporarily in the pipe. This temporary delay is long enough for the pipe to perform addition and when we are done using it it is essentially discarded. All that was required was the storage of the results into the Vector File. As shown in FIG. 285 this is what is called G op 1 and G op 2.

Now, there are other variations of these G ops that we will be talking about. One of these is called the GIV instruction, or a Generate Index Vector and this instruction path is pictorially shown in FIG. 286. Instead of having the same value used over and over from the G register, the values are incremented. This increment can be anything from one, two, or three on up. What we are doing is incrementing this value so that instead of the same value being used in the pipe all the time, each of these values will be incremented. The SC is again acting as an interface between the Move Pipe 1800 and the SPM 150. The Move Pipe 1800 will be taking this data and buffering it and when it finally receives the data it stores it into a Vector File. Again the GIV Instruction is in the VV format and also note that single precision type data only is used for a GIV instruction.

As shown in FIG. 287, there is the Scalar Processor Module 150 on the left. The SC section 1400 is shown in the VPM and the Move Pipe 1800 is adjacent to the Vector Files 1300. We take an initial value of a G register in the SPM and we send that via a selector register to an adder. We are going to add a certain increment to it. This increment is called a stride and is represented by STR entering the adder. What happens is that each of these values will come across the interface as they are incremented and the SC section will again act as an interface. Now remember that the SC is only controlling the interface, the actual interface is on the F card. The incremented result from the SC goes over to the Move Pipe buffer which will then either immediately transfer the results out or if the Move Pipe has to wait for the Vector File to become free, it will fill up the buffer and will eventually empty the buffer into the Vector Files.

Next, consider the reduction operation as pictorially shown in FIG. 287. A reduction instruction is a vector format operation and it is the vector pipes that are operating on the data. In this case it will only be the Add Pipe 1600 or the Multiply Pipe 1700. Again the SC 1400 acts as the interface to send the data to the Scalar Processor Module 150. Returning to the GIV instruction for a moment, it depends on the OP modifier bits and it's being set to a certain zero one zero pattern in the vector control word. In a reduction type instruction we are going to be going backwards from what we were doing on the previous operations. We have a Vector File that has a vector stored in it, and we take the elements of this Vector File and either add them together or multiply them together one at a time, until we finally get a result.

We take this single result, which is a scalar value, and send it to the Add Pipe or Move Pipe. When it gets this value it informs the SC that we have this value ready to go. Here, the SC is again acting with the Vector Store (VS) as its data path. The VS is a Vector File. It takes this data and sends it across the interface to the Scalar Processor Module and then places it into a specified G register. Another point that should be made here so far as G ops, GIV's and reduction instructions are concerned, for any of the format operations is that we must remember that the SC is only acting as an interface and that the pipes that are involved in the instruction, i.e. the Add Pipe, the Multiply Pipe or the Move Pipe which are in the Vector Processor Module, are the pipes that have to resolve any conflicts. They also have to do the time slot management, as well as take care of all of the housekeeping. The SC is only concerned with bringing the data across the interface, making sure that it comes at the right time and that it is ready for use.

Next, we will talk about the V ops. The V ops or vector operands are RR format instructions and RR format instructions are used in the Scalar Processor Module, scalar values or a particular element from the Vector File that is going to be used in an operation that is going on in the Scalar Processor Module. So we are looking for a certain element in the Vector Files and we are going to put something into a certain element in the Vector File so that we have to specify these sources and destinations. Remember only one element is being operated on at a time and in order to be involved, the SC has to make sure that at least one of these operands is going to be in the Vector File, be it source or destination. FIG. 288 illustrates the V ops path between the Vector File 1300 and the SPM 150. There are two types of RR format instructions, one is called an RR format scalar. This is where we perform an arithmetic instruction in the Scalar Processor Module. Basically, we take an element from a Vector File or possibly two elements and we perform an operation with them in the Scalar Processor Module. Conversely, we may add two G regs in the Scalar Processor Module and store the result into a certain element of the Vector File. The second type of RR format instruction that we have is called the RR format scalar move. This instruction, as the name implies, is where we are moving these elements of data around. We place them so that we may use them. For example, we may do a move from one Vector File to another Vector File, with the location of these elements being specified by some value in the G register. We may also move from one Vector File into a G register or we can move from a G register into a Vector File. Note that in this instruction we are not actually doing any arithmetic operation on the data. The data is left untouched, it is merely moved to another location.

The next subject to be described are the format words themselves. Also we will discuss how these format words are to be used to create vector control words and also how these vector control words will be used to start off the logical sequences. Finally, we will review the timing charts which relate to what these sequences look like.

Consider first the G ops because they are more simple as far as their operation is concerned.

As has already been described, these word formats include various fields. In the VV format, as previously shown, there is a function or f field. This specifies the operation. Next is the operation in single or double precision. The V fields are next and they specify the locations of the vector fields from which the data is taken and into which it is stored. Following this is the 1 field which indicates the length in the number of elements that we are going to be operating upon. The C field follows and it will specify some conditional executions. Finally, is the S field, which will specify the locations of the operands and where they originate.

A standard broadcast G instruction using the VV format word is shown in FIG. 289. This figure shows the f field and that specifies the type of operation that we are doing. The T field specifies single or double precision and the V1 and V2 and V3 fields. On a broadcast G register, remember that we are going to be taking two values and adding them together. Now either one or the other or both of these operands can come from a Vector File. Further either one of these operands may be coming from a G register and the other may come from a Vector File. V1 is the operand 1 source and V2 is the operand 2 source. So these are basically the source addressing. We also have the length field in here and V3 always specifies a vector destination, since we are always going to be putting the results into a Vector File. Between the V3 field and the S1 field are six (6) unused bits. The S fields specify whether we have a vector field being chosen as one of the operands or a G register being chosen as one of the operands. Again S 1 and S 2 are both specifying the source and notice that they are both a one bit field. This means that we only have a possibility of S being equal to a one or a zero. If S is equal to one we are specifying that the source is going to be coming from a Vector File. However, if S is equal to zero we are indicating that the source of the operand is a G register.

FIG. 291 is a pictorial diagram illustrating the Vector Control Word formation and its data path. The vector format words are actually issued by the program to the Scalar Processor Module 150. The Scalar Processor Module will, in turn, have to decode these words and create a Vector Control word containing the necessary instructions the Vector Processor Module needs to actually execute the instruction. As shown in FIG. 291 our program has instructions that it is issuing to the Scalar Processor Module. The IF section 400 in the Scalar Processor Module 150 has to decode these instruction words and then send the decoded results of the vector control words to the Vector Control (VC) section 1100 in the Vector Processor Module 162. The vector control word is then sent by the VC card to the various pipes, to the SC section or to the other interfaces in the Vector Processor Module 162 so that they will all know the identity of the instruction. They look at it via their pipe select and enable lines.

FIG. 292 is a block diagram basically showing the Scalar/Vector Control (SC) card 1400. This is the area enclosed by the dashed lines The three blocks across the top comprise the Vector Control (VC) card 1100. The three blocks on the right hand side are the Vector Files (VF) 1300. We will now attempt to describe how the SC section works with these other two sections, the Scalar Processor Module 150 and the pipes to actually transfer the data from the Scalar Processor Module into the Vector Processor Module. Consider a specific example. Take an Add Pipe instruction and for a G op 1 we are going to take a G register value. For G op 2, we are going to take the contents of a Vector File location and we are going to add them together in the pipe and store the results into another Vector File location. In the block diagram of FIG. 292 we start off with these three sections of the SC cards. The first section is called the G op control 1402. Next, we have a section that we will call the Vector File read/write control 1404. This might also be called the V op control. It is where the RR format type of instructions are going. The third block is the control for the RR format type of instructions, and it is called the interface register control 1406. This is the control area that controls the transfer of data with the Scalar Processor Module. As noted, the Vector Control (VC) section is contained in the three blocks across the top and recall that a whole section of this description is directed to the VC section. Consequently, we will discuss it here only in the briefest terms. The top left blocks is the instruction receive and issue section 1102. This is the section where the VC words will enter and VC will then, in turn, send to the various pipes corresponding the control words that they should consider. The second VC section 1104 is one that looks at conflicts and time slot pattern reservations. The final section 1106 in the Vector Control accomplishes the controlling of the Vector File addressing. The top block of the Vector File section may be thought of as the actual RAM memory in the Vector File. The lower blocks of the VF are the scalar data-in register 1340 and scalar data-out register 1314. These are just two registers that are physically on the VS card. They are directly interfaced to the Scalar Processor Module. These two data registers merely buffer the bidirectional data flow. This overall block diagram of FIG. 292 has lines which are labelled as to their function. All that the G op or SC section is concerned with, at this time, is to get the data from the Scalar Processor Module G register and bring it over to the Vector Processor Module by way of the Vector File cards and hold that information in the Vector Files and then inform the pipe that is going to be working with the SC on this instruction.

The instruction receive and issue block 1102 of the VC receives the vector control word. From there, the word is sent down the decoded instruction line and it is going to come across with the vector control word to the SC section. The pipes are also informed at this time. Anyway the decoded instruction line comes across to the G op control. This G op control is then going to look at the G op enable bits that were included in our vector control word. From those bits it will decide whether or not as well as which operand is exiting the Vector File and where the result is to be sent. As soon as we receive G op instruction, because the G op enable bits are set, we also get signals from the VC that says that an instruction is active.

The next line, called G op wait, adjacent to the decoded instruction line immediately sends a signal back to the VC for issuance to the pipes. This line says two things. It first tells the Vector Control sections to delay the time slot reservation mechanism until the empty section is ready to proceed with the G op and second it prevents their going active until such time as the SC sections are ready to proceed.

So now we have gotten the decoded instruction across, and the SC knows that it is going to have to act as an interface. By this time, the pipe will have attempted to reserve a time slot, but G op wait signal is delaying that reservation. Within the G op control section, the timing chains in this G op control will be started and once they start running they will, eventually, clear this G op wait line so that the time slot can be reserved and the pipes caused to go active.

Now, if we next look at the interface register control block 1406, there are a number of lines. One of them is coming from the Scalar Processor Module and controls the data available and busy line. This line indicates that the Scalar Processor Module has gotten the value into its G register and it is ready to send it across the interface. It has the data values that are already in its output register, and it is merely sitting there at the interface waiting to come across. When it gets to that point, it will raise the data available signal line and the interface control section will then acknowledge that when the data is available and when it does arrive it will acknowledge that it has received the data. A busy signal will be returned to the Scalar Processor Module acknowledging receipt of the data. In the bottom right hand corner of FIG. 292 is the Vector File scalar data-in register 1340. this is data coming from the Scalar Processor Module into this register. Now the interface register control operates the enabling of this register so that both the in 1340 and the out register 1314 are always enabled. We disable that register at such time that we know that the desired data is in there. We just freeze that data tat is in there. That is what the HOLD data clock enable line accomplishes. At this point, the timing chain knows that the data has been passed into the Vector File card. The pipes are informed via the hold G op data (clock enable) signal line to the Add Pipe, the Multiply Pipe and the Move Pipe in the upper left hand corner. This enable signal line tells the various pipes that the data has passed across to the Vector Processor Module. So we are sending this signal to the various pipes and they, in turn, will use this signal to allow the data to pass via their own paths into the Vector File. The pipes determine how long they need it by the element count that they have received in the Vector Control word, and all that the SC has to do is to get the data over to the data-in register 1340. The SC causes the data to be taken from the data-in register and moved into the augend and addend registers (not shown). The pipes will hold it there. This is accomplished by the MUX control pipe data register line entering the Vector Files. When the data is received at the point where control has been given over to the pipes, it is their responsibility. The Vector File scalar-in register 1340 is then freed since the hold signal is no longer active and this allows the register to return to the constantly enabled state so that more data may be accepted.

In so far as the SC is concerned in this instruction most of the other logic sections shown in FIG. 292 are not involved. The Vector File read/write control block is not active, since we are not performing a V op instruction. Since Vector Control conflict detect section is not the one that is going to reserve the time slot the SC is not involved. The SC is not involved with Vector File addressing since that is done for the SC by the VC card, so that when the VC card receives the Vector Control word, the Vector File addressing has already been accomplished. Be aware, however, that the VC is actually working with the pipes to free those conflicts.

FIG. 293 and FIG. 294 illustrate the logic diagram and the timing diagram of the G op sequence. FIG. 293 is a detailed logic diagram of the Scalar/Vector Control (G op Control) shown generally in FIG. 292. Note particularly, the G op MUX enable register 1408 with its set and clear inputs which provides the MUX control to the Vector File. At this point, the G op control drops the G op wait signal and when the G op wait signal level drops, then, at that time, we are able to reserve their time slot. When the pipes have their time slots reserved, they return a ready to accept G op data signal, so that we know that they are ready to go ahead with the instruction.

We will start with the reduction instruction because that is probably the most simple instruction. Again, we are going to be using the Scalar/Vector control section here. We are going to go through the same process of entering the Vector Control word and we also know that we are executing a reduction instruction. We will set the G op wait register and we are going to do this for just two cycles. In that way we will execute the reduction instruction where we are taking all of the elements from the Vector File. These will be reduced down by the pipe which takes all of the elements from the Vector File to get a single scalar value which is sent back across the interface. So, generally, all that need be done by the G op control is to condition itself so that the interface is open and ready to accept the data returning from the pipe when the pipe gets its answer from the reduction instruction. We have to make sure that nobody else is going to be using the interface at that time and that all of the proper lines are enabled. What is really important here is that the pipe has gone ahead, done its reduction and it has a single answer ready to go across and it sends this signal back to the G op control. The G op control will, in turn, send a signal back over to the interface register control which says that the result data is available for a reduction instruction. The Scalar Processor Module is then notified that the completed data is about to come across whenever it can be accepted.

The timing diagram for the GIV instruction is shown in FIG. 296. The Scalar Processor Module knows that there is a GIV instruction being executed so it is necessary that the data available line signal be up for a longer period of time. This is necessary because the data is going to be changing on the interface on the fly. It is going to be an incremented value and the data will coming one right after the other. We have to be able to accept them one right after the other, so the data available line must be up for a specified amount of time. That amount of time is determined by the element count and also by the stride. What is happening then is that we bring this data available across to our interface register control and in this case, all we have to do since we are not going to disable the Vector File scalar data-in register, is to let the data pass through the Vector File scalar-in.

FIG. 293 shows all of the logic that is on the SC card and as we have mentioned, there are four timing chains. We have a number of G op MUX enable signal lines. These are the ones that are going to the VF card so that we can enable the transfer of the data from the Vector File-in register to the augend/addend registers. We have included the logic that is going to decode the type of a G op operation that we are going to be doing, be it a G op 1, G op 2, a G op 3, a GIV or a reduction instruction. This decoding circuit will also determine when we enable the various pipes. The clock enable signal goes to the pipes so that they know that we have gotten the data into the Vector File scalar data-in register and we have gotten out the G op wait information. This data-in register is a register that is set and cleared. It gives us a way of determining which pipes are going to perform and also allows us to solve the G op instruction in the correct order, be it 1 or 2. Recall that in the case of a dual G op operation, we always solve G op 2 first, and the G op 1 second.

In the lower left hand corner of the G op Sequence logical diagram shown in FIG. 293 are a number of input signal lines. First, we must make sure that a G op operation is not presently being solved by the SC section. Also we must make sure that there is not a GIV instruction being executed, nor a reduction instruction, nor a V op operation. In other words, we are checking to make sure that the SC interface is open. The AND gate receives the G op lockout, the GIV not busy, the G op 3 not busy and the V op not busy signals. If all of these signals are present when any one of signals from the OR gate is received, then the G op 11-14 instruction is started. Be aware also that this is a path that we can use to set G op wait bits.

Returning to FIG. 293, we have gotten the start condition on the G op timing chain. The adjacent line is called the restart signal line. If this timing chain is aborted because of the presence of an A or Abort signal the pipe will not be activated. However, if the pipe is ready to go, the abort signal is removed. A restart signal will continually be applied to the timing chain until such time as the abort signal is removed. When the abort signal disappears, then the timing chain will be allowed to cycle up to an appropriate time. The G op enable bits G op 1 and G op 2 will be decoded to make sure that we have a G op active signal and that together with the previous timing chain will create a start on the G op write timing chain shown in FIG. 293. The G op extended timing chain 1410 will only run in the case of the dual G op type of operation. Anyway, once we have gotten this second timing chain started, notice that this abort arrives after a second clock time, so we have a restart capability and the third starting capability comes from the G op extended timing chain. Essentially, all we are interested in here is the start signal which starts the timing chain. Continued attempts will be made to start until such time as we know that the data is available in the scalar data-in register. When this occurs we are allowed to go on to the next line on the timing chain. This, in turn, sends off a start signal to the next timing chain which will move the data from the Vector File data-in register and place it into the augend and addend registers (not shown) on the VF card. At the same time that we are sending a signal we are going to clear the G op wait at this time so that the pipes can get their time slots reserved. This means that they can go active and take the data and start using it in their computations. As shown in the OR gate 1412, central to the figure, the three different pipes have three different timing configurations so we are able to enable the various pipes at different times upon different phases from the timing chain. This is represented by the OR gate 1412 and it is this circuitry which is going to decide which pipe is going to get the clock enables, i.e. whether it is a G op 1, or a G op 2.

Next, these timing chains are activated and the pipe select lines determine whether or not a G op 1 or 2 is chosen. Next, we receive the clock enable signals and they go to the pipes. We are also determining whether or not we have one or two of the operands or the G op's are enabled. When that is set we also look at what type of G op operation is being done. We make sure that the G op timing chains have started and once we know that, then we enable the data to transfer over there and then the pipes will then be informed that we have got the data into the augend/addend registers. They can accept control from there and the SC will then release itself. That is basically what a single G op is doing, however, in the case of a dual G op, we first decide whether or not there are two G op's active. If there are then both operands are entering from a G register. This means that we have to go through this G op sequence twice to bring the first scalar value over. Once we have done that we have to bring the second G value across the interface. So we have to go through this sequence twice and the G op extended sequence circuit 1410 shown in FIG. 293 does this. When it is decided that there are two G op's active and we have solved the first one to the point where we know that the data has come across the interface, then we will start off this G op extended timing chain. It will not abort since there is no abort signal applied to it. It will therefore run straight through and come around and try to start the G op write 11 through 14 timing chain 1409. When we get to this point, this second timing chain will be aborted until we hit the second bit of data coming across. When that happens then this timing chain will continue on to completion of the second sequence.

In the case of the G op termination timing chain 1411, we keep out the G op MUX enable signals to 1408 for the entire time. This is done so that we can accept two bits of data instead of just one.

In the case of the GIV instruction, we are going to look at the GIV enable bits and they directly enter the G op 1 and 2. Recall that we are also going to have to go through the G op timing chain sequence to make sure that the interface is not busy. The G op wait will be reset and we will pass through the timing chain and wait for the data available to come across, but in the case of a GIV instruction, the data available is going to be up for a longer period of time. In this case, we send the data directly to the Move Pipe and bypass all intermediate steps. The SC waits for a signal to return from the Move Pipe indicating that all the data available has been received. Thereafter, the Move Pipe is cleared since it is not needed any longer as an interface.

Consider next, FIG. 294 which illustrates the G op timing sequence. The sequence shown is for no conflicts and the top line shows the cycles 1 through 7. Each of the cycles is divided into four phases. The issue signal is the next line and it is the one that comes from the Scalar Processor Module over to the Vector Processor Module VC control sections. It arrives with the Vector Control Words (next line) saying that there is an instruction that has to be done. The Vector Control Word (VCW) bits then are decoded by the VC and sent through the various pipes. The next line shows the SC getting a signal that says the instruction has been received. The G op enable bits in the Vector Control Word will start the G op wait. The G op timing chains are started so that a G op wait set is received. The G op wait will cancel time slot reservations at least for the first two cycles. In this case, the pipe shown is an Add Pipe single G op. The Add Pipe will acknowledge to the VC control section that the Add Pipe is the one that is going to be working on the instruction. Once the G op wait stops, the sequence is activated. The time slots are reserved at that time and the read and write time slots TS0, TS1 are used. At this time, the G op wait timing chains are set and started and they run through to completion. Once we get a data available signal we, in turn, send a signal acknowledging that fact back to the Scalar Processor Module. By the time that the timing chains have gone through to completion the sequence is completed. He then tells the Vector Control section that it can drop the instruction received and can issue another Vector Control Word.

Data available is a totally asynchronous signal and it is not known when it is going to go active in relation to the Vector Control Word. For example, it can come up before the SC section actually sees the Vector Control Word or it can come up many cycles after it has received the Vector Control Word. This is why the SC section has the enable signals going to the Scalar data-in and data-out registers, it allows the sufficient time to line up with the correct Vector Control Word and to be sure that it is actually operating on that instruction at that time and that it is the correct data for the instruction.

The Scalar Processor Module can issue VCW's at a maximum rate of one every 30 nanoseconds and the Vector Processor Module, at best, can only handle one every 60 nanoseconds, so there is a possibility of a conflict there. It is very possible that we will get the data available signal long before the Vector Control Word is seen. Likewise when we are trying to send data back to the Scalar Processor Module there is the possibility that the Scalar Processor Module is busy trying to do another instruction and cannot accept the new data. Some way must be supplied for us to hold on to that data before it is sent over to the Scalar Processor Module. Remember that the data available signal may arrive at any time during this sequence. If that happens before the Vector Control Word, the timing remains basically the same but remember that the G op wait signal is waiting for the data available signal so if it comes up quite a bit later, say 6 or 7 cycles, then the G op wait must be extended. Many potentially reserved time slots will be cancelled, and we must keep the pipes from going active during this period.

A reduction instruction is made where we are doing an element count of less than 2. This is shown in the timing diagram of reduction instruction as illustrated in FIG. 295. Because a reduction instruction will become a very long instruction, dotted lines are included in the timing lines to show the break that exists between cycle 6 and 20. To start, the instruction issues and the Vector Control Word starts at the same time. Shortly thereafter the instruction received signal comes across. A G op wait sets again for a minimum of two cycles until our timing chains get going. Once this happens, we are going to set the G op 3 to busy in the SC logic section. This keeps us from starting up any other G op, or V op. The Add Pipe is again used as the example, so the Add Pipe will send an acknowledge signal. This will acknowledge to the VC section that the Add Pipe is to be used. The Add Pipe will start trying to reserve time slots, but it will be unable to reserve until the G op wait signal disappears. Once this happens the time slot is reserved. It will be a space read space write time slot reservation. The instruction is going to go on for at least 18 cycles where the element count is less than 2. Once the time slot is reserved the sequence will start. When the AP has finally gotten its scalar value answer, it is sent across to the Scalar Processor Module and placed into the G register. The AP informs the SC with a signal called reduction available and it arrives at cycle 22. The SC when it discovers that it has a reduction result available, will send a data available signal to the IFC section telling it that it has reduction results available which the IFC section should ready itself to take. Generally, this sequence is what a reduction instruction looks like. Conflicts, of course, can stretch things out in much the same manner as previously discussed with regard to data available being accepted by the Scalar Processor Module. In any event be aware that there may be conflicts and the pipes themselves will resolve them, not the SC section.

A timing diagram for a GIV instruction is shown in FIG. 296. This instruction has no conflicts and an element count of nine. Again we start with an issuance of an instruction and shortly thereafter an instruction receive signal is sent. The G op wait signal is going to start up for a longer period of time because the Move Pipe has to take a longer period of time to get started. Next, we wait until we receive the data available signal. Once we get the data available signal we can clear the G op wait signal. The Move Pipe then gets a time slot reserved and the data will then start streaming across that interface. The first two elements, zero and one, enter the scalar-in register. This means that the element zero and element one are crossing at this time. We get about 3 cycles for the first two elements to cross but for all of the following elements come across one right after the other, one every cycle. Now recall that data available has to start up for a longer period of time and notice that it is staying up for essentially the same time as the element count. So once the data available signal falls it no longer accepts data into the buffer and the desired element count has been reached. This means that we now have created our index vector in the Vector File.

Referring next to FIG. 297, which includes 297A and 297B, there is shown a plurality of timing chains in block diagram form which illustrate our basic control mechanism. These timing chains are used in conjunction with a plurality of counters whose outputs generally pass through a large OR gate. These counters are the ones that are going to generate the release that is sent through the large OR gate to the VC section. As previously mentioned, we have an initial time slot location counter that has to be synchronized with the VC section by forcing it to zero. It is necessary to have some way to determine our current element point, so that when we know the point, we will know when our read data is going to be available, or when that element is going to be entering through its window. It is necessary to have four of these release mechanisms because at the rate that these instructions are arriving, the read V ops can come across every 30 nanoseconds from the Scalar Processor Module. Just to be able to handle that instruction flow rate it is necessary to be able to, in effect, to stack up some of these read V ops time slot releases. To do this we have to be able to release the correct time slot at the correct time. Consequently we have to be able to handle a number of these things concurrently. Four counters were decided upon as an optimum number of these counters to accomplish the task. In any event, we have four time slot counters across the top of FIG. 297A. We can select each of these counters and increment them so that we always start out with the first instruction taking counter A; the next one, counter B; the following one, counter C; and the last one, counter D. The arrangement here is similar to that with the G op's. Here again, we have timing chains which use the same gate arrays. Remember that there are three timing chains to each of the gate arrays. The abort signals, as is the case with the G ops can come at different times. This is the sequence in which the aborts become quite important and they are noted as to when they occur. Referring to FIG. 297B, the Vector Control Word (VCW) issued from the Vector File is applied to the AND gate 1413. We also check the pipe decode signal to decide whether the SC is going to be involved or not. Next we check to make sure that the V op is not busy. That is, there are no reads or writes going on. We also make sure that a time slot has been reserved. This is all done by the signals concurrently entering the AND gate 1413. The presence of these conditions will start off the first timing chain. It is aborted by the presence of a signal called pipe active. This occurs if both the SC busy and the V op enable signals are present at the abort AND gate 1414. When our abort condition disappears we get the start condition. Since we have our time slot reserved, we immediately want to initialize our time slot location counter to zero so that we become synchronized with the Vector File. This is shown by the line connected between location 11 of the File R/W TC and the select side of the time slot location counter. This forces the counter to all zeroes. The output count of this read time slot location counter is commonly sent to the data side of all four of the release counters. These counters will be looking at this data for their input but they will not do anything with it until such time as they are directed to do so. To continue, we had started this timing chain, and initialized the location counter to zero. We then feed this output into the compare means. This compares the current element point with the count presently in our time slot location counter. If we have zero here we would immediately get a compare indication and this will tell us that our read data is available from the Vector Files. That signal also enters into the abort side of the next timing chain. This first timing chain has been allowed to go and it is going to try to start the next timing chain under the condition that we definitely perform a read V op operation. The restart signal is used where we have to wait for the data to become available. This becomes more evident in the case of the large element point which comes up quite a bit later in the sequence, and it is necessary so that we have some way of restarting the timing chain until we get the available data. So the available data enters the abort input and as soon as we get data available, this timing chain is allowed to run. The V op termination timing chain is started from one through 24. In this case we are doing a single V op so the abort signal is going to be low or inactive at this time. The write only V op signal is ignored and that is how the time slot release is generated.

The timing chain is started and once it gets going, since the abort is gone, this happens immediately. At time 22 a signal 1415 is sent to all four of the counters A 1416, B 1418, C 1420, and D 1422. They are looked at by the respective AND gates and sent to the Selector inputs. The output from this Selector activates the first timing slot release counter and we are going to use counter A. So the selector is initialized to A and the gate is selectively activated, so that element is taken as the data and time signal 22 with the select signal selects the data which is going to be equal to a one at this time. Next, he is going to put it into counter A. On the output of this counter is a one shot mechanism (OS) that essentially circles back around to disable this selector from allowing any other value entered as data. Thus, this data has been captured and the counter starts. When the count reaches two then he will generate a release signal to the time slot mechanism and the read time slots (TS) will be released. Now this one shot (OS) also ensures that these counters are going to be continuously counting. However, they are going to be forced to an initialized value so that we can also be reaching a count of two. If this counter has not been selected, this one shot will prevent us from sending a release when we reach a count of two on a normal cycle.

For an element count larger than zero we are going to be addressing the Vector Files again in the same manner. They start at zero, and the time slot location counter is going to be initialized to a count of zero. Now the read data is not going to come up correctly as it did on the first example. This is because our element point is four and the compare operation will not occur until the time slot location counter arrives at the four (4) count. When we get the compare count to four the value that is transferred over to the release counter is a five. This means that we have already passed the count of two so our read time slot has come down and then cycled on up. Meanwhile, we have not generated any slot release because we did not know that there was read data available until that time. So we have to keep this time slot reserved because it has not been used as yet. It will continue cycling on through because we have to get to a count of 2. When we get to the count of 2, we pass through the delay and then into the OR gate. So on the second time that the time slot location 4 is reached, the release is generated. The write time slot has an auto release, so it has been released at the same time as for an element of zero.

FIG. 299 is a timing sequence diagram for a Read 2 op operation with an element point equal to seven. Our read time slot location counter is synched to zero so we are synched with the time slot release mechanism. We count until we get to 7 at which time we get a compare signal. This compare signal indicates that the read data becomes available at this time. But notice that we have already passed the first occurence of the time slot release, so we have to continue cycling through for the next time. It might appear that we would generate a release at this time, however, because we have a dual V op operation being executed, we want to hold that time slot until we have found the second V op. Anyway, we avoid the generation of this timing chain 22 signal so that a release counter is not selected. So now we select a release counter. First, we synchronize the release counter and when it gets to a count of two, it will go through the delay logic and through the OR gate as previously described. It will then generate the release signal on time slot four and then finally release the time slot. So this final read/write timing chain has started out to read the V op termination timing chain and we are waiting on this data available signal. What has been accomplished is the execution of a dual V op type of operation.

Consider next, FIG. 302 which illustrates the logic diagram for a V op write only operation. It is similar to what we saw for read V ops in that we have time slot location counters, compare logic, and timing chains. We have to remember from the read V op sequence that we had a file read/write timing chain. A similar timing chain is illustrated here. It will go for either a read or a write operation. Thus, we have the write time slot location counter just as we did for the read time slot location counter. It is a separate counter that is normally continuously cycling. When we select this, we force, instead of zeros, a six (6) into the data input. Again, a comparator type mechanism is illustrated. This is where we compare the current element point with our time slot location counter. In this way we know when our window arrives for doing a write operation. When we receive this window we generate a write done signal. It enters an abort entrance on the timing chain much the same way as we had with the read V op type operations. There are two counters, A and B. We only need two counters in the case of a write operation. This is because write operations cannot be issued at as fast a rate from the Scalar Processor as that possible from the read operations. We also have the same mechanism for a one shot so that we select the data only when we want to actually generate a release signal. These counters are always counting so we just select them and force the data in. The selector is jut a toggle mechanism 1425 that repeatedly goes from A to B, so it is more simple than that used for the read time slots.

f. Vector Load (1200)

Our objectives for this description are basically to present an overview of the load vector instructions and to provide a detailed explanation of the AG logic. There are three load vector instructions. They are: the load vector, index load vector and load alternating elements vector. First, we will provide an overview of the data path and the address formation. Secondly, we will take a look at the scalar module action. Thirdly, we will specifically review the address generation logic within the Scalar Module. Fourthly we will review the data path and the scalar vector interface and finally, we will take a look at the Vector Module action.

First, consider the three load vector instructions. Initially, we must load the vector, next, load the vector index and then load the alternating elements vector. These are the instructions as they appear in FIG. 307. The f field is the function code, the t bit tells us single or double precision. A zero t bit means single precision, while a one t bit means double precision. V1 is the destination vector. It indicates which vector we are going to load. The 1 field will tell us where we are going to get our element count since we are working with the vector, while the G3 field tells us which G register we are going to be using for the start virtual address. The J bit will tell us how we are going to get the stride from G register and whether it is a stride one or two. The C field tells us which value of the mask we should use. You can ignore the mask, but we can use a 1 in the mask or zeros. The load vector index is the same as the load vector except that rather than use a stride we use another vector for indexes. The load alternating elements vector (LAEV) is where we have two destination vectors and we alternately put the data in V1 and V2 and there we can use a stride also.

Next, consider FIG. 308 which is a block diagram of the logic involved in the load vector. The load vector starts with a virtual address in the G register. The left half of the G register is the virtual address and the right half is the stride, if a stride is to be used. When we issue the instruction, the contents of the left half of the G register will be sent to the Address Generation section and that becomes our virtual address. Virtual address is then translated into an absolute address and we will use that when we re addressing the HPSU. The stride that we use will usually come from the right half of the G register. So the first time you take the absolute address through and address the HPSU. This will come back around and the next time we add in the stride value and generate our address. These addresses are then sent to the HPSU. Sometime later the data will come out of the HPSU and be sent to a load buffer. From the load buffer there will be sent to the Vector Files. The load buffer is located in the Vector Module. The Scalar Module is basically in control of getting the data to the load buffer and the Vector Module will take the data from the load buffer and place it into the Vector File. Next, take a look at the data path involved. The data most of the time will be located in the HPSU. The HPSU entry zero may get the data out of Local Store and in general we will be looking at the HPSU. The four words of data from the HPSU is loaded into an input register in the Local Store section and from there it is sent to the Vector Load section and loaded into a load buffer. This buffer can handle up to 64 element vectors and from there it is loaded into the Vector File. As was previously stated, the Scalar Module is responsible for getting the data into a load buffer and the Vector Module is responsible for getting it from the load buffer to the Vector File. Now, recall, as is shown in FIG. 309, that this is a four word data path all the way through so at its maximum speed it is capable of sending four words every cycle. At this point we can change the data around, putting it in the proper order. The order that it sits in each HPSU is not necessarily the order in which we desire to load it into the Vector Files.

Next, consider the Scalar Processor Module 150. Mostly we will be looking at the supporting function of the Scalar Processor Module. There are basically four sections that are involved in the load vector of the Scalar Processor Module. They are: First, the Instruction Flow control section 400 which is responsible for the instruction decode and the instruction issue. The Loop Control section 1000 is second and it provides the element count to Address Generation section 700 and Vector Control section 1100. It tells us how many elements it can store in the vector. Third, is the Mask (MK) section 600. It will provide a processed mask to the Address Generation section 700. By processed, we mean placing the c field on the mask so that you can change the mask. The SP section 900 provides the start of the virtual address and the stride to the AG. The Scalar Processor Module 150 issues an instruction and during that we send the IF 400 a signal telling it that we need to read out of the G register and send it off to HPSU.

First of all look at Instruction Flow section 400 shown in FIG. 310. It follows that when this instruction is issued out of the instruction buffer 402, it is loaded into a hold register. From the hold register 420 we will send off the information that we need for the element count to the Loop Control section 1000. We need to send it early, in order, to have that the information is ready by zero time. The instruction is loaded into the NI register 422 and both the VFO 424 and FO, 408 registers are cleared so that we may load the instruction there. From this point, we send the instruction presently in the VFO 424 to the vector side of the Vector Control section 1100. It also sends the c field to the MK section 600 in order to process the mask. On the scalar side, from the FO register 408 we issue an order to the Address Generation section 700 to get it started on the instruction and send it to the F1 section 426. From there we will send the information over to the G register in the SP section.

As shown in the timing diagram of the next instruction of FIG. 311, if the next instruction uses FO, it is either a scalar instruction or another dual modular instruction. The next instruction (NI) can be held back until we have the mode vector instruction on its way. If the instruction goes to the HPSU hold, the next instruction coming in is blocked until the address ready signal comes back from the AG section 700 telling the IF 400 that the address has been translated and they are now ready to start requesting data. If we are going to the Local Store for the data, the AG 700 will send a signal back to the IF 400 saying we are going to Local Store 300. We need to do this in case the next instruction uses Local Store, so that when the segment zero does drop we can drop the hold signal and let the next instruction enter.

The Loop Control section 1000 shown in FIG. 312 is responsible for supplying an element count (ELCNT). From the IF hold register 420 we send the t field and the 1 field through the Loop Control section. It enters the NI register 1008 and from there an ELCNT selection is made. In case there is an overflow or if we have a zero element count, we select and send the necessary signals to the Vector Control section telling it that a zero element count has been received. Basically, the same process goes on with the AG, except that the F1 time is just like the FO time. So the Loop Control section 1000 is responsible for sending the element count to the Vector Control section and to the AG section.

Next, consider the Mask Processor (MK) 600 shown in FIG. 313 which illustrates the MK role in the load vector. From IF the Mask is sent to the c field 608 to determine which values should be used for a mask. As shown in the FIG. 313, a zero in the process mask 606 loads the element depending on which c field is received. A C0, C1, C2 or C3 field places a different value in the process mask. If both are zeros, this means load L elements. We may load in the mask or load only those elements corresponding to zeros in the mask before we load the top of the mask load elements i.e. those elements which have a one in the mask. So a mask is basically processed in the c field and sent over to the Address Generation section for processing.

Next, we will discuss the Address Generation section 700 in more detail. First of all, consider the functions of the AG section and what it needs to do for the vector. Its first function is to generate addresses for the HPSU or to the Local Store. Second, it needs to make requests to the HPSU for data. Third, it has to control the data from the HPSU or Local Store to the Vector Load section and basically it controls the loading of the vector load buffer. As mentioned before, the AG is responsible for the addresses to the HPSU and to the multiply store. It is complicated because we are working with four words at a time in the HPSU, so everything has to be addressed in four word blocks even though we will only get one word out of the block. Secondly, the AG is involved in data control and because we are getting blocks of four words we just select the correct data from the four word block. Since we may not need all the data we have a mechanism called a load select memory. This enables us to select the correct data that we must read from the HPSU and which must be put in the correct order for the load buffer. We also need to process the mask and load the select memory. We must keep the mask information along with the data. The mask is not used but we associate the mask with the data and send it over to the Vector Processor Module. Now this information contains the valid bits and the mask bits and in the selection; it all enters the tracking memory. The reason we have a tracking memory is because there is quite a long delay between making the request and receiving the data back. During this delay all of this information about the data must be stored away so that we can pull it out once we get the data back from the HPSU.

The load vector sequence is basically controlled with timing chains in the AG logic and these timing chains are under the control of the element counter. The element counter starts with the number of elements that we are going to transfer and it counts down. Once we reach a value of approximately zero we will know that we are finished with the instruction.

Look at the block diagram of FIG. 314 showing the addressing scheme. Our address comes from the real (base) memory 716 located in the AG section. Assume that we have already translated the address and the result of the translation is loaded into a memory. What we have is a memory with one entry for every G register. This is a speed up mechanism since if we need to do another load vector in the same G register, we already have it translated. It can be used right away since we do not have to go through the translation process. The real memory has an actual base address which is going to be used for the HPSU. This is loaded into a buffer and the first time around, the addend buffer 718 will be zero to start. We send that address off to the HPSU and request the data. Now the addend buffer register 718 and the absolute address buffer register 720 both contain 36 bit words. However, the address being sent to the HPSU is 22 bits wide. We also lose the last two bits of the address since we are addressing four word blocks. The stride will come out of the stride memory 722, if we are using a stride, and we select between the stride and the default stride. Default strides are one, two and four. One is for a normal single precision load vector, two is for a double precision load vector or alternating load vector and four is for a double precision alternating vector. So we select our stride and the value we should add to the address and that information is loaded into an addend buffer 718. We will then keep adding this addend to the absolute address 720 to constantly increment or decrement our address and then send that out to the HPSU and make the request.

Now, as shown in FIG. 315, the sequence is slightly different when going to the Local Store section 300. There is a longer path to the address and the source of the address is different to the Local Store. We get the address from the real memory 316, but it is from the virtual segment offset (VSO). We do not need the base address while we are going to Local Store because the base is going to be zero, so we just need to know how far into the Local Store 301 that we can go to the offset. It is the same mechanism that is used with the addend buffer 318. The output is sent to the Local Store section and we circle around into the addend buffer 318 and do the same thing over and over again. It is important to remember that with the Local Store 301 we can address a word rather than a four word block. This will be happening at the same time that we are addressing the HPSU. It is necessary to know what is going on in both the HPSU and the Local Store because we may want to go to the HPSU in case we run out of Local Store capacity. We will not know this until we actually calculate our address from the Local Store 301. Once we know that, then we can calculate our destination address.

Assuming that we are going to be using a stride for the instruction, the stride will come out of the stride memory and it will be loaded into the stride buffer 324. If it is not an alternating index we must do an adjustment on the stride due to the definition of the stride and the machine architecture. The architecture describes the stride as an amount that we wish to offset the elements. For the first element we need to add one only if we are doing an offset. If we are doing a double precision alternating operation we have to add 2. So the stride is loaded into a buffer and from there it is loaded into the addend buffer 318.

FIG. 316 illustrates the stride buffer operation. In this case we load that into the addend buffer and there we may need to shift the stride depending upon where the data is going to be in relation to the HPSU. For example, if we have a stride of one, then we need to actually add 4 to the address in order to get to the next block with four words. This is because we use those last two bits such that we need to take the one from the stride buffer and shift it by two places and we get a four. Then you have to add four to the address in order to get those words out of the HPSU.

The control on the addend buffer is going to decide whether we are doing an index or not. If we are doing an index we select the index input while doing a load vector and we take two bits out of the load select memory. Two bits will be exiting the load select memory and they basically control the stride by indicating whether or not it should be incremented. The information from the load segment memory is now under the control of our address and our stride.

An example may help. Assume that we have a double load vector with a stride of four. We are interested in receiving the four words residing in that location in the HPSU. This is shown in FIG. 317 which illustrates a double load vector with a stride of four. We really do not care about the other data. We make one request and read out these four words. Then we make another request and read out the next four words. Now the first request resolves in the first two words and they are sent over to the load buffer. The load buffer in turn will send them to the Vector Files. Sometimes it is necessary to change the data around since we do not necessarily want those words in those positions. That is we need to move them to the other positions. To do this we take three and four and load them into positions three and four. Next we set the corresponding valid bits and send them off to the load buffer. This controls the loading of the load buffer and allows the necessary data manipulation to get it in the right position in the HPSU.

Another example, as shown in FIG. 317 is the load vector with a stride of three. To read out four words we must make three separate requests of the HPSU. The first request results in two valid words, one and two. They will be moving into the positions shown in order to correctly load the load buffer. Three and four bits are loaded up that order. These are valid bits and they are set. We also have to send the corresponding mask bit along with the data so that we may also do some manipulation with the mask.

Next look at the load select memory. FIG. 318 illustrates how it is actually implemented in the logic. There are two load select memories. Memory A is going to handle all of single precision load vector and memory B is going to handle double precision, as well as single and double precision index and single precision alternating. Double alternating is a special case and that includes hardware that does not exist in the memory at all. We initially supply load select memory A with an address. The input to the load select A address is in the information about the stride. As was shown before there are two different cases of stride. They were totally different so even though some information from the stride is negative or positive or zero, one, two or three, that information is loaded into the address register. Two additional bits arrive from the last two bits of the base address and are loaded into a register. From the output of the load select memory A are two bits that will come around from the output to the address register. This is our jump mechanism and we need these two bits to control the stride. They tell us whether to shift the stride or not or to increment the address. Then for each data word we have two bits for the word select. This is needed in order to reposition these data words so that we have correct positions.

The mask logic is illustrated in FIG. 319. It enters from the Mask Processor 600 and is loaded into a mask register in the AG section. As we start to load or make request of the HPSU, we select off four bits of the mask and these four bits are loaded into one bit latches 612, 614, 616, and 618. We can select any one of these four bits. We select off the mask of any one of these positions depending on what the load select memory bits tells us. There are two bits for each one of the words. This zero corresponds to word zero that is the word to be read.

Now we take the mask and we keep shifting it via mask shift 608 so as we make the request to the HPSU. So what it will do is, it will bring the mask around here into a slave register 610. We will shift the mask depending on the value indicated by the load select memory. In this way we know we are going to be getting four valid words and we know that we have to shift the mask by four bits. There is only one valid word shifted by one bit. It enters and tells us that this word is valid. From here they enter the tracking memory because once we get the data, we can read from that tracking memory and send this information on to the vector side of the machine.

The tracking memory shown in FIG. 320 consists of several input registers, a memory 620 and several output registers. A great deal of information must go into the tracking memory 620 and we will go through it one piece at a time and send the valid bits off to the vector side. This indicates the selected words. It tells them which data words are going to be valid and which of those data words is going to have an associated mask bit. We need to send the word select bits to the Local Store section, so there is going to be two bits for each one of the four words. Now there is another bit to tell us when we are doing a load vector and still another that tells us this is the last pass to be made. There is also going to be a count of how many valid words we are sending. All this is loaded into a register and from there on it will proceed into the tracking memory 620. There is also a bit that will tell us whether we are going to Local Store 300 or to HPSU 16, once we get out of the tracking memory, since we need to know the source of our data. The mask will get inverted at this point since the mask is zero. Also remember that we must read and load that element.

Because the vector side expects the mask signal we need to load the element and invert the mask if we have a valid address. If we do have an invalid address, we keep the mask at zero and it will prevent any of the data from being loaded into the Vector File. Now, if we are getting our data from the Local Store we need to bypass the tracking memory. Further, since there is no need to worry about any delays from the Local Store, we know we are timing perfectly, so we bypass the output register. The tracking memory 620 can hold up to 16 information entries and that corresponds to 16 outstanding attitudes so that when they return we know that we can increment our address and let that information exit the tracking memory. Most information will go to the vector side except for that from the select memory which has to go to the Local Store section. A word count is sent as the last transfer and this is loaded into the Vector Load section. Word select and valid bits are sent to the Local Store and Mask sections at this time.

Next, we will discuss how this information gets controlled in the load vector of the AG section. First of all, the AG section 700 is controlled and the load vector is controlled by timing chains. FIG. 321 illustrates these timing chains that control the whole operation. Initially, we are setting up the things that are needed to start off an instruction. If we just follow the path as it goes through, we see several points at which the sequence can be stopped. The first point is a vector busy point. This means that there is a vector already being executed and we cannot be allowed to enter at this time. If you remember, once we send the address ready signal, the next instructions may be issued so we can be busy with vector instruction and also add the next one. At this point it stops, and we must wait until the previous instruction is done. For the moment, assume that we are not busy and we continue along the chain. We will then reach the point A where several things must be valid before we can continue. The most important item is a previously translated valid address. We also must have a valid element count (ELCNT) and a valid mask. This signal sent from the IF section indicates that everything is valid. If the mask or the L count is being used, a load buffer is needed and we must have room in the load buffer before we can go ahead and start. Information is fedback from the vector load section if the buffer is full or not. If we are doing an index equation, the index must be zero before we can go on so we do not wait until these enable signals are set. We also have to watch our ACK 1 and ACK 2 counters and make sure that we do not have too many outstanding ACK 1's or ACK 2's. If there are any problems with the HPSU we have to stop, however, we may go ahead and make the request. If all these conditions are met, we will continue on with the chain, this is just another initialization. Basically, and this is the most important thing, we must load up the element counters and the mask and then get our stride and the load buffer setup information. We will then continue on the timing chain to the next section. Now if these conditions are not met, we will continue to wait here. Before the instruction is started we keep waiting until these conditions are met. At this point we check the element count for zero or overflow. If it is zero or overflow, we just stop and clear everything out and look for the next instruction. We must have room in the load buffer for this instruction. Also, we must have indexes available and when the store vector is running, they enter the load vector. If these counters are greater than the reference numbers then we have to stop and wait until the HPSU is available. Once the chain is started, this will set another wait timing chain. We have to stop while we are executing this vector. However, it will start up again once everything is cleared out. Now this chain will just keep operating to basically control our address in the load select memory and our masking operation. The only way it is stopped is if we detect a last pass. There is also another mechanism which can temporarily stop us. This is the situation where we find out that we actually have to go to Local Store rather than to the HPSU. We then have to stop this chain because this chain is going to the HPSU and another chain is started which goes to the Local Store which will control this data from the Local Store.

Along with the timing chain control we have an element counter. The element counter is loaded at the start of instruction and it will count down and will tell us when to stop. So the element count comes from the Loop Control section and the element count is adjusted depending on whether we are operating in the alternating or double precision mode. Regardless of the operating mode, however, all of the elements are loaded into a buffer where they will be subtracted from the element count. When we near the end of the count, i.e. when we read 3, 2, 1, or zero, we are sending four words at a time so we load the element counter. We then proceed to count down, by subtracting four valid bits from the Local Select memory. In this way, we can calculate the number of valid words that we are sending over from the element count.

There is also another mechanism that we use which is similar to the element counter but it is just used to allow in the next instruction. It is called an auxiliary element counter and is shown in FIG. 323. It's only purpose is to let us know when the next instruction is going to start. This is important because the load vector processor has pipeline characteristics so we need to know when we can allow the next instruction in, so that maximum efficiency is obtained.

To reiterate we get the element count from the Loop Control section and perform the same adjustment to it. We subtract one in the same way and load it into this register. Now the first pass that is gone through is where we take information from the load select memory, i.e. the bit count For example, if we are doing four words every time, this will subtract number 16 from the total and that will be the first pass. Subsequent passes will be controlled by the number of valid bits that we have. Once the counter reaches zero or goes negative, the pass gate is set and that will force the vector busy to drop. This will allow the next instruction to enter and show that vector busy. It is from one of those initialization timing chains and it sets the vector busy as long as we do not have a zero element count. After we clear out the vector busy signal, this will enable the next instruction to enter. We have a special mechanism called a last pass designator, to tell us when we have reached the end of the instruction. The key here is that we will not stop. We will not even look to see if we stop until the upper bits of the element count of zero has been reached. Once we have reached zero, one, or two in the element counter we go ahead and we look at the valid bits that are exiting the load select memory. If, for example, we have four valid words, we select four and enter them into this register. If there are four valid bits we select the element counts in this register and hard wire those. If our element count says that there are two valid words left, we have to know which of those four are really the valid words. To do this, we have to do a selection operation. This is done by a series of hard wired registers. They are connected to this selector and it needs to accomplish two things. First we must detect if we are doing the last pass and this need to readjust the valid bits as before. These are the new valid bits rather than those coming out of the memory. They show up during the last pass or when we get down to three elements left, and we are still not at the last pass, these bits go to the tracking memory. There will be another bit exiting which will tell us that we are doing a last pass or not. The last pass designator will be set at this point. The setting of this bit will indicate that we have four different types of last pass. If we are running in both vector and scalar and the load vector is starting up, it is ready to go. We will perform a selection and this allows us to have a different set of last pass signals. Where we are doing a load vector and there is nothing else exiting we just go back to another load vector operation and this will be the last pass.

Next consider the Load Vector (VL) section 1200 from Local Store as shown in FIG. 326. Generally the Load Vector from the Local Store works much like the Load Vector from the HPSU except that we need to control it with a different timing chain sequence. We start off with the same timing chain as if we are going to use the HPSU. Since we are going to the Local Store we need to stop its timing chain and use it. There is a mechanism in this timing chain called a four K check. It limits us from entering the Local Store and make sure we enter the HPSU. When the four K check goes to the correct value we will stop the HPSU timing chains and switch over to the Local Store timing chains. The four K check is controlled by our address and we will take a look at that operation next.

The four K check is only used if it gets translated to the ST entry zero and there is the possibility of it going to the Local Store. It is the only time that we are going to be looking at that. Otherwise, it goes to the HPSU. As shown in FIG. 327 when we have an AST zero we are going to be selecting either the HPSU or the Local Store. That is determined by the address coming from our virtual segment offset stride register. We also check to see that the upper bits are all zero and from that we know that we have to go to the Local Store. If this turns out to be zero we go to the Local Store, while a one will go to the HPSU. Now when switching from the HPSU to the Local Store we have to wait until the tracking memory (TM) enters. Remember that when we do go to the Local Store we have to bypass the tracking memory. Also if there is any information in there, we must wait until it exits, before we can go ahead and start, so we make sure the tracking memory is empty and once it is empty we go ahead and start up the load vector to Local Store otherwise we must wait. That completes the description of the Load Vector to Local Store, we will now look at the Index Load Vector shown in FIG. 328.

The Index Load Vector is a special case because the indexes that we add to the address come from another vector in the Vector File. So before we can even generate any addresses we have to get the indexes from the Vector Files and move them into index buffer. It can hold up to 64 indices in the buffer. This is a two word path going into buffer and only one word that we may read out at a time. So usually there are few conflicts in the index buffer. What happens is that we read out of the index buffer and put it into the addend buffer and then directly add it to the absolute address (AA). We calculated a new address by adding the stride value and then sent it off to the HPSU. The data will go into a load buffer and then into the Vector Files. So basically there are two separate operations. The first operation involves getting the indexes from the Vector Files and into the index buffer. Thereafter, the addresses are generated by taking the index out of the index buffer adding it to the absolute address and sending it off to the HPSU and continuing on with the Load Vector (VL). It is for this reason that we have to stop the timing chains when we do not have any indexes.

Take a closer look at the index buffer shown in FIG. 329. The index buffer is comprised of four separate index buffers and each one of these can hold 16 different indexes. The indexes actually come through the store buffer section. The vector store section is responsible for reading the indexes out of the Vector File and sending it to the AST section. There it will pass through two simple registers and on into the AG section. There are two index read addresses, one for each of the buffers. However, there is only one output index register. Consequently we have to select between these and we use an index toggle to select which of the memories we are going to use. We use them as a pair, zero and two as one buffer and one and three as the other. So the index toggle will control which one of these groups will be providing the output. For a read address one of the buffers will tell us which one of those two we should select.

From the index buffer register it goes directly into the addend buffer and it is then added to the absolute address. We have two separate write addresses for the index buffers and that is because there are two words entering at a time so we can load both buffers at once. Now for reading we can only read one at a time so basically we are only going to have one read address, though we do have two stored in the address registers. This is shown in FIG. 330.

Now consider first, the control interface and following that we will look at the data path and its composition. FIG. 331 is a timing diagram of that control interface. The requests and the ACK 1, ACK 2 are the AG and HPSU interface. The ACK 2, the load vector, the valid and the mask are the AG to the VL section interface, while the word select is the AG to Local Store interface to control the data. This next line represents the data coming from the HPSU to the Local Store and being sent to the vector side.

When we make a request we load up the information of that request into the tracking memory and it will stay there until we get an ACK 2 back and when the ACT 2 does return we send a later copy of that incident to the vector side and we let the information flow from the tracking memory for that request. So we send a signal saying that we are doing a load vector, now the Vector Load section will not look at anything until it sees both the load vector and the ACK 2. Since you could also receive ACK 2 for a store vector both signals exiting the tracking memory are needed in order to load the buffer. The valid and mask bits also come from the tracking memory. Now the valid bits indicate which one of the four words are actually valid and those should be written into the load buffer. There is a mask bit which corresponds to every data word and you can not mask out the data until it actually gets to the Vector File. Consequently the mask will not prevent it getting into the buffer but only into the Vector File. Also coming out of tracking memory is the word select signal. We must rearrange the data coming out of the HPSU and get it in the correct order in order to write it into the load buffer. As the data comes back from the HPSU it is latched in the Local Store and the word select signal is sent to the Local Store. It rearranges the data words and thereafter they are sent to the load buffer in the correct order.

Next, let us look more closely at that interface in the Local Store. FIG. 332 is a diagram of the Local Store section. Consider first the case where the data comes from HPSU. It is different than from the Local Store. The data comes in from the HPSU four words at a time. It enters an input register. From there any of these words can be placed in any of the VP data registers in whatever order indicated by the tracking memory. Now, there are two bits for each one of these paths along which the data must travel. It comes from the tracking memory and the tracking memory, in turn, came from the load select memory. So, in this case, we can put the data in any desired order. There is also one bit that tells us whether we are coming out of the HPSU or the Local Store. That bit selects either the HPSU or the Local Store. Now the data coming out of the Local Store can also be selected in any of those registers, similar to the HPSU. The address for the Local Store during the load vector periods comes from the AG and this is an important signal that the IF must send. This only comes up if we have to return a zero back to the Instruction Flow section. This tells it that we need to go to the Local Store. This is set up so that the AG's address will actually be the one addressing the Local Store.

Next, consider the Vector Processor Module to see how it is involved in the Load Vector instruction. Basically, it has two parts. The first part is the load buffer and it is located in the Vector Load section. The second part is a Vector File located in the Vector File section.

FIG. 333 is a logical block diagram of the Load Buffer. It can handle up to two complete four word vectors. It is structured in this way so that it can handle a double, an alternating load vector or both of these vectors. The data comes in from the Local Store through one input register via the load buffer. Now the load buffer is separated into a buffer zero and a buffer one. It is partitioned such that words zero and one are in buffer zero and words two and three are in buffer one. Along with the data we have a mask signal which is received a stage earlier in a transfer mask register. It will go in along with the data. One of the signals that controls the writing of the data is the ACK 2 bit. Each of these control write words is going to include valid bits. So even if we get a load vector and an ACK 2 signal nothing is written unless we have a valid bit. This writing into the buffer is separate from the reading out of the buffer. For example, the AG in the Scalar Processor Module is in control of the data written into the buffer, while reading out of the buffer and sending the data over to the Vector Files is the responsibility of the Vector Load section.

Conflicts may arise here such that the vector load instruction has to wait until the data enters. Conversely you could have the data loaded in the Vector Load section awaiting the receipt of the instruction. Since there is a forward data path via the load data AB register coming out of the buffers and sent over to Vector Files we can perform any desired selection. As far as the time slot goes we have two write time slots and we may not need both of them if the data is arriving too slowly. The vector section will calculate that and use its selectors to get the data out in correct order.

Moving on to FIG. 334 there is shown a detailed portion of the Vector File section. Two words arrive separately from the Vector Load section since we have two time slots and since we will write them in different places. The vector control (VC) section is responsible for the address through the Vector File and will provide that. The primary address will go along in sequence via registers to each one of the 4/5 Vector Files and the data will get selected and placed into the correct file as we move along.

FIG. 335 is a pictorial example of a load vector with a stride of three and an element count of five. We will now go through this and show just how the load select memory works. Remember that the load select memory is a read only memory (ROM) and the only inputs going into it are going to be the starting address along with the stride and information about the stride. On the left is the representation of the HPSU. Starting at location zero, on the first request we are going to read out four words and now we want to get these into the correct position in order to get them into the Vector File. Now the load select memory is responsible for getting the data into that position. If we can take a look at the load select memory, what we have is the starting address going to the load select memory. This is zero since we are starting in the first position. The first two bits of the stride three are two ones and also we have the jump control bits. This address is used to give us an entry into the memory itself. What is shown are the most important output signals of the memory. This, of course is how we control that data word path from the Local Store to the load buffer. What we have is a four word path and in the entry itself there is a valid bit for each. There are two bits for each one of those words of word select and two bits for each one of those words in the mask. The first time a request is made will tell us that we have two valid words. Also because of the stride, the start of the address and the word select we have to take word zero out of the HPSU and put it into this position. This is going to be a valid signal and the zero bit of the mask is selected. Now the third word comes out of the HPSU and is made the first word that we want to send over as word one to the Vector Load section. That word is also valid and we want to select a correct mask bit to go along with it. Words two and three of those paths are going to be invalid and are ignored. The second request is handled by the load select memory also. So this is the fourth and fifth request. We also count down the element counter as we are making the request. Note that we had an element count of five and we need to subtract one so we are working with an element count starting with four. This enables us to end up with locations three, two, one or zero. We have words one, two, three and four left. We start out with word four and we send two valid words so we decrement that down to two and make our next request. We can do this because we know that once we have hit two we have to start to look for the last pass. This means that we must check to see if this is going to be our last pass. The element count has counted down to two. This means that the upper bits are going to be zero so instead of selecting those in zero locations, we pass on to the next one indicating a valid bit for the next request. These hardware registers know the valid bits because the element count says two actual meanings. Thus since we have three words left we are not going to want to set the last pass operation.

g. Vector Store

The final logical section in the VPM is the Vector Store (VS) section. FIG. 336 is a block diagram of all of the sections that come into play when you are doing a Vector Store type instruction. The instruction is loaded into the instruction buffer and is staged along to the IF 400 until it reaches the FO register which is basically the execution time of all instructions. At that time is sends important decode information to the instruction and the issue information to the Vector Control section 1100 and to the Address Generation section 700. The Vector Control section 1100 continues to send important information to the Vector Store section 1500 which starts the Vector Store. The data path flows from the Vector Files 1300 into the Store Buffer 800 and from the Store Buffer 800 in the HPSU 16 and for Local Store 300. So once an instruction has been issued all of the control is handled by either the Vector Store section or the Address Generation section.

FIG. 337 is a more detailed diagram of the data path. It shows that you have four words that come out of the Vector Files, two primary words and two secondary words. Since the primary Vector File has the exact same data as a secondary Vector File we can send more data at a time and because of the way that the data is transfered you can send discontinuous data, which is the way that it is sent across. There two staging registers 801, 803 in the ST section 800 are used only during normal store vector instructions. During store alternate or index store the data goes around these two and straight into the write data register 813. The file write data register 813 then puts the data into one of the two buffers shown in FIG. 338, either store buffer 0 or store buffer 1. The output register in the store buffer section sends the data either to the HPSU or to Local Store. The words in the store buffer that go into the storage locations depends upon where in the memory that it is being stored. So word 0 does not necessarily have to go to word 0, rather it can go to word 3. How that happens is dependent upon what occurs in the Address Generation section 700. The AG section takes care of address translation to a real address in either the Local Store or in the HPSU. It also has a selector memory which determines the word selection destination from the Store Buffer. The selector memory generates a function which basically determines the write enable signal for the memory. It also determines whether and where it is going to in Local Store and/or the HPSU. Those write enable signals correspond with those words that are being sent across and identify their order.

At this point, it is believed that some explanation is needed as to what the AG is doing and how it is translating and generating addresses. For any store pipe instruction, the G register is required to point at an address. Whether the address is pointing to a Local Store address or to an HPSU address depends upon the identifier that is in the G register. If it is pointing at entry GO or G15, it is defined as Local Store. All other G registers can be used for either the LS or the HPSU depending upon what identifier is contained in the G register. Thus, if the G register is pointing at the HPSU it will be an entry other than 0.

The Activity Segment Table is stored in a memory that is three words wide. The first word is the identifier of the lower segment number and the upper segment number which is stored in the complete 72 bit word. So you can define both the upper and lower boundaries of the segment, but you do not have to define both upper and lower boundary. It can be just the lower one in which case the identifier in the G register has to match the contents of the lower boundary. The second word is the base address which indicates whether the segment is in the Local Store or in the HPSU. It is pointing at the base address. The third word describes the length of the segment. That is, the number of useable words in the segment. That length,for the Local Store, is defined as being of a minimum of 32 words and it must be in 32 word increments. For the HPSU it is a minimum of four words and is in four word increments. So you have an identifier, a base address, and the length of the segment. So when we execute the instruction, the first thing that it does is to bring in the identifier which is in the G register. It compares it to the reference levels to see if it falls in the bounds of being greater than or equal to the lower identifier and less than or equal to the upper identifier. This comparison is the validity check to determine if this identifier is valid. If it is valid, from that point on, it waits until the instruction is ready to be executed and it starts forming the real address by bringing the base up and adding to it the stride value if you are using a stride. If you are not using a stride it adds on a single value. The base address is then loaded into the real address memory. It is stored there if you are going to Local Store because you may have areas there that you are storing. If the stride is other than 1, it is added in at this point. If it is 1 there is an automatic increment of 1 if you are not using the stride register. If you are doing an index type instruction, the index value gets loaded into the addend buffer and gets added directly to the base without any incrementation. The index buffer is shown in FIG. 339. So each subsequent index value goes into the addend buffer and then gets added to the base address and from there it propagates into the HPSU address. It either propagates in the adder up to the HPSU address or it propagates up to the Local Store address. That is the basic path of how an address is obtained.

In a normal Store Vector type instruction, the IFC first issues an Address Generation signal. Next, the IFC sends an issue to the Vector Control Module. It is four lines wide mainly for error checking so that if a bit is dropped, it is recognized. Two phases later, that data is propagated to the Vector Store section. The VC also sends a pipe decode signal. This notifies it that the issue is for a Vector Store type instruction. Two phases after the issue acknowledges, it gets a time slot reserve in the Vector Control section. It also sets up a signal that says that no new instructions are allowed. A cycle later it goes active and is used for performance monitoring. It also tells the VC that we are currently executing a Vector Store instruction and this signal is used to accomplish that. Two cycles after the VC has been received, the instruction from AG get its issue. The reason for this is because of a change in the Instruction Flow Control section. Every time the G register is accessed it must be invalidated and then updated, since we only use the G register once, when it goes through the validation process on the AG, it only can be updated once. Two phases after the AG receives its issue, the AG performs an actual validation check of the address.

After the AG has determined validation it waits for the data to be loaded into the Store Buffer. At the time that the VS executes the instruction, it also performs an element count. The VS ST Control interface timing of this operation is illustrated in FIG. 340. The element count is loaded into the element counter register in the VS and the VS starts transferring the data to the Store Buffer. At the time that it starts an actual transfer a VS SC primary start vector designator signal is recognized. It is going active at this time which is approximately one cycle after it has received the issue. It also determines which buffer is going to store the data. In this case it is going to use buffer zero because it has not used any of the other buffers before this point. It could be going from a low to a high point to buffer one, but in this particular instance it is going to buffer zero and the VS has total control over the buffer selection. The only items that need checking are the lines coming back from the store buffer. They determine if there is an idle buffer. If there is a buffer that is busy it goes to the other buffer, but if both of them are busy then you must wait until the first buffer that was used becomes empty and it will go there. Now since the data that we want to store comes across as word zero and one, sixteen and seventeen, we do not want to store the secondary data right away, because all four words will be stored in word zero and one in the store buffer. Because of that, the primary store vector and the secondary store vector are delayed by one cycle and prevent the writing of the secondary data. These signals are used in the store buffer to determine when the write enable signals become active. The first two words to be stored are written into zero and one locations. The next write operation actually comprises four words and at that point we write words two and three. The data that is coming across on the primary line are words two and three, and sixteen and seventeen. Because we are only doing an element count of 7 this is basically non-valid data. At this time word zero and one write addresses are sitting at zero and, in the secondary, words 2 and 3 are also sitting at zero. On the next cycle when it should write the next one, word two and three both remain zero while one will have gone to four. A simple instruction startup timing diagram is illustrated in FIG. 341.

Because the element is so short, there is an offset counter which has previously been discussed in the Vector Store section. This offset counter normally counts up before it allows you to start reading, so that you do not over run the data. In the present instance because we are only storing these elements that the counter has no chance of reaching the point where it says that there is enough data to transfer. However, the AG starts generating addresses in order to start the transfer of data. Next, the AG store vector receives an address timing chain that is just starting. At the same time the read addresses are being generated to start reading the data out of the store buffer and it is sitting at zero at that point. The read address counter runs in parallel with the offset counter so that it will be incremented at the same time as the offset counter. There is a lag between the time that we have gotten the last transfer and the reason for this is that we start reading the physical data out and generating the address in the presence of the store start enable (STAG) signal. This signal is active when it is in the low condition. It is sent after it has gotten the last transfer and, at that point, this signal must be propagated through the AG section. It physically starts the address timing chain to get everything started. At that point, we can start sending data across, so we read the data out and the data is staged through the output registers of the store buffers and the AG sends the address of the location of which it is going to write four words.

On the next cycle, the address read address is incremented and the HPSU address is then incremented and the function changes to a 16 because we are only writing three words for a total of seven. The AG keeps track of how many elements it has to send. These element counters are loaded with one minus the element count and it is decremented by four on each pass on which data is sent. So when the element count drops below zero, the AG sends an early last pass signal, which begins the shut down of the whole process. In any event, after the last pass, the instruction is complete and all of the data has been stored in the HPSU.

FIG. 342 illustrates a timing diagram of a store vector operation, where the element count equals 35. The data paths are shown so that we can see that the relationship they have to cycle numbers on the timing chart is that cycle one corresponds to zero time. Cycle one is also where the VF is changed to the start vector time, so the first line represents the Vector File. Thus, we have a Vector File with some amount of data in it and at stage four we send four words across. This includes two primary words and two secondary words.

The primary data goes from the output of the Vector Files into the write data register in the store buffer at phase three. On the following phase one, that data is written into words zero and one of a store buffer. Now the next batch of data comes in on cycle 2 and it follows the same path through the store buffer input register. However, it enters word locations two and three of the store buffer. This same pattern follows along for a total of 8 words even though the element count is 7 because they transfer two words at a time.

At the time that the AG has a ready address, the data is taken out of store buffer and placed in the output register of the store buffer. On the next cycle we will also have four words latched into the output register. For an element count of thirty-five a write enable signal is given to the HPSU to correspond with that word.

FIGS. 343 and 344 also illustrate timing diagrams, however, they are for element counts of nine. FIG. 343 is for an instruction save vector (ISV) and FIG. 344 is for an instruction load vector (ILV).

The next instruction type to be explained is the store alternate instruction shown as a timing diagram in FIG. 345. It is a relatively long timing diagram so the alternating elements are different in that they send across a real and an imaginary data pair. Since you are sending across four words at a time there are two corresponding pairs, but each four words correspond to two elements. That is, two elements instead of four elements as in a normal store vector. If this were a double precision operation for alternating, each of the four words would be a single element. Because of this, if the element count is 38 which is greater than 32 you have the possibility of filling up more than one store buffer. For the example, we have chosen an element count greater than 32. In fact, the element count chosen is 38 to show the transition between the two buffers. The start up of this store alternating operation is the same as that for the store vector, and we have previously shown the signals for that in FIG. 341.

The primary write toggle designator determines the buffer into which we are writing. It starts out at zero and we start to load it up. Now the VS needs some means for telling the store buffer which type of storage is being done i.e. is it a store vector, a store alternate or a store index. Instead of sending a primary and a secondary store vector line we have the VS ST stored zero being activated. There is also shown a store one signal. At the time that we should have gotten a primary start vector signal we did a store zero alternate operation. This tells the SP to start storing data. It is going to be that signal and the write tag signal which tells us that it is going to start storing data in buffer zero.

The store operation continues with the pass counter and the element counter decrementing until we get half way through. At that point the pass counter tells the write toggle to switch over to buffer one. At the same time, the store zero signal drops and, in the meantime, the store all zeros signals drops. The store out one signal rises to tell us that we are now storing in buffer one. The store continues on until the end and the last transfer comes up and the store one drops and tells the store buffer that there is no more data to be sent to the buffer. We have now shown the major difference, as far as the AG is concerned between this and the store vector. For example, we have here a far bigger element count of 38. This is instead of an element count of nine (9) and that causes this whole process to run much longer. However, though longer, they are the same processes that are followed in causing the data to exit. The major difference is in taking care of it in the Store Buffer. There is a read toggle circuit, not shown, which keeps track of when you have to switch between the two buffers.

The read toggle performs the same function as the write toggle that comes from the VS in that it keeps track of when we need to come up between the buffers. This mechanism has been described in detail earlier in this specification, however, basically we are going to be flopping between buffers. The other major difference between this and the store vector example previously described is that the offset counter which is shown on line 30 and 31 is effective here. The write address has to count up to ten here because that is compared to the read offset counter. The write enable signal must be greater than the offset counter and we drop off the least significant bit of the write address and we compare that to the offset counter. It is not until the point when write address gets to a count of ten that it is greater than a three in the offset counter and it is at that point that we can get the store start enable bit.

At the point where the read address is greater than three we send the store start enable signal and we can start reading the data. This happens when the data is physically transferred and when we start getting the function and the address. Now as to these addresses, the function is a 14 and the reason that it is a 14 is because we have shown what is going to happen if a stride other than one is used. In this case a stride of two was chosen which means that the data is always going to be stored in words zero and one. Consequently it is going to take double the amount of time to do the physical store. We are only going to store two words at a time. We are going to store one real and one imaginary pair in each storage transfer, so the function is a 14 which corresponds to a word zero and a word one. The address is being incremented the same as it would be if the stride had been 1. So in this example we have tried to show what happens if you have a stride other than one and you cross the boundary.

It is considered readily seen that the primary and secondary words are written when they cross the interface to the store buffer. Thereafter, they again go into the write data register for entry into the files. At some later time the first two words of data exit on the word zero and one. The next two words of data will also come out on words zero and one and that process will continue for a given number of cycles. In this case for quite a number of cycles until the end is finally reached and you write the last two words. All of these transfers happen on word zero and one because of the stride that was chosen. Because we are doing a store alternating operation the word boundaries are on a even word. If a different stride had been chosen they may have come out of words two and three, however, they will never come out on word lines one and two or on word lines zero and three. The lines will always be zero and one or two and three. For a normal store vector they can come out on any of the words because there are no boundary restrictions for that type of instruction.

It should be remembered that there is no crossing of the data, it always comes across as real and imaginary and goes into the write data register as real and imaginary. It is also stored in the store buffer as real and imaginary and it is transferred between the store buffer and the HPSU or Local Store by printing them as the real and imaginary. It is taken out so that word zero and word two are sent as word zero and one on the interface. They are transferred as a pair of words and the word numbers are one real and one imaginary. It is not until it takes the data out of the store buffer and transfers to the HPSU or the Local Store that the two words are placed in adjacent locations.

Now since this is double precision, the timing chart shown in FIG. 345 has been written to show you that there is going to be some major differences between this and a normal store vector. The first difference is that a primary start vector is not sent, rather we will send a pair of signals. They are a store index designator and a store index data designator. So as long as the index value is active it tells us that we are sending the actual index value, which will generate the address. In the double precision case it is seen that this double precision data is twice as long as the index values because each word of data is two elements long. Because of this we can only send one element of data for every two elements of index. It is apparent that the primary element count which corresponds to the data is twice the value of the secondary element count which corresponds to the index. Remember also that the store vector toggle is toggling as it was with the store vector because the data is always coming across as primary words. Consequently if we did not toggle, we would always end up in words zero and one in the store buffer. Since you need continuous locations in the store buffer, you need to transfer them to words two and three also and this toggle signal enables us to do this.

FIGS. 346, 347, and 348 are all timing diagrams illustrating various operations of the overlap condition. This, of course, occurs where there are instructions which are seeking concurrent execution.

FIG. 346 illustrates the overlap situation during the start-up of the instruction. FIG. 347 illustrates the overlap case for the concurrent execution of a save vector (SV) with a save vector, while FIG. 348 is the example of a save vector (SV) with an instruction save vector (ISV).

CONCLUSION

From the foregoing description of the Scientific Processor components and the interaction among components it is clear that the various stated purposes and objectives have been met. The Scientific Processor has an interface for coupling to a High, Performance Storage Unit for receiving instructions and operands and for providing resultant operands. It also has control and timing circuits that synchronizes the transfer operation with the operation of a host processor. The scientific calculations are accomplished in the Scalar Processor Module and the Vector Processor Module. The Scientific Processor is efficiently controlled by an associated host processor without the requirement of extensive dedicated memory or caching, and without any resident operating system software. All of the instructions and data words are derived from the High Performance Storage Unit under control of the host processor. All of the resultant data words are directed back to the High Performance Storage Unit, where they can also be referenced by the host processor.

The Scalar Processor Module includes instruction flow control circuitry for controlling execution of instructions, and a control block for controlling functioning of the Scientific Processor. Address generation circuits control generation of addresses in the High Performance Storage Unit. A Scalar Processor ALU performs required scalar manipulations. Loop Control circuitry is arranged for controlling nested loops of instructions. A store buffer is shown for passing resultant data words to the interface for storage. The entire Scalar Processor Module is shown to function in parallel and at comparable rates with the Vector Processor Module.

The Vector Processor Module has vector control circuits and vector file storage that is loaded by vector load circuits. There are several parallel pipelined circuits, including a multiply pipeline, an add pipeline and a move pipeline, each of which produces resultant words at rates comparable to the transfer rates of the interface. Conflict detection circuitry detects conflicts in references to the vector operands between the parallely functioning pipelines.

In view of the detailed descriptions and drawings, various modifications or implementations will become apparent to those skilled in the art without departing from the spirit and scope of invention, and what is described to be protected by Letters Patent is set forth in the appended claims.

We claim:

1. For use in a data processing system having a general purpose host processor and a high performance storage unit coupled thereto for providing a general purpose processing capabilities in said data processing system, an improved scientific processor operable under the control of the general purpose host processor comprising:

interface means for coupling to the high performance storage unit for receiving data operands and instruction words from the high performance storage unit and for transmitting resultant data operands to the high performance storage unit;

unit control and timing means coupled to said interface means for providing timing and control signals for synchronizing operation with the operation of the general purpose host processor and the high performance storage unit;

scalar processor module means coupled to said unit control and timing for performing scalar instruction data processing, said scalar processor module means including instruction buffer means for providing instruction word buffering between the high performance storage unit and the scientific processor; and vector process module means coupled to said unit control and timing for performing vector data processing instructions, said vector processor module means including a plurality of pipeline means coupled to said interface means for receiving data transfers of said data operands therefrom and for providing resultant operands thereto, and further including a plurality of vector register means for temporarily storing selected ones of said data operands and said resultant operands;

wherein both scalar operands and vector operands can be efficiently manipulated in various combinations under program control of the general purpose host processor and to make resultant data operands available to the high performance storage unit all without the requirement of dedicated or cached memory.

2. The improved scientific processor as set forth in claim 1 wherein said scalar processor module means is coupled to said interface means and is coupled to said unit control and timing means for temporarily storing data operands received, and temporarily storing instruction words received from said interface means in said instruction buffer means and for at least temporarily storing resultant data operands for transmission through said interface means to the high performance storage unit.

3. An improved scientific process as in claim 1 wherein said scalar processor module means further includes:

instruction flow means coupled to said interface means for receiving instruction words and for controlling the execution of instructions in response thereto, said instruction flow means including said instruction buffer means;

scientific processor control block means for controlling the functioning of the scientific processor in response to control signals provided from the general purpose host processor via the high performance storage unit;

mask processor means for selectively providing informational data transfers to said vector processor module means;

address generation means for generating addresses to be referenced in the high performance storage unit:

scalar processor arithmetic logic unit for performing scalar instruction manipulation of scalar words read from said local storage means; and store buffer means for at least temporarily storing said resultant data words and for making said resultant data words available to said interface means for transmission to the high performance storage unit.

4. The invention of claim 3 wherein said scalar processor module further includes:

loop control means for controlling nested loops of instructions.

5. An improved scientific processor as in claim 1, wherein said vector processor module means includes:

vector control means for controlling vector operands received from the high performance storage unit to be processed;

vector file means for temporarily storing the vector operands to be processed;

vector load means coupled to said vector control means and coupled to said vector file means for managing and timing storage of vector operands in said vector file means;

vector store means for transferring resultant vector operands intended for storage in the high performance storage unit;

scalar data operand and vector data operand transfer control means for selectively directing operands between scalar and vector processing operations in said scalar processor module and said vector processor module;

said plurality of pipeline means for respectively performing different instruction functions involving addition, multiplication and operand manipulation and movement; and each of said plurality of pipeline means operable simultaneously with each other for performing simultaneous respective functions.

6. An improved scientific process as in claim 5 wherein said vector processor module further includes:

conflict detection means coupled intermediate to said vector file means and said plurality of pipeline means for detecting access conflicts in reference to respective ones of the vector operands therebetween.

7. An improved scientific processor as in claim 5, wherein said plurality of pipeline means includes:

add pipeline means for performing instruction functions involving addition;

multiplying means for performing pipelined multiply functions; and move pipeline means for moving resultant data words to storage;

said add pipeline means, said multiply pipeline means, and said move pipeline means, operable in parallel for performing simultaneous respective functions.

8. An improved scientific processor as in claim 7 wherein each of said plurality of pipelines can provide a pair of resultant operand words in the time normally expanded for a memory reference cycle of the high performance storage unit.

9. For use in a data processing system having host processor means and a high performance storage unit coupled to the host processor for providing high speed storage of data operands and instruction words, the host processor operable to execute instructions and control functioning of the data processing system, an improved scientific processor operable under control of the host processor comprising:

interface means for coupling to the high performance storage unit for receiving data operands and instruction words from the high performance storage unit and for transmitting resultant data operands to the high performance storage unit;

unit control and timing means coupled to said interface means for providing timing and control signals for synchronizing operation with the operation of the host processor and the high performance storage unit;

local store means coupled to said interface means and coupled to said unit control and timing means for temporarily storing control parameters, data operands and instruction words received from said interface means and for at least temporarily storing resultant data operands for transmission through said interface means to the high performance storage unit;

scalar processor module means coupled to said unit control and timing means and to said local storage means for performing scalar instruction data processing, said scalar processor module means including instruction buffer means for providing instruction word buffering between the high performance storage unit and the scientific processor; and vector process module means coupled to said unit control and timing means and coupled to said local store means for performing vector data processing instructions, said vector processor module means including a plurality of pipeline means coupled to said interface means for receiving data transfers of said data operands therefrom and for providing resultant operands thereto, and further including a plurality of vector register means for temporarily storing selected ones of said data operands and said resultant operands;

wherein both scalar operands and vector operands can be efficiently manipulated in various combinations under program control of the host processor and to make resultant data operands available to the high performance storage unit all without the requirement of dedicated or cached memory.

10. An improved scientific processor as in claim 9 wherein said scalar processor module means includes:

instruction flow means coupled to said interface means for receiving instruction words and for controlling the execution of instructions in response thereto said instruction flow means including said instruction buffer means;

scientific processor control block means for controlling the functioning of the scientific processor in response to control block signals provided from the high performance storage unit by the host processor;

address generation means for generating addresses to be referenced in the high performance storage unit;

scalar processor arithmetic logic unit means for performing scalar instruction manipulation of scalar data operands read from said local store means;

store buffer means for at least temporarily storing said resultant data operands and for making the temporarily stored ones of said resultant data operands available to said interface means for transmission to the high performance storage unit.

11. An improved scientific processor as in claim 10 wherein said scalar processor module further includes:

mask processor means for selectively providing informational data transfers to said vector processor module means.

12. An improved scientific processor as in claim 10 wherein said scalar processor module means further includes:

loop control means for controlling nested loops of instructions.

13. An improved scientific processor as in claim 9, wherein said vector processor module means includes:

vector control means for controlling vector operands received from the high performance storage unit to be processed;

vector file means for temporarily storing vector operands to be processed;

vector load means coupled to aid vector control means and coupled to said vector file means for managing and timing storage of vector operands in said vector file means;

vector store means for transferring resultant vector operands intended for storage in the high performance storage unit;

scalar data operand and vector data operand transfer control means for selectively directing operands between scalar and vector processing operations in said scalar processor module and said vector processor module;

said plurality of pipeline means for respectively performing different instruction functions involving addition multiplication and operand manipulation and movement; and each of said plurality of pipeline means operable simultaneously with each other for performing simultaneous respective functions.

14. An improved scientific processor as in claim 13 wherein said vector processor module means further includes:

conflict detection means coupled intermediate to said vector file means said plurality of pipeline means for detecting access conflicts between ones of said plurality of pipelines in reference to respective ones of the vector operands.

15. An improved scientific processor as in claim 14, wherein said plurality of pipeline means includes:

add pipeline means for performing instruction functions involving addition;

multiply pipeline means for performing pipelined multiply functions; and move pipeline means for moving resultant data words to storage;

said add pipeline means, said multiple pipeline means, and said move pipeline means, operable in parallel for performing simultaneous respective functions, and each of said add pipeline means and said multiply pipeline means capable of providing resultant operand words in the time normally expended for a memory reference cycle of the high performance storage unit.

16. For use in a data processing system having a host processor and a high performance storage unit coupled to the host processor for providing high speed storage of data operands and instruction words, the host processor operable to execute instructions and control functioning of the data processing system, an improved scientific processor operable under control of the host processor comprising:

interface means for coupling to the high performance storage unit for receiving data operands and instructions words from the high performance storage unit and for transmitting resultant data operands to the high performance storage unit;

unit control and timing means coupled to said interface means for providing timing and control signals for synchronizing operation with the operation of the host processor and the high performance storage unit;

local storage means coupled to said interface means and coupled to said unit control and timing means for temporarily storing data operands and instruction words received from said interface means and for at least temporarily storing resultant data operands for transmission through said interface means to the high performance storage unit;

scalar processor module means coupled to said unit control and timing means and to said local store means for performing scalar instruction data processing, said scalar processor means including instruction execution means and addressing means for accessing the high performance storage unit, and further including instruction buffering means for providing instruction word buffering between the high performance storage unit and the scientific processor; and vector processor module coupled to said unit control and timing means and coupled to said local storage means for performing vector data processing instructions, said vector processor module means having a plurality of vector operand manipulation pipelines operable simultaneously and each capable of providing resultant operands at rates relating to a memory reference cycle of the high performance storage unit, and further including a plurality of vector register means for temporarily storing selected ones of said data operands and said resultant operands; and where both scalar operands and vector operands can be efficiently manipulated in various combinations under program control of the host processor and to make resultant data operands available to a high performance storage unit all without the requirement of dedicated or cached memory.

17. An improved scientific processor as in claim 16 wherein said scalar processor module means includes:

instruction flow means coupled to said interface means for receiving instruction words and for controlling the execution of instructions in response thereto;

scientific processor control block means for controlling the functioning of the scientific processor in response to control block signals provided from the high performance storage unit by the host processor;

mask processor means for selectively providing informational data transfer to said vector processor module means;

address generation means for generating addresses to be referenced in the high performance storage unit, whereby address spaces may be commonly reference by the hot processor and the scientific processor;

scalar processor arithmetic logic unit means for performing scalar instruction manipulation of scalar data operands read from said local store means;

loop control means for controlling nested loops of instructions; and store buffer means for at least temporarily storing said resultant data operands and for making the temporarily stored ones of said resultant data operands available to said interface means for transmission to the high performance storage unit.

18. An improvided scientific process as in claim 16, wherein said vector processor module means includes:

vector control means for controlling vector operands received from the high performance storage unit to be processed;

vector file means for temporarily storing vector operands to be processed;

vector load means coupled to said vector control means and coupled to said vector file means for managing and timing storage of vector operands in said vector file means;

vector store means for transferring resultant vector operands intended for storage in the high performance storage unit;

scalar data operand and vector data operand transfer control means for selectively directing operands between scalar and vector processing operations;

said plurality of vector manipulating pipelines including add pipeline means for performing instruction functions involving addition of vector operands;

multiply pipeline means for performing pipelined multiply functions of vector operands;

move pipeline means for moving resultant data operands to storage;

said add pipeline means, said multiple pipeline means, and said move pipeline means, operable in parallel for performing simultaneous respective functions; and conflict detection means coupled intermediate to said vector file means and said pipeline means, said multiply pipeline means, and said move pipeline means, for detecting access conflicts by more than one of said add pipeline means, said multiply pipeline means and said move pipeline means, in reference to respective ones of the vector operands.

19. In a scientific data processing system with a general purpose host processor and a main storage system having a directly coupled thereto an improved scientific processor having balanced computation and storage data transfer rates, the scientific processor comprising:

scalar processing means for performing scalar manipulations including instruction buffer means for storing instruction words to be performed by the scientific processor;

interface means bidirectionally coupled to said scalar processing means and adapted for coupling to the main storage system for receiving instruction words and storing them in said instruction buffer means, and for receiving and transmitting scalar and vector data operands therebetween;

a plurality of vector registers coupled to said interface means for storing vector data operands;

a plurality of arithmetic pipeline means coupled via said interface means to said plurality of vector registers for receiving vector data operand transfers therefrom and providing vector data operand transfers thereto;

wherein the total concurrent vector data operand transfer between said plurality of vector registers and said plurality of arithmetic pipeline means provides a computational rate which is matched to the storage rate of data operands transferred between the improved scientific processor and the main storage system.

20. The invention as set forth in claim 19 wherein said plurality of arithmetic pipeline means includes an add pipeline and a multiply pipeline.

21. The invention as set forth in claim 20 wherein the computational rate of the add pipeline is matched the computational rate of said multiple pipeline.

22. The invention as set forth in claim 21 wherein the computational rate of said add pipeline is two words per cycle, the computational rate of said multiply pipeline is two words per cycle and the storage data operand transfer rate is four words per cycle to provide a processor which is balanced with the same number of computational result operand words per cycle as the number of words per cycle transferred by said interface means to the main storage system.

23. For use in a data processing system having a host processor and a high performance main storage system, a scientific processor with balanced computational and storage rate comprising:

scalar processor means for performing scalar calculations;

common interconnection means bidirectionally coupled to said scalar processor means for coupling to the higher performance main storage system;

a plurality of arithmetic pipeline means coupled to said common interconnection means for receiving data transfers therefrom and for providing data transfers thereto;

a plurality of vector registers coupled to said plurality of arithmetic pipelines and coupled to said common interconnection means for receiving and temporarily storing data transfers from said plurality of arithmetic pipelines and for providing data transfers thereto;

said plurality of vector registers also adapted for coupling to the high performance main storage system for receiving stored data transfer therefrom; and an instruction buffer adapted for coupling to the high performance main storage system and to said plurality of vector registers to provide instruction buffering between the high performance main storage system and said plurality of vector registers wherein the scientific process or is balanced with the same number of computational result words per high performance main storage system cycle as the numbers of words per high performance main storage system cycle transferred from said common interconnection means.

24. The invention as set forth in claim 23 wherein said plurality of arithmetic pipeline means includes an add pipeline and a multiply pipeline.

25. The invention as set forth in claim 24 wherein the computational rate of the add pipeline is equal to the computational rate of said multiply pipeline.

26. The invention as set forth in claim 25 wherein the computational rate of said add pipeline is two words per storage access cycle, the computational rate of said multiply pipeline is two words per storage access cycle and the storage rate is four words per storage access cycle for providing a scientific processor which is balanced with the same number of computational result words per storage access cycle as the number of words per storage access cycle transferred by said common interconnection means.

* * * * *